TIME DIVISION COMMUNICATION SYSTEM

Filed Dec. 29, 1964 167 Sheets-Sheet 1

INVENTORS J. E. CORBIN
J. H. HELFRICH
K. A. HELLER
K. L. NICODEMUS
G. W. SMITH, JR.
A. E. SPENCER, JR.
R. C. TOWNLEY

BY John K. Mullarney
ATTORNEY

Sept. 10, 1968 J. E. CORBIN ET AL 3,401,235

TIME DIVISION COMMUNICATION SYSTEM

Filed Dec. 29, 1964 167 Sheets-Sheet 8

Sept. 10, 1968 J. E. CORBIN ET AL 3,401,235

TIME DIVISION COMMUNICATION SYSTEM

Filed Dec. 29, 1964 167 Sheets-Sheet 22

TIME DIVISION COMMUNICATION SYSTEM

Sept. 10, 1968 J. E. CORBIN ET AL 3,401,235

TIME DIVISION COMMUNICATION SYSTEM

Filed Dec. 29, 1964 167 Sheets-Sheet 32

Sept. 10, 1968 J. E. CORBIN ET AL 3,401,235

TIME DIVISION COMMUNICATION SYSTEM

Filed Dec. 29, 1964 167 Sheets-Sheet 44

Sept. 10, 1968 J. E. CORBIN ET AL 3,401,235

TIME DIVISION COMMUNICATION SYSTEM

Filed Dec. 29, 1964 167 Sheets-Sheet 48

Sept. 10, 1968 J. E. CORBIN ET AL 3,401,235

TIME DIVISION COMMUNICATION SYSTEM

Filed Dec. 29, 1964 167 Sheets-Sheet 50

Sept. 10, 1968 J. E. CORBIN ET AL 3,401,235

TIME DIVISION COMMUNICATION SYSTEM

Filed Dec. 29, 1964 167 Sheets-Sheet 52

Sept. 10, 1968 J. E. CORBIN ET AL 3,401,235

TIME DIVISION COMMUNICATION SYSTEM

Filed Dec. 29, 1964 167 Sheets-Sheet 58

Sept. 10, 1968 J. E. CORBIN ET AL 3,401,235

TIME DIVISION COMMUNICATION SYSTEM

Filed Dec. 29, 1964 167 Sheets-Sheet 73

Sept. 10, 1968 J. E. CORBIN ET AL 3,401,235

TIME DIVISION COMMUNICATION SYSTEM

Filed Dec. 29, 1964 167 Sheets-Sheet 80

Sept. 10, 1968 J. E. CORBIN ET AL 3,401,235

TIME DIVISION COMMUNICATION SYSTEM

Filed Dec. 29, 1964 167 Sheets-Sheet 81

Sept. 10, 1968 J. E. CORBIN ET AL 3,401,235

TIME DIVISION COMMUNICATION SYSTEM

Filed Dec. 29, 1964 167 Sheets-Sheet 84

Sept. 10, 1968 J. E. CORBIN ET AL 3,401,235

TIME DIVISION COMMUNICATION SYSTEM

Filed Dec. 29, 1964 167 Sheets-Sheet 94

Sept. 10, 1968 J. E. CORBIN ET AL 3,401,235

TIME DIVISION COMMUNICATION SYSTEM

Filed Dec. 29, 1964 167 Sheets-Sheet 104

Sept. 10, 1968 J. E. CORBIN ET AL 3,401,235

TIME DIVISION COMMUNICATION SYSTEM

Filed Dec. 29, 1964 167 Sheets-Sheet 105

Sept. 10, 1968 J. E. CORBIN ET AL 3,401,235

TIME DIVISION COMMUNICATION SYSTEM

Filed Dec. 29, 1964 167 Sheets-Sheet 109

Sept. 10, 1968 J. E. CORBIN ET AL 3,401,235

TIME DIVISION COMMUNICATION SYSTEM

Filed Dec. 29, 1964 167 Sheets-Sheet 113

Sept. 10, 1968 J. E. CORBIN ET AL 3,401,235

TIME DIVISION COMMUNICATION SYSTEM

Filed Dec. 29, 1964 167 Sheets-Sheet 118

Sept. 10, 1968 J. E. CORBIN ET AL 3,401,235

TIME DIVISION COMMUNICATION SYSTEM

Filed Dec. 29, 1964 167 Sheets-Sheet 130

Sept. 10, 1968 J. E. CORBIN ET AL 3,401,235

TIME DIVISION COMMUNICATION SYSTEM

Filed Dec. 29, 1964 167 Sheets-Sheet 134

Sept. 10, 1968 J. E. CORBIN ET AL 3,401,235

TIME DIVISION COMMUNICATION SYSTEM

Filed Dec. 29, 1964 167 Sheets-Sheet 147

FIG. 1350
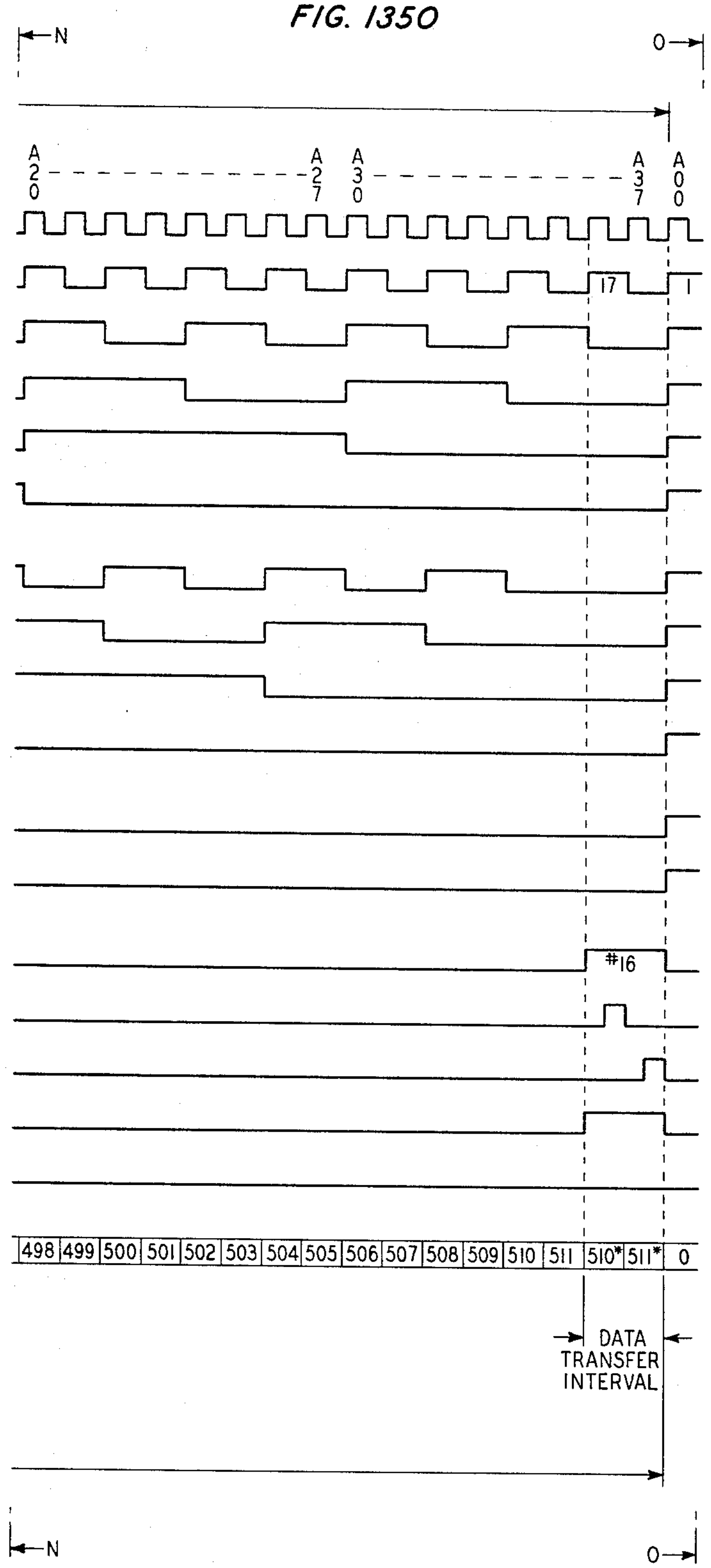

Sept. 10, 1968 J. E. CORBIN ET AL 3,401,235

TIME DIVISION COMMUNICATION SYSTEM

Filed Dec. 29, 1964 167 Sheets-Sheet 149

Sept. 10, 1968 J. E. CORBIN ET AL 3,401,235

TIME DIVISION COMMUNICATION SYSTEM

Filed Dec. 29, 1964 167 Sheets-Sheet 154

Sept. 10, 1968 J. E. CORBIN ET AL 3,401,235

TIME DIVISION COMMUNICATION SYSTEM

Filed Dec. 29, 1964 167 Sheets-Sheet 159

Sept. 10, 1968 J. E. CORBIN ET AL 3,401,235

TIME DIVISION COMMUNICATION SYSTEM

Filed Dec. 29, 1964 167 Sheets-Sheet 161

Sept. 10, 1968 J. E. CORBIN ET AL 3,401,235

TIME DIVISION COMMUNICATION SYSTEM

Filed Dec. 29, 1964 167 Sheets-Sheet 165

DIGITAL SIGNALING FRAME RECOVERY CIRCUIT

United States Patent Office 3,401,235

Patented Sept. 10, 1968

3,401,235

TIME DIVISION COMMUNICATION SYSTEM

Joseph E. Corbin and John H. Helfrich, Middletown, Kenneth A. Heller, Holmdel, Keith L. Nicodemus and George W. Smith, Jr., Middletown, Albert E. Spencer, Jr., Holmdel, and Ray C. Townley, Middletown, N.J., assignors to Bell Telephone Laboratories, Incorporated, New York, N.Y., a corporation of New York Filed Dec. 29, 1964, Ser. No. 421,762
142 Claims. (Cl. 179—15)

ABSTRACT OF THE DISCLOSURE

This disclosure relates to a time division communication system having a plurality of subscriber lines for carrying respective digital message bit streams each of which includes supervisory signal and control bits at uniformly spaced positions in each frame of the stream, the respective digital message bit streams being at a number of different yet multiple related rates, and one or more interoffice trunks each capable of carrying in multiplexed channels a predetermined number of digital message bit streams as well as supervisory signal and control bits at uniformly spaced positions in each frame of the same. The frame format is the same in each case irrespective of the nature of the digital bit stream (i.e., simplex or multiplex) or the rate thereof. Terminal circuitry respectively associated with each line and trunk separates the supervisory signal and control bits from the incoming message bits and then stretches the message bits into a uniformly spaced stream of message bits preparatory to switching the latter through the time division switching matrix. The switching matrix has a plurality of line circuit positions to which the message bits of the lines and trunks are respectively coupled. The matrix is controlled to switch message bit streams between selected subscriber line circuit positions by interconnecting the latter in distinct time slots of a repetitive office cycle, the number of time slots utilized per office cycle for a given interconnection being determined by the rate of the bit streams to be interchanged. The switching matrix is further controlled to multiplex and demultiplex other selected subscriber lines with a selected interoffice trunk by interconnecting the line circuit positions thereof in other distinct time slots of the office cycle.

This invention relates to communication systems, and more particularly to a time division switching communication system.

The basic ways of dividing or separating signal paths in a switching network are "space division," "frequency division" and "time division." Frequency division is not economically feasible, so the practical choice has been between space division and time division.

In space division switching, a discrete path, defined by relays or other switching elements, is set up through the network. Each such path is individual to the connection that has been set up and is assgined to that connection for the duration of the message. Privacy of conversion is assured by the separation of individual messages in space.

In time division switching, the path through the network is a shared "highway," to which a number of input and output lines may be connected. Each message is assigned to the highway for an extremely short but rapidly and periodically recurring interval, and the connection between any two lines in communication is completed only during these short intervals. Privacy of transmission is assured by separation of the messages in time.

Time division switching and transmission have become increasingly popular for a number of valid reasons. First, time division switching requires fewer network crosspoints, with a resultant reduction in physical size and weight. Second, time division switching systems are generally more flexible than space division systems from the standpoint of modular growth. This is a significant advantage from a commercial standpoint inasmuch as it permits an orderly growth of a switching center. And, third, as will be well appreciated by those in the art, considerable savings in outside cable facilities are achieved by multiplexing a number of subscribers over a single transmission trunk.

Many time division switching systems have been proposed heretofore. All of these prior art systems, however, appear subject to one or more disadvantages or shortcomings when used for digital communication. For example, earlier time division switching systems used the "resonant transfer" principle to establish the paths through the switching matrix. With a resonant transfer circuit, a plurality of switches, (e.g., four) are simultaneously closed for an exact period, defined by the circuit constants, during which an analog transfer between an input and an output capacitor takes place. Resonant transfer, however, requires tight tolerances on pulse widths; tight tolerances on fixed and stray capacitance and inductance in the switching matrix; and destructive readout of the message bits, the latter making it difficult to implement a broadcast mode of call.

In other time division systems additional transmission paths are required to carry the supervisory signaling and control information between subscribers and a central switching office and between interconnected central offices. Such additional paths are, of course, costly.

In still other time division systems multiplexing and demultiplexing is accomplished independently of the switching. The separation of these functions, however, is uneconomical and generally imposes special timing problems.

A common problem heretofore encountered in time division switching systems is termed "blocking." In brief, blocking occurs when a particular time slot or channel assigned to a calling party, associated with one switching network, is active on another call at the switching network associated with the called party, so that a busy condition results. The possibility of such blocking is particularly acute in large time division switching systems. Generally, additional equipment of varying degrees of complexity can be added to a time division switching system to overcome this problem (see patent application Ser. No. 24,994, filed Apr. 27, 1960, of H. Inose-J. P. Runyan), but here again the cost may prove substantial.

Further shortcomings of prior art time division switching systems are encountered when it is necessary to handle digital data and/or digitalized voice messages at several different rates; when a conference call mode of communication is required; when very high speed interswitching office signaling is necessary, et cetera. These, as well as other shortcomings of prior art time division systems, will be appreciated by those skilled in this art.

It is accordingly the general object of the present invention to provide an improved time division communication system.

More particularly, the object of this invention is to overcome the aforementioned shortcomings and limitations encountered in time division switching.

These and other objects are attained in accordance with the present invention in a time division switching communication system having a plurality of associated subscriber lines and interoffice trunks each of which carries a stream of digital message bits and supervisory signal and control bits, the latter bits being located at uniformly spaced positions in each frame of the bit sream. The frame format is the same in each case irrespective of the nature of the message bit stream (i.e., simplex or multiplex) or the rate thereof. Terminal circuitry respectively associated with each line and trunk separates the supervisory bits from the message bits, and then stretches the latter into a uniformly spaced message bit stream preparatory to switching through the time division switching matrix. The switching thus takes place at the message bit rate rather than the line or trunk rate.

A supervisory signal assembler and distributor (SA/D) performs two functions: it assembles the supervisory signal bits that are stripped from each incoming message bit stream prior to transmission of the same as four-bit signal characters (S-characters) to the central processor; and, conversely, it accepts coded S-characters from the central processor and distributes the same for insertion in predetermined positions in each outgoing message bit stream.

It is accordingly a feature of the present invention that the supervisory signal and control bits be multiplexed in each message bit stream to thereby eliminate the need for special signal and control paths.

The time division switching system of the present invention utilizes an all logic circuit design which facilitates a number of highly desirable communication functions. For example, flip-flops are utilized rather than capacitors, as in resonant transfer, for storage elements in the line packages. Accordingly, nondestructive readout from one line to many is easily accomplished, thereby making it readily possible to implement the broadcast mode. In addition, with flip-flop storage, the storage time can be indefinitely long, and therefore, the storage time can be varied quite arbitrarily. This means that identical circuitry can be used for switching very low speed data and very high speed data.

It is another feature of the invention that digital data and/or digitalized voice messages at multiple rates can be handled, i.e., switched simultaneously by this time division switching system.

In accordance with another feature of the invention, the functions of switching and multiplexing/demultiplexing are integrated and performed within the switching network.

A further feature of the invention is a channel (i.e., time slot) interchange scheme, for overcoming the aforementioned blocking problem, which simply comprises a one-bit store for each direction of transmission (the instant system is a "4-wire"). The flip-flops that are used for storage in the line packages are advantageously utilized to this end.

A still further feature of the invention is a conference call arrangement that is essentially unlimited as to possible number of conferees. The only practicable limitation here is the available capacity of the switching office itself. In fact, the present system is capable of establishing and maintaining several conferences simultaneously, with, of course, different conferees.

An important aspect of the present time division system relates to the supervisory signaling plan incorporated therein. This signaling scheme is highly flexible, and of unlimited capacity with respect to the variety of signaling information that can be conveyed, particularly between central offices. Typical of this flexibility is the arrangement for sending signaling information via a portion or all of the message channel of a digital bit stream should the speed (i.e., bit rate) of the signal bit channel prove inadequate. In such a case a connection is established through the time division switch matrix to a terminal of the signal assembler-distributor (SA/D). The signal words, comprising a plurality of S-characters, are sent over the message channel, through the switching matrix, and then assembled (or, conversely, distributed) by the SA/D in the same way as if they had been transmitted via the signal channel.

The above and other objects and features of the present invention will be more readily understood from the following description when read in connection with the drawings in which:

FIGS. 1 and 2, when placed side by side, show a schematic block diagram of a time division switching system in accordance with the present invention;

FIG. 3 illustrates a typical message bit stream that is received over a subscriber line or interoffice trunk in a cyclic pattern;

FIGS. 4 through 133, when arranged as shown in FIG. 154, show a detailed schematic drawing of the time division switching system of FIGS. 1 and 2;

Figure 148:
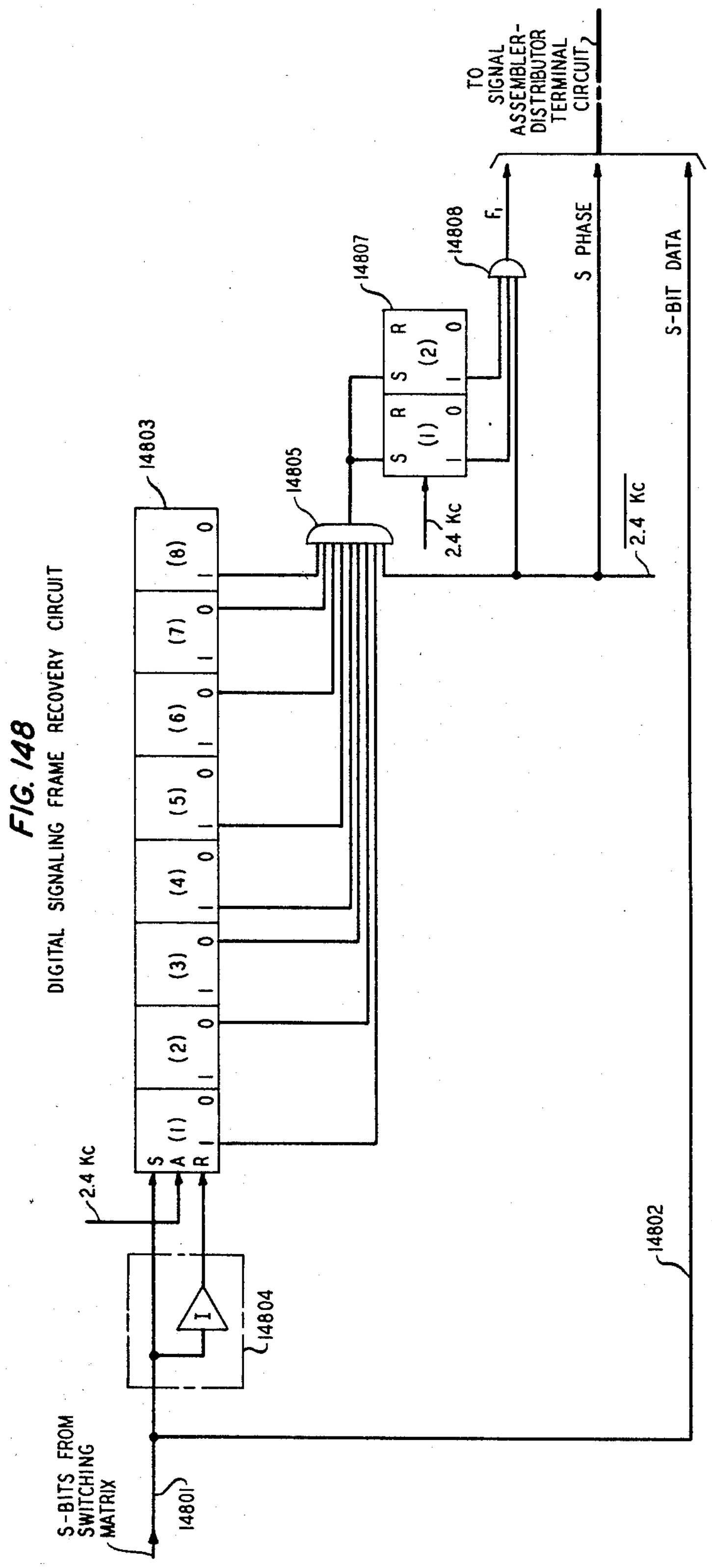
Figures 153, 154, 155, 156, 157, 158:
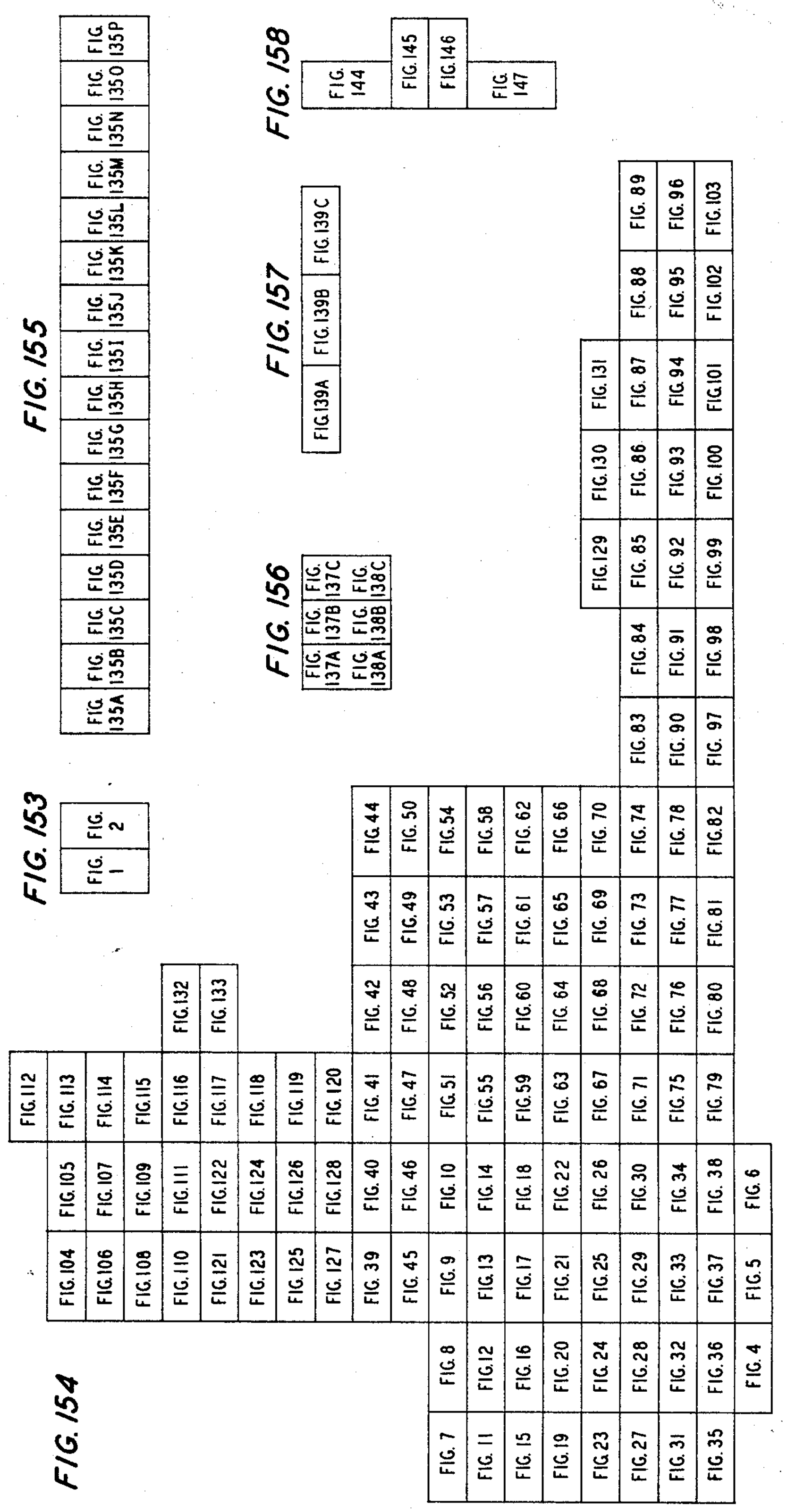

FIGS. 144 through 147, when arranged as shown in FIG. 158, illustrate the sequence of operations involved in handling a typical intraoffice call;

FIG. 148 is a schematic diagram of a frame recovery circuit that is utilized for message channel signaling purposes;

FIGS. 149 through 152 show the schematic circuit and symbolic diagrams of the low level logic packages that are utilized in various combinations to perform the variety of logic functions required in the instant time division switching system; and FIGS. 153 through 158 show the combinational arrangements of the preceding figures.

GENERAL DESCRIPTION

Figure 1:
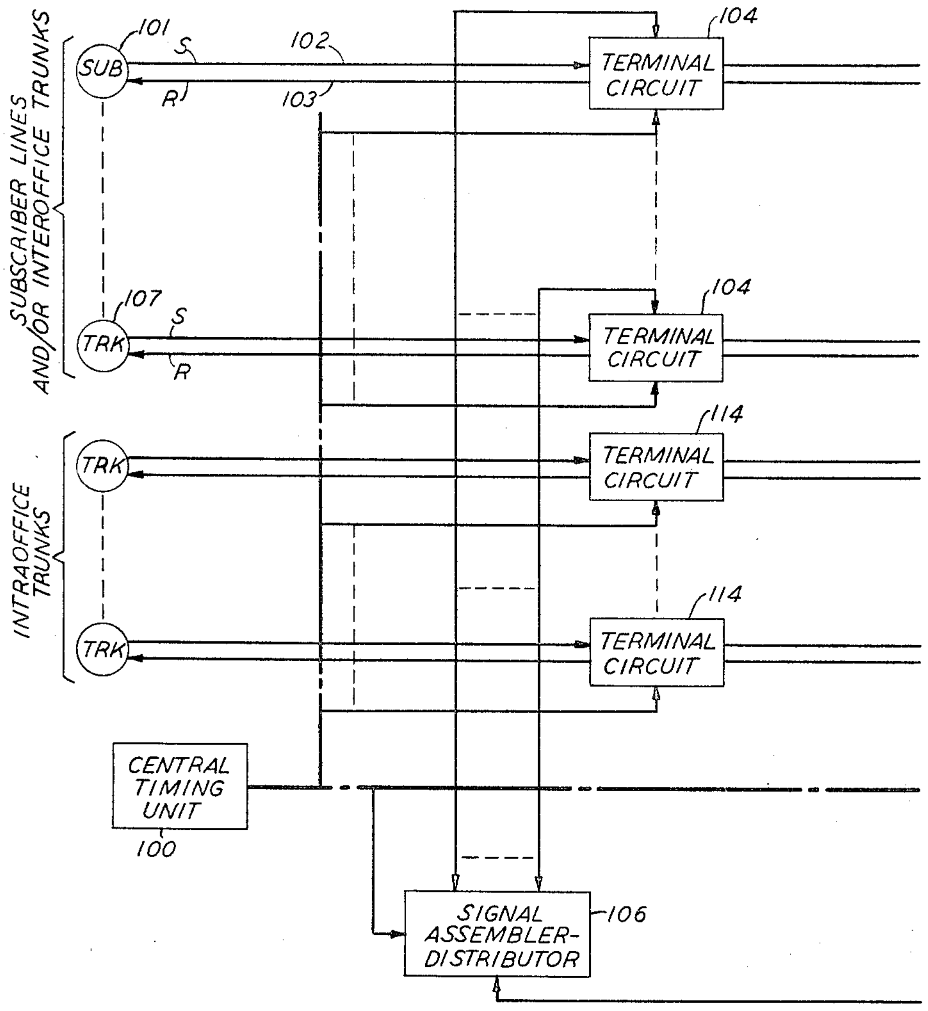
Figure 2:
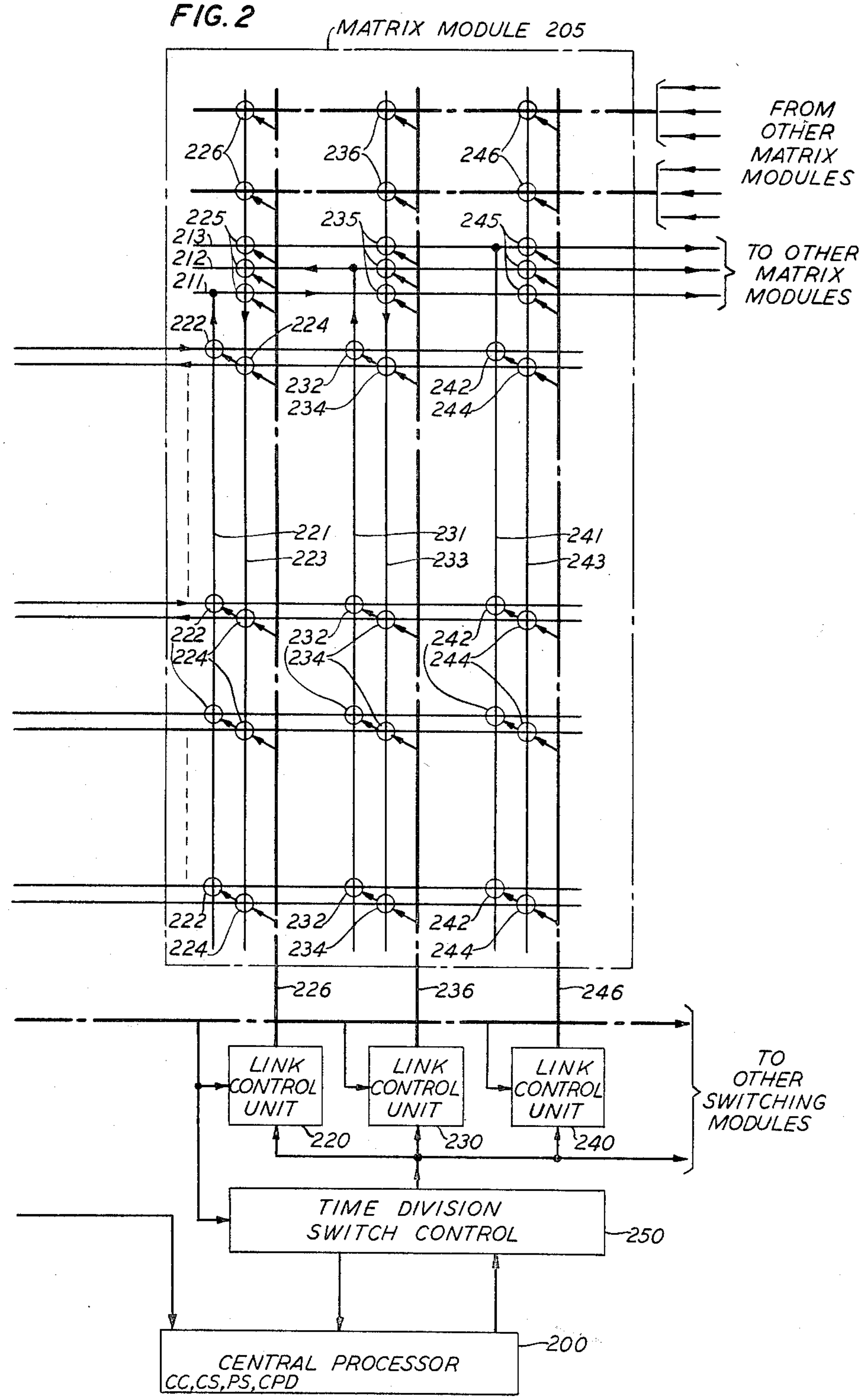

Referring now more specifically to the drawings, there is shown in FIGS. 1 and 2 a block diagram schematic of a time division switching system in accordance with the principles of the present invention. The instant time division switch (TDS) is intended to switch only messages that are in digital form. Digital transmission has become increasingly popular in recent years for several important reasons. First, cross-talk problems are much more troublesome between circuits carrying analog signals than between circuits carrying digital signals. Second, digital transmission to and through the central office permits connections which have a constant net loss and which are relatively free of transmission noise. Further, the quality of transmission is substantially independent of the transmission medium, makeup and length. And lastly, the rapidly increasing use of data processing devices will inevitably make digital data transmission increasingly important in the future.

Transmission to and through the present TDS is on a "4-wire" basis; separate paths exist for the send and receive directions. Thus, for example, digital messages are transmitted from a remote subscriber station 101 to a central office switching module over the send transmission line 102, while digital messages are received from the latter over receive line 103. Although reference may be made hereinafter to wire transmission lines and trunks, it should be obvious that any other transmission medium having the requisite bandwidth can equally well be employed.

The message bit stream from any given subscriber station might typically comprise digitalized teletypewriter signals; data, possibly speed buffered, from any of the various data devices known to those skilled in the art; or even multiplexed, encoded, vocoded voice signals. The digitalization and multiplexing of vocoder signals has been satisfactorily demonstrated heretofore; see, for example, the article entitled "Simple Multiplex Vocoder"

by A. R. Billings, in Electronic and Radio Engineer, May 1959, pages 184–188. On a multiplexed interoffice trunk any and all of the above digitalized signals may be intermixed in typical time division multiplex fashion.

As will be clear hereinafter, the switching of digital information cross-office in the instant TDS is not dependent upon or influenced by the type message that has been digitalized or in the particular pulse code scheme utilized in a message bit stream.

For illustrative purposes, it will be assumed that a total of 127 subscriber lines and interoffice and intraoffice trunks are presented to the interface of the time division switching system shown in FIGS. 1 and 2. Accordingly, for an office of larger capacity requirements additional matrix modules, and associated control and termination units, would be added. For example, for a 1000-line office, eight matrix modules would be utilized, these being interconnected with each other by junctor gates in the manner to be described hereinafter.

Normally the number of subscriber lines will greatly exceed the number of interoffice and intraoffice trunks. However, the instant TDS is in no way limited to any given "mix" of lines and trunks, this being largely fixed by the anticipated service demand.

The instant TDS is capable of switching messages at a multiple of binarily related rates. By way of example, the signals from the subscriber stations can be at message bit rates of 2.4, 9.6 and 38.4 kilobits per second (kb.). These message bit rates all fall in the $75\times2^n$ bits/second series. There is considerable merit in such an arrangement, since the message rates being related by a factor of 2 facilitates the multiplexing of slower channels into faster ones. However, the $75\times2^n$ series has been chosen only for illustrative purposes, the principles of the present invention being in no way limited thereto. For example, the principles of the invention are equally applicable to the switching of other binarily related message bit rates, e.g., $50\times2^n$, $60\times2^n$, $100\times2^n$ et cetera.

The interoffice trunks are intended to carry digital messages either on a simplex or multiplex basis. For the former nonmultiplexed case, a selected subscriber can be routed through the time division switch to a trunk of adequate bandwidth for subsequent interconnection with a remote subscriber through one or more other central office switching centers.

Interoffice connections are also established on a time division multiplex basis. The instant TDS provides, for example, for the multiplexing (and conversely, demultiplexing) of up to sixteen 2.4 kb. message bit streams onto one 38.4 kb. interoffice trunk.

As the name implies, the intraoffice trunks are used for interconnection between the TDS and various other equipment at the local central switching office. For example, one or more intraoffice trunks may terminate in a message store-and-forward unit or module (S/F). Such units are used in instances where it is desirable, and permissible, to store traffic for a time and then forward the same to its destination during periods of light traffic load.

The time division switch terminal circuits 104 perform several essential functions. They compensate for the vagaries in propagation time of the incoming digital bit streams, i.e., all incoming streams of the same rate are made bit synchronous. And, further, for incoming multiplexed message bit streams, subframe synchronization is achieved. The terminal circuits also recover, automatically, the framing information from each incoming bit stream. In addition, the terminal circuits 104 separate the supervisory signal and control bits from the message bits in each incoming bit stream, stretch the message bits into a uniformly spaced message bit stream, and buffer both the message bits preparatory to their being switched through the TDS matrix module 205 and the supervisory signal bits preparatory to their delivery to the Signal Assembler/Distributor 106. For traffic in the other direction, the terminal circuits receive the appropriate message bits from the matrix module and insert into each outgoing message bit stream the proper supervisory signal and control bits.

The intraoffice terminal circuits 114 need perform none of the above recited functions, since the message bit streams routed to the intraoffice trunks and the office equipment connected thereto have already been stripped of their supervisory bits and stretched in time as heretofore described.

The supervisory signal bits (S-bits) that are stripped from the incoming bit streams are assembled into respective S-characters in the Signal Assembler/Distributor 106 (SA/D) and these S-characters are then delivered to the central processor of the switching office. The S-characters are used to convey signaling information such as On-hook, Off-hook, Call-waiting, Busy, Cancel and the like. For outgoing message streams from a central switching office, the SA/D accepts S-characters from the central processor and distributes the same as S-bits to respective terminal circuits wherein the S-bits are inserted in predetermined positions in each outgoing bit stream. The SA/D equipment may be of the same nature as that disclosed in the copending application of J. H. Helfrich, Ser. No. 243,213, now Patent No. 3,166,734, filed Dec. 6, 1962.

The central processor 200, sometimes called a common control, is in effect an information processing center which processes and directs all of the actions necessary to the establishment and disestablishment of interconnections through the switching system. Thus, for example, a central processor may periodically scan the lines and trunks; recognize a request for service from a particular line or trunk; examine the addressee information received from the line or trunk; find a path through the switching network and complete the connection to the appropriate outgoing line or trunk; monitor the connection for an answer; monitor the lines for a subsequent on-hook indication (or a release or cancel signal); and then break the connection. As will be clear to those in the art, these and many related operations are commonly encountered in typical telephone switching systems and various common control arrangements are known which are capable of accomplishing the same. There are, however, various other novel operations capable of being carried out by the instant time division switching system that cannot be readily implemented by using the pre-existing common control modules. The central processor or common control equipment utilized herein is fully automatic and it comprises essentially a digital data processing unit programmed by an ordered list of sequential program instructions. This digital unit is structurally the same as that disclosed in the copending application of A. H. Doblmaier-R. W. Downing-M. P. Fabisch-J. A. Harr-H. F. May-J. S. Nowak-F. F. Taylor-W. Ulrich patent application, Ser. No. 334,875, filed Dec. 31, 1963.

The central processor provides the instructions for periodically and cyclically "closing" appropriate "crosspoints" of the matrix module 205 to thereby establish interconnection between two or more subscriber lines and/or trunks.

The matrix module, shown symbolically in FIG. 2, comprises: three link transmit buses 221, 231 and 241, and their associated line-link transmit gates 222, 232 and 242; three link receive buses 223, 233 and 243, and the associated line-link receive gates 224, 234 and 244; and three control translation cables 226, 236 and 246, each of which is permanently associated with a link control unit to be described hereinafter.

The link transmit buses 221, 231 and 241 are connected to respective intermatrix (or intramatrix, as the case may be) buses 211, 212 and 213, while intercoupling between the latter and the link receive buses is via link-junctor gates 225, 235 and 245. For an office having additional matrix modules, the transmit buses 211, 212 and 213 will be interconnected with the link receive buses of the same via their respective link-junctor gates. The additional matrix modules, if any, are the same as the module to be described in detail hereinafter; each is similarly provided with three intermatrix buses which are permanently associated with respective link transmit buses, and these intermatrix buses are interconnected with the link receive buses of matrix module 205 via the link-junctor gates 226, 236 and 246.

The manner of establishig an interconnection between a pair of subscriber lines and/or trunks is substantially the same whether the lines and trunks are associated with the same or with different matrix modules. All that is really different is the particular link-junctor and line-link gates actuated. Accordingly, for purposes of explanation, only a single matrix module will be described, with the calls assumed limited to the subscriber lines and trunks associated therewith.

To establish an interconnection between the subscriber station 101 and trunk 107, for example, the line-link gates 222 and 224 associated with subscriber station 101 and the line-link gates 232 and 234 associated with trunk 107 are periodically and cyclically enabled. Simultaneously therewith, the link-junctor gate 235 at the crosspoint of intermatrix bus 211 and link receive bus 233 and the link-junctor gate 225 at the crosspoint of intermatrix bus 212 and link receive bus 223 are enabled. In this fashion, and as indicated by the arrows in FIG. 2, a pair of talking paths are periodically and cyclically established through the switching matrix.

The link control units 220, 230 and 240 provide the gating signals which enable the line-link and link-junctor gates of the matrix module 205. To perform this function, each link control unit comprises a recirculating memory, line and junctor gate translators, and a parity check circuit. The recirculating memory is composed of a plurality of recirculating delay lines having the same loop delay. Line-link and link-junctor gate address information is stored in these delay lines and the same is caused to recirculate therein for the duration of a call. The total loop delay defines an office cycle, with the latter comprisinga predetermined number of integral time slots.

The translators, in response to parallel interrelated output signals from the recirculating delay lines, serve to provide enabling signals to appropriate gates to establish an interconnection during a predetermined time slot or slots, as the case may be. The delay lines, of course, store a plurality of addresses in respective time slots and these when translated establish the desired interconnections on a time division basis.

Each link control unit further includes a parity check circuit for single error detection purposes. If an error is detected, an inhibit signal is delivered to appropriate gates in the matrix module to interrupt transmission therein.

Two link control units, and, of course, their related line-link and link-junctor gates, are utilized in establishing a given interconnection. The additional link control unit and related gates are primarily for purposes of redundancy, and for broadcast type calls—i.e., when a subscriber desires interconnection to a pair of subscribers.

The time division switch control 250 receives call instructions from the central processor and in response thereto loads the aforementioned gate address information in the appropriate link control memories and, of course, in the proper time slot or slots thereof. The TDS control 250 also comprises parity check generator equipment for generating the parity bits for the link control units. A parity check on the call instructions received from the central processor is also performed, as well as additional checks internal to the switch control unit itself.

The central timing unit 100 supplies all of the basic timing waveforms required in the switching office. The timing unit 100 comprises a master oscillator circuit, preferably of the quartz crystal type; a synthesizer network which generates the various clock signals required in the switching office by countdown techniques; and distribution circuitry which transmits the various clock signals throughout the switching center from the synthesizer countdown chains. The central timing unit is shown in detailed schematic diagram form in FIGS. 4 to 6.

Figure 3:
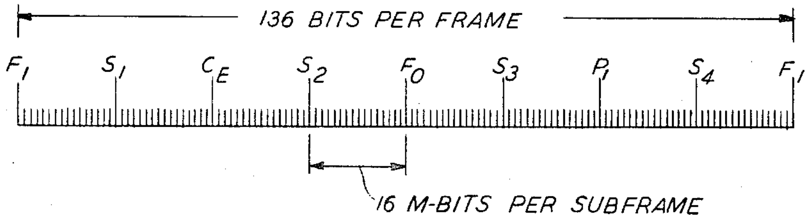

FIG. 3 shows the format of a typical digital message bit stream that is received over a subscriber line or interoffice trunk in a cyclic pattern. In the illustrated format, a cycle of 136 bits, or a frame, contains 128 message bits and 8 supervisory signal and control bits. The supervisory bits comprise four signaling bits $S_1$, $S_2$, $S_3$ and $S_4$ which form unique S-characters, and four control bits $F_1$, $F_0$, $P_1$ and $C_E$. The eight supervisory signal and control bits are called subframe bits and these are distributed evenly throughout the bit stream, any two adjacent subframe bits being separated by sixteen message bits (M-bits). The $F_1$ and $F_0$ bits are framing bits; the $P_1$ bit is used for parity check purposes; and the $C_E$ bit may be for encryption purposes, or also for parity check, or for some still further purpose as desired. The illustrated format is the same for all subscriber lines and interoffice trunks irrespective of the message bit rate thereof. The message bits may comprise the multiplexed message bits from a plurality of subscribers, as when sixteen 2.4 kb. subscribers are multiplexed onto one 38.4 kb. interoffice trunk, or, alternatively, they may comprise the message bits of a single subscriber on an incoming line.

DETAILED DESCRIPTION

*Central timing unit*

For the operation of the various logic circuits of the time division switch, at multiple transmission rates, several families of digital clock pulses are necessary. The generation of these digital clock pulses will be described at this point, while the manner in which the same are utilized throughout the TDS will become more apparent as the description proceeds.

Figure 4:
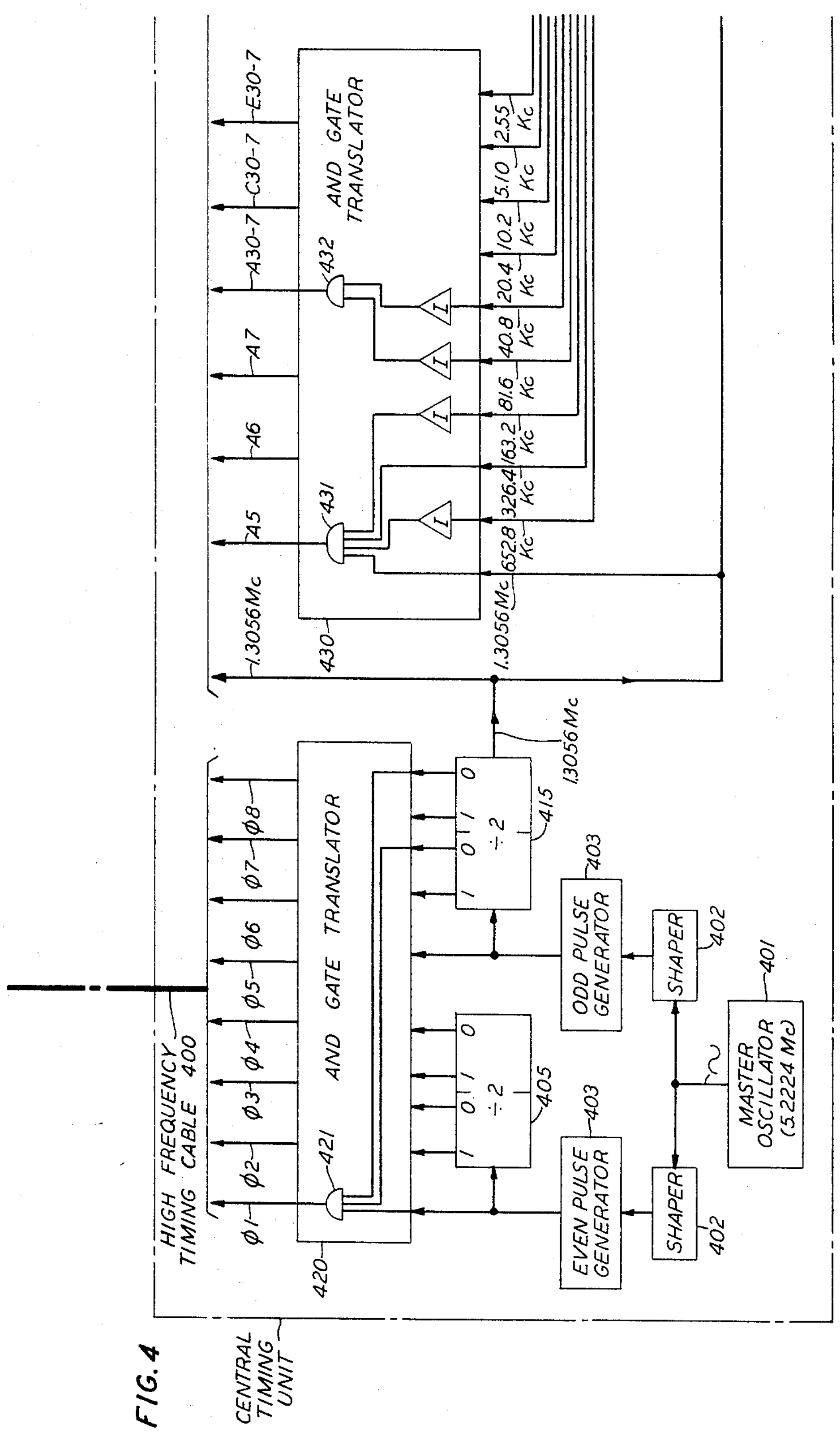
Figure 5:
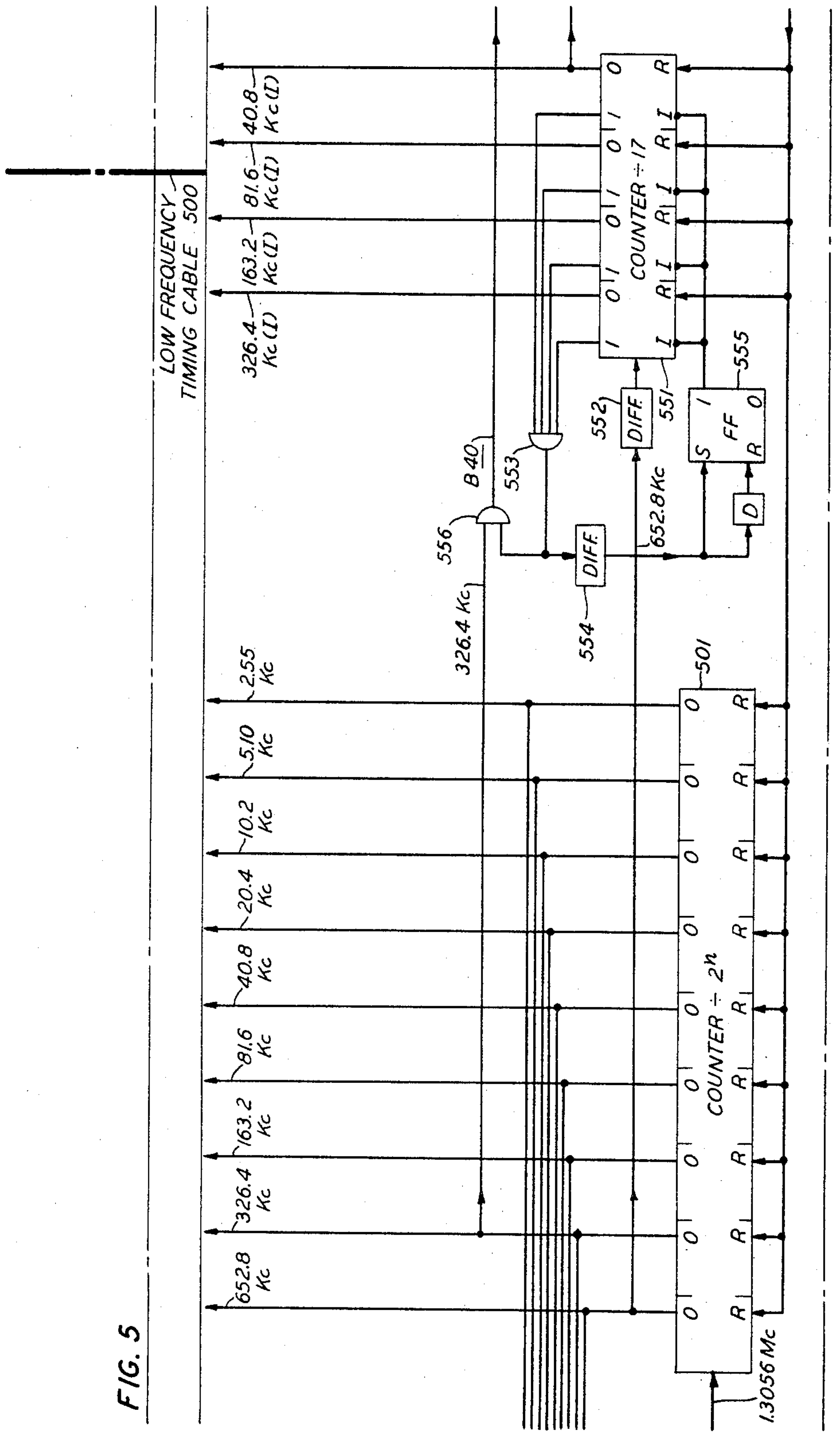
Figure 6:
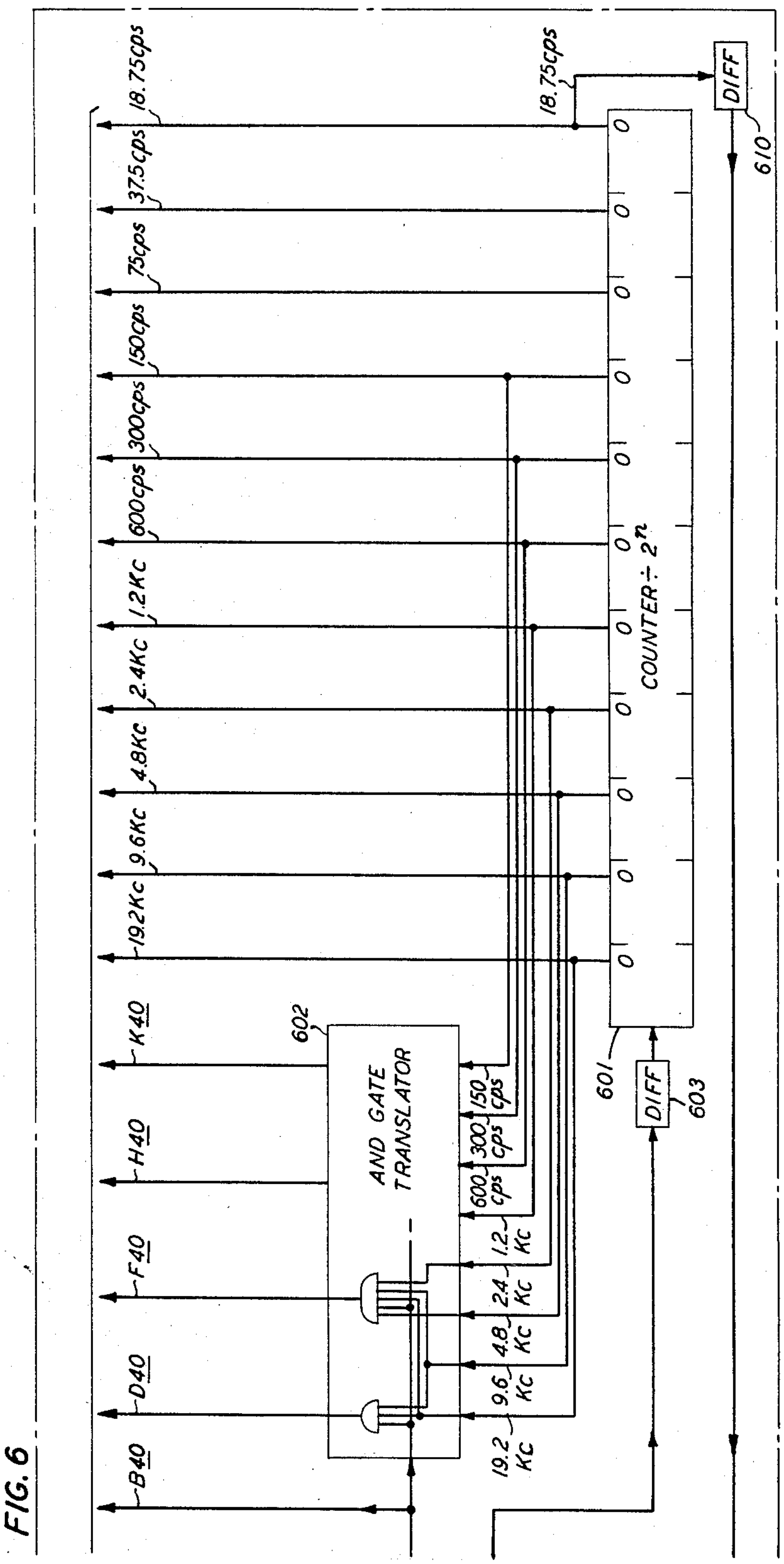
Figure 7:
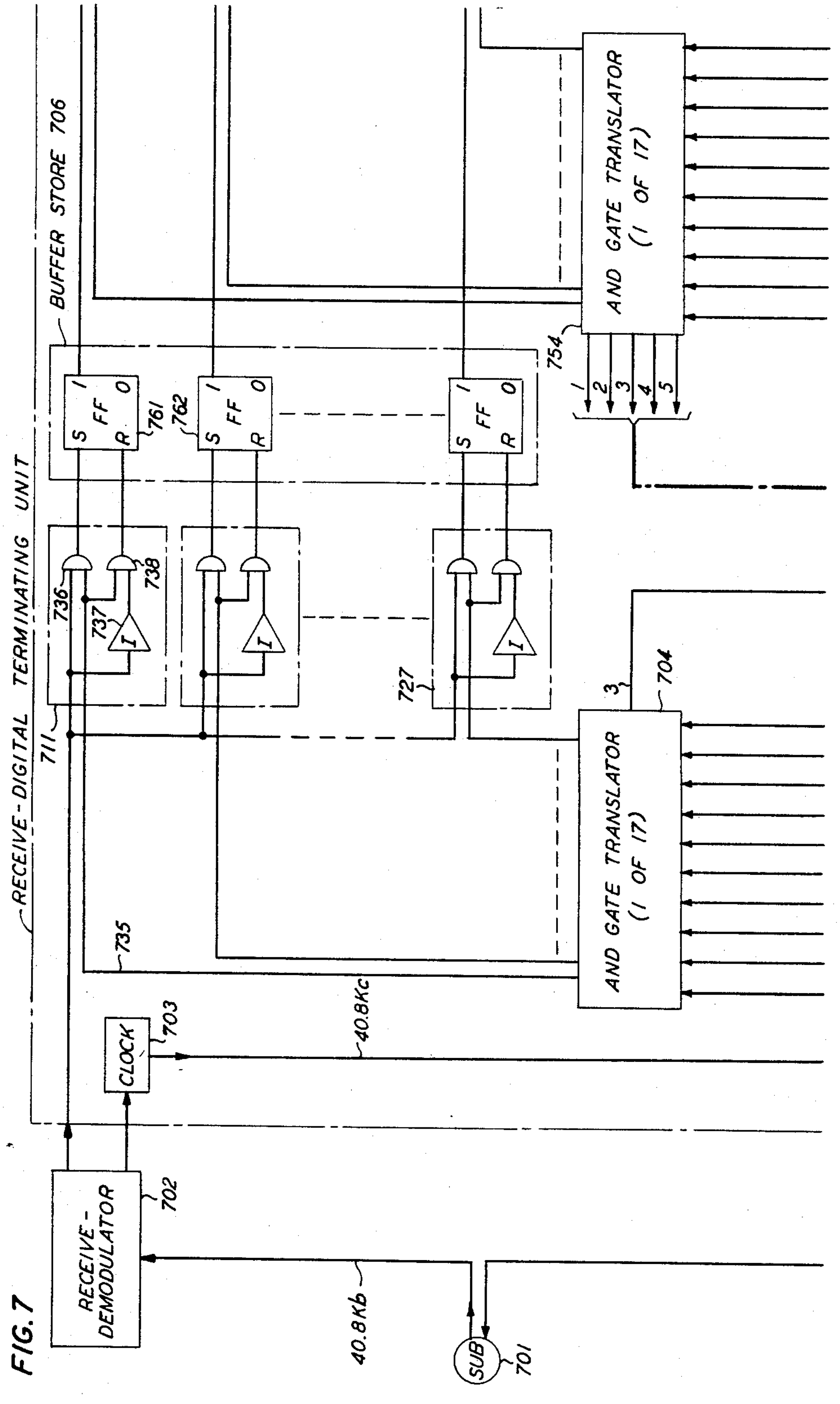
Figure 8:
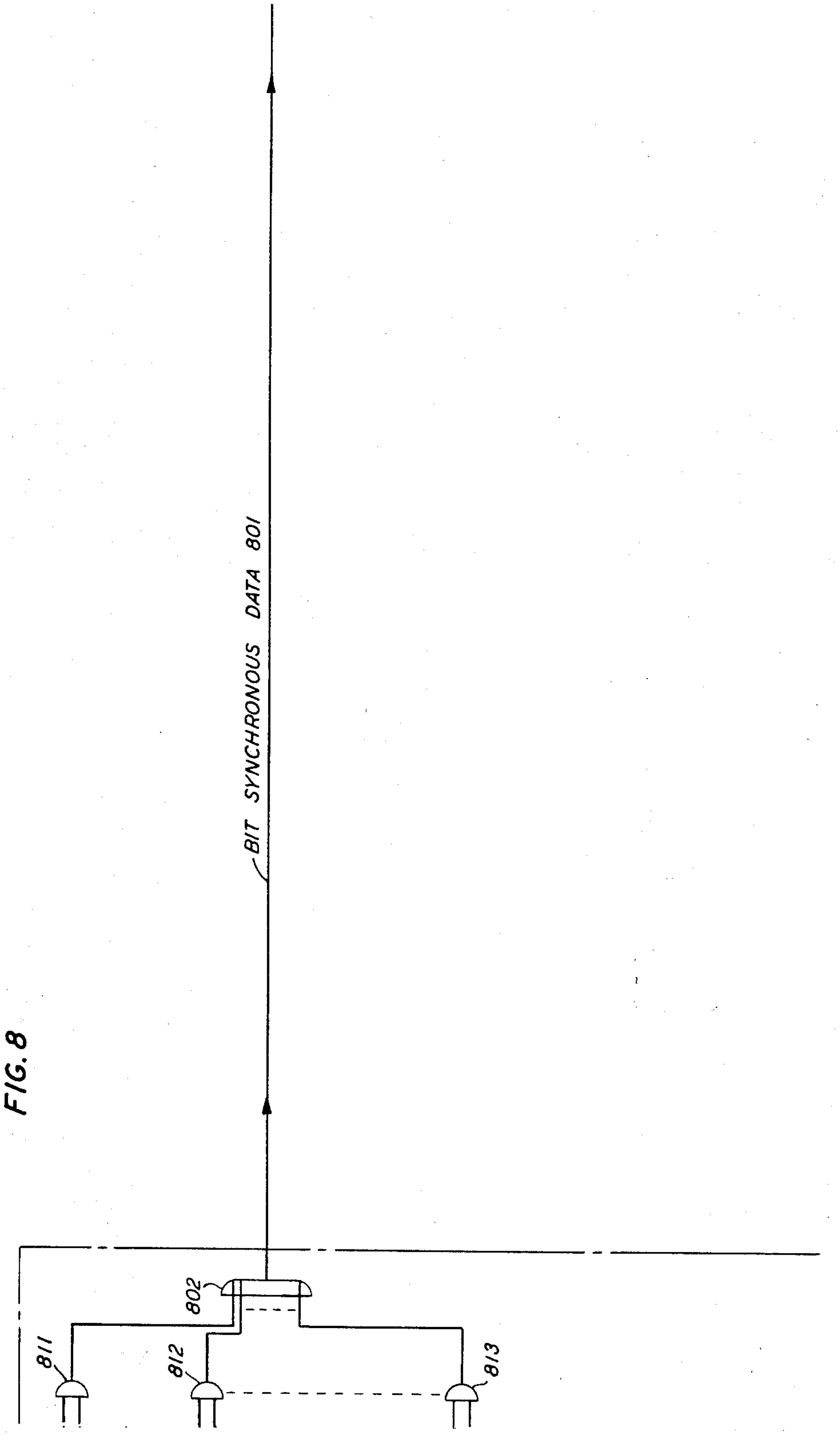

The central timing unit, shown in detail in FIGS. 4 through 6 of the drawings, comprises a master oscillator and a synthesizer or countdown circuit. As the name implies, the master oscillator 401 generates the fundamental timing frequency (5.2224 megacycles) of the switching center. Typically, the master oscillator may comprise a quartz crystal oscillator that is phase locked with, or periodically calibrated against, an atomic frequency standard such as a commercially available cesium standard or a rubidium standard. Numerous oscillator arrangements having accuracies of at least $\pm 1$ part in $10^9$ over long periods of time are commercially available, and any of these can be advantageously utilized herein.

The aforementioned digital clock pulse families are derived from a synthesizer circuit, which is essentially a binary countdown chain operating on the timing signal supplied by the master oscillator. The 5.2224 mc. alternating current signal from the oscillator 401 is split into two channels each of which comprises a shaper 402 and a pulse generator 403. These channels provide output square waves (i.e., pulse trains) that are time related to respective halves of the 5.2224 input sine wave. That is, the output square waves from one channel are time related to the positive-going portions of the sine wave, while those of the other channel are time related to the negative-going portions. The terms ODD and EVEN designate opposite phases of the sine wave signal from the oscillator. A typical shaper may comprise a properly poled series diode limiter that passes only signals of a given polarity, one or more stages of amplification followed by an amplitude limiter, and possibly a differentiator circuit, depending upon the pulse generator utilized, all in series connection. Many circuits exist in the prior art for deriving such output square wave signals from an input sine wave, the invention being in no way limited to any particular arrangement for accomplishing the same.

In general, there are two separate types of digital clock pulse families (i.e., pulse series) required by the instant TDS. The first is a high frequency family necessary for time slot sampling and memory operation within the matrix and link memories of the TDS. The second type consists of one family for each transmission rate necessary for operation of the line and trunk terminal circuits of the TDS. The latter type will be referred to herein as the lower frequency families since the data rate through the TDS is lower than the time slot capability of the link memories. The derivation of the high frequency family will be described first.

The output of the even pulse generator 403 is delivered to the two stage countdown circuit 405, and the output of the odd pulse generator 403 is delivered to a similar two stage countdown circuit 415. Structurally, a countdown circuit is similar to a conventional counter circuit, except that the output is normally taken from the (0) output leads of the respective stages rather than from the (1) output leads as in the standard counter arrangement. Thus, from the perspective of a circuit connected to the (1) output leads such a circuit will be counting up, binarily, in response to successive input pulses, while from the perspective of a circuit connected to (0) output leads the same circuit will be counting down. The counting operations are thus complementary, and, of course, they are cyclical.

Figure 134:
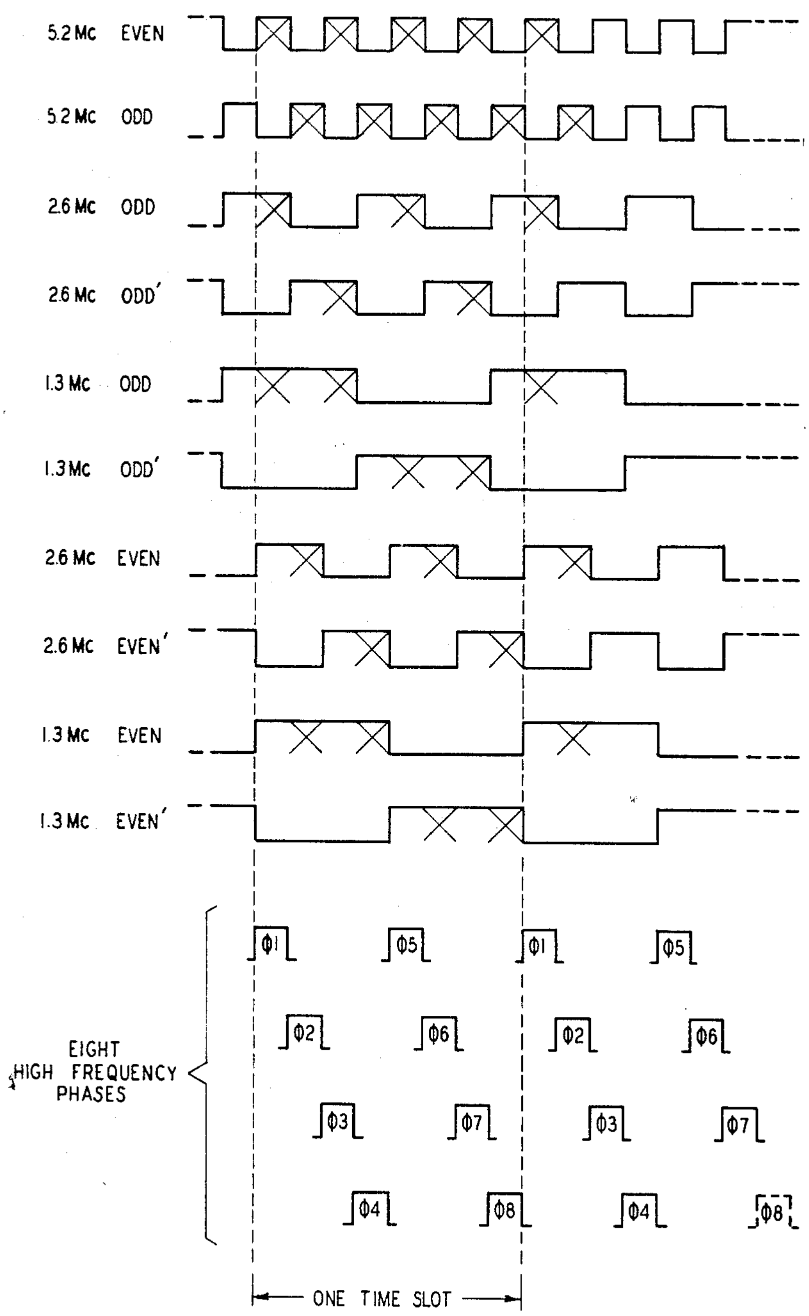
FIGS. 134 through 138A–138C are timing diagrams useful in the explanation of the various aspects of the present invention.
Figure 135A:
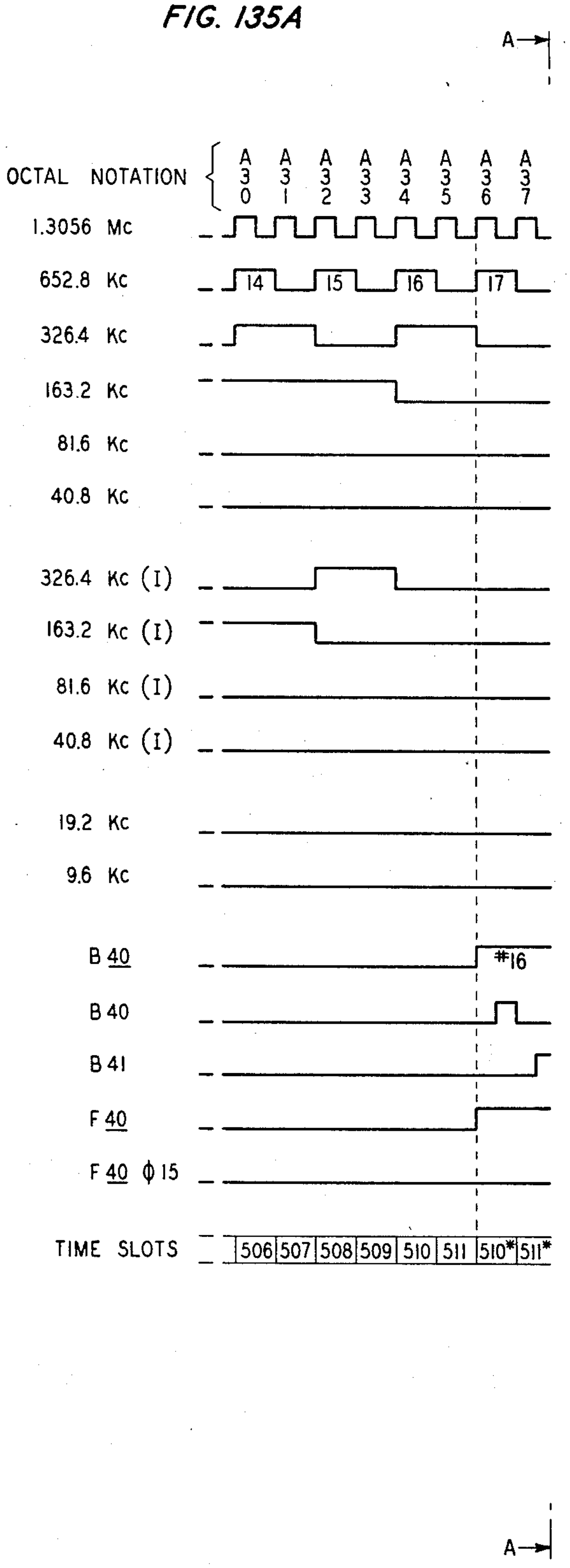
Figure 135B:
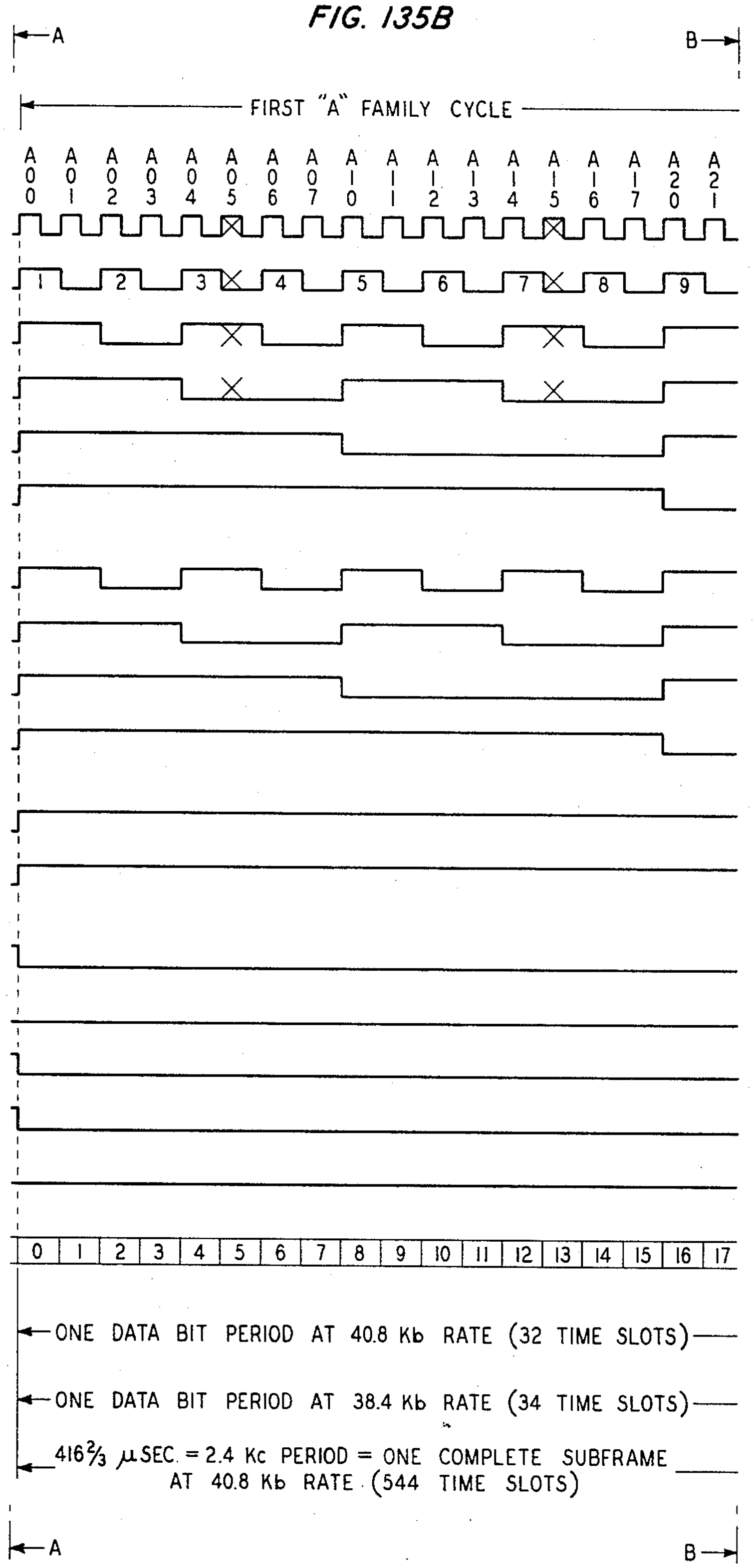
Figure 135C:
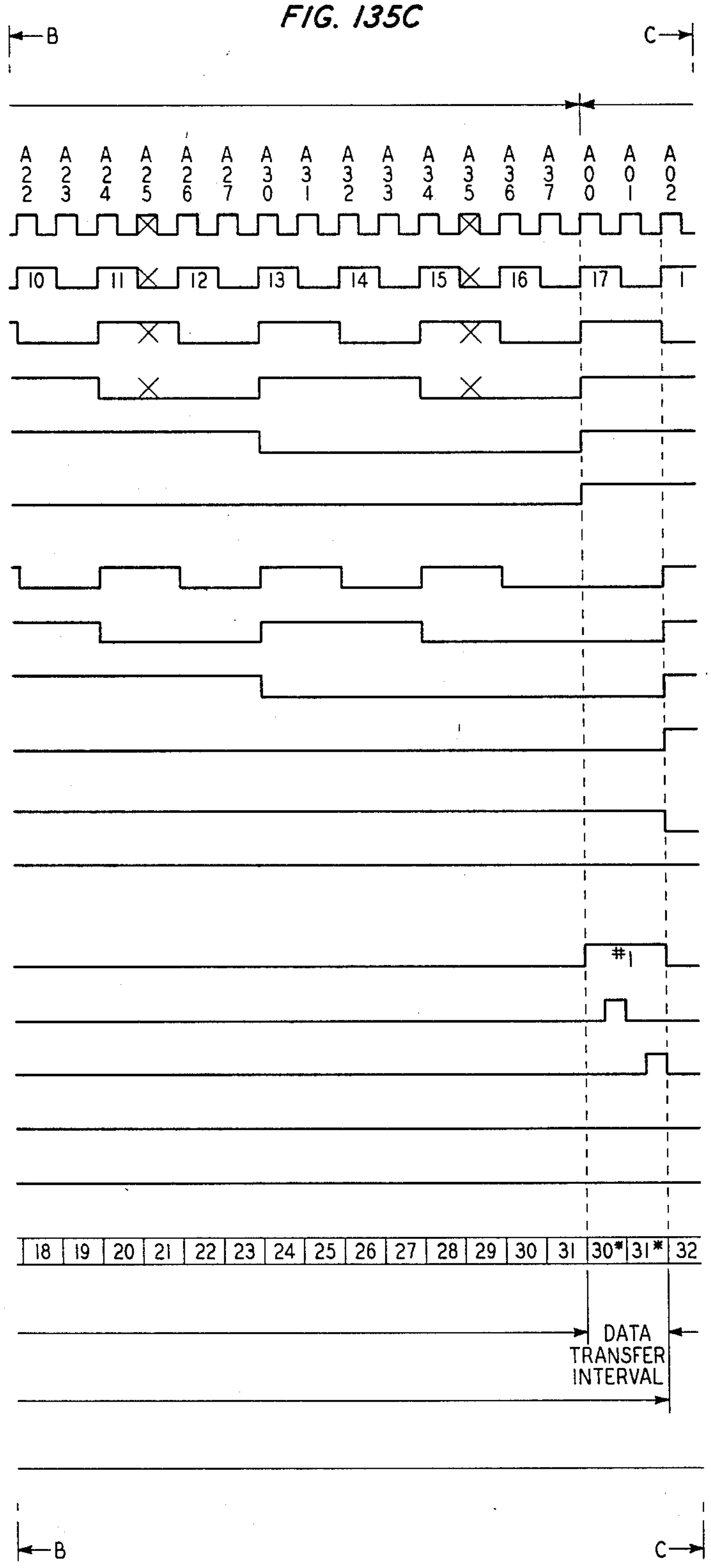
Figure 135D:
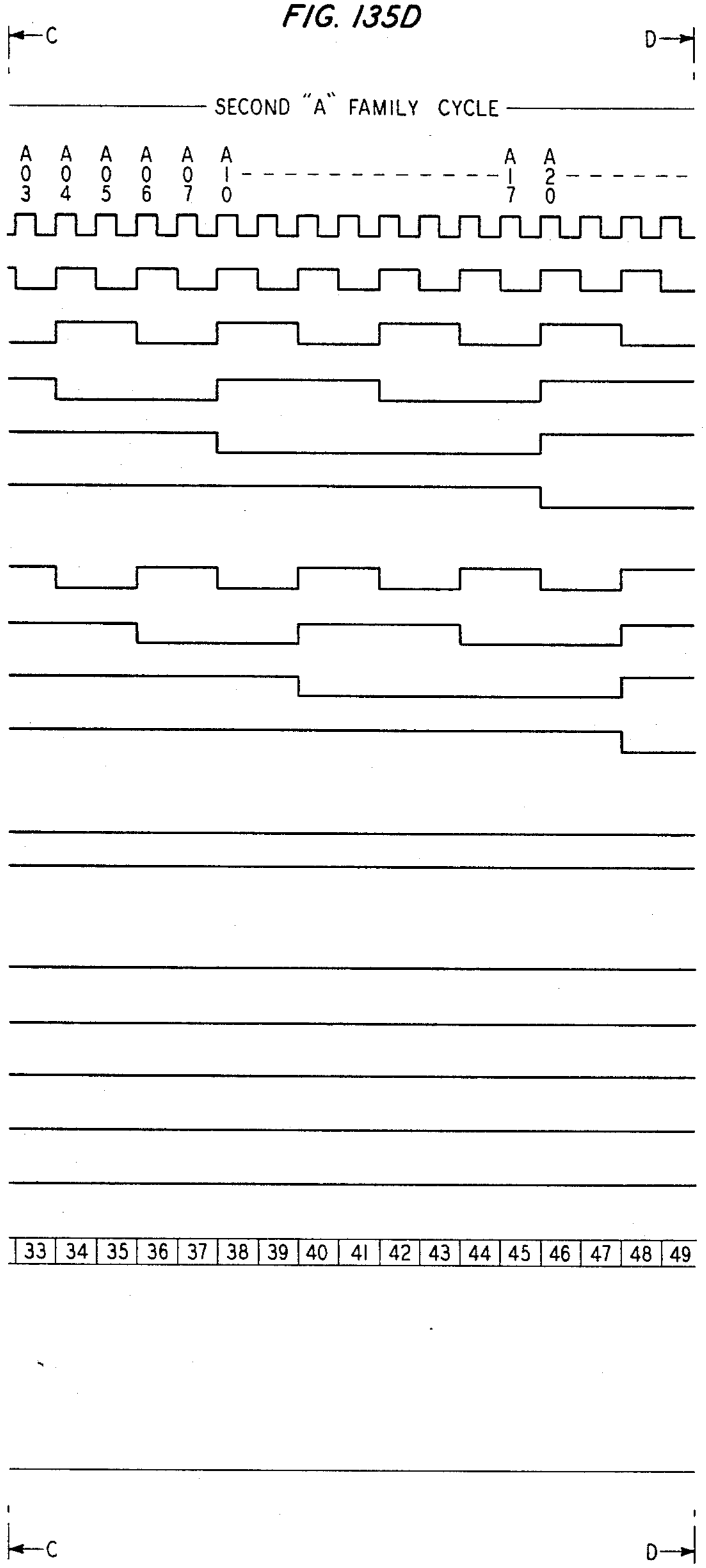
Figure 135E:
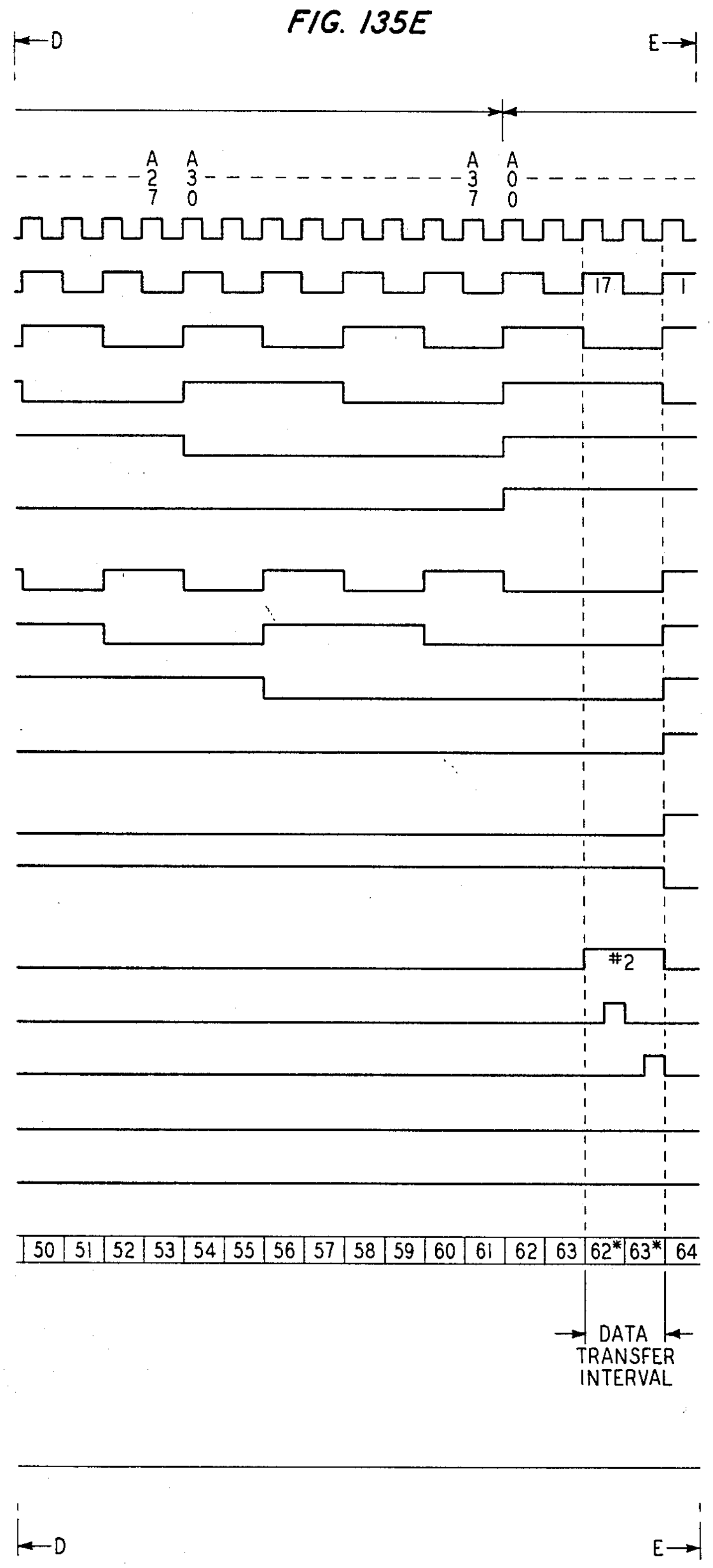
Figure 135F:
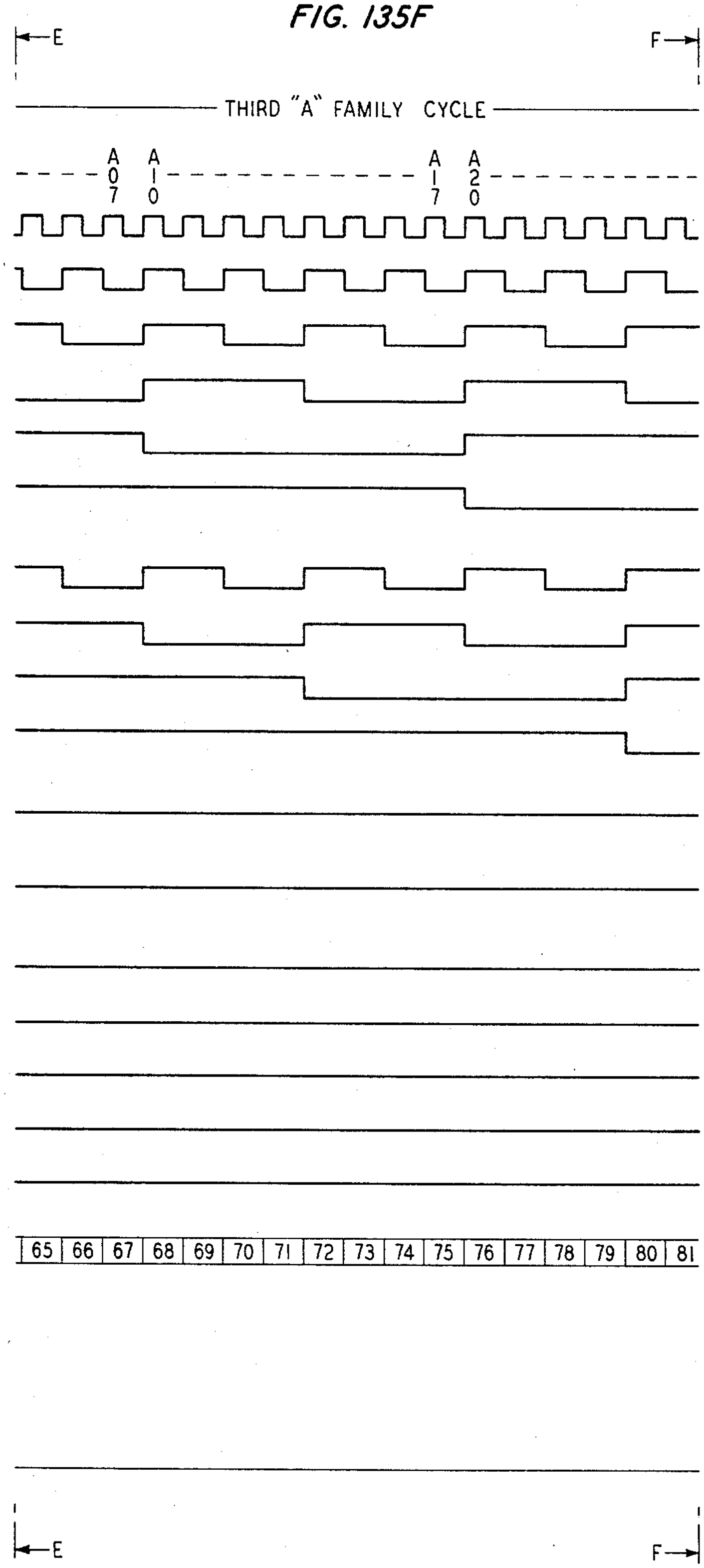
Figure 135G:
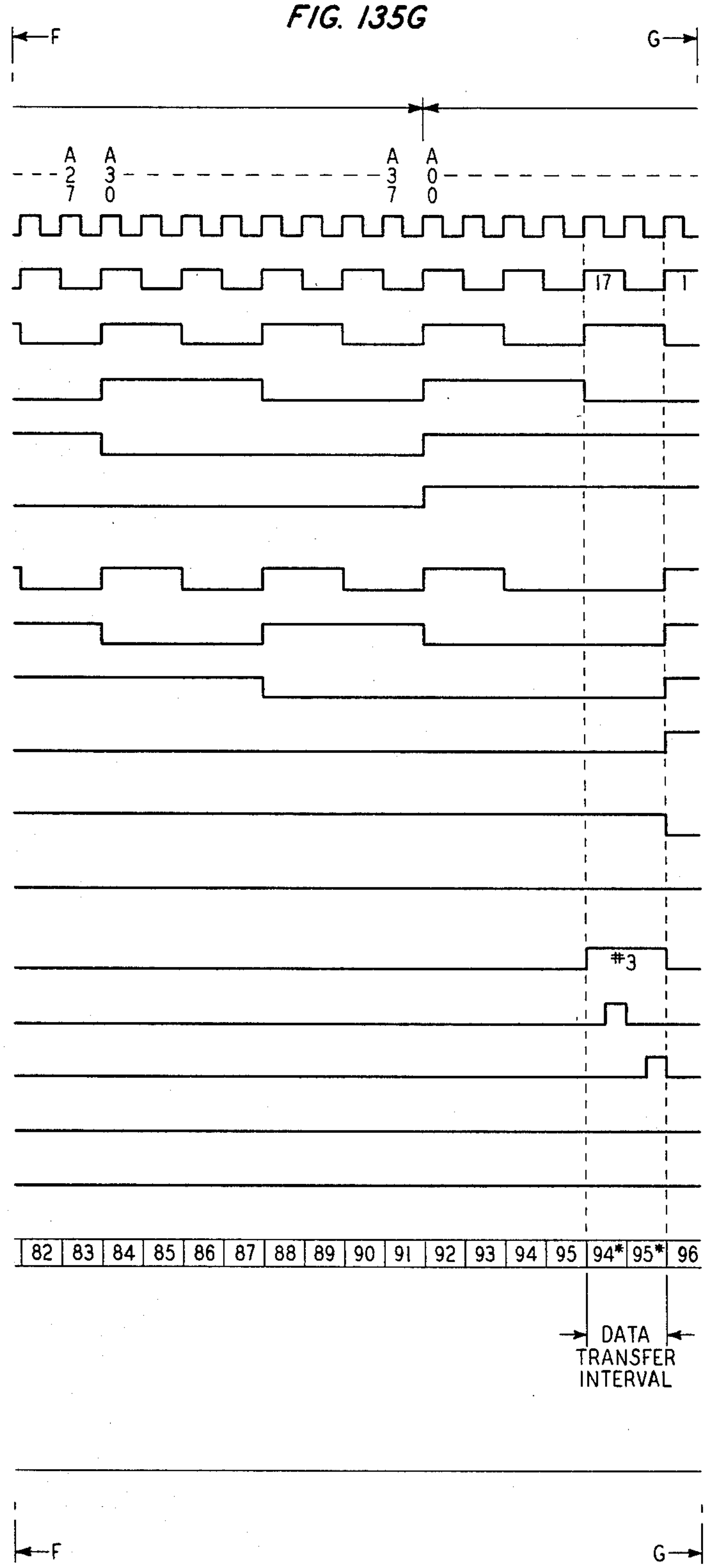
Figure 135H:
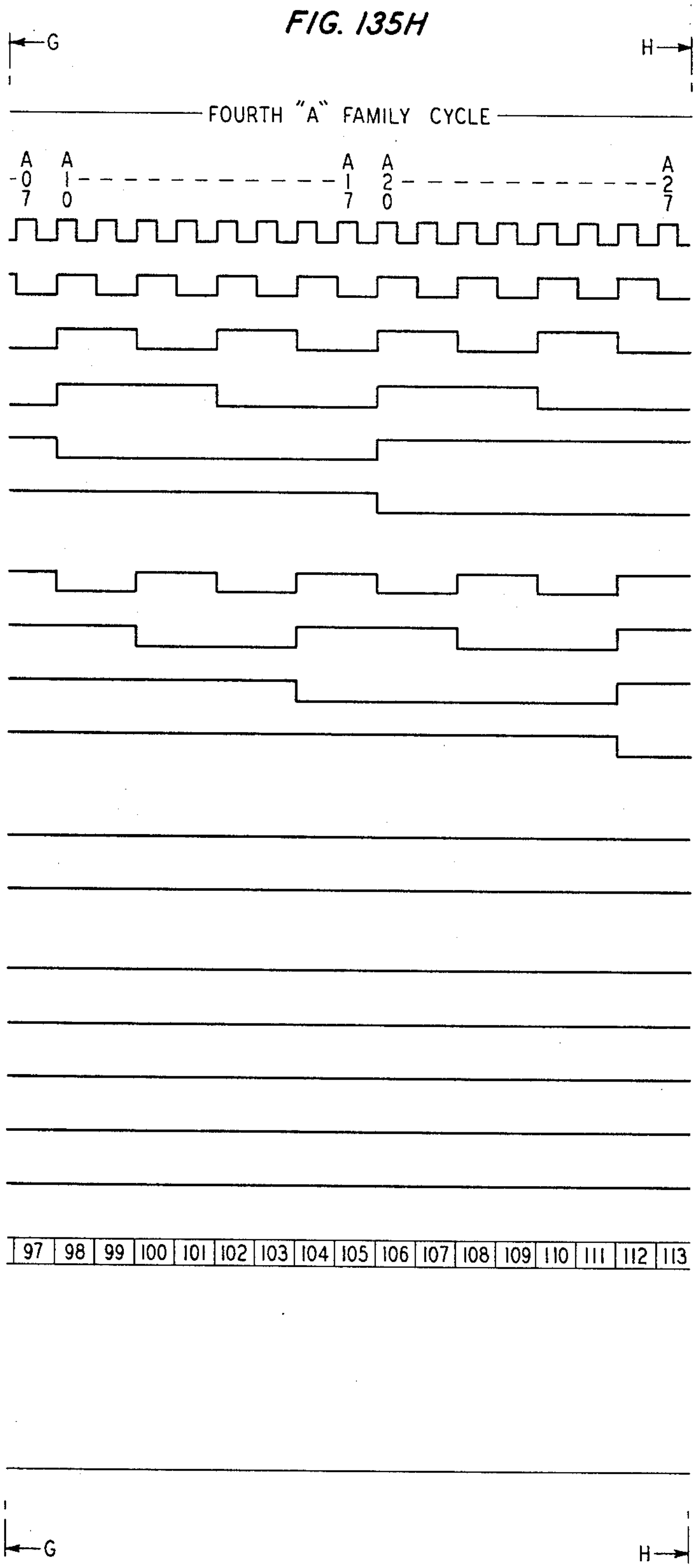
Figure 135I:
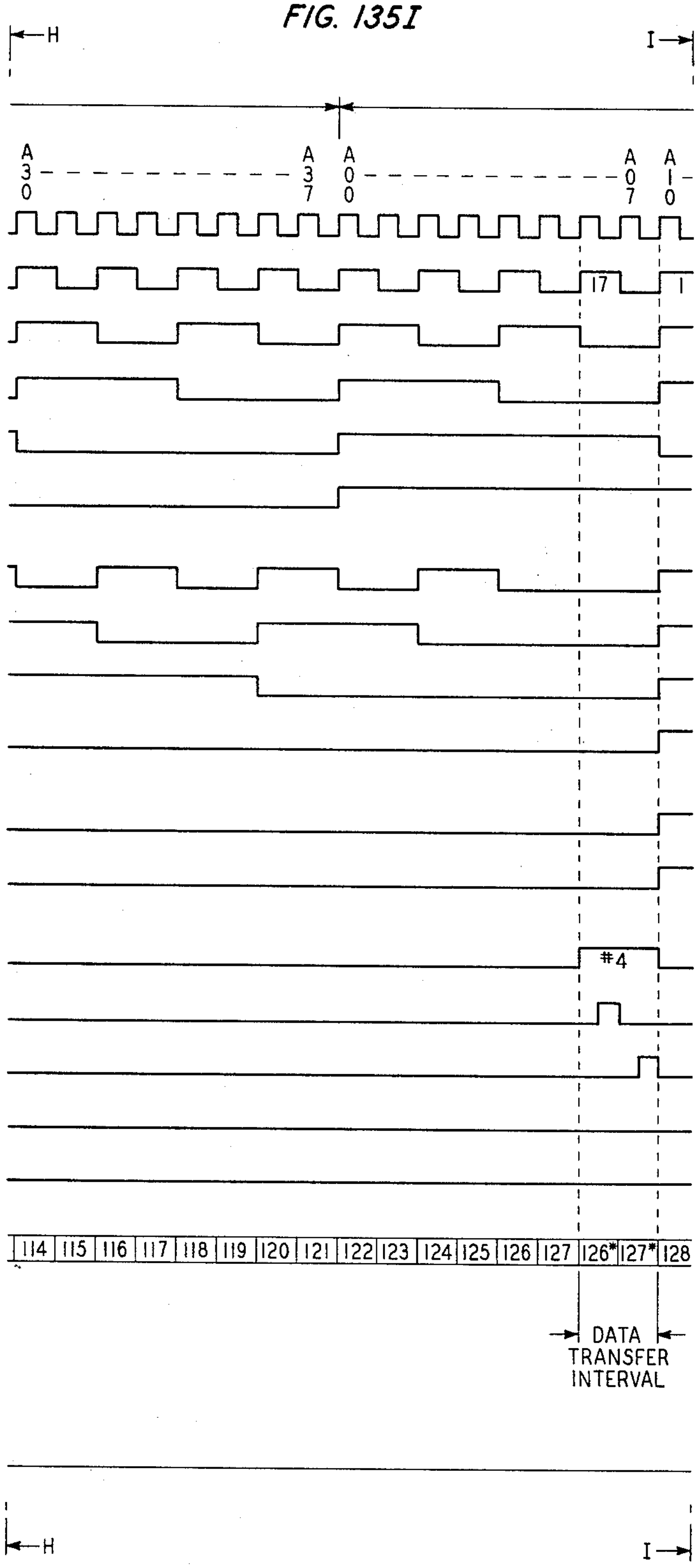
Figure 135J:
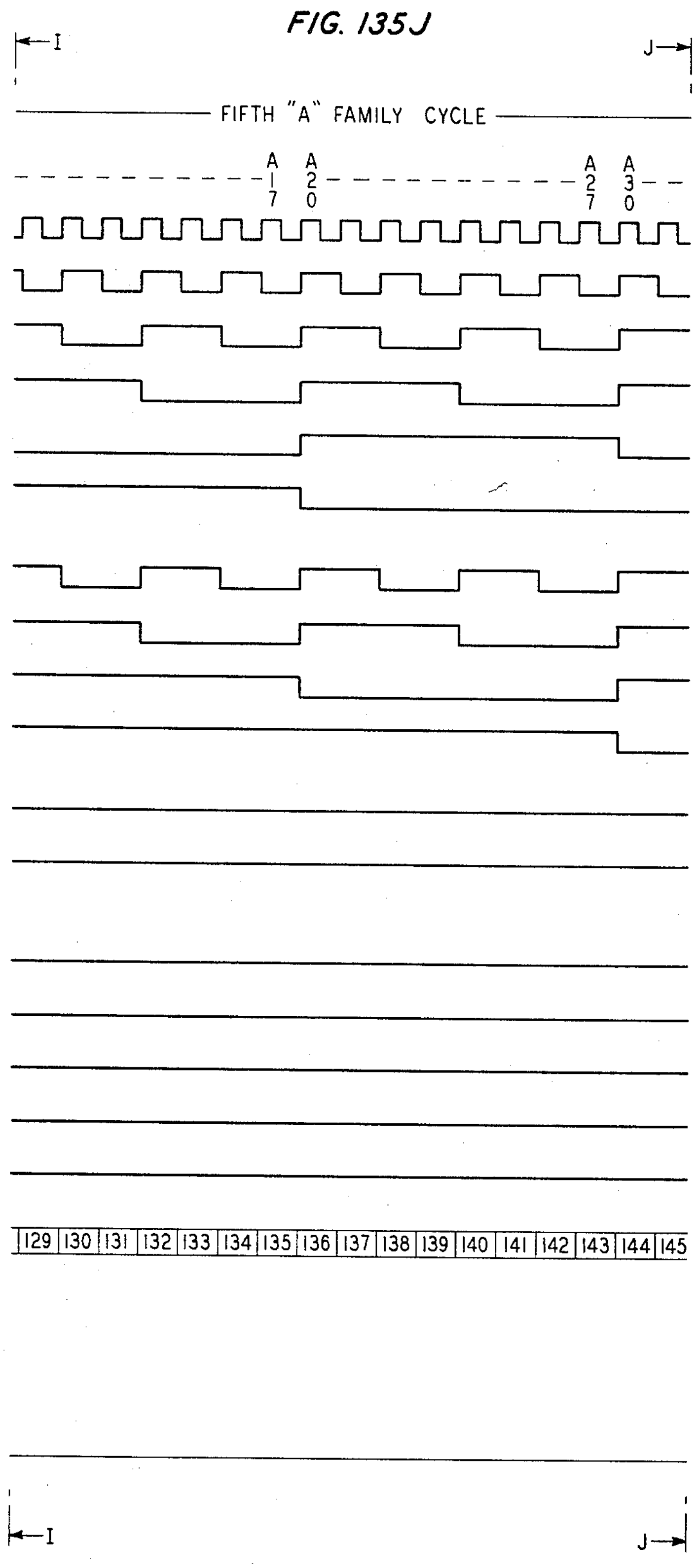
Figure 135K:
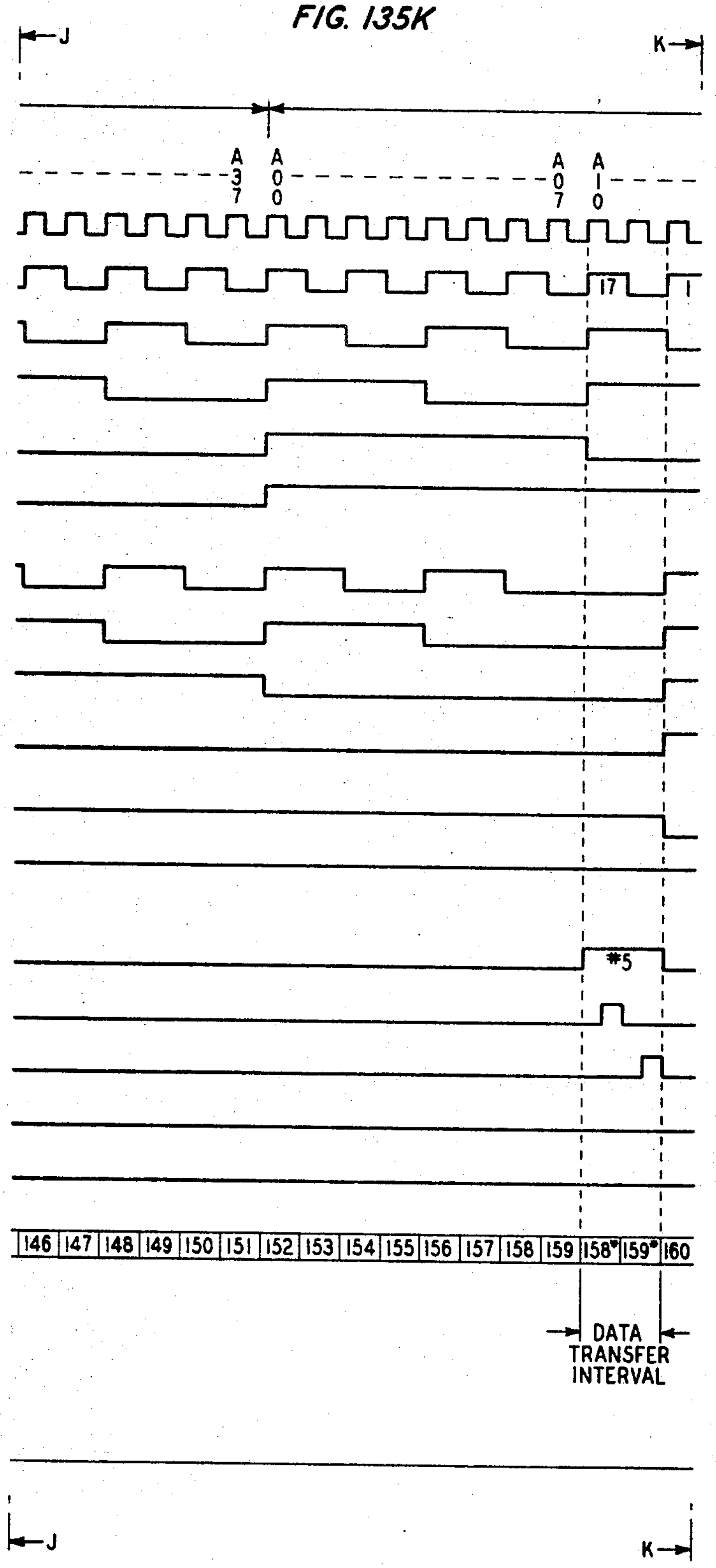
Figure 135L:
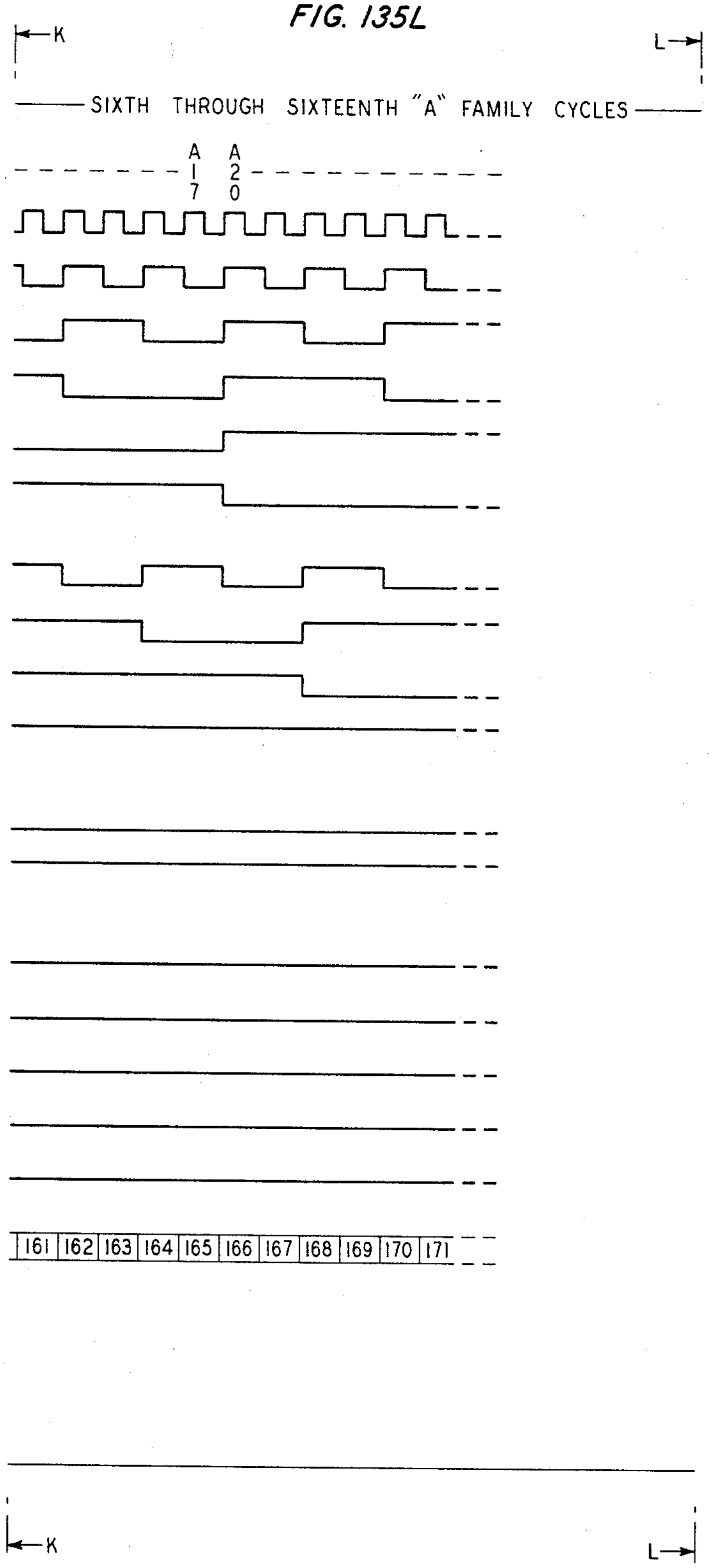
Figure 135M:
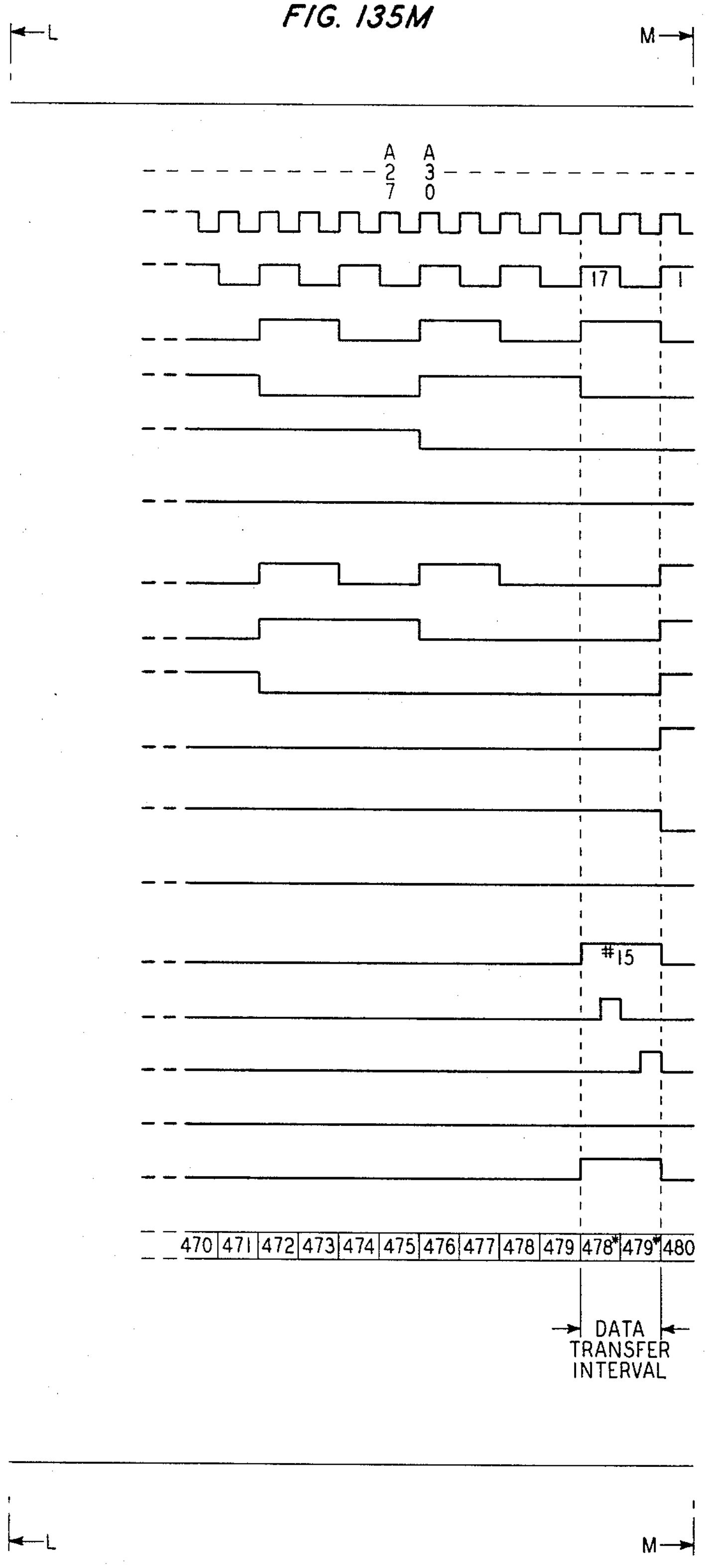
Figure 135N:
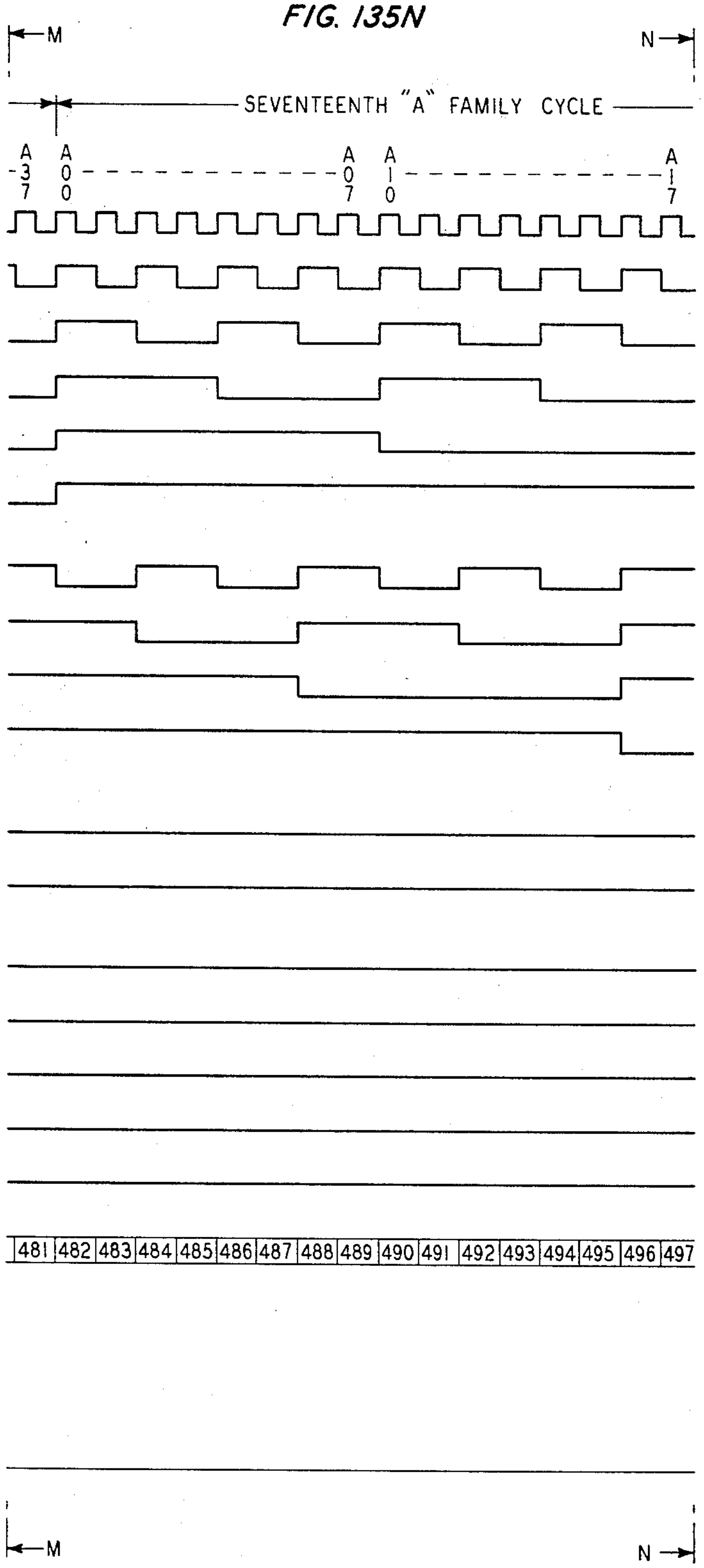
Figure 135P:
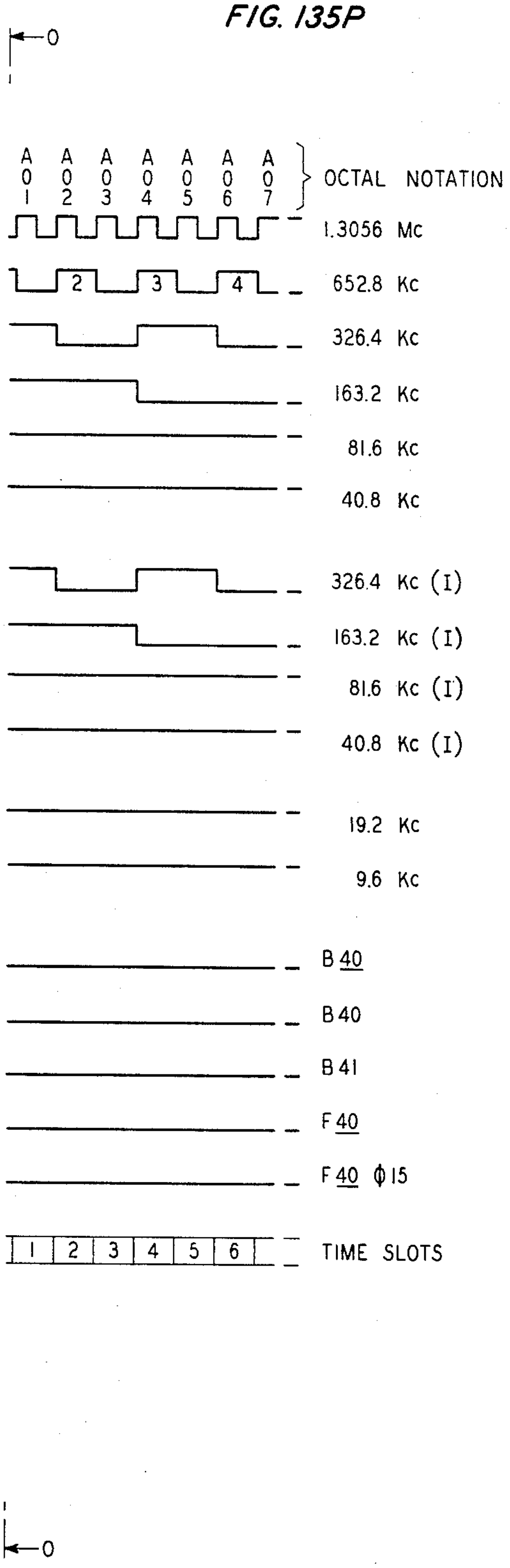

Referring now to FIG. 134 of the drawings, the square wave input signals to the counters 405 and 415 are illustrated by the waveforms designated "5.2 mc. EVEN" and "5.2 mc. ODD," respectively. For simplicity here, the decimal numbers, indicative of frequency, have been rounded off to the nearest tenth. The input stage of countdown circuit 415, for example, alters its state in response to successive input pulse signals (i.e., it divides by 2) to thereby provide a waveform over its (0) output lead such as that designated "2.6 mc. ODD." The waveform "2.6 mc. ODD" is the complement and appears over the (1) output lead of the first stage. Similarly, the second stage of countdown circuit 415 alters its state in response to successive input signals from the first stage to thus provide the waveform designated "1.3 mc. ODD" over its (0) output lead. The counterdown circuit 405 operates in similar fashion in response to the "5.2 mc. EVEN" input.

The aforementioned high frequency family of digital clock pulses comprises eight pulses, designated $\phi 1$–$\phi 8$, that are phased in time in the manner shown in FIG. 134. The total time duration of the eight pulses is equal to the period of a time slot in the TDS link memories. These eight time-phased pulses are continuously generated in cyclic fashion and they appear on respective output leads of AND gate translator 420.

Referring still to FIG. 134, the X-marks on the waveforms indicate the manner in which the eight time-phase pulses are produced. For example, the $\phi 1$ pulse is produced during a "5.2 mc. EVEN" pulse period, if and only if the two stages of the countdown circuit 415 are in their "0" state, i.e., the (0) output leads of both are energized. From the waveforms of FIG. 134, it should be evident that the $\phi 1$ pulse is therefore generated only once per designated time slot period.

Returning to FIG. 4, the periodically recurring $\phi 1$ pulse is derived by connecting the output of the even pulse generator 403 and the (0) output leads of the stages of countdown circuit 415 to the input of AND gate 421 of translator 420. The AND gate translations necessary for the derivation of the other time-phased pulses ($\phi 2$–$\phi 8$) will be obvious from FIG. 134 and the example given above.

As will be clear hereinafter, not all of the eight time-phased pulses are used in the TDS. The generation of all eight, however, provides flexibility. For example, a phase pulse is used to sample the information in the time slots of the link memories. However, the total loop delay of the memories can never be fixed with exactitude and a minor variation in the same may occur. As a result of such a variation, it may be desirable to sample with a pulse somewhat phased in time with respect to the one originally intended to be used. This can be readily accomplished herein by choosing the appropriately phase sampling pulse.

The low frequency families of digital clock pulses are used primarily in the operation of the terminal circuits 104. Accordingly, the clock pulse waveforms themselves, their functional utility in the TDS, and the timing and relationship of the same with respect to each other and with respect to the incoming message bit streams will be considered in detail hereinafter, particularly in connection with the detailed description of the TDS terminal circuits; only the manner of generation of the requisite waveforms will be considered at this point.

The 1.3056 mc. square wave signal from the ODD channel is used as the basis for the derivation of the low frequency clock pulse waveforms. To this end, this signal is coupled to the input of the counter or countdown circuit 501 and to AND gate translator 502. The 1.3056 mc. signal is also used in other parts of the TDS and hence it is coupled via a separate lead to the low frequency timing cable 500.

The counter 501 is similar to the counters 405 and 415 except, of course, that it has more stages—nine to be exact. As in the previous case, the output signals are derived from the (0) output leads of the respective stages. The frequency of the square wave signal on each output lead is indicated in FIG. 5, and the highest frequency waveforms are illustrated in FIG. 135 of the drawings.

The output signals from counter 501 are delivered via separate leads to the timing cable 500, as well as to the input of AND gate translator 430 where they are utilized to provide periodically recurring timing signals A5, A6, A7, A30–7, C30–7 and E30–7, the purpose of which will become more apparent hereinafter.

The 1.3056 mc. waveform, shown in FIG. 135, has been designated the "A" family. Predetermined pulses in this A family are utilized for sampling the incoming data, the particular pulse or pulses used being dependent primarily upon the rate of the message to be sampled. An octal numbering system has been used to designate the individual pulses of this A family. In accordance with this numbering system the first eight pulses are numbered consecutively 0 through 7, with the number being preceded by the prefix A0. The next eight pulses, again numbered consecutively, have the prefix A1, the next eight have the prefix A2, with the prefix A3 for the last eight pulses. The next 32 pulses are numbered in the same fashion, as are each succeeding 32 pulses. These 32 pulses of the A family are repetitive at a 40.8 kc. rate and any given pulse of this family may be translated out of the A stream by the use of the other generated clock waveforms. A part of this translation is performed by AND gate translator 430.

The AND gate translator 430 serves to translate out of the 1.3056 mc. or A family bit stream the fifth, sixth and seventh numbered pulses (A5, A6 and A7) of each octal group (i.e., group of 8 pulses). FIGS. 4 and 135 illustrate the manner in which the A5 pulse of each octal group is derived. In FIG. 4, the AND gate 431 of translator 430 has the 1.3056 mc. and 326.4 kc. square wave signals coupled to the input thereof along with the inversion of square waves 652.8 kc. and 163.2 kc. Thus. an output signal from AND gate 431 appears during the period that the 1.3056 mc. and 326.4 kc. leads are energized and the counter output leads designated 652.8 kc. and 163.2 kc. are de-energized or in their "0" state. The X-marks on the corresponding waveforms of FIG. 135 indicate the instances when these stated conditions exist. As is evident from the waveforms, the same holds only during the period of the A5 pulse of each octal group. Thus, in effect, the successive A05, A15, A25 and A35 pulses of the four octal groups have been translated out of the A family bit stream and these appear over the translator output lead designated A5.

The A6 and A7 pulses of each octal group are similarly translated out of the A family bit stream and appear on output leads A6 and A7, respectively. To derive the A6 pulses it is necessary to AND the 1.3056 mc. and 652.8 kc. signals together with the inversion of the 326.4 kc. and 163.2 kc. square wave signals. For the A7 pulses, the 1.3056 mc. signal is ANDed with the inversion of the 652.8 kc., 326.4 kc. and 163.2 kc. signals. This will be evident from an examination of the appropriate waveforms of FIG. 135.

The A5, A6 and A7 pulses are generated for each and every octal group. However, for sampling the commonly encountered incoming message bit rates only those pulses of a given octal group are necessary. For example, for sampling a 40.8 kc. incoming message bit stream only the A35, A3 6 and A37 timing pulses are utilized. Accordingly, additional timing waveforms corresponding in time to predetermined octal groups are required. These waveforms are derived in AND gate translator 502 using conventional techniques.

By way of example, for sampling a 40.8 kc. incoming bit stream, a timing waveform corresponding to the A30 through A37 octal group is required. Turning to the waveforms of FIG. 135, it will be seen that opposite phases of the square wave designated 81.6 kc. correspond to successive octal groups. Accordingly, by ANDing the 81.6 kc. and 40.8 kc. square waves in the appropriate manner a timing pulse corresponding in time to any desired octal group can be arrived at. For example, a timing pulse corresponding to each A30–A37 octal group is derived by connecting the inversion of the 81.6 kc. and 40.8 kc. square waves to the input of AND gate 432 of translator 430. Thus, a timing pulse is provided over lead A30–7 for the duration of this octal group.

In a similar fashion, timing waveforms are provided over leads C30–7 and E30–7 and these are utilized in deriving specific sampling pulses for use with incoming messages at rates of 10.2 kc. and 2.55 kc., respectively. The timing waveform appearing on lead C30–7 is derived by ANDing the inversion of the 20.4 kc. and 10.2 kc. output signals from counter 501; the timing waveform on lead E30–7 is arrived at by ANDing the inversion of the 5.1 kc. and 2.55 kc. signals from the counter. The derivation of appropriate timing waveforms for use with other message bit rates will be obvious to those in the art.

The 652.8 kc. output of counter 501 is delivered to the input of the four stage counter 551 via the differentiator-clipper 552. The counter 551 is, per se, similar to those heretofore described, but because of the added logic circuitry connected thereto it offers an additional (÷17) function—i.e., every seventeenth input pulse is divided out and the counting operation is thus temporarily interrupted. The output waveforms appearing on the designated (0) output leads of counter 551 are illustrated in FIG. 135 of the drawings. If the latter waveforms are compared with the 652.8 kc. input pulse waveform it will be seen that counter 551 provides conventional countdown output signals for the first sixteen input pulses. Thus, to this point its output waveforms correspond to those of counter 501 (e.g., compare the 326.4 kc. and 326.4 kc. (I) waveforms of FIG. 135). The seventeenth input pulse, however, is divided out, in a manner to be described, and this temporarily interrupts the operation of the counter 551. Counter operation is thereafter resumed with the introduction of the next input pulse, and the described operation is then repeated.

To perform the ÷17 function, the AND gate 553 is connected to the (1) output leads of each of the stages of counter 551. From the interrupt waveforms of FIG. 135, bearing the suffix (I), it will be seen that the sixteenth input pulse to counter 551 places each of the stages thereof in the "1" state to thereby energize the (1) output leads of the same. The (0) output leads are, of course, de-energized as illustrated by the waveforms. The resultant output signal from AND gate 553 is delivered to differentiator-clipper 554 so as to provide a short duration differentiated pulse which is substantially coincident in time with the leading edge of the designated 16th pulse of the 652.8 kc. waveform. The differentiated output is then applied directly to the "set" terminal of flip-flop 555, and to the reset terminal of the same via the delay D. With the flip-flop 555 set to its "1" state each of the counter stages are inhibited and the counter is temporarily retained in the condition to which it had been set. The delay D is greater than one full cycle of the 652.8 kc. waveform, but less than two full cycles. Accordingly, the differentiated seventeenth input pulse is effectively divided out because the inhibit signal from flip-flop 555 prevents the counter 551 from responding thereto. However, the differentiated pulse signal through the delay path serves to reset the flip-flop 555 prior to the arrival of the next succeding input pulse to the counter 551. This removes the inhibit signal and normal counter operation is resumed.

The (1) output leads of the counter 551 are all energized during the period from the sixteenth to eighteenth input pulses and hence a pulse signal of similar duration appears on the output lead of AND gate 553. The latter output lead is connected to the input of AND gate 556 along with the 326.4 kc. output of counter 501. The resultant output from the AND gate is illustrated in FIG. 135 by the waveform designated B40. The B40 pulses are delivered to the AND gate translator 602 and to the timing cable 500 via a separate lead. The B40 pulses may, alternatively, be derived from a flip-flop that is set to its "1" state by the seventeenth input pulse and reset to the "0" state by the eighteenth input pulse. At all other times the flip-flop would be retained in its "0" state by ORing the (0) output leads of counter 551 and applying the same as an inhibit to the flip-flop.

The 40.8 kc. (I) output of counter 551 is delivered to the counter 601 via the differentiator-clipper 603. On comparing a complete cycle of the 40.8 kc. (I) waveform with a cycle of the 40.8 kc. output waveform of counter 501 it will be evident that the former is of longer duration due to the above-described interrupt operation of counter 551. In fact, its duration or period is one-seventeenth greater than that of 40.8 kc., and hence its frequency being reciprocally related to the period is one-seventeenth less than 40.8 kc.—i.e., its actual frequency is 38.4 kc.

The (÷2) counter 601, being similar to the counters heretofore described, is operative to produce the designated output square wave signals over its (0) output leads in response to the 40.8 kc. (I) input signal. The 19.2 kc. and 9.6 kc. waveforms are illustrated in FIG. 135 of the drawings, the waveforms of the other submultiply related signals are derivable in straightforward fashion from these.

Among other things, the B40 pulses define the TDS data bit transfer intervals for the incoming 40.8 kb. message bit streams. However, as will be clear hereinafter, similar pulse waveforms are necessary for other incoming data bit rates. These waveforms are developed in the AND gate translator 602 using the B40 pulse waveform and the indicated output waveforms of counter 601. The following table illustrates the manner in which some of the other desired pulse waveforms are derived.

| Signal required: | Translator AND gate inputs |
|---|---|
| D40 | B40 19.2 kc. and 9.6 kc. |
| F40 | B40 19.2 kc., 9.6 kc., 4.8 kc. and 2.4 kc. |
| H40 | B40 19.2 kc., 9.6 kc., 4.8 kc., 2.4 kc., 1.2 kc. and 600 cycles. |
| K40 | K40 19.2 kc., 9.6 kc., etc., through 150 cycles. |

Since the counters 501, 551 and 601 will generally be in various random states at the beginning of operation, it is necessary that means be provided to bring them into synchronization. To this end, the signal on the 18.75 output lead of counter 601 is differentiated in differentiator-clipper 610, and the short-duration pulse output of the latter is then fed to the reset terminal of each stage of the counters 501 and 551.

In response to successive input pulses the counter 601 will reach a state where each of the stages thereof are set to their "1" state. The counter has then reached its capacity and on the next succeeding input pulse all of the stages are returned to their "0" state—as is known to those familiar with counter operation. The 18.75 (0) out-output lead is thus energized at this point and a resultant short-duration differentiated pulse is delivered to the respective stages of counters 501 and 551 to set the same to the "0" state. All three counters are now in their "0" state and circuit operation then proceeds in the above-described manner. If there is no circuit malfunction, the three counters will now normally all revert to their initial or "0" state at the same time, even in the absence of the periodic pulse signal generated at the output of differentiator-clipper 610.

*Terminal circuitry*

A terminal circuit 104 is associated with each subscriber line and interoffice trunk. Each such circuit performs a variety of separate, distinct functions. To facilitate an understanding of the same, the terminal circuits can be treated and considered as consisting of two major subsections. The first of these subsections forms the TDS interface with the subscriber lines and interoffice trunks; each comprises a Digital Terminating Unit for each direction of transmission and an Automatic Frame Recovery and Alignment Circuit associated with each incoming line and trunk. For an incoming message, a Receive-Digital Terminating Unit serves to achieve bit synchronization between all lines and trunks operating at the same rate and a Frame Alignment Circuit recovers framing information from the incoming message bit stream and generates clock pulses that are synchronous with the supervisory bit positions in the incoming bit stream. For an outgoing message, a Send-Digital Terminating Unit generates ODD parity bits and inserts the same, along with the other control bits ($F_1$, $F_0$, $C_E$) into the message bit stream.

The other major subsections form the interface with the switching matrix: each of the same performs the functions of supervisory bit stripping—and conversely, insertion; the aforementioned message bit "stretching" so as to achieve a uniformly spaced message bit stream; and M-bit and S-bit buffering.

As will be clear hereinafter, the terminal circuits 104 are essentially the same regardless of whether they are associated with subscriber lines or interoffice trunks, and regardless of the rate thereof. There is one exception to this. The terminal circuits associated with multiplex interoffice trunks include additional circuitry for achieving subframe synchronization between multiplex trunks.

A limited representative sample of subscriber lines and interoffice trunks will be assumed for purposes of illustrating the principles of the present invention. For example, the subscriber lines or stations 701, 1501 and 1901 operate at assumed message bit rates of 38.4, 9.6 and 2.4 kilobits per second, respectively. The interoffice trunk 2301 comprises a multiplexed trunk operating at a 38.4 message bit rate, and trunks 3101 and 3501 can be assumed simplex or multiplex interoffice trunk connections at message rates of 9.6 and 2.4, respectively. As indicated hereinbefore, these message rates fall in the $75\times2^n$ bit per second series. This series, however, is merely illustrative and the principles of the present invention are equally applicable to the switching of other binarily related message bit rates.

Each message bit stream received over a subscriber line or interoffice trunk has inserted therein eight supervisory signal and control bits per frame—i.e., the supervisory bits appear in regular order with 16 message bits therebetween, as shown in FIG. 3 of the drawings. Accordingly, the actual transmission rates will be somewhat higher than the desired message bit rates. For example, for desired message bit rates of 2.4 kb., 9.6 kb., 38.4 kb., et cetera, the actual line and trunk transmission rates will be 2.55 kb., 10.2 kb., 40.8 kb., et cetera. As might be expected, these transmission rates fall in a related series, namely, in the series: $75\times2^n(1+K)$, where K is 1/16.

The subscriber lines and interoffice trunks, being of different lengths, incorporate different time delays, and hence the incoming bit streams will expectedly be "skewed" in some random fashion with respect to each other. The Receive-Digital Terminating Units, a typical one of which is shown in FIGS. 7, 8, 11 and 12 of the drawings, serve the purpose of achieving bit synchonization between all incoming lines and trunks operating at the same rate.

Considering FIGS. 7, 8, 11 and 12 in detail, the incoming 40.8 kb. digital bit stream from subscriber line 701 will be demodulated in conventional fashion in the receive-demodulator 702 and then applied in parallel to the bank of "double rail gate" logic circuits 711 through 727. A local clock 703 is "slaved" to, and hence runs at, the incoming digital transmission rate. The clock pulses from clock 703 are fed to the input of counter 1104 which counts to a predetermined number (e.g., seventeen) and then recycles. Such counters are well known in the art; see chapter 11 of "Pulse and Digital Circuits," by Millman and Taub, McGraw-Hill Publishing Co. (1956). The (1-out-of-17) AND gate translator 704 serves to energize one and only one of the output leads thereof for each count of counter 1104. The output leads of the translator 704 are connected to respective double rail gate logic circuits 711–727. As the count proceeds in counter 1104 successive output leads of the translator will be energized to thereby successively enable the aforementioned logic circuits 711–727 and thus couple successive bits of the incoming digital bit stream to successive stages of the seventeen stage buffer store 706.

Double rail gate logic circuits are well known in the art; their operation is such that a binary one in the incoming bit stream will set a flip-flop to its "1" state, while a binary zero will set the flip-flop to its "0" state. For example, if the output lead 735 of translator 704 is assumed energized, a binary one in the incoming bit stream will be applied to the input of AND gate 736 along with the enabling signal of lead 735, whereby an energizing signal will be delivered to the set terminal of the flip-flop storage stage 761 to set the same to its "1" state. If stage 761 was already in the "1" state, it just remains there. Since the input message bit is inverted in inverter 737, the AND gate 738 remains de-energized at this time.

A binary zero in the incoming bit stream fails, of course, to energize AND gate 736; but because of the voltage inversion provided by inverter 737, this binary zero causes an energizing signal to be delivered from AND gate 738 to the reset terminal of flip-flop 761 to set the same to its "0" state.

The double rail gate circuits associated with each flip-flop operate in the described fashion to thereby couple the successive bits of the incoming bit stream to successive flip-flop storage stages of buffer store 706. The storage of a bit in the last stage of buffer store 706 is followed by a recycling of counter 1104 and the described operation is thence repeated.

The 40.8 kc. signal generated in the central timing unit 100 is delivered via the timing cable 500 to the input of the counter 1154. This counter is identical to the counter 1104. The (1-out-of-17) AND gate translator 754, being similar to translator 704, serves to energize one and only one of the output leads thereof for each count of counter 1154. The output leads of translator 754 are connected to respective gates in the bank of AND gates 811–827. Each AND gate is also respectively connected to one of the storage stages of buffer store 706. Accordingly, as the translator 754 successively enables the AND gates 811 through 827 the bit information stored in the stages of buffer store 706 will be successively read out onto the output lead 801 of OR gate 802. The readout from buffer store 706 is cyclical in the same manner as the write in thereto, and, of course, it is at the same rate.

As will be clear to those in the art, the digital bit stream appearing on lead 801 is "full-bauded"—i.e., of the "non-return-to-zero" type. A full-bauded or "NRZ" bit stream is simply one wherein the interface or leading and trailing edges between similar adjacent bits are eliminated (i.e., they are nonexistent). The digital bit streams arriving at the TDS over the subscriber lines and interoffice trunks may similarly be of the NRZ type, or, alternatively, they may comprise return-to-zero message bit streams. Should the received bit streams be of the latter type they will, of course, be converted to the former in the Terminating Units; however, such conversion results in no loss of information.

It will be apparent at this point that the buffer store write in and readout operations take place simultaneously. The write in and readout, however, should not occur simultaneously with respect to the same stage of buffer store 706. That is, the write in and readout operations should be staggered stage-wise, each stage being given an adequate period to stabilize in the one or the other of its bistable states prior to the readout therefrom. The comparator circuit 1101 accomplishes the desired "staggering." Comparator 1101 can be simply an AND gate translator which in response to closely related counts in counters 1104 and 1154 delivers a signal to counter 1154 to advance or jump the count therein by a predetermined amount. For example, the input of the comparator can be connected to the output lead of translator 704 that is energized when counter 1104 counts to 3 and to those leads of translator 754 that are energized when counter 1154 counts to 1, 2, 3, 4 and 5, respectively. Accordingly, if the relative count of counters 1104 and 1154 is not at least three units removed or separated, a "jump N Bits" signal will be delivered to counter 1154 when counter 1104 reaches the count of three (3). In the absence of equipment failure, the counters thereafter will count continuously and cyclically with a constant phase difference (i.e., count difference) therebetween.

The 40.8 kc. timing signal from the central timing unit controls the readout from each buffer store associated with each incoming 40.8 kc. line and trunk. Accordingly, bit synchronization between all 40.8 kc. lines and trunks is guaranteed. As will be clear hereinafter, the same is true for other rates.

The bit synchronous data on bus 801 is delivered to the Automatic Frame Alignment Circuit and to the Supervisory Bit Stripper and Rate Buffer, the latter to be described in detail hereinafter. The Frame Alignment Circuit is shown in block diagram form in FIGS. 9 and 13 of the drawings. The basic objective of this frame circuit, as with all framers, is to adjust the receive-station clock pulse generator-distributor 1301 so that when it generates a clock pulse ($F_1$), the framing bit ($F_1$) in the received bit stream will be on the bus 801. If this can be done, all other bits in the received bit stream will be oriented properly with respect to local clock pulses, and they can be identified and correctly routed.

The Automatic Frame Alignment Circuit illustrated herein is the same as that disclosed in detail in the copending application of D. M. Coulter, Ser. No. 208,647, filed July 9, 1962. Quite briefly, the frame bit check circuit 901 compares the timing or alignment of the locally generated $F_1$ and $F_0$ clock signals with the $F_1$ and $F_0$ bits in the received bit stream. If an out-of-frame condition exists, the frame loss detector 902 generates a signal that causes the automatic frame alignment circuit to start a frame search mode of operation. During frame search the 40.8 kc. driving pulses to the clock pulse generator-distributor 1301 are intermittently blocked by the inhibit control circuit 1302, thus allowing the phase of the generator-distributor to be retarded a bit at a time in a step-like fashion. With each phase retardation another comparison is made in the frame bit check circuit 901. At some point in time, the locally generated $F_1$ and $F_0$ clock signals will again be aligned with those of the received bit stream. This alignment is detected in the frame detector 903 which terminates the frame search mode, and normal service operation is again resumed. Actually, much of the above is conventional, and numerous automatic frame circuits known to those in the art can be utilized to advantage herein. The novelty and desirability of the aforementioned Coulter case lie in the proposed means whereby frame recovery can be greatly accelerated.

As a result of the above-described operation, the designated clock pulses generated by generator-distributor 1301 correspond in time with the appearance of the supervisory signal and control bits on bus 801. These clock pulses are utilized in other parts of the TDS and hence they are coupled via separate leads to the Clock Pulse and S-bit Cable 1300 for subsequent distribution.

The "jump N Bits" signal to counter 1154 is also delivered to the clock pulse generator-distributor 1301. Thus the generator-distributor is advanced to the same degree as the readout control counter 1154 and no loss of framing will occur should a "jump N Bits" signal be generated. As will be evident from the cited Coulter application, the generator-distributor 1301 is essentially a counter with an AND gate translator output.

Figure 11:
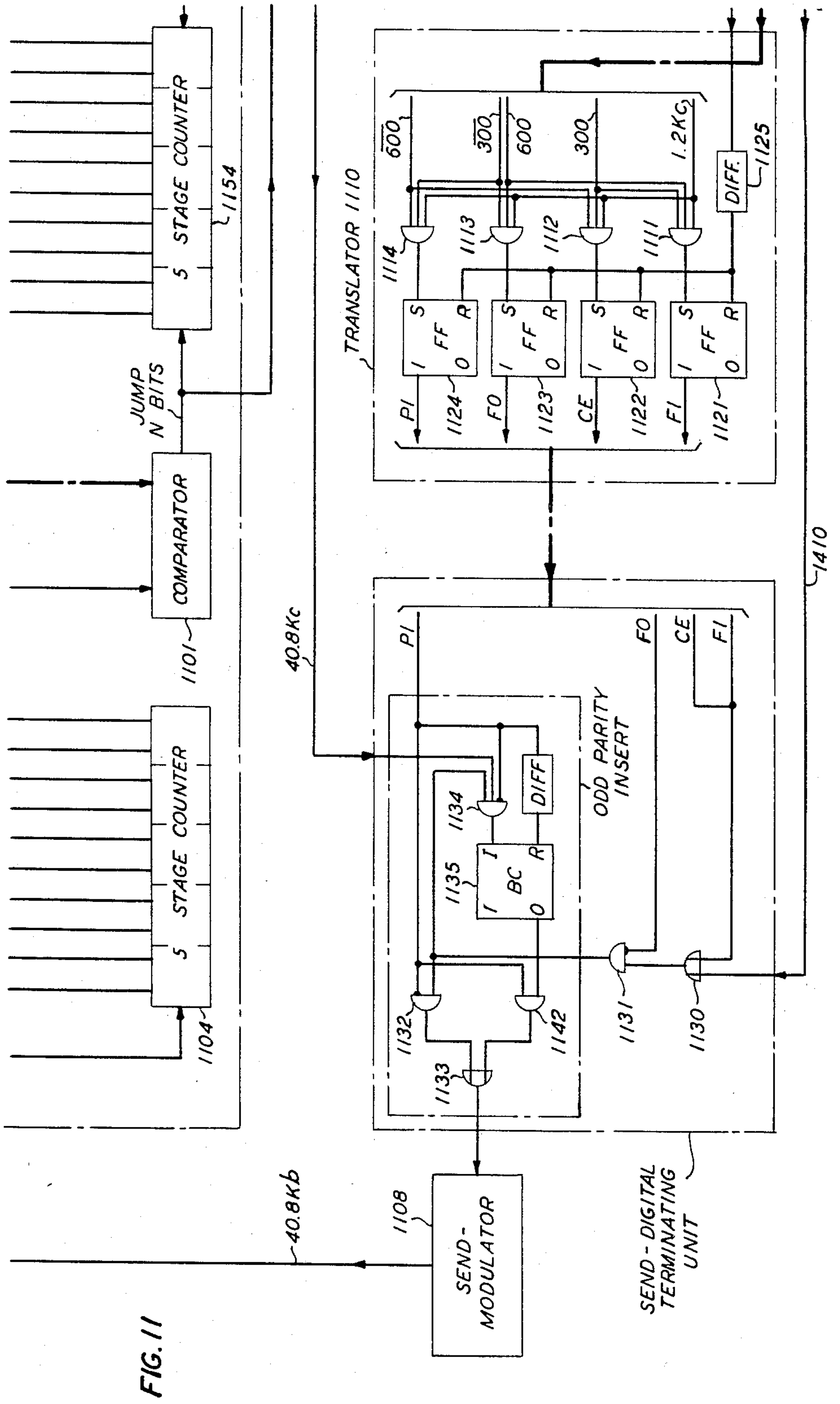
Figure 12:
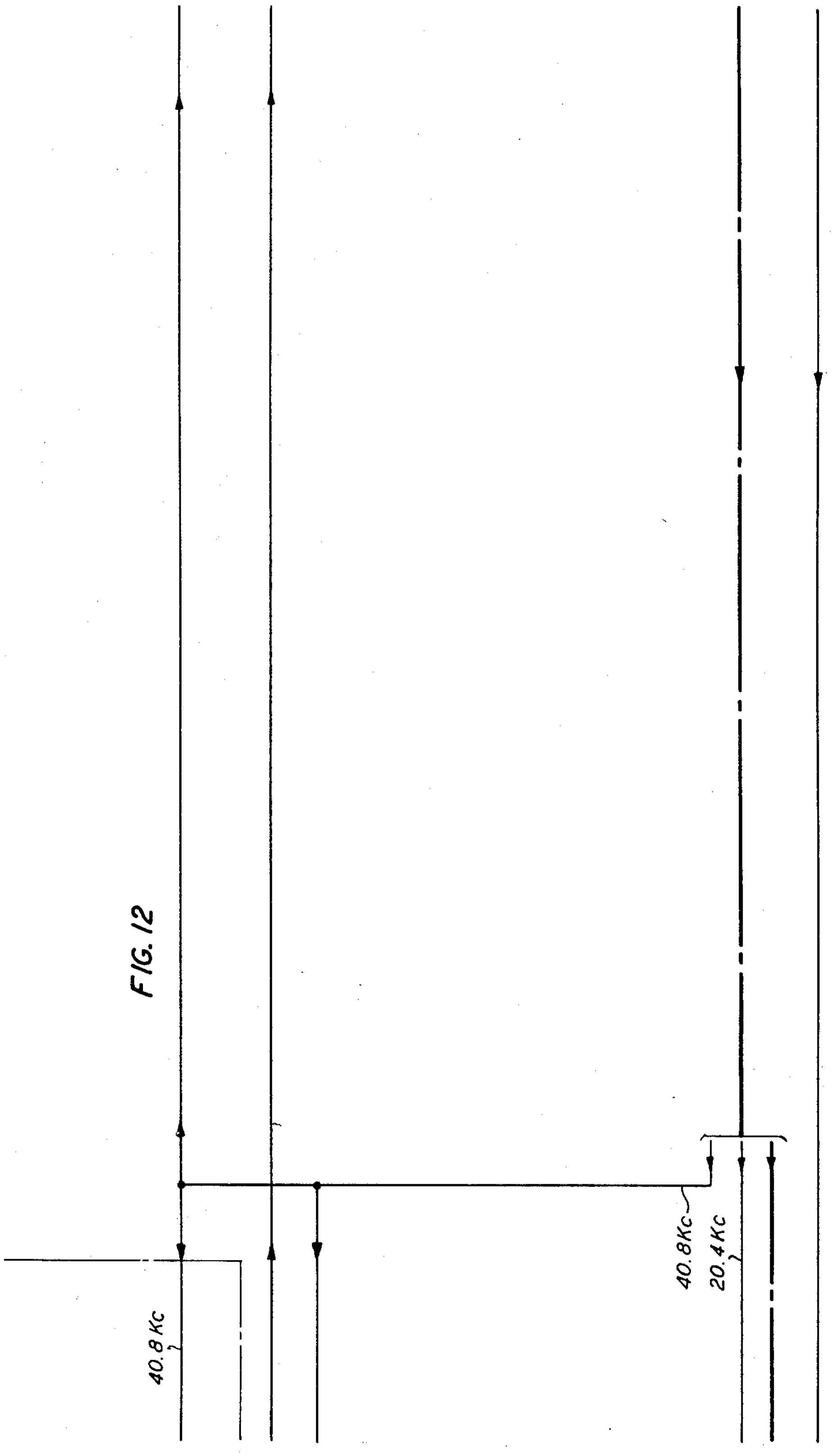

For the other direction of transmission, the Send-Digital Terminating Unit of FIG. 11 receives the outgoing message bit stream over bus 1410 and the control bits $F_1$, $C_E$, $F_0$ and $P_1$ from translator 1110; it inserts the control bits into the outgoing bit stream; and then delivers the same to the Send Modulator 1108 for modulation with an appropriate carrier prior to transmission to the remote subscriber station. The bit stream on bus 1410 will contain message bits and supervisory bits arranged in the standard format. However, the bit positions or time slots in this bit stream that are reserved for the control bits will contain the supervisory signal bits ($S_1$, $S_2$, $S_3$ and $S_4$). That is, the S-bit insert equipment of FIG. 14 double-writes the signal bits into the message bit stream, and hence the Digital Terminating Unit must insert the control bits by overwriting into the proper time slots.

Figure 136:
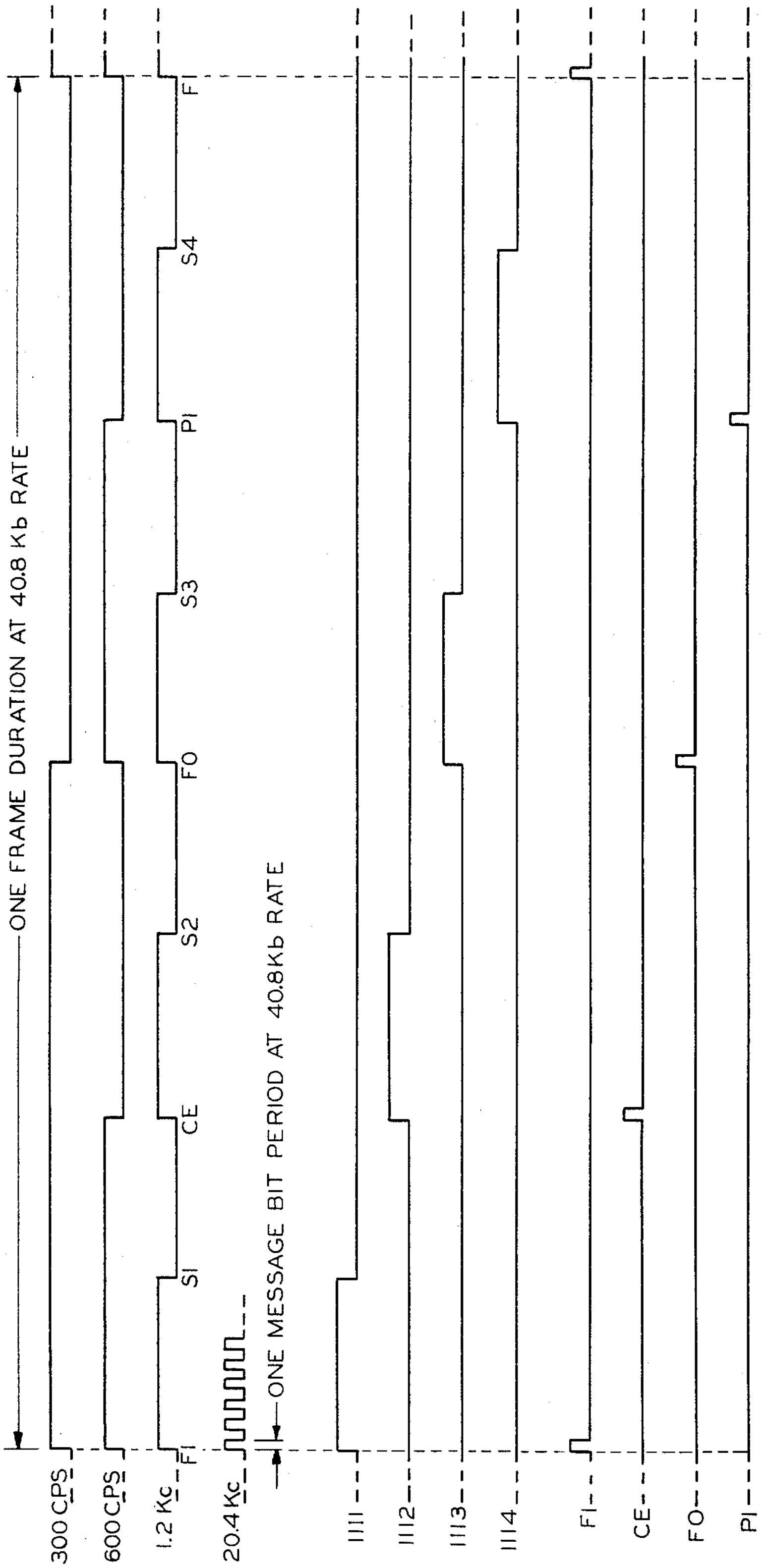

The manner in which the translator 1110 generates the four control bits $F_1$, $C_E$, $F_0$ and $P_1$ is illustrated by the waveforms of FIG. 136. The illustrated 20.4 kc., 1.2 kc., 600 and 300 cycle waveforms are derived from the central timing unit 100. Considering these waveforms: one cycle of the 300 c.p.s. waveform is equivalent to the duration of one frame at a 40.8 kb. rate; the 1.2 kc. waveform is repetitive at the same rate as the control bit or S-bit rate of a 40.8 kb. bit stream (note, the eight supervisory bits of a 40.8 kb. stream occur at a 2.4 kb. rate); and one-half cycle of the 20.4 kc. waveform is equivalent to the duration of one bit period at the 40.8 kb. rate. These equivalencies are used in the manner to be described to generate the four control bits.

The 1.2 kc., 600 and 300 c.p.s. signals from the central timing unit are delivered to the AND gate 1111 to thereby provide an output therefrom such as that indicated by the waveform 1111 of FIG. 136. The leading edge of this waveform serves to set the flip-flop 1121 to its "1" state. The 20.4 kc. signal is delivered to the differentiator 1125 so as to derive short duration output pulses coincident in time with the trailing edges of the 20.4 kc. pulse train. The output of the differentiator 1125 is coupled to the reset terminal of each of the flip-flops 1121–1124. Accordingly, the flip-flop 1121 will be reset shortly after having been set to its "1" state. Subsequent differentiated pulse signals are ineffectual with respect to flip-flop 1121, since the same is not again set to its "1" state until the beginning of the next frame, as will be evident from the waveforms of FIG. C. The FIG. 136 waveform designated $F_1$ indicates the output of flip-flop 1121. The manner in which the flip-flop outputs designated $C_E$, $F_0$ and $P_1$ are derived should be evident from FIG. 136 and the foregoing explanation.

The 1.2 kc., $\overline{600}$ and 300 cycle signals are coupled to the input of AND gate 1112; the bar over a waveform (i.e., $\overline{600}$) designates the inversion thereof, which can be derived from a simple inverter or, alternatively, from the complementary output of the designated counter stage of the central timing unit. The 1.2 kc., 600 and $\overline{300}$ signals are coupled to the AND gate 1113, and the 1.2 kc., $\overline{600}$ and $\overline{300}$ signals are fed to AND gate 1114. And, as explained heretofore, each flip-flop is reset by a short duration differentiated pulse shortly after having been set to its "1" state.

The $F_1$ bit of the format utilized herein is always a binary one and hence it is inserted directly into the outgoing bit stream by means of OR gate 1130. The $C_E$ bit is, for purposes of explanation, assumed to be a binary one and thus it is likewise inserted directly into the outgoing bit stream. However, whether this bit is a binary one or zero or some alternating sequence thereof, will depend upon its intended usage and this in turn will dictate the logic to be used in the insertion of the same into the message bit stream.

The framing bit $F_0$ is always a binary zero. The $F_1$ and $F_0$ bits therefore always appear as a 1010101 . . . pattern, and since the message, parity and signaling bits will be one or zero in some more-or-less random fashion, no other pair of bits separated by a half frame will have the noted continuous repetitive pattern. It is this constant and unique 10101 . . . sequence in the bit stream that makes framing possible at the receiving end.

Since the $F_0$ bit in the outgoing bit stream should always be a binary zero, the $F_0$ bit output of flip-flop 1123 is delivered as an inhibit signal to the gate 1131. The normal path for the outgoing digital bit stream is through OR gate 1130, gate 1131, gate 1132 and OR gate 1133 to the Send Modulator 1108. During the $F_0$ output of flip-flop 1123 and gate 1131 is inhibited and a binary zero is thereby effectively inserted in the message bit stream in the appropriate time slot. The timing or framing of all outgoing bit streams is directly under the control of the central timing unit and hence the control bits are automatically generated in appropriate time periods in the manner described.

The $P_1$ parity bit is inserted or not depending upon the complexion of the immediately preceding bit stream. The concept of parity for error detection purposes will be known to those in the art and therefore only the manner in which the parity bit is inserted into the bit stream will be treated herein. An ODD parity insert shall be assumed for purposes of explanation. Accordingly, if the 135 bit positions or time slots immediately preceding the $P_1$ bit position in the bit stream contain an odd number of binary ones, the $P_1$ bit should not be inserted; alternatively, if the 135 bit positions contain an even number of binary ones, a $P_1$ parity bit should be inserted. As will be recalled, a complete frame includes 136 bit positions or time slots.

To this end, the bits of the message bit stream are delivered to the input of the binary counter 1135 via the AND gate 1134, the latter being periodically enabled at the message bit rate by the 40.8 kc. signal from the central timer. The counter 1135 can comprise a simple flip-flop with a conventional input diode type pulse steering circuit whereby the flip-flop is successively set and reset in response to successive input pulses. If an odd number of binary ones appear in the 135 bit positions preceding the $P_1$ bit generation, the counter 1135 will be in its "1" state; whereas if there were an even number of binary ones, the counter will be in its "0" state.

The $P_1$ bit from flip-flop 1124 inhibits the gate 1132 to thus block through transmission of the message bit stream; it also inhibits the gate 1134 to prevent read in to counter 1135; and it is further fed to the input of AND gate 1142 along with the (0) output of counter 1135. Accordingly, the $P_1$ bit will be passed by gate 1142 if and only if the counter 1135 is set to its "0" state, which is indicative of an even number of binary ones in the preceding 135 bit positions of the outgoing bit stream. The $P_1$ bit from gate 1142 is mixed into the bit stream by means of OR gate 1133. Upon termination of the $P_1$ bit, the gates 1132 and 1134 are no longer inhibited; the trailing edge of the $P_1$ bit is differentiated and thus used to reset the counter 1135; and normal operation is resumed.

The control bits are generated under the control of the central timing unit without interruption—i.e., whether or not a digital message is in the process of being transmitted. As will be clear hereinafter, the signal bits are likewise continuously generated. The control bits of other lines and trunks operating at the same rate are generated in the very same manner as that described above and hence it will be clear that all outgoing lines and trunks at the same rate are in frame synchronization.

Considering for the moment just subscriber lines, the Receive and Send Digital Terminating Units and the Frame Alignment Circuits associated with all other lines are structurally and functionally identical to those described above. However, the central timing unit waveforms that are applied thereto will necessarily be different for lines at different rates. For example, the read out from each Receive-Digital Terminating Unit is at the incoming line transmission rate, and hence the 10.2 kc. waveform from the timing unit 100 will be applied to the read out counter of the Digital Terminating Unit shown in block form in FIGS. 15 and 16 of the drawings, this unit being associated, of course, with a 10.2 kc. subscriber line. Similarly, the 2.55 kc. timing waveform will be fed to the read out counter of the FIG. 19–20 Receive-Digital Terminating Unit, since the same is associated with a 2.55 kc. transmission rate subscriber, and so on, for other lines at other rates.

Figure 15:
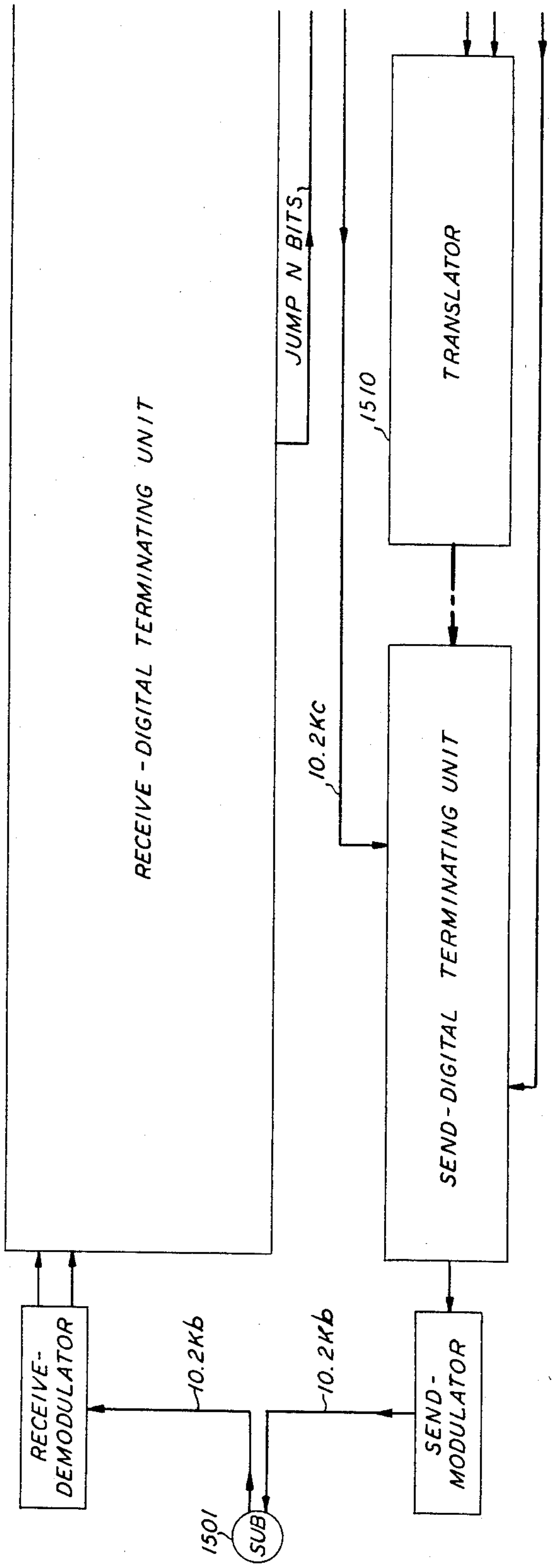
Figure 16:
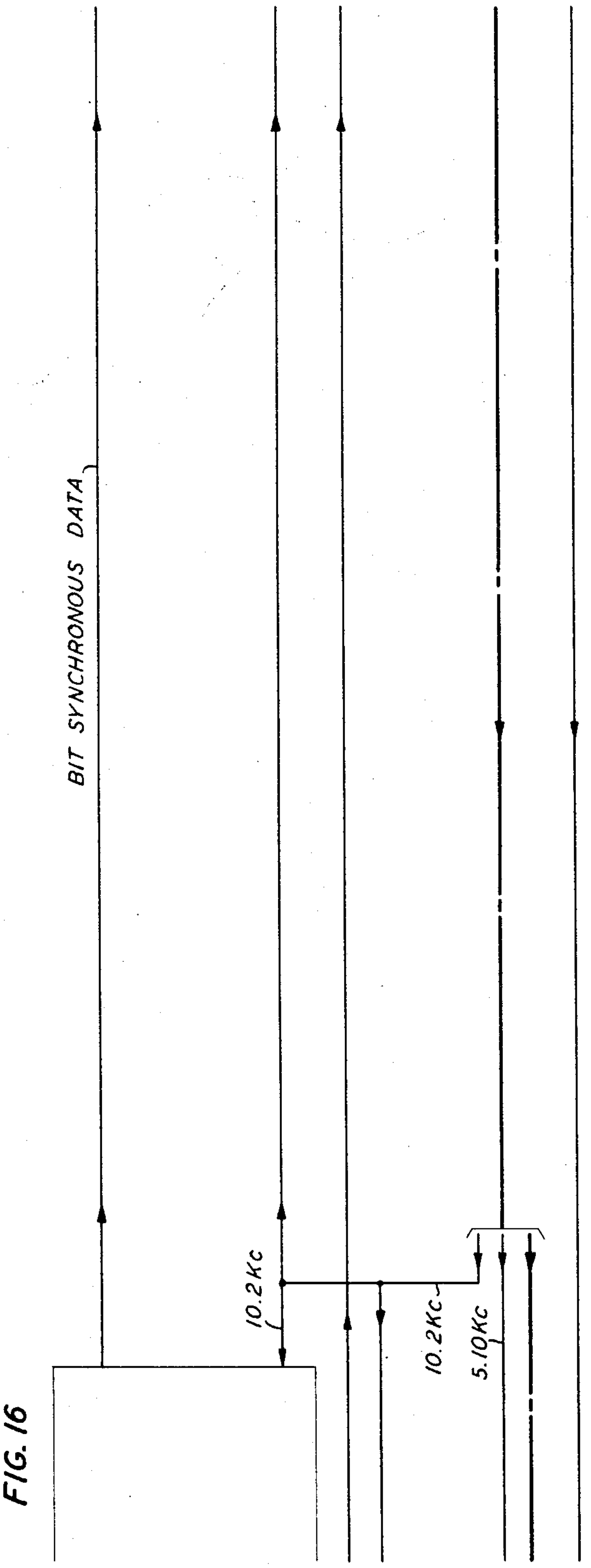
Figure 17:
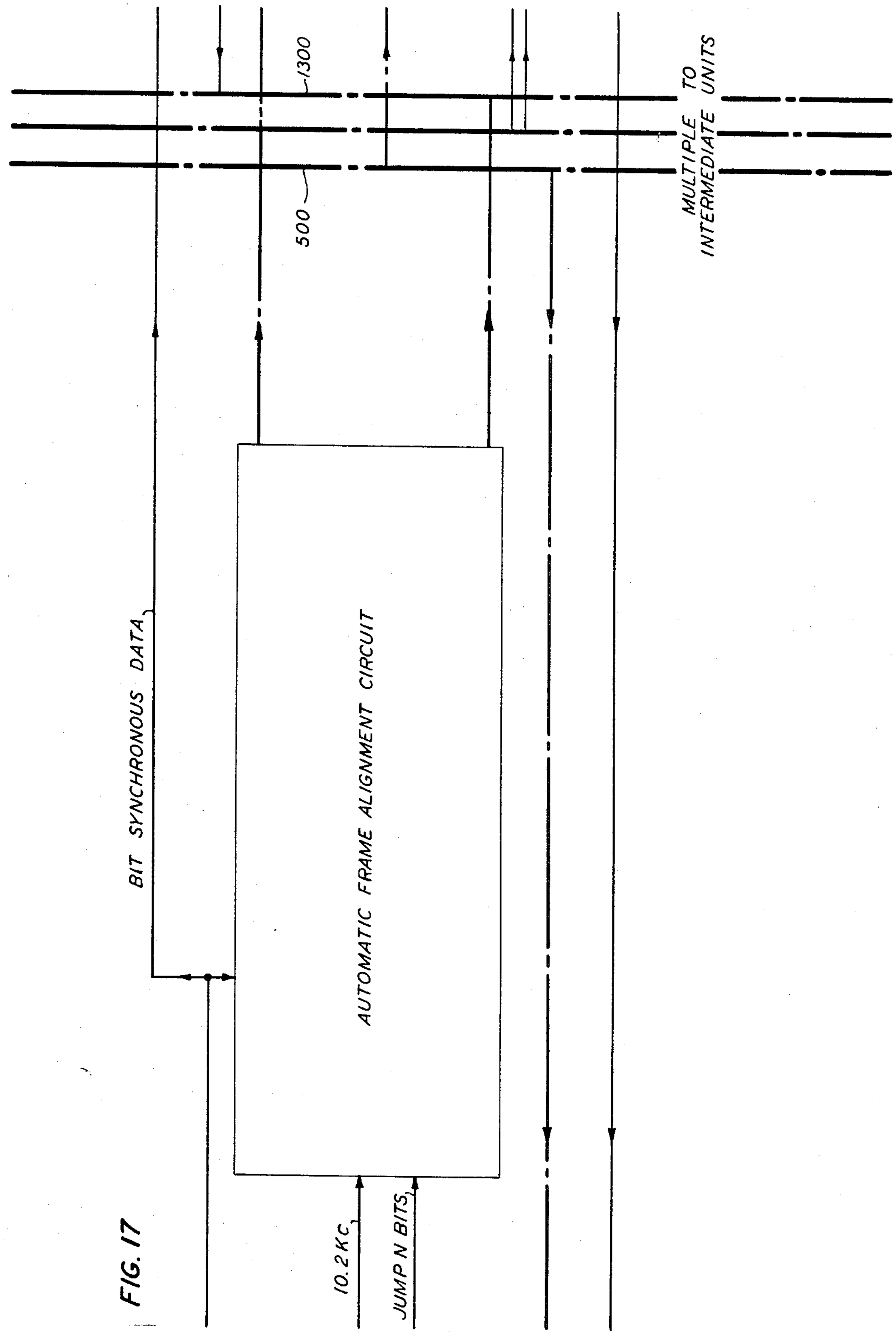
Figure 18:
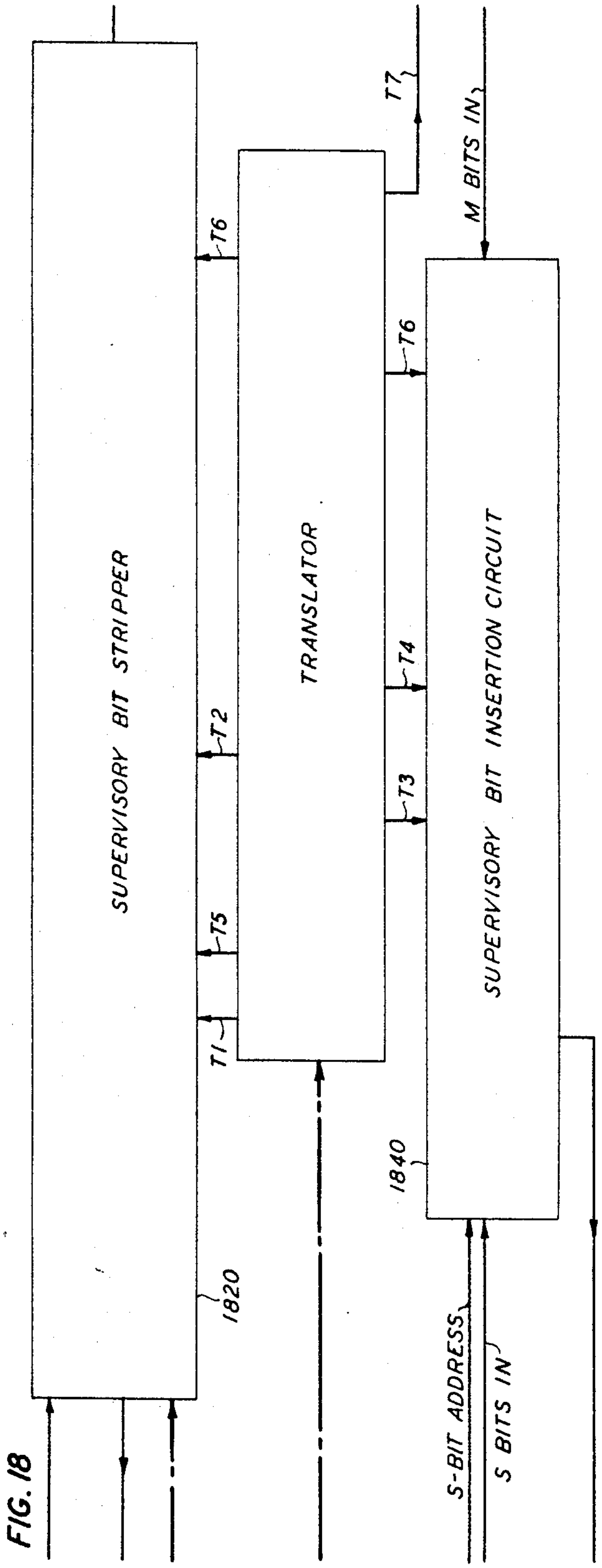
Figure 19:
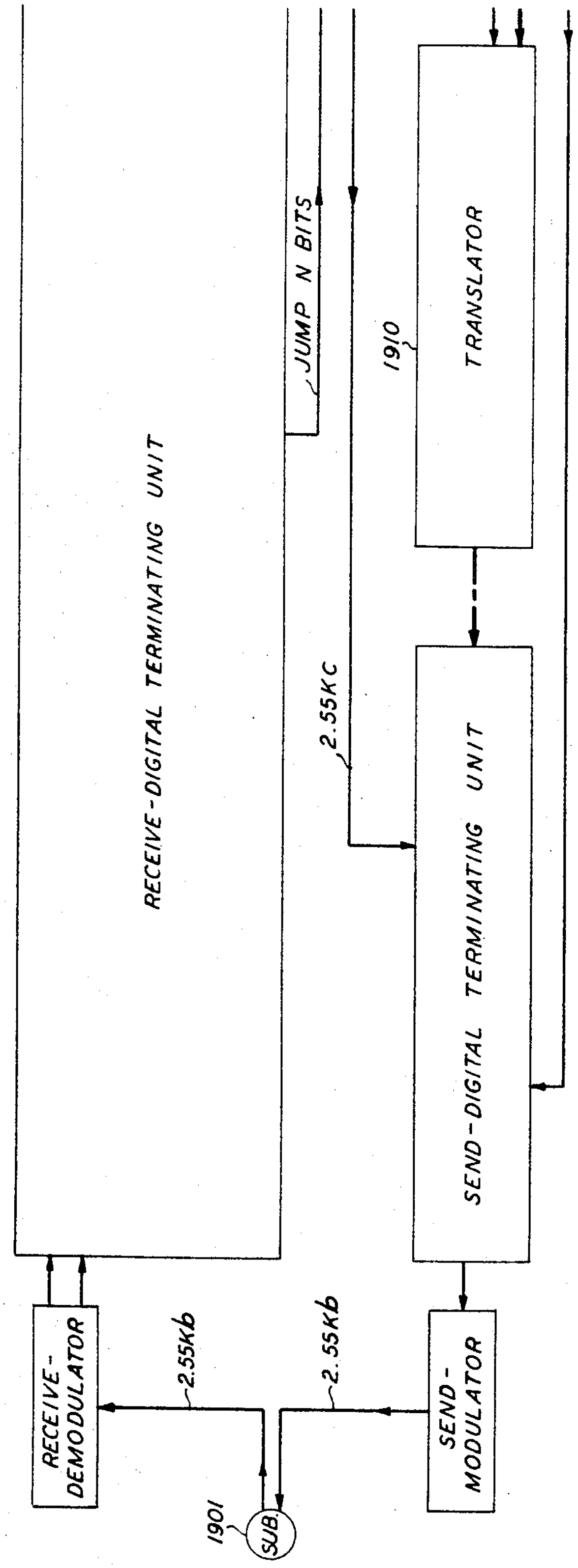
Figure 20:
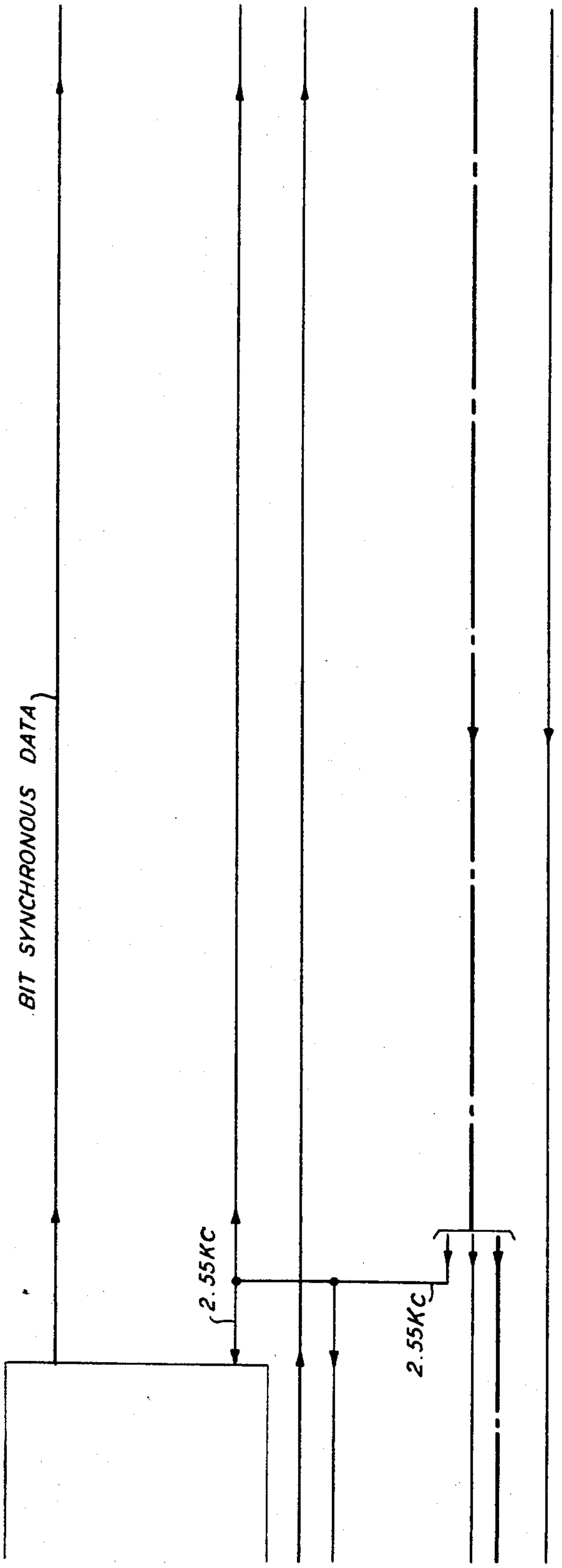
Figure 21:
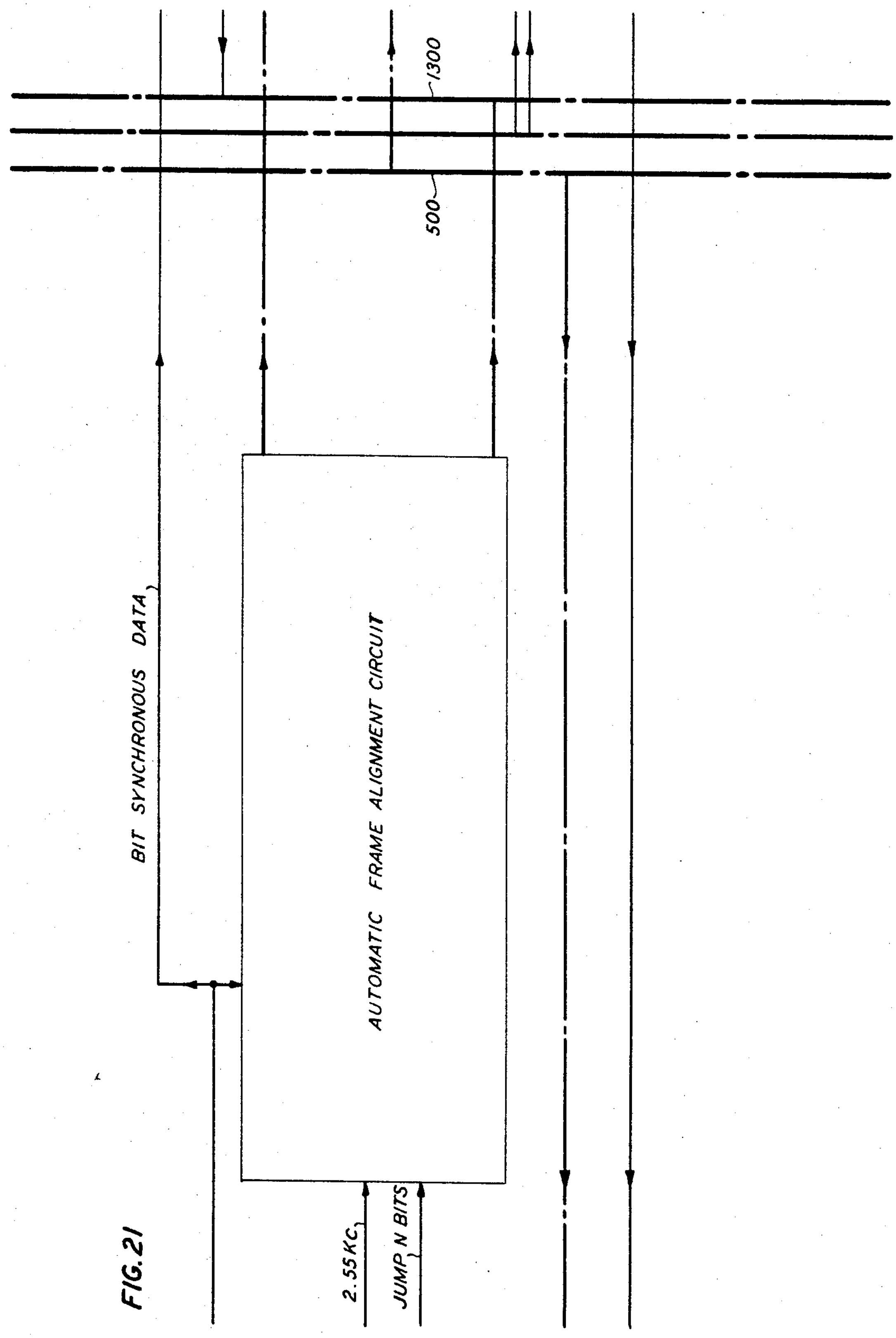

The translators 1510 and 1910 shown in FIGS. 15 and 19 of the drawings are likewise structurally and functionally the same as translator 1110. The following table lists the timing waveforms used to generate the necessary control bits at the several assumed transmission rates. For purposes of comparison, the waveforms used to generate the control bits for the outgoing 40.8 kb. bit stream are included therein.

| Control Bit | 40.8 kb. Rate | 10.2 kb. Rate | 2.55 kb. Rate. |
|---|---|---|---|
| $F_1$ | 300 c.p.s. | 75 c.p.s. | 18. 75 c.p.s. |
| | 600 c.p.s. | 150 c.p.s. | 37.50 c.p.s. |
| | 1.2 kc. | 300 c.p.s. | 75 c.p.s. |
| | 20.4 kc. | 5.10 kc. | 1.275 kc. |
| $C_E$ | 300 c.p.s. | 75 cp..s. | 18175 c.p.s. |
| | 600 c.p.s. | $\overline{150}$ c.p.s. | $\overline{37.50}$ c.p.s. |
| | 1.2 kc. | 300 c.p.s. | 75 c.p.s. |
| | 20.4 kc. | 5.10 kc. | 1.275 kc. |
| $F_0$ | $\overline{300}$ c.p.s. | $\overline{75}$ c.p.s. | $\overline{18}.\overline{75}$ c.p.s. |
| | 600 c.p.s. | 150 c.p.s. | 37.50 c.p.s. |
| | 1.2 kc. | 300 c.p.s. | 75 c.p.s. |
| | 20.4 kc. | 5.10 kc. | 1.275 kc. |
| $P_1$ | $\overline{300}$ c.p.s. | $\overline{75}$ c.p.s. | $\overline{18}.\ \overline{75}$ c.p.s. |
| | 600 c.p.s. | $\overline{150}$ c.p.s. | $\overline{37.50}$ c.p.s. |
| | 1.2 kc. | 300 c.p.s. | 75 c.p.s. |
| | 20.4 kc. | 5.10 kc. | 1.275 kc. |

As will be clear from the drawings, the Receive and Send Digital Terminating Units and the control-bit-generation Translator associated with the 40.8 kb. interoffice multiplex trunk 2301 are the same as those circuits related to subscriber line 701. The timing waveforms used in translator 2710 to generate the $F_1$, $C_E$, $F_0$ and $P_1$ Control Bits are the same as those utilized in translator 1110 and therefore the outgoing bit streams of subscriber line 701 and interoffice trunk 2301 will be frame synchronous.

To perform certain functions within the TDS (e.g., channel interchange), it is desirable to achieve subframe synchronization between all incoming multiplex trunks. This function is performed by the Automatic Frame Alignment Circuit of FIGS. 24, 25, 28 and 29, in addition to those frame alignment functions heretofore described, i.e., frame recovery and the generation of clock pulses synchronous with the supervisory bits in the incoming bit stream.

The bit synchronous data stream from the Receive-Digital Terminating Unit is delivered via bus 2401 to the input of the delay buffer 2402. The buffer 2402 comprises a 17 bit shift register, the capacity thus being equal to the number of bits per subframe in the format utilized herein. The bits are shifted in the register under the control of the 40.8 kc. waveform from the central timing unit.

The output AND gates 2411 through 2427 are connected to respective stages of the delay buffer shift register. The bit stream delivered to the delay buffer will be shifted therein at a 40.8 kc. rate and then read out of that stage whose output AND gate is enabled. Accordingly, it will be clear that the storage time in delay buffer 2402 can be altered by selection of the output AND gate to be enabled. An elastic delay is thus provided since read out from a stage more remote from the input effectively increases the storage time in the register.

Figure 26:
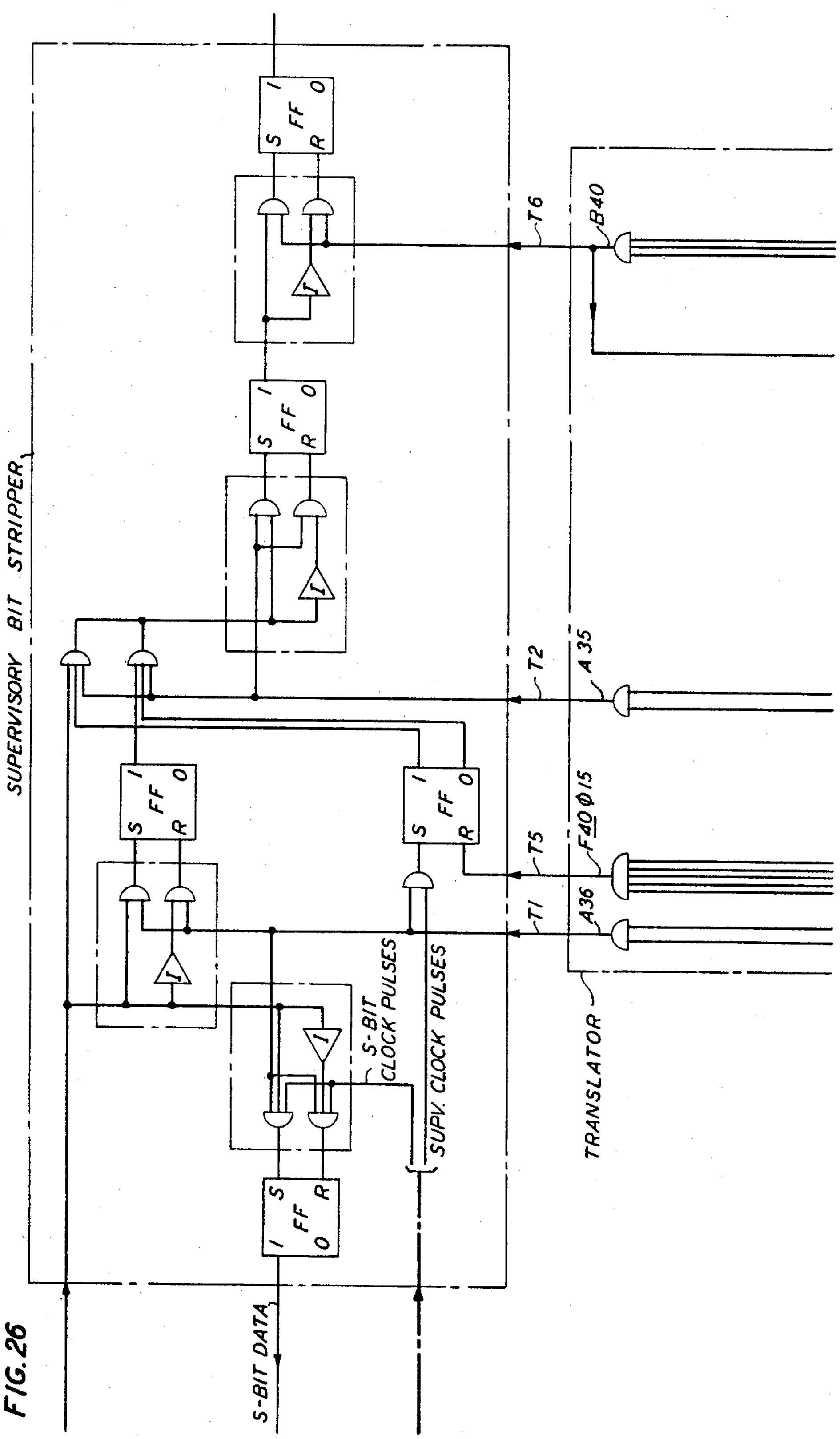

The AND gates 2411–2427 are ORed in gate 2429, and the output of the latter is delivered via AND gate 2501 to the Supervisory Bit Stripper and Rate Buffer shown in FIG. 26. For normal operation, the AND gate 2501 is continuously enabled.

The Frame Loss Detector is connected to the output lead of AND gate 2501. As the name implies, the purpose of this detector unit is to detect a loss of frame condition. This detector, like detector 902, is similar to the Frame Loss Detector disclosed in the aforementioned Coulter application.

The AND gate 2502 of the frame loss detector is connected to the output lead of AND gate 2501 and to the $F_0$ clock pulse lead of the clock pulse generator-distributor 2910. Recalling now that the $F_0$ bit of the incoming message bit stream is always a zero, the bit output of AND gate 2501 should be a zero during the $F_0$ clock pulse period, with the result that AND gate 2502 will remain de-energized. If, however, the bit output of gate 2501 is a one, indicative of possible loss of frame, the AND gate 2502 will be energized to provide an output pulse signal.

The output of gate 2501 is also connected to the inhibit input of gate 2504, the other input to the latter being derived from the $F_1$ clock pulse lead. Since the $F_1$ bit of the incoming message bit stream is always a one, the gate 2504 should normally be inhibited by the same during the $F_1$ clock pulse period. If, however, the output of gate 2501 is in fact a zero during this clock pulse period, indicative of possible loss of frame, the gate 2504 will not be inhibited and the $F_1$ clock pulse will be passed by the same. Output signals from gates 2502 and 2504 therefore indicate possible frame loss. The output signals, if any, from gates 2502 and 2504 are coupled, via OR gate 2505, to the frame loss counter 2506 to advance the count therein.

The frame loss counter 2506 is a forward-backward type counter such as that shown in detail in the Coulter patent application. The counter counts up and down in response to applied "count up" and "count down" signals. The count up signals occur only for a possible loss of frame condition, as described above; whereas a count down signal is generated, for example, for every fourth $F_1$ and $F_0$ clock pulse. This count down signal can be derived from a conventional divider circuit to which the $F_1$ and $F_0$ clock pulses are applied. The philosophy here is to prevent the initiation of a frame search operation until a true out-of-frame condition exists. Noise bursts, short term signal fade and the like often give the appearance of an out-of-frame condition, when in fact there has been no actual frame loss. Thus, a short duration noise burst lasting one or two frames, for example, will cause the frame loss counter to count up, but upon termination of the same the counter will return to a zero count in response to subsequent count down signals. However, for an actual out-of-frame condition the count up signals will be applied at a rate that exceeds the count down rate, and hence the counter will quickly count to a predetermined number (e.g., six).

When the frame loss counter 2506 reaches the preassigned count, indicative of a true out-of-frame condition, an energizing signal is delivered to the flip-flop 2508 to set the same to its "1" state. The (0) output lead of this flip-flop is thereby de-energized, and the AND gate 2501 which is connected to the (0) output lead is no longer enabled—i.e., through transmission of the digital bit stream is interrupted. Concurrently therewith, the energizing signal on the (1) output lead of this flip-flop is delivered to the reset terminal of the frame detector 2903 via the OR gate 2901 and, via OR gate 2902, to the set terminals of this frame hunt register 2800 so as to set each of the seventeen stages thereof to their "1" state. When the frame detector 2903 is reset the inhibit potential normally supplied by the same to the gates 2520 and 2522 is interrupted. The circuit now enters a frame search mode of operation.

In essence, the instant frame search operation is similar to that previously described. The $F_1$ and $F_0$ clock pulses generated in the clock pulse generator-distributor 2910 are compared with the bits of the incoming bit stream, while the driving pulses to the generator-distributor are intermittently blocked, thus allowing the phase of the generator-distributor to be retarded in a step-like fashion. With each phase retardation, another comparison is made and this continues until, at some point in time, the locally generated $F_1$ and $F_0$ clock pulses are again aligned with those framing bits of the received bit stream. In the instant case, however, the periodic clock pulses are simultaneously compared with seventeen bits of the incoming bit stream. This permits a more rapid frame recovery.

The $F_1$ clock pulses from generator-distributor 2910 are delivered via gate 2520 to the bank of seventeen gates 2441 through 2457, and the $F_0$ clock pulses are fed via gate 2522 to the seventeen AND gates 2461 through 2477. These two banks of gates serve to compare the locally generated clock pulses with seventeen bits of the incoming bit stream that are temporarily stored in the shift register 2402. Each bit comparision is substantially the same as that carried out by the gates 2502 and 2504 of the Frame Loss Detector of FIG. 25. The (1) output lead of the input stage of shift register 2402 is coupled as an inhibit input to gate 2441, and as an enabling input to AND gate 2461; the (1) output lead of the second stage is similarly coupled as an inhibit input to gate 2442, and as an enable input to AND gate 2462; and so on, for each of the seventeen stages of shift register 2402. The gates 2441 and 2461 are ORed in gate 2821, with the output of the latter fed to the reset terminal of the first stage 2801 of frame hunt register 2800; the gates 2442 and 2462 are ORed in gate 2822 and the output of the same is delivered to the reset terminal of the second stage 2822 of register 2800; and so on, as indicated in the drawings.

Considering first the comparison of the $F_0$ clock pulses with the incoming bits stored in respective stages of shift register 2402, it will be recalled that the $F_0$ framing bit of the incoming bit stream is always a binary zero. Accordingly, if any stage of shift register 2402 is set in its "1" state for the $F_0$ clock pulse period, an out-of-frame condition is known to exist between the bit temporarily stored therein and the locally generated $F_0$ clock pulse. In such a case, the (1) output lead of the stage will be energized to thereby enable the associated AND gate and thus pass the $F_0$ clock pulse signal to the reset terminal of the appropriate flip-flop of frame hunt register 2800. For a given $F_0$ clock pulse one or more of the seventeen stages of register 2800 may be reset.

The message, parity and signaling bits of successive frames of the incoming bit stream will be one or zero in some more-or-less random fashion. It is this randomness in contrast with the invariant nature of the $F_0$ bit that makes frame recovery possible. As successive $F_0$ clock pulse signals are generated the above-described comparison is repeated. If the $F_0$ frame bit is not in the 17-bit block that is stored in register 2402 during each $F_0$ clock pulse period, sooner or later all of the stages of the frame hunt register 2800 will be reset due to the aforementioned randomness of ones and zeros in successive frames. The all zero detector 2850 is an AND gate connected at its input to the (0) output leads of the seventeen stages of frame hunt register 2800 and therefore when all of the stages of the latter have been reset in the aforementioned manner an output signal will be provided by AND gate 2850. This output signal is indicative of a continuing loss of frame.

If the $F_0$ frame bit falls in the 17-bit block that is stored in register 2402 during each $F_0$ clock pulse period, all but one of the stages of register 2800 will be reset. For example, if the $F_0$ frame bit is deposited in the second stage of shift register 2402 during each $F_0$ clock pulse period, the (1) output lead of the stage will not be energized during this pulse period, the AND gate 2462 will not be enabled and hence the flip-flop 2802 of the frame hunt register will remain in its set or "1" state. All other stages of the frame hunt register will, of course, be reset as explained heretofore.

The fact that one stage of the frame hunt register 2800 remains in its "1" state signifies that framing has been recovered and the particular stage that remains set serves to identify the present location of the framing bit in the delay buffer shift register 2402.

Frame recovery could be carried out in the described manner using a single frame bit per frame. Thus, the $F_1$ bit itself is not significant, but it does speed up the reframing process since it increases the rate of information on which a reframing decision is based. Now, as will be recalled, the $F_1$ framing bit in the incoming bit stream is always a binary one. Accordingly, if any stage of shift register 2402 is set to its "0" state for the $F_1$ clock pulse period, an out-of-frame condition exists between the incoming bit temporarily stored therein and the locally generated $F_1$ clock pulse. In such a case, the (1) output lead of the stage will not be energized, an inhibit signal will not be applied to the associated gate (2441–2457) and the locally generated $F_1$ clock pulse will be passed by the latter to the reset terminal of the flip-flop of frame hunt register 2800. For a given $F_1$ clock pulse one or more of the seventeen stages of the register 2800 may be reset.

If the $F_1$ frame bit is not in the 17-bit block that is stored in register 2402 during each $F_1$ clock pulse period, sooner or later all of the stages of the frame hunt register 2800 will be reset due to the aforementioned randomness; whereas, if the $F_1$ frame bit falls in the 17-bit block, all but one of the stages of register 2800 will be reset. For example, if the $F_1$ frame bit is in the second stage of shift register 2402 during each $F_1$ clock pulse period, the (1) output lead of the stage will be energized during this pulse period, the gate 2442 will be inhibited and hence the flip-flop 2802 of the frame hunt register will remain in its "1" state. All the other stages will, however, be reset.

The $F_1$ and $F_0$ frame bits are separated by exactly half a frame, as are the 17-bit blocks temporarily stored in the register 2402 during the $F_1$ and $F_0$ clock pulse periods. The $F_1$ and $F_0$ clock pulses generated by the generator-distributor 2910 are, of course, separated in time by exactly the same period as the $F_1$ and $F_0$ bits of the incoming bit stream. It will be clear, therefore, that if the $F_1$ frame bit is stored in a given stage of the shift register 2402 when the $F_1$ clock pulse occurs, the $F_0$ frame bit will appear in the very same storage stage a half frame later when the $F_0$ clock pulse is generated. The above-described comparisons of the bit stream with the $F_0$ and $F_1$ clock pulses take place concurrently, only staggered by half a frame, and both comparisons serve to reset all but a given one of the flip-flops of frame hunt register 2800.

The $F_1$ and $F_0$ clock pulses from generator-distributor 2910 are delivered to the input of the Frame Detector 2903 via the gates 2904 and 2906. A counter in the Frame Detector attempts to count to a predetermined number in response to the applied $F_1$ and $F_0$ clock pulse signals. However, if an out-of-frame condition exists, intermittently generated search reset signals derived from the frame hunt register 2800 will continuously reset the counter, thereby preventing it from reaching the predetermined count. When the proper local clock pulse phase is eventually arrived at, no further search reset signals will be generated and the counter of the Frame Detector then counts to the chosen number, this being indicative of a continuing in-frame condition. The Frame Detector then terminates the frame search mode of operation, in the manner to be described, and normal service is again resumed. This Frame Detector can be similar to the Frame Detector disclosed in the aforementioned Coulter application.

As the Frame Detector 2903 counts in response to the applied $F_1$ and $F_0$ clock pulses, the aforementioned comparisons of the $F_1$ and $F_0$ clock pulses with the incoming bit stream are carried out. If the frame bits are not in the 17-bit blocks that are stored in register 2402 during the $F_1$ and $F_0$ clock pulse periods (i.e., if an out-of-frame condition exists), all of the stages of the frame hunt register 2800 will, after a period, be reset to their "0" state. When all of said stages are reset, the all zero detector 2850 delivers a reset signal to the Frame Detector 2903 via the OR gate 2901, to initiate a new count therein. The predetermined number (e.g., sixteen) to which the counter of the Frame Detector counts should be such that there is a high degree of confidence or probability that all of the stages of the frame hunt register 2800 are certain to be reset prior to this count being reached, assuming, of course, an out-of-frame condition.

The all zero detector output signal is also fed to the inhibit input of gate 2906 so as to inhibit the input clock counting pulses $F_1$ and $F_0$ while the Frame Detector is being recycled or reset. The "0" detector signal is further fed to the inhibit logic 2909 causing the same to inhibit for one count the 2.4 kc. timing pulses that are normally delivered to the counter of the clock pulse generator-distributor 2910. This inhibit circuit can be similar to that described in the Coulter application.

As will be recalled, the eight supervisory bits are at subframe intervals and for a 40.8 kb. bit stream they occur at a 2.4 kb. rate. Accordingly, it should be clear that when one of the 2.4 kc. timing pulses is inhibited in circuit 2909 the phase of the counter of generator-distributor 2910 is retarded the equivalent of a subframe. This, of course, "skews" or phase retards the locally generated clock pulses 17-bit positions with respect to the incoming bit stream. The new local clock pulses $F_1$ and $F_0$ are thus compared with the next succeeding, half frame removed, 17-bit blocks of the incoming message bit stream.

After a delay D, sufficient to insure satisfactory execution of each of the foregoing functions initiated by the all zero detect signal, the latter is coupled via OR gate 2902 to the set terminals of the frame hunt register 2800 to set each of the stages thereof to the "1" state. The described frame search function is then once again repeated.

Sooner or later the frame bits will fall within the 17-bit blocks that are stored in register 2402 during the $F_1$ and $F_0$ clock pulse periods. One of the stages of the frame hunt register 2800 will, therefore, remain in its set state. The counter of the Frame Detector 2903 is thereby permitted to count to the predetermined number which is indicative of an in-frame condition. The Frame Detector then terminates the frame search operation by delivering an inhibit signal to the gates 2520 and 2522 and a reset signal to flip-flop 2508 to set the same to its "0" state. The inhibit input to gates 2520 and 2522 is continued until the Frame Detector is once again reset by a signal from the flip-flop 2508 of the Frame Loss Detector, this being indicative of a new out-of-frame condition.

The particular stage of register 2800 that remains in its "1" state serves to identify the location of the framing bits in the shift register 2402 during each clock pulse period and it further effects the aforementioned elastic delay provided by the delay buffer shift register. To this end, the (1) output leads of the flip-flop stages 2801 through 2817 of the frame hunt register are respectively connected to the AND gates 2411 through 2427. These AND gates are also respectively connected to the (1) output leads of the seventeen stages of shift register 2402. It will be clear, therefore, that one and only one of the AND gates 2411–2427 will be enabled when framing is recovered. And the particular gate enabled will be the one connected to that stage of the register 2402 which stores the framing bits during the $F_1$ and $F_0$ cock pulse periods. For example, if the frame bits are in the second stage of shift register 2402 during each clock pulse period, the flip-flop 2802 of the frame hunt register will remain in its "1" state. All other flip-flop stages will be reset as heretofore described. Thus, of the AND gates 2411–2427 only gate 2412 will be enabled. The framing bit and all other subsequent bits of the incoming bit stream are, therefore, read out of the second stage of the shift register 2402.

If the frame bits are in any other stage of the shift register 2402 during each clock pulse period, the read out will, of course, be from that stage. In this fashion, a delay of up to a subframe (i.e., 17 bits) may be achieved since read out from any stage more remote from the input increasees the storage time in the shift register 2402.

The AND gate 2501 is enabled when the flip-flop 2508 is reset by the signal from the Frame Detector 2903, and hence the bit stream read out from the delay buffer shift register 2402 is once again delivered to the Supervisory Bit Stripper and Rate Buffer of FIG. 26. Normal operation is thus resumed.

The eight local clock pulses are generated in generator-distributor 2910 under the control of a 2.4 kc. timing waveform and they therefore occur at subframe intervals. The local clock pulses generated for use with other 40.8 kb. multiplex trunks are developed in a similar manner unde rthe control of the same 2.4 kc. timing waveform and therefore they likewise occur at subframe intervals. Accordingly, all of the clock pulse groups that are generated for use with respective 40.8 kb. multiplex trunks are, at least, in subframe synchronization. The $F_1$ and $F_0$ frame bits in respective incoming multiplex bit streams are brought into alignment with the locally generated $F_1$ and $F_0$ clock pulses in the manner described above, and hence it follows that all 40.8 kb. incoming multiplex bit streams will be brought into subframe synchronization.

The subframe clock pulse generator-distributor 2910 comprises a three stage counter 2911 with a conventional AND gate translator output. As the count proceeds in the counter the eight clock pulse output leads of the translator 2912 are energized successively and cyclically. Now since the count is advanced in the counter at a 2.4 kc. rate, each output lead of the translator will be energized for a full subframe period. The local clock pulses, however, should be of the same duration as the bits of the associated incoming bit stream. To this end, the technique used in Translator 1110 to derive control bits of proper duration is made use of herein.

The 2.4 kc. pulse signals that advance the count in counter 2911 are also used to set the flip-flop 2913 to its "1" state. With a count of one in counter 2911 and the flip-flop 2913 set to its "1" state, the AND gate 2914 will be enabled and thereby energize the output lead designated $F_1$.

The 20.4 kc. timing waveform is delivered to the differentiator 2915 so as to derive short duration output pulses coincident in time with the trailing edges of the 20.4 kc. pulse train. The output of the differentiator 2915 is coupled to the reset terminal of the flip-flop 2913. Accordingly, the flip-flop 2913 will be reset shortly after having been set to its "1" state. This reset of flip-flop 2913 disables the AND gate 2914 to terminate the energized output signal on the $F_1$ lead. Since one-half cycle of the 20.4 kc. waveform is equivalent to the duration of one bit period at the 40.8 kb. rate the $F_1$ clock pulse is now at the proper duration.

The (1) output lead of flip-flop 2913 is connected to each of the AND gates of Translator 2912 and therefore each of the generated clock pulses will be of proper duration.

Figure 23:
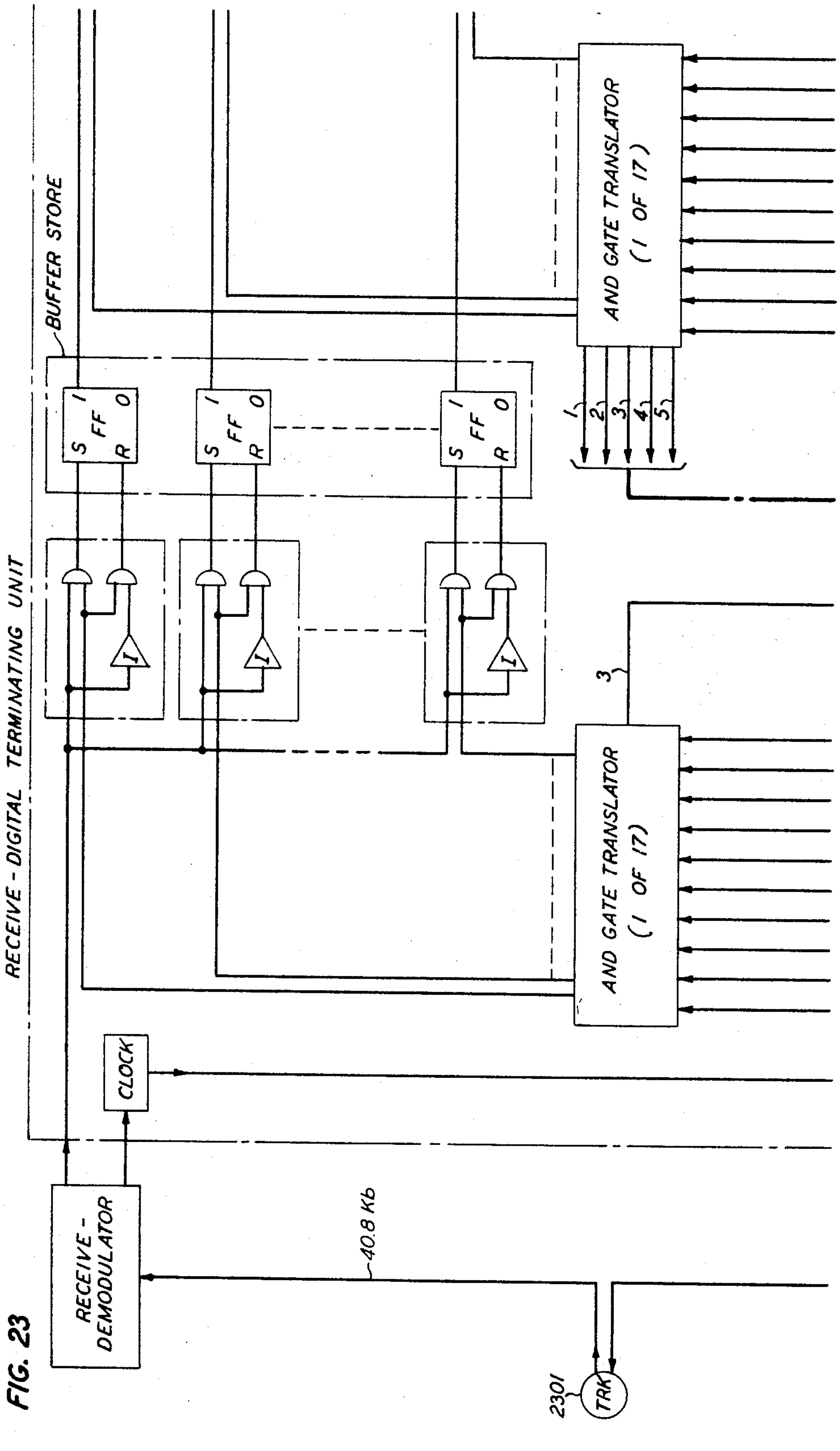
Figure 24:
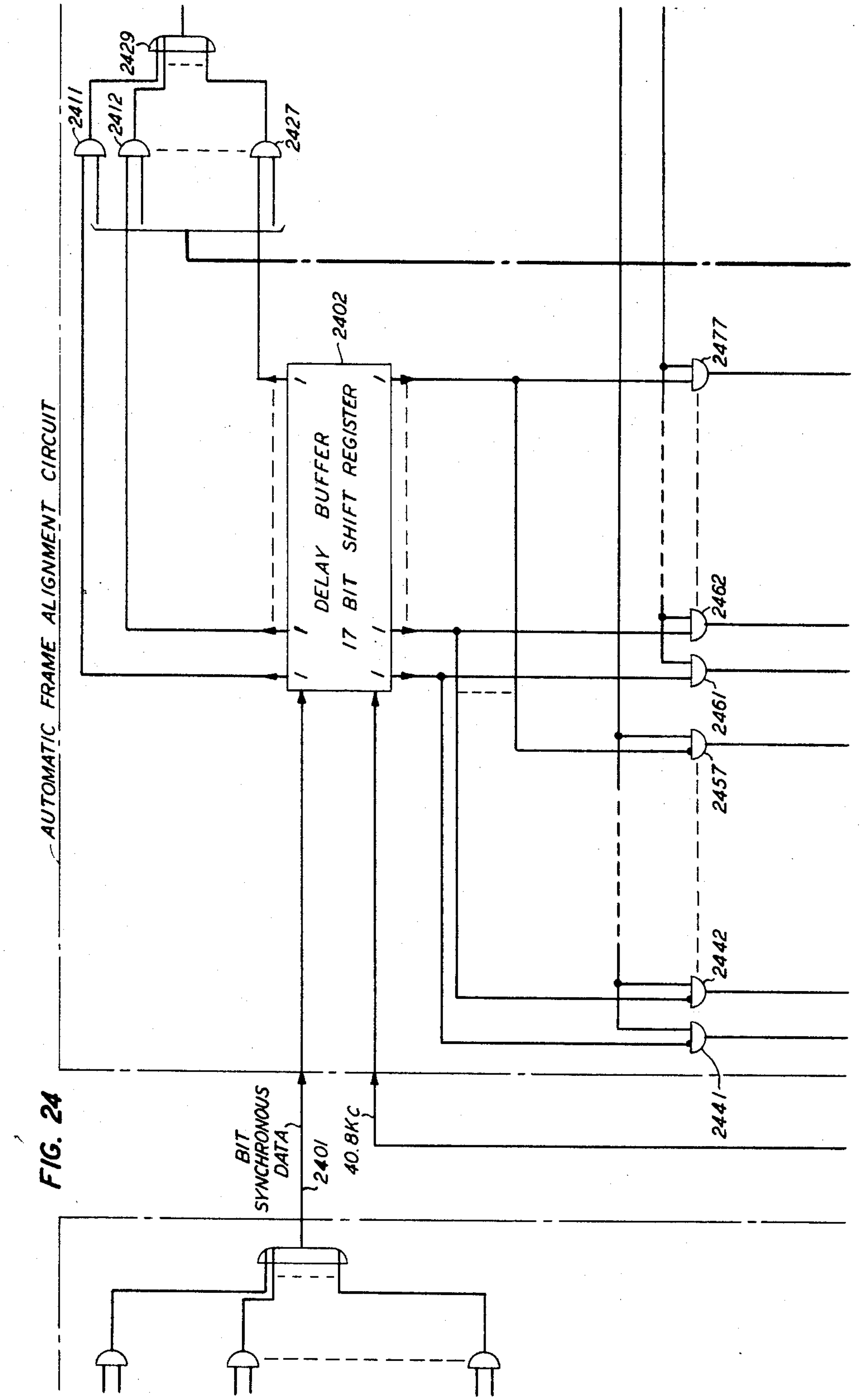
Figure 25:
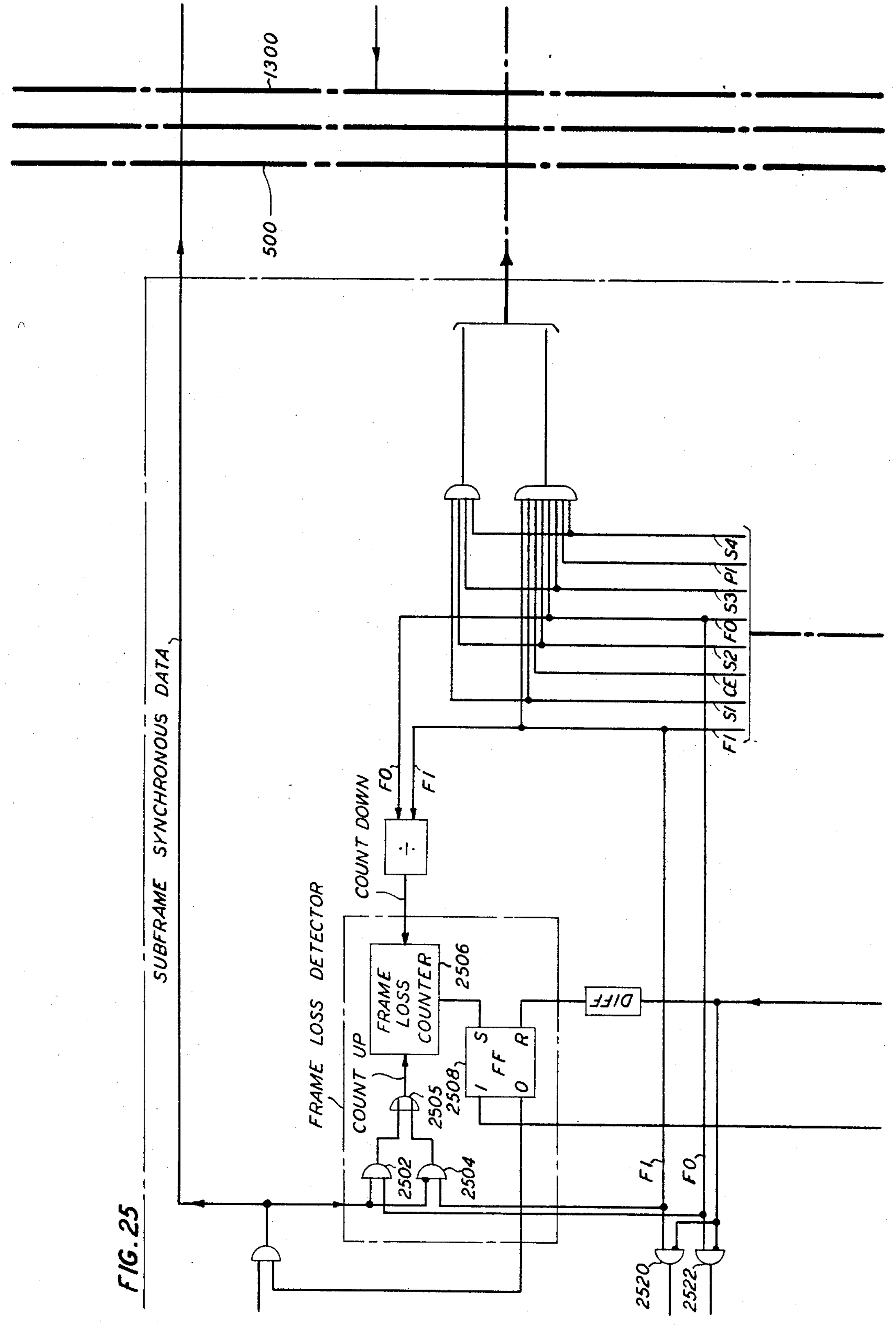
Figure 27:
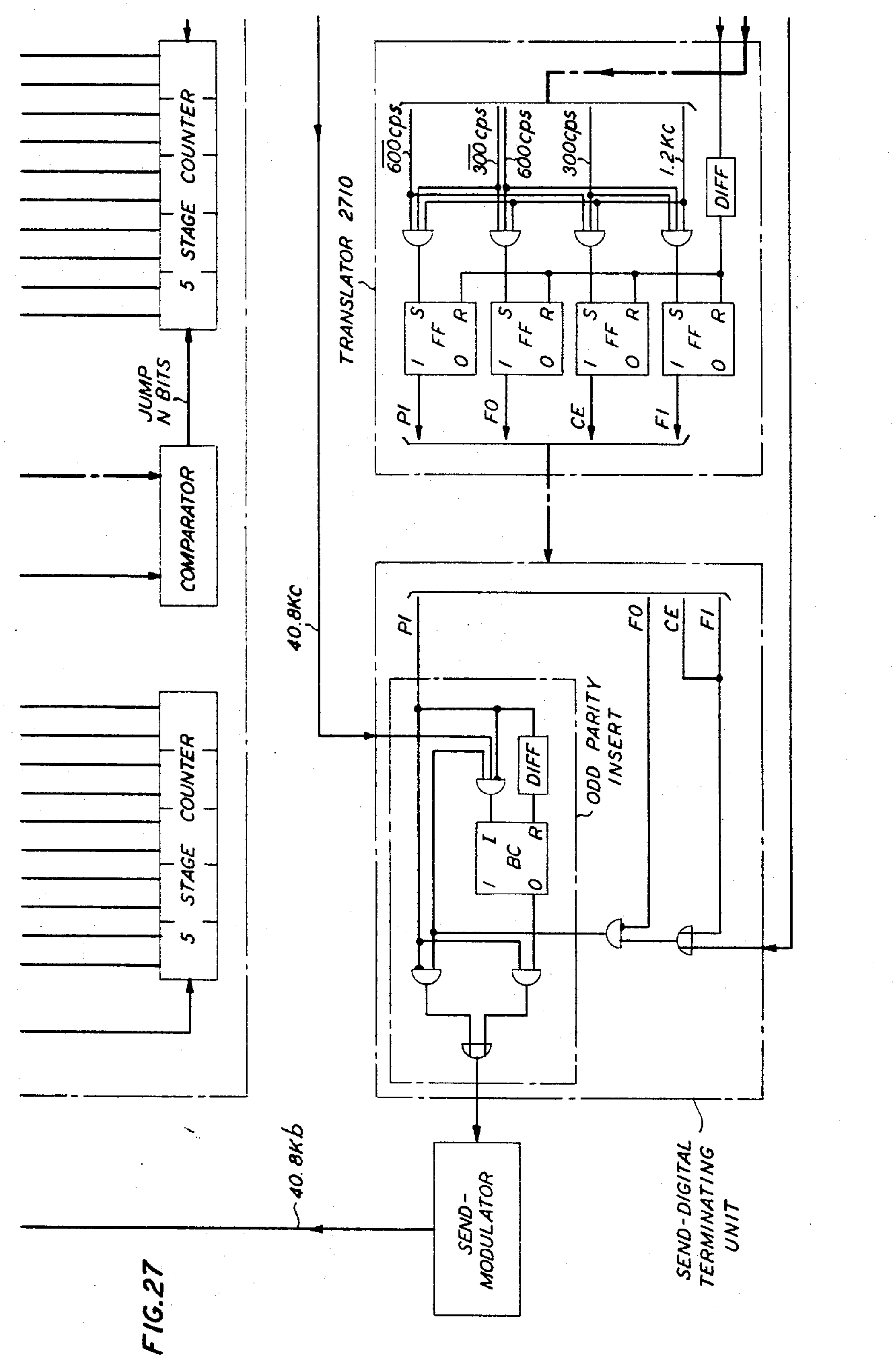
Figure 28:
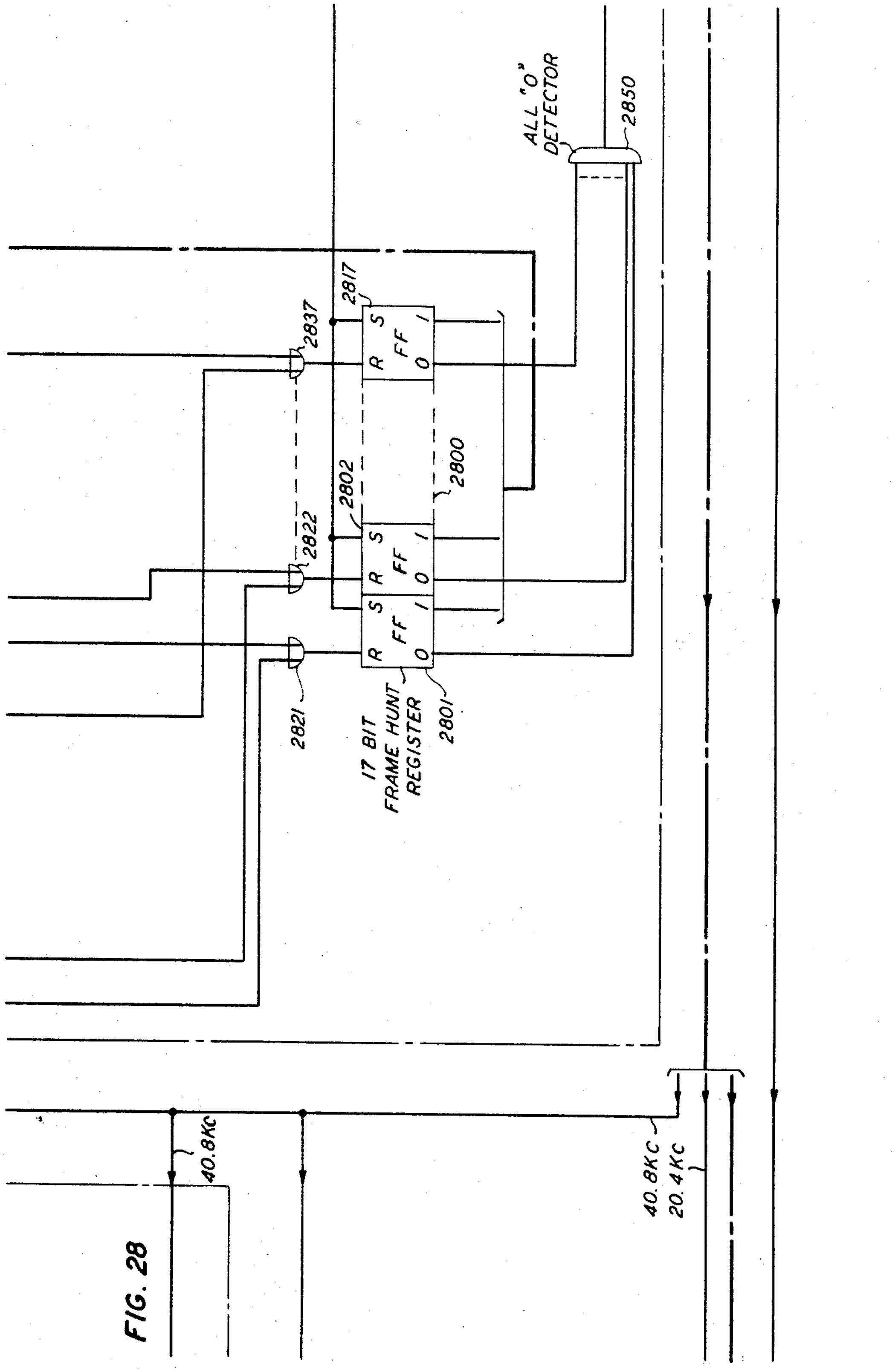
Figure 29:
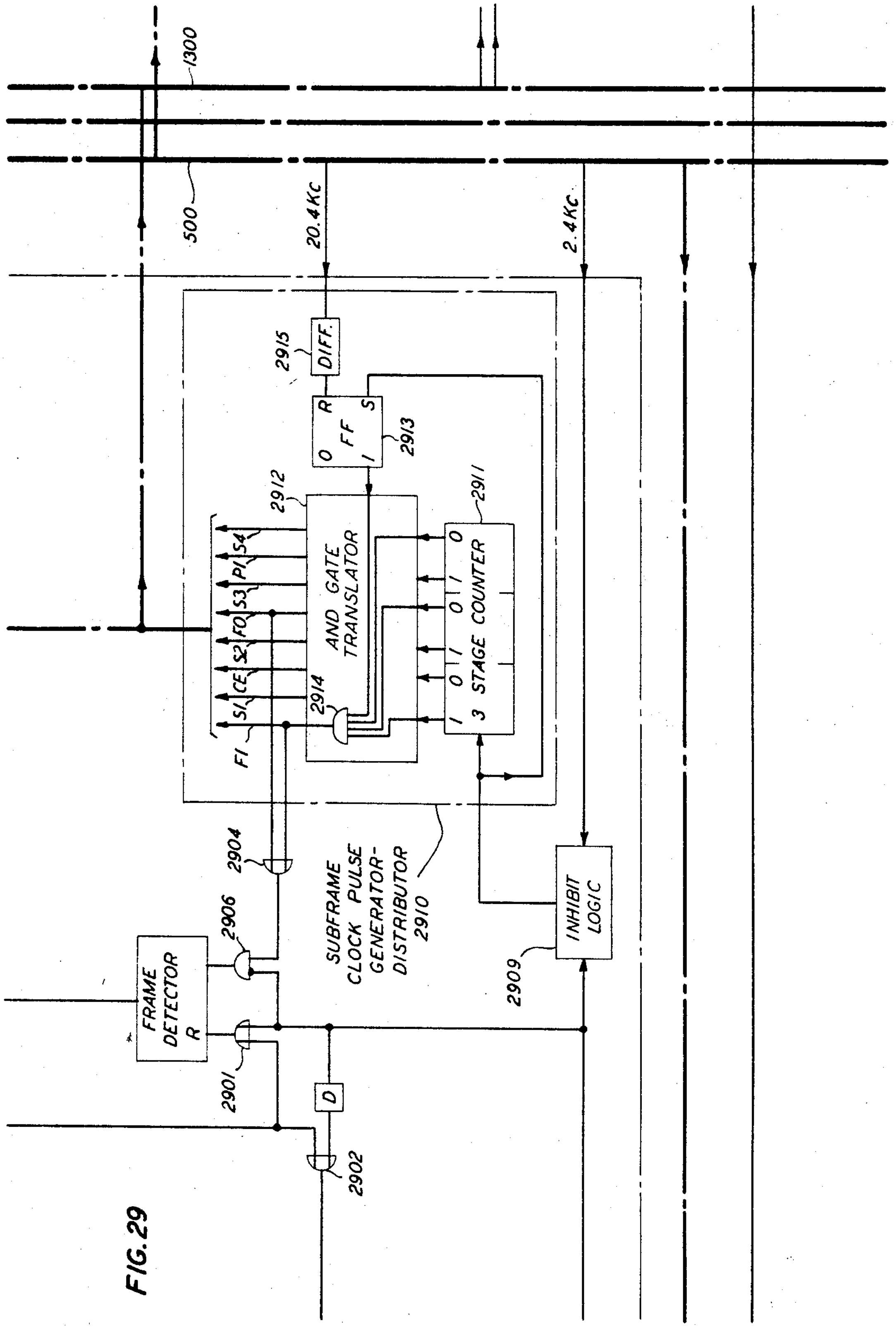

In the Frame Alignment Circuit of FIGS. 24, 25, 28 and 29, the $F_1$ and $F_0$ clock pulses are successively compared with 17-bit blocks of the incoming bit stream. This permits a frame recovery that is orders of magnitude more rapid than that of the Frame Alignment Circuit of FIGS. 9 and 13. For this reason, it is not necessary to couple thereto the "jump N Bits" signal that may be generated in the Digital Terminating Unit of FIGS. 23 and 27. Even should a "jump N Bits" signal occur, framing is recovered quite rapidly with only a negligible loss of information.

The Receive and Send Digital Terminating Units and the control-bit-generation Translator associated with the 10.2 kb. interoffice trunk 3101 are the same as those circuits heretofore described. The timing waveforms used in translator 3110 to generate the $F_1$, $C_E$, $F_0$ and $P_1$ Control Bits are the same as those utilized in translator 1510 and therefore the outging bit streams of subscriber line 1501 and interoffice trunk 3101 will be frame synchronous.

If he interoffice trunk 3101 is intended to carry multiplex messages (e.g., four 2.4 kb. message bit streams, or sixteen 600 c.p.s. message bit streams), the associated Automatic Frame Alignment Circuit will be similar to that shown in FIGS. 24, 25, 28 and 29 of the drawings. Whereas, if the interoffice trunk 3101 is intended for simplex (i.e., a single message at a time) message use, the Frame Alignment Circuit can be of a simpler variety such as that shown in FIGS. 9 and 13.

The Receive and Send Digital Terminating Units and the control-bit-generation Translator associated with the 2.55 kb. interoffice trunk 3501 are here again similar to those circuits heretofore described. The timing waveforms used in translator 3510 to generate the $F_1$, $C_E$, $F_0$ and $P_1$ Control Bits are the same as those utilized in translator 1910 and therefore the outgoing bit streams of subscriber line 1901 and interoffice trunk 3501 will be frame synchronous.

Figure 9:
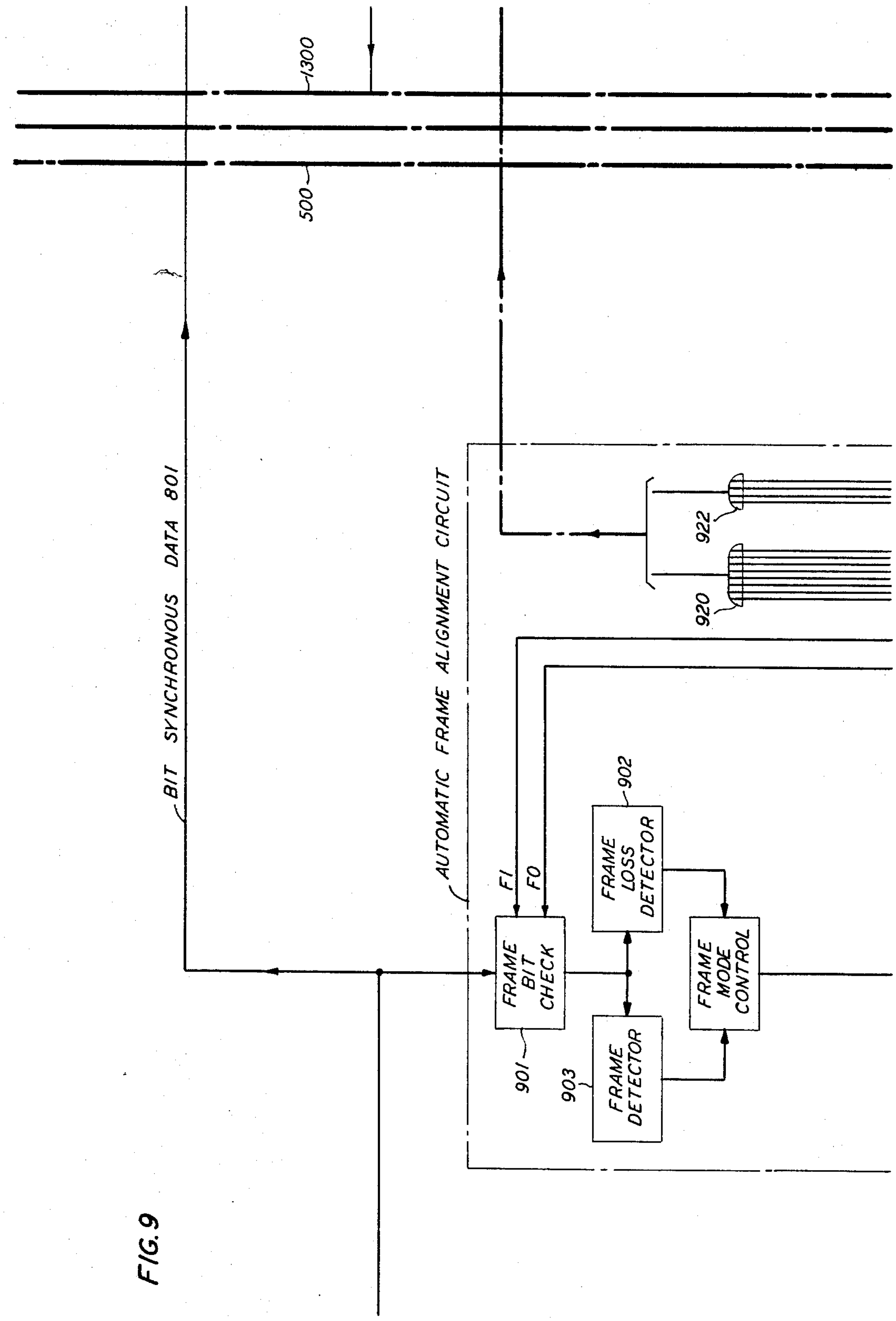
Figure 13:
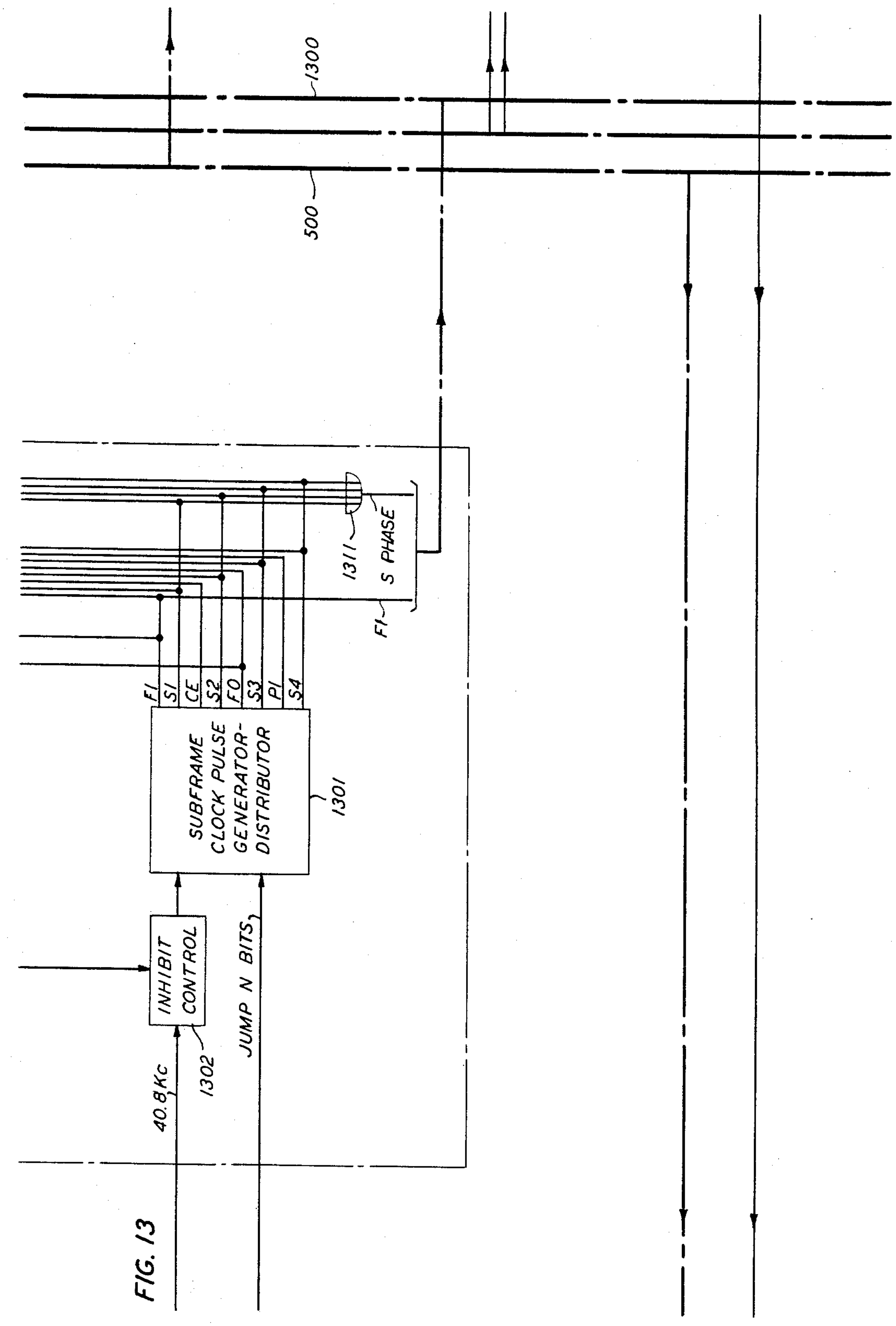

If the interoffice trunk 3501 were intended to carry multiplex messages, the associated Automatic Frame Alignment Circuit would be similar to that of FIGS. 24, 25, 28 and 29; whereas if this interoffice trunk is intended for simplex message use, the Frame Aligner can be of the type shown in FIGS. 9 and 13. While the multiplexing of messages over a 2.55 kb. trunk is not improbable, simplex transmission over the same is much more likely. Accordingly, the latter will be assumed herein.

*Terminal circuitry—Supervisory bit stripper and bit insertion circuits*

Figure 10:
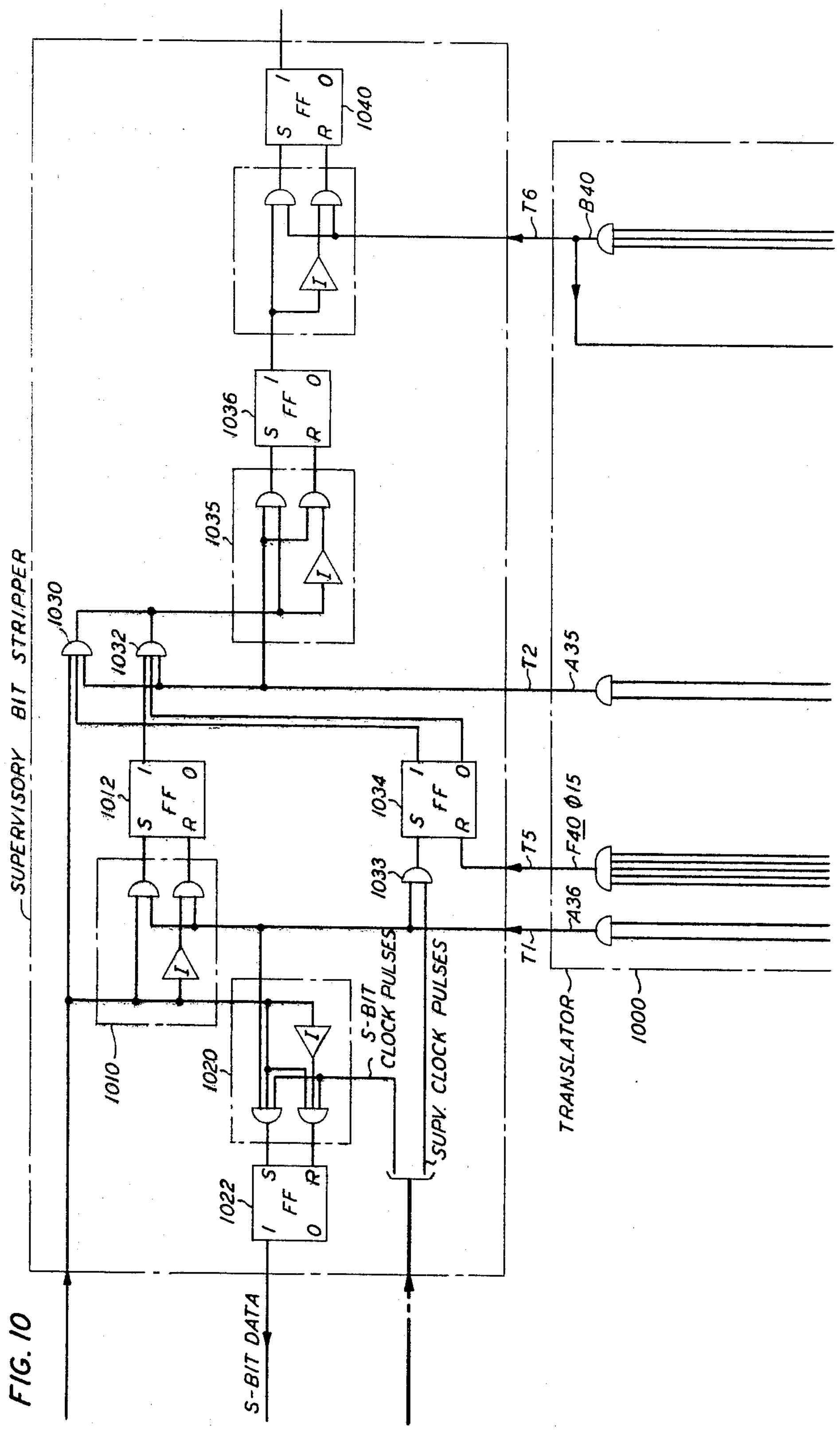

The Supervisory Bit Stripper shown in FIG. 10 of the drawings accepts the bit synchronous data stream from the Receive-Digital Terminating Unit of FIGS. 7, 8, 11 and 12; it separates the supervisory signal and control bits from the message bits; it stretches the message bits into a uniformly spaced message bit stream; and it buffers (i.e., flip-flop stores) both the message bits preparatory to their being switched through the TDS switching matrix and the supervisory signal bits preparatory to their delivery to the Signal Assembler/Distributor.

Figure 14:
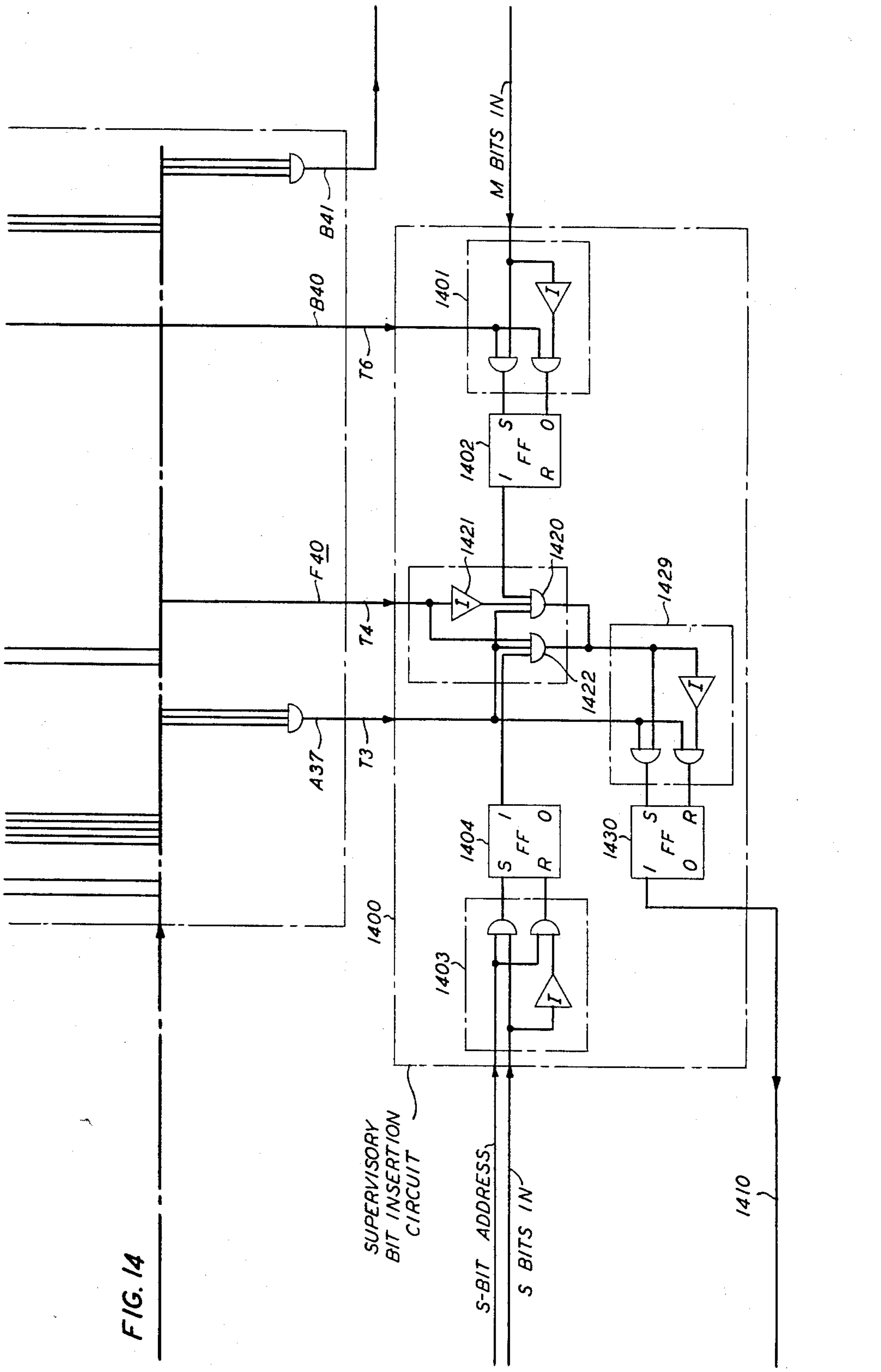

For return messages, the Supervisory Bit Insertion Circuit of FIG. 14 receives message bits (M-bits) from the switching matrix and supervisory signal bits (S-bits) from the Signal Assembler/Distributor; it provides for the insertion of the S-bits into the message bit stream; and then delivers the combined M-bit and S-bit stream to the Send-Digital Terminating Unit of FIG. 11 via lead 1410.

Figure 137A:
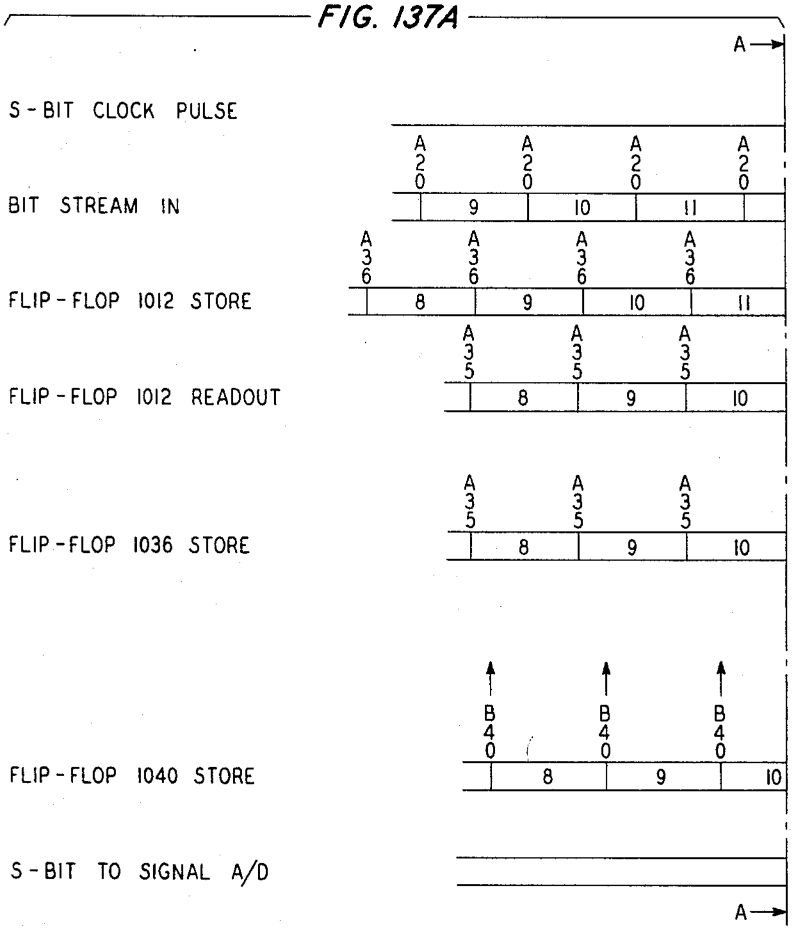
Figure 137B:
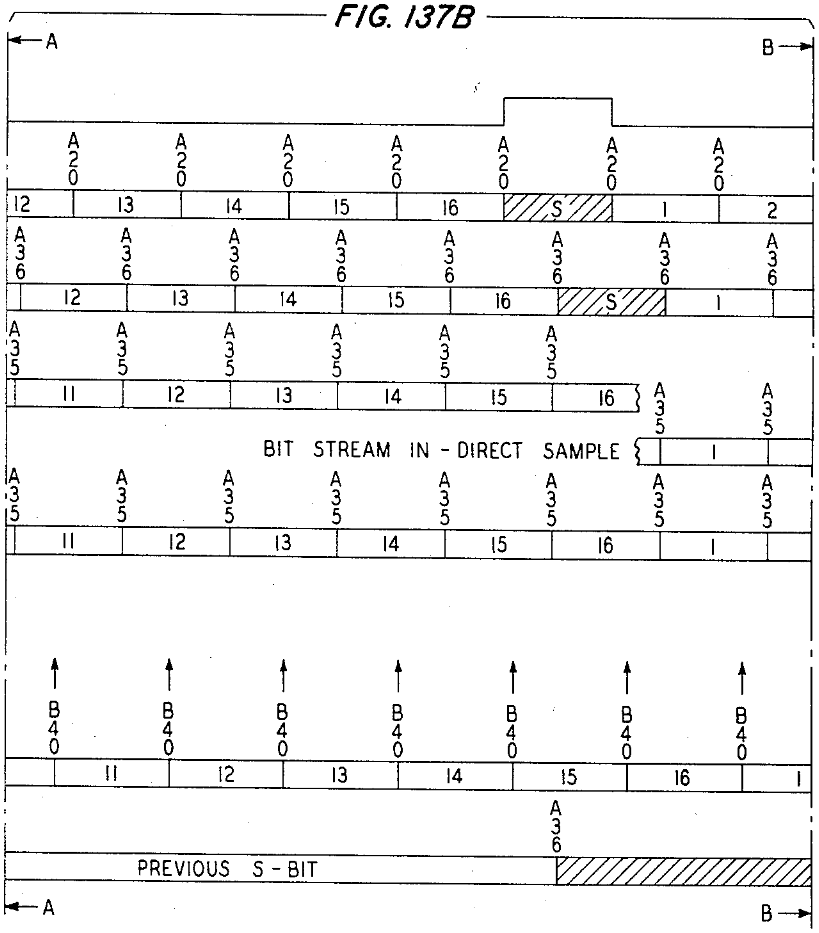
Figure 137C:
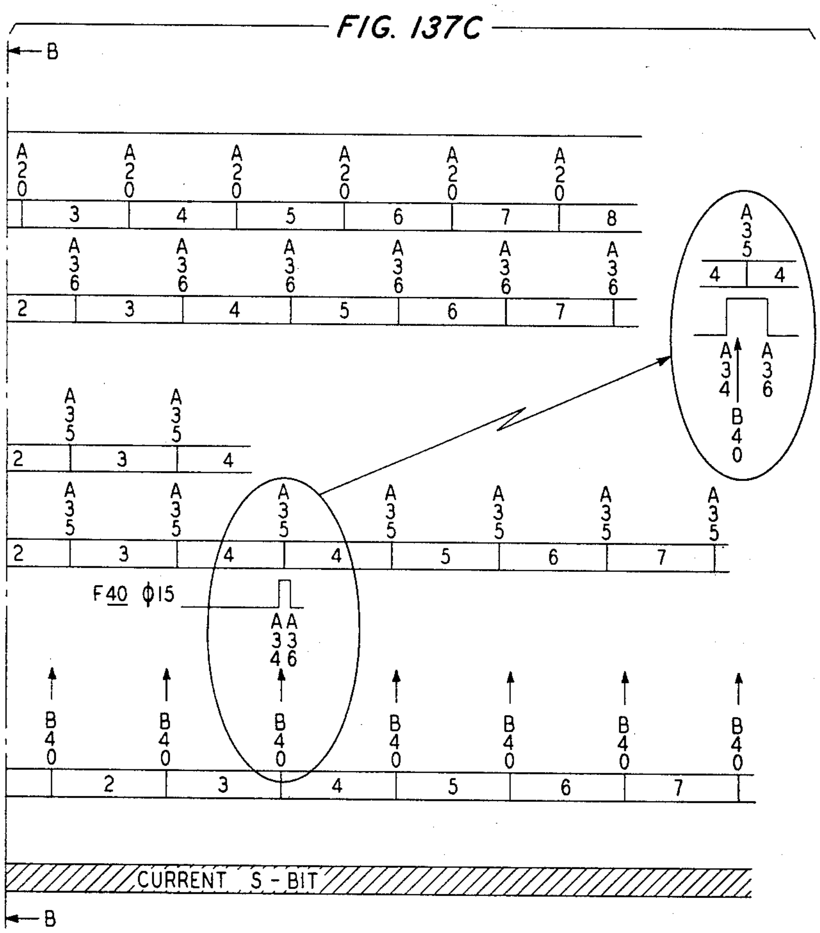

A more complete understanding of the Supervisory Bit Stripper of FIG. 10 can be had when the same is considered in conjunction with the timing waveforms of FIG. 135 and the bit waveforms of FIG. 137. The bit synchronous digital bit stream from the Receive-Digital Terminating unit is illustrated in FIG. 137 by the "full-bauded" waveform designated "Bit Stream In." An arbitrarily assumed segment of this digital bit stream is shown for purposes of explanation. The bit stream is applied to the single-to-double rail logic circuits 1010 and 1020 which are associated with flip-flops 1012 and 1022, respectively. As explained in detail hereinbefore, double rail gate logic accomplishes destructive read in, i.e., a binary one in the bit stream will set the flip-flop to its "1" state, while a binary zero will set the flip-flop to its "0" state. And for successive binary digits that are similar, the state of the flip-flop is unchanged.

As indicated hereinbefore, the 40.8 kb. bit stream of subscriber line 701 is read out of buffer store 706 under the control of the 40.8 kc. timing waveform from the central timing unit. For proper operation of the Supervisory Bit Stripper, however, this read out should correspond to the trailing edge rather than leading edge of the 40.8 kc. timing signal. As will be clear to those in the art, whether the read out counter 1154 counts in response to the leading edge or trailing edge of the input waveform is simply a matter of design involving nothing more than minor counter circuit alteration. Now as will be evident from FIG. 135, the trailing edges of the 40.8 kc. timing waveform are coincident with the A20 pulses of the 1.3056 mc. waveform. In accordance therewith, the bit interfaces of the "Bit Stream In" waveform of FIG. 137 are designated A20.

The S-bit clock pulses that are generated by the clock plus generator-distributor 1301 are delivered via OR gate 920 to the double rail gate circuit 1020. As indicated in FIG. 137, and as explained heretofore, these clock pulses are aligned or in synchonism with the S-bits of the received bit stream. Thus the S-bits of the bit stream and the S-bit clock pulses are applied simultaneously to the inputs of the AND gates of the double rail gate circuit 1020. The A36 pulses of the aforementioned 1.3056 mc. waveform are derived in translator 1090, in a manner to be described in detail hereinafter, and they are applied as enabling signals to the double rail gate circuit 1020. In this manner the S-bits, and only the S-bits, of the incoming bit stream are read into the flip-flop 1022. The A36 pulses of the 1.3056 mc. waveform appear approximately intermediate the A20 pulses and hence mid-bit sampling is provided. This offers less chance for error. Once stored in flop-flop 1022, the S-bits will be sampled into the Signal Assembler/Distributor by a scanner in the Assembler which operates at a scan rate in synchronism with the terminal circuit flip-flop sampling rate.

The A36 timing pulses are also applied as enabling signals to the AND gates of the double rail gate circuit 1010 to thereby successively sample the incoming bit stream and deposit the same, a bit at a time, in the flip-flop 1012. Here again, the A36 timing pulses lie substantially intermediate the A20 timing pulses and hence the bit stream stored, a bit at a time, in flip-flop 1012 will be similar to the "Bit Stream In," but approximately a half bit period delayed, as shown by the waveform of FIG. 137 designated "Flip-Flop 1012 Store."

The steering gates 1030 and 1032 and the steering flip-flop 1034 serve to eliminate the supervisory signal and control bits from the message bit stream that is deposited, a bit at a time, in flip-flop 1036. The flip-flop 1034 is normally in its "0" state and therefore an energizing signal is normally delivered over the (0) output lead thereof to the AND gate 1032. The latter gate is also connected at its input to the (1) output lead of flip-flop 1012, and it is periodically enabled by the short duration A35 timing pulses of the 1.3056 mc. waveform. Accordingly, the incoming digital bits that are successively stored in flip-flop 1012 are normally read out therefrom through gate 1032 and then delivered to flip-flop 1036 via the double rail gate logic circuit 1035. The A35 read out timing pulses immediately precede the A36 pulses that enable the read in to flip-flop 1012 and therefore read out occurs just prior (by one cycle of the 1.3056 mc. waveform) to the next read in. This is indicated by the FIG. 137 waveform designated "Flip-Flop 1012 Read Out." Comparing this waveform with the one immediately above it, it will be apparent that a delay of nearly a full bit period is experienced by a bit being read into and out of flip-flop 1012.

The eight supervisory signal and control clock pulses developed by the clock pulse generator-distributor 1301 are delivered via OR gate 922 to the AND gate 1033, which is periodically enabled by the A36 timing pulses. Accordingly, as an S-bit or control bit of the "Bit Stream In" is read into flip-flop 1012 by an A36 enabling signal, the flip-flop 1034 is set to its "1" state.

With flip-flop 1034 in its "1" state, the (1) output lead connected to gate 1030 is energized and the (0) output lead connected to gate 1032 is de-energized. Accordingly, when the next succeeding A35 timing signal occurs the gate 1030 is enabled, the gate 1032 is disabled, and the "Bit Stream In" is then read directly into flip-flop 1036 via AND gate 1030 and the double rail logic circuit 1035. Turning to the FIG. 137 waveforms, this direct sampling of the "Bit Stream In" waveform is symbolically illustrated by the bit waveform designated "Bit Stream In-Direct Sample."

The flip-flop 1036 receives a bit sample every A35 timing pulse. As indicated by the waveforms of FIG. 137, these bit samples are first derived from the flip-flop 1012 and then when a supervisory bit appears in the bit stream the bit samples are taken directly from the incoming data bit stream, with the result that the supervisory bit then temporarily stored in flip-flop 1012 is skipped over by the described action of the steering gates 1030 and 1032. The bit stream stored in flip-flop 1036 is illustrated in FIG. 137 by the bit waveform labeled "Flip-Flop 1036 Store," this being simply a combination of the two partial waveforms appearing immediately thereabove.

The A35 sampling pulses repeat at a 40.8 kc. rate and therefore even though the supervisory signal and control bits have been effectively removed from the bit stream, bits are still sampled and stored in flip-flop 1036 at the 40.8 kc. rate. Some message bit redundancy, therefore, expectedly occurs. By way of example, in FIG. 137 the number 4 bit of the "Flip-Flop 1036 Store" waveform is shown repeated. However, as will be clear hereinafter, any of the message bits may in fact be the bit repeated, this depending on the phasing between the office timing cycle and the incoming bit stream.

An office timing cycle is illustrated in FIG. 135 of the drawings. This cycle, extending from an $F\underline{40}$ pulse to the next $F\underline{40}$ pulse, is of 416⅔ μsec. duration, which is equal to a 2.4 kc. period or one complete subframe at the 40.8 kb. rate. However, while the 40.8 kc. timing waveform and the 40.8 kb. bit stream are in synchronism inasmuch as the read out of the latter from buffer store 706 is under the control of the 40.8 kc. timing waveform, no given set phase relationship is established between the office timing cycle and subframes of the incoming bit stream. Accordingly, the $F\underline{40}$ phase 15 pulse which occurs once per office cycle. as shown in FIG. 135, likewise has no given set phase relationship to the incoming bit stream. The timing of this $F\underline{40}$ $\varphi$15 pulse with respect to the "Bit Stream In" determines which of the message bits is repeated in the bit stream stored in flip-flop 1036. However, as will later be evident, this bit repetition is really inconsequential since the same is dropped or eliminated from the message bit stream output of the Supervisory Bit Stripper Circuit.

The $F\underline{40}$ $\varphi$15 pulse derives its name from the fact that it corresponds in time with the fifteen phase of the $B\underline{40}$ waveform, i.e., with the fifteen $B\underline{40}$ pulse in each office cycle. As will be clear hereinafter, the $B\underline{40}$ pulses define the data bit transfer interval in the switching matrix for incoming 40.8 kb. bit streams.

The $F\underline{40}$ $\varphi$15 signal is derived from the waveforms of the central timing unit in a manner to be described and it bears a fixed relationship to the other office timing waveforms, e.g., it is always coincident with the fifteenth $B\underline{40}$ pulse and it spans the indicated period from A34 to $A\overline{36}$ of the 1.3056 mc. waveform.

Returning now to FIGS. 10 and 137 of the drawings, it will be recalled that the flip-flop 1034 was set to its "1" state by a supervisory clock pulse, thereby enabling steering gate 1030 and disabling gate 1032. The "Bit Stream In" is thus sampled directly each time an A35 sample pulse occurs. This direct sampling of the bit stream will continue until the occurrence of the $F\underline{40}$ $\varphi$15 pulse, which in FIG. 137 is arbitrarily assumed to occur just prior to the direct sampling of bit number 5 of the "Bit Stream In." As noted in FIG. 137, and as will be evident from FIG. 135, the leading edge of the $F\underline{40}$ $\varphi$15 pulse is aligned with an A34 pulse of the 1.3056 mc. waveform. The $F\underline{40}$ $\varphi$15 pulse serves to reset the flip-flop 1034 to its "0" state, thereby reversing the condition or states of steering gates 1030 and 1032. Accordingly, the A35 sample pulse that immediately follows the leading edge of $F\underline{40}$ $\varphi$15 serves once again to sample the flip-flop 1012 output. As will be evident from FIG. 137, this A35 sample pulse will read out bit number 4 from the flip-flop 1012 store. In this manner, the bit number 4 is repeated in the bit stream stored in flip-flop 1036. The read out thereafter is from flip-flop 1012 until the next supervisory clock pulse arrives to once again set flip-flop 1034 to its "1" state and reverse the states of the steering gates 1030 and 1032.

The bit stream stored, a bit at a time, in flip-flop 1036 is read out therefrom and deposited in flip-flop 1040 under the control of the $B\underline{40}$ timing pulses shown in FIG. 135. As a result of the timing relationship between the A35 pulses which control the read in to flip-flop 1036 and the $B\underline{40}$ read out timing pulses, the repeated bit in the bit stream is dropped and the remaining message bits are stretched into a uniformly spaced 38.4 kb. message bit stream. As will be recalled, an incoming 40.8 kb. transmission comprises a 38.4 kb. message bit stream and a 2.4 kb. supervisory signal and control bit stream combined in the format shown in FIG.3. Thus, the end result of the above-described operation is that the message bit stream and the supervisory bit stream are separated, with the message bits stretched into a uniform 38.4 kb. bit stream.

This operation can be best understood by considering the timing waveforms of FIG. 135 in conjunction with the bit waveforms of FIG. 137. From the waveforms of FIG. 135 it will be seen that a $B\underline{40}$ pulse occurs subsequent to the leading edge of the $\overline{F\underline{40}}$ $\varphi$15 pulse and just prior to the next succeeding A35 read in sampling pulse. The first of the number 4 bits is, therefore, read out of flip-flop 1036 and read into flip-flop 1040. This is immediately followed by bit number 4 being again read into the flip-flop 1036 in the manner heretofore described. The next succeeding A35 read in sampling pulse, however, occurs prior to the next $B\underline{40}$ read out pulse and hence bit number 5 will be read into flip-flop 1036 just prior to the next $B\underline{40}$ read out. Thus, the second or repeated number 4 bit is skipped or "jumped over" and thereby effectively eliminated from the bit stream stored in flip-flop 1040. Thereafter, each bit of the bit stream stored in flip-flop 1036 will be sampled in succession by the $B\underline{40}$ pulses which repeat at a 38.4 kb. rate. As will be evident from FIG. 137, the $B\underline{40}$ sampling pulses precess with respect to the "Flip-Flop 1036 Store" waveform. It is this precession that permits the circuit to perform the rate change associated with the supervisory bit stripping function. The bit stream stored, a bit at a time, in flip-flop 1040 is illustrated in FIG. 137 by the waveform designated "Flip-Flop 1040 Store." The bits, it should be noted, will be of uniform duration.

For each successive 17-bit block of the "Bit Stream In," the number 4 message bit will be repeated and then skipped or eliminated in the process of stretching the message bits into a uniformly spaced message bit stream. That is, the described process is a repetitive, continuous one.

FIG. 135 is self-explanatory for the most part, but since the several timing waveforms thereof play an important part in the S-bit stripping and insertion operations some remarks directed thereto at this point may prove helpful. The dotted line at the left of the chart is a reference point from which time advances to the right. At the reference point the end of an office timing cycle has just occurred, as marked by the appearance of an $F\underline{40}$ pulse. A complete office cycle extends from an $F\underline{40}$ pulse to the next $F\underline{40}$ pulse, this period being equal to a 2.4 kc. period or one full subframe at a 40.8 *kb.* transmission rate.

Now for each transmission rate that the TDS must handle, the following is required:

(A) A family of pulses, in the standard line or trunk transmission series $75\times2^n(1+K)$, to sample data consisting of combined message and supervisory bit streams into and out of the terminal circuitry (e.g., 40.8 kb.); and (B) A family of pulses, in the standard digital information series $75\times2^n$, to transfer message bits into and out of the switching matrix (e.g., 38.4 kb.).

The 1.3056 mc. waveform shown in FIG. 135 comprises the required "A" family of pulses for the 40.8 kb. transmission rate. The 32 pulses of this "A" family (A00 through A37) are repetitive at a 40.8 kc. rate. In one office cycle, the "A" family recycles 17 times.

For the 38.4 kb. message rate, the required "B" family comprises $B\underline{40}$, B40 and B41 (only the latter two are utilized in the terminal circuitry) and these are reptitive at a 38.4 kb. rate. In one office timing cycle, the "B" family pulses repeat 16 times.

Since the "A" family pulses repeat 17 times per office cycle while the "B" family pulses repeat 16 times, there is a "precession" between the "A" and "B" families as will be evident from FIG. 135. At the end of each office cycle the "A" and "B" family pulses can be considered in phase, but they then change their phase relationship a set amount for each cycle or repetition thereof until at the end of a full office timing cycle they again return to the initial in-phase condition. As will be evident from FIG. 135, and as will be explained in detail hereinafter, the amount of precession per family cycle is equal to two of the designated time slots, or two periods of the 1.3056 mc. waveform.

Throughout an office cycle the B40 pulses precess or advance with respect to the numbered timing pulses of the "A" family. The next to last B40 pulse in an office cycle just precedes an A35 bit stream sampling pulse, while the very last B40 pulse follows the A35 pulse. It is this skipping of the B40 read out pulses over the last A35-to-A35 interval that accounts for the elimination of the message bit that is momentarily repeated in the terminal circuitry.

The described precession between the designated "A" and "B" families permits the S-bit stripping and insertion processes for a 40.8 kb. transmission. A similar precession occurs between the families of timing pulses (C and D families) which are correspondingly utilized for a 10.2 kb. transmission and the families (E and F families) used for a 2.55 kb. transmission rate. The latter pulse families will be covered hereinafter.

The timing pulses, required for the supervisory bit stripping and insertion processes, are derived in the AND gate translator 1000. The following table indicates the manner in which the designated timing pulses are produced.

| Timing Pulses: | Translator AND Gate Inputs [40.8 kb. rate] |
|---|---|
| T1 A36 | A30–7, A6. |
| T2 A35 | A30–7, A5. |
| T3 A37 | A30–7, A7. |
| T4 F40 | F40. |
| T5 F40 $\phi$15 | B40, $\overline{19.2}$ kc., 9.6 kc., 4.8 kc., 2.4 kc. |
| T6 B40 | B40, $\overline{1.3056}$ mc., 652.8 kc. |
| T7 B41 | B40, $\overline{1.3056}$ mc., $\overline{652.8}$ kc. |

The T7 timing pulse is actually used by the line-link flip-flop of the switching matrix, but the same is listed herein since its derivation must change if the transmission rate changes.

Figure 138A:
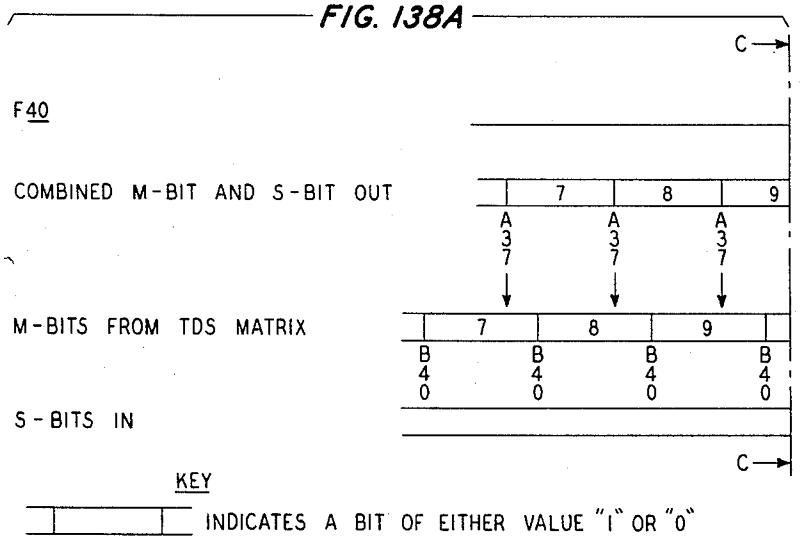
Figure 138B:
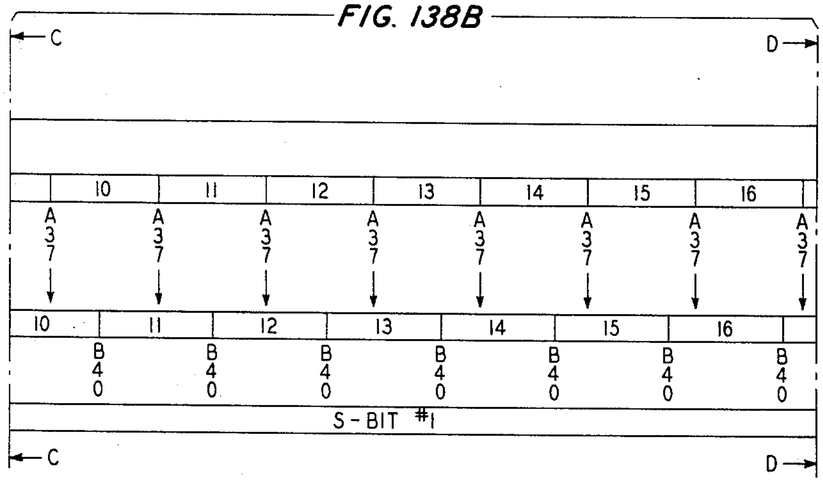
Figure 138C:
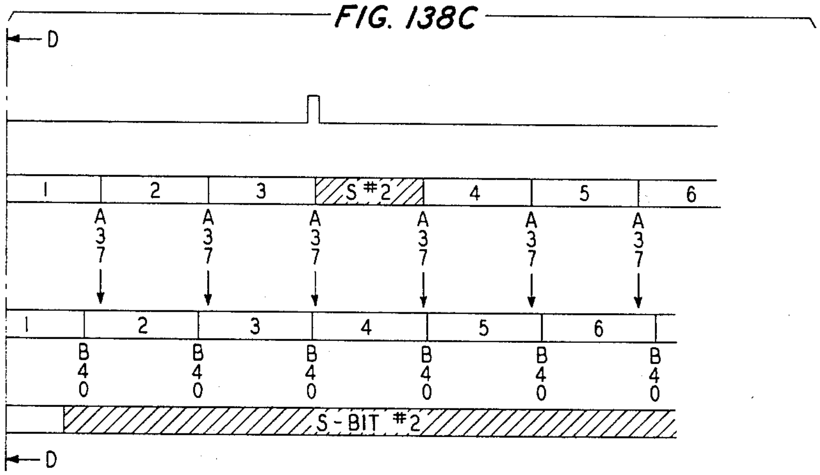

Turning now to the Supervisory Bit Insertion Circuit shown in FIG. 14, a more complete understanding of the circuit can be had when the same is considered in conjunction with the timing waveforms of FIG. 135 and the bit waveforms of FIG. 138. The message bit stream from the TDS switching matrix is stored, a bit at a time, in the flip-flop 1402 under the control of the B40 timing pulses. Here again, the input M-bits are first applied to a single-to-double rail logic circuit 1401 which provides for destructive read in. If the M-bit is a binary one the flip-flop 1402 will be set to its "1" state, while a binary zero will set the flip-flop to its "0" state.

As will be evident hereinafter, a 38.4 kb. message bit stream intended for subscriber line 701 is stored, a bit at a time, in the line-link flip-flop 6710. Each M-bit is deposited in this flip-flop at some time prior to the occurrence of a B40 pulse, the time depending upon the time slot allotted to this particular transmission. A B40 pulse applied to the AND gates of the double rail gate circuit 1401 reads each M-bit out of flip-flop 6710 and into flip-flop 1402. A B41 timing pulse follows each B40 pulse and serves to reset the flip-flop 6710, thus preparing it to receive the next M-bit. As indicated in FIG. 135, the B40 and B41 pulses fall within the designated "Data Transfer Interval," which will be described hereinafter in connection with the operation of the TDS matrix.

The 38.4 kb. message bit stream that is deposited, a bit at a time, in the flip-flop 1402 is illustrated in FIG. 138 by the "full-bauded" waveform designated "M-bits from TDS Matrix." An arbitrarily assumed segment of this bit stream is shown for purposes of illustration. As indicated in the waveform, a B40 sampling pulse marks each bit transition, the B40 pulses occurring, of course, at a 38.4 kc. rate.

The S-bits to be inserted in the message bit stream are delivered to the flip-flop 1404 via the double rail gate circuit 1403. These S-bits are derived from the Signal Assembler/Distributor (SA/D) in a manner to be described in detail hereinafter. The output of the SA/D comprises the S-bits for all outgoing lines and interoffice trunks mixed or multiplexed together on a common bus. Accordingly, means must be provided to direct the respective S-bits to the proper terminal insertion circuits. To this end, an S-bit address pulse signal is provided by the SA/D. The S-bit address pulse serves to enable the AND gates of the double rail gate circuit 1403 during the interval that an S-bit intended for bit insertion circuit 1400 appears over the common output bus of the SA/D. The generation of the S-bits and S-bit address pulses will be described hereinafter in connection with the description of the Signal Assembler/Distributor Subsystem.

The S-bits stored successively in flip-flop 1404 are indicated in FIG. 138 by the waveform designated "S-Bits In." The manner of operation of the SA/D is such that an S-bit transition occurs some time prior to an F40 pulse.

The steering gates 1420 and 1422 and the output rate change flip-flop 1430 serve to insert the S-bits into the M-bit stream. The combined M-bit and S-bit stream is then delivered over lead 1410 to the Send-Digital Terminating Unit of FIG. 11 where the $F_1$, $P_1$, $F_0$ and $C_E$ bits are inserted, in the manner heretofore described.

The AND gate 1420 is connected at its input to the (1) output lead of flip-flop 1402 and via inverter 1421 to the F40 lead. The AND gate 1422 is connected at its input to the (1) output lead of flip-flop 1404 and also directly to the F40 lead. Both AND gates are periodically enabled by the short duration A37 timing pulses of the 1.3056 mc. waveform; their output leads are connected together, and through the double rail gate circuit 1429 to the input of flip-flop 1430.

The A37 timing pulses are repetitive at a 40.8 kc. rate and therefore bits, irrespective of origin, are sampled at this rate and applied to flip-flop 1430. The F40 lead is energized only during the F40 pulse period; see FIG. 135 for the F40 pulse waveform. Accordingly, the gate 1422 is normally de-energized, while the gate 1420 which is connected to the F40 lead via the inverter 1421 is normally energized. Accordingly, the M-bit output of flip-flop 1402 is normally sampled for each A37 sampling pulse.

This sampling of the M-bits is indicated in FIG. 138 by the bit waveform designated "Combined M-Bit and S-Bit Out." For each A37 sampling pulse the M-bit stream is sampled, this being symbolically illustrated by the arrows directed at the M-bits of the "M-Bits from TDS Matrix" waveform. As explained in detail heretofore, the "A" family pulses (including A37) and "B" family pulses (including B40) precess with respect to each other and it is this precession that permits the S-bit insertion operation. This precession will be evident from the waveform of FIGS. 135 and 138.

The precession of the A37 sampling pulses with respect to the input M-bit stream continues until the occurernce of an F40 pulse in the office cycle. With the F40 lead thus energized, the condition or states of steering gates 1420 and 1422 are reversed. The next A37 sampling pulse therefore reads the S-bit stored in flip-flop 1404 into the output flip-flop 1430.

This operation can perhaps be best understood by reference to the waveform of FIGS. 135 and 138. In FIG. 135, the occurrence of an F40 pulse marks the end of an office timing cycle. The sequence of events at this time is as follows. The F40 pulse reverses the states of the steering gates 1420 and 1422 as heretofore described. A B40 pulse falls within the F40 time interval, shortly behind the leading edge of the latter. This B40 pulse serves to read out the next M-bit (e.g., bit #4 in FIG. 138) from the line-link flip-flop and into the flip-flop 1402. An A37 sample pulse occurs immediately after the B40 pulse, but because the states of the steering gates are now reversed the S-bit stored in flip-flop 1404 is sampled rather than the aforementioned #4 M-bit.

The F$\underline{40}$ pulse terminates shortly after the described read out of the S-bit and this returns the steering gates 1420 and 1422 to their normal condition. The next succeeding A37 sampulse precedes the next B40 pulse and hence the #4 M-bit will be sampled shortly before the next M-bit (#5) is read into flip-flop 1402. The M-bits thereafter are sampled in sequence until an F$\underline{40}$ pulse again appears, one subframe interval later.

The resultant combined M-bit and S-bit stream is illustrated in FIG. 138 by the waveform designated "Combined M-bit and S-bit Out." An A37 sampling pulse marks each bit transition and since these are uniformly spaced and repetitive at a 40.8 kc. rate, the combined M-bit, S-bit stream expectedly comprises a uniform 40.8 kb. bit stream.

The S-bits intended for other 40.8 kb. subscribers are inserted in the respective M-bit streams in exactly the same fashion as that described above and therefore all 40.8 kb. subscriber bit streams, out of the respective insertion circuits, will be in subframe synchronization.

The S-bits are stored in flip-flop 1404 for a period of time that is greater than one subframe, but less than two subframes. The insertion circuit therefore double-writes each S-bit into the M-bit stream. However, as heretofore described, this double-writing is eliminated at the Send-Digital Terminating Unit.

The Supervisory Bit stripper and Bit insertion Circuits associated with all other subscriber lines are structurally and functionally identical to those circuits described above. However, the timing pulses that are applied thereto will necessarily be different for subscriber lines at different rates. The following table lists the central timing unit waveforms used to generate the necessary timing pulses at the several assumed transmission rates. For purposes of comparison, the waveforms used to generate the timing pulses for a 40.8 kb. subscriber transmission rate are repeated.

| Timing Pulses: | Translator AND Gate Inputs |
|---|---|
| | [For a 40.8 kb. transmision rate] |
| T1 A36 | A30–7, A6. |
| T2 A35 | A30–7, A5. |
| T3 A37 | A30–7, A7. |
| T4 F$\underline{40}$ | F$\underline{40}$. |
| T5 F$\underline{40}$ $\phi$15 | B$\underline{40}$, $\overline{19.2}$ kc., 9.6 kc., 4.8 kc., 2.4 kc. |
| T6 B40 | B$\underline{40}$, $\overline{1.3056}$ mc., 652.8 kc. |
| T7 B41 | B$\underline{40}$, $\overline{1.3056}$ mc., $\overline{652.8}$ kc. |
| | [For a 10.2 kb. transmission rate] |
| T1 C36 | C30–7, A30–7, A6. |
| T2 C35 | C30–7, A30–7, A5. |
| T3 C37 | C30–7, A30–7, A7. |
| T4 H$\underline{40}$ | H$\underline{40}$. |
| T5 H$\underline{40}$ $\phi$15 | B$\underline{40}$, 19.2 kc., 9.6 kc., $\overline{4.8}$ kc., 2.4 kc., 1.2 kc., 600 c.p.s. |
| T6 D40 | D$\underline{40}$, B$\underline{40}$, $\overline{1.3056}$ mc., 652.8 kc. |
| T7 D41 | D$\underline{40}$, B$\underline{40}$, $\overline{1.3056}$ mc., $\overline{652.8}$ kc. |
| | [For a 2.55 kb. transmission rate] |
| T1 E36 | E30–7, C30–7, A30–7, A6. |
| T2 E35 | E30–7, C30–7, A30–7, A5. |
| T3 E37 | E30–7, C30–7, A30–7, A7. |
| T4 K$\underline{40}$ | K$\underline{40}$. |
| T5 K40 $\phi$15 | B$\underline{40}$, 19.2 kc., 9.6 kc., 4.8 kc., 2.4 kc., $\overline{1.2}$ kc., 600, 300 and 150 c.p.s. |
| T6 F40 | F$\underline{40}$, B$\underline{40}$, $\overline{1.3056}$ mc., 652.8 kc. |
| T7 F41 | F$\underline{40}$, B$\underline{40}$, $\overline{1.3056}$ mc., $\overline{652.8}$ kc. |

The following table represents an alternative, somewhat simplified, method of translation for the lower rate.

| Timing pulses | 40.8 kb. rate | Alternate Translation | |
|---|---|---|---|
| | | 10.2 kb. rate | 2.55 kb. rate |
| T1 | A36 | C36=C30–7, A36 | E36=E30–7, C36. |
| T2 | A35 | C35=C30–7, A35 | E35=E30–7, C35. |
| T3 | A37 | C37=C30–7, A37 | E37=E30–7, C37. |
| T4 | F$\underline{40}$ | H$\underline{40}$ | K$\underline{40}$. |
| T5 | F$\underline{40}$ $\phi$15 | H$\underline{40}$ $\phi$15 [1] | K40 $\phi$15=F$\underline{40}$ $\phi$15, $\overline{1.2}$ kc., 600, 300 and 150 c.p.s. |
| T6 | B40 | D$\underline{40}$, B40 | F$\underline{40}$, B40. |
| T7 | B41 | D$\underline{40}$, B41 | F$\underline{40}$, B41. |

[1] See above table.

As will be evident from this table, the timing pulses for the lower rates are submultiply related to the timing pulses used at higher rates.

Figure 30:
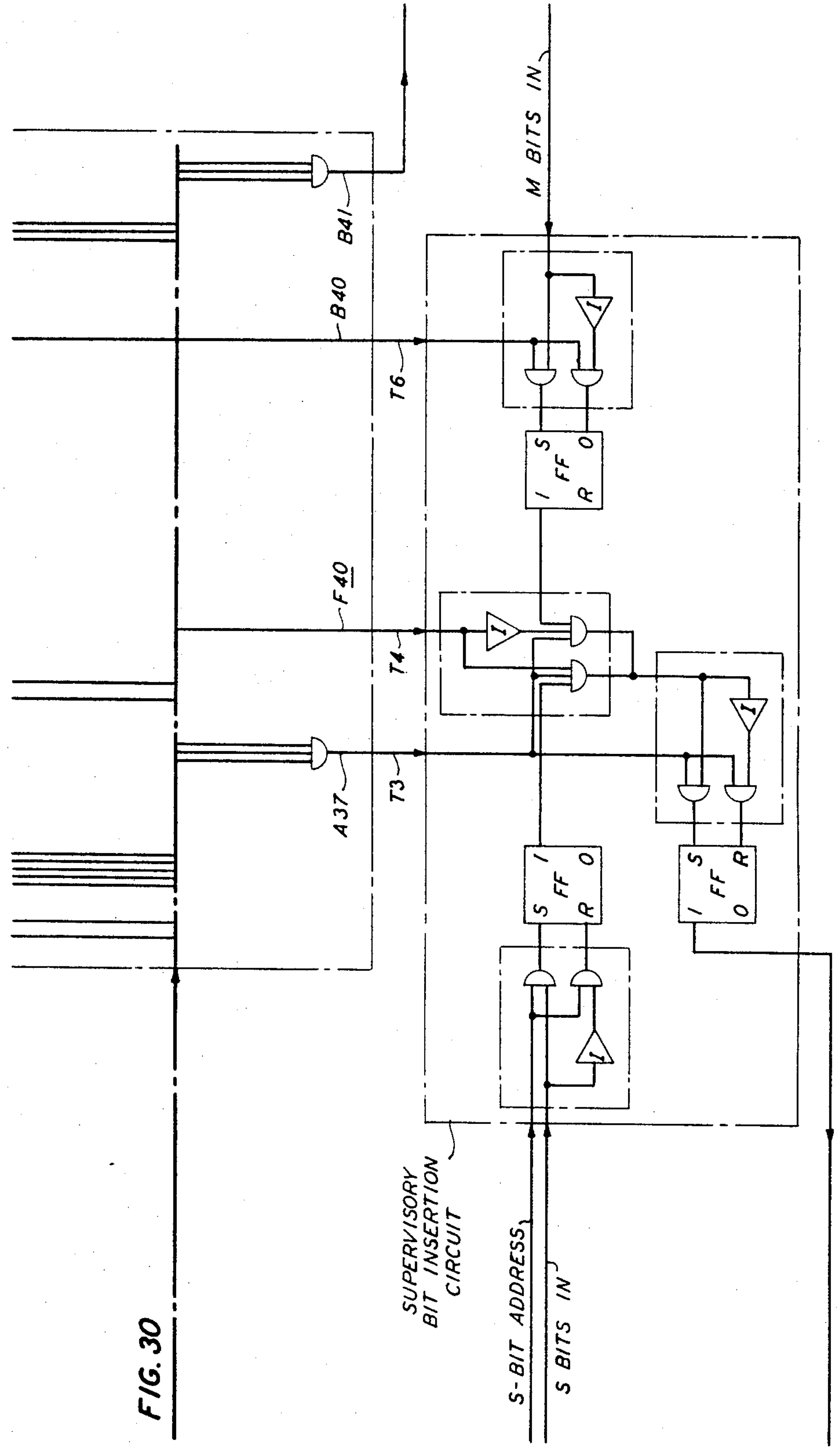
Figure 31:
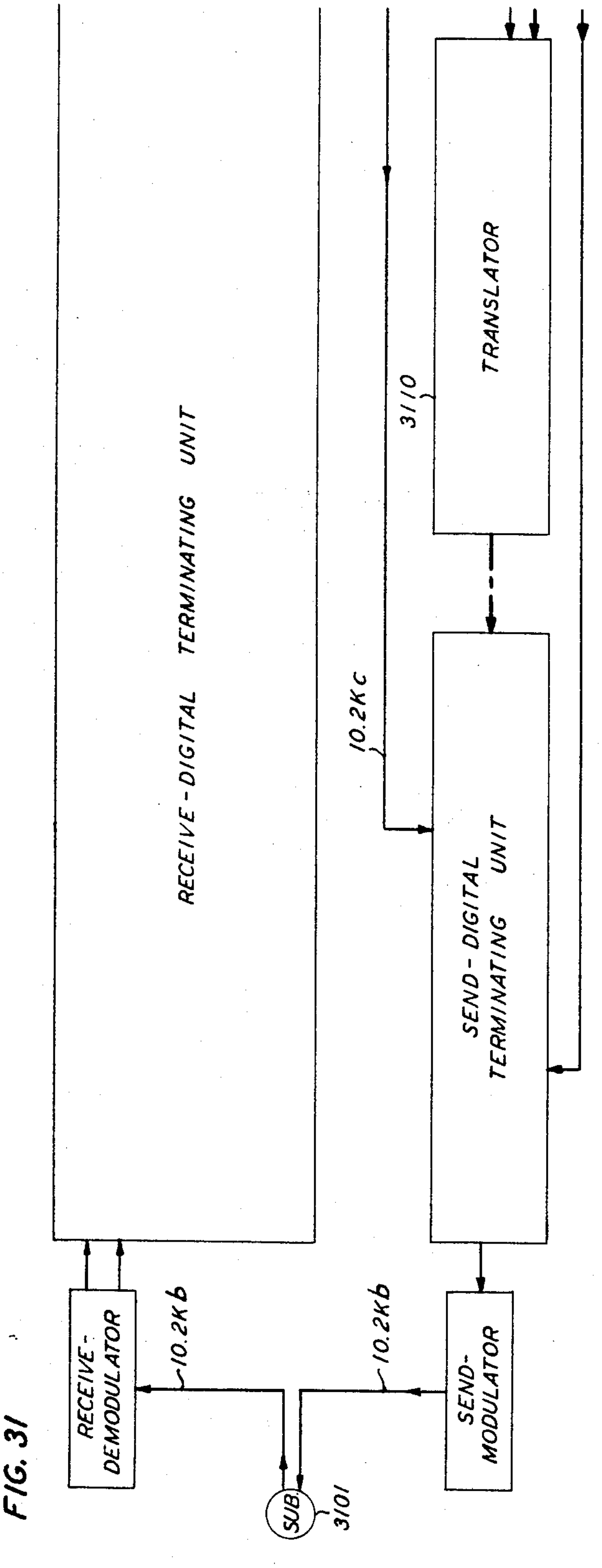
Figure 32:
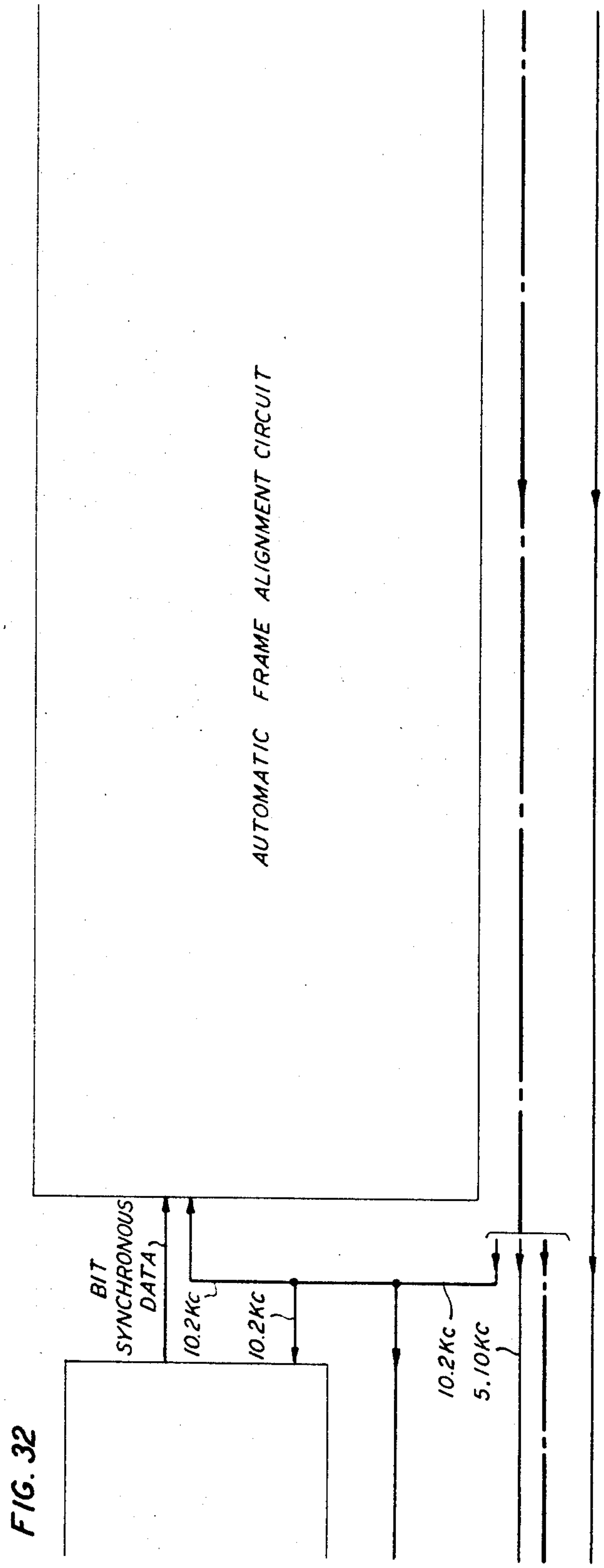
Figure 33:
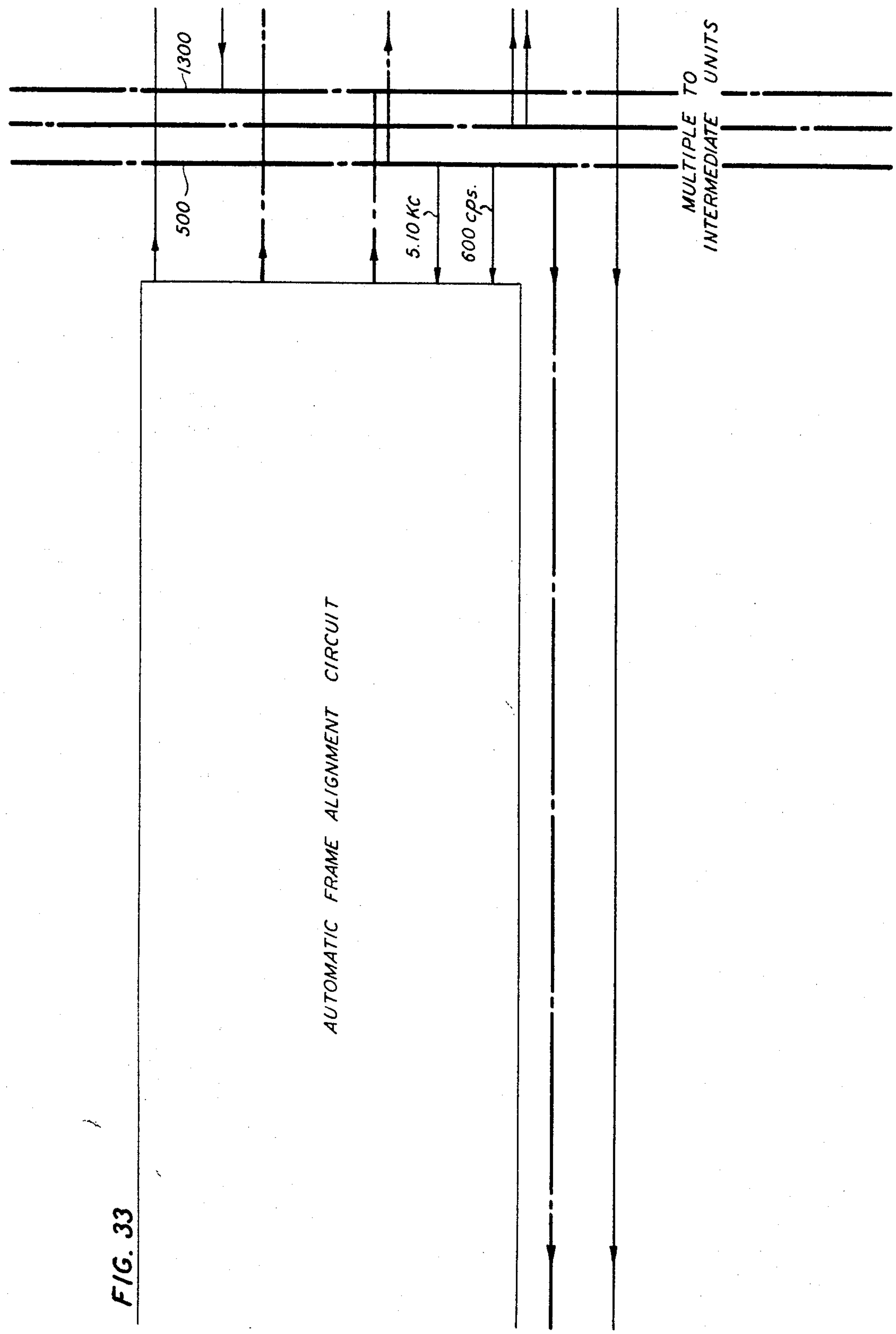
Figure 34:
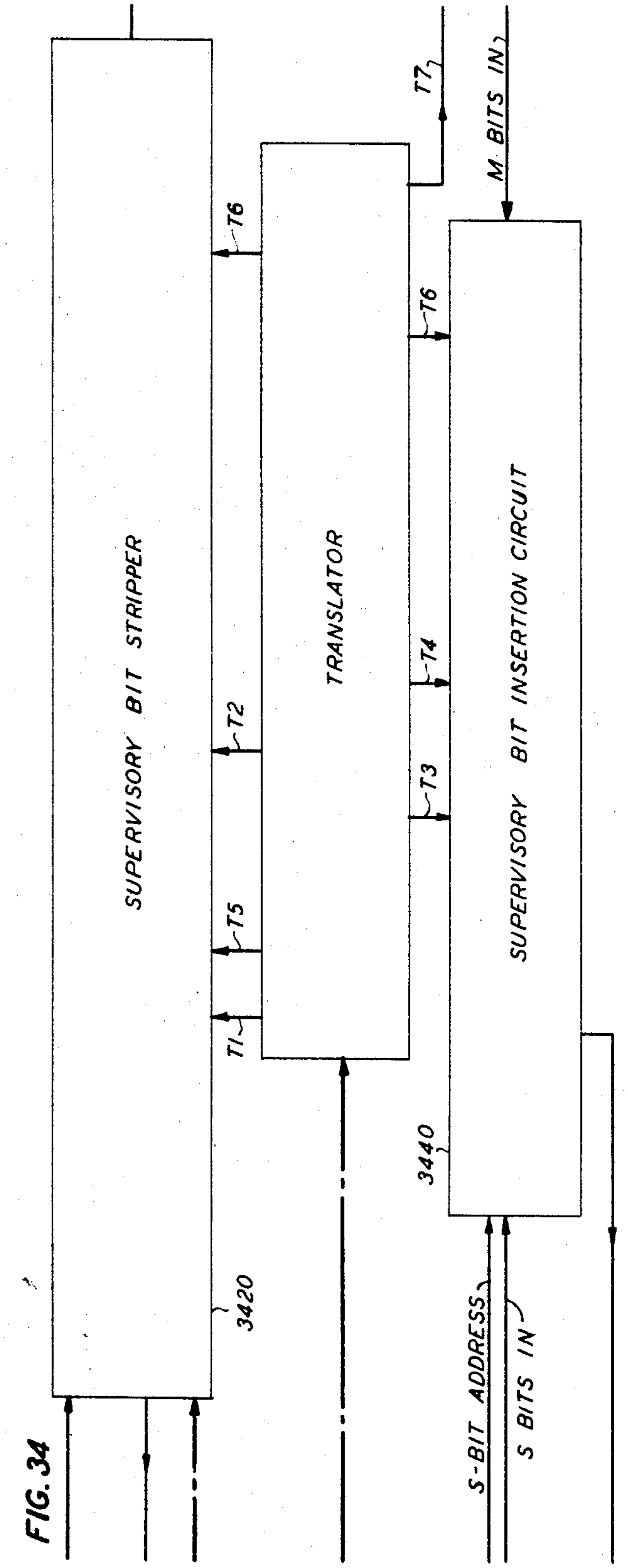
Figure 35:
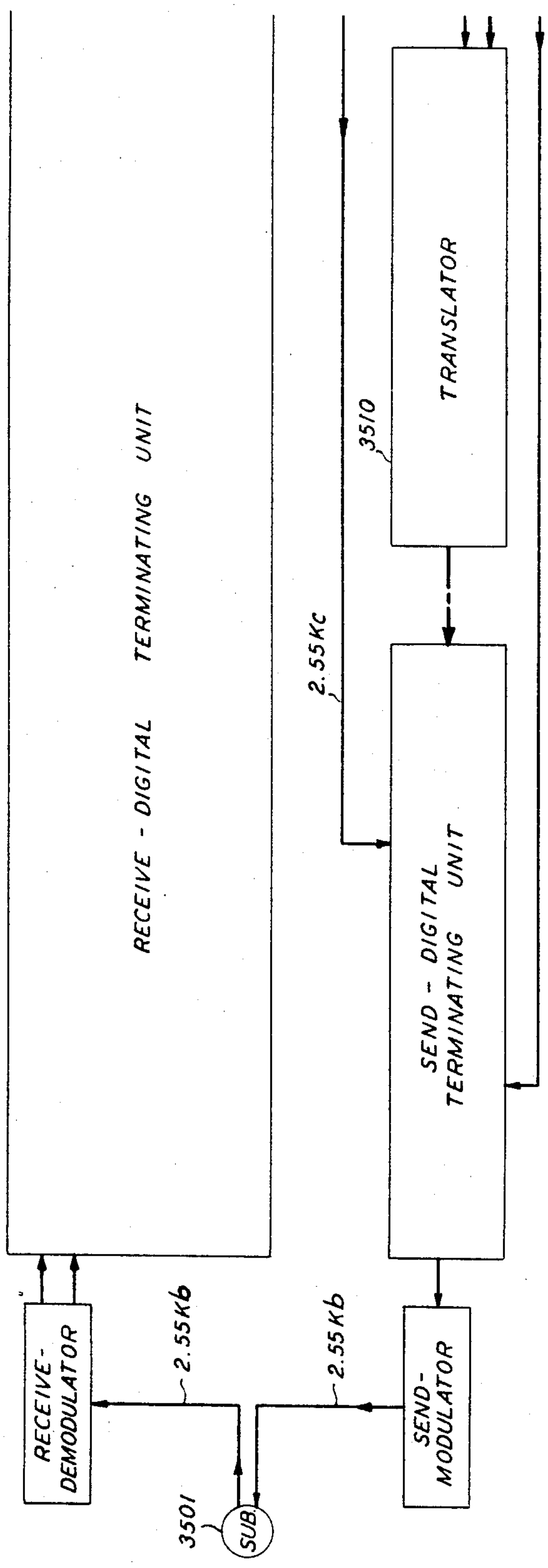
Figure 36:
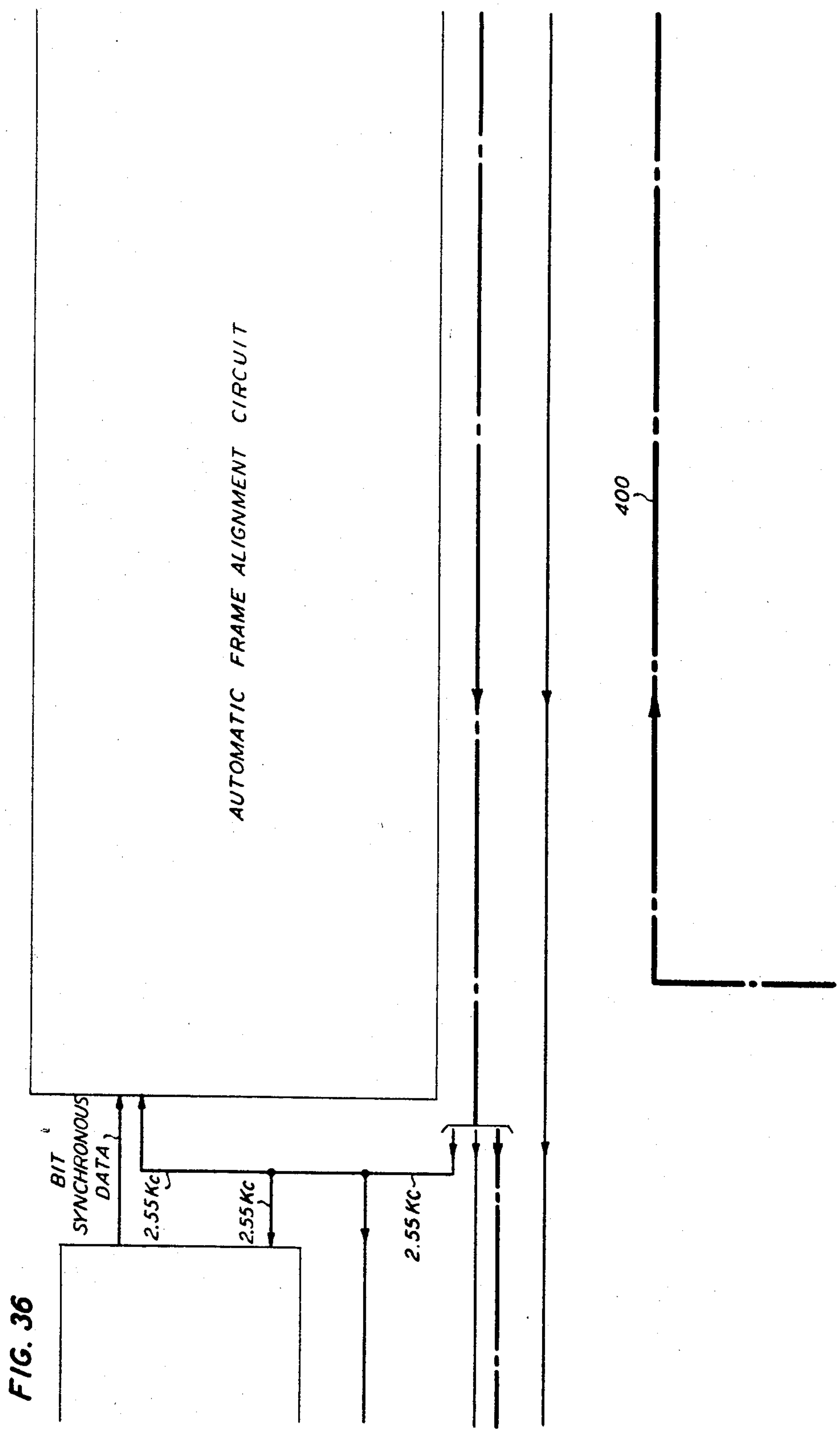
Figure 37:
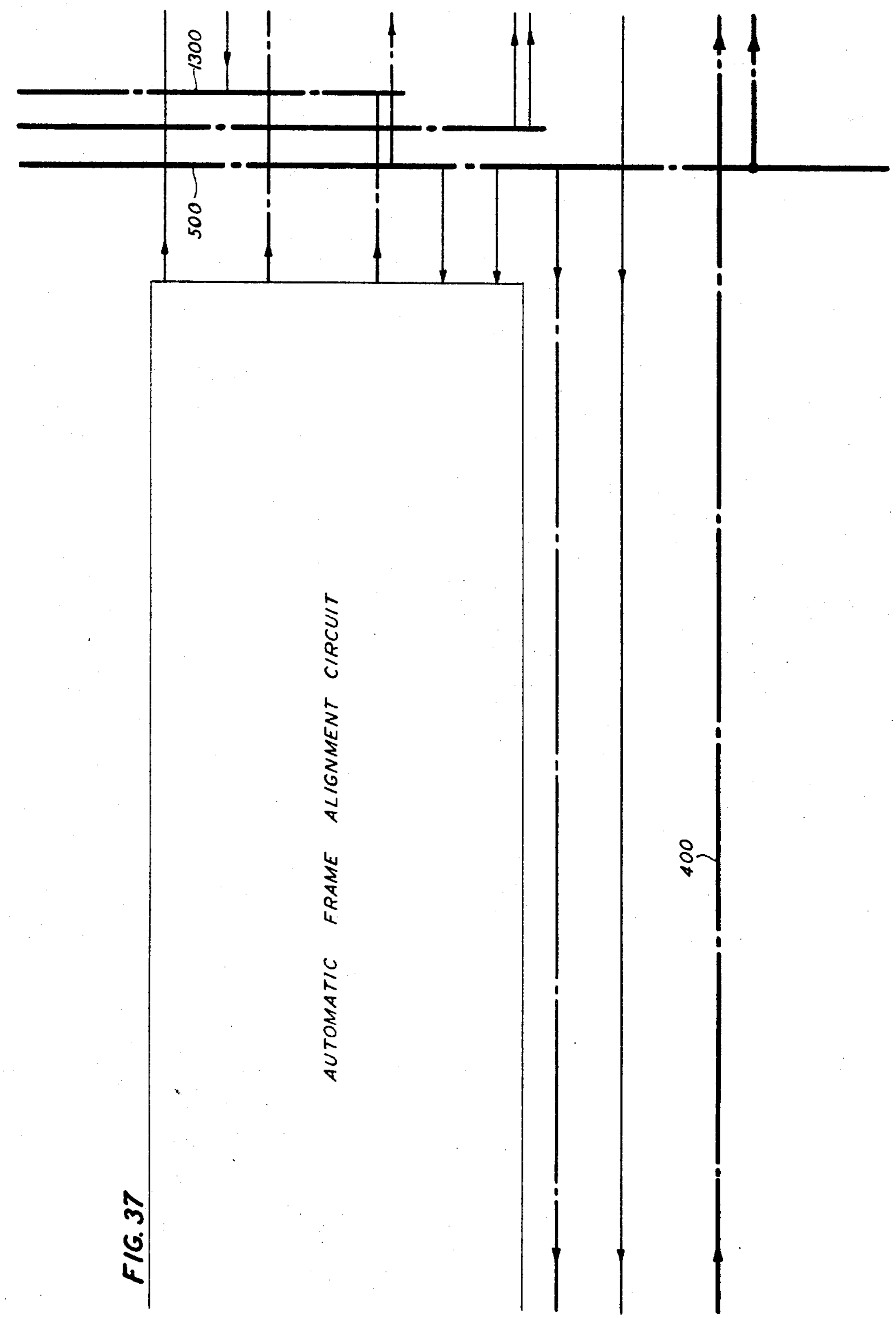
Figure 38:
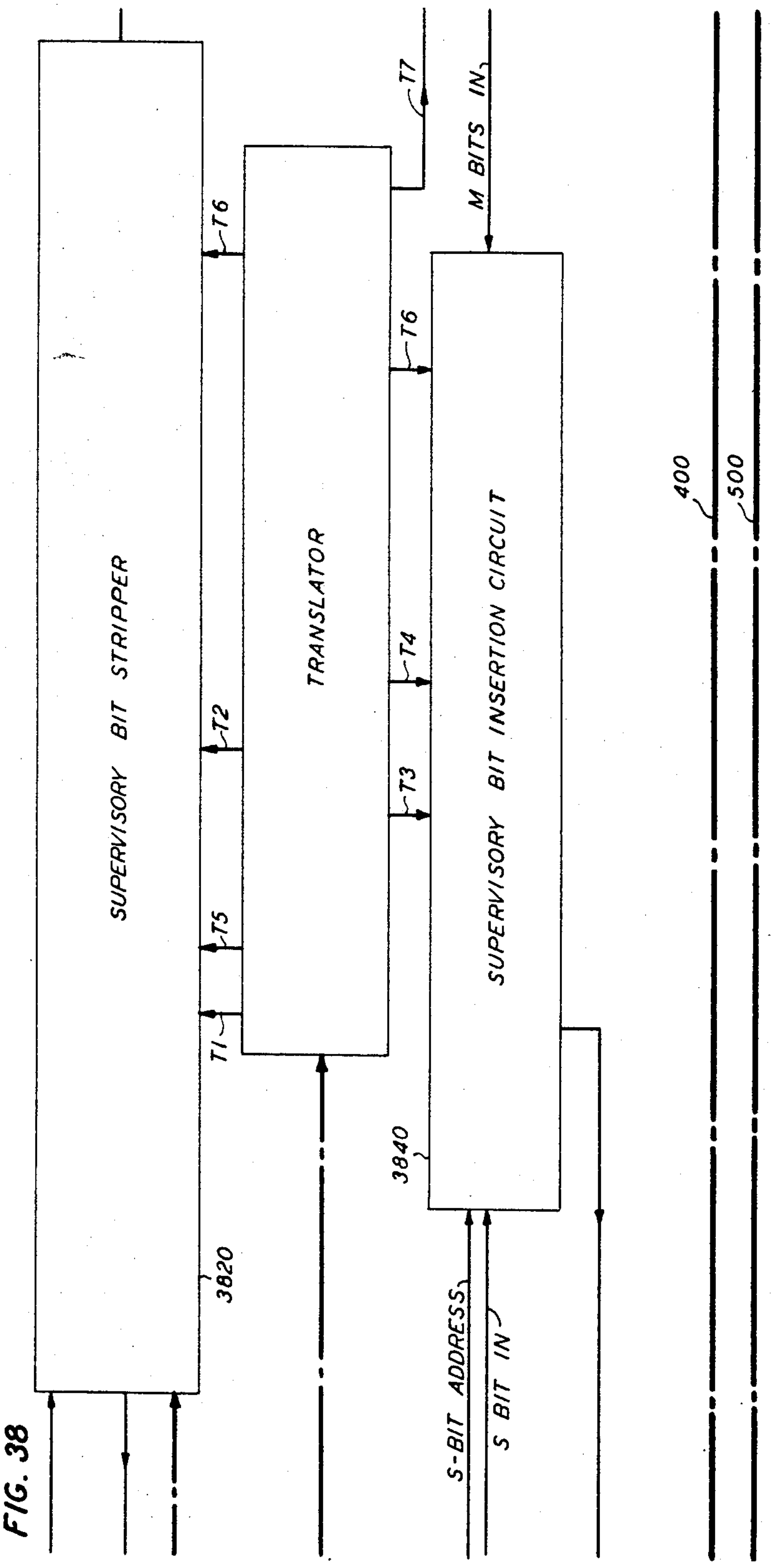

Turning now to the interoffice trunks, it will be evident from a comparison of FIGS. 26 and 30 with FIGS 10 and 14 that the Supervisory Bit Stripper and Bit Insertion Circuits associated with trunk 2301 are structurally identical to the heretofore described circuits associated with subscriber line 701. And since trunk 2301 is assumed to operate at the same rate as subscriber line 701, the required timing pulses are derived in an identical fashion as that described. In practice, the necessary timing pulses (T1–T7) are derived in a centralized translation unit and then distributed to all similarly rated line and trunk terminal circuits.

The Supervisory Bit Stripper and Bit Insertion Circuits 3420 and 3440, associated with the 10.2 kb. interoffice trunk 3101, are structurally and functionally identical to those circuits heretofore described. And the timing pulses (T1–T7) that are applied thereto are derived in the same manner as the timing pulses required by the Supervisory Bit Stripper and Bit Insertion Circuits 1820 and 1840 associated with the 10.2 kb. subscriber line 1501 (see tables, supra). Similarly, the timing pulses required by the stripper and Insertion Circuits 3820 and 3840, associated with interoffice trunk 3501, are derived in the same manner as the timing pulses required by those circuits of subscriber line 1901.

From a comparison of FIGS. 137 and 138 it will be seen that the supervisory bits inserted into the outgoing M-bit stream occupy a different bit position or time slot therein (e.g., between M-bits #3 and #4) than the supervisory bit position in the incoming bit stream. No attempt is made to establish such a bit position correspondence for subscriber lines and simplex trunks. In each instance the supervisory bits are eventually removed at the remote receiver and the M-bits are stretched into a continuous uniform M-bit stream. For multiplex trunks, however, it is essential that the format remain the same, otherwise the messages assigned to respective channels (i.e., repetitive time slot positions) will be misrouted.

Now it is known that each incoming bit stream incurs a given amount of delay as it traverses the terminal circuitry and the TDS matrix. This delay is a constant of the time division switch, and its amount can be empiracally determined.

In the absence of the described delay, the aforementioned supervisory bit position correspondence would be automatically retained. That, is the supervisory bits would be automatically inserted in the proper positions in each M-bit stream. The existence of this delay, however, causes the supervisory bits to be inserted in a time slot position that is different (i.e., delayed) from that occupied by the supervisory bits of the incoming stream, e.g., compare FIGS. 137 and 138 where an arbitrarily assumed delay is illustrated.

As indicated hereinbefore, the aforementioned delay can be ignored for subscriber lines and simplex trunks; however, with multiplex trunks it must be taken into account and corrected for. Once the delay has been empirically determined there are several ways of correcting for the same. For example, if the occurrence of the timing pulses (T3, T4, T6 and T7) used with the insertion circuits of multiplex trunks are delayed an amount corresponding to the aforementioned equipment delay, the described supervisory bit position correspondence will be attained. An alternative and preferable method of accomplishing the same is to advance the phase of the bit stream out of the Automatic Frame Alignment Circuit by an amount equal to the delay encountered by the bit stream as it traverses the terminal circuitry and TDS matrix. This advance is carried out by advancing the phase of the 2.4 kc. pulses delivered to the 3-stage counter 2911. Knowing the delay involved and hence the phase advance desired, the proper "A" family pulse in a 2.4 kc. office cycle can be derived, by straightforward translation, and then applied to counter 2911 to advance the count therein.

All multiplex trunks of the same rate are handled in identical fashion, i.e., the timing pulses (T1–T7) for each are completely synchronous, so that the multiplex bit streams of respective insertion circuits are, at least, in subframe synchronization.

The intraoffice trunks 3901, 3911 and 4501 are used for interconnection with other equipment at the central office. For example, one or more intraoffice trunks may terminate in a message store-and-forward unit (S/F). Such units are used in instances where it is desirable, and permissible, to store messages for a time and then forward the same to its destination later—particularly during subsequent periods of light traffic load.

As will be clear hereinafter, one or more of these intraoffice trunks may terminate at the Signal Assembler/Distributor. In some instances it may be desirable to send signaling information via a portion or all of a message channel—particularly if the rate of the signal channel is inadequate to handle the amount of signaling information that must be conveyed. In such a case a connection will be established from the incoming line or trunk, through the TDS matrix, and then to a terminal of the SA/D via an intraoffice trunk.

The intraoffice trunk terminal circuits 3900, 3950 and 4500 perform none of the terminal circuit functions heretofore described. For example, an incoming bit stream intended for an intraoffice trunk, and, of course, the particular equipment connected thereto, is stripped of its supervisory bits prior to switching the same through the matrix to said intraoffice trunk. Thus, the intraoffice terminal circuit wlil see only a uniformly spaced message bit stream. For the bit stream traveling through the intraoffice terminal circuit in the opposite direction, the supervisory bit insertion operation is not carried out until the bit stream is switched through the matrix to the terminal circuit associated with the intended subscriber line or trunk.

Figure 39:
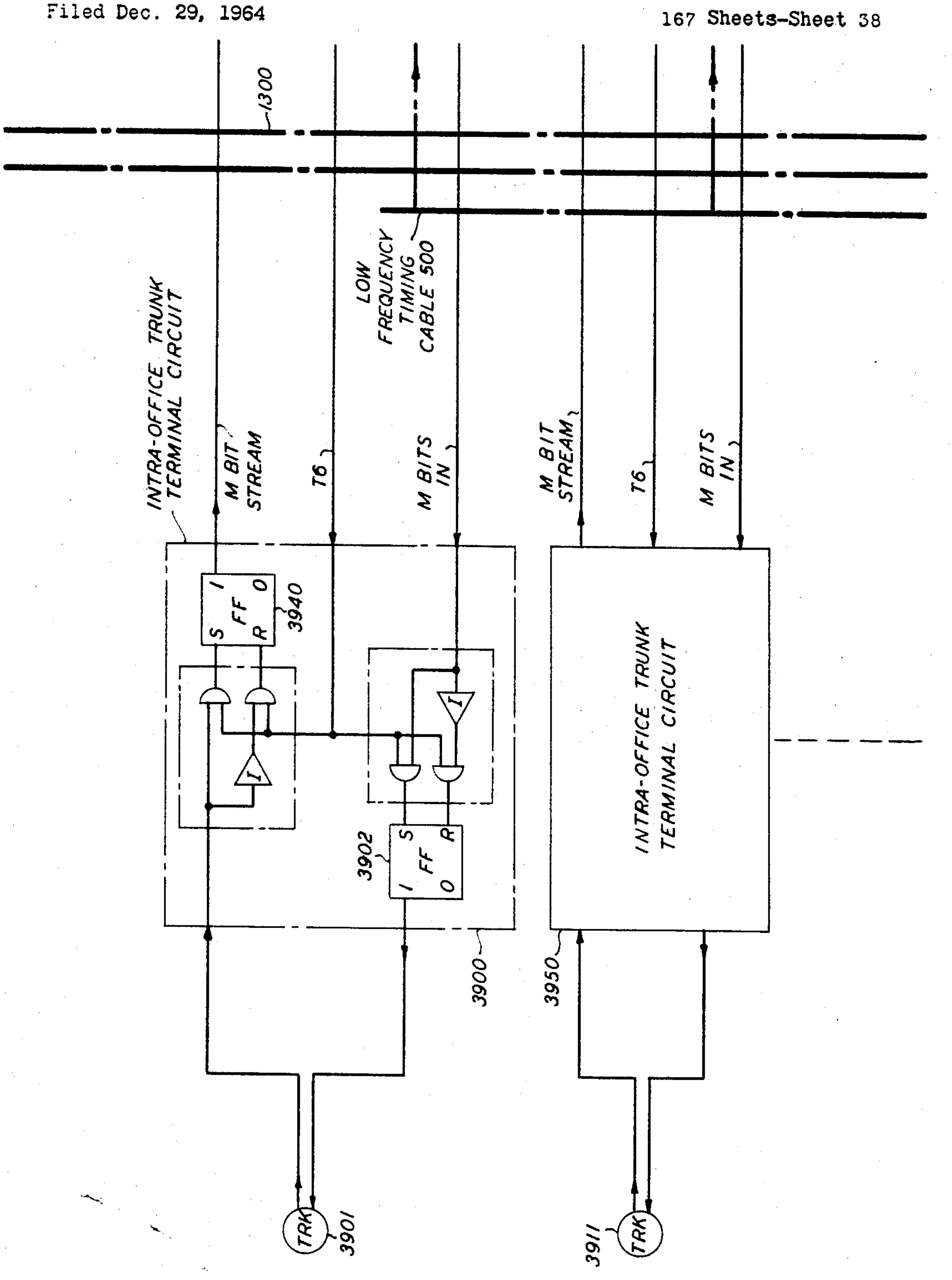
Figure 40:
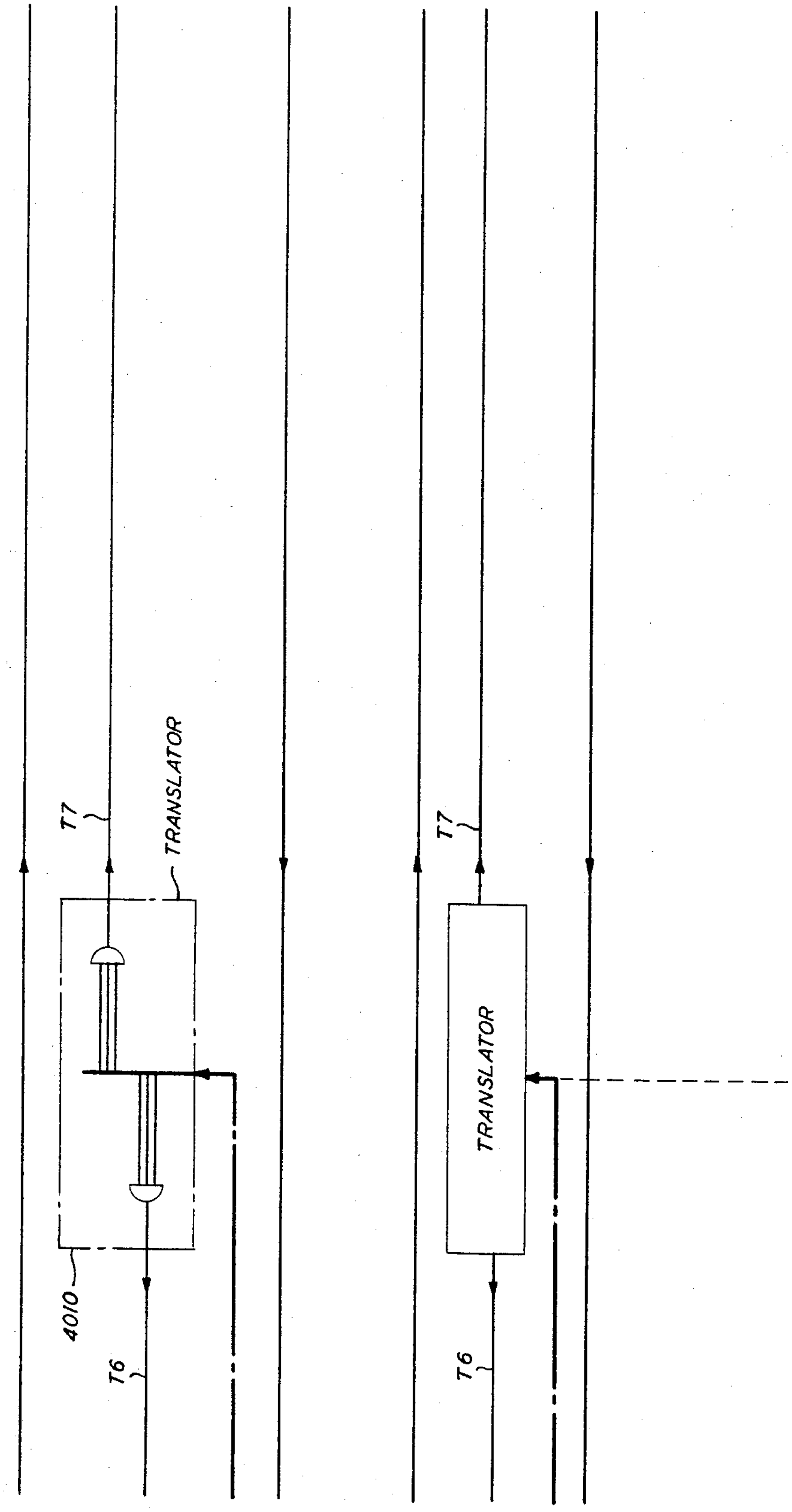
Figure 41:
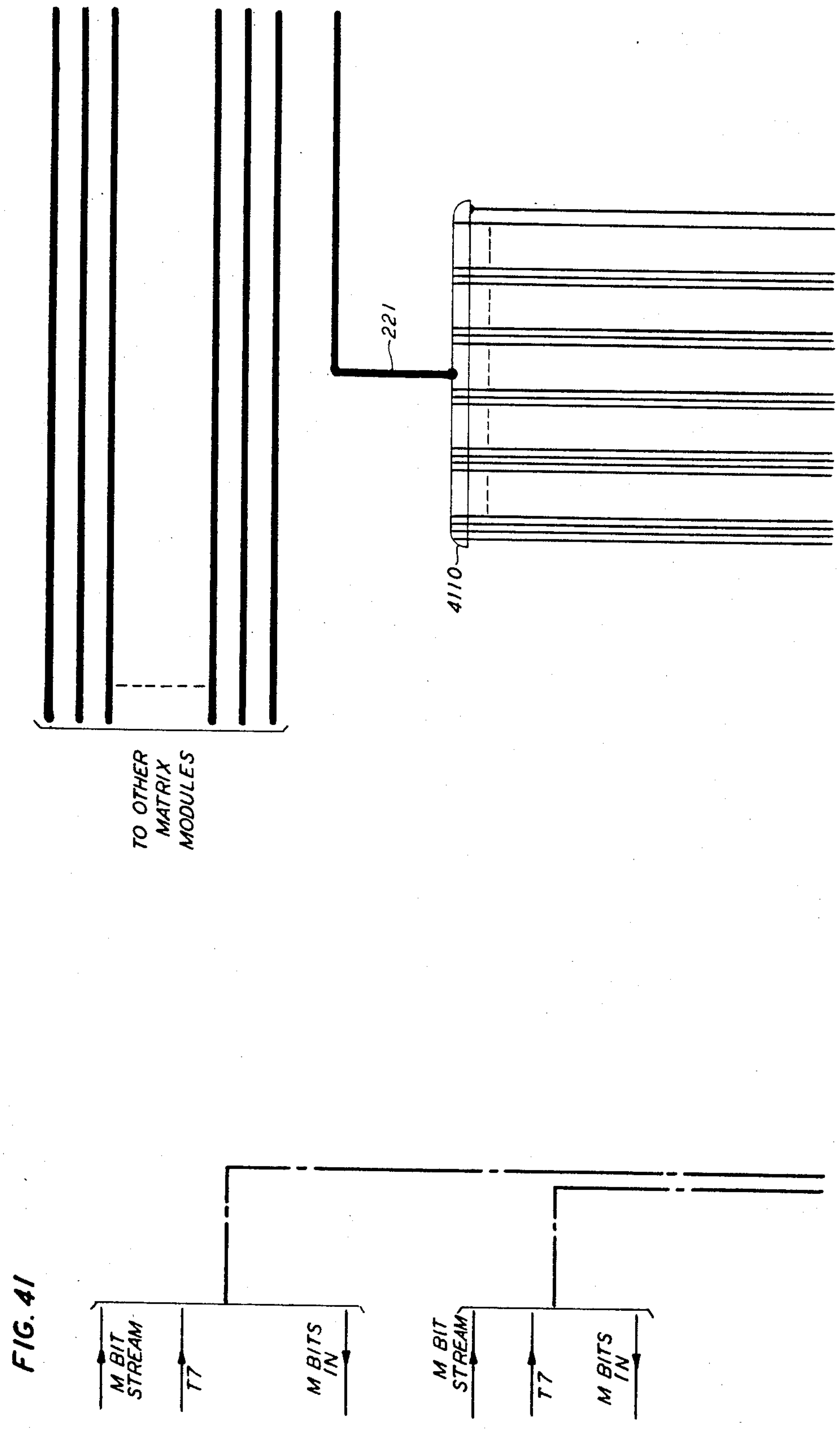
Figure 42:
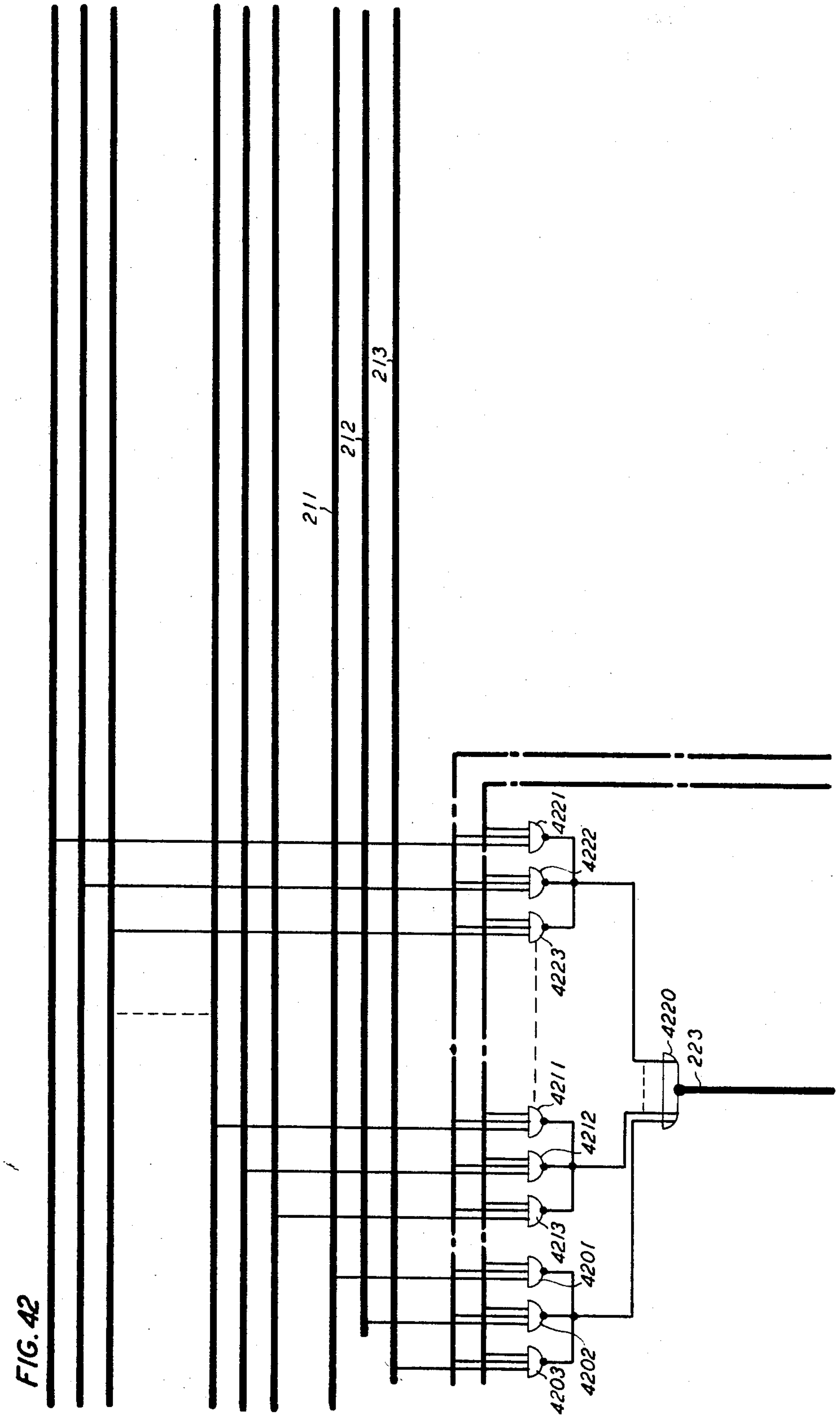
Figure 43:
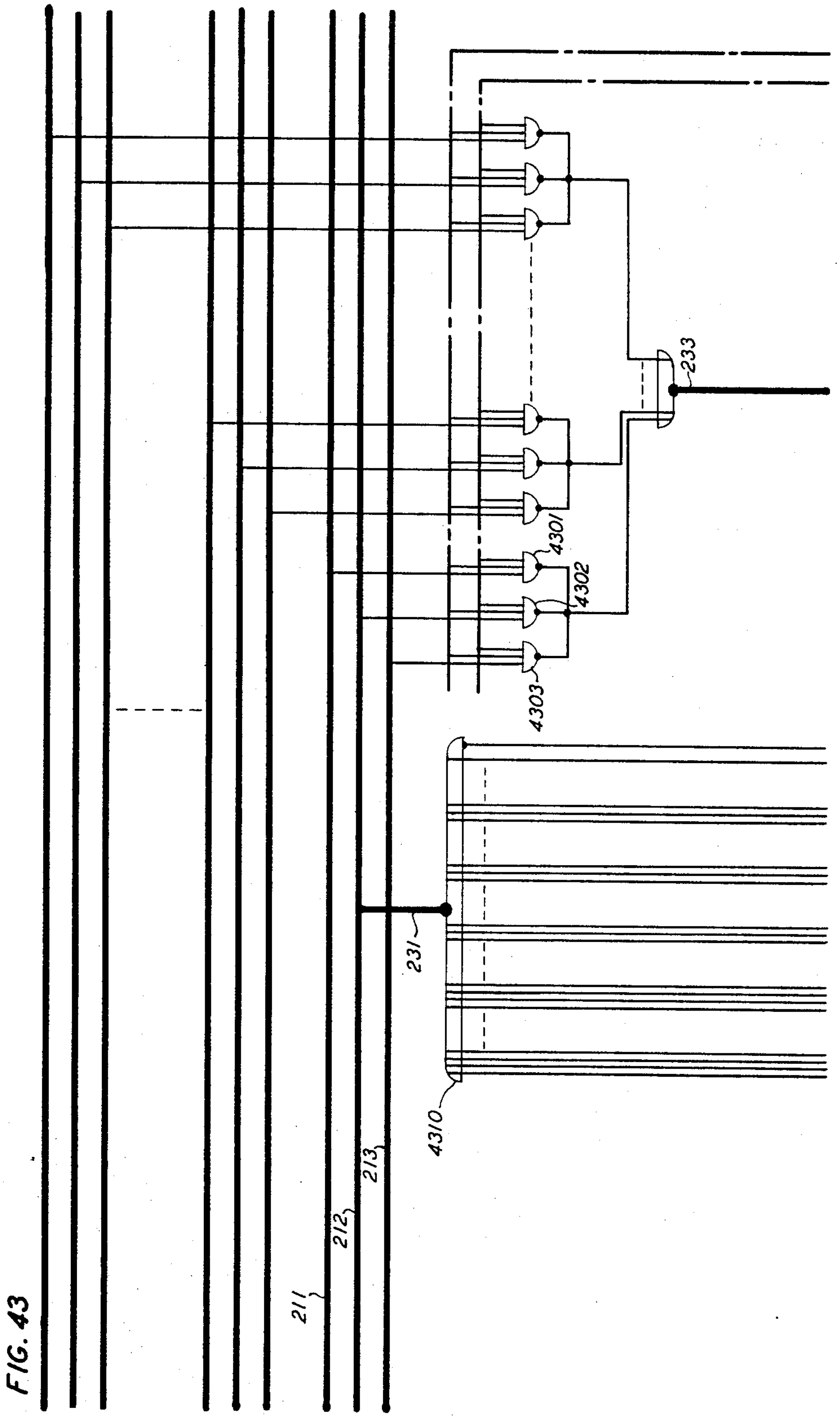
Figure 44:
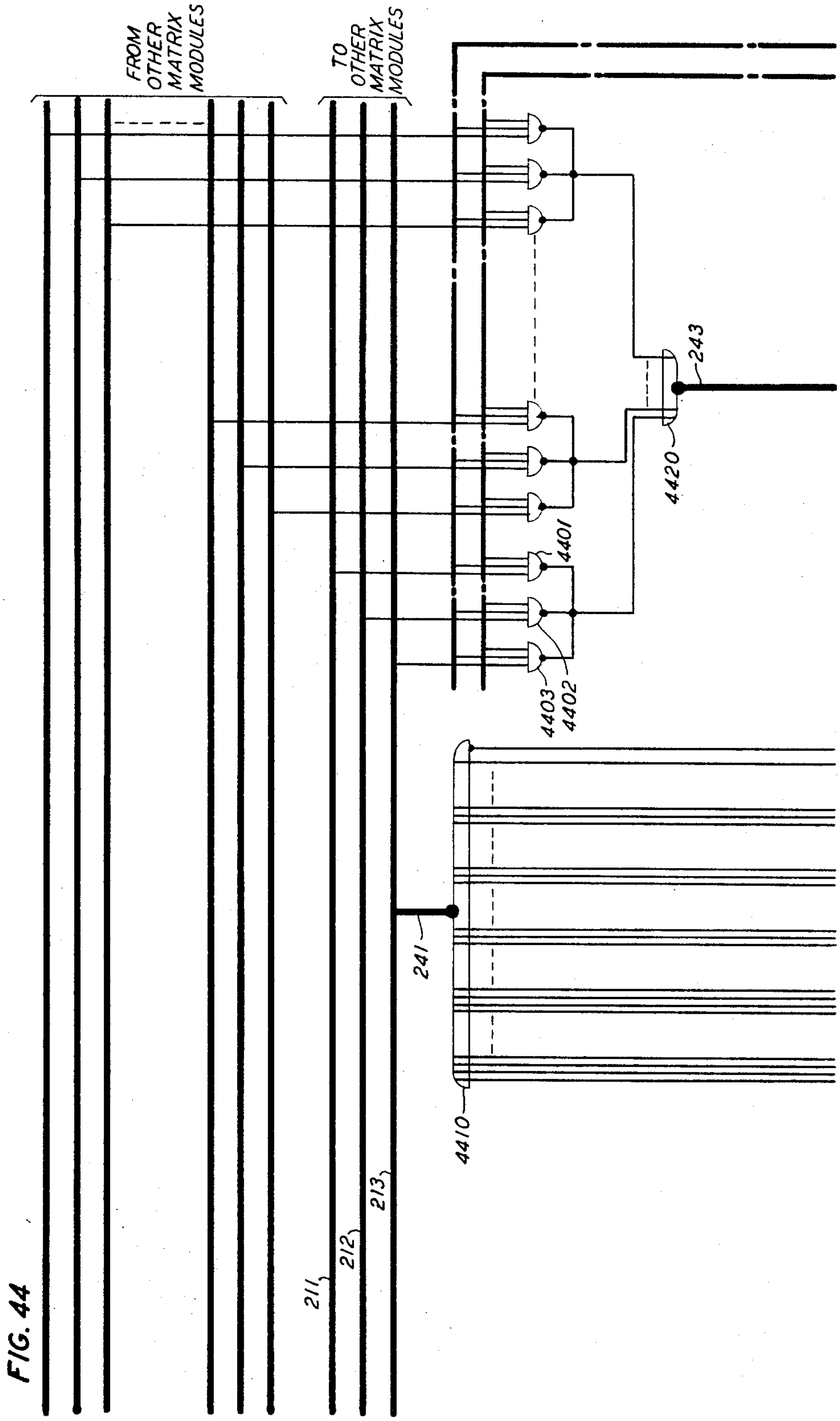
Figure 45:
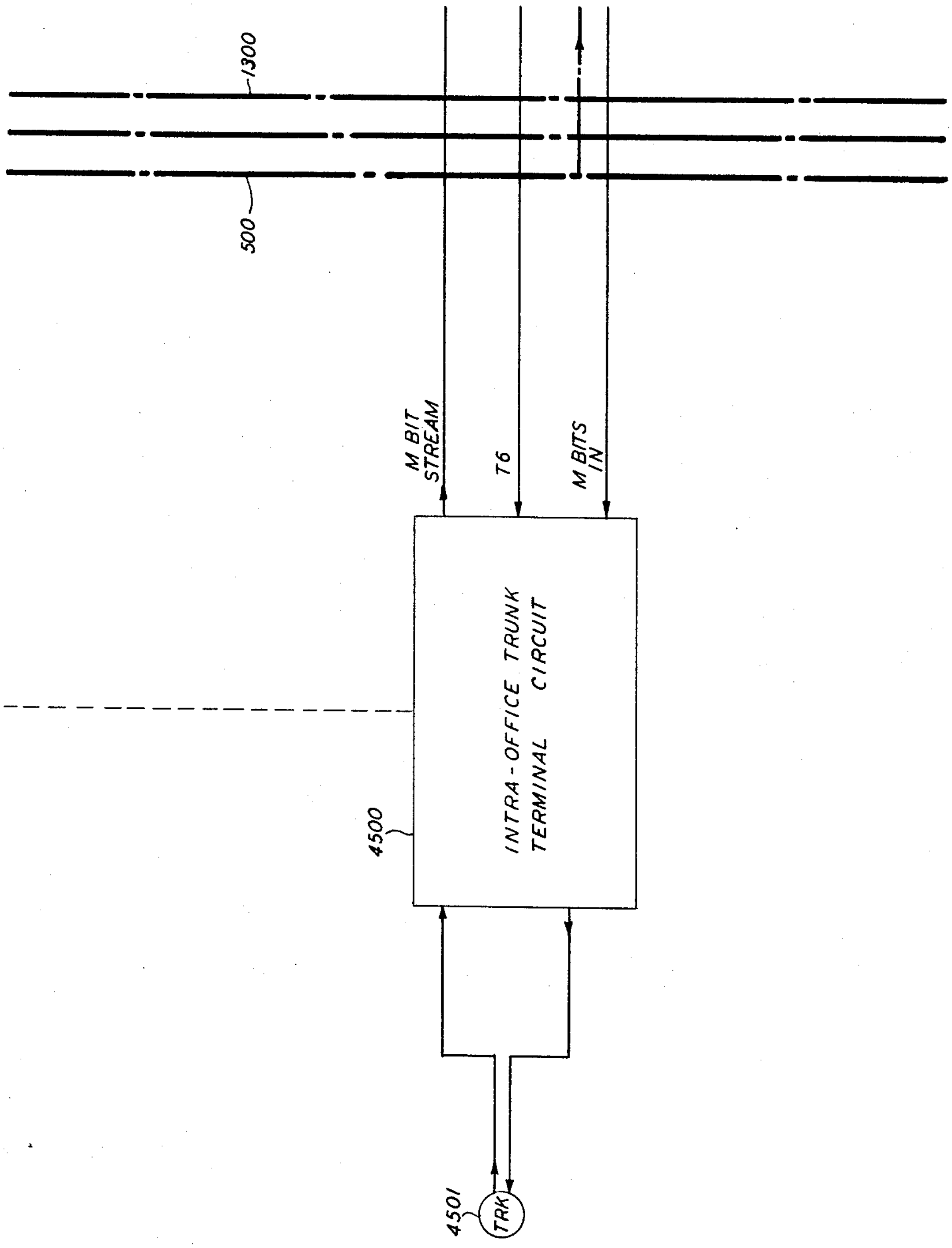
Figure 46:
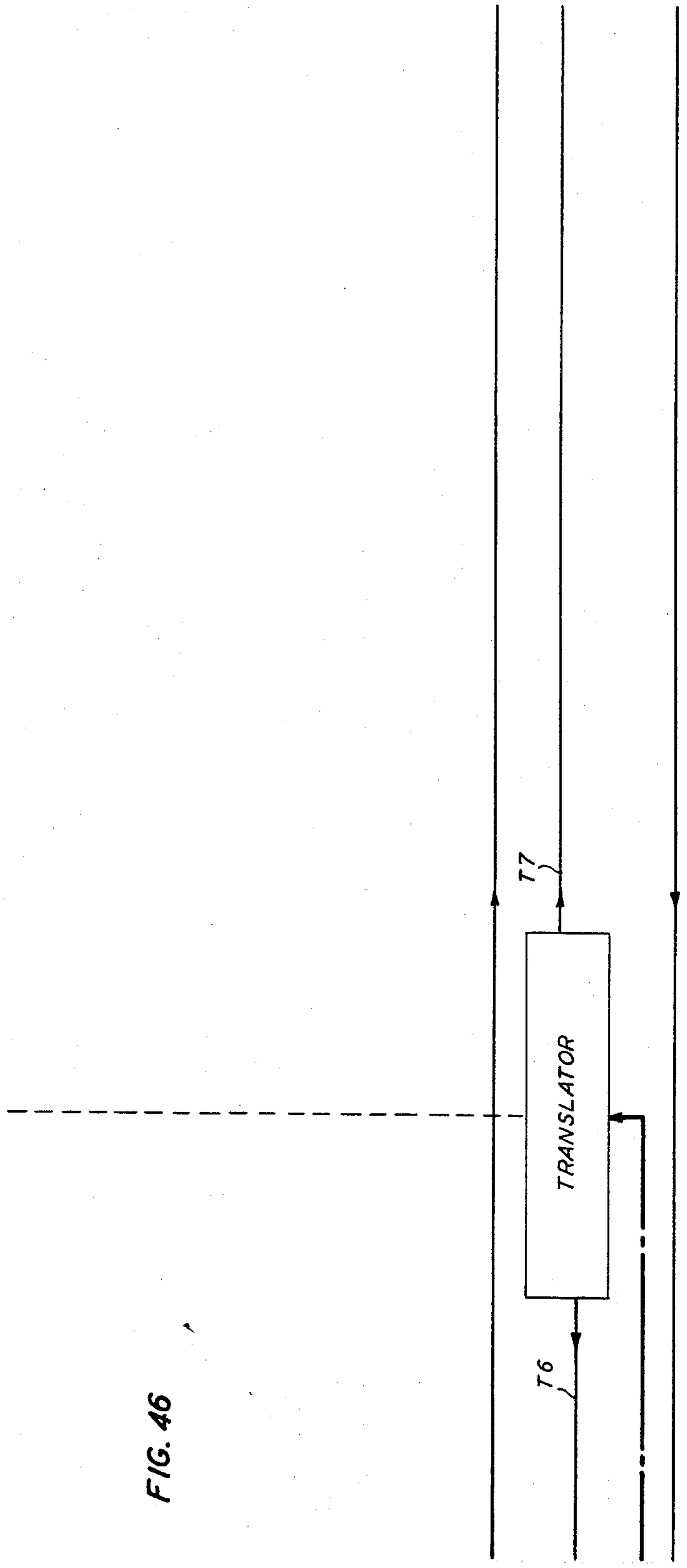
Figure 47:
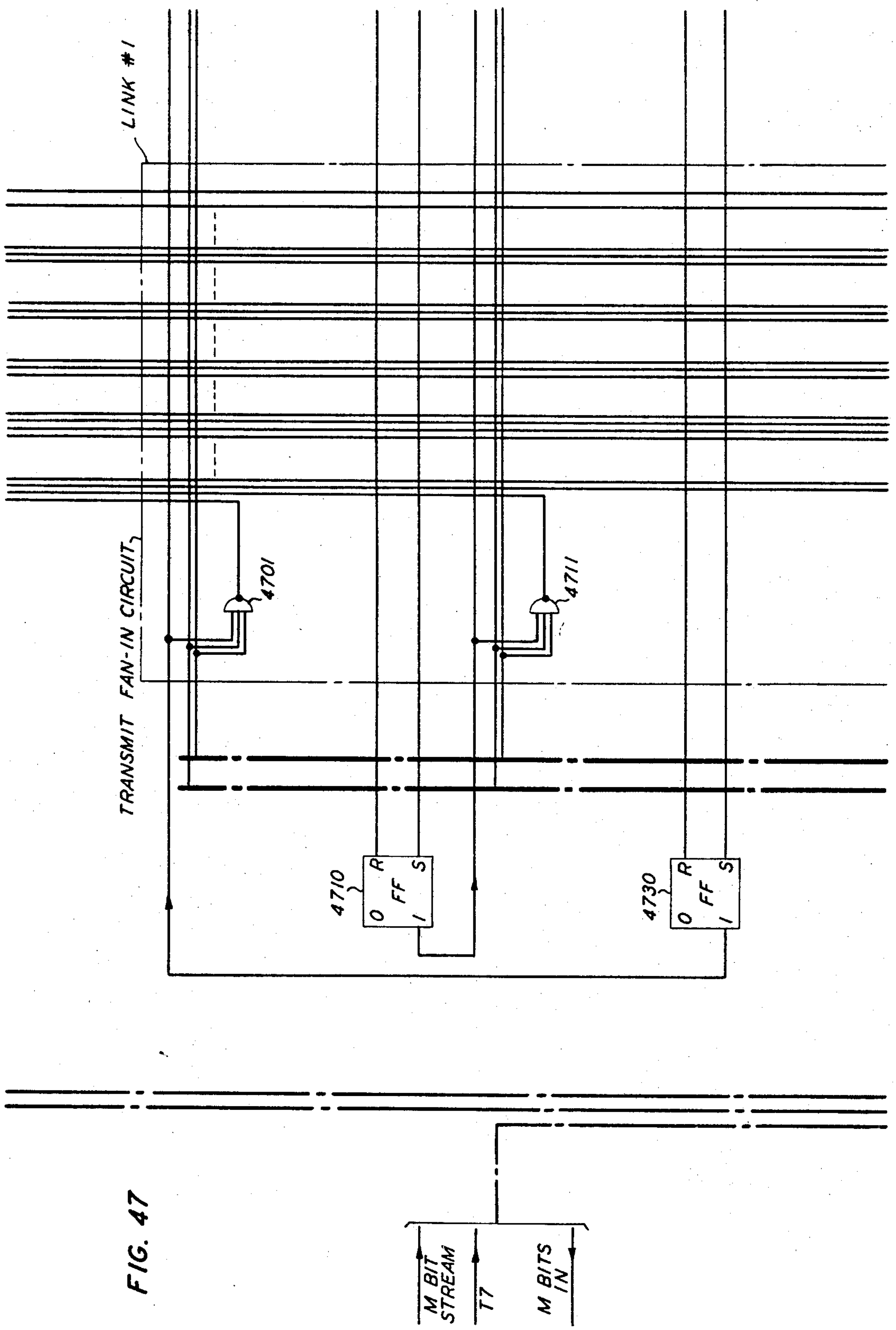
Figure 48:
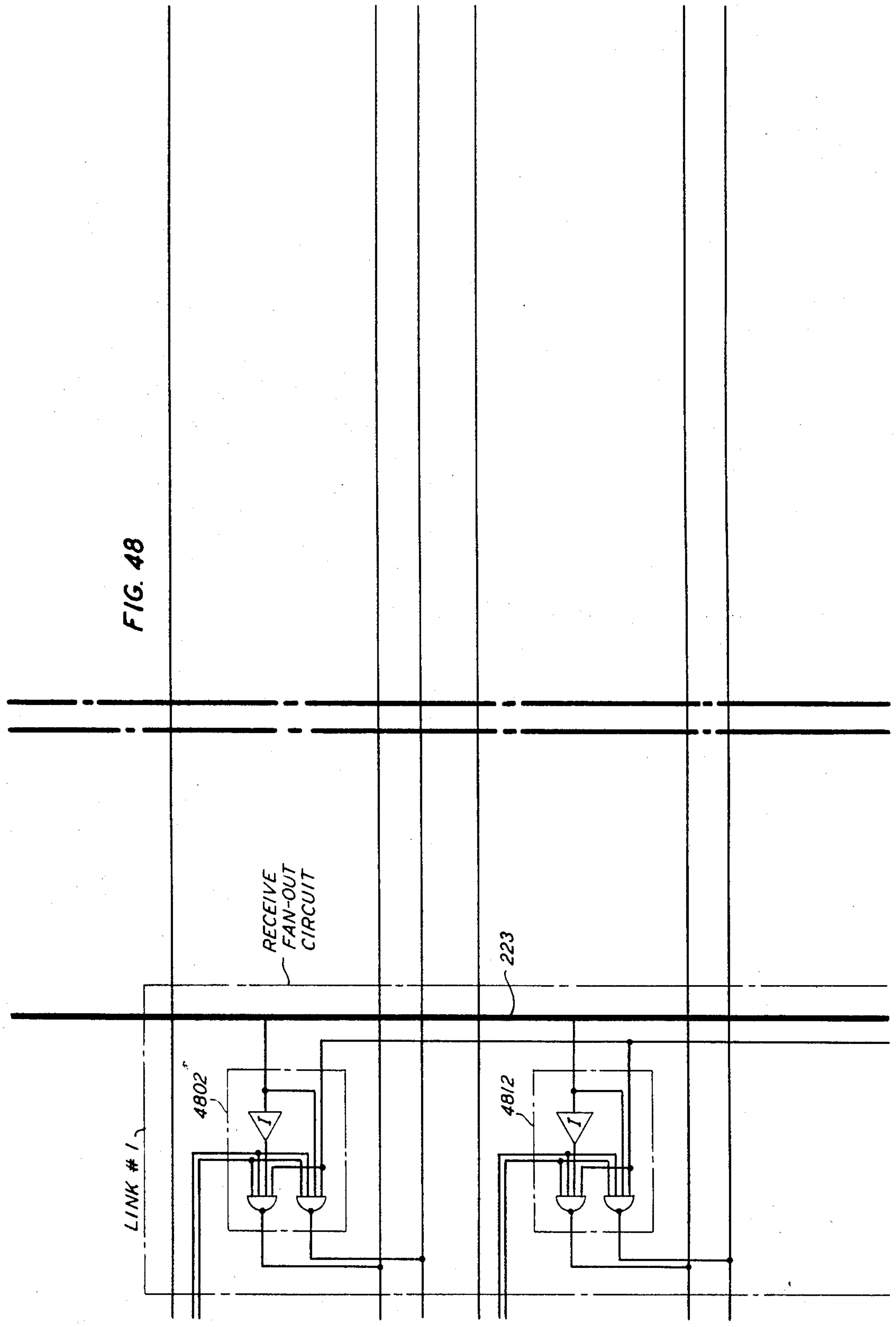
Figure 49:
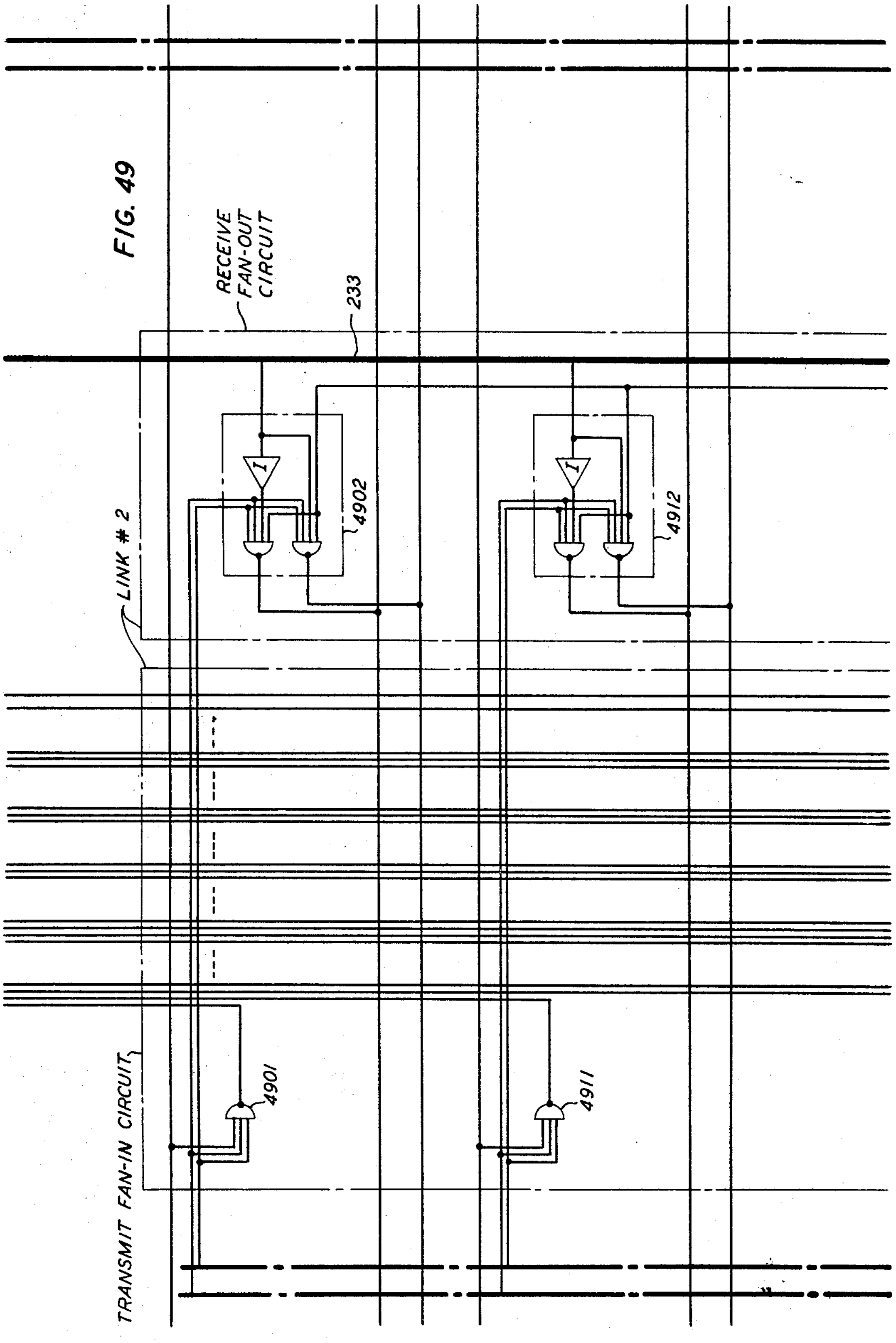
Figure 50:
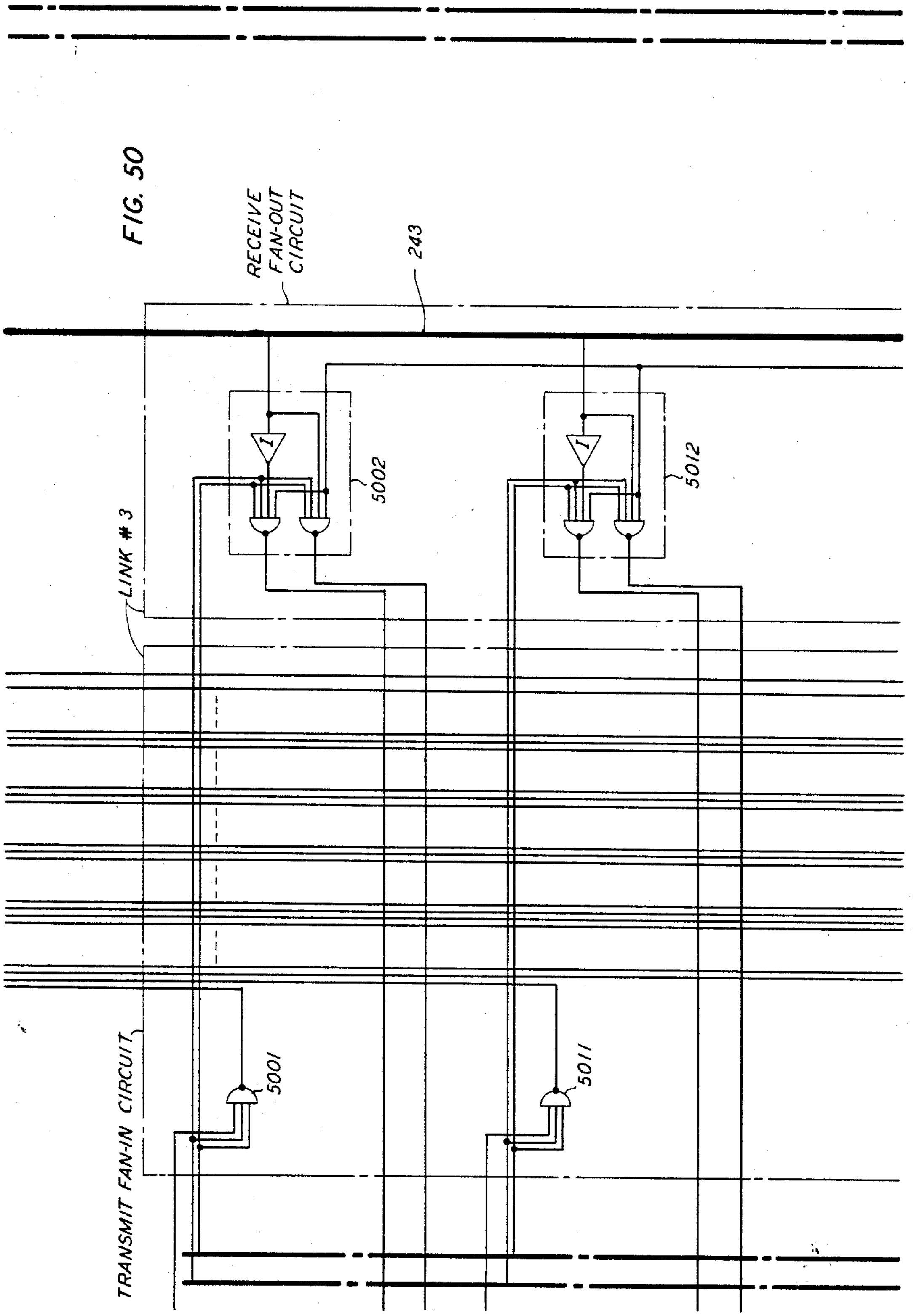
Figure 51:
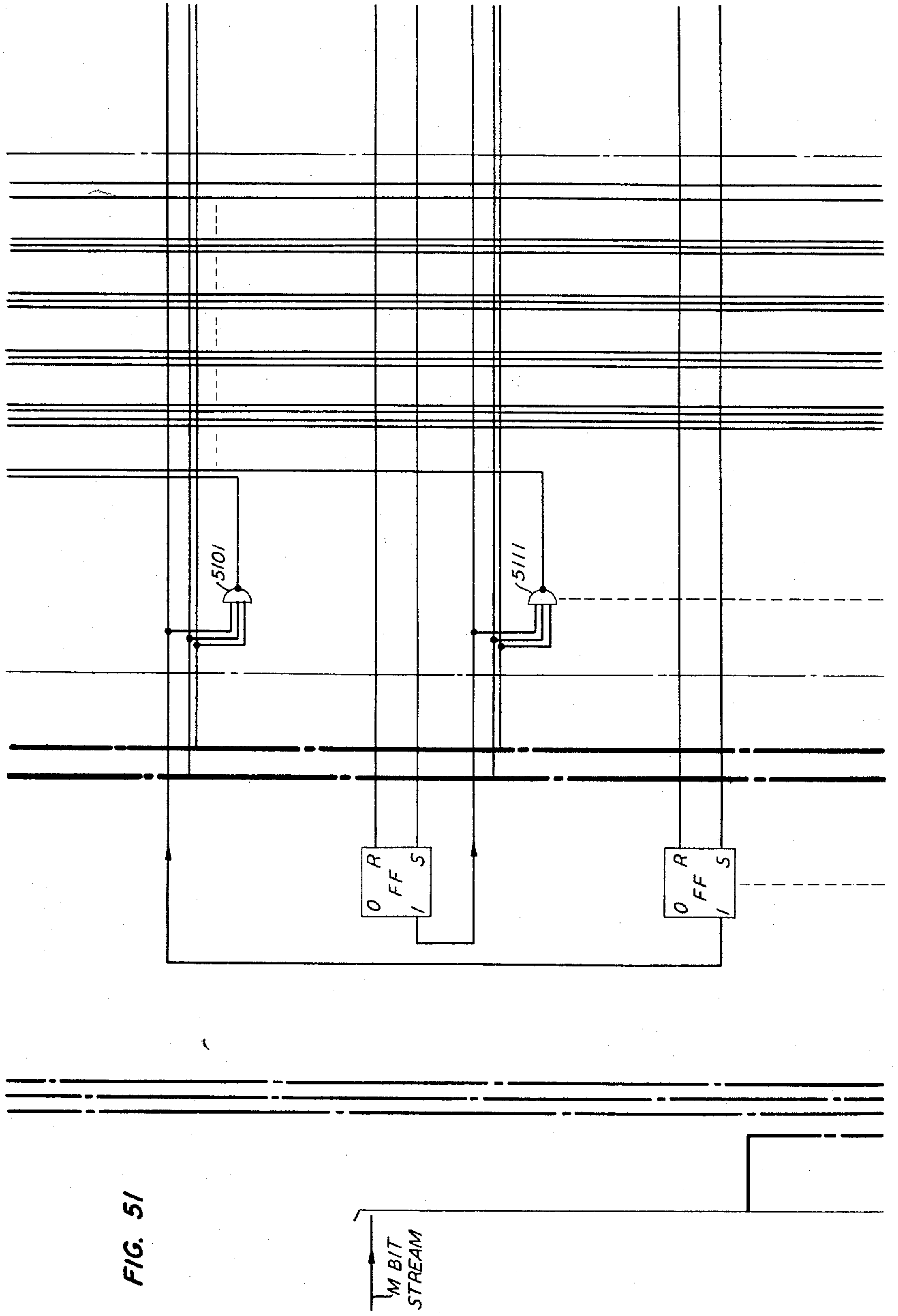
Figure 52:
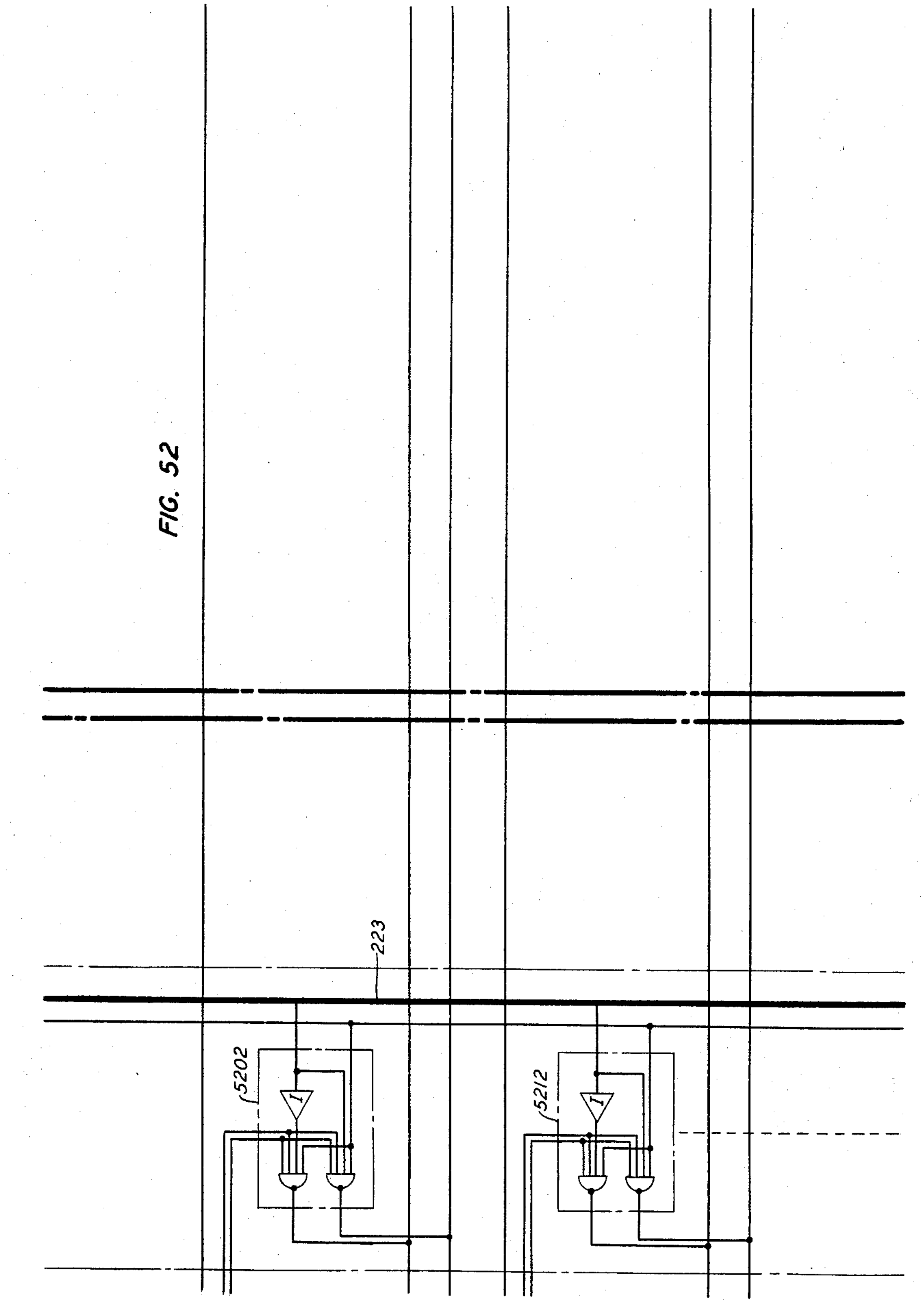
Figure 53:
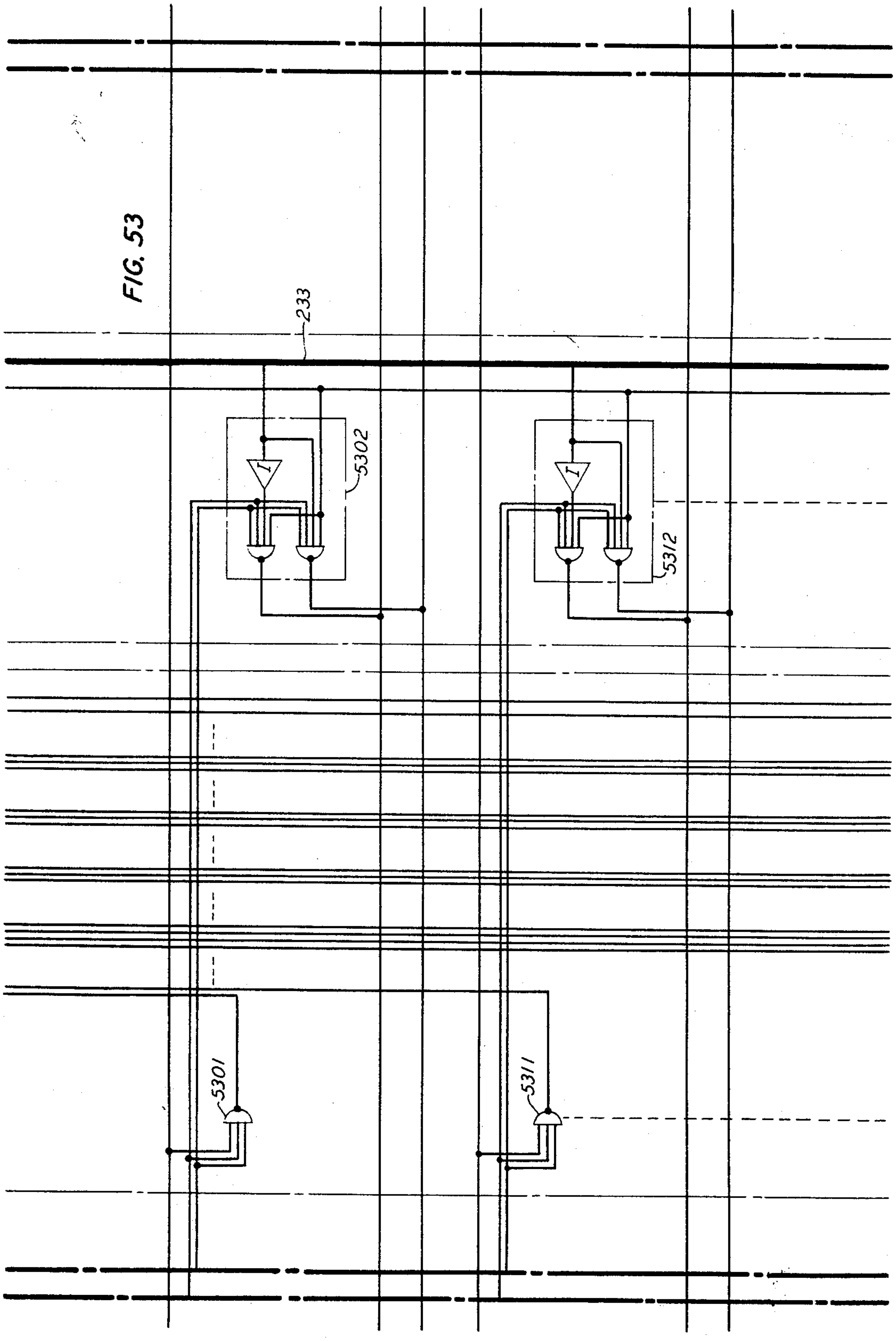
Figure 54:
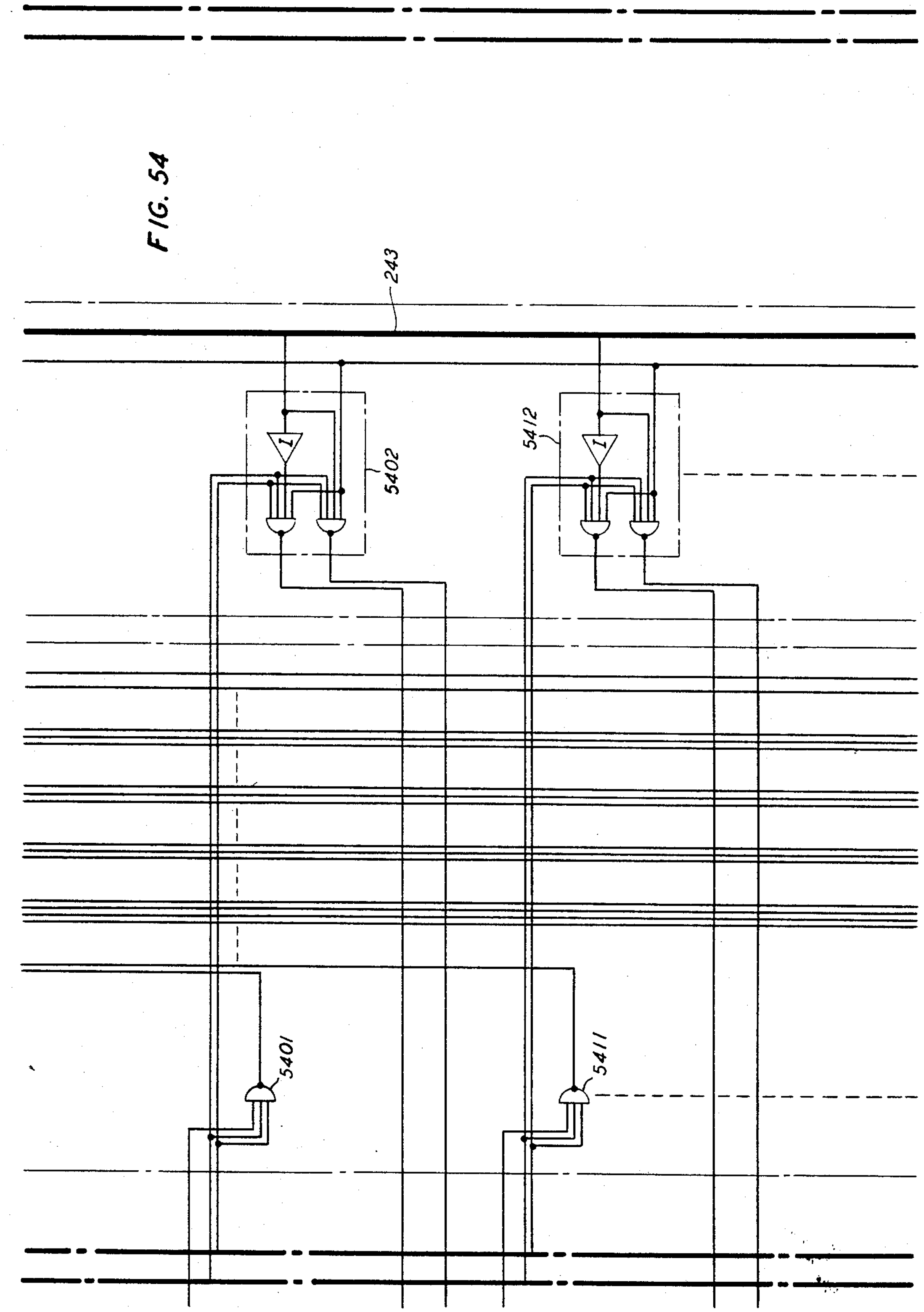
Figure 55:
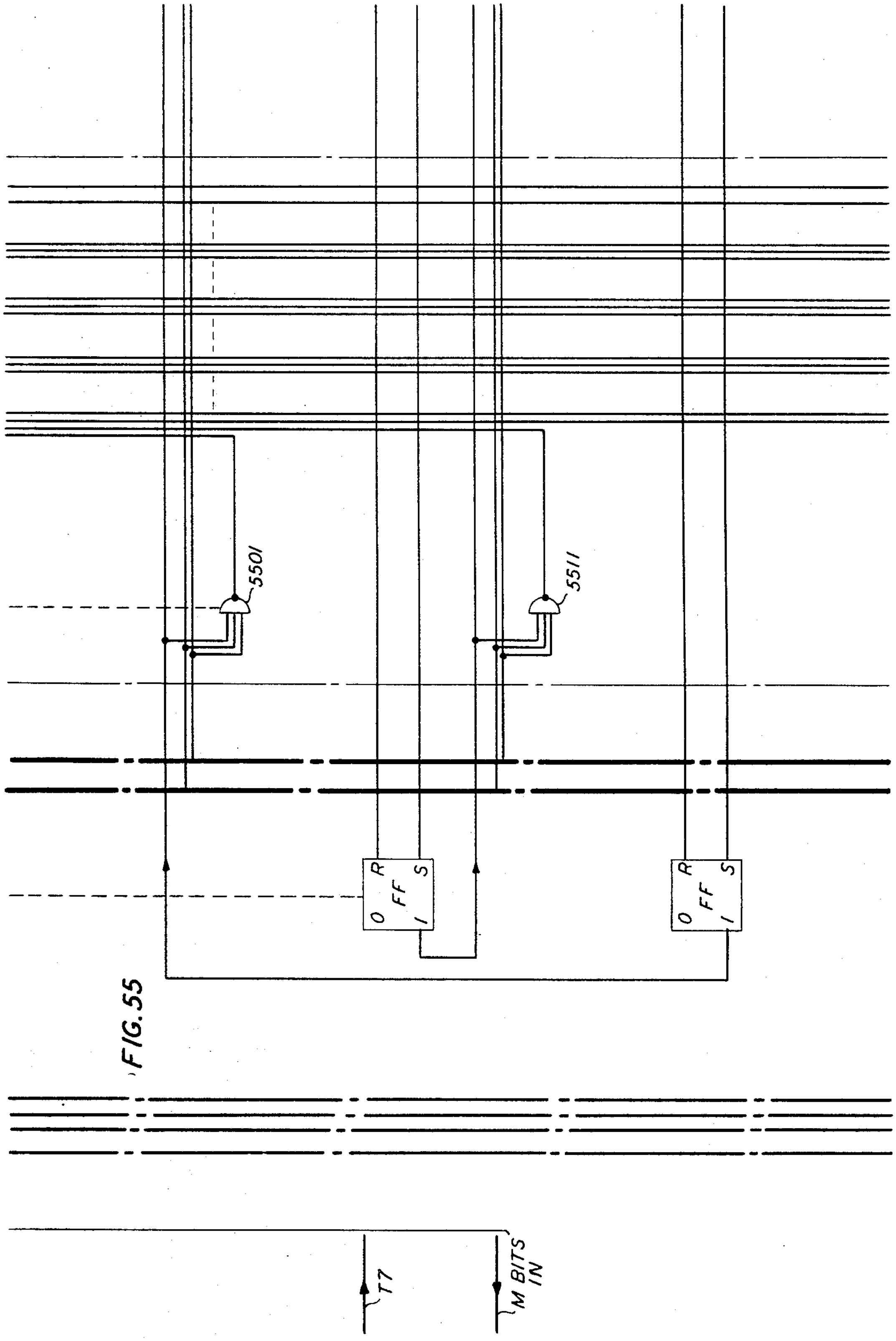
Figure 56:
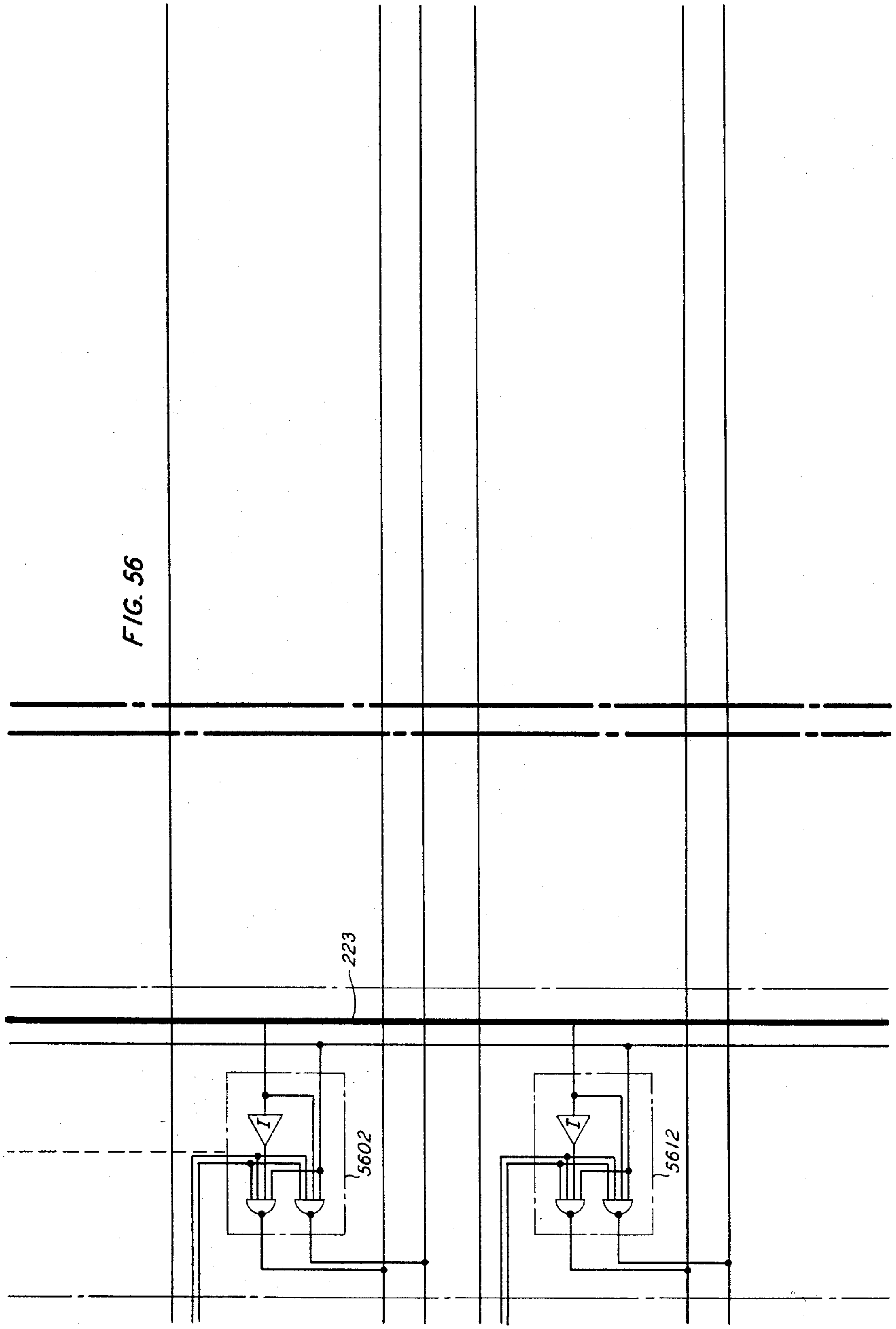
Figure 57:
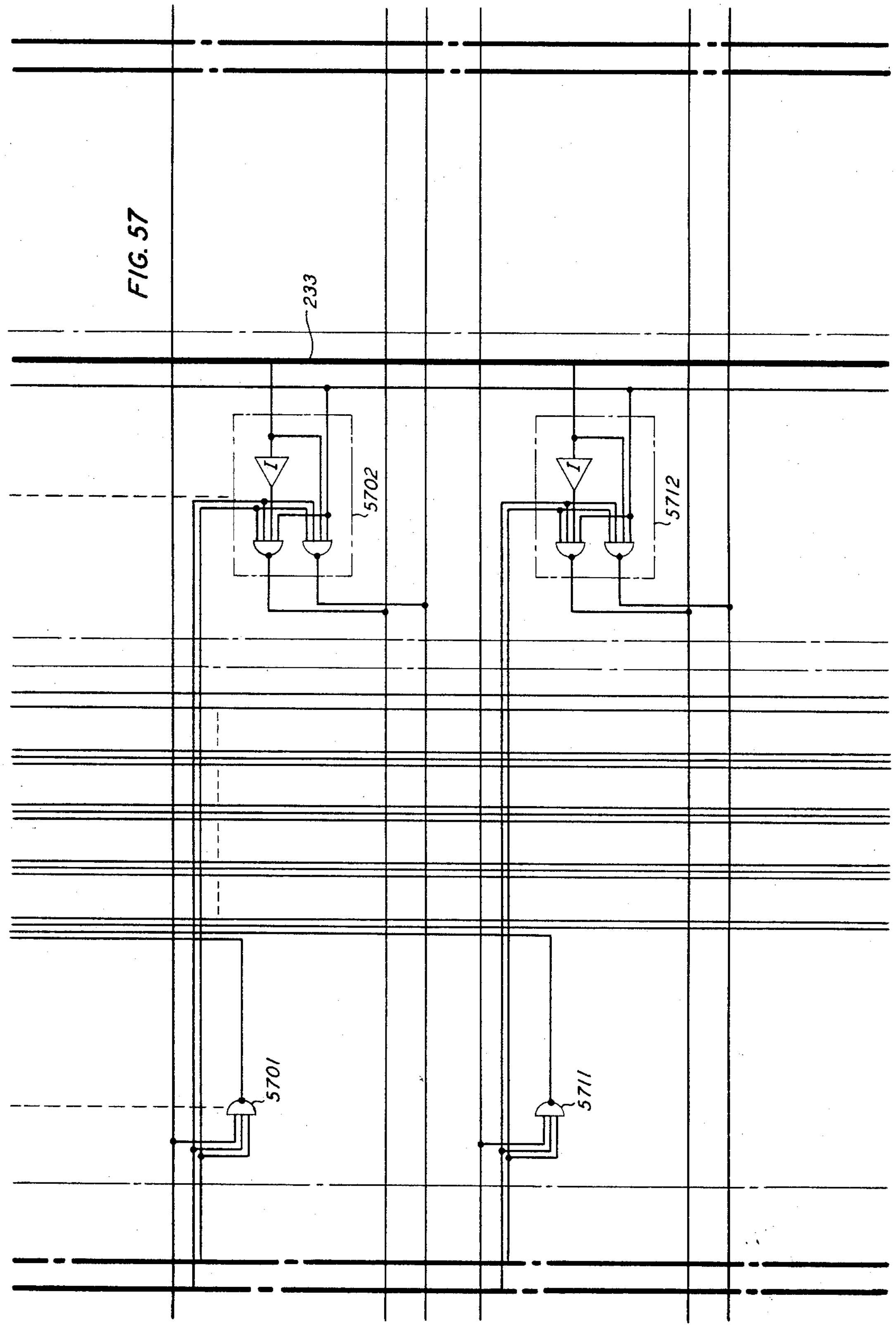
Figure 58:
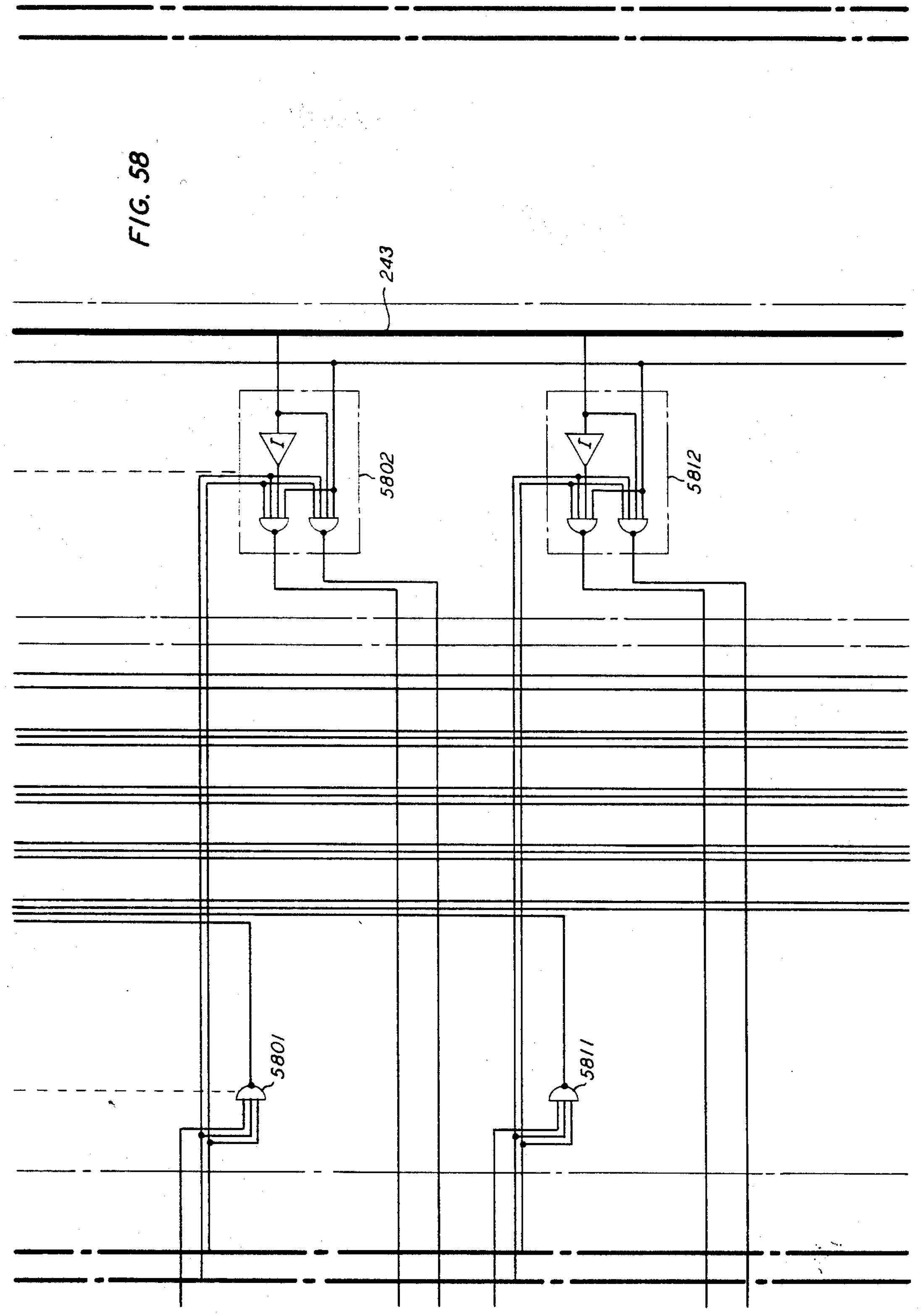
Figure 59:
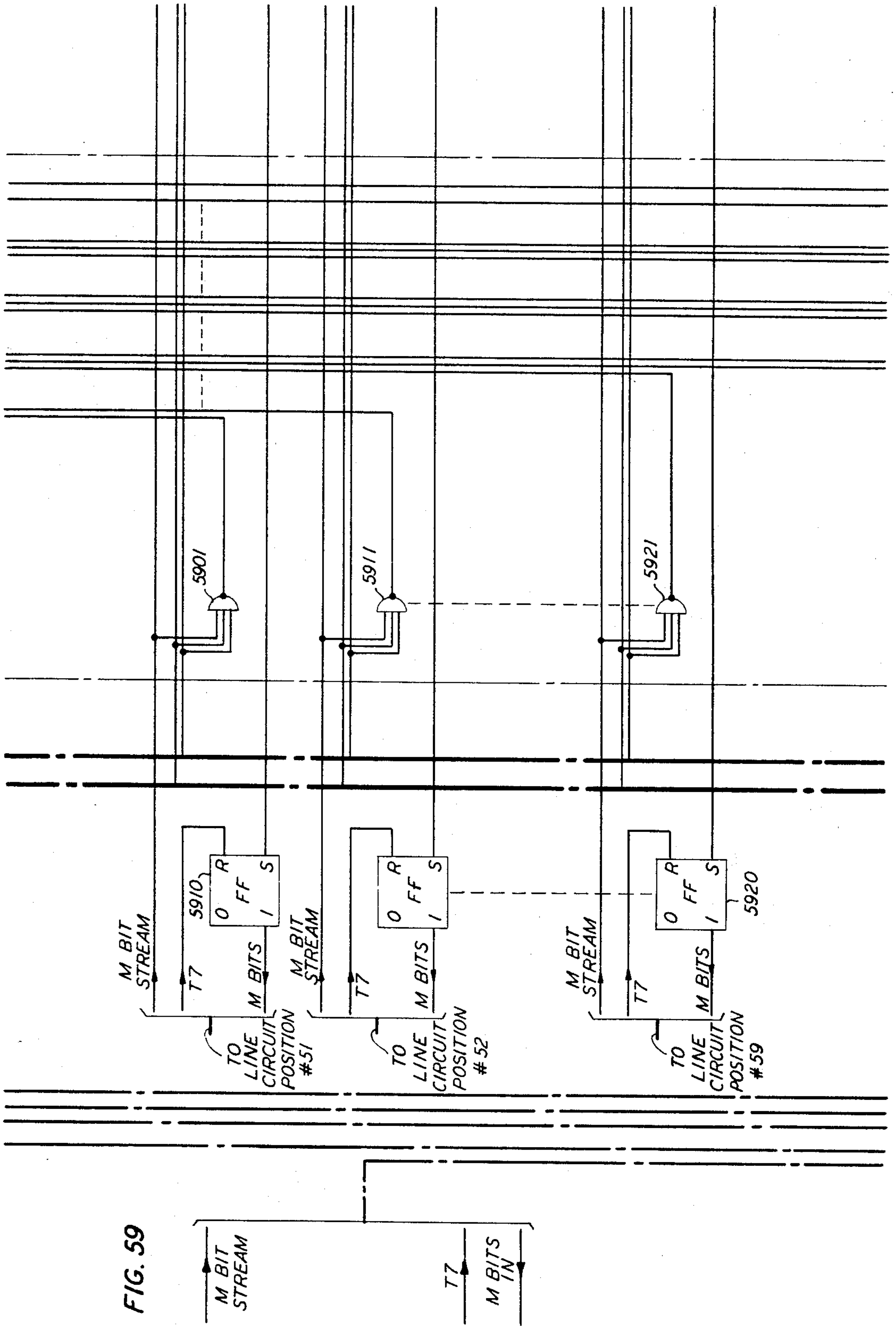
Figure 60:
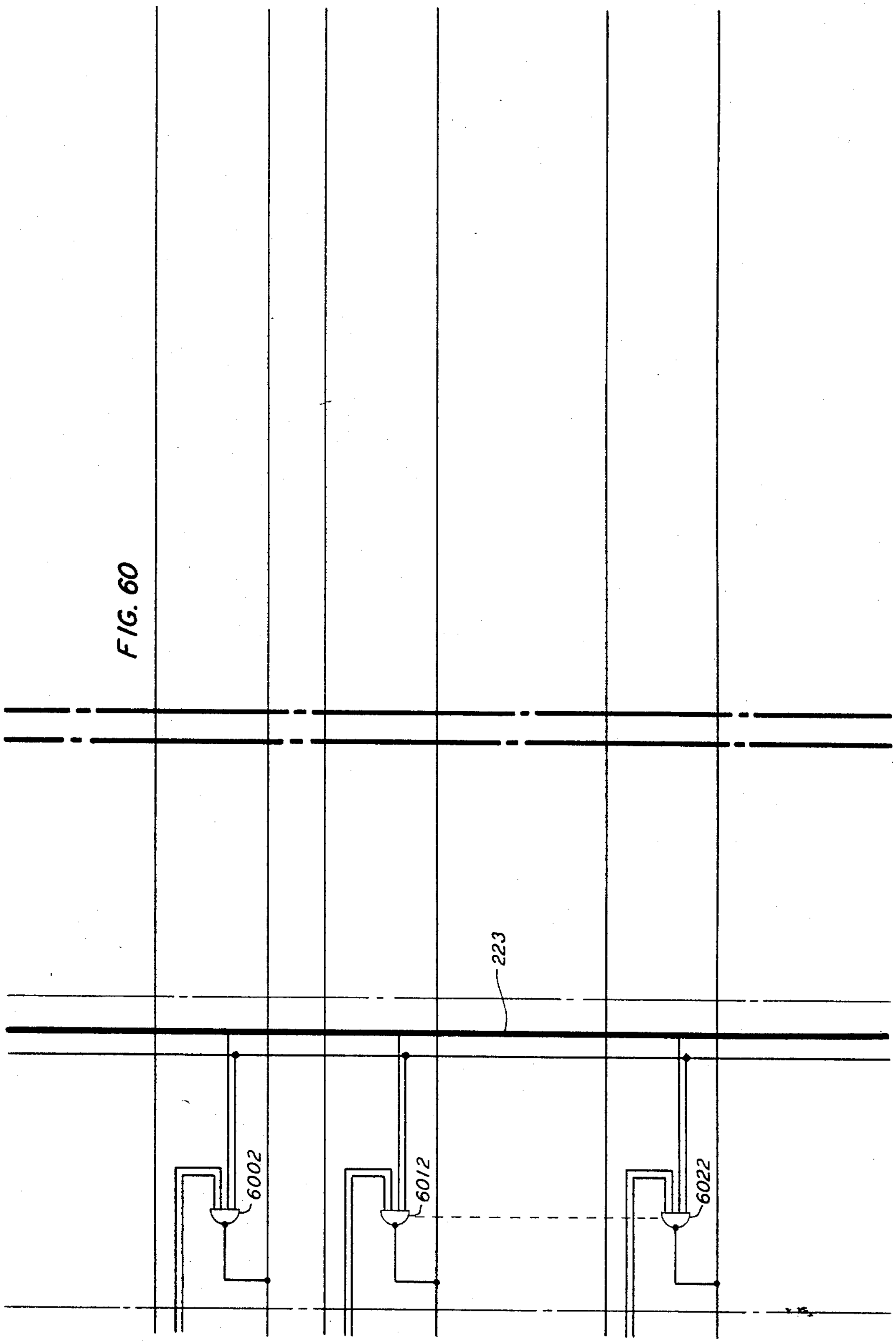
Figure 61:
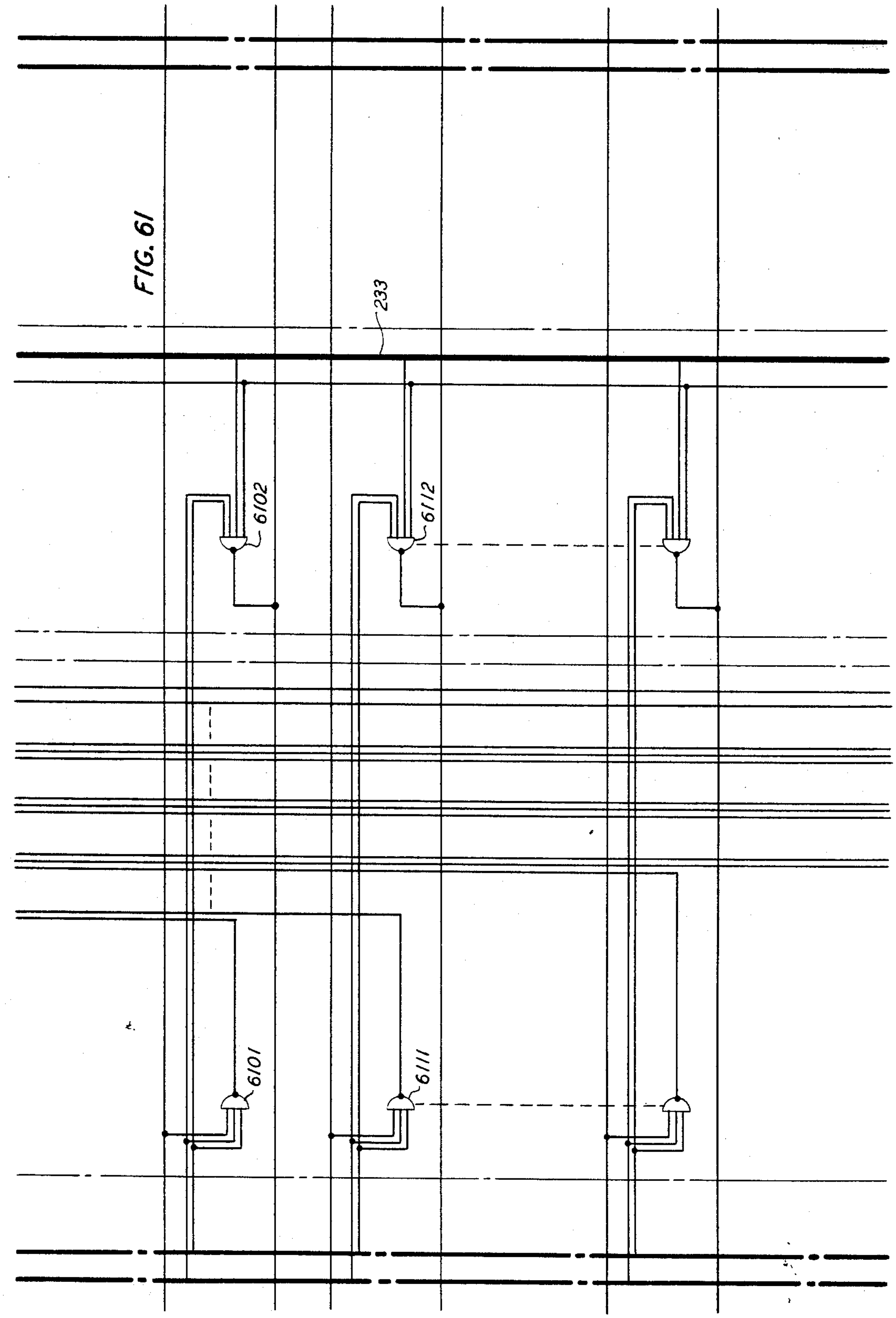
Figure 62:
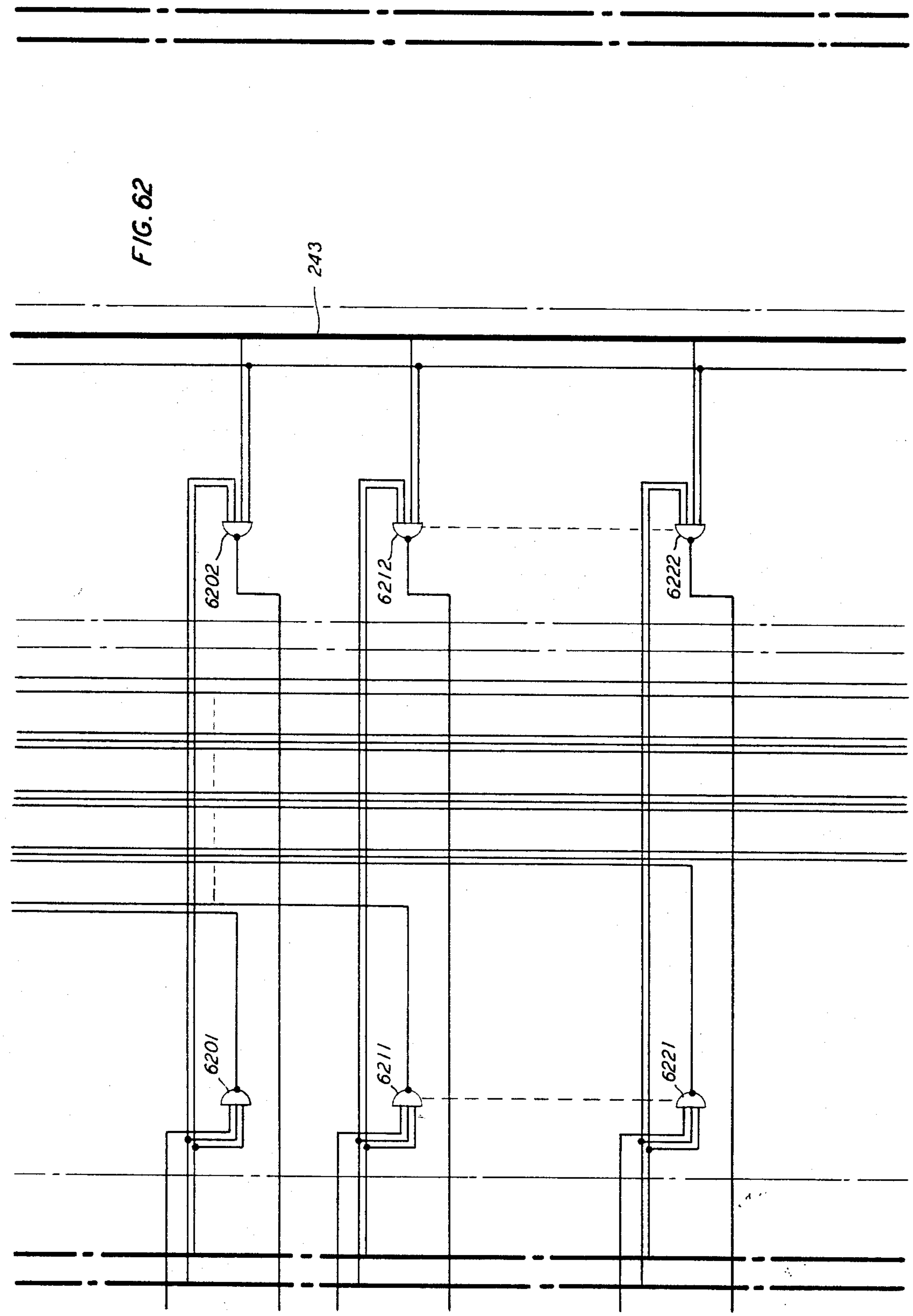
Figure 63:
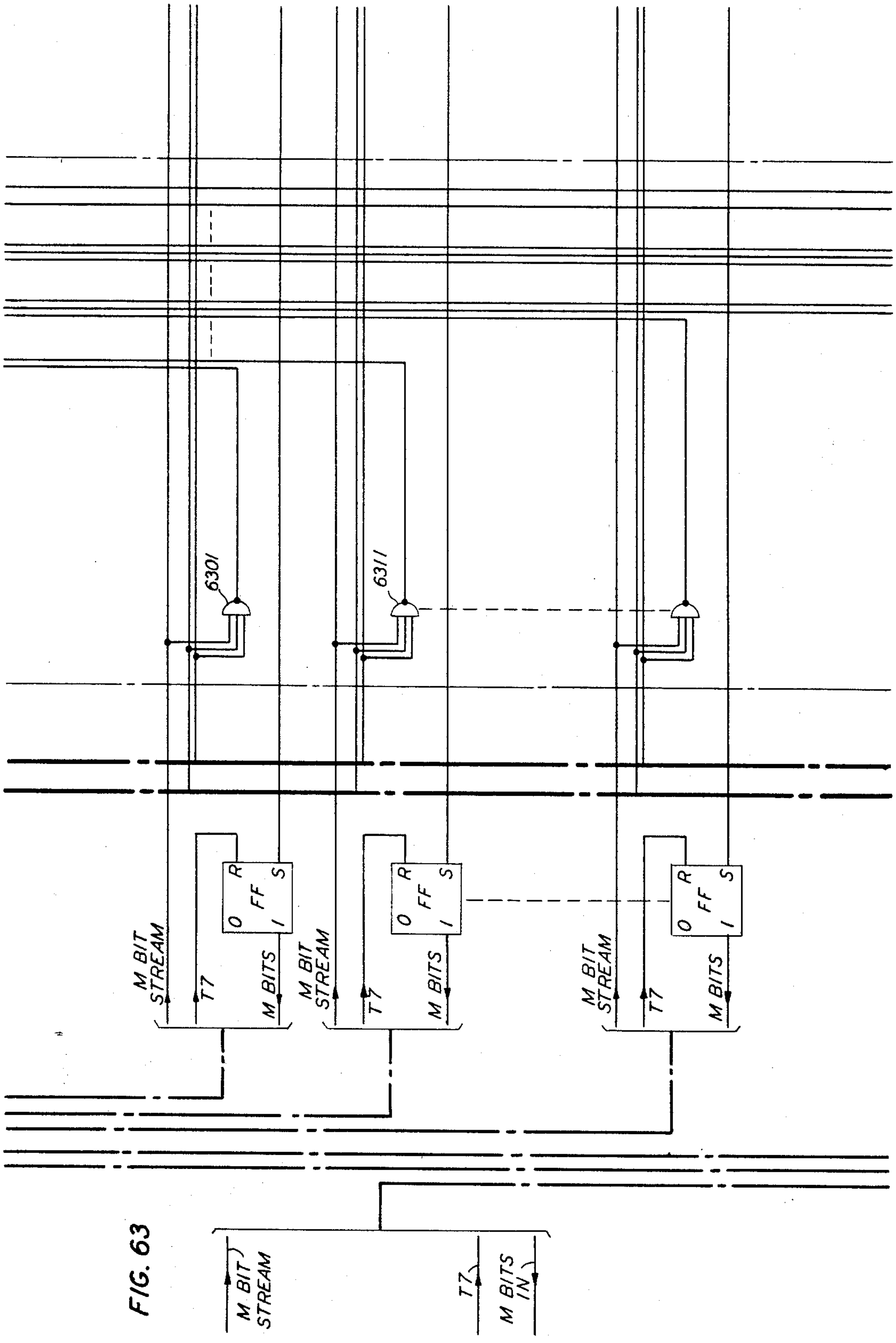
Figure 64:
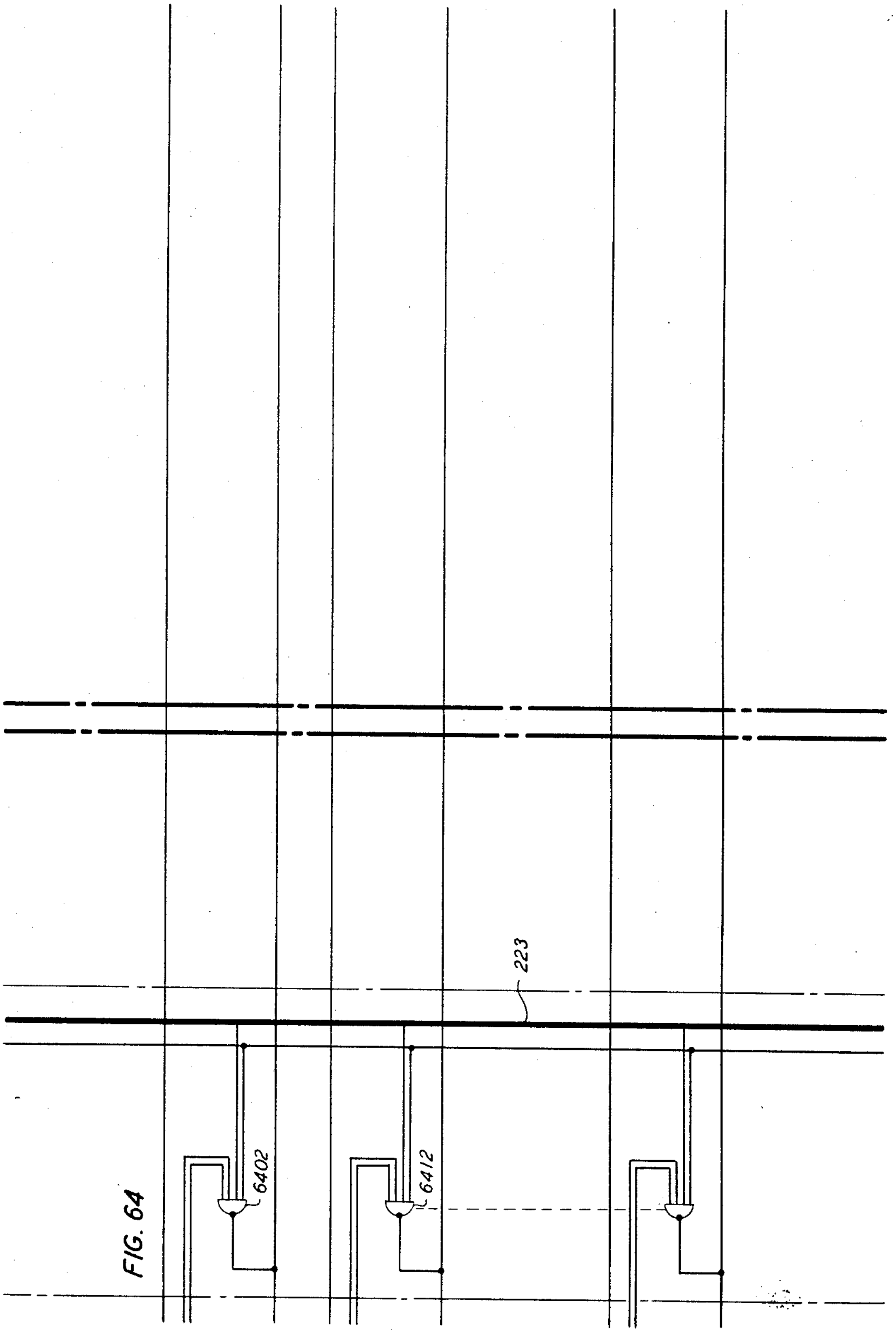
Figure 65:
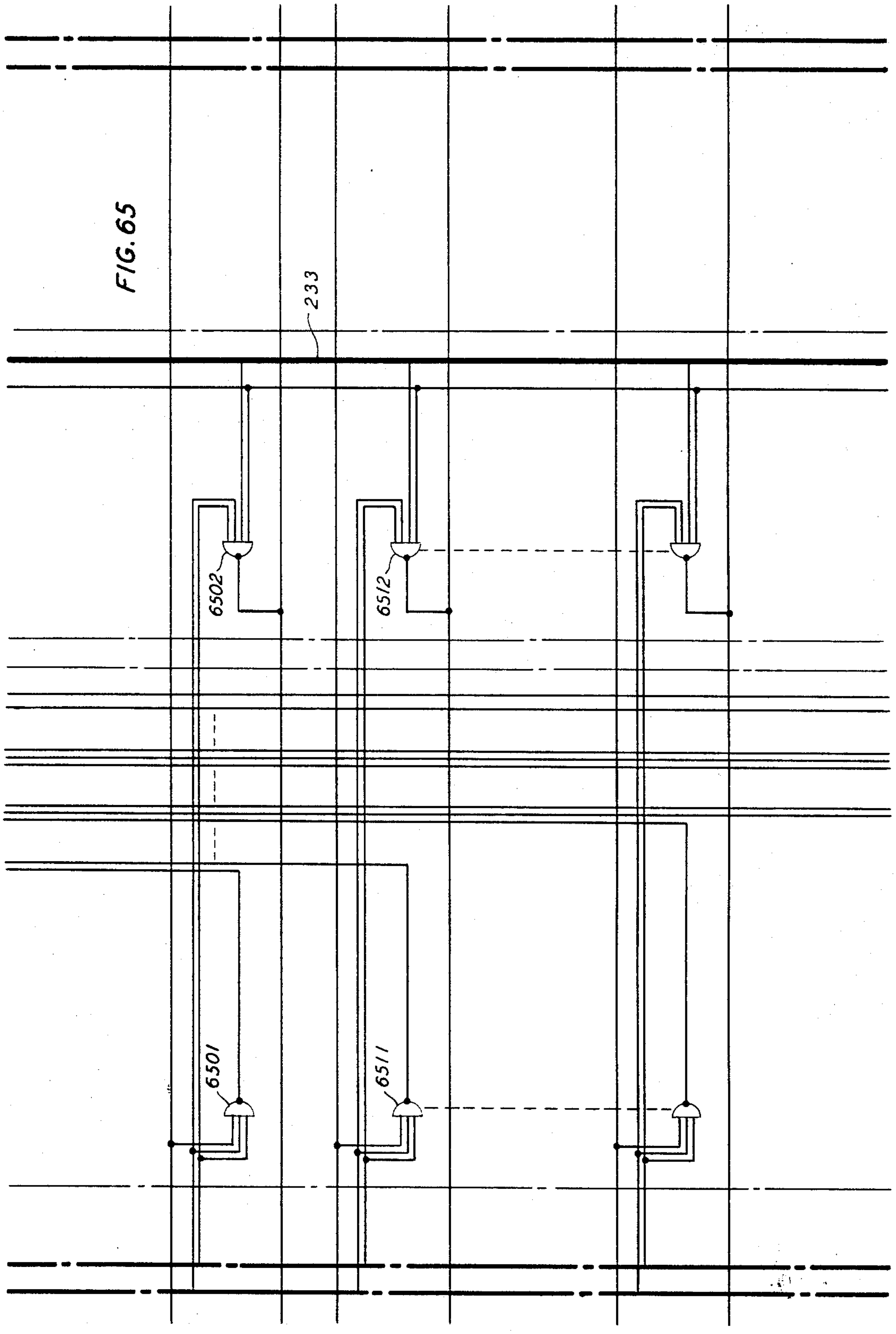
Figure 66:
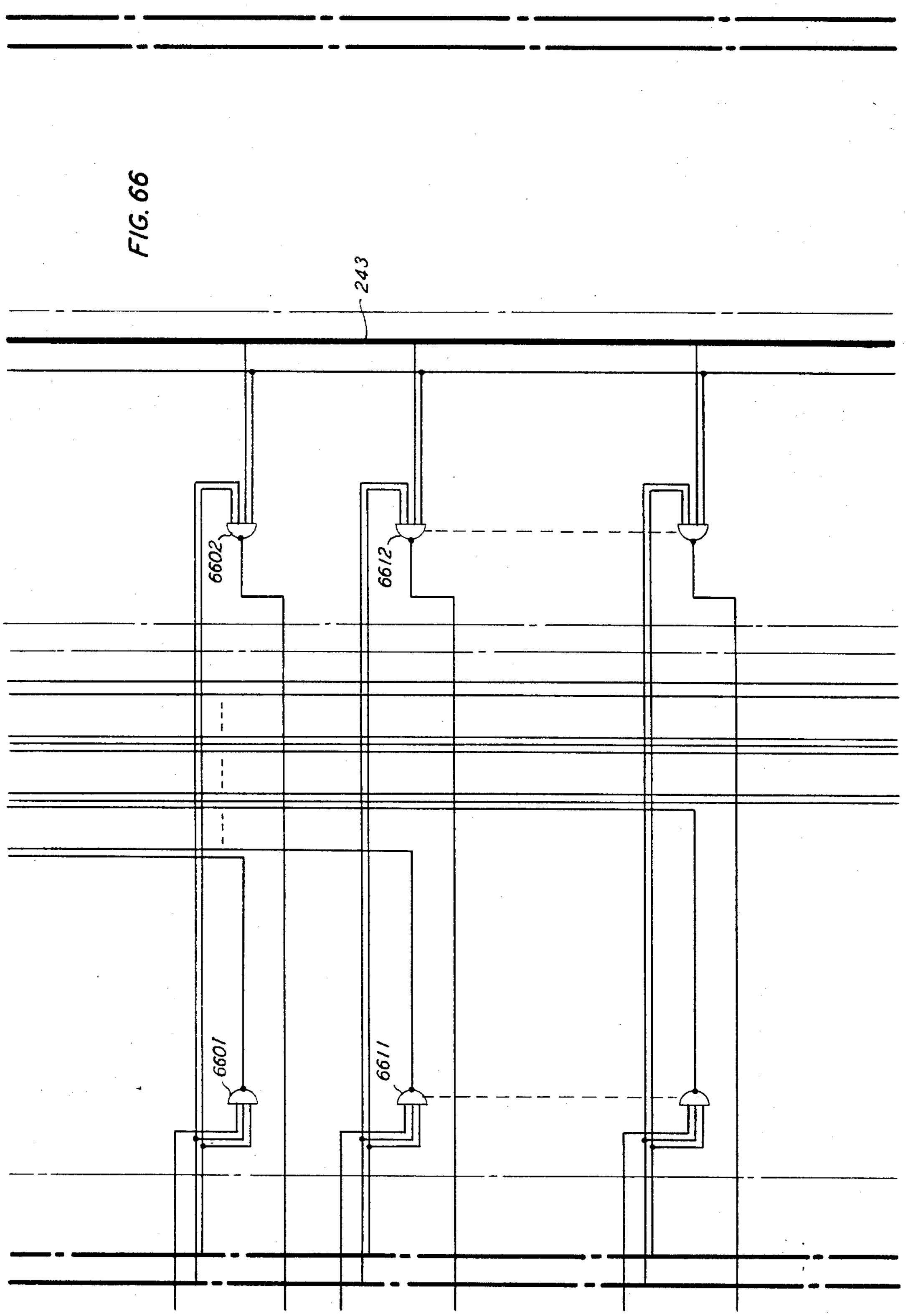
Figure 67:
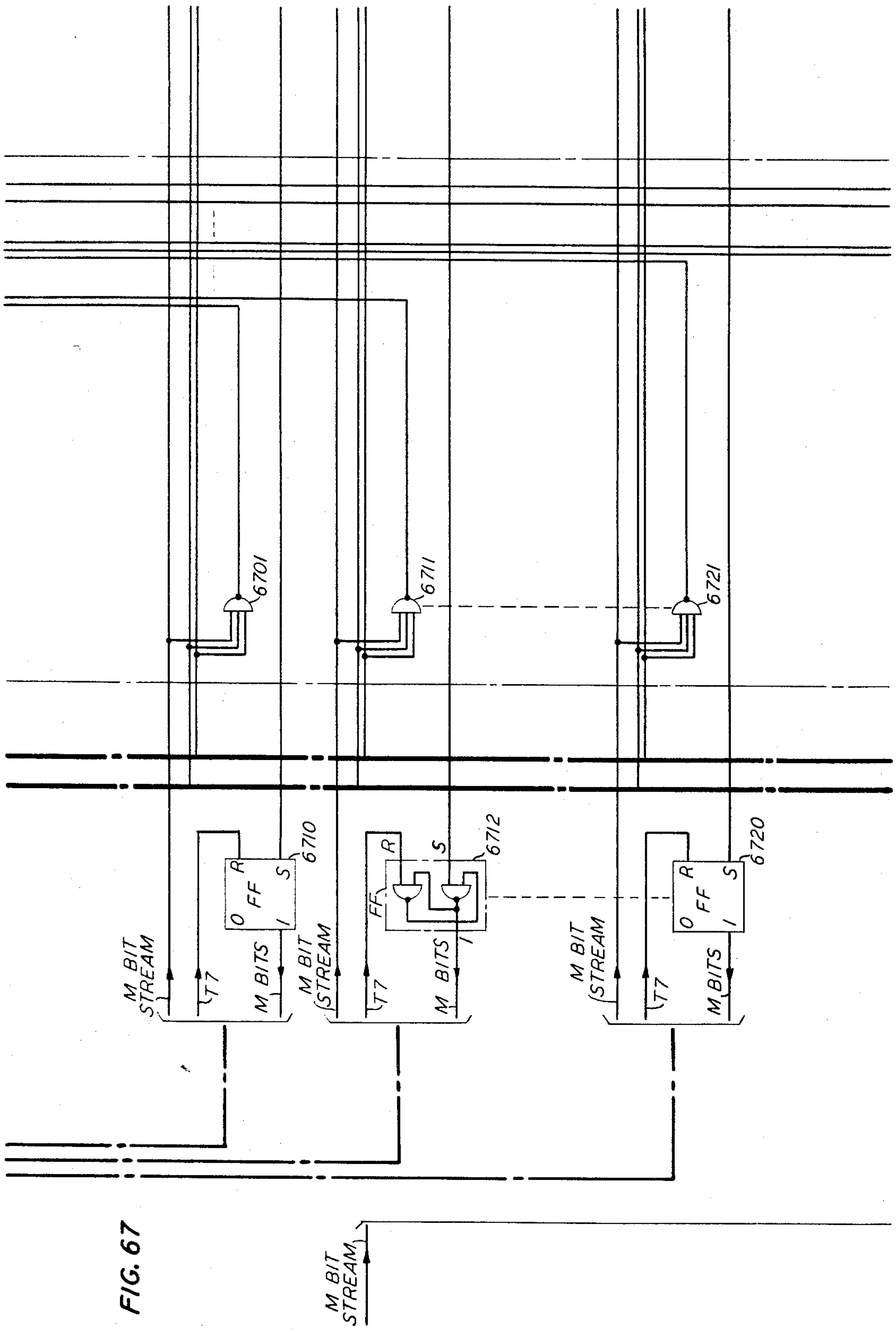
Figure 68:
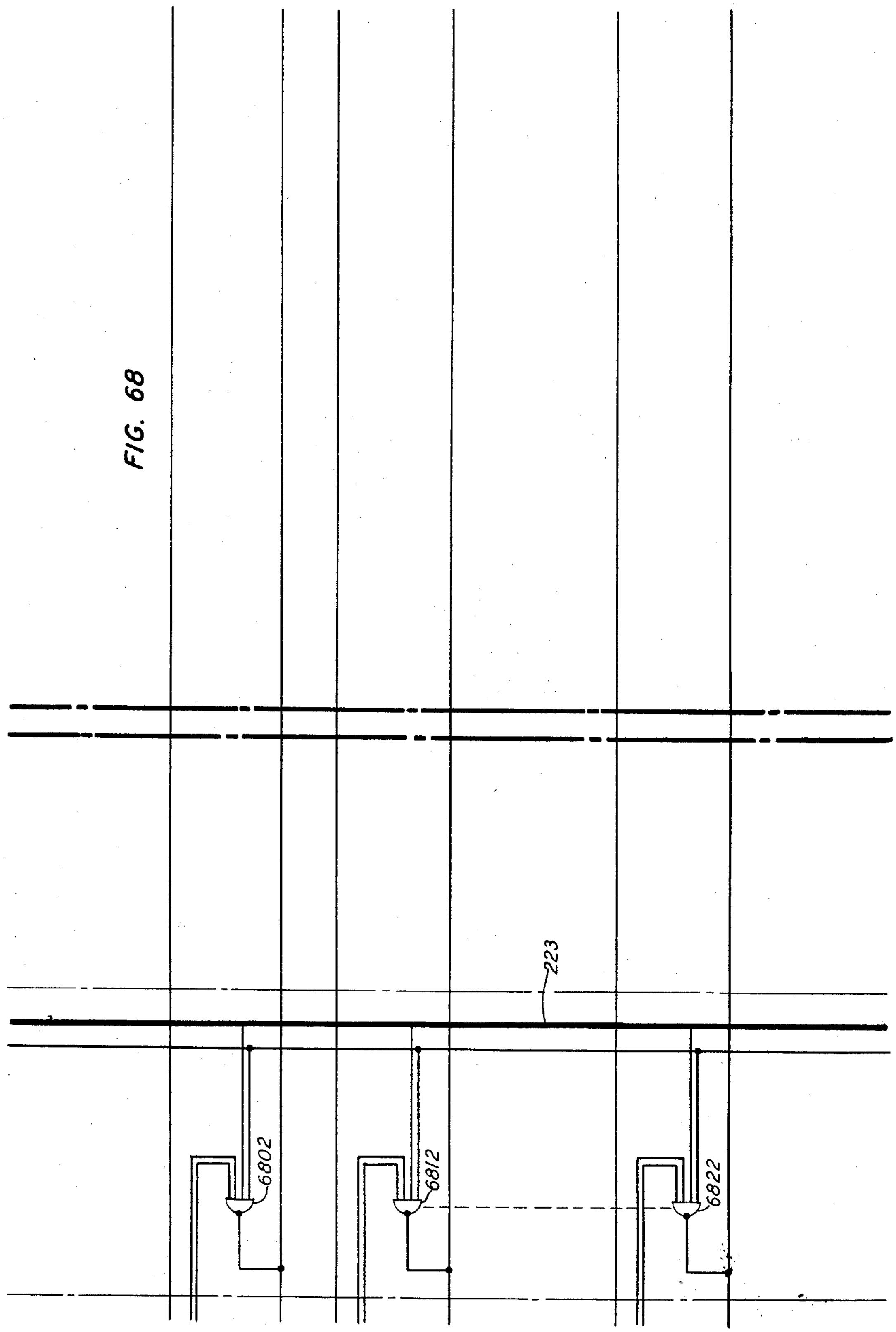
Figure 69:
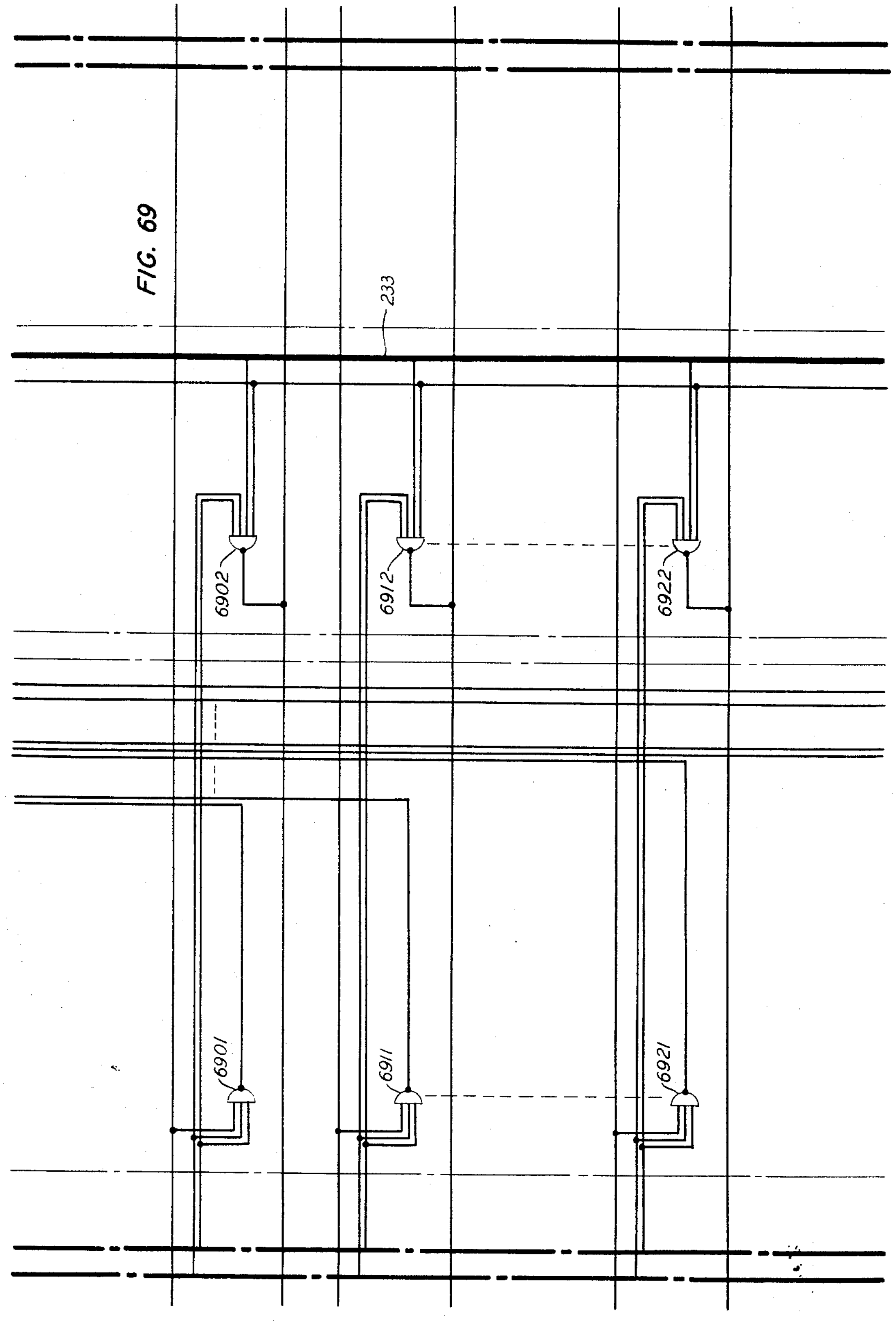
Figure 70:
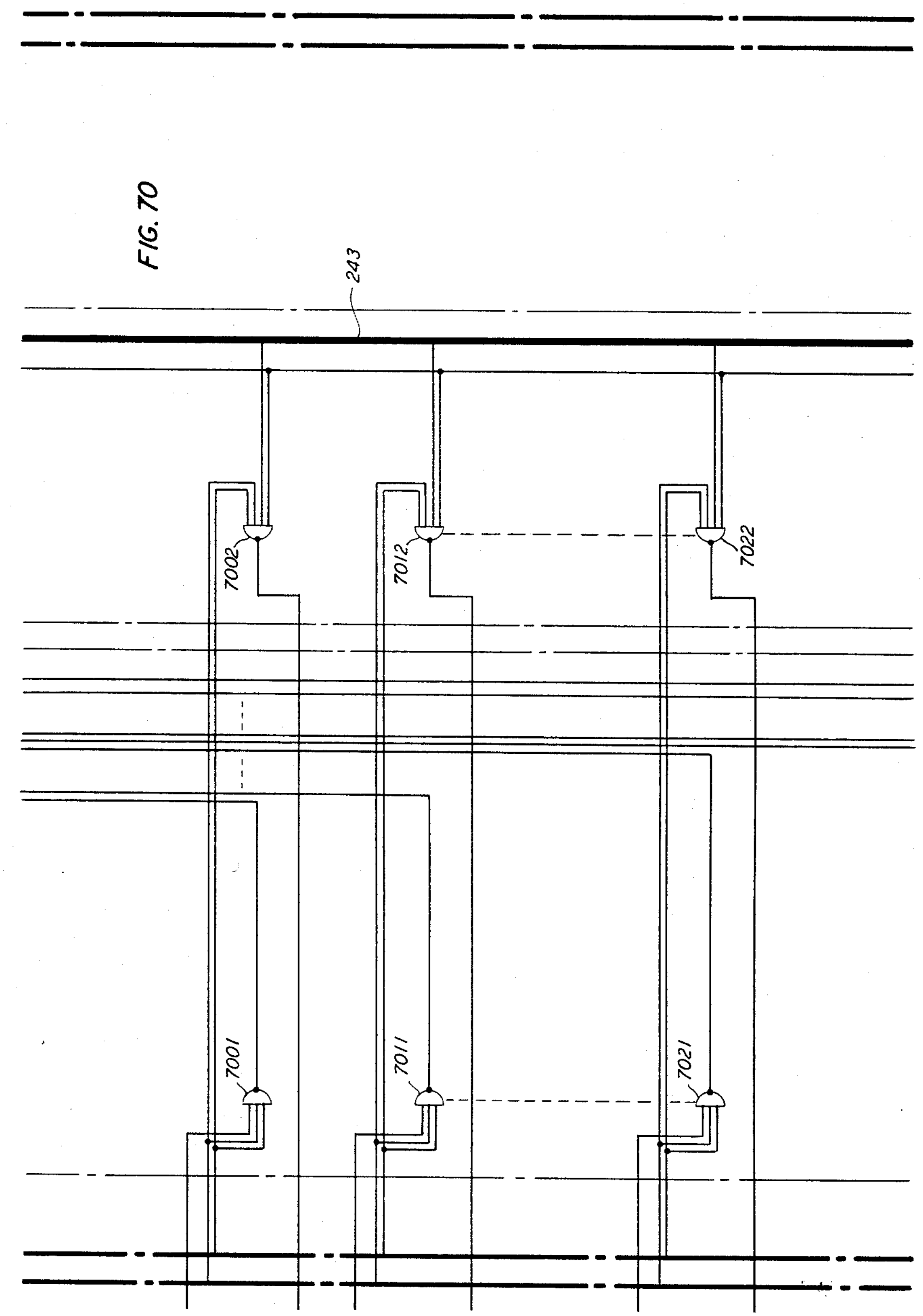
Figure 71:
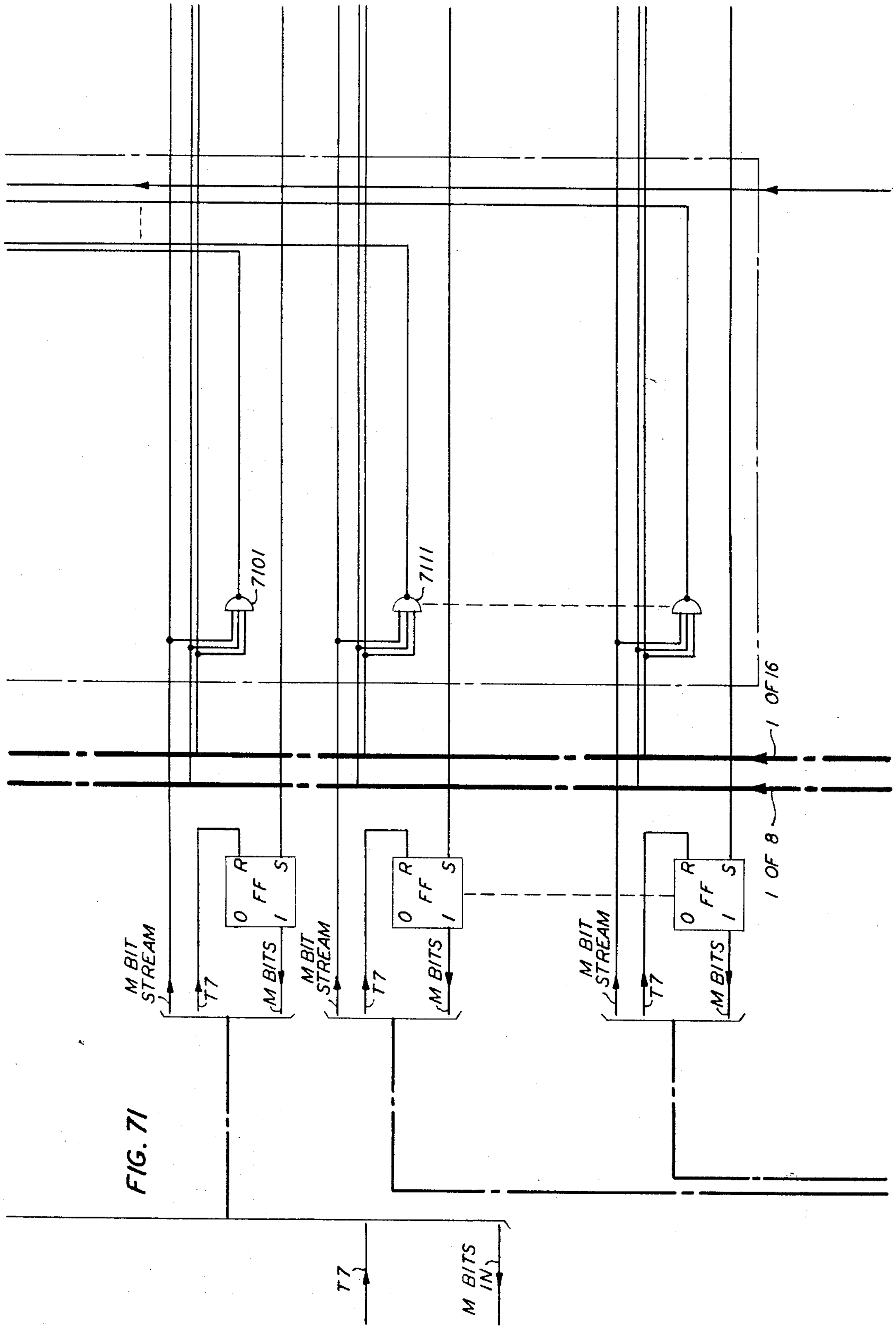
Figure 72:
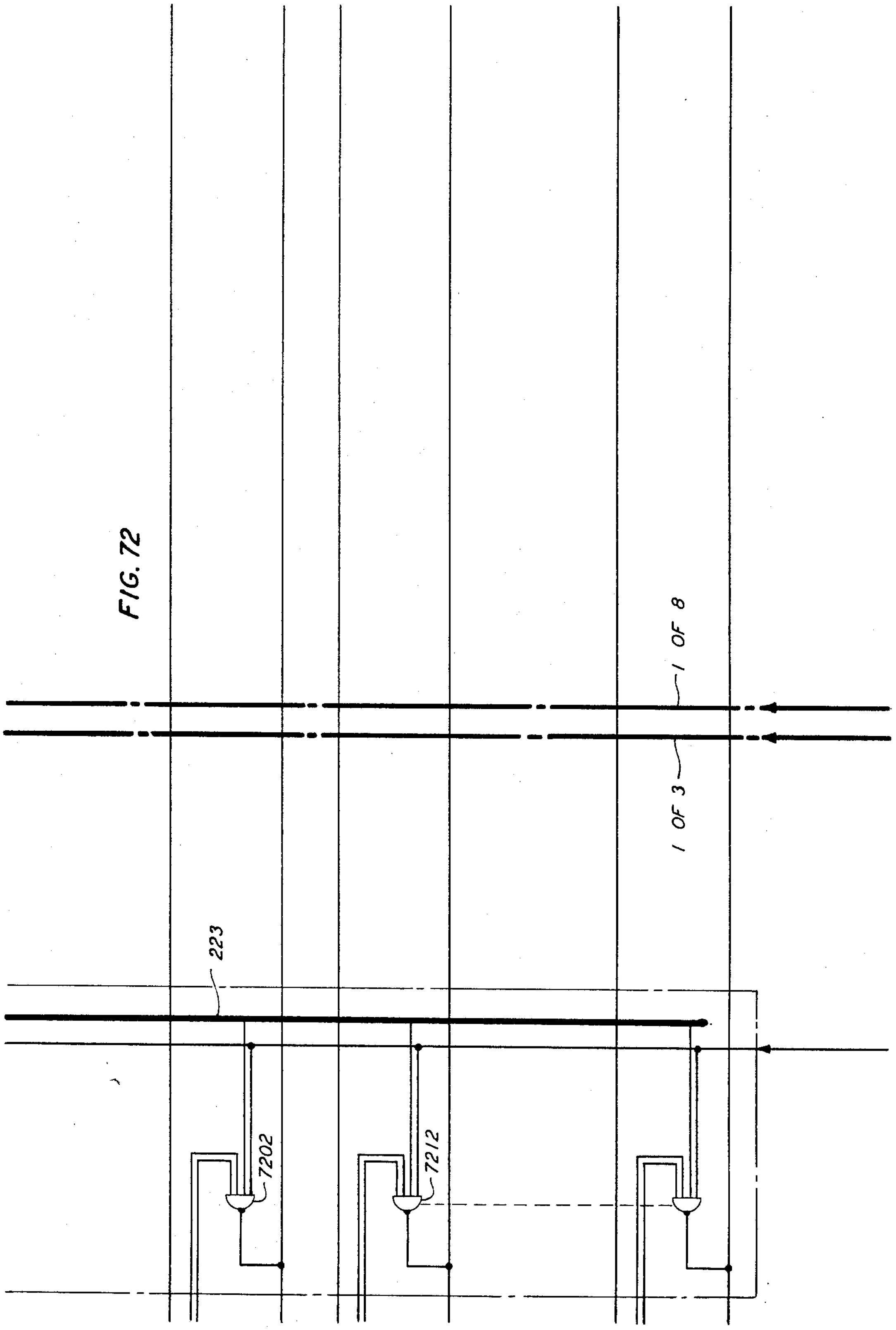
Figure 73:
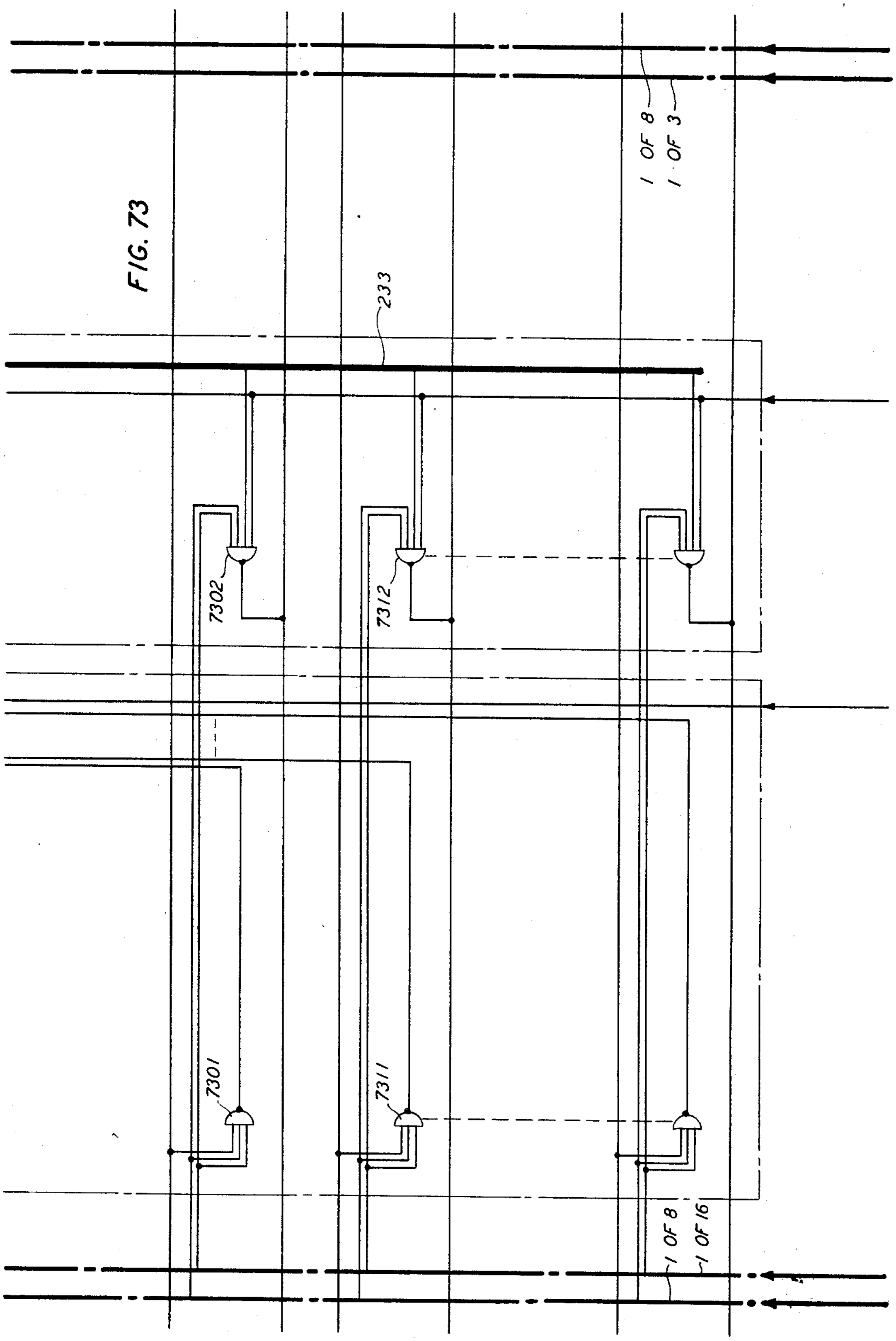
Figure 74:
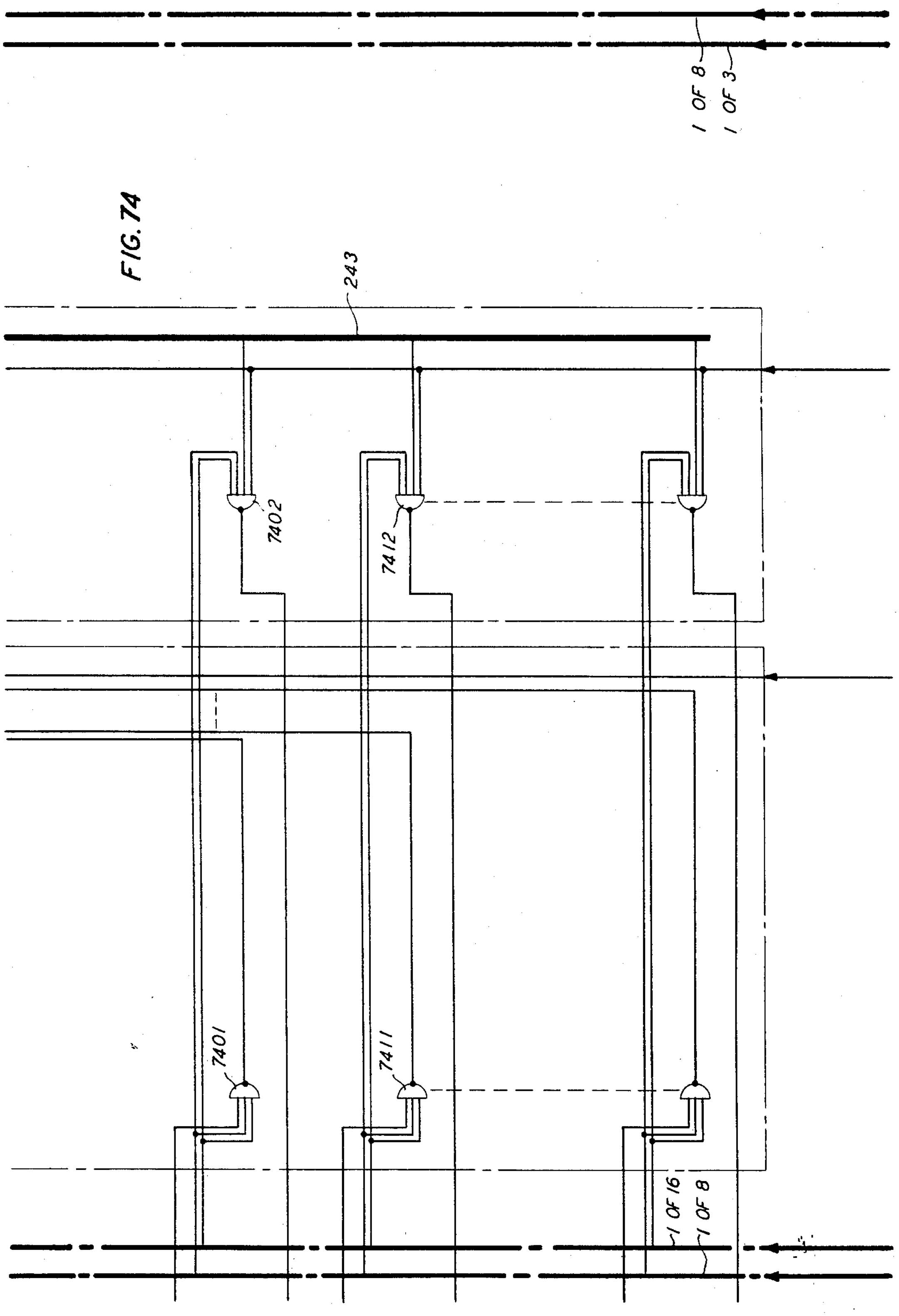

A typical intraoffice terminal circuit is illustrated in detail in FIG. 39 of the drawings. The terminal circuit 3900 comprises a flip-flop and and a single-to-double rail logic circuit for each direction of transmission. The flip-flops 3940 and 3902 are the functional equivalents of the flip-flops 1040 and 1402. As in the case of the latter flip-flops, bits are read into the flip-flops 3940 and 3902 under the control of the T6 sampling pulses. These T6 pulses are derived in translator 4010 in accordance with the foregoing tables. The line-link flip-flop reset pulses T7 are also derived in this translator.

*Switching matrix*

The TDS matrix is designed in modular form to permit ready expansion when office demands increase. A minimum office (i.e., one matrix module, as shown in the drawings) can serve up to 127 lines, and/or trunks. When demand increases, the office may be expanded in blocks of 127 lines (i.e., a matrix module at a time) up to a total of 1016 (i.e., eight modules).

A matrix module capable of serving up to 127 lines and trunks is illustrated in FIGS. 41–44 and 47–74 of the drawings. The module consists of three links which together form one link group. Each link comprises a Transmit Fan-In Gate Circuit having an output link transmit bus 221, 231 and 241 respectively (note, like parts are designated with like reference numerals throughout the figures) and a Receive Fan-Out Gate Circuit having an input link receive bus 223, 233 and 243, respectively.

Each Transmit Fan-In Circuit is composed of 127 line-link transmit gates for controlling the flow of message bits from the respective line and trunk terminal circuits to the associated link transmit bus; and each Receive Fan-Out Circuit is composed of 127 line-link receive gates for controlling the flow of message bits from the link receive bus to the respective terminal circuits, the latter message bits being deposited, a bit at a time, in respective line-link receive flip-flops prior to transmission to the terminal circuits.

The link transmit buses 221, 231 and 241 are connected to or rather integral with respective intermatrix (or intramatrix for an office of one matrix module) buses 211, 212 and 213, while intercoupling between the latter and the link receive buses is via link-junctor gates, e.g., 4201, 4202, 4203. For an office having more than one matrix module, the buses 211, 212 and 213 will be interconnected with the link receive buses of the same via their respective link-junctor gates. The additional matrix modules, if any, are the same as the module shown in the drawings; each is similarly provided with three intermatrix buses which are permanently associated with respective link transmit buses, and these intermatrix buses are interconnected with the link receive buses of the illustrated matrix via respective link-junctor gates, e.g., 4211–4213 and 4221–4223. With the matrix modules so interconnected a subscriber line associated with the illustrated matrix can be interconnected with another subscriber line or trunk associated with this matrix or with any other matrix in the switching office. As will be evident hereinafter, two links are utilized in setting up a given call and the switch operation is the same whether these links are of the same or of different matrix modules. Accordingly, for purposes of explanation all call requests will be assumed to be confined to the illustrated matrix. As will later be evident, the choice of switching links is made by the central processor acting on received address information, and whether the two links selected for a given call are in the same or different link groups the call set-up and switching operations are identical. This being the case, a complete understanding of the invention can be had by confining the drawings and description to a single matrix.

The line-link gates and link-junctor gates are accessed or enabled under the control of signals derived from the link control output translators. There is a Link Control Unit associated with each switch link and each comprises thirteen memory loops that store the address information and deliver the same cyclically to said output translators. The three Link Control Units, for Links Nos. 1, 2 and 3 of the drawings, are illustrated in FIGS. 75–82; these Control Units will be described in detail hereinafter.

It will be clear at this point that the matrix interface has 127 input-output line circuit positions, to each of which the following matrix components are connected: three line-link transmit gates which control the flow of message bits to specified link transmit buses; three line-link receive gates which control the flow of message bits from the link receive buses; and a receive flip-flop for storing the latter bits, a bit at a time, preparatory to transfer of the same out of the matrix.

The assignment of subscriber lines and interoffice and intraoffice trunks to the matrix line circuit positions is arbitrary, but once made is more-or-less permanent. These assignments are retained ("remembered") in a permanent memory of the Central Processor.

Consider, by way of example, the line circuit position of subscriber line 701; the M-bit stream out of its Bit Stripper Circuit is applied in parallel to the line-link transmit gates 6701, 6901 and 7001 of link #1, 2 and 3 respectively. The other two inputs to each of these gates are derived from respective link control translators, in a manner to be described, for gate access or enabling purposes. One and only one of these transmit gates will be accessed or enabled during a given call, to thereby couple the M-bit stream to the selected link transmit bus.

The line-link receive gates 6802, 6902 and 7002 of links #1, 2 and 3 are connected at their input to the link receive buses 223, 233 and 243, respectively, and they control the flow of message bits in the reverse or return direction. The outputs of these receiver gates are connected together and to the set terminal of receive flip-flop 6710, The message bits are read out of flip-flop 6710 into flip-flop 1402 of the Bit Insertion Circuit 1400, the flip-flop 6710 being reset after each bit read-out, as heretofore described.

As will be evident from the drawings, the enable inputs to line-link transmit gates 6701, 6901 and 7001 are also respectively connected to the inputs of line-link receive gates 6802, 6902 and 7002. Accordingly, the line-link transmit and receive gates of each link are accessed or enabled together. A strobe pulse derived from the high frequency timing cable is applied in parallel to the line-link receive gates of all links. This strobing will be covered hereinafter.

From a comparison of the several figures, it will be apparent that the described matrix components and their interconnections are the same for every line circuit position irrespective of whether a subscriber line or trunk is connected to the circuit position and irrespective of the rate thereof. As will be clear hereinafter, the various operations that the switch is capable of performing, e.g., multirate and crossrate interconnections, multiplexing and demultiplexing, broadcast and conference calls etc., really result from the manner in which the various gates of the matrix are accessed.

The above-noted sameness is true for all line circuit positions connected to subscriber lines and trunks. Some line circuit positions however are utilized in carrying out channel or time slot interchange operations, conference calls, et cetera. For these line circuit positions, the matrix components and their interconnections are somewhat different from that described. The number of line circuit positions used for these tasks will be determined by the type and extent of the traffic and will, of course, vary from office to office.

A pair of line circuit positions are used to perform a channel interchange operation, a typical pair being illustrated in FIGS. 47–50 of the drawings. The bit stream input to the line-link transmit gates 4701, 4901 and 5001 of one line circuit position is derived from the receive flip-flop 4730 of another line circuit position, while the bit stream input to the line-link transmit gates 4711, 4911 and 5011 of the latter line circuit position is derived from the receive flip-flop 4701 related to the first-mentioned line circuit position. Since these line circuit positions are not connected to line or trunk terminal circuits, they receive no clear or reset signals (T7). For this reason, a double rail gate input to the receive flip-flops 4710 and 4730 is necessary. The single-to-double-rail, line-link receive gate circuits 4802, 4902, 5002, 4812, 4912 and 5012 are substantially the same as the line-link receive gates heretofore described, except that they provide destructive read in to the connected receive flip-flops. For example, the respective enable inputs to line-link transmit gates 4701, 4901 and 5001 are also respectively connected to the gates of the line-link receive gate circuits 4802, 4902 and 5002. Accordingly, the line-link transmit gates and line-link receive gate circuits of respective links are accessed together. And, the strobe pulse that is applied in parallel to all line-link receive gates is also applied to the gates of the line-link receive gate circuits.

To aid in understanding the switching matrix configuration, a typical message bit "talking" path through the same will now be described. Let it be assumed that subscriber line 701 has requested an interconnection with a 40.8 kb. subscriber, which shall be assumed connected to line circuit position #59. Further, links #1 and 3 are assumed chosen for this interconnect. The message bits out of flip-flop 1040 are "gated" or passed by the enabled line-link transmit gate 6701 to the link transmit bus 221 via the transmit bus driver 4110. These message bits (actually samples of the same) appearing on the intermatrix bus 211 are coupled to the link receive bus 243 by the accessed link-junctor gate 4401, and via the receive bus driver 4420. From this bus the message bits proceed via the line-link receive gate 6222 to the receive flip-flop 5920, from which they are read out of the matrix as heretofore described.

The message bits of the return talking path proceed from the assumed 40.8 kb. subscriber through the line-link transmit gate 6221 to link transmit bus 241 via the transmit bus driver 4410. The message bits which thus appear on intermatrix bus 213 are coupled to the link receive bus 223 via the accessed link-junctor gate 4203 and the receive bus driver 4220. From this latter bus the message bits proceed via the line-link receive gate 6802 to the receive flip-flop 6710. The message bits are read out of flip-flop 6710 into flip-flop 1402 of the Bit Insertion Circuit 1400, the flip-flop 6710 being reset by the T7 timing pulses after each message bit read out.

The line-link transmit gates 6701 and 6221, the line-link receive gates 6802 and 6222, and the link-junctor gates 4203 and 4401 are simultaneously accessed during predetermined periods (i.e., time slots) in each office cycle, the transmit and receive bus drivers being in the nature of OR gates need not be accessed. The talking paths for the two directions of travel are thus "space-separated"—i.e., they are separate and distinct routes. However, the message bits of this call will be time division multiplexed on the link transmit and receive buses, and the intermatrix buses with the message bits of other calls being handled at the same time. While the foregoing description speaks of message bit gating or transmission through the switching matrix, it is actually only successive samples of the same that are transmitted therethrough. This will be evident hereinafter when the switching operations are described in detail.

Figure 149:
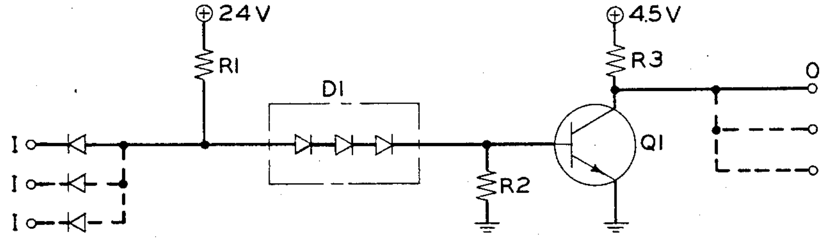
Figure 151:
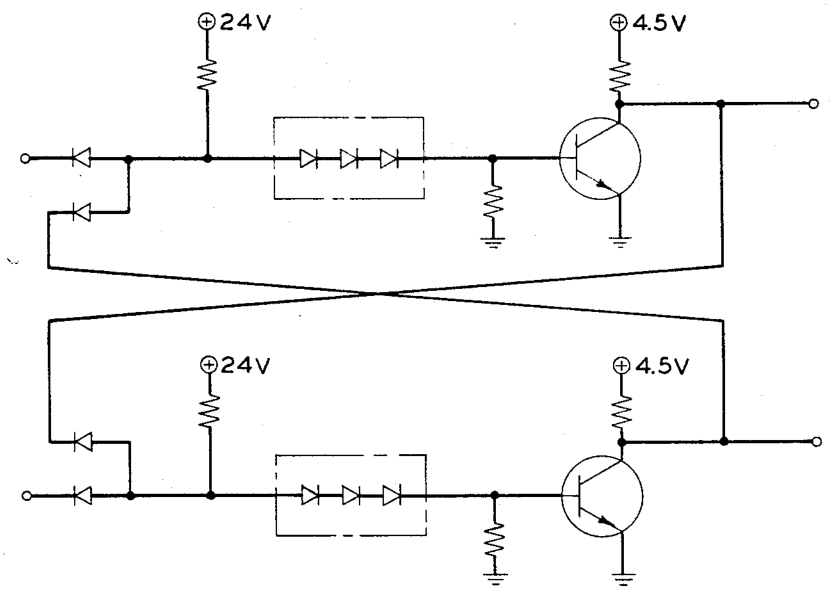
Figure 152:
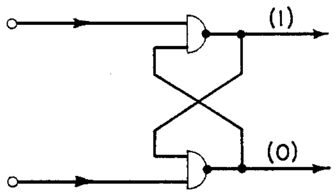

As indicated by the appropriate symbol, the switching gates of the illustrated matrix module are of the AND-NOT type. This is a result of the transistor circuit package used to perform the desired logical functions. Low Level Logic (LLL) comprises the basic logic circuit package for this system. LLL offers many advantages such as high speed, the use of silicon devices with their wide temperature limits, liberal device tolerance and power regulation requirements, high fan-out capability and general all around versatility. A basic LLL circuit is shown in FIG. 149 of the drawings. This circuit configuration can be interconnected in various combinations via diode coupling to perform numerous logic functions. Counters, translators, shift registers, parity-check trees, adders, storage registers, comparators and various other circuit configurations can be assembled from this basic circuit. By way of example, FIG. 151 shows the interconnection of two such circuits to form a flip-flop. FIGS. 149 and 151 will be explained in detail hereinafter. For a better understanding of LLL, its advantages and versatility, reference may be had to the article entitled "No. 1 ESS Logic Circuits and Their Application to the Design of the Central Control," by W. B. Cagle et al., Bell System Technical Journal, September 1964.

An AND-NOT gate is the functional equivalent of an AND gate followed by an inverter. The inversion in this instance is inherent in and a result of the common emitter transistor configuration of the LLL logic package. The AND gate function per se can of course be derived from the basic LLL circuit, but the added expense of additional circuit elements to arrive at the same would not be justified. That is, a designer familiar with Boolean algebra will experience no system design difficulties because of the inversion inherent in the LLL circuit package.

The aforementioned inversion experienced in the traversal of each gate in the matrix presents no problems, since any given talking path through the matrix comprises an even number of inverisons. And an even number of logic inversions through the matrix insures that whatever logic voltage level or value is applied as a steady state signal at the matrix input will appear at the output thereof. The foregoing statement can be verified from the drawings by counting the number of inversions in one of the previously described talking paths. Note, in this regard that the transmit and receive bus drivers provide an inversion, as does the line-link receive flip-flops (see flip-flop 6712 for a symbolic illustration of a flip-flop assembled from the basic LLL package). The normal state of the output of TDS matrix is a logic zero in the absence of a call in process.

For purposes of explanation, other portions of the instant TDS have been illustrated using the more commonly encountered logic—e.g., AND gates rather than AND-NOT gates. This has been done primarily to facilitate an understanding of the same. However, it will be clear to those in the art that the advantages of LLL are equally applicable thereto and these other sections of the TDS can be, and in fact have been, constructed using basic LLL building blocks.

Prior art time division switching matrices have used resonant transfer to establish the paths through the same. With such a switching circuit, four switches are simultaneously closed for an exact period defined by the circuit constants during which an analog transfer between input and utput capacitors takes place. In the instant all logic matrix, a series of logic switches is gated and the bits "ripple through" the same as do the bits in a digital computer circuit.

In comparing the prior art resonant transfer schemes with the instant all logic system, a number of advantages of the latter are presented. The all logic matrix does not require tight tolerances on pulse widths which contrasts with the requirement of an accurately controlled pulse width of one-half the natural resonant period in the resonant transfer case. The instant all logic matrix does not require as tight tolerances on fixed and stray capacitance and inductance in the matrix, and tuning of line, link and junctors is eliminated. Interface problems are simplified, since the circuits on either side are implemented with LLL making them compatible. One important source of crosstalk is eliminated, since no trapped charges can exist on buses due to imperfect tuning as happens with resonant transfer. Noise margins are improved since there is distributed gain in LLL logic circuits, which with resonant transfer signal losses occur. Flip-flops are utilized as storage elements rather than capacitors in the line circuit position packages; therefore, storage time can be idefinitely long and can be varied arbitrarily. This means that identical circuitry can be used for switching very low speed data as well as very high speed data. In line with the above, non-destructive read out from one line or trunk to many is readily accomplished, thereby making it much easier to implement the broadcast mode. The growth capability of the all logic matrix is much greater since the logic may be readily expanded and the circuit is more flexible. The system remains "4-wire" through the switching matrix. This eliminates the time division hybrid and allows simultaneous load and unload operations. An added degree of flexibility is provided by "4-wire" switching since the design can be easily altered to permit unidirectional control of data flow. This advantage is beneficial in multiplexing.

*Link control units*

The switching matrix operates on address information received from the Central Processor (CP) via the TDS Control. The Central Processor sets up a call by sending address, time slot and rate information to the TDS Control. The TDS Control in turn synchronously stores the address information in the Link Control Unit memories in the precise time slot, or slots, dictated by the Central Processor for that call. Each time the address appears at the link memory output registers, the call is set up. The calling party is designated to transmit on one link and the called party transmits on another. The call is set up once every office cycle (i.e., a 2.4 kc. period) for a 2.4 kb. rate call, 4 times for a 9.6 kb. rate and 16 times for a 38.4 kb. rate. As will be clear hereinafter, during a complete office cycle 512 time slots may be used in varying combinations of rates to complete various types of calls through the switching matrix. Call information remains in the Link Control Unit memories until cleared out by the Central Processor in response to a call termination signal.

With this brief functional recitation of the interrelationship of the Link Control Units with the other sections of the TDS, reference should now be had to FIGS. 75–82 of the drawings wherein three Link Control Units are shown. The Link Control Units are each permanently associated with one of the links of the illustrated matrix and they are identical in every respect to each other. This being the case, only Link Control Unit #1 will be described in detail.

A Link Control Unit, such as Unit #1 shown in FIGS. 75, 76, 79 and 80, provides independent control of one link, this control being in the nature of gating or access signals to the line-link and link-junctor gates thereof. To perform this function, each Link Control Unit comprises a recirculating memory that recycles each office cycle; line and junctor gate translators; and a parity check circuit. Considering first the memory, it is composed of thirteen delay line loops (note, one loop is used for parity check purposes) having the same loop delay. The line-link and link junctor gate address information is parallel stored in twelve of these memory loops, in a manner to be described, and the same is caused to recirculate therein for the duration of a call. The total loop delay defines an office cycle.

Figure 75:
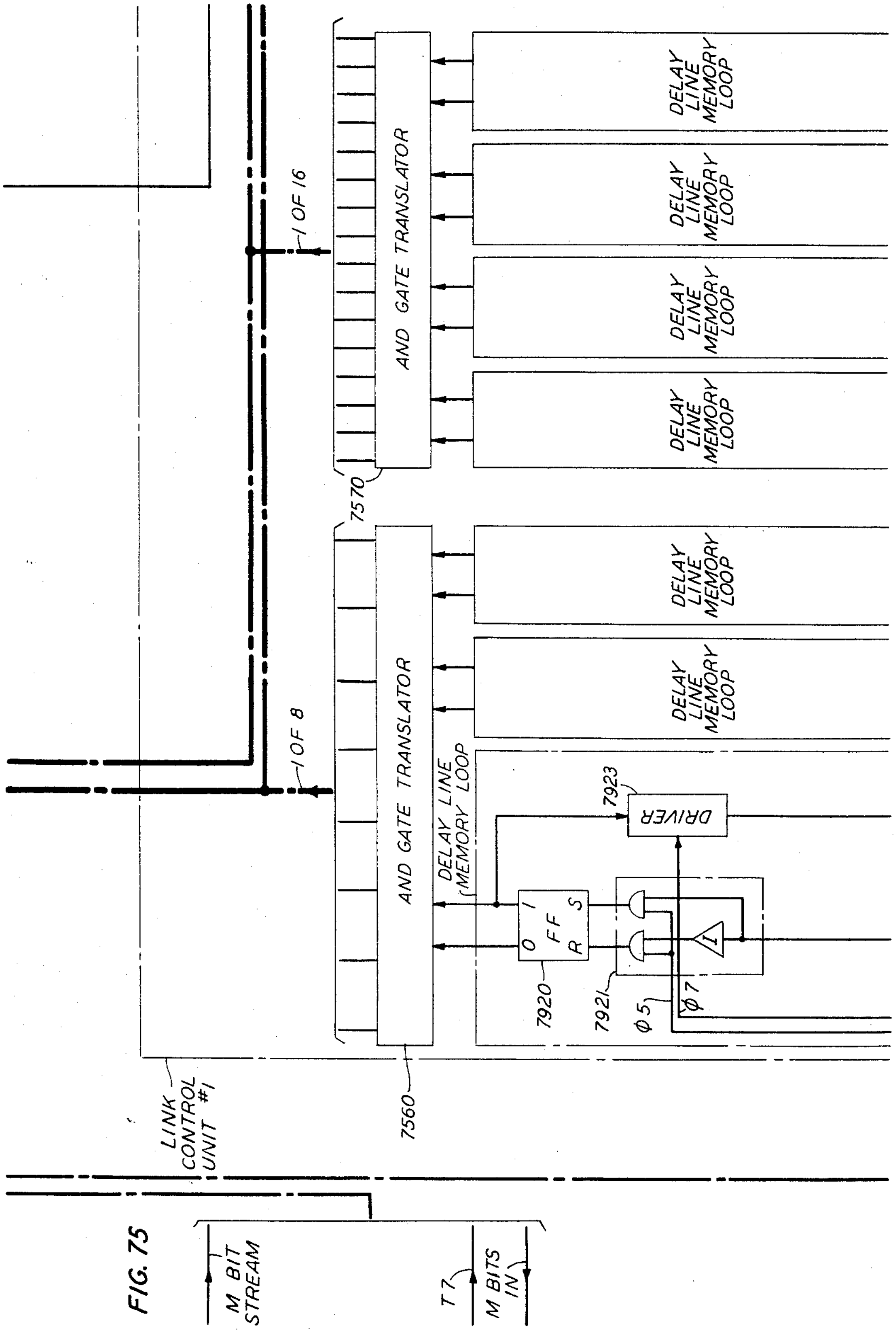
Figure 79:
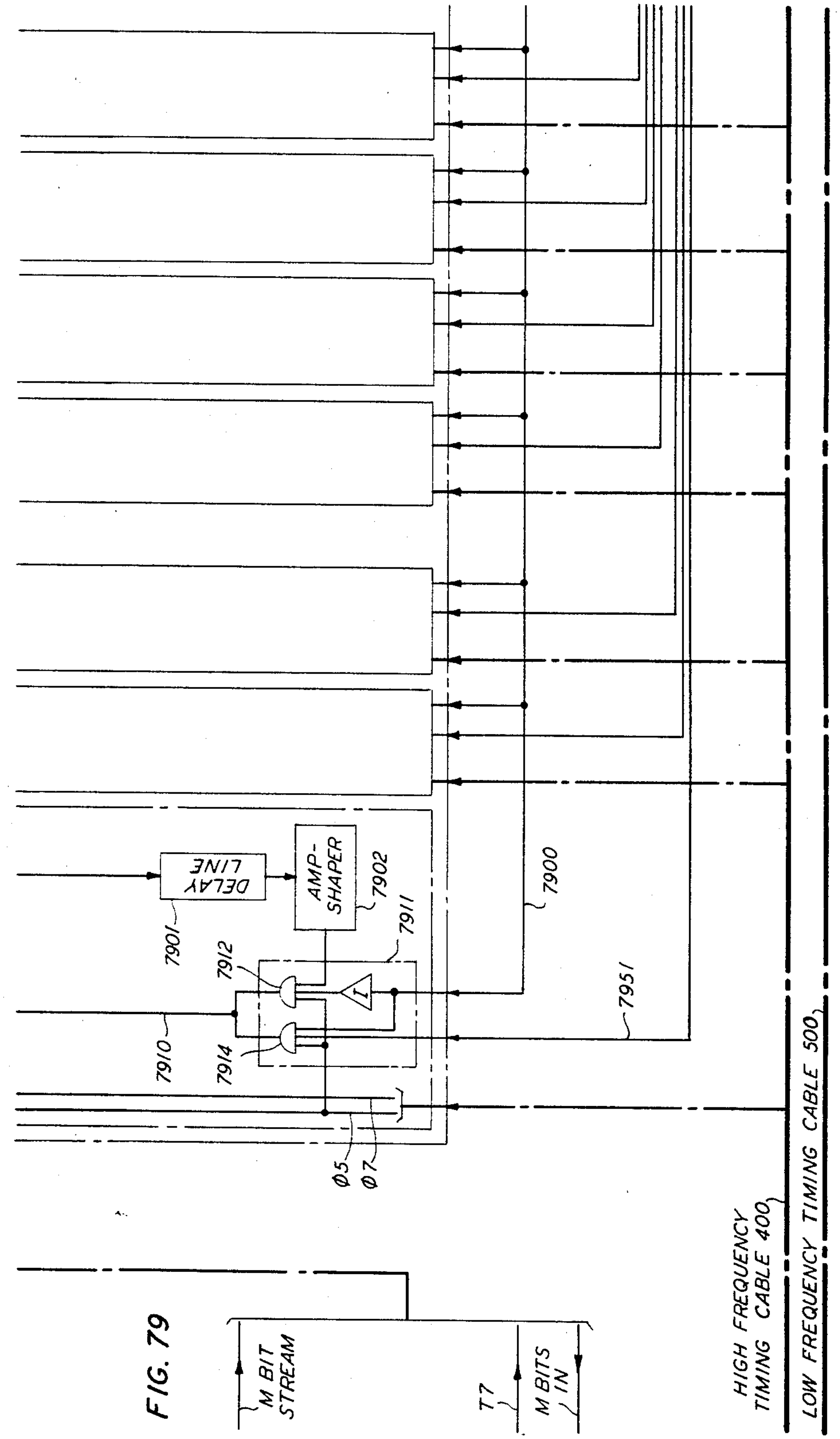

A typical delay line loop, is shown in FIGS. 75 and 79 of the drawings and it comprises a delay line 7901 having a delay of substantially 416⅔ μsec., this being equal to one period of the 2.4 kc. waveform. An ultrasonic strip delay line such as that shown in the patent to A. H. Meitzler, No. 3,041,556, issued June 26, 1962, can be advantageously used for this purpose. The instant TDS system, however, is in no way limited to this type delay line and any of the delay lines known in the art may be utilized herein. The output of the delay line 7901 is fed to an amplifier-shaper circuit 7902 which comprises a conventional amplier-shaper combination and a one shot multivibrator that produces a square wave signal of approximately .4 μsec. duration in response to an output signal from the delay line. The output of the amplifier-shaper 7902 is delivered to the address gate 7912. Assuming no address information is to be written into the delay loop, the output of the amplifier-shaper is strobed by a $\phi 5$ pulse, derived from the high frequency timing cable 400, and thus gated through to lead 7910. The lead 7910 is connected to the input of the address register flip-flop 7920. The address register flip-flop has a single-to-double rail input 7921 and hence requires no clearing. The output of flip-flop 7920 is delivered to the 1-of-8 AND gate translator 7560 and to the delay line driver 7923. The $\phi 7$ pulse derived from the high frequency timing cable 400 gates the bit in the address register flip-flop back into the delay line via the driver 7923, and the stored address bit thus begins once again to recirculate in the loop.

There are specific relationships between the memory loop or cycle and the central timing unit waveforms. For example, total loop delay is equal to one full period of the 2.4 kc. timing waveform. This duration defines the office cycle and it is subdivided into 544 time slots as indicated in FIG. 135. The period of a time slot in this memory cycle is equal to one full cycle of the 1.3056 mc. waveform—or one-half cycle of the 652.8 kc. waveform. As will be clear hereinfater, these time slots are governed or defined by the clock waveforms which are fed into the time slot comparator of the TDS Control. It is in the comparator circuit that comparison of the clock waveforms with the binary coded call instruction from central processor initiates the process of writing the call information into the delay line memory loops.

Referring now to FIG. 135, of the 544 time slots in a memory or office cycle 512 time slots are usable for address storage purposes and these are numbered sequentially from 0 to 511 for programming purposes. Those slots marked with asterisks are not used for address information storage purposes since they fall within the data transfer intervals. As will be recalled, the data transfer intervals are those in which message bits are transferred into and out of the matrix—i.e., it is the period encompassing the T6 and T7 pulses. The B40 pulses define the data transfer interval at a 38.4 kc. message bit rate; the D40 pulses define the transfer interval at the 9.6 kc. message rate; and the F40 pulses do the same for the 2.4 kc. rate. The F40 pulse occur every sixteenth B40 and mark the end of each memory cycle.

When a new call is to be set up by the TDS Control, address bits and a link selector enabling signal are simultaneously applied to the Link Control Unit associated with the selected link. When an address bit of the new call is gated into the appropriate delay line memory loop the write-in gate connected to the output of the delay line is disabled. For example, if link #1 is to be used to transmit a new call, an enabling signal will be provided over lead 7900 during the time slot or slots assigned to that call. The enabling signal on lead 7900 serves to enable gate 7914 during the selected time slot or slots, and to disable gate 7912 because of the indicated inversion. The appropriate address bit is simultaneously applied to gate 7914 via lead 7951. A high frequency $\phi 5$ strobe pulse occurs during each and every time slot and therefore the address bit will be delivered to lead 7910 during said selected time slot or slots. In a similar fashion each of the other address bits are simultaneously written into their respective delay line memory loops. The addres write-in operation will be more fully appreciated following the explanation of the TDS Control.

The $\phi 5$ strobe pulses "mid-bit" sample the input address bits as well as the .4 $\mu$sec. pulses from the amplifier-shaper 7902. This reduces the possibility of sampling error. If minor delay discrepancies between lines are found to exist, it may be desirable to use a different high frequency strobe pulse (e.g., $\phi 6$ pulse) to relock the delay line loop.

To complete a call through any given link twelve address bits are simultaneously stored in twelve respective memory loops associated with the link. Accordingly, all the address bits related to a call occupy the same time slot or slots. These address bits circulate and recycle in the delay line memory loops for the duration of the call. Other address bits related to other calls are also simultaneously circulating and recycling in the memory loops, but these of course occupy other and different time slots.

The address bits related to a given call are simultaneously gated into their respective address register flip-flops and they remain there for substantially a full time slot—i.e., from one $\phi 5$ pulse to the next. During this time the line and link translators are setting up the call in the matrix in a manner to be described. A $\phi 4$ pulse occurs and strobes a message bit of the call to the appropriate line-link receive flip-flop just prior to the next succeeding time slot, which may contain the address bits of another and different call.

As indicated heretofore, each matrix has a total of 127 line circuit positions. Accordingly, 7 address bits are required to designate, i.e., access the gates of, any one of the 127. This 7-bit number is grouped or divided into a 3-bit number and a 4-bit number. One translation serves to decode the 3-bit number into a 1-of-8 and another translation decodes the 4-bit number into a 1-of-16. This is illustrated in FIG. 75 wherein 4 stored address bits (A0–A3) are fed to and operate the 1-of-16 AND gate translator 7570 and 3 bits (A4–A6) are fed to and operate the 1-of-8 AND gate translator 7560. These translators are of the conventional type.

The manner in which these two translations serve to designate any particular line circuit position is indicated in the following table. The line circuit positions are numbered consecutively from 1 to 127. Note, that the 4-bit binary numbers comprised of the A0–A3 bits correspond to the decimal numbers in the first column. The 3-bit binary numbers (A4–A6) merely increase the decimal base by 16 for each binary increase therein. The table is believed self-explanatory.

| 1-of-16 | | | | | | | | | | | | 1 of 8 |
|---|---|---|---|---|---|---|---|---|---|---|---|---|
| | | | | 0 | 0 | 0 | 0 | 1 | 1 | 1 | 1 | A6 |
| | | | | 0 | 0 | 1 | 1 | 0 | 0 | 1 | 1 | A5 |
| A3 | A2 | A1 | A0 | 0 | 1 | 0 | 1 | 0 | 1 | 0 | 1 | A4 |
| 0 | 0 | 0 | 0 | | 16 | 32 | 48 | 64 | 80 | 96 | 112 | |
| 0 | 0 | 0 | 1 | 1 | 17 | 33 | 49 | 65 | 81 | 97 | 113 | |
| 0 | 0 | 1 | 0 | 2 | 18 | 34 | 50 | 66 | 82 | 98 | 114 | |
| 0 | 0 | 1 | 1 | 3 | 19 | 35 | 51 | 67 | 83 | 99 | 115 | |
| 0 | 1 | 0 | 0 | 4 | 20 | 36 | 52 | 68 | 84 | 100 | 116 | |
| 0 | 1 | 0 | 1 | 5 | 21 | 37 | 53 | 69 | 85 | 101 | 117 | |
| 0 | 1 | 1 | 0 | 6 | 22 | 38 | 54 | 70 | 86 | 102 | 118 | |
| 0 | 1 | 1 | 1 | 7 | 23 | 39 | 55 | 71 | 87 | 103 | 119 | |
| 1 | 0 | 0 | 0 | 8 | 24 | 40 | 56 | 72 | 88 | 104 | 120 | |
| 1 | 0 | 0 | 1 | 9 | 25 | 41 | 57 | 73 | 89 | 105 | 121 | |
| 1 | 0 | 1 | 0 | 10 | 26 | 42 | 58 | 74 | 90 | 106 | 122 | |
| 1 | 0 | 1 | 1 | 11 | 27 | 43 | 59 | 75 | 91 | 107 | 123 | |
| 1 | 1 | 0 | 0 | 12 | 28 | 44 | 60 | 76 | 92 | 108 | 124 | |
| 1 | 1 | 0 | 1 | 13 | 29 | 45 | 61 | 77 | 93 | 109 | 125 | |
| 1 | 1 | 1 | 0 | 14 | 30 | 46 | 62 | 78 | 94 | 110 | 126 | |
| 1 | 1 | 1 | 1 | 15 | 31 | 47 | 63 | 79 | 95 | 111 | 127 | |

Line Circuit Position Address Code

Figure 76:
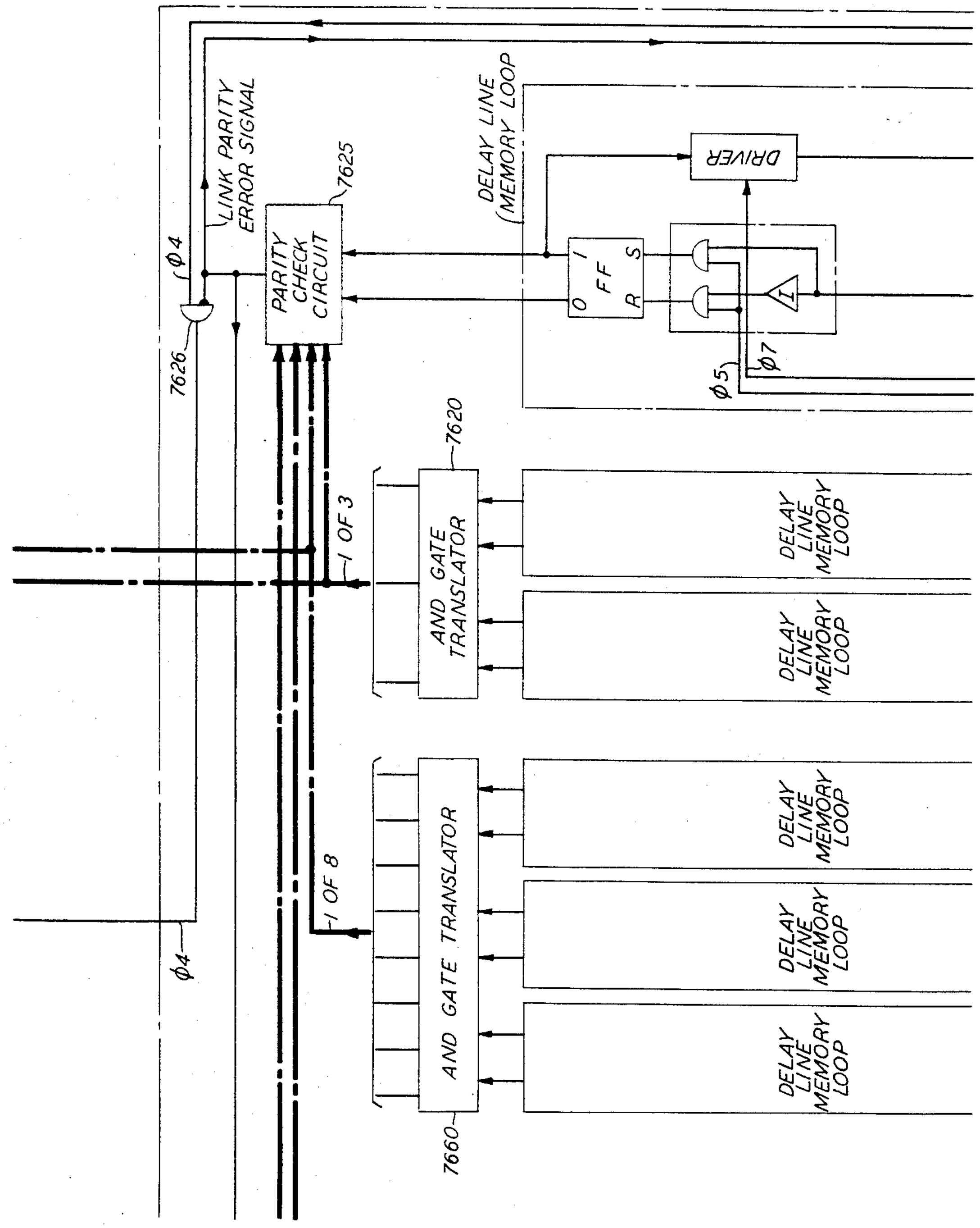
Figure 77:
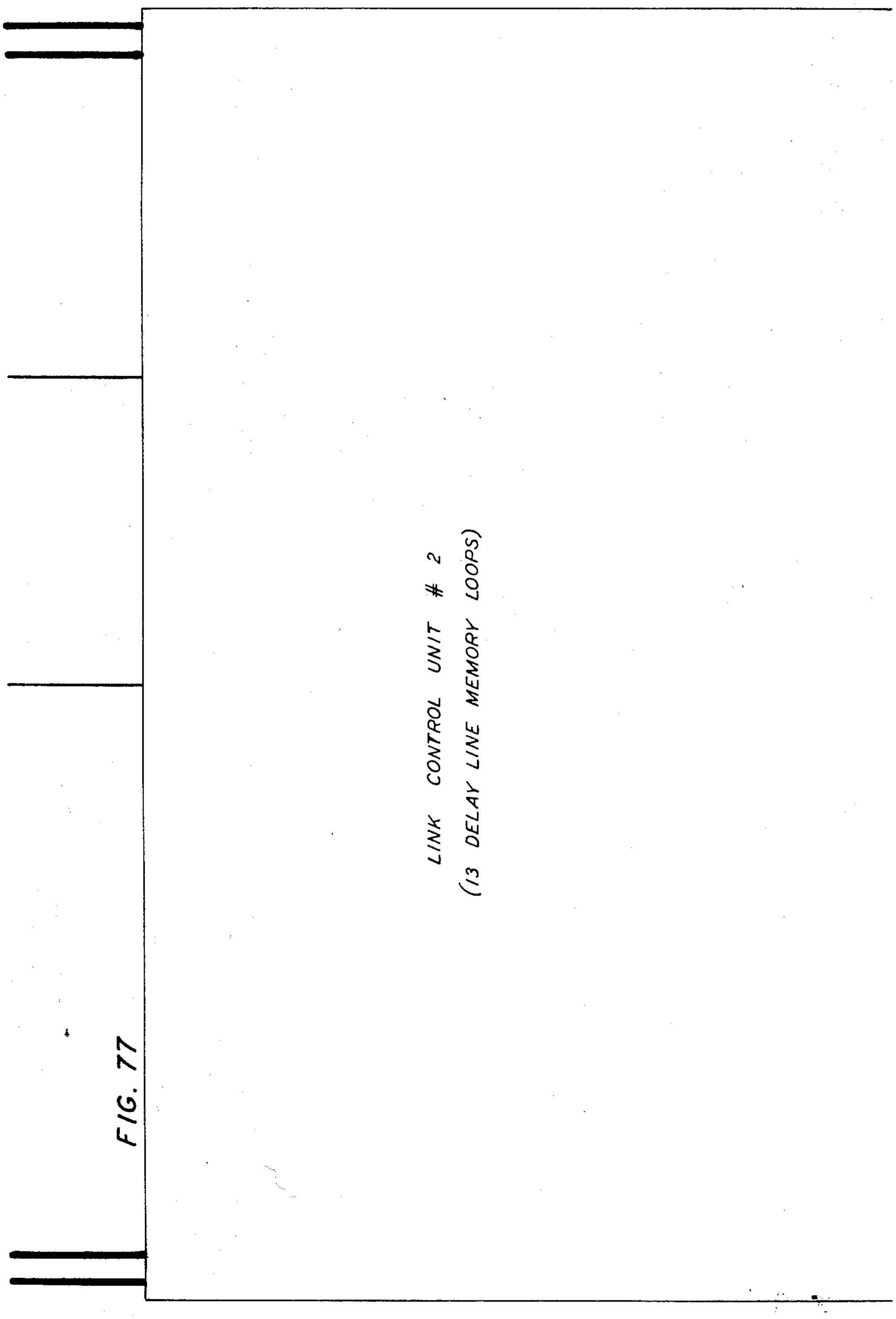
Figure 78:
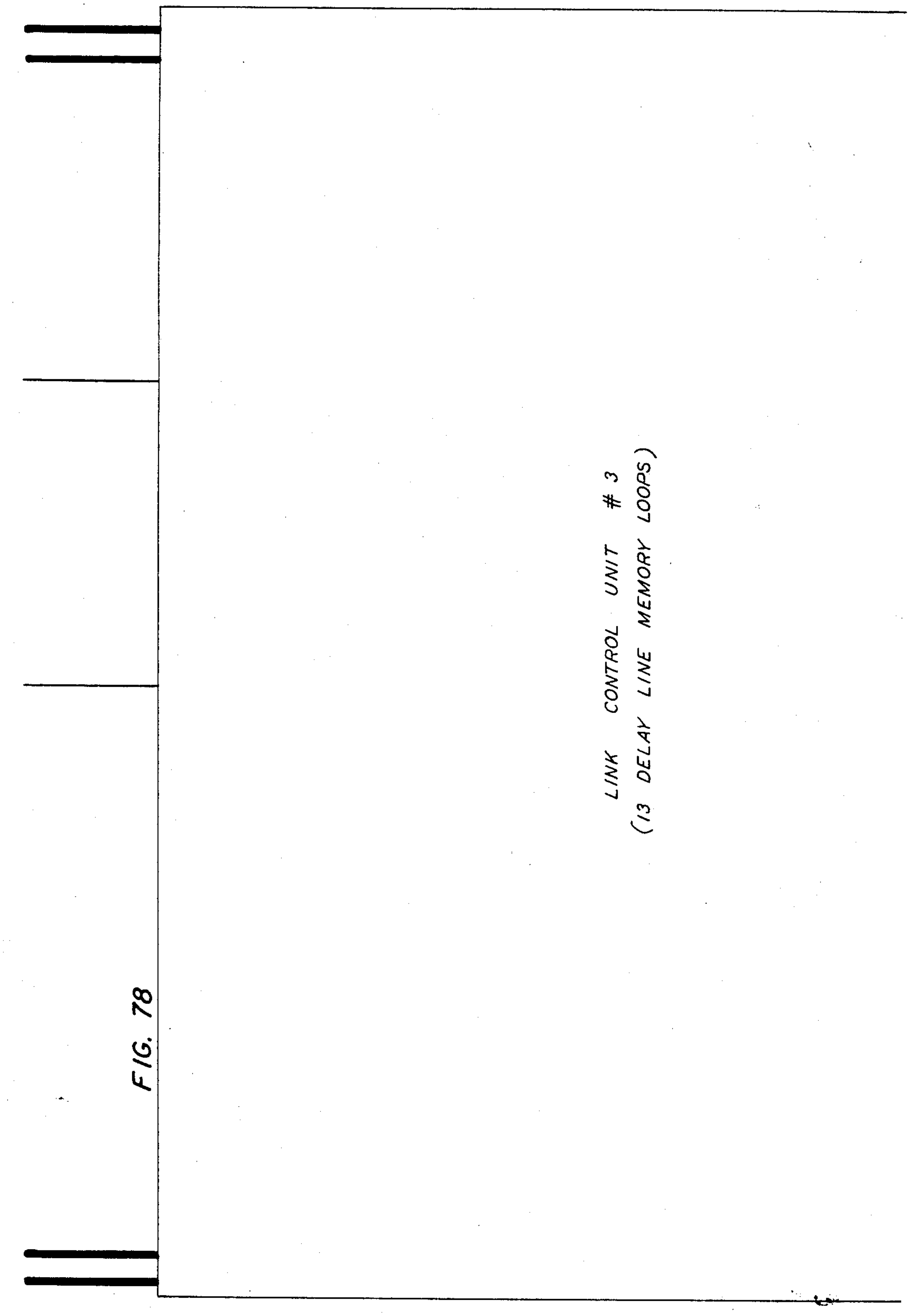

A full office may have as many as eight matrix modules, or a total of 24 links; and any link can be interconnected with any other link in the office. In a 24 link office, each link will have a total of 24 link-junctor gates which serve to connect the link receive bus thereof to any one of the link transmit buses of the other links. Accordingly, 5 bits are required to access any given one of the 24 link-junctor gates. This 5-bit number is grouped or divided into a 3-bit number and a 2-bit number. One translation serves to decode the 3-bit number into 1-of-8 and another translation decodes the 2-bit number into 1-of-3. As shown in FIG. 76. three stored address bits (B0–B2) are fed to and operate the 1-of-8 AND gate translator 7660 and two bits (B3 and B4) are fed to and operate the 1-of-3 AND gate translator 7670.

The manner in which these two translations serve to designate which link-junctor gate will be accessed is indicated in the following table. The 1-of-8 translation designates the matrix module of the calling subscriber and the 1-of-3 translation singles out the link the calling subscriber is using. The appropriate link-junctor gate is then accessed to connect the link transmit bus of the calling subscriber with the link receive bus tied to the accessed link-junctor gate. The link-junctor gate is of course accessed simultaneously with the line-link gates.

| 1-of-8 | | | | | | |
|---|---|---|---|---|---|---|
| | | | 1 | 0 | 1 | B3 } 1-of-3 |
| B2 | B1 | B0 | 0 | 1 | 1′ | B4 } |
| 0 | 0 | 0 | $\phi$-1 | $\phi$-2 | $\phi$-3 | |
| 0 | 0 | 1 | 1-1 | 1-2 | 1-3 | |
| 0 | 1 | 0 | 2-1 | 2-2 | 2-3 | |
| 0 | 1 | 1 | 3-1 | 3-2 | 3-3 | |
| 1 | 0 | 0 | 4-1 | 4-2 | 4-3 | |
| 1 | 0 | 1 | 5-1 | 5-2 | 5-3 | |
| 1 | 1 | 0 | 6-1 | 6-2 | 6-3 | |
| 1 | 1 | 1 | 7-1 | 7-2 | 7-3 | |

Binary Codes for Link-Junctor Gates

The call address word (13 bits) sent by the TDS Control to the appropriate Link Control Unit contains the line-link and link-junctor gate address bits plus one parity bit. This parity bit is added to the call address by the TDS Control. The parity bit is a ONE or ZERO as required to maintain ODD partiy in the call address.

The parity bit is stored in a delay line memory loop 7610 which is similar in every respect to the delay line loop heretofore described. Storage of the parity bit takes place simultaneously with storage of the line and link address bits and the parity bit thus occupies the same time slot or slots as said address bit.

When the address bits are applied to the line-link and link-junctor translators in a Link Control Unit, parity is simultaneously checked in a parity check circuit 7625. If parity is not ODD, an output signal is produced which inhibits any message bit transmission into and out of the associated link during that time slot. For example, the output of the parity check circuit 7625 is applied as an inhibit to the link transmit bus driver 4110 and to the gate 7626 through which the high frequency $\phi 4$ strobe pulses are normally applied to all the line-link receive gates of link #1.

Parity must be checked for each utilized time slot in an exceedingly short interval of time. For this purpose, the conventional parity tree involving a long series of successive bit comparisons is too slow. A parity check circuit specifically designed for the required fast operation is shown in FIG. 139. This circuit is capable of performing a parity check in 30–40 nanoseconds. The circuit will be described in detail hereinafter.

In addition to the aforementioned call inhibit action, the output parity error indication of parity check circuit 7625 is delivered to a parity error register (not shown) which can be in the nature of a conventional counter. There is a similar register for each link and these are periodically and cyclically scanned by the Master Scanner associated with the Central Processor. When a link is found to be malfunctioning, as indicated by a selected number (e.g., 3) of parity error signals to the associated register, the link is taken out of service by the Central Processor and the calls transferred to one of the other links of the link group. As indicated hereinbefore, while only two links are required for a given call, an additional link is provided in each link group primarily for purposes of redundancy.

A malfunctioning link can be removed from service by removing all the call address data from the memories thereof in much the same manner as that followed in taking down a given call upon its termination. Similarly, the transfer of calls to another link is carried out in substantially the same manner in which the calls are originally set up in any given link. These call "set up" and "take down" operations will be described in further detail hereinafter in connection with the description of the TDS Control. Alternatively, and perhaps more desirably, a solid state switch (e.g., one or more flip-flops) can be provided for each link to take the same out of service for reasons of malfunction or maintenance. When this out of service switch is set by a signal from the C.P. in response to received parity error indications, further operation of that link is inhibited. The switch, when set, will inhibit the $\phi 4$ strobe pulse and the link transmit bus driver for that link in a fashion similar to that described. In the out of service condition, the parity check circuit can also be disabled to prevent the C.P. from acting on a continuous parity error indication from the link.

In connection with the above, it may be desirable to also provide a mechanical out of service switch for each link—these being located at a convenient position on the front panel. When a link requires local maintenance, a manual request for that link to be cleared of traffic will be initiated by actuating the appropriate switch. This will set the aforementioned parity error register, or alternatively, the solid state flip-flop switch, associated with the link and the link is then cleared of traffic or disabled. Maintenance on that link can then be done while the other two links of the link group remain in operation, to thereby provide the required call service.

While the described parity error register, flip-flop link disabling switch, and manually operated maintenance switch are not illustrated in the drawings, the provision of the same is quite straightforward and within the skill of one in the art. The C.P. maintenance procedures described correspond to those disclosed in the aforementioned copending application of Doblmaier et al. In the Doblmaier et al. case, maintenance procedures are described for single and multiple parity error detections. For single errors the data stored in call store is reread and rewritten if required. This corresponds to the instant situation where the call address word is rewritten into the memories in the event of a single parity error indication. For multiple errors, a maintenance routine is described in Doblmaier et al. whereby program stores and the necessary ancillary equipment are substituted for those malfunctioning. This corresponds to the link disabling and call transfer operations described above.

The manner in which the various calls are switched through the matrix will now be described, leaving till later the description of the link memory loading operations, which in turn are initiated by the signaling information received from remote subscriber stations and remote switching centers.

*Switching matrix operation*

The message bits progress, a bit at a time, through the transmit side of a line circuit position to the point where they are presented to the matrix crosspoint—i.e., the line-link transmit gate of the selected link. Concurrently, the link memories are circulating the coded address information of the call instruction and feeding the parallel data to the line and link translators. The translation steers the translated code to the proper crosspoints during a given time slot and causes a sample of a message bit to ripple through the matrix to the line-link receive gate of the proper line-link receive flip-flop. A ripple time of approximately ⅞ time slot (0.672 microsecond) is allowed for these bit samples to arrive at the proper line-link receive gate. This ripple time is sufficient for the link translator to have picked all of the proper crosspoints and for the sampled message bits to have settled at the line-link receive gate. The receive gate is then strobed by a $\phi 4$ high frequency strobe signal, which appears once per time slot. The line-link receive flip-flop is thereby set to a given state, depending, of course, on the polarity of the message bit sample. The receive flip-flop is subsequently reset by a T7 timing pulse, before the next message bit arrives. The length of time a bit is stored in the line-link receive flip-flop is variable and depends upon which time slot is used to sample. The transfer pulse T6 samples the bit out of the line-link flip-flop into the receive side of the proper line terminal circuit just prior to the flip-flop reset.

Turning now from the above generalized brief description of message bit progression through the matrix to a more specific example, let it be assumed that subscriber line 1901 has requested an interconnection with a similarly rated subscriber, the latter being assumed connected to line circuit position #51. Further, links #1 and 2 shall be assumed chosen for this interconnect. The message bit rate of subscriber 1901 is 2.4 kb., and the $\overline{F40}$ pulses define the data transfer interval at this rate. That is, message bits are read into, as well as out of, the matrix by those B40 timing pulses that occur during, and only during, the $\overline{F40}$ pulse intervals; see in this regard the derivation tables for the T1–T7 timing pulses, supra. Accordingly, it will be evident from FIG. 135 that there are 512 usable time slots between successive M-bit read-ins to the matrix; and any unused time slot can be utilized to accomplish the desired M-bit switching through the matrix. The specific time slot that is used for the call will be established by the central processor. For purpose of illustration, time slot #41 shall be assumed the one so chosen.

The TDS Control, acting on address information from the C.P., simultaneously loads twelve address bits in the respective delay line memory loops of Link Control Unit #1 so as to complete the call through link #1, and it also simultaneously loads another twelve address bits in the respective delay line memory loops of Link Control Unit #2 to complete the call through link #2. All 24 address bits related to the call thus occupy the same time slot—namely, time slot #41.

Each message bit of subscriber line 1901 is read, a bit at a time, into the matrix just prior to the beginning of a new office memory cycle—i.e., during the $\overline{F40}$ pulse period. An M-bit so read in "sits" at the input of line-link transmit gate 6721. The link memories are circulating the coded address information of the various calls in progress and feeding the parallel stored address bits to the line and link translators. When the address bits stored in time slot #41 are delivered to the translators, the transmit gate 6721 and the link-junctor gate 4301 will be enabled thereby causing a sample of the message bit to ripple through the matrix to the line-link receive gate 6102. To trace this path, the sampled bit passed by the accessed (i.e., enabled) transmit gate 6721 is delivered to the link transmit bus 221 and intermatrix bus 211 via the transmit bus driver 4110. The bit sample is then coupled to the link receive bus 233 by the accessed link-junctor gate 4301. A period of approximately ⅞ time slot is allowed for the M-bit to arrive at the proper line-link receive gate and settle there prior to the occurrence of a $\phi 4$ strobe pulse. The line-link receive gate 6102 is accessed concurrently with the aforementioned line-link and link-junctor gates so that when the input thereof is strobed by the short duration $\phi 4$ strobe pulse a bit sample is delivered to the input of the line-link receive flip-flop 5910. If the M-bit is a binary one the flip-flop is set to its "1" state, and if a binary zero it remains in its reset or "0" state. The flip-flop 5910 is sampled simultaneously with the next M-bit input to the matrix and this sample is delivered to the terminal circuitry connected to line circuit position #51. The flip-flop 5910 is then immediately reset by a T7 timing pulse. The next input M-bit and each succeeding M-bit of the message is switched through the matrix in the described fashion until the call is terminated, at which time the circulating address bits related thereto are removed from the circulating memory in a manner to be described.

Figure 22:
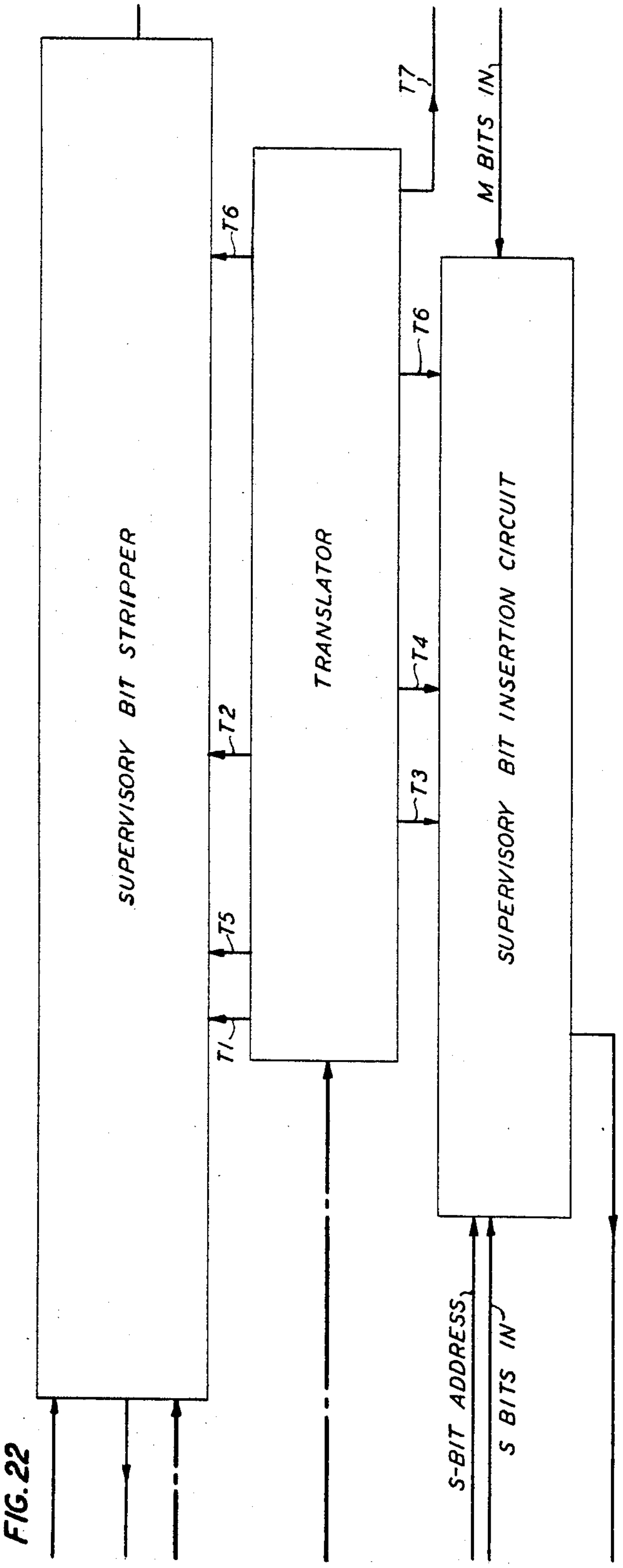

Concurrently with the above-described message bit transmission through the matrix, the message bits of the return talking path are being transmitted in a similar fashion through the matrix, but along a separate and distinct path. The M-bits of all similarly rated lines and trunks are brought into bit synchronization, as heretofore described. Accordingly, an M-bit of the subscriber line connected to line circuit position #51 is likewise read into the matrix just prior to the initiation of each office memory cycle. The M-bit read in "sits" at the input of line-link transmit gate 6101 until the same is accessed. The sampled bit is then passed to the link transmit bus 231 and the interconnected intermatrix bus 212 via the transmit bus driver 4310. The bit sample is then coupled to the link receive bus 223 by the accessed link-junctor gate 4202. The line-link receive gate 6821, when strobed by the $\phi 4$ strobe pulse that occurs during time slot #41, serves to couple the M-bit sample to the line-link receive flip-flop 6720. The output of flip-flop 6720 is subsequently sampled and the sample is delivered to the Supervisory Bit Insertion Circuit of FIG. 22. The flip-flop 6720 is then reset by a T7 timing pulse.

Other and different subscribers can be interconnected via links #1 and 2 by utilizing other and different time slots. For example, another set of 2.4 kb. subscriber lines can be interconnected, via links #1 and 2, during time slot #42. Other and different subscribers can, of course, also be interconnected in the very same time slot so long as other and different links are involved.

Turning to another example, let it be assumed that subscriber line 701 has requested an interconnection with a similarly rated subscriber, the latter being assumed connected to line circuit position #59. Since the message bit rate of subscriber 701 is 38.4 kb., the $\overline{B40}$ pulses define the data transfer interval and M-bits are read into and out of the matrix for each occurrence of a B40 timing pulse. Accordingly, it will be evident from FIG. 135 that there are 32 usable time slots between successive $\overline{B40}$ data transfer intervals and any unused time slot can be utilized to switch an M-bit of this message through the matrix. The specific time slot used will be established by the central processor.

Sixteen M-bits are read into and out of the matrix during each office memory cycle and sixteen time slots per memory cycle are required to accomplish the desired matrix switching at a 38.4 kb. message rate. As will be evident later from the description of the TDS Control, these sixteen time slots will appear in the same relative positions intermediate successive $\overline{B40}$ data transfer intervals. For example, for the assumed call at a message bit rate of 38.4 kb., the sixteen time slots in the sequence 6, 38, 70, 102 . . . can be used—assuming, of course, that none are in present use by another call. If the latter is the case, then another similar sequence of time slots will be selected by the central processor.

The M-bits of a 38.4 kb. call ripple or progress through the matrix in a manner similar to that described. If the links #1 and 3 are assumed chosen for this interconnect, the talking paths are the same as those described in the section entitled "Switching Matrix," supra.

Other and different 38.4 kb. subscribers can be interconnected via links #1 and 2 by utilizing other and different time slots. For example, another pair of 38.4 kb. subscriber lines can be interconnected, via links #1 and 3, during time slots in the sequence 4, 36, 68, 100 . . . ; or during time slots in the sequence 5, 37, 69, 101 . . . ; et cetera. And here again, a pair of 38.4 kb. subscribers can be interconnected in the very same sequence of time slots as another pair of subscribers so long as they utilized other and different links.

For a pair of 9.6 kb. subscribers, four M-bits are read into and out of the matrix during each office cycle and four time slots equally spaced in time are used to accomplish the M-bit switching therefor. Here again, the only requirement on time slot assignment is that none are in present use by another call.

The message bits of simplex trunks are switched through the matrix in the same manner as that described. In fact, to the TDS matrix and its control a simplex trunk is functionally indistinguishable from a similarly rated subscriber line.

*Broadcast calls*

As indicated hereinbefore, the all logic switching system of the present invention facilitates the implementation of the broadcast mode wherein there is one talker and a plurality of listeners. For purposes of explanation, a broadcast connection between 38.4 kb. message rate subscribers will be described, the manner in which such a connection is carried out for other rated subscribers being obvious therefrom.

With one important exception, a broadcast call appears similar to a plurality of distinct calls, each of which is between the talker and a respective one of the listeners. For example, the talker can be interconnected with a first listener, via links #1 and 2, during time slots in a sequence such as 1, 33, 65, 97 . . . , assuming, of course, none of the same are in present usage. The talker can also be interconnected with a second listener, via links #1 and 2, during time slots in another sequence such as 2, 34, 66, 98 . . . ; he can be further interconnected via the same links with a third listener in the time slot sequence 3, 35, 67, 99 . . . , et cetera. Theoretically, the 38.4 kb. talker could be interconnected with 32 listeners, if no other calls were presently being handled by links #1 and 2. In practice a broadcast call request is usually limited to four or five listeners, who may or may not be connected to the same matrix module. Whether the talker and listeners are connected to the same or different matrix modules is, of course, immaterial, since the links of all modules are interconnected via the intermatrix buses in essentially the same manner in which the links of a single matrix are interconnected.

For some calls, e.g., digitalized vocoded voice transmission, it is important that there be no return transmission from the listeners back to the talker. In the presence of such return transmission, proper synchronization of the talker vocoder cannot be maintained and a completely garbled message results. To this end, the link-junctor gates of the link over which the talker is transmitting are disabled during the appropriate time slots, for the duration of the broadcast call. For example, if the talker is transmitting over link #1 to a plurality of listeners, the link-junctor gates 4201–4203, 4211–4213, 4221–4223, et cetera, will be disabled thereby preventing "talk-back" to the talker. Thus, in this respect a broadcast call differs from the aforementioned plurality of separate and distinct calls from talker to respective listeners. The link-junctor gates can be readily disabled by reading all zeros into the proper time slots of the 1-of-8 and 1-of-3 delay line memory loops of Link Control Unit #1. This, of course, prevents any of the 24 link-junctor gates from being accessed and thereby effectively blocks all return transmission to the talker.

Multiplexing-demultiplexing

To provide a specific illustrative example of the multiplexing-demultiplexing capabilities of the system of the present invention, consider the 40.8 kb. interoffice multiplex trunk 2301. As indicated hereinbefore, there are sixteen M-bit positions (hereinafter called channels) per subframe and up to sixteen 2.4 kb. subscribers can be multiplexed onto this trunk. Each subscriber occupies a given assigned channed or M-bit position in each subframe, which assignment is generally retained for the duration of a call. The one exception to this occurs when a channel interchange operation is required to avoid a "blocking" situation. Channel interchange will be described in detail hereinafter.

As will be recalled, each incoming 40.8 kb. multiplexed bit stream is first brought into subframe synchronization with the 2.4 kc. timing waveform (and hence with each other) and each is then stretched into a uniformly spaced 38.4 kb. multiplexed message bit stream (note in this regard that 16 subscribers at a 2.4 kb. rate=38.4 kb.). At this rate, the $\underline{B40}$ pulses define the data transfer interval; the $\underline{F40}$ subframe marker pulses occur every sixteenth $\underline{B40}$ and these mark the end of each 2.4 kc. office memory cycle.

Considering now the schematic circuit diagram in conjunction with FIG. 135, let it be assumed that the 2.4 kb. subscriber line 1901 is presently assigned to M-bit position, or channel, #1 of the multiplexed data bit stream; the 2.4 kb. subscriber assumed connected to line circuit position #51 is temporarily assigned, for its call duration, to channel #2 (i.e. M-bit position #2); another 2.4 kb. subscriber connected to line circuit position #52 has been assigned to channel #3; et cetera. As each office memory cycle begins, the message bit in channel #1 is read into the matrix, that is, it is applied to the input of line-link transmit gate 7101. The link memories are circulating the coded address information of the various calls in progress and feeding the parallel stored address bits to line and link translators. From FIG. 135 it will be apparent that there are 32 usable time slots before the next multiplexed M-bit read in, any unused one of which can be utilized to accomplish the desired M-bit switching through the matrix. Here again, the specific time slot used will be determined by the central processor which keeps a running record of time slot utilization. For purposes of illustration, time slot #12 shall be assumed selected.

Accordingly, when the address bits stored in time slot #12 are delivered to the line and link translators, the line-link transmit gate 7101 and the link-junctor gate 4301 will be enabled thereby causing a sample of the message bit in channel #1 to ripple through the matrix to the line-link receive gate 6922, assuming, of course, links #1 and 2 have been selected to complete the call. The input of the latter gate is subsequently strobed by a $\phi 4$ strobe pulse and the M-bit sample is thus delivered to the line-link receive flip-flop 6720, which is associated with subscriber line 1901.

During this same time slot a message bit from subscriber 1901 is being switched through the matrix via a separate and distinct path and the same is deposited in channel #1 of the outgoing multiplexed data bit stream. That is, the system is "4-wire" as stated heretofore. This return talking path will not be described in detail since it should be rather obvious at this stage in the specification.

The message bit occupying the next multiplexed M-bit position (i.e., the M-bit in channel #2) is destined for the 2.4 kb. subscriber assigned to line circuit position #51. Any of the time slots from slot #32 through #63 can be used to switch this next M-bit through the matrix. This latter call is separate and distinct from the others being handled via the intermatrix trunk and the time slot selected to complete the interconnection need have no specific relative position with respect to the other time slots selected for the other calls. All that is necessary in this regard is that the time slot chosen fall within the appropriate channel time duration. The call processing of multiplexed message bits differs in this respect from a straight call between 38.4 kb. subscribers wherein the selected time slots fall in a given sequence of uniform spacing.

During the selected time slot, e.g., time slot #34, the line-link transmit gate 7101 and the link-junctor gate 4301 will be enabled thereby permitting a sample of the message bit to ripple through the matrix to the line-link receive gate 6102, here again assuming links #1 and 2 have been selected to complete this call. The latter gate is accessed for the duration of the selected time slot and hence when strobed by the $\phi 4$ strobe pulse it couples a sample of the M-bit to the receive-flip-flop of line circuit position #51. And during this same time slot a separate return path is established to deposit an M-bit from the 2.4 kb. subscriber of line circuit position #51 into channel #2 of the outgoing multiplexed data bit stream data.

The next input M-bit of the multiplexed bit stream occupies channel #3 and it is intended for the 2.4 kb. subscriber connected to line circuit position #52. Here again, any one of the next succeeding 32 usable time slots (i.e., time slots from slots #64 through 95) can be used to switch this M-bit through the matrix.

The described operation is repeated for each of the sixteen 2.4 kb. channels of the incoming multiplexed bit stream—assuming, of course, all of the same are in present use. At the end of an office cycle, marked by the F40 subframe marker pulse, the next succeeding M-bit of channel #1 will be read into the matrix, followed by the M-bits of channels #2, #3, et cetera, and the described operation is repeated.

The described multiplex-demultiplex switching operation can be thought of as a plurality of up to sixteen individual call interconnections between the sixteen channels of the 40.8 kb. multiplex trunk and sixteen 2.4 kb. subscribers. There are 32 available time slots per channel, any unused one of which can be utilized to complete a requested call interconnection. The time slots used for respective calls need bear no relationship, spatially or sequentially, to one another.

The necessary information as to channel assignment and the desired routing or destination of each call is carried out via the signaling channel of the multiplexed bit stream. Channels are seized and calls set up individually in response to requests for service; the S-channel possesses adequate capacity to assure the expeditious handling of substantially all such call requests. The signaling plan will be treated in detail hereinafter. The specific time slot used for a given interconnect will be determined by the local central processor in response to the received signaling information and its own record of present time slot utilization.

It is unlikely that all sixteen message channels of a 40.8 kb. interoffice trunk would be in use simultaneously. This, of course, in no way alters the multiplex-demultiplex operation, which is carried out as described except that the multiplex trunk transmit crosspoint remains disabled during idle channel time periods.

The multiplex-demultiplex capabilities of the present time division switching system are in no way limited to the foregoing example. For example, the present system is capable of multiplexing (and, conversely, demultiplexing) four 2.4 kb. message rate subscribers onto one 10.2 kb. interoffice trunk or, as another example, it can multiplex-demultiplex sixteen 38.4 kb. message bit streams onto a 614.4 kb. multiplexed message bit stream. In the latter case the B40 pulses constitute the subframe marker pulses. Considering a subframe at the 614.4 kb. message bit rate, a call interconnection can be made between each of sixteen 38.4 kb. message rate subscribers and the multiplex trunk in the alternate time solts 0, 2, 4, 6, 8 . . . 28, 30, while message bits are read into and out of the matrix and the receive flip-flops are reset in the intervening time slots 1, 3, 5, 7 . . . 29, 31, the intervening time slots thus defining the data transfer intervals. The paired time slots 0 and 1; 2 and 3; 4 and 5; . . . 30 and 31; thus comprise sixteen channels at the 614.4 kb. rate. The supervisory signal and control bits are inserted into this multiplexed message bit stream during the B40 subframe marker pulse periods, this insertion being accomplished in a manner similar to that heretofore described. The multiplexed bit stream out of the terminal circuit will be at a 652.8 kb. rate.

*Channel interchange*

Of the messages arriving at a local switching office over respective channels of a multiplex interoffice trunk some will generally be routed to local subscribers while others intended for remote subscribers will be routed to another multiplex trunk between the local office and the remote office serving said remote subscribers. For a tandem office call it is the general practice to attempt to seize corresponding channels in the tandem coupled multiplex trunks. However, it frequently happens that a given channel assigned to a calling party, associated with one switching office, is active on another call at the switching office associated with the called party, so that a busy condition results. This condition is known in the art as "blocking"; the possbility of such blocking is particularly acute in large time division switching systems. In accordance with the invention, blocking is overcome in the present system in a very simple, yet highly expeditious, manner.

As noted heretofore, the line circuit position circuitry can be modified in minor detail to provide for channel interchange. A pair of such line circuit positions is used to perform a single channel interchange operation, and additional pairs of line circuit positions can, of course, be set aside to perform additional channel interchange operations if required. The line circuit position circuitry used for channel interchange has been described in detail in the section entitled "Switching Matrix," supra.

Considering now the schematic circuit diagram in conjunction with FIG. 135, let it be assumed that a calling party, assigned to channel #2 of the multiplex bit stream carried by interoffice trunk 2301, desires to communicate with a subscriber connected to a remote switching office. The call is made via a similar multiplex interoffice trunk, which shall be assumed connected to line circuit position #59. However, channel #2 of the latter interoffice trunk may already be in use by another and different call and hence in the absence of some channel interchange facility, the call will not be able to be completed. If this is the case, a channel interchange operation similar to that which will now be described is initiated. It is assumed that channel #2 of the trunk to the remote office is presently occupied, but another channel of the same, e.g., channel #4, is idle.

An M-bit in channel #2 of trunk 2301 is applied to the input of the line-link transmit gate 7101 for a time period that encompasses the usable memory time slots #32 through #63. An unused time slot (e.g., #35) is selected by the central processor and when the appropriate address bits stored in memory are delivered to the line and link translators, the line-link transmit gate 7101 and the link-junctor gate 4301 will be enabled thereby causing a sample of the M-bit in channel #2 to ripple through the matrix to the line-link receive gate circuit 4902—assuming, of course, links #1 and 2 have been selected for this interconnect. The receive gate circuit 4902 will also be accessed during this time slot #35 and hence when the input of the same is strobed by the $\phi 4$ strobe pulse the M-bit sample of channel #2 is read into the line-link receive flip-flop 4710. This read in is destructive because of the single-to-double-rail receive gate circuit. The return talking path shall be ignored for the moment.

The sampled M-bit remains in the receive flip-flop 4710 until a new M-bit sample is read in a subframe later. Prior to this new read in, however, an M-bit in channel #4 of the interoffice trunk connected to line circuit position #59 will be presented to the line-link transmit gate 5921 for a time period that encompasses the usable memory cycle time slots #96 through #127. An unused time slot (e.g., #103) is selected by the central processor and when the appropriate address bits stored in memory are delivered to the line and link translators, the line-link transmit gate 5921 and the link-junctor gate 4301 will be enabled thereby causing a sample of the said M-bit in channel #4 to ripple through the matrix to the line-link receive gate circuit 4912—here again, it is assumed that links #1 and 3 have been preselected for this interconnect. The receive gate circuit 4912 is also accessed during time slot #103 and hence when the $\phi 4$ pulse occurs this M-bit sample of channel #4 is read into the line-link receive flip-flop 4730, where it remains until the next M-bit read in a subframe later.

The line-link transmit gate 4911 will, of course, also be accessed simultaneously with the receive gate circuit 4912, during time slot #103, and thus the aforementioned channel #2 bit previously stored in receive flip-flop 4710 is read out and delivered to the intermatrix bus 212. From there it is coupled, via the accessed link-junctor gate 4202 and the link receive bus 223, to the line-link receive gate 6022. The receive gate 6022 is also accessed during time slot #103 and it will therefore pass this M-bit sample when strobed by the $\phi 4$ strobe pulse. The net result of this last operation is that the M-bit in channel #4 of the trunk connected to line position #59 is stored in flip-flop 4730, and the M-bit of channel #2 of trunk 2301 is deposited in channel #4 of the former.

During the next succeeding subframe the next M-bit in channel #2 of trunk 2301 will be deposited in receive flip-flop 4710 during time slot #35. This operation is identical to the previously described. During this same time slot, however, the aforementioned channel #4 bit prevously stored in flop-flop 4730 is read out therefrom via the accessed line-link transmit gate 4901. This channel #4 M-bit is delivered to the line-link receive gate 7202 via the intermatrix bus 212, the accessed link-juncture gate 4202 and the link receive bus 223. The $\phi 4$ pulse then strobes the M-bit sample into receive flip-flop 7110 with the result that the said channel #4 M-bit is now deposited in channel #2 of the interoffice trunk 2301.

To summarize the detailed channel interchange operation set forth above, an M-bit from channel #2 of interoffice trunk 2301 is read into flip-flop 4710 once per subframe, while simultaneously therewith the M-bit previously stored in flip-flop 4730 is read out and switched through the matrix to receive flip-flop 7110 via a separate and distinct path. The latter M-bit, from channel #4 of the trunk connected to line circuit position #59, is thus deposited in channel #2 of the outgoing transmission path of intermatrix trunk 2301. Shortly thereafter, an M-bit from channel #4 of the trunk connected to line circuit position #59 is read into flip-flop 4730, while simultaneously therewith the M-bit previously stored in flip-flop 4710 is read out and switched through the matrix to receive flip-flop 5920 via a separate and distinct path. This latter M-bit was, of course, derived from channel #2 of trunk 2301 and it is now deposited in channel #4 of the trunk tied to line position #59. The operation is repeated for the duration of a call with the result that the call is completed via different channels of the respective tandem connected trunks.

The channel interchange operation is initiated under the control of the central processor when a given call cannot be established in corresponding channels of tandem multiplex trunks. The specific time slots used for the same will be determined by the central processor which keeps a running record of trunk channel utilization and the time slot assignments for other and different calls.

*Conference calls*

The TDS system of the present invention is capable of establishing conference call connections in several different manners. The nature and number of possible conferees, the number of call instructions necessary for the original connection and subsequent reswitching for each, and the central processor programming task are some of the factors which will be determinative of the exact method utilized for a given network. The methods to be disclosed are essentially the same whether the digital bit streams to be conferenced are digitalized vocoded voice signals (at the low bandpass, 2.4 kb. rate) or PCM coded voice signals (at the higher 38.4 kb. rate; note, 9600 samples per second×4 digit code=38.4 kb. per second). For purposes of explanation, a conference call interconnection between 2.4 kb. vocoded voice subscribers will be described in detail, the manner in which conference calls are carried out between other message rate subscribers being readily apparent therefrom. The talking paths are established in exactly the same manner as heretofore described and hence further detailed recitation of the various talking paths does not appear warranted; the same will be evident in the light of the foregoing disclosure.

The basic conference call interconnection is similar to the broadcast type connection heretofore described, with the exception that one of the conferees, in most instances the conference leader, can "talk back." For example, the conference leader will advise the central processor, by means of multiple address headings, that he desires a conference between similarly rated 2.4 kb. subscribers, designated A, B and C. The central processor then selects three unused time slots from the total of 512 usable time slots that might be used for this call. Note, from FIG. 135, there are 512 usable time slots per 2.4 kb. bit period. The conference leader then broadcasts, i.e., transmits, on multiple time slots (one per listener). Thus, the conference leader may for example be connected to the listening subscribers A, B and C via links #1 and 2, in time slots #1, 29 and 62, respectively.

The transmission from all but one of the listening conferees back to the broadcaster must be inhibited in the respective time slots. If return transmission from each conferee were permitted, proper synchronization of the broadcaster vocoder could not be maintained and a completely garbled message would result. One conferee, however, can be permitted to have a two way interconnection with the broadcaster without giving rise to synchronization problems. This will be evident to those familiar with multiplex vocoding. Thus, if the broadcaster is assumed transmitting over links #1 to the subscribers A, B and C in time slots #1, 29 and 62, respectively, and subscriber A is permitted to talk back, the link-junctor gate 4202 will be enabled during time slot #1 and disabled in time slots #29 and 62. As indicated hereinbefore, this disabling is accomplished by reading zeros into the appropriate time slots of the 1-of-8 and 1-of-3 delay line memory loops of Link Control Unit #1.

As a general rule, on the initial interconnection the conference leader broadcasts and all conferees are inhibited to enable the originator to set up the course of the conference without interference. Then on subsequent reswitches the conference leader is programmed into the "talk back" position so that he retains voice control of the conference indirectly through the broadcaster. Thus, the described talk back facility given A, supra, is the exception and not the rule. That is, on initial connection the conference leader broadcasts on multiple time slots (one per listener) and the return transmission from all conferees is generally inhibited. At some time during the conference the conference leader may want A's opinion on the matter under discussion. The conference leader then sends the appropriate signaling information, via the signal channel, to the central processor which, in response thereto, switches the broadcast mode facility to subscriber A and gives the conference leader talk back facility. Subscriber A now broadcasts, i.e., transmits, on multiple time slots (one per listener); the return transmission to A is inhibited during all but one of the selected multiple time slots, this one exception being the time slot chosen for the "conference leader-subscriber A" interconnection. The conference leader can therefore talk back to subscriber A.

Prior to each subsequent reswitch the conference leader will advise the present broadcaster of his intent to transfer the broadcast facility to another conferee. The leader then sends the appropriate signaling information to the central processor to place another subscriber in the broadcast mode, and to reestablish his talk back facility with the new broadcasting conferee. In this fashion each conferee is permitted to add to the conference on one or more occasions.

To minimize central processor time slot searching, it is desirable that the initially selected time slots be retained on reswitching (subsequent changes of broadcaster). The only real limit on the possible number of conferees in any given conference is the number of available time slots. Theoretically, 512 vocoded voice conferees could participate in the same conference if no other calls were presently being handled by the selected links.

The above-described method of establishing conference call connections is equally applicable to subscribers at other and different message bit rates. For example, a conference between 38.4 kb. PCM coded subscribers is established by connecting the conference leader with a first listening conferee during time slots in a sequence such as 1, 33, 65, 97 . . . assuming, of course, none of the same are in present usage. The conferee leader can also be interconnected with a second listening conferee during time slots in a second similar sequence, e.g., 2, 34, 66, 98 . . .; he can be further interconnected via the same links with a third listening conferee in still another time-slot-sequence, e.g., 3, 35, 67, 99 . . .; et cetra. The conference leader thus broadcasts, i.e., transmits, on multiple time-slot-sequences (one such sequence per conferee). There are 32 usable time slots per 38.4 kb. bit period and hence up to 32 PCM coded voice conferees could participate in the same conference if no other calls were presently being handled by the selected links.

Here again, the transmission from all but one of the listening conferees back to the broadcaster must be inhibited in the respective utilized time slots. In the usual case, the conference leader initially broadcasts and all listening conferees are inhibited in the manner heretofore described. On subsequent reswitches the conference leader is then programmed into the talk back condition. Thus, the conference leader desiring a reswitch sends the appropriate signaling information, via the S-channel, to the central processor which, in response thereto, switches the broadcast mode to a designated conferee and gives the conference leader talk back thereto. The designated conferee now broadcasts, i.e., transmits, on multiple time-slot-sequences (one sequence per listener), and the return transmission to this broadcaster is inhibited in the heretofore described manner during all but one of the selected time-slot-sequences, the one exception being the time-slot-sequence selected for the "conference leader-designated conferee" connection.

It is sometimes desirable and even necessary to conference together subscriber lines of different message bit rates. For example, a conference between digitalized vocoder lines (2.4 kb.) and PCM coded lines (38.4 kb.) may be required. The TDS system of the present invention is capable of establishing such a conference connection.

Figure 140:
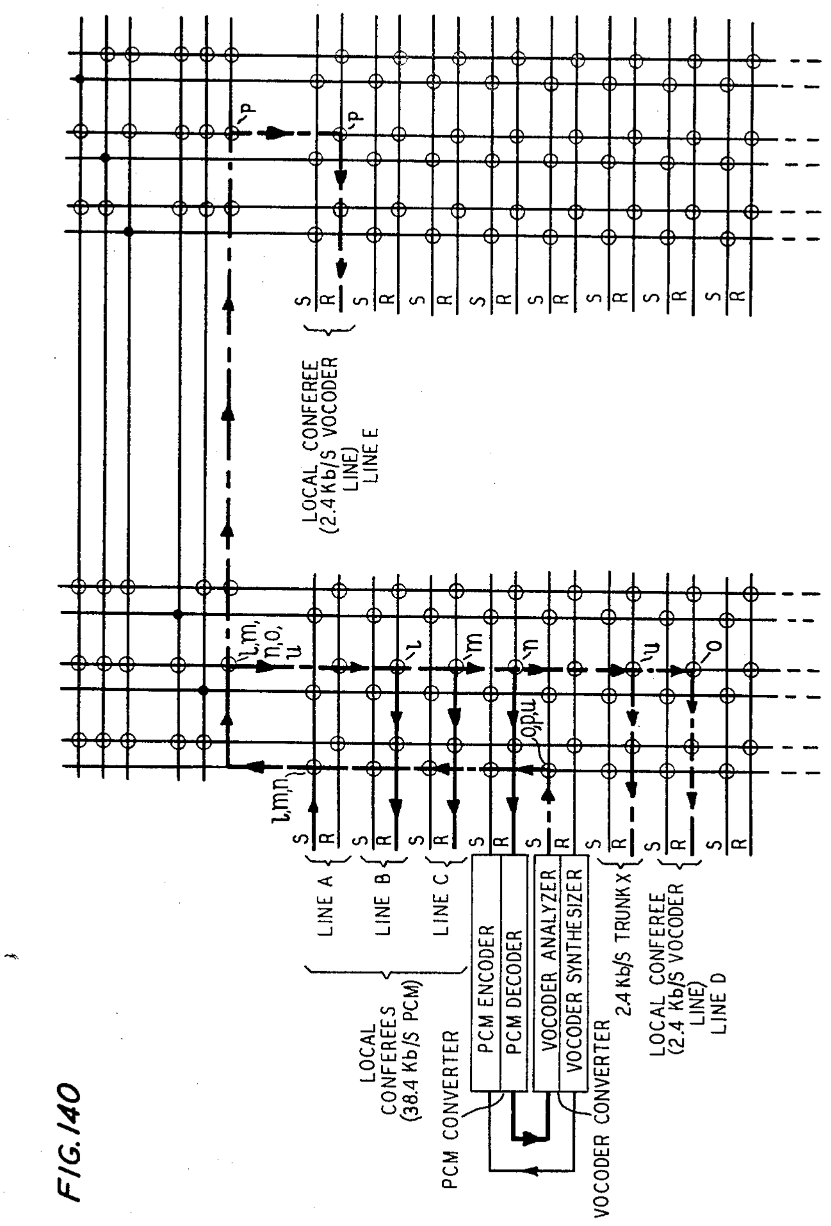
FIGS. 140 through 142 are symbolic illustrations of the switching matrix and the manner in which various conference call connections can be established therein.
Figure 141:
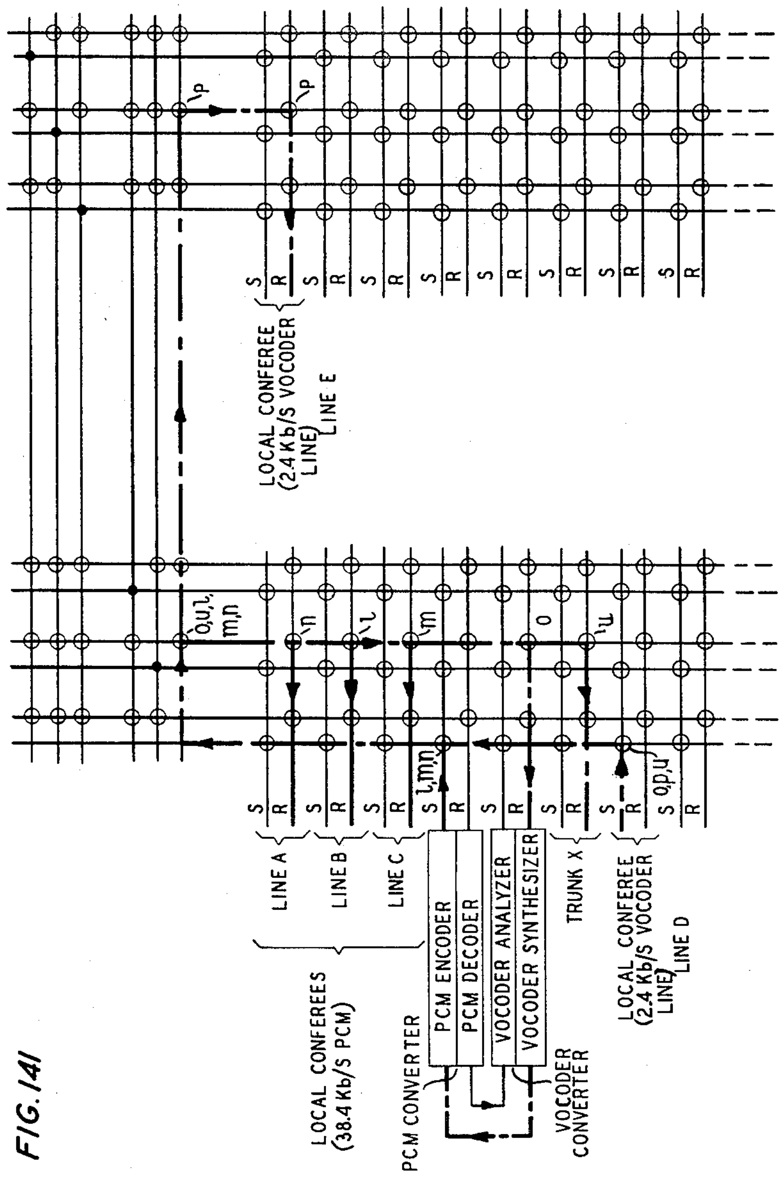

FIGS. 140 and 141 of the drawings illustrate the manner in which a conference call connection of the described type is set up in the instant TDS. The figures show symbolically, a pair of matrix modules and their respective crosspoints, with the modules being interconnected via intermatrix buses and link-junctor crosspoints as heretofore described.

Referring now to FIG. 140, line A, at a 38.4 kb. rate, is assumed the originator of the conference, i.e., the conference leader. Connections are made to the 38.4 kb. conferees B and C in the same manner as that described. Thus, an M-bit of subscribed A is routed to subscribers B and C in respective time slots *l* and *m*, the heavy solid line indicating the paths thereof. In addition, however, a similar connection is made to the PCM decoder. Thus, the M-bit routed to subscribers B and C in respective time slots *l* and *m* is also routed to the PCM decoder in time slot *n*. These connections are repeated at the 38.4 kb. rate, i.e., 16 times per office cycle.

To connect the 38.4 kb. broadcaster to 2.4 kb. vocoder conferees a PCM to analog to vocoder loop connection is utilized. Conversely, to connect a 2.4 kb. broadcaster to 38.4 kb. PCM conferees a vocoder to analog to PCM conversion is required. The instant conference call feature of the invention is in no way limited to any specific PCM or vocoder conversion apparatus; and the required conversions can, in accordance with the invention, be performed by any of the various conversion units known in the art. For example, if a log differential PCM encoding scheme is utilized, the PCM encoding and decoding apparatus can be similar to that disclosed in the Patents 2,605,361 and 2,724,740 issued to C. C. Cutler. The vocoder analyzer and synthesizer may be similar to those units disclosed in the aforementioned article by A. R. Billings.

The analog output of the PCM decoder is connected to the input of the digitalized vocoder analyzer where it is converted into a typical 2.4 kb. digital vocoded message. The converted vocoder output is then switched through the matrix to the appropriate 2.4 kb. conferees using, of course, other and different time slots. That is, no 2.4 kb. time slot may coincide with any of the 38.4 kb. time slots of the same link group.

An B-bit at the output of the vocoder analyzer is routed to the 2.4 kb. conferees D and E in respective time slots *o* and *p*, the heavy dotted line indicating the paths thereof. Conferee E, it will be noted, is tied to a different matrix module. The M-bit output of the vocoder converter is also shown routed to a remote conferee via the 2.4 kb. trunk X, this interconnect occurring during time slot *u*. These latter interconnections are, of course, repeated at the 2.4 kb. rate, i.e., once per office cycle.

To summarize the above, the 38.4 kb. PCM coded conference leader broadcasts directly to the other similarly rated conferees on multiple time-slot-sequences (one sequence per conferee) as heretofore described. However, with respect to the vocoder conferees, the 38.4 kb. PCM coded broadcast message is converted to a 2.4 kb. bit stream, which to the vocoder conferees appears to originate or emanate directly from the vocoder conversion unit. This converted 2.4 kb. bit stream is then independently switched through the matrix to the appropriate 2.4 kb. subscriber conferees using separate and distinct time slots.

The same conference with line D in the talking or broadcast condition is shown in FIG. 141. Connections are made to the 2.4 kb. conferees (i.e., line E and the remote conferee tied to trunk X) in the same manner as that heretofore described. Thus, an M-bit of subscriber D is routed to line E and trunk X in respective time slots *p* and *u*, the heavy dotted line indicating the paths thereof. Here again, to minimize central processor time slot searching, it is desirable that the time slots initially selected for the conference call be retained on reswitches. Now, in addition to these connections, a similar connection is made to the vocoder synthesizer. Thus, the M-bit routed to line E and trunk X in respective time slots *p* and *u* is also routed to the vocoder synthesizer in time slot *o*. These connections are each repeated at the 2.4 kb. rate. The vocoder synthesizer converts the received message bit stream to an analog output which is then delivered to the PCM encoder where it is converted into a typical 38.4 kb. PCM coded bit stream.

The PCM encoder output is switched through the matrix to the appropriate 38.4 kb. subscriber conferees using other and different time slots. For example, an M-bit at the output of the PCM encoder is routed to the 38.4 kb. conferees A, B and C in respective time slots *l*, *m* and *n*, the heavy solid line indicating the paths thereof. The latter interconnections are repetitive at the 38.4 kb. rate.

The PCM to analog to vocoder conversion loop and the vocoder to analog to PCM conversion loop are functionally separate and distinct. Thus, while the line D is broadcasting to lines A, B and C via the vocoder to analog to PCM loop connection, line A may be talking back to line D via the PCM to analog to vocoder loop connection. Here again, transmission back to the broadcaster from all the other conferees should be inhibited in the other time slots seized for this conference.

While the PCM and vocoder conversion units have been described in connection with their use in establishing conference calls between different message rate subscribers, it will be clear that they can be similarly used to establish a party-to-party call between a pair of subscribers operating at different rates, i.e., a party-to-party call between a 38.4 kb. PCM coded subscriber and a 2.4 kb. vocoder subscriber. Such a call is carried out by establishing a pair of talking paths between the 38.4 kb. subscriber and the PCM converter, in much the same manner as a straight 38.4 kb.-to-38.4 kb. interconnect, and a pair of talking paths between the 2.4 kb. subscriber and the vocoder converter. For all intents and purposes, the PCM converter will appear to the 38.4 kb. subscriber as another 38.4 kb. originating subscriber, while the vocoder converter appears to the 2.4 kb. subscriber as a similar 2.4 kb. line. Separate time slots should, of course, be utilized for the 2.4 kb. and 38.4 kb. message bit switching.

In the described conference call arrangement, wherein the broadcaster must broadcast on multiple time slots to reach multiple listeners, the number of reswitch connections is always equal to the number of original connections and the same grows in proportion to the number of conferees. This method of establishing conference calls is readily programmed and is particularly advantageous in offices where small conferences are prevalent. However, inasmuch as this method requires that multiple connections be broken and re-established for each change of broadcaster, the same becomes unwieldy for conferences of more than eight to ten conferees due to the increasing number of reswitch connections required as conferees are added.

In accordance with the present invention, the channel interchange facility of the TDS is used to connect a single broadcaster to a number of listeners. This arrangement allows the broadcaster to reach all listeners by transmitting on a single time slot and this in turn reduces the number of connections that must be changed upon reswitching. The broadcaster transmits to the channel interchange facility on a single time slot (assuming a 2.4 kb. conference) and the channel interchange acts as a memory to remember each bit of the broadcaster's transmission for a full bit interval. The stored bit is then sampled by each listener in his own time slot sometime prior to the next M-bit read in from the broadcaster. When changing broadcasters, it is now only necessary to reswitch one listener with the person currently broadcasting, while the remaining listeners continue to sample the channel interchange output in their assigned time slots. In this manner a minimum fixed number of connections are involved in a reswitch operation.

Figure 142:
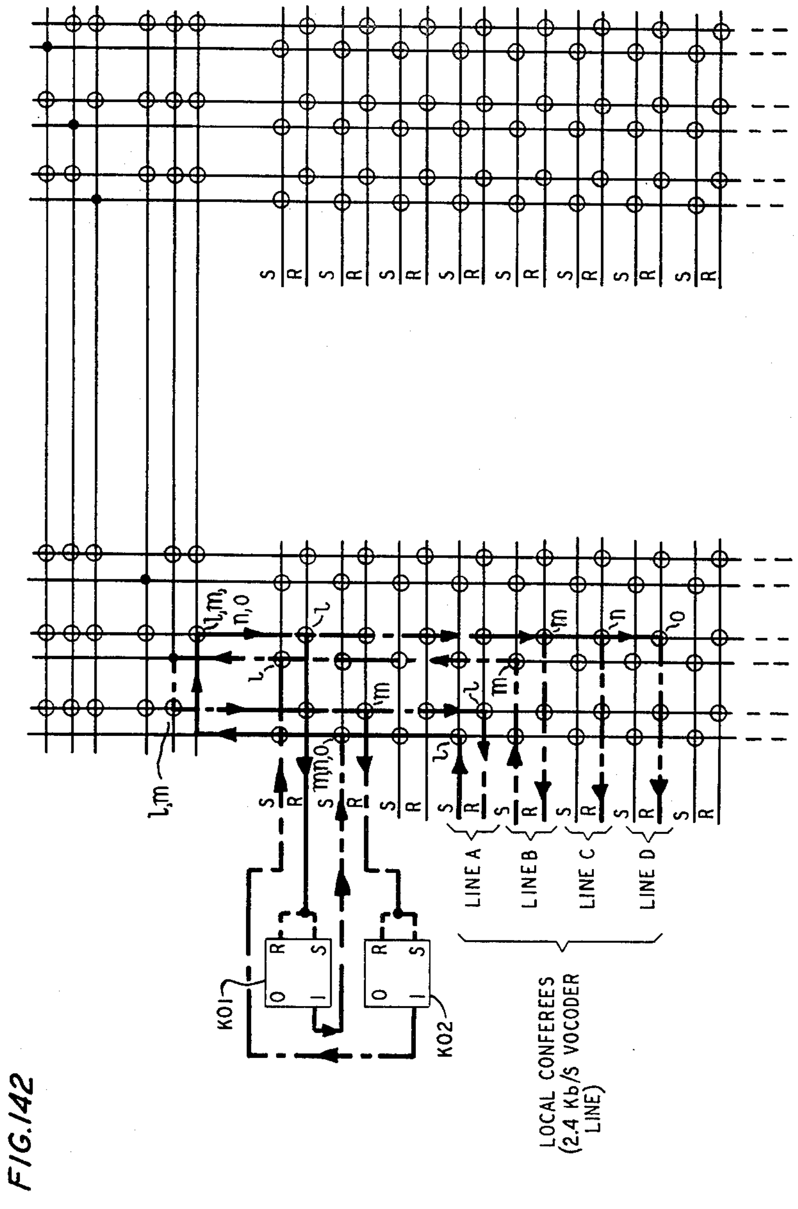

FIG. 142 of the drawings illustrates the manner in which a conference call connection is set up using the channel interchange facility. This figure is similar to FIGS. 140 and 141, but it shows in addition a pair of line circuit positions connected in the heretofore described channel interchange connection; see the section entitled "Switching Matrix," supra, for a detailed description of the channel interchange circuitry. The destructive read in to the flip-flops K01 and K02 is illustrated symbolically by the bifurcated or paired connection to each flip-flop from the respective receive lines.

Line A, at a 2.4 kb. rate, is assumed to be the broadcaster. An M-bit of line A is routed to the flip-flop K01 in the time slot *l*, the heavy solid line indicating the path thereof. This M-bit then "sits" in this storage flip-flop until the next M-bit of line A is sampled, one full office cycle later. Prior to this next M-bit read in, however, the output of flip-flop K01 is sampled in time slots *m*, *n* and *o* and the samples routed to the 2.4 kb. lines B, C and D, respectively; the heavy dashed line indicates these latter paths. The described interconnections are each repeated at the 2.4 kb. rate, i.e., once per 2.4 kc office cycle Now if during the conference it is decided to transfer the broadcast facility to line B, it is only necessary to reswitch line B, the listener, with line A, the broadcaster. Thus, the line B input crosspoint is now accessed in time slot *l* to thereby route in similar fashion each M-bit thereof to the flip-flop K01, while line A is now accessed in time slot *m*. The accessing of all other gate crosspoints is unchanged; the other listeners C and D continue to sample flip-flop K01 in their previously assigned time slots. It should be apparent, therefore, that regardless of the number of conferees a minimum fixed number of connections are involved in a reswitch operation.

As in the previous methods heretofore described, one of the conferees can be permitted to talk back to the broadcaster, and generally it is the conference leader that retains this facility. However, as previously indicated, return transmission to the broadcaster from all other conferees must be prevented by inhibiting the appropriate link-junctor gate in the appropriate time slots.

In FIG. 142, line B is assumed programmed in the talk back position. Accordingly, as the output of flip-flop K01 is sampled in time slot *m* and this sample routed to line B, an input M-bit of line B is simultaneously sampled and routed to flip-flop K02 via the heavy dot-dash line. The latter M-bit sample then remains in flip-flop K02 for a full bit interval. Now as the next M-bit input of the broadcasting line A is sampled in time slot *l* and routed to flip-flop K01, the line B M-bit stored in flip-flop K02 is read out therefrom and routed to line A via the heavy dot-dash line, thus completing two way communication between lines A and B. Line A therefore is broadcasting to lines B, C and D, while line B is permitted to talk back to A.

If the broadcast facility is subsequently shifted to line C by changing the line A and C time slot assignments as described, line B will automatically be shifted into talk back with C without any change in his time slot assignment.

On the first reswitch of a conference call the conference leader, who generally retains talk back, should be programmed into the last time slot preceding the designated broadcaster's time slot. If this caveat is not observed, the channel interchange flip-flop in the broadcaster's receive path will be reset to a steady D.C. level by one of the inhibited time slots, prior to the same being read, and the "talk back" will be lost. Subsequent reswitching then proceeds as described.

The described conference call operation is exactly the same for 38.4 kb. message rate conferees, except that the described interconnections are completed sixteen times per office cycle.

A PCM to analog to vocoder loop connection, and of course the converse thereof, can be utilized in connection with the described channel interchange conference call arrangement. The use herein is substantially the same as that heretofore described, that is, the output of the loop connection is treated exactly like a normal vocoder output (assuming a PCM broadcaster, some vocoder listeners, and a PCM to analog to vocoder conversion loop) and it is regarded as the point source to be switched in programming this conference connection. For example, a PCM broadcaster can be switched to the input of a PCM to analog to vocoder loop connection with the output thereof then switched to a channel interchange storage cell which is sampled in respective time slots by the 2.4 kb. listeners. Here again, care must be exercised so that none of the slow rate (2.4 kb.) vocoder time slots coincide with any of the high rate (38.4 kb.) PCM time slots. The talk back facility can be carried out in essentially the same fashion as heretofore described. The same talk back restrictions are, however, applicable; for example, talk back from only one listener is permissible.

*Time division switch control*

The Central Processor (C.P.) receives a service request from a subscriber and it performs the logical steps required to determine the service to be given and to issue instructions to the equipment needed to provide this service. Since the logic capability of the C.P. is time-shared among many functions, these instructions must be reasonably basic and the equipment to which they are issued must be capable of storing and using this information. In the case of the instant switching system, the recirculating memories provide this storage function. The crosspoint addresses are stored in the memories in a manner such that the transfer of information can take place at the desired rate.

The present switching system has two basic timing cycles which are much different from the C.P. memory cycle. One is the time slot which is short with respect to the computer memory cycle and the other is the delay line memory recirculation cycle which is much longer. A primary purpose of the Time Division Switch Control Unit (TDS Control) is to provide for the matching of the timing characteristics of the instant TDS to that of the C.P.

The TDS Control receives the call instructions from the C.P. and in response thereto loads the crosspoint address information in the appropriate link control memories, in the proper time slot or slots thereof. A further function ancillary to this is the generation of the parity bits for the link control units.

The call instructions required for the control of the switching system must specify the when, what path, and for whom a connection should be made. The "when" consists of time slot and bit rate information. The "what path" consists of link and related link-junctor information, and the "for whom" consists of line information. Call instructions, of a somewhat similar nature, are also necessary to take down the connection when a call is terminated.

As indicated hereinbefore, recirculating delay line memory loops continue to establish the desired interconnection, on a time shared basis, for the duration of the call. The memory length is equal to a 2.4 kc. period, or 416⅔ microseconds. This period is equal to 544 time slots of .766 microsecond duration. Thirty-two of these time slots are reserved for the timing of the switching matrix line terminating flip-flops (i.e., they define the data transfer intervals) and the remaining 512 are available for message bit switching through the matrix. Accordingly, in order to describe one time slot out of 512 usable time slots at least 9 call-instruction information bits are required ($2^9=512$). These 9 bits are used to control access to the delay line memories during the selected time slot period. The 9.6 kb. and 38.4 kb. message bit rates, for example, require 4 and 16 message bit transfers per 2.4 kc. period, respectively, and hence rate information is also needed.

The maximum number of call instruction bits necessary to describe a path and a subscriber depends on the size to which the office may grow. A 1000 line office was heretofore assumed, the same consisting of eight link groups of 127 lines per group. Each link group consists of three links for a total of 24 links. Therefore, in accordance with the above, 7 call instruction bits are necessary to define any given line number (i.e., a line circuit position) and 5 bits are needed to define any given link.

The format of the call instructions from the C.P., for a 1000 line office, is given below. The first word specifies the when and what path information and the second word designates for whom.

| | Number of Bits | Bit Location in Word |
|---|---|---|
| FIRST WORD | | |
| Information: | | |
| Rate | 1 | 0 |
| Time Slot | 9 | 1–9 |
| Inhibit Bits | 2 | 10–11 |
| Calling Party Link Number | 5 | 12–16 |
| Called Party Link Number | 5 | 17–21 |
| Test | 1 | 22 |
| Parity | 1 | 23 |
| Total First Word | 24 | |
| SECOND WORD | | |
| Information: | | |
| Calling Party Line Number | 7 | 0–6 |
| Called Party Line Number | 7 | 7–13 |
| Parity | 1 | 14 |
| Total Second Word | 15 | |

With the addition of one parity bit per word, a complete call instruction consists of 39 bits—divided as indicated into two words. The purpose of the Inhibit and Test bits will be described in detail hereinafter.

Referring now more specifically to the drawings and particularly to FIGS. 83 through 103, the TDS Control shown therein comprises two identical units, which for want of a better word shall be termed Buffers hereinafter. The two Buffer equipments are arranged so that both can operate in a synchronous step-by-step mode. This duplex operation is primarily for purposes of redundancy, i.e., to assure that a failure in a Buffer does not disable the entire switching system. Should such a Buffer failure occur, a simplex mode of operation is automatically established.

Figure 86:
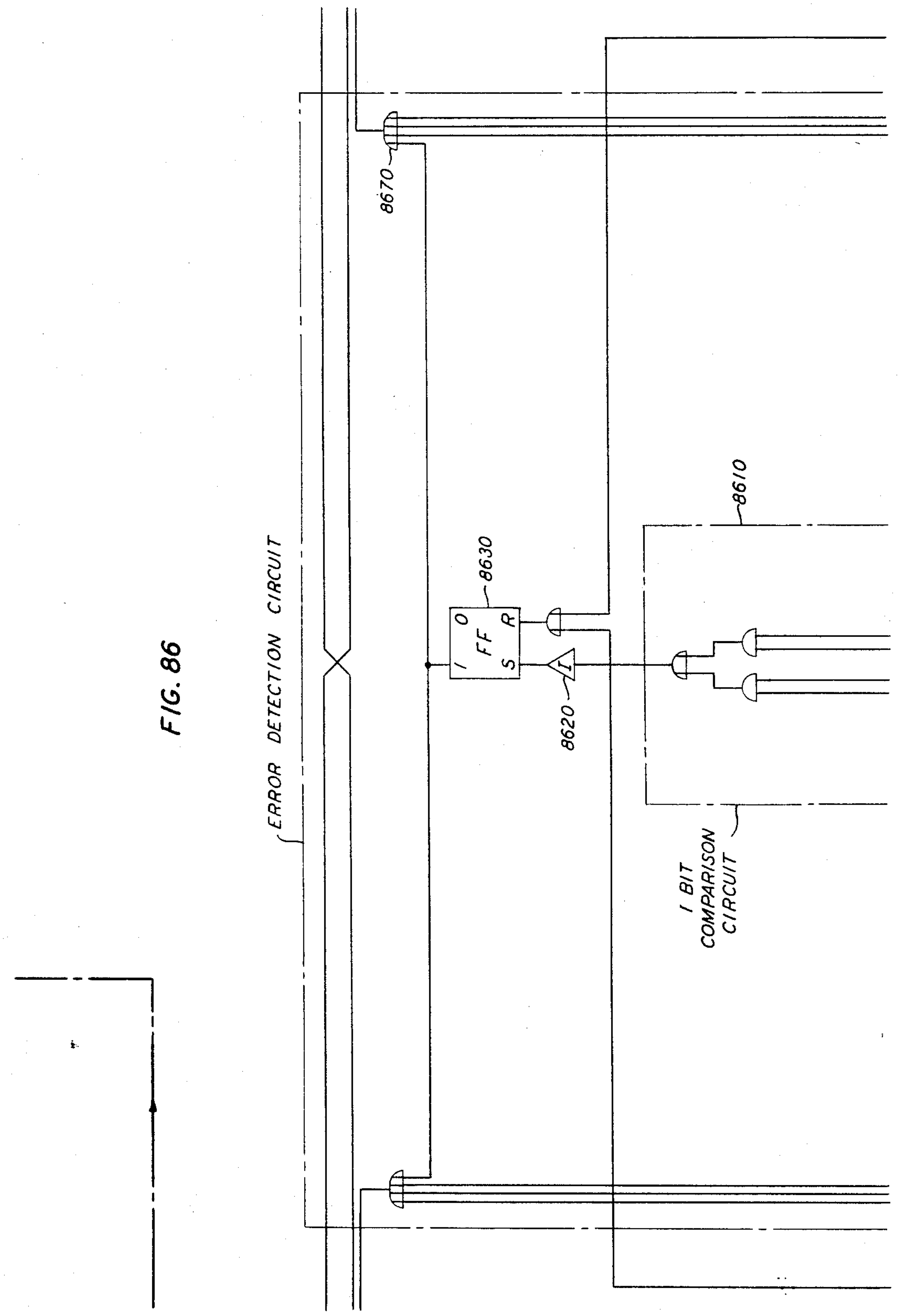
Figure 87:
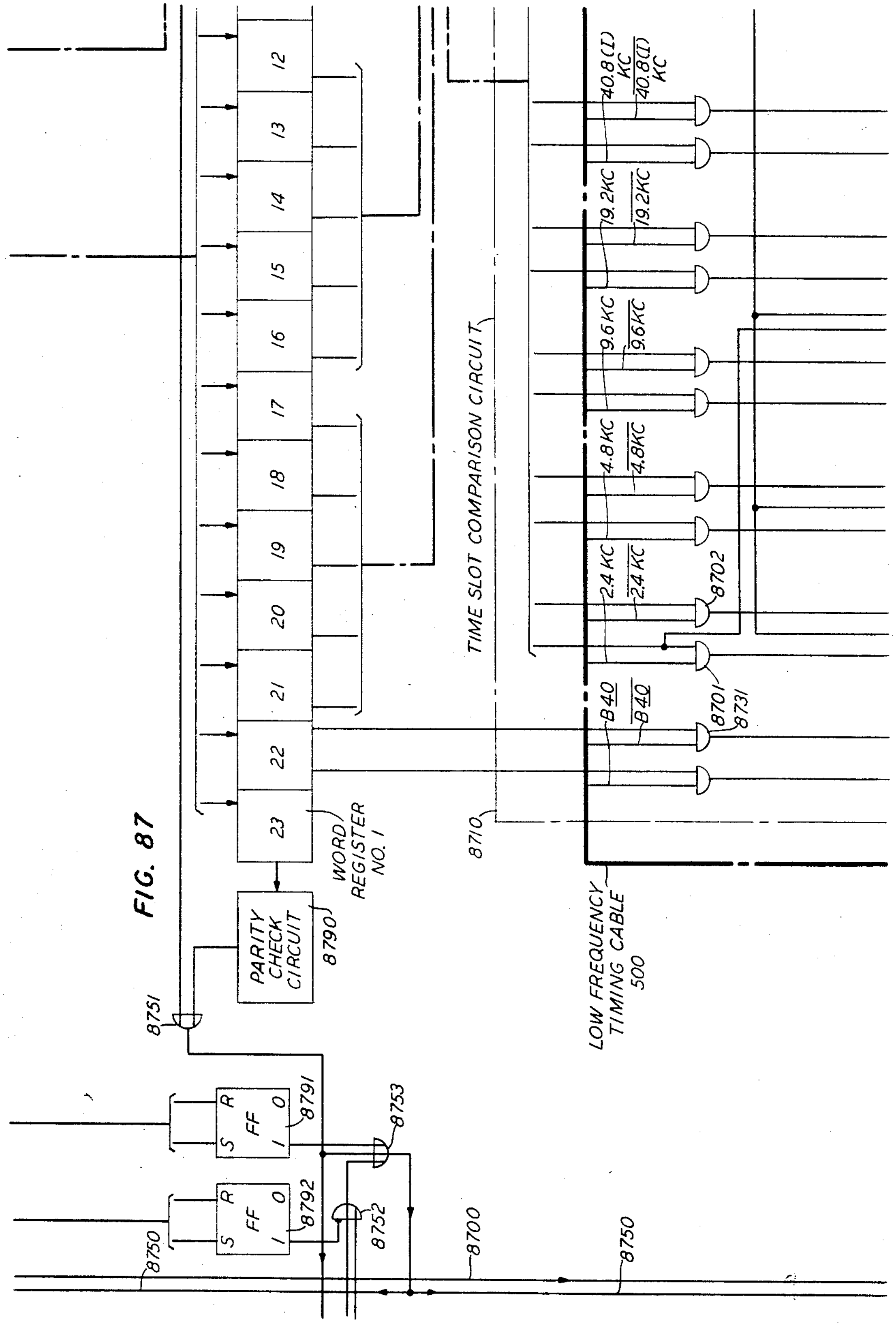
Figure 88:
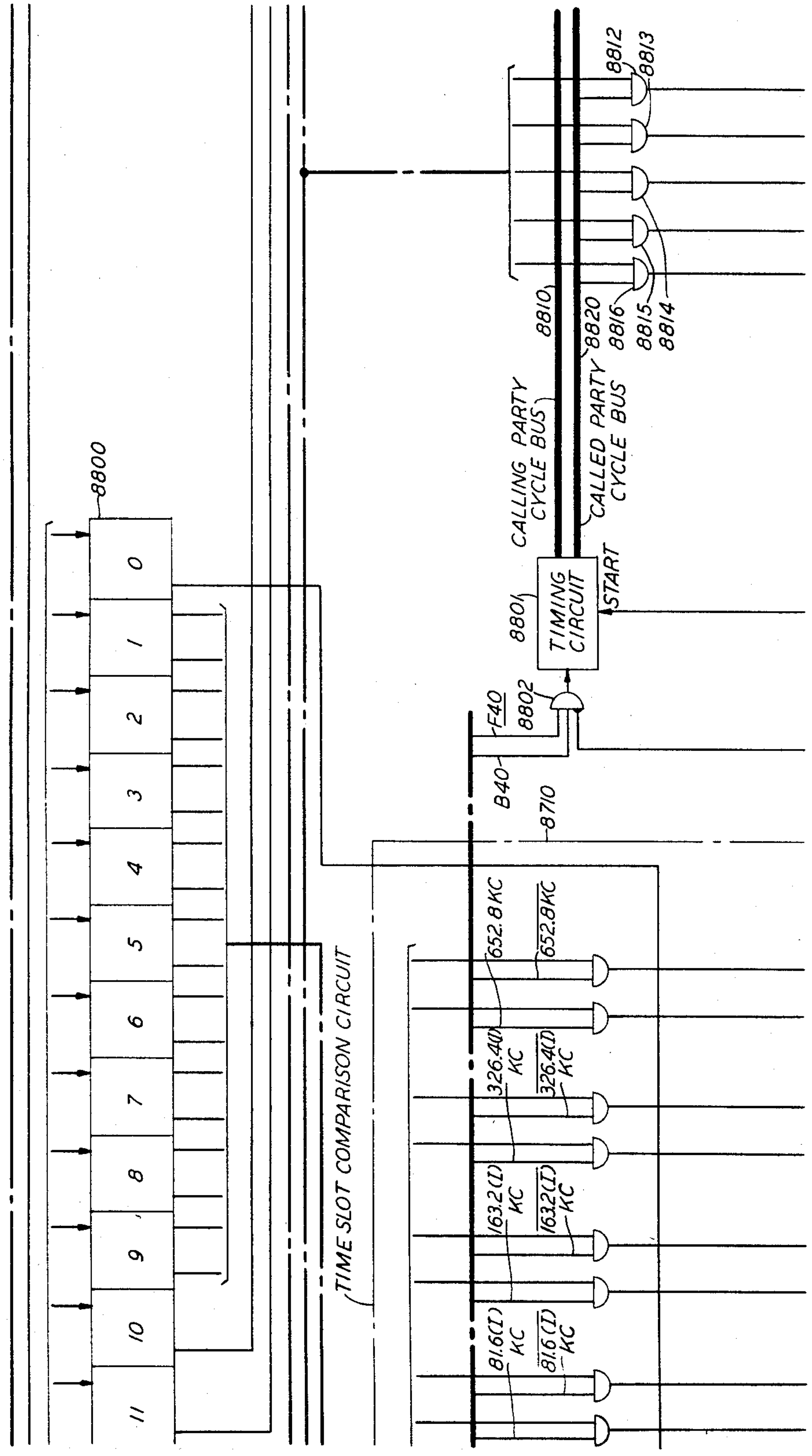
Figure 93:
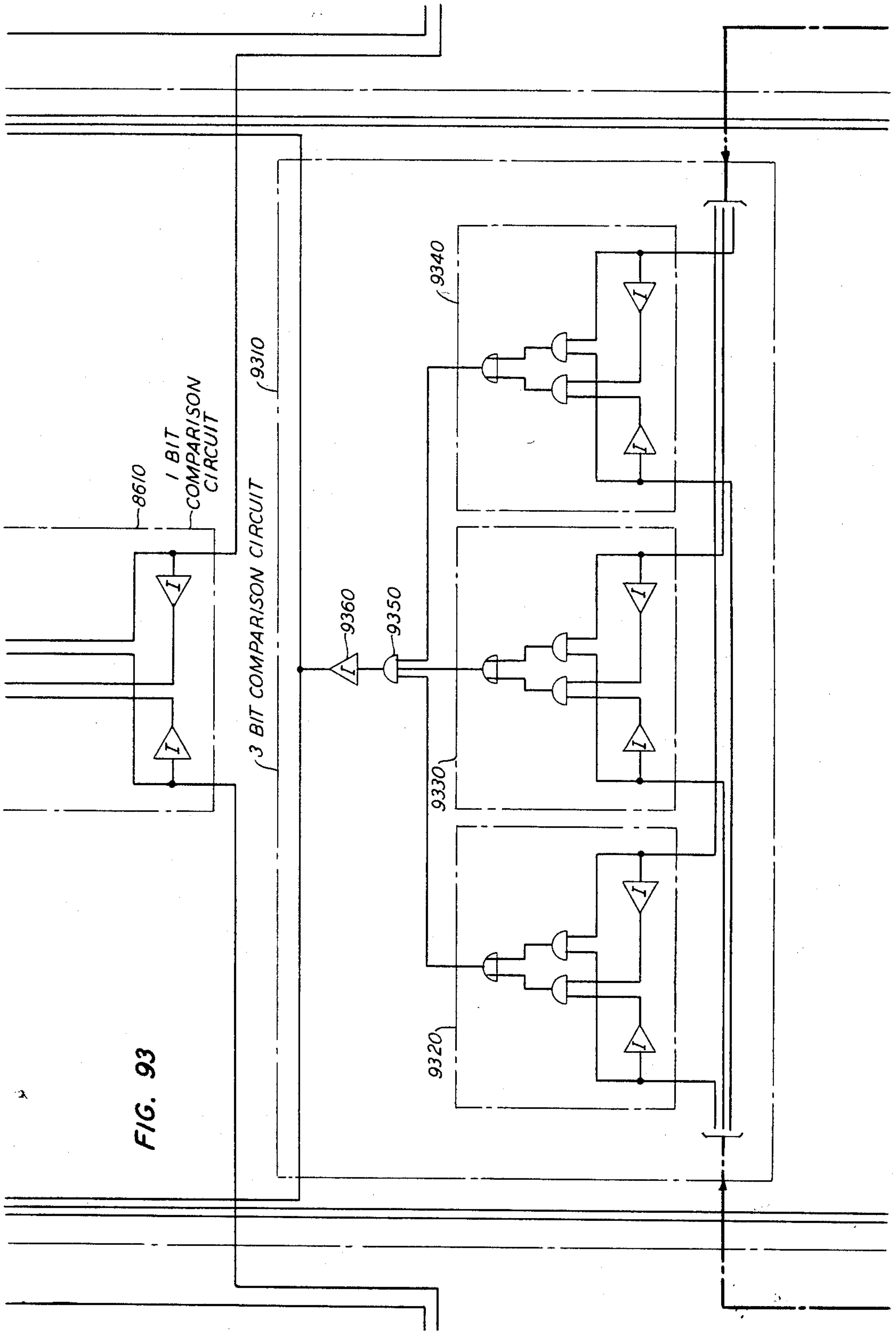
Figure 94:
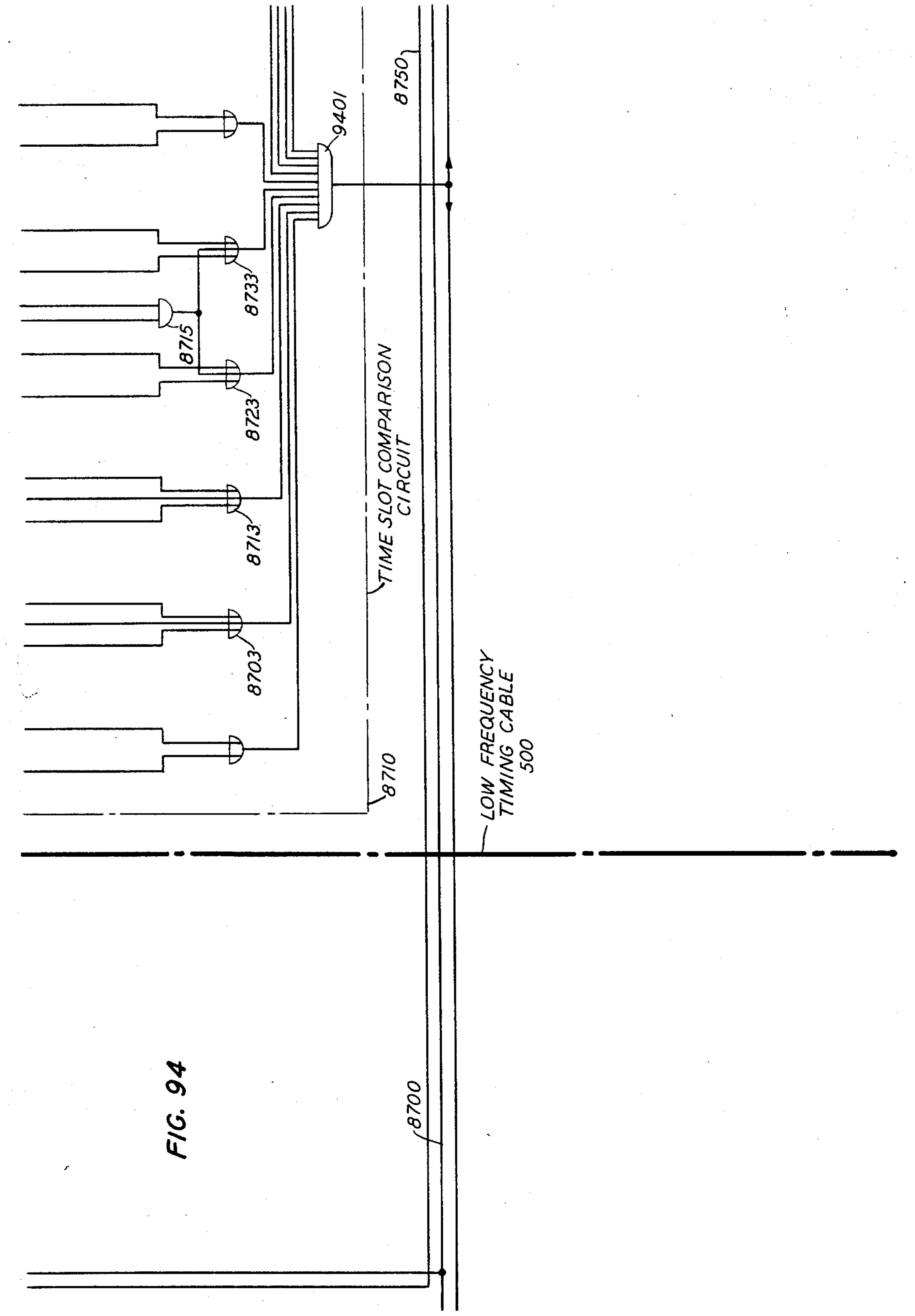
Figure 100:
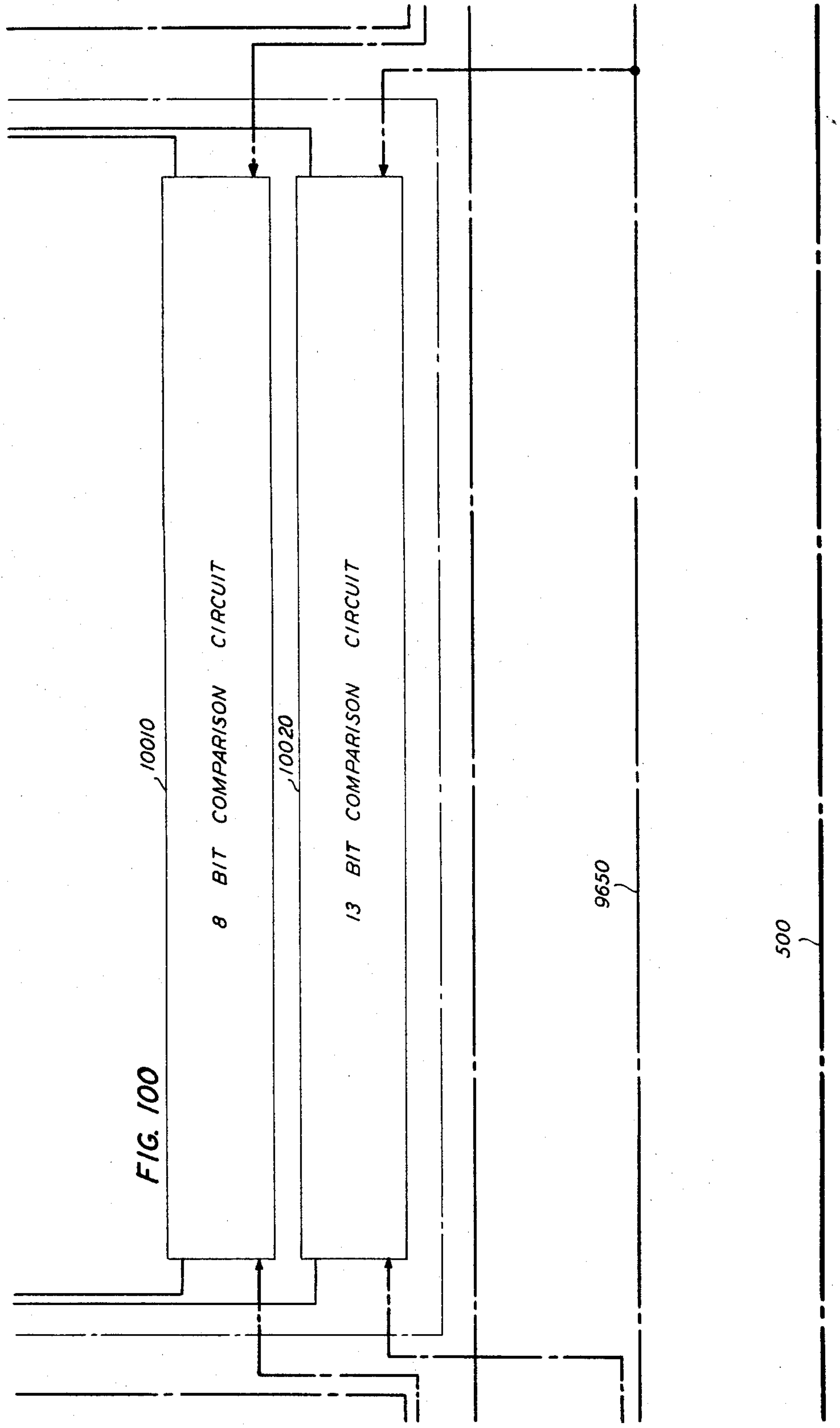
Figure 101:
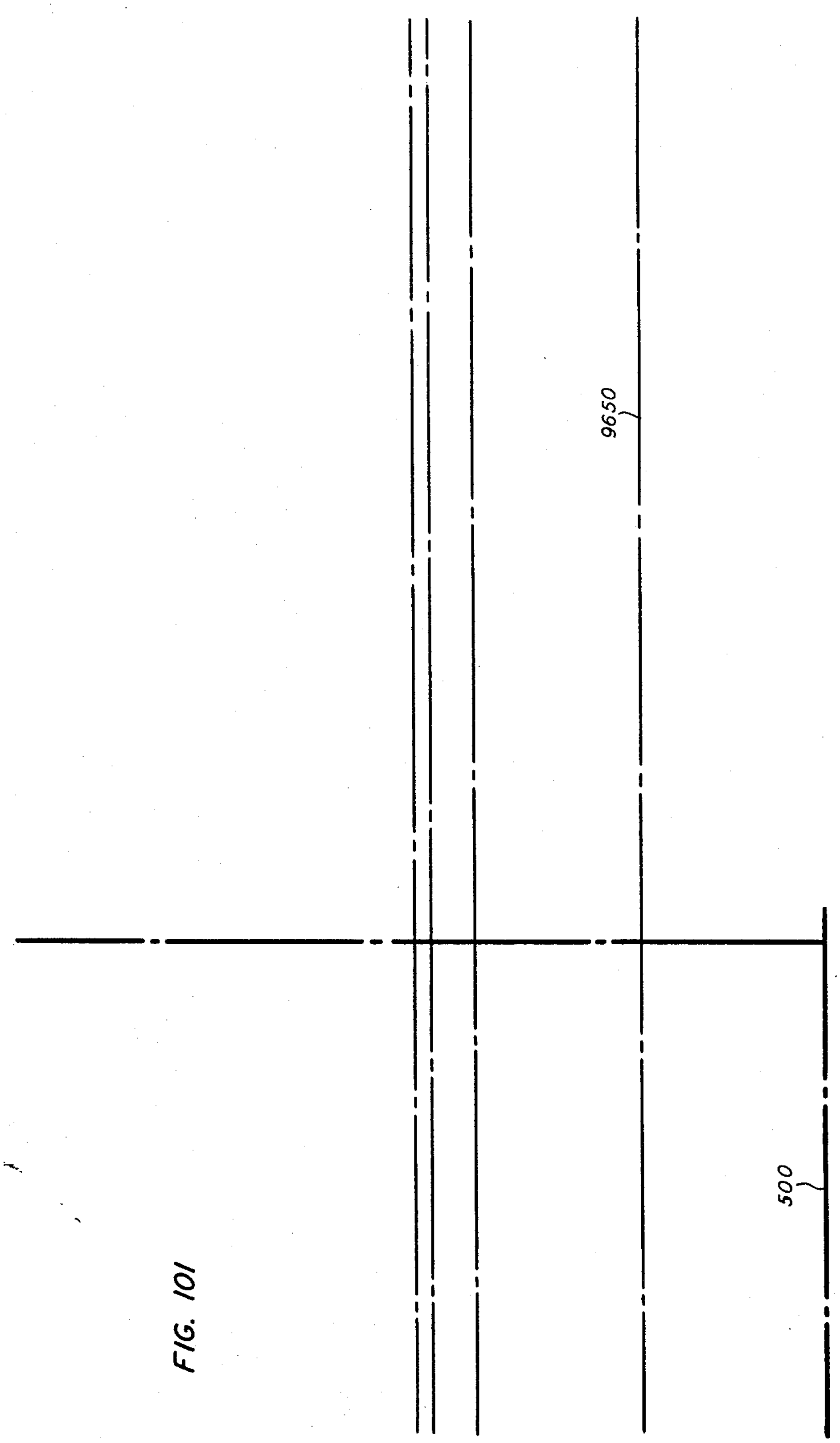
Figure 102:
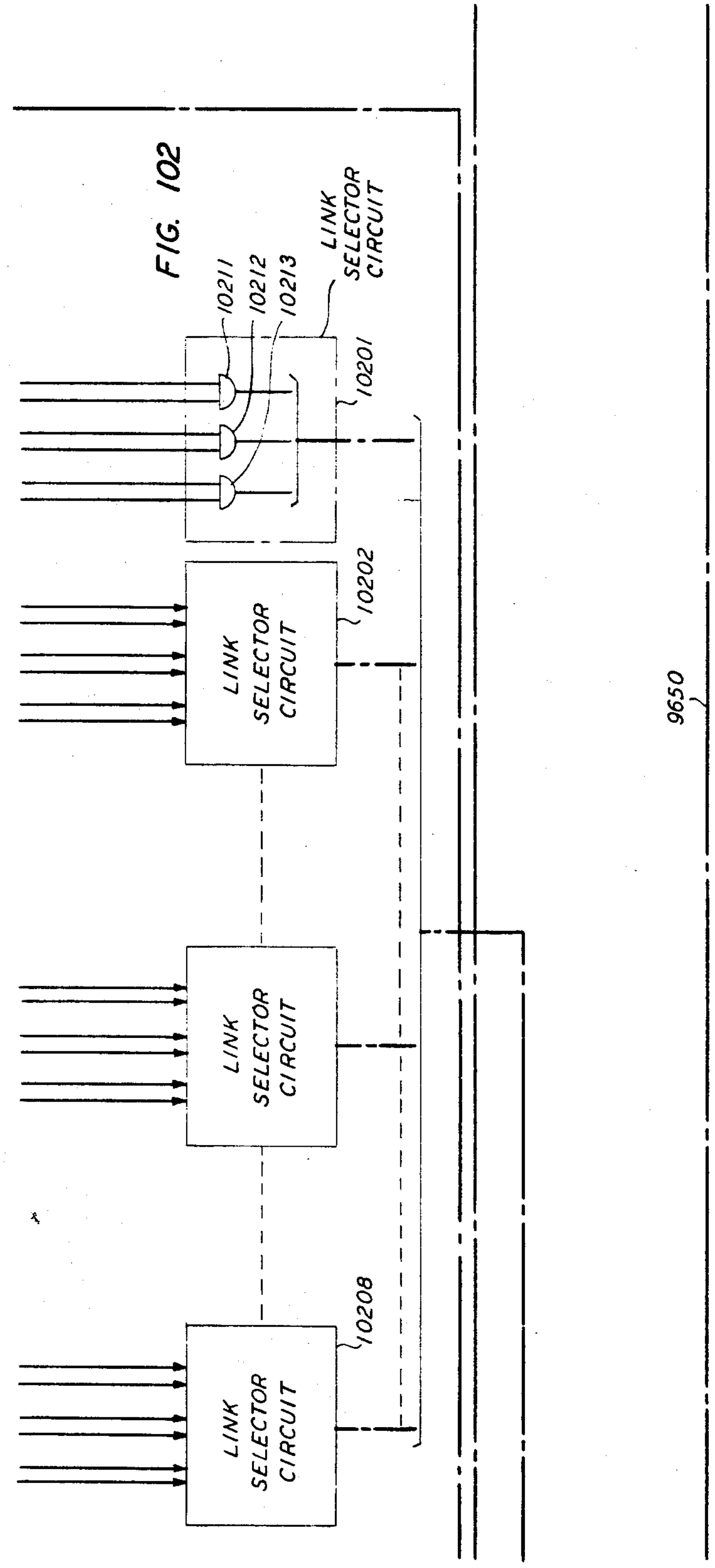
Figure 103:
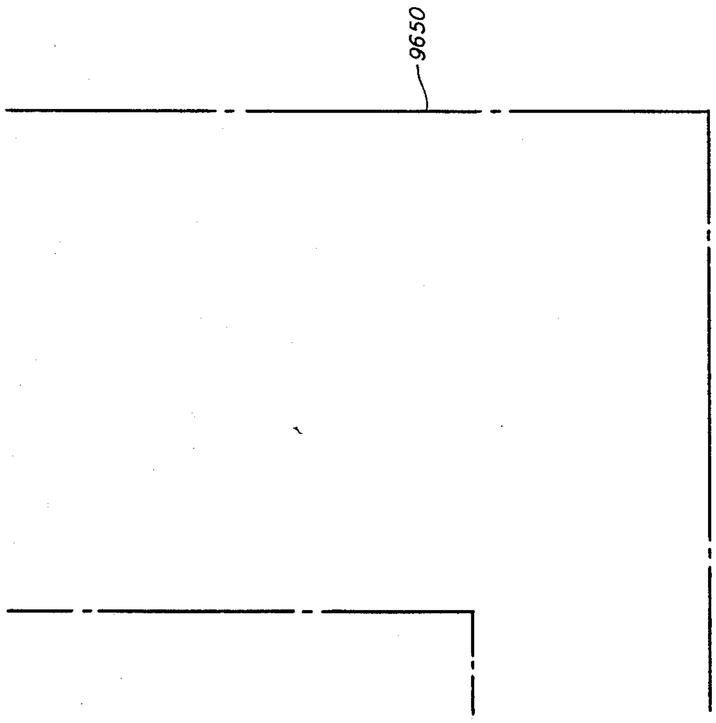
Figure 104:
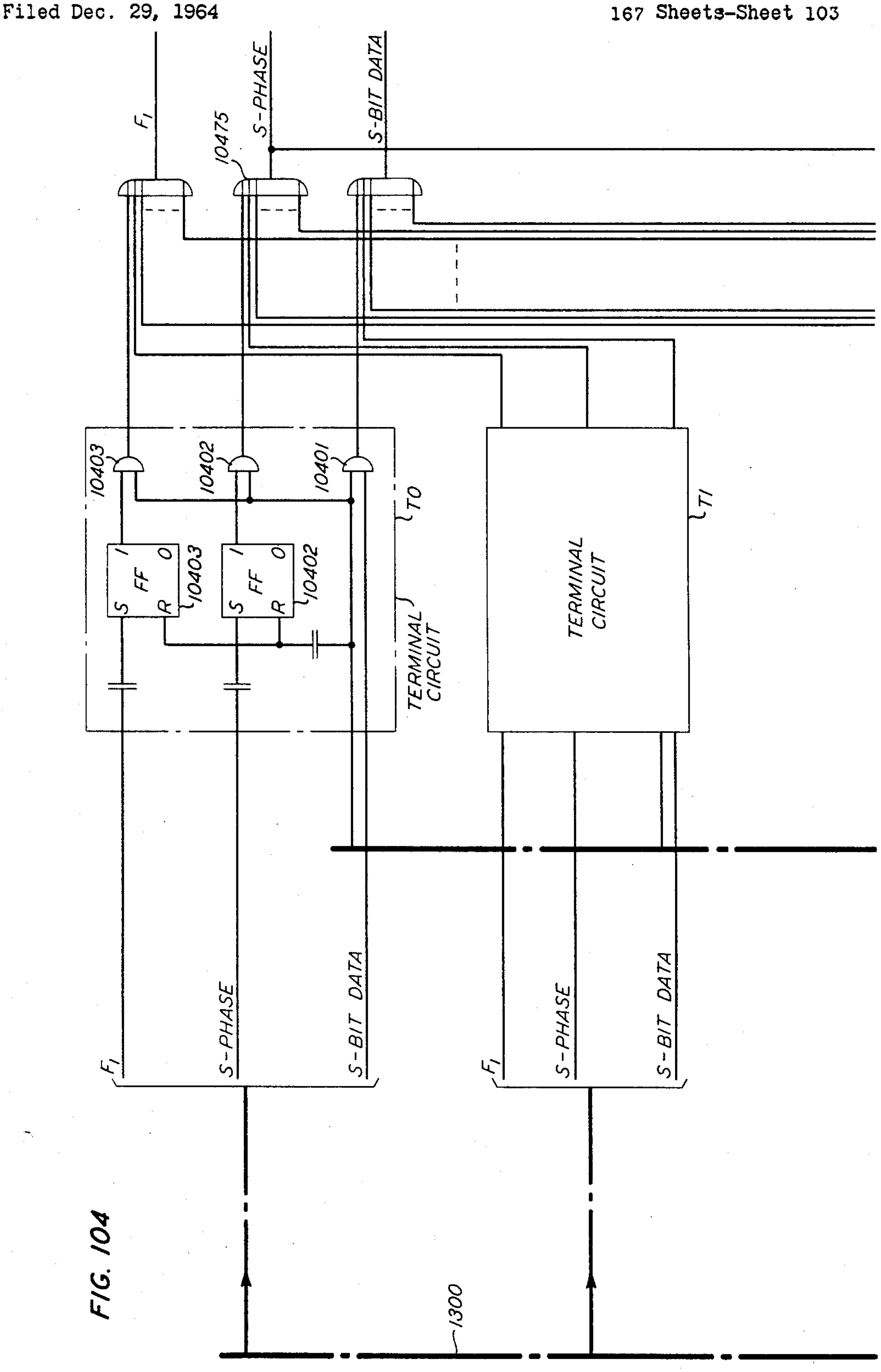
Figure 105:
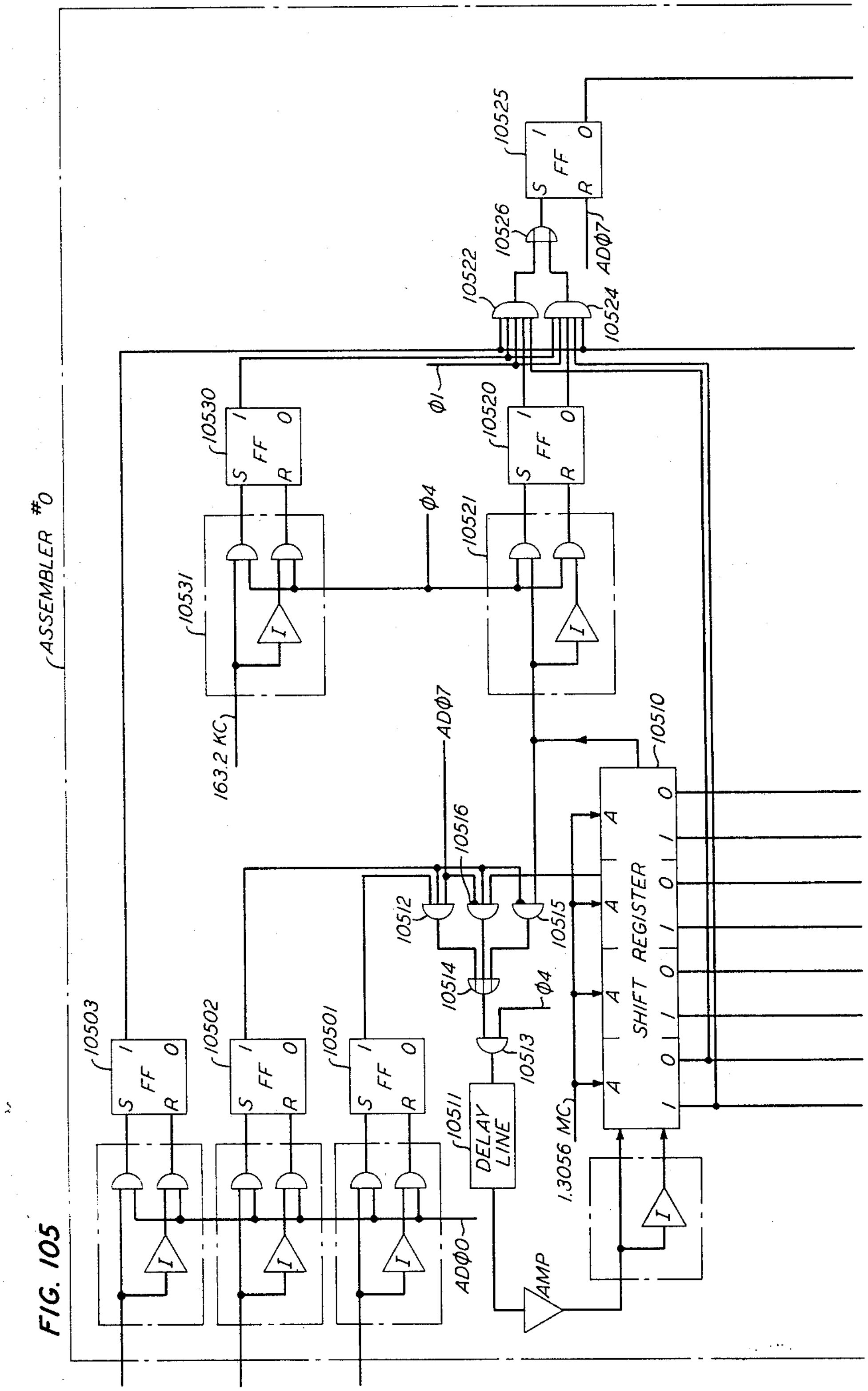
Figure 106:
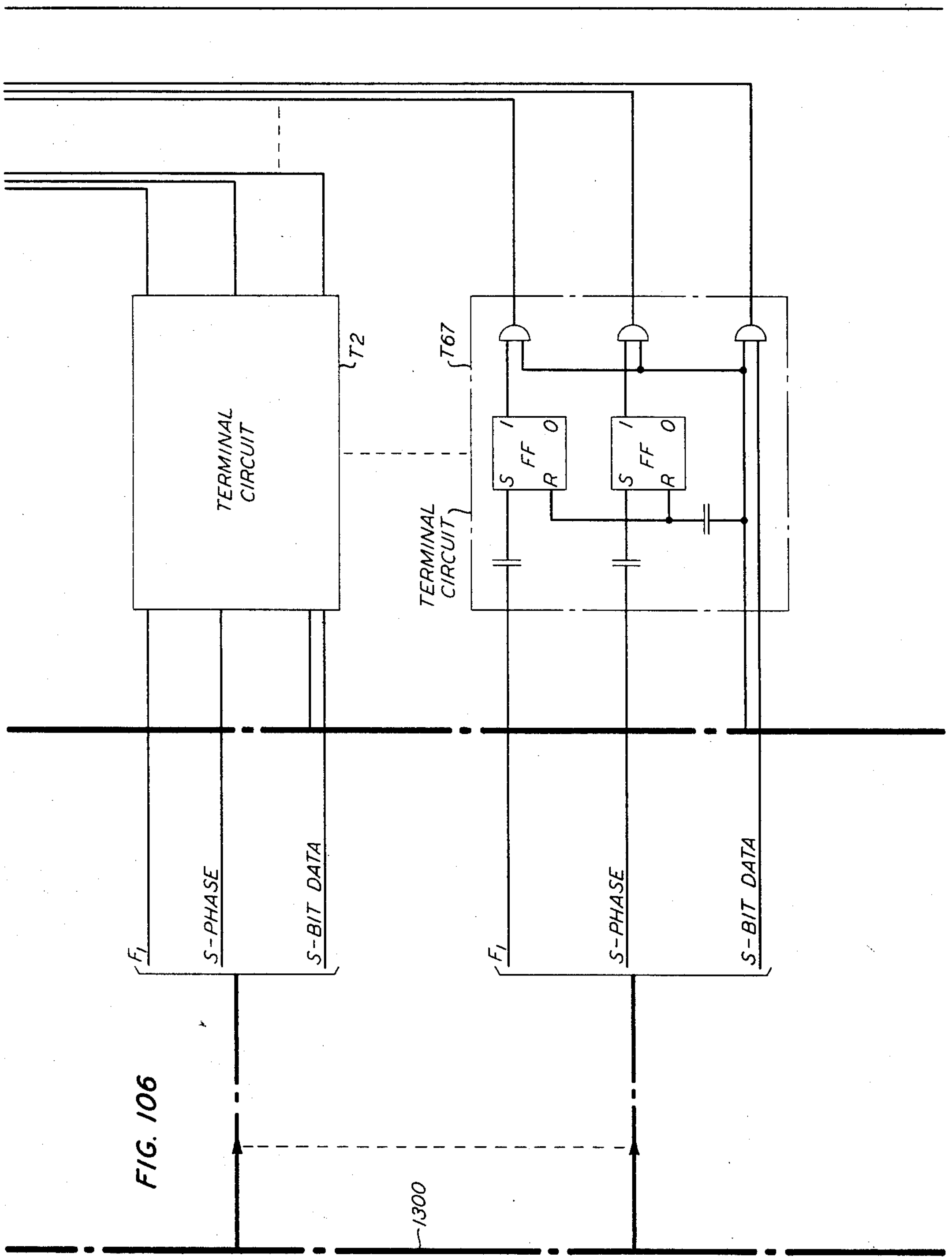
Figure 107:
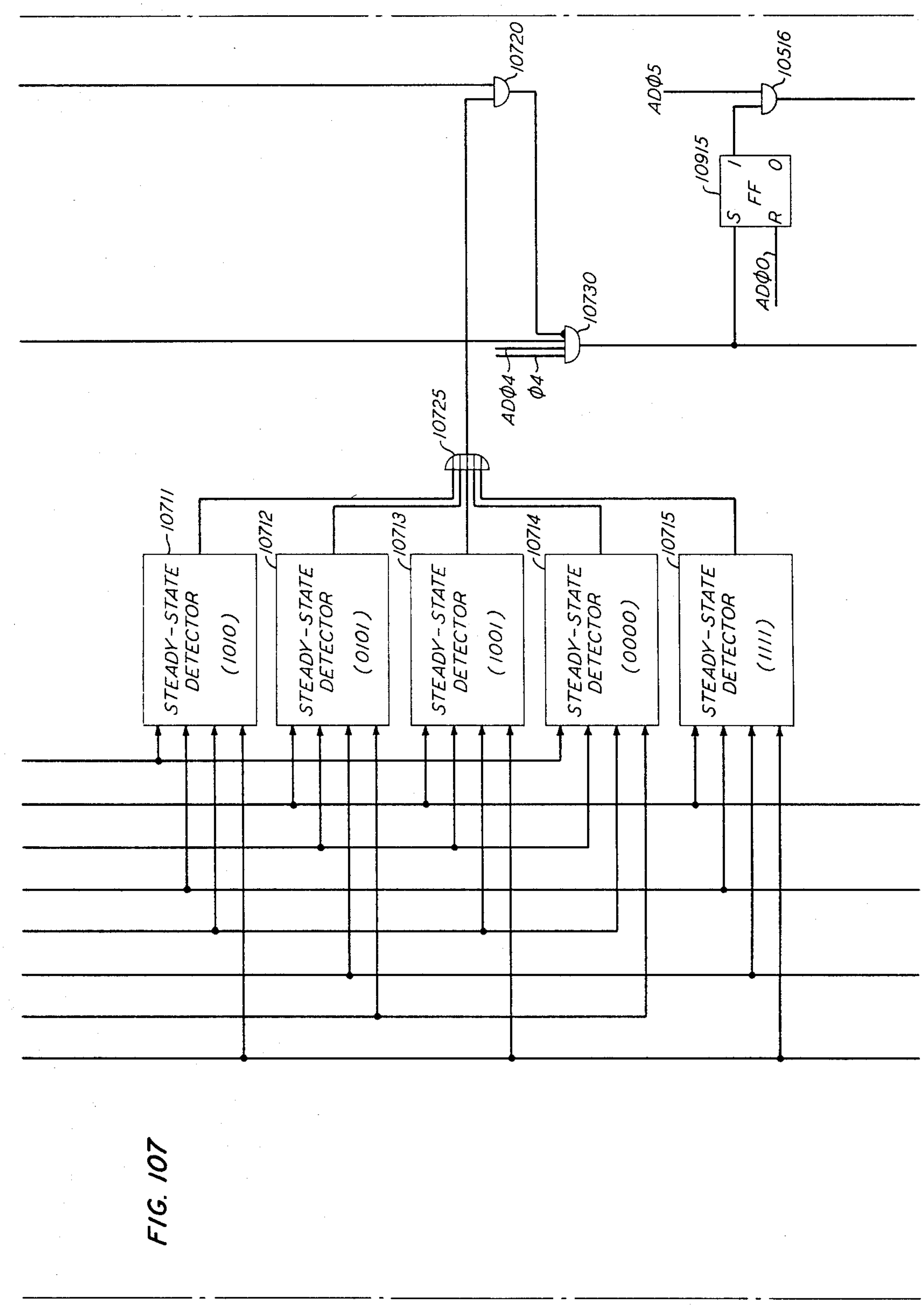

Since the Buffers are identical, only the Buffer shown in FIGS. 87–9, 94–6, and 101–103 will be described in detail. The other Buffer is shown in FIGS. 83–5, 90–2, and 97–99, and as will be evident from a comparison of the figures it is structurally identical to the Buffer to be described. The error detection circuitry shown in FIGS. 86, 93 and 100 compares the significant binary subwords developed in one Buffer with the counterparts thereof developed in the other. As will be more evident hereinafter, a bit-by-bit comparison is made so as to assure a high level of protection against error. Should an error be encountered the Buffers are temporarily disabled and an error indication signal is sent to the C.P.

A call instruction from the C.P. is gated from the call store send bus and stored in Word Registers Nos. 1 and 2, these being numbered 8800 and 8900 respectively. As will be evident hereinafter, the call store send bus is really a cable of, at least, 24 information leads, with a "sync" lead for gating purposes. The two words of the call instruction appear consecutively, i.e., serially, over the call store bus, and the bits thereof are gated into the respective word registers in parallel. Each of the words of the call instruction includes a parity bit. If parity checks, the Buffer is permitted to start using the call instruction. The details of the procedure followed if parity does not check will be set forth hereinafter.

The essential character of Buffer operation is to store sequentially, in the designated link memories, the calling party information and the called party information. This sequential storage of the call information in link memory requires only half as many link memory access gates as would simultaneous storage. The maximum handling time for this sequential operation is something in excess of 833 microseconds (two 2.4 kc. office cycles) per call instruction, which is more than adequate for the expected rate of change of call connections in a 1000 line office.

A start signal from the central processor is delivered via lead 8700 to the timing circuit 8801 several microseconds after the read in of the first and second words of the call instruction into word registers 8800 and 8900, respectively. The start signal takes the timing circuit 8801 out of the idle state in preparation for a two count, or two cycle, operation. The timing circuit may comprise a two stage, start-stop counter; that is, it counts only to two and then returns to an idle or disabled state where it remains until the reception of the next start signal. The input counting pulses are derived from the AND gate 8802 when the same is enabled by the input F40 and $\underline{B40}$ pulses derived from the low frequency timing cable. The inhibit pulse to AND gate 8802 can be disregarded for the moment.

As will be seen from FIG. 135, the F40 pulses occur only once, immediately preceding, each 2.4 kc. office cycle. Accordingly, at the beginning of the next complete office cycle following a start signal, an input count pulse will be applied to the timing circuit counter so as to initiate the first count or cycle thereof. In this first cycle the output bus labeled "calling party cycle bus" is energized and it remains so until the beginning of the next 2.4 kc. office cycle, at which time the recurring F40 and B40 pulse initiate the second count or cycle. During the second cycle, the output bus labeled "called party cycle bus" is energized and the calling party bus 8810 is once again de-energized. The called party bus 8820 similarly remains energized until the beginning of the next succeeding office cycle, at which time the timing circuit counter is returned to its idle condition to await the next start signal which accompanies the next call instruction from the central processor.

The pair of words comprising a call instruction remain in their respective word registers until a new call instruction is read in the registers (i.e., the read in to these registers is destructive). The call instruction is only operated upon, however, during the aforementioned calling party and called party cycles. After these two cycles, the timing circuit reverts to its idle state and thereby deactivates the Buffer unit until the next call instruction and accompanying start signal is received from the C.P. With the exception of error correction situations, the next call instruction will relate to another and different service request.

Figure 95:
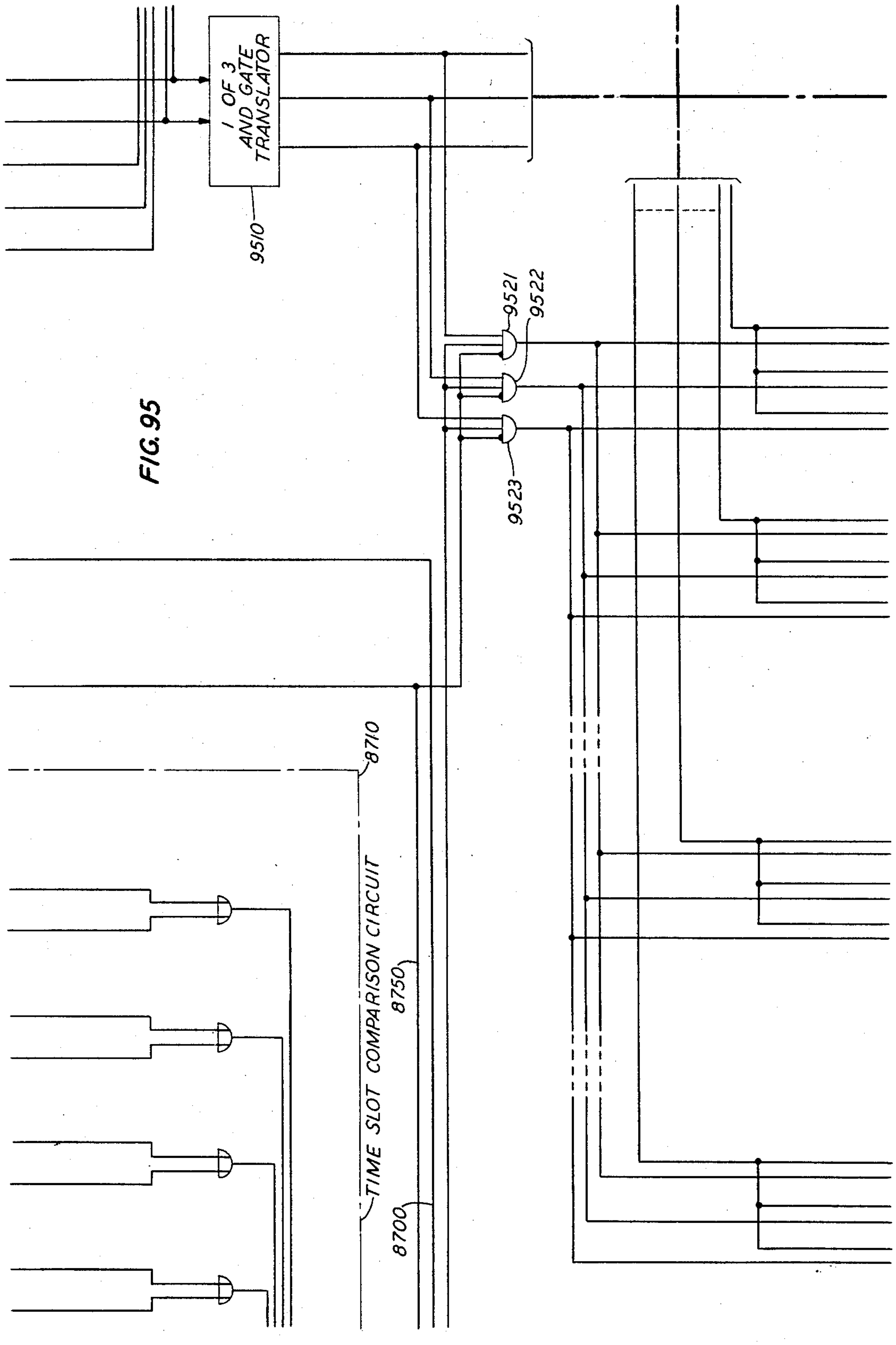
Figure 96:
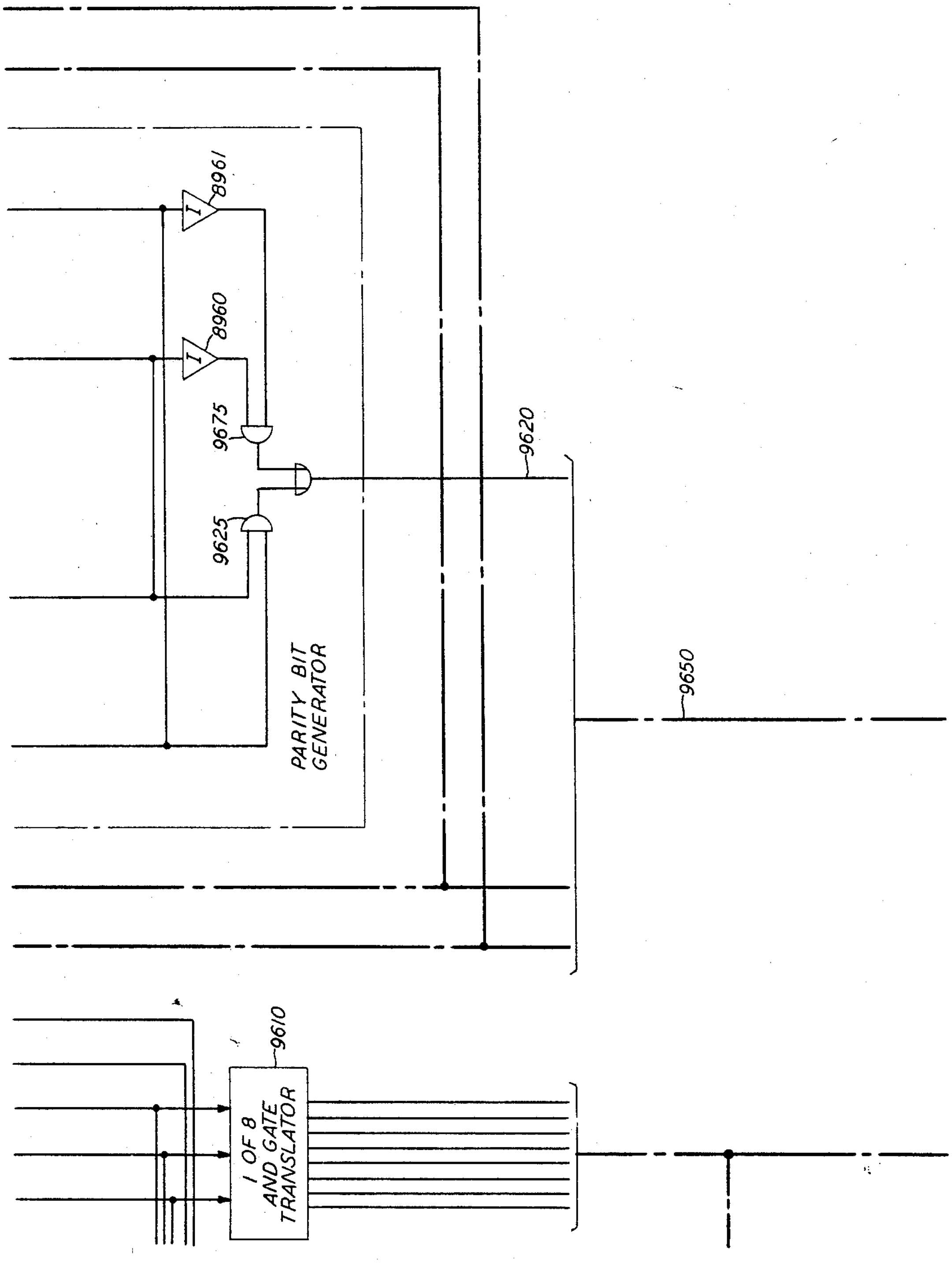
Figure 97:
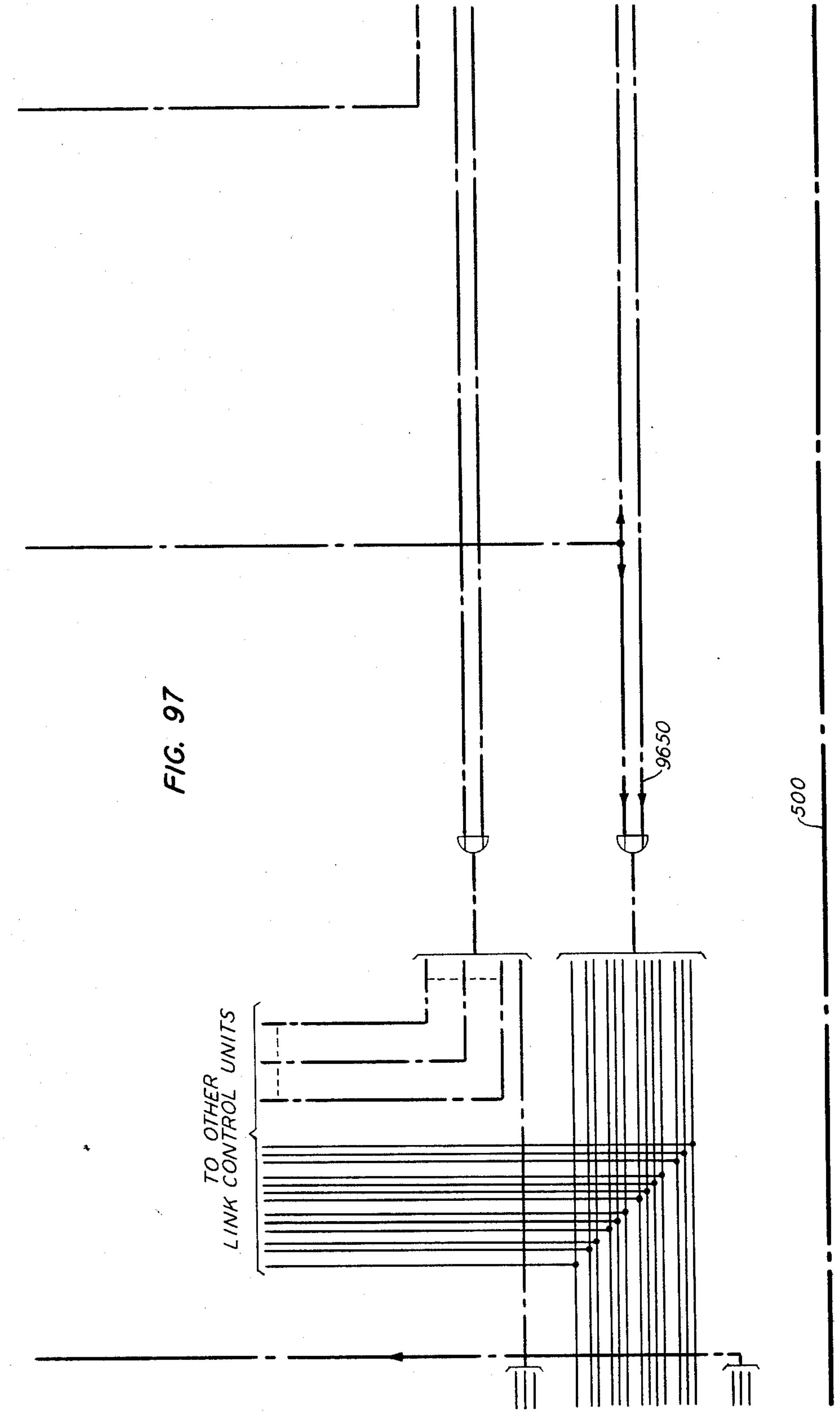
Figure 98:
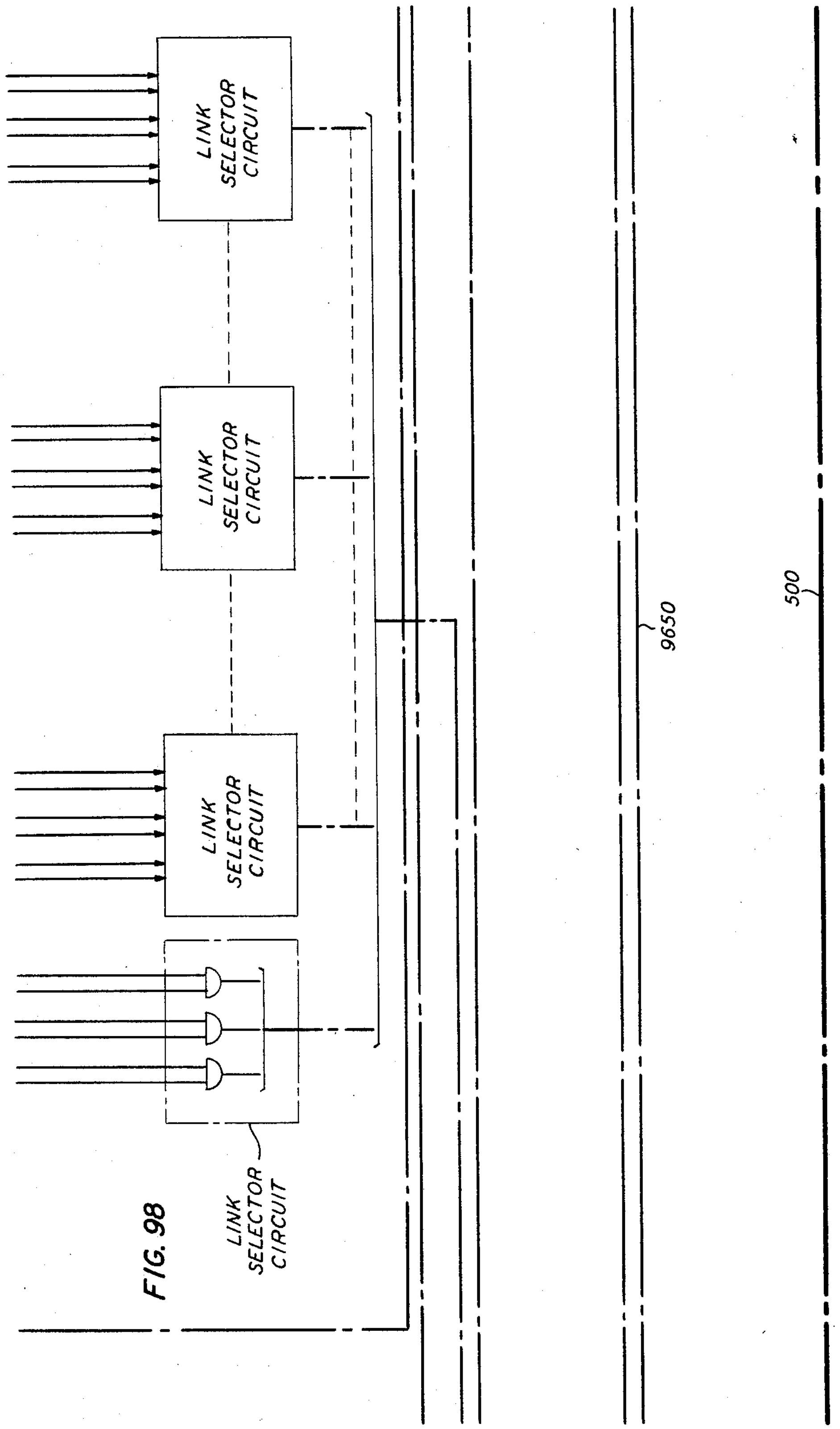
Figure 99:
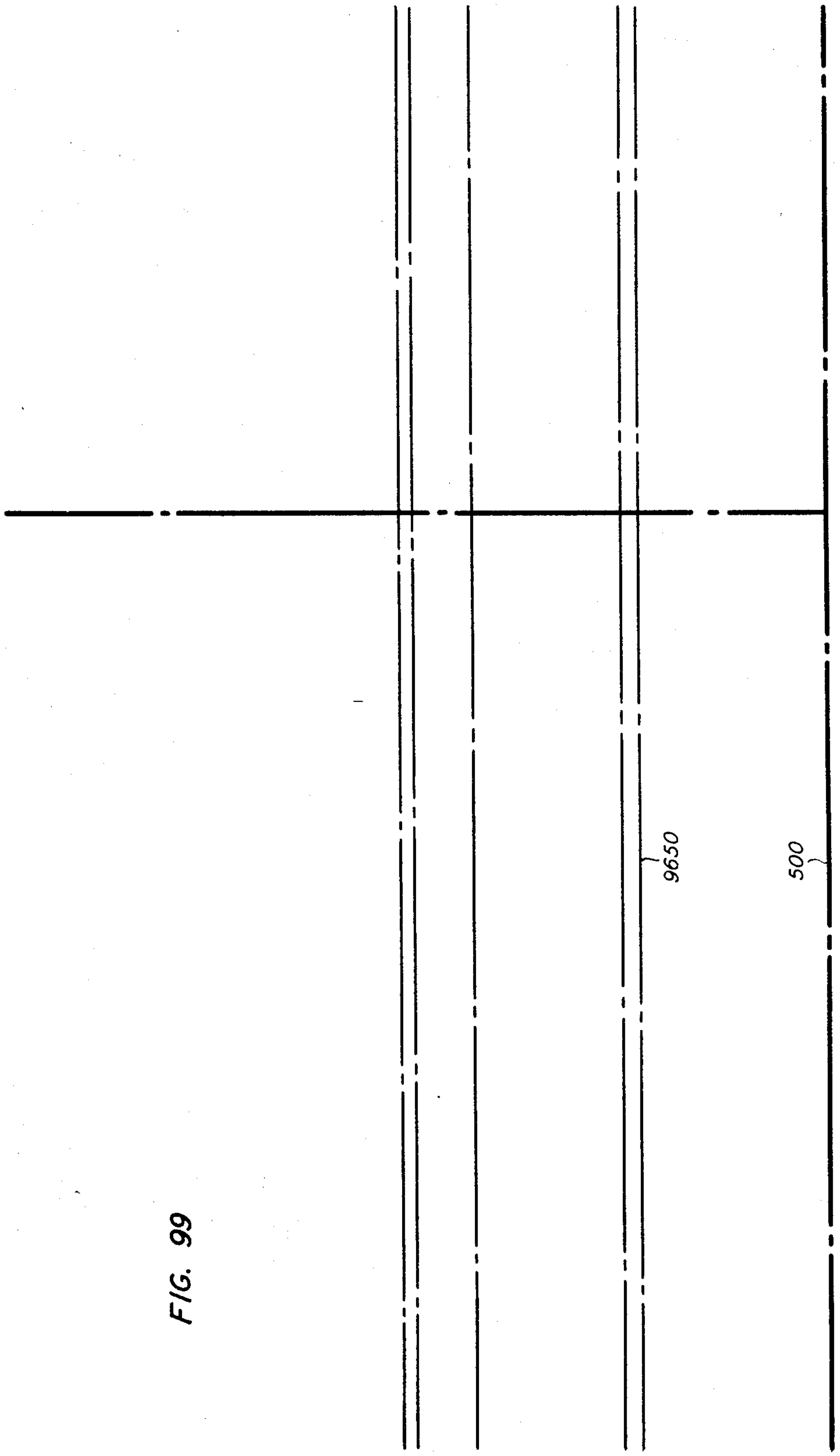

Now with the timing circuit 8801 removed from its idle condition and the initiation of the first or calling party cycle, the AND gates 8912 through 8916 will be enabled by the energized calling party cycle bus and hence the "calling party link number" bits stored in locations 12–16 of word register No. 1 will be read out therefrom. Note, in this regard, that the bit locations in each word register store correspond to the above-recited bit locations in the instruction word format. These 5 bits at the output of AND gates 8912–8916 are used in "setting-up" or accessing the particular link assigned to the calling party for this call. Five bits, it will be recalled, are required to designate any given one of the 24 links in the office. This 5 bit binary number is grouped or divided into a 3 bit binary number and a 2 bit number. One translation serves to decode the 3 bit number into 1-of-8 and another translation decodes the 2 bit number into 1-of-3. As shown in FIGS. 95 and 96, the three most significant bits from AND gates 8914–8916 are fed to and operate the 1-of-8 AND gate translator 9610 and the two least significant bits from AND gates 8912–8913 are fed to and operate the 1-of-3 AND gate translator 9510.

The manner in which these two translations serve to designate the appropriate link is indicated in the following table. The 1-of-8 translation designates the matrix module of the calling party and the 1-of-3 translation signals out the link thereof that the calling party is to use.

| 1-of-8 | 1-of-3: 1 0 | 1-of-3: 0 1 | 1-of-3: 1 1 |
|---|---|---|---|
| 0 0 0 | φ-1 | φ-2 | φ-3 |
| 0 0 1 | 1-1 | 1-2 | 1-3 |
| 0 1 0 | 2-1 | 2-2 | 2-3 |
| 0 1 1 | 3-1 | 3-2 | 3-3 |
| 1 0 0 | 4-1 | 4-2 | 4-3 |
| 1 0 1 | 5-1 | 5-2 | 5-3 |
| 1 1 0 | 6-1 | 6-2 | 6-3 |
| 1 1 1 | 7-1 | 7-2 | 7-3 |

Link Selection Table

As indicated in the drawings, the eight output leads of the 1-of-8 AND gate translator 9610 are connected respectively to eight link selector circuits 10201–10208; since the latter are identical only one of the same is shown in detail. The 1-of-8 translator output lead that is delivered to the link selector circuit 10201 is actually connected to the input of each of the three AND gates 10211–13. Accordingly, if the translator output lead is the one energized, the AND gates of selector circuit 10201 will each be, at least, partially enabled.

The three output leads of the 1-of-3 translator 9510 are each coupled, via the AND gates 9521–9523 to be described, to each of the eight link selector circuits 10201–10208. However, each of the three 1-of-3 output leads is connected to one and only one of the AND gates that comprise each link selector circuit. Accordingly, one and only one of the AND gates of the said partially enabled lnk selector circuit will be fully enabled. And the AND gate so enabled is, of course, the one associated with the particular link assigned to the calling party for this call.

Figure 80:
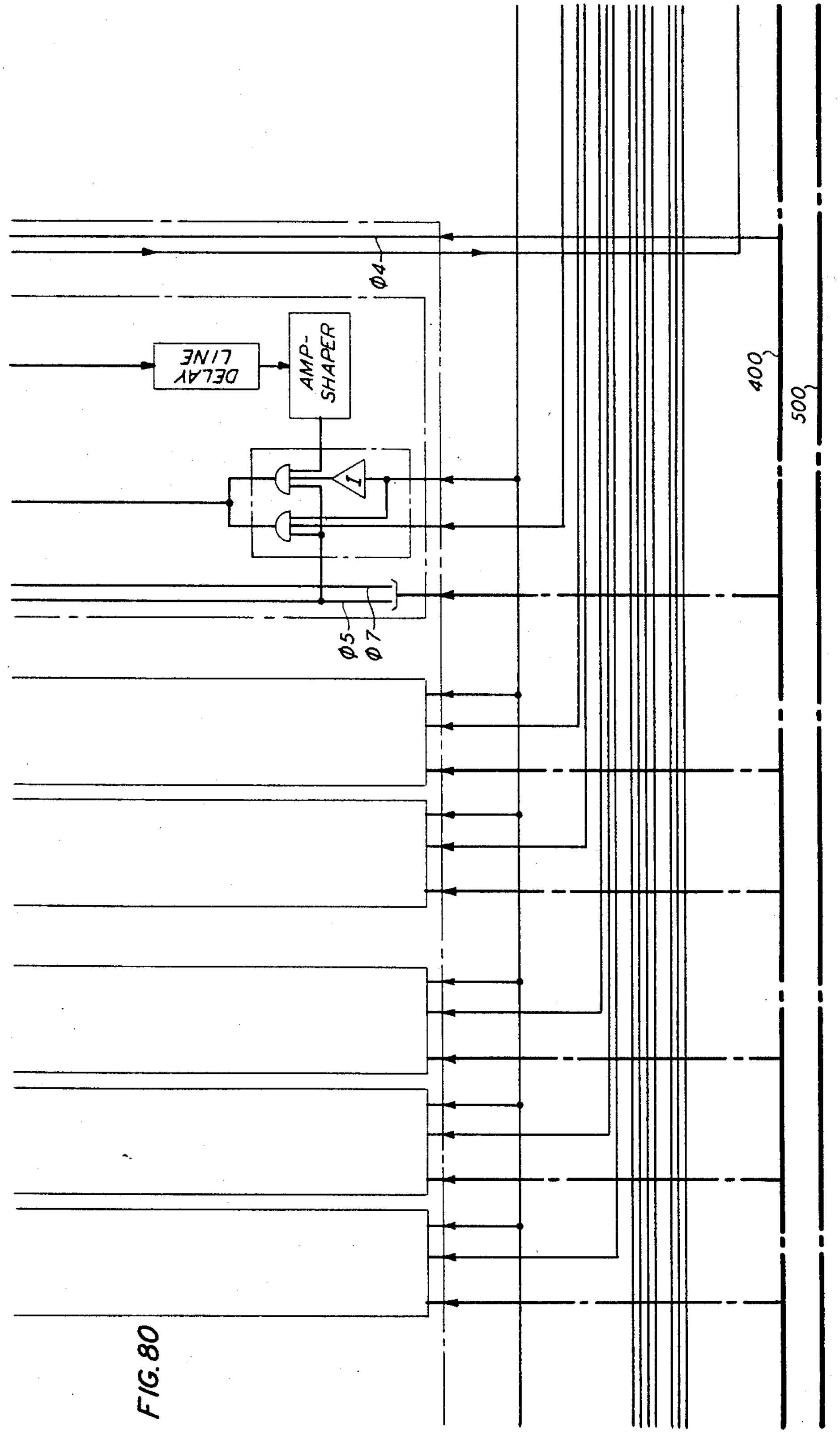
Figure 81:
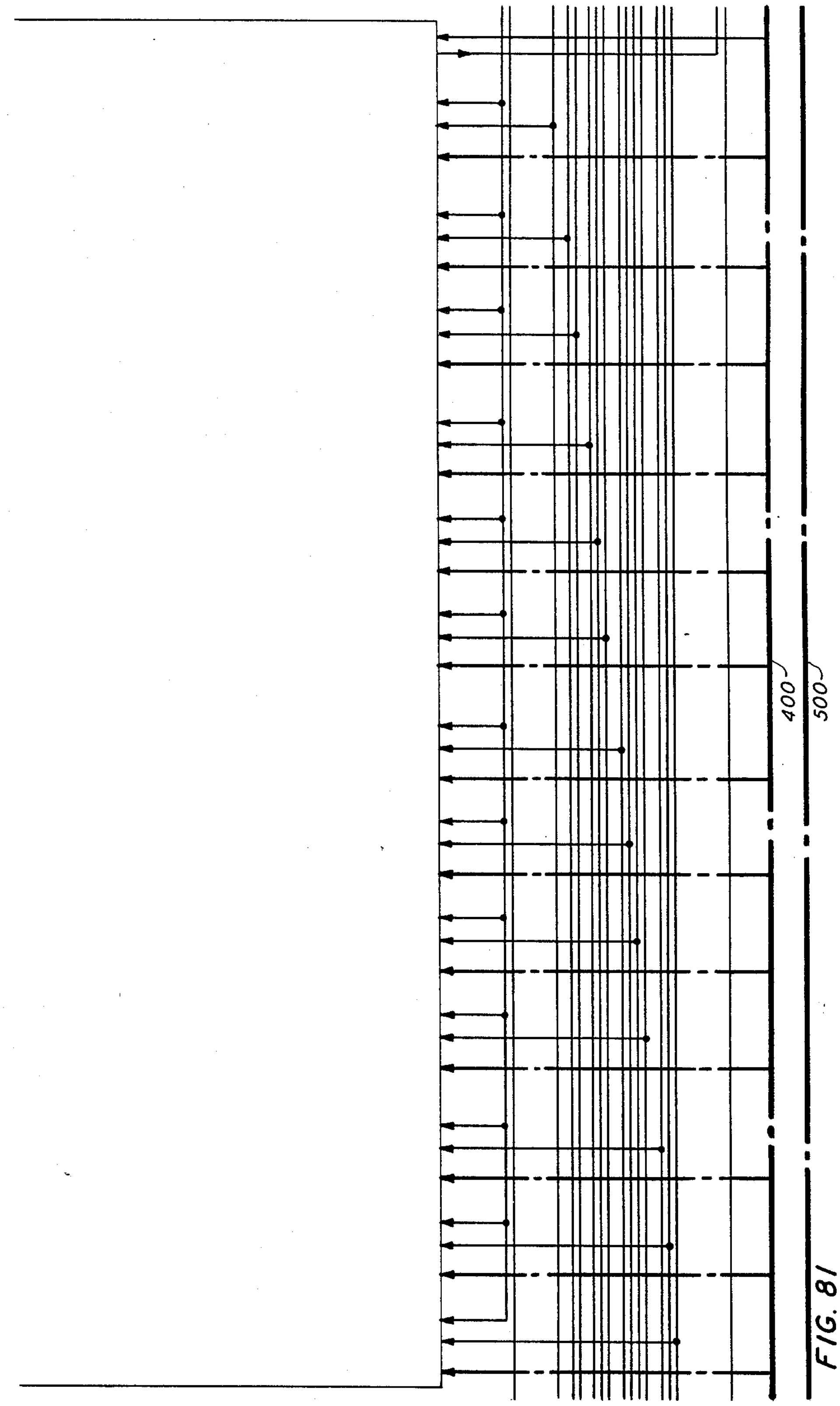
Figure 82:
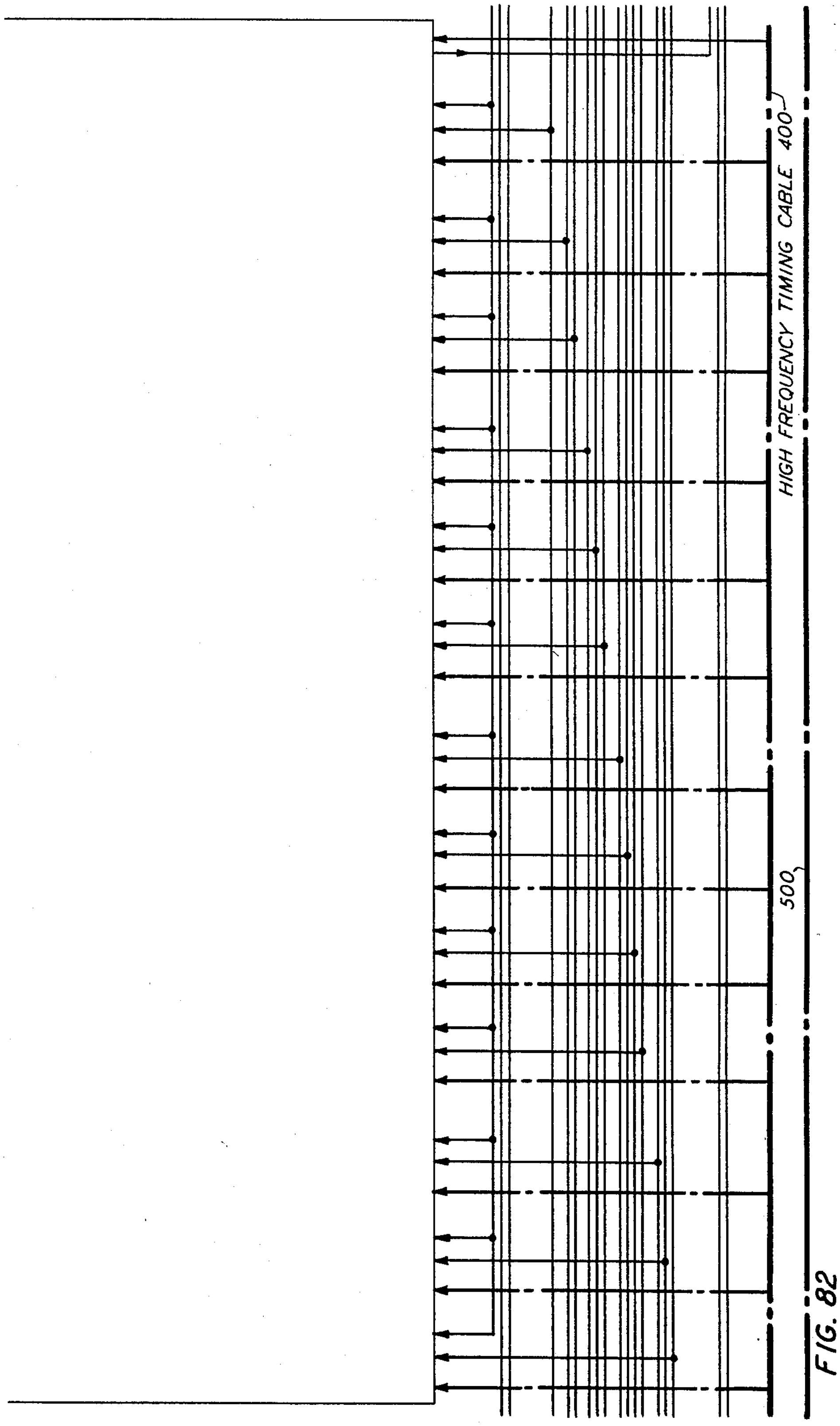
Figure 83:
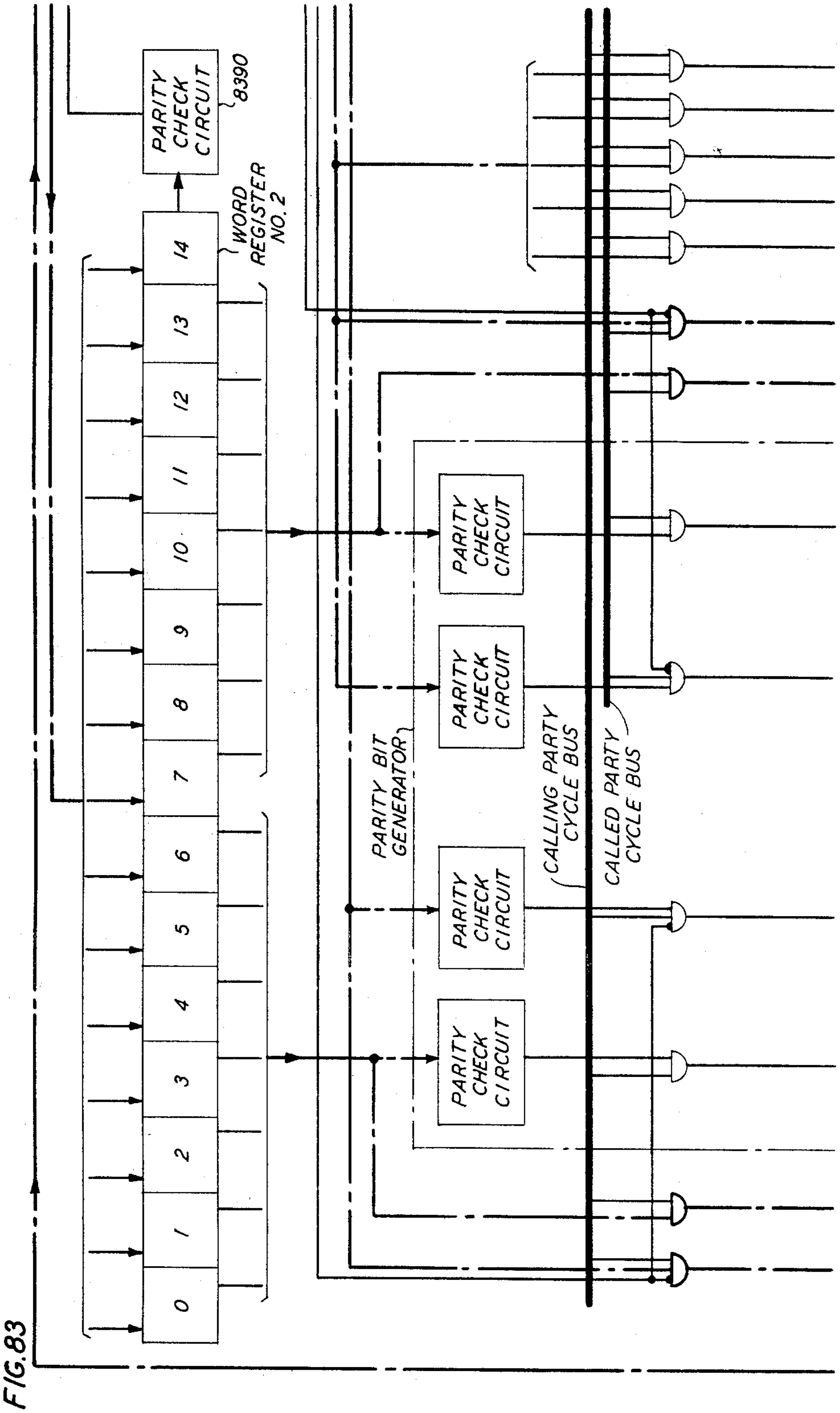
Figure 84:
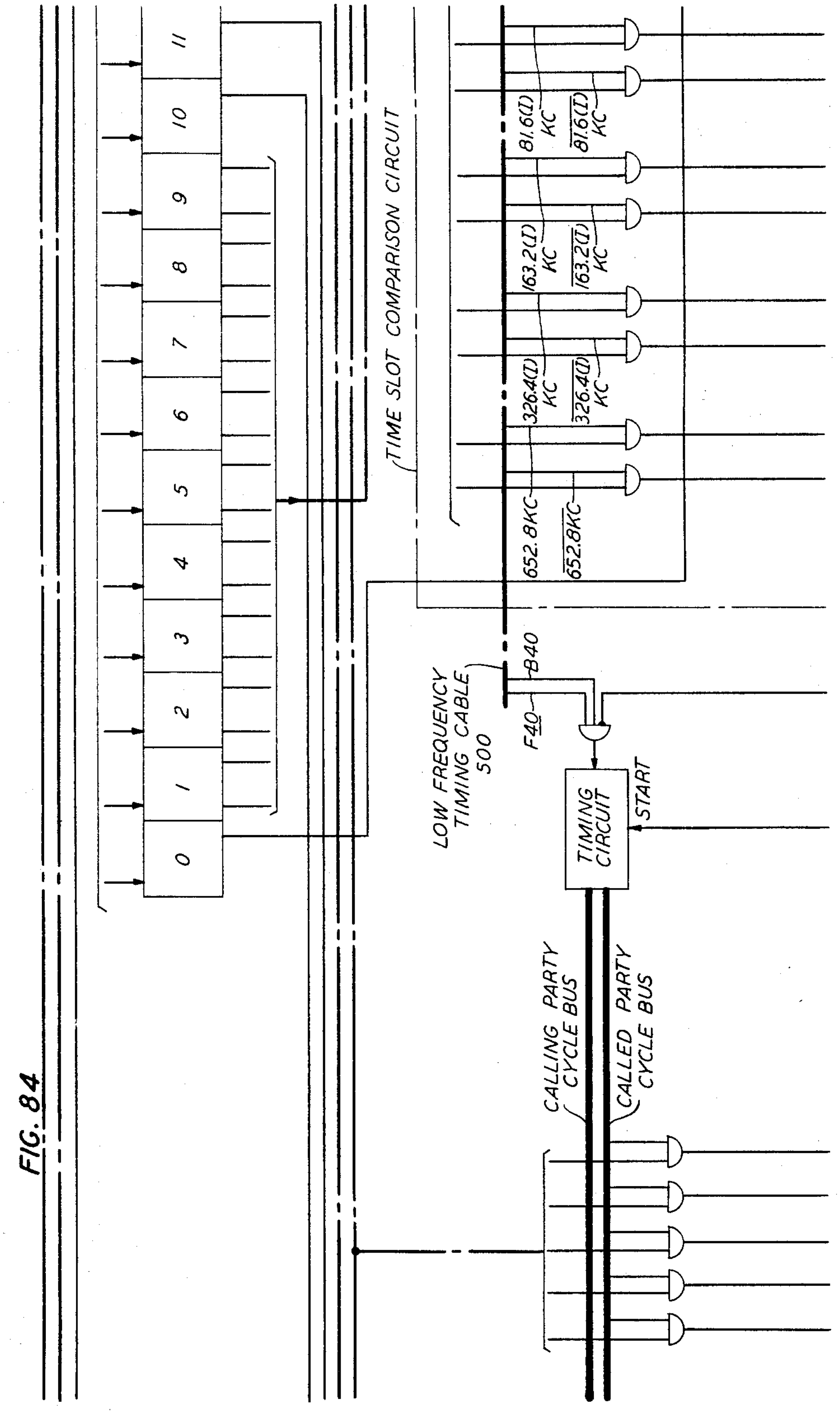
Figure 85:
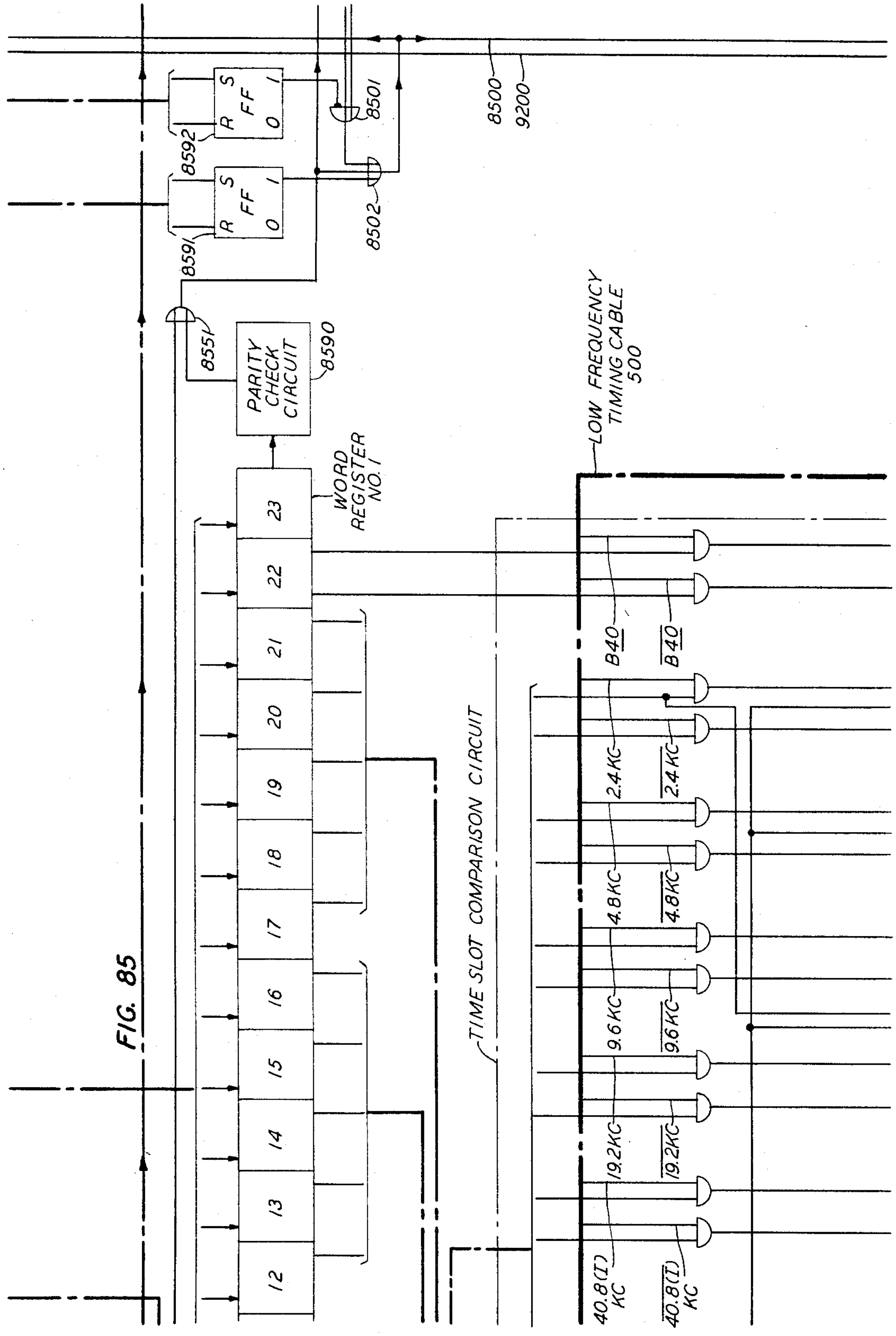

The output lead of each of the link selector AND gates is connected to a respective Link Control Unit in a manner such as that illustrated in FIGS. 79 and 80. The lead 7900, for example, is derived from one of said link selector AND gates. As previously explained, an enabling signal on lead 7900 serves to enable the gate 7914 and, because of the indicated inversion, it disables gate 7912. An appropriate address bit is semultaneously applied to gate 7914 via lead 7951. This address bit is then strobed into the delay line memory loop by a high frequency $\phi 5$ strobe pulse. The lead 7900 is similarly connected to each of the other delay line memory loops of Link Control Unit #1 and hence the other address bits are simultaneously written into their respective memory loops.

The address bits related to a given call are written into their memory loops in the time slot or slots assigned by the C.P. to the call. And all the address bits of a given call must occupy tre same time slot or slots. These requirements are carried out herein by controlling the time occurrence of the enabling signal derived from the link selector circuitry 10201–10208. That is, the enabling signal is delivered to the appropriate Link Control Unit during and only during the time slot or slots assigned to the call.

The control of the time slot occurrence of the link selector enabling signal is accomplished by the time slot comparison circuit 8710, shown in FIGS. 87, 88, 94 and 95. Briefly, this time slot comparison circuit compares the time slot information stored in word register No. 1 with the 512 usable time slots of the office cycle, as defined by the timing waveforms, and when there is a "match" therebetween an energizing signal is delivered to the AND gates 9521–9523. Accordingly, the output of the 1-of-3 AND gate translator 9510 is coupled to the link selector circuitry 10201–10208 only during the appropriate time slot or slots assigned by the C.P. to the call.

To summarize the above, the output of the 1-of-3 translator designates the matrix module of the calling party; the 1-of-3 AND gate translator output designates the link assigned by the C.P. to the calling party; and the time slot comparison circuit 8710 controls the time slot or slots during which the 1-of-3 translation output is delivered to the link selector circuitry 10201–10208. Thus, a link enabling signal will appear on one and only one of the 24 output leads of the link selector circuitry and its occurrence will correspond to the time slot assignment made by the C.P.

The inhibit to AND gates 9521–9523 can be disregarded for the moment.

Considering now the time slot comparison circuit in greater detail, in order to define any given time slot out of the 512 usable time slots in an office cycle, 9 call-instruction information bits are required. These 9 bits are stored in storage locations (1) through (9) of word register 8800. The comparison circuit 8710 performs the straightforward task of comparing these 9 bits with selected low frequency timing waveforms derived from the low frequency timing cable and when a "match" situation occurs a time slot defining pulse is generated on the output lead of AND gate 9401 and it is applied as an enabling pulse to gates 9521–9523.

The most significant of these 9 bits is compared with 2.4 kc. timing waveform, the next most significant is compared with the 4.8 kc. waveform, and so on as indicated in the drawings. Each comparison is carried out using a "negated," or inverted, EXCLUSIVE-OR type operation. Thus, the (1) and (0) output leads of the most significant bit position, i.e., storage stage (9) of register 8800, are compared in AND gates 8701 and 8702 with the 2.4 kc. timing waveform and the inversion thereof ($\overline{2.4 \text{ kc.}}$ waveform). Accordingly, if this most significant bit is a zero, the gate 8701 will deliver an enabling signal to AND gate 9401 during the first half of the 2.4 kc. office cycle, whereas if this most significant bit is a one, the gate 8702 will deliver an enabling signal to AND gate 9401 during the second half of the 2.4 kc. cycle. This first comparison, therefore, provides an indication of whether the time slot selected by the C.P. for this interconnection falls within the first or second half of the 2.4 kc. office cycle. The remaining comparisons that are carried out with the less significant bits serve to further define in a similar fashion the selected time slot.

At some point in the 2.4 kc. office cycle a "match" situation occurs between each of the 9 bits stored in the word register and each of the waveforms to which the former are compared. At this point, the AND gate 9401 is enabled and it in turn delivers an enabling signal to the AND gates 9521–9523.

Referring to the timnig waveforms of FIG. 135, an examination of the same will indicate that each of the 512 usable time slots in the 2.4 kc. office cycle can be defined by various combinations of the timing waveforms that are coupled to the time slot comparison circuit 8710. Note, in this regard, that the half periods of the 652.8 kc. waveform are equal to, and in fact specifically define, each and every time slot period. During time slot #0 each of the time slot comparison waveforms is in its high or positive state. Accordingly, if the 9 time slot defining bits stored in word register 8800 are all zeros, an output pulse will be provided by AND gate 9401 for this, and only this, time slot period. However, if the eight most significant bits are zeros and the less significant bit is a one, then an output pulse will be delivered via the enabled AND gate 9401 during time slot #1; and so on.

In the foregoing description, it was assumed that one and only one of the time slots of the 512 usable time slots was selected for use. This is the typical situation for a 2.4 kb. subscriber interconnection. That is, the time slot comparator is arranged so that, for a 2.4 kb. rate call, all 9 bits of the time slot number are compared with the timing waveforms. At the higher subscriber rates, however, a number of spaced time slots per office cycle are required for an interconnection. For example, for the 9.6 kb. and 38.4 kb. message rates, four and sixteen time slots are respectively required per 2.4 kc. office cycle. For these 9.6 kb. and 38.4 kb. rates, the comparator is arranged so that it ignores the two and four most significant bit comparisons and hence comparisons are achieved four and sixteen times per 2.4 kc. period, respectively.

The first bit of the first word of a call instruction is the rate bit and it is stored in storage location (0) of word register 8800. For a 2.4 kb. rate interconnection, this first bit is a zero and the time slot comparison operation is carried out as heretofore described. For higher rate interconnections, however, this first bit will be a binary one. The (1) output lead of storage location (0) is connected to the input of OR gates 8703 and 8713 and hence with the storage location (0) set to the "1" state an energizing signal is continuously delivered to the OR gates 8703 and 8713. These OR gates therefore each pass an energizing signal to AND gate 9401 for the complete 2.4 kc. office cycle irrespective of the comparisons, if any, being carried out against the 2.4 kc. and 4.8 kc. timing waveforms. The end result of this is, of course, that the 2.4 kc. and 4.8 kc. waveform comparisons are effectively eliminated or rendered moot and the most significant bit comparison is now made against the 9.6 kc. waveform—and, of course, this inversion ($\overline{9.6\text{ kc.}}$). Now from FIG. 135 it will be apparent that with the 2.4 kc. and 4.8 kc. waveform comparisons operatively eliminated, four of the aforementioned "match" situations will occur per 2.4 kc. office cycle and an enabling pulse signal will appear at the output of AND gate 9401 during four selected evenly spaced time slots. This satisfies the time slot requirements for a 9.6 kb. message rate interconnection.

For a 38.4 kb. interconnection, the time slot comparison circuit must deliver an output enabling signal to the AND gates 9521–9523 during sixteen, evenly spaced time slot periods. The technique for doing this is substantially the same as that described—namely, the four most significant bit-to-waveform comparisons are ignored.

As stated hereinbefore, if the rate bit is a binary one, a rate in excess of 2.4 kb. is indicated. The comparison of the most significant bit of the 9 bit time slot word with the 2.4 kc. timing waveform is thus effectively ignored, as described, and therefore for rates in excess of 2.4 kb. this bit position can be utilized to convey other information. This double utilization of the bit position is resorted to for the purpose of keeping the call instruction word to a minimum length. For the 9.6 kb. rate, the rate bit is a binary one and the most significant bit is set to binary zero. The operation of the comparison circuit is exactly as described, i.e., the most significant bit plays no part in the comparison circuit operation at this rate. For the 38.4 kb. rate, however, the rate bit is again a binary one, but the most significant bit in this instance is now a binary one. The AND gate 8715 is connected to the (1) output leads of storage location (0) and (9) and hence with binary ones stored in each the AND gate is enabled and delivers an energization signal to OR gates 8723 and 8733. In this manner the 9.6 kc. and 19.2 kc. waveform-to-stored bit comparisons are effectively eliminated or rendered moot and the most significant bit comparison is that made against the 40.8 (I) kc. waveform—and, of course, its inversion. Sixteen of the heretofore described "match" situations now take place every 2.4 kc. office cycle and the time slot comparison circuit thus delivers an output enabling signal to the AND gates 9521–9523 during sixteen, evenly spaced, time slot periods.

The above described philosophy can be applied to even higher rates, that is, successive bit-to-waveform comparisons are ignored for the successively higher subscriber rates.

Normally the bit stored in storage location (22) of word register 8800 is a binary zero. The (0) output lead of this storage location is connected to the input of AND gate 8731 along with the inversion ($\overline{B40}$) of the B40 waveform. Accordingly, the gate 8731 will normally deliver an energization signal to AND gate 9401, except during the B40 interval. This is due to the fact that during this interval the inverted $\overline{B40}$ waveform drops or goes negative and the gate 8731 is thus de-energized during said interval. The utilization of the B40 data transfer intervals for subscriber address information storage is therefore normally prevented.

In certain test situations, however, it may be desirable to store pseudo-address data in one or more of the time slots that fall within the data transfer intervals. In this manner, tests can be run without utilizing any of the 512 time slots intended for regular traffic. To this end, a binary one is stored in the storage location (22) which, with the 9-bit time slot word heretofore described can be used to define one or more of the time slots within the B40 data transfer intervals.

The "calling party line number" comprises seven bits of information, the same being stored in storage locations (0) through (6) of word register 8900. The energization of the calling party cycle bus 8810 causes these seven bits to be read out of the register via seven enabled AND gates, which are symbolically illustrated in FIG. 89 by the heavy-lined AND gate 8910. As has been explained heretofore, 7 call instruction bits are required to define a given line number (i.e., line circuit position) out of the total of 127 associated with each matrix module.

The energization of the calling party cycle bus 8810 also serves to read out the 5-bit "called party link number" from storage locations (17) through (21) of word register 8800. This read out is via the five enabled AND gates which are symbolically illustrated in FIG. 89 by the heavy-lined AND gate 8920. The inhibit applied to the latter AND gates can be disregarded for the moment. It is this 5-bit number together with the above-mentioned 7-bit number that comprise the twelve address bits necessary to complete the call through the link assigned to the calling party. The twelve address bits together with a parity bit, to be described, are delivered over separate leads (indicated by cable 9650) to each of the Link Control Units.

As illustrated by way of example in FIGS. 75, 76, 79 and 80 and as described heretofore, each of the twelve address bits are respectively connected to the input of a delay line memory loop. The 7-bits that define a given line number are applied to the read-in AND gates (e.g., 7914) of the memory loops of FIGS. 75 and 79, while the five "called party link number" bits are applied to the read-in AND gates of the memory loops of FIGS. 76 and 80. A separate memory loop is reserved for the parity bit. The address and parity bits are applied to the read-in AND gates of their respective memory loops for the duration of the calling party cycle. Accordingly, a sample of each bit will be simultaneously read into each of the respective memory loops for each and every occurrence of an enabling signal from the link selector circuitry 10201–10208. This read in will take place once, four or sixteen times per 2.4 kc. office cycle, depending on whether the requested interconnection is to be established for 2.4 kb., 9.6 kb. or 38.4 kb. message rate subscribers.

The twelve address bits and the accompanying parity bit are simultaneously and correspondingly coupled to the memory loops of each of the other Link Control Units. However, since the link selector enabling signal is delivered to one and only one of the Link Control Units, the address and parity bit are only stored in the memory loops of this one.

The 7-bit "calling party line number" when translated in the selected Link Control Unit serves to access the appropriate line-link transmit and receive gates. The 5-bit "called party link number" when translated serves to access the link-junctor gate that connects the link receive bus of the calling party to the talking bus of the called party. Note, in this regard, the correspondence between the foregoing tables entitled "Link Selection Table" and "Binary Codes for Link-Junctor Gates." The 5-bit "called party link number," therefore, might be considered to perform two, albeit closely related, functions.

Figure 89:
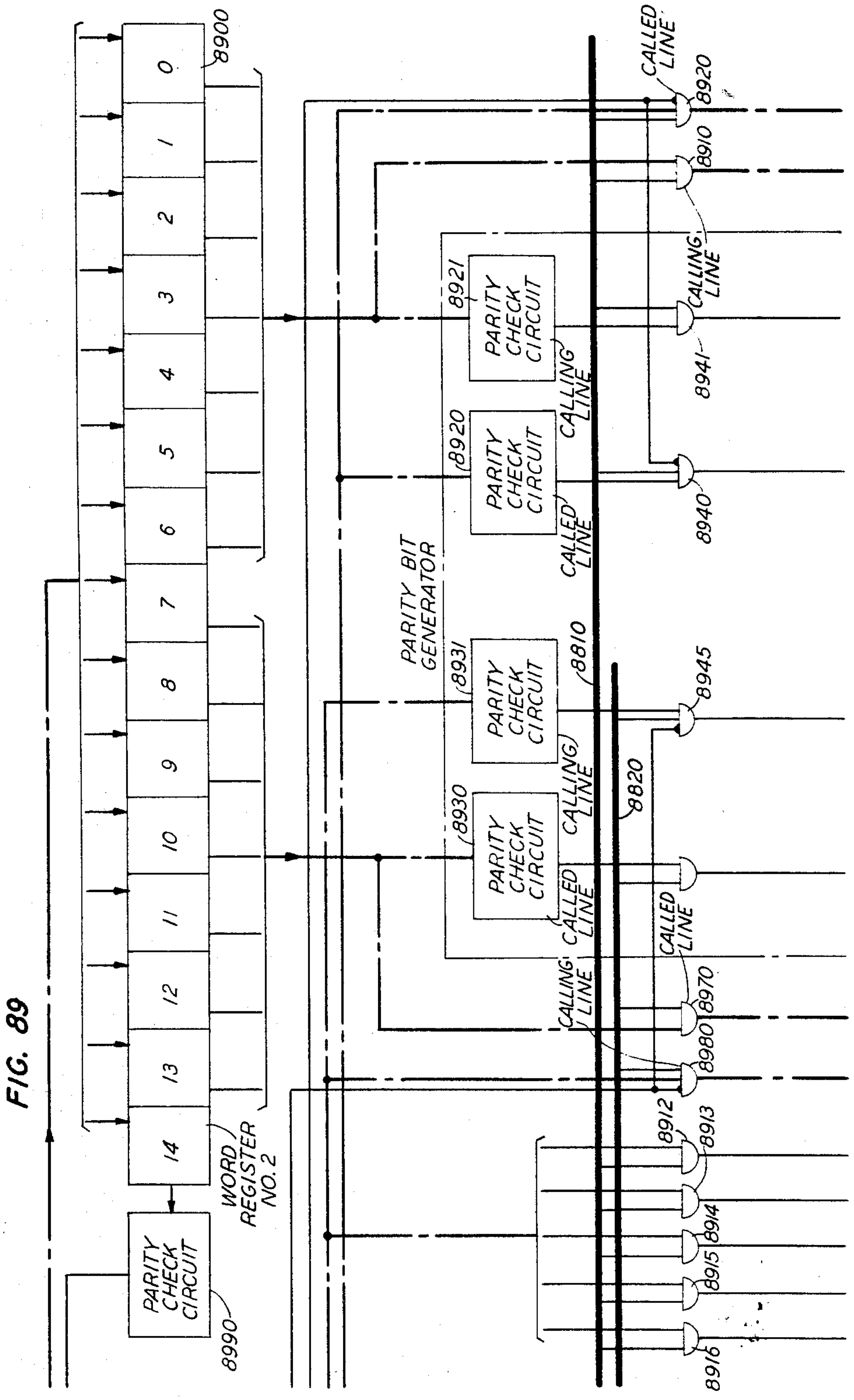
Figure 90:
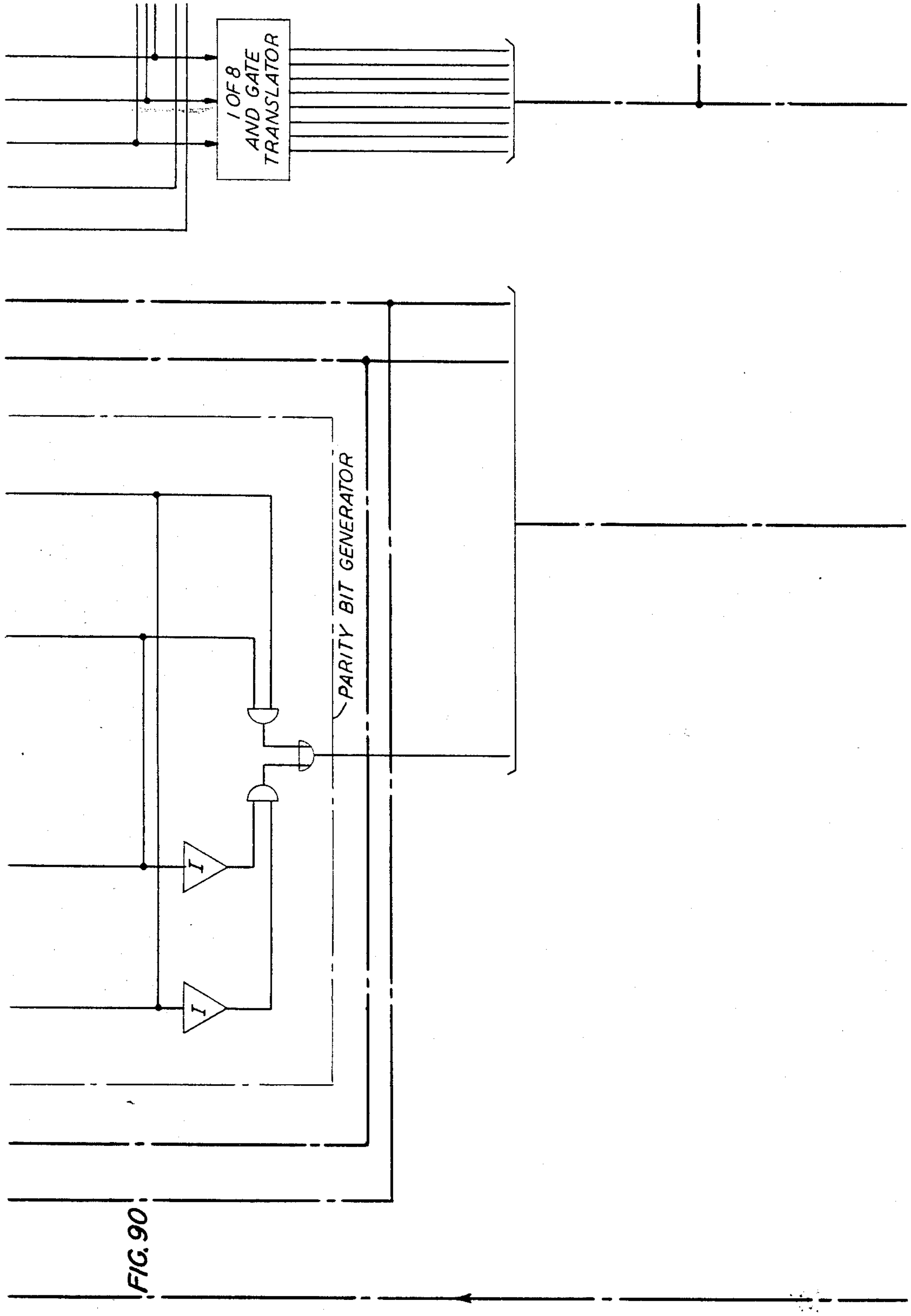
Figure 91:
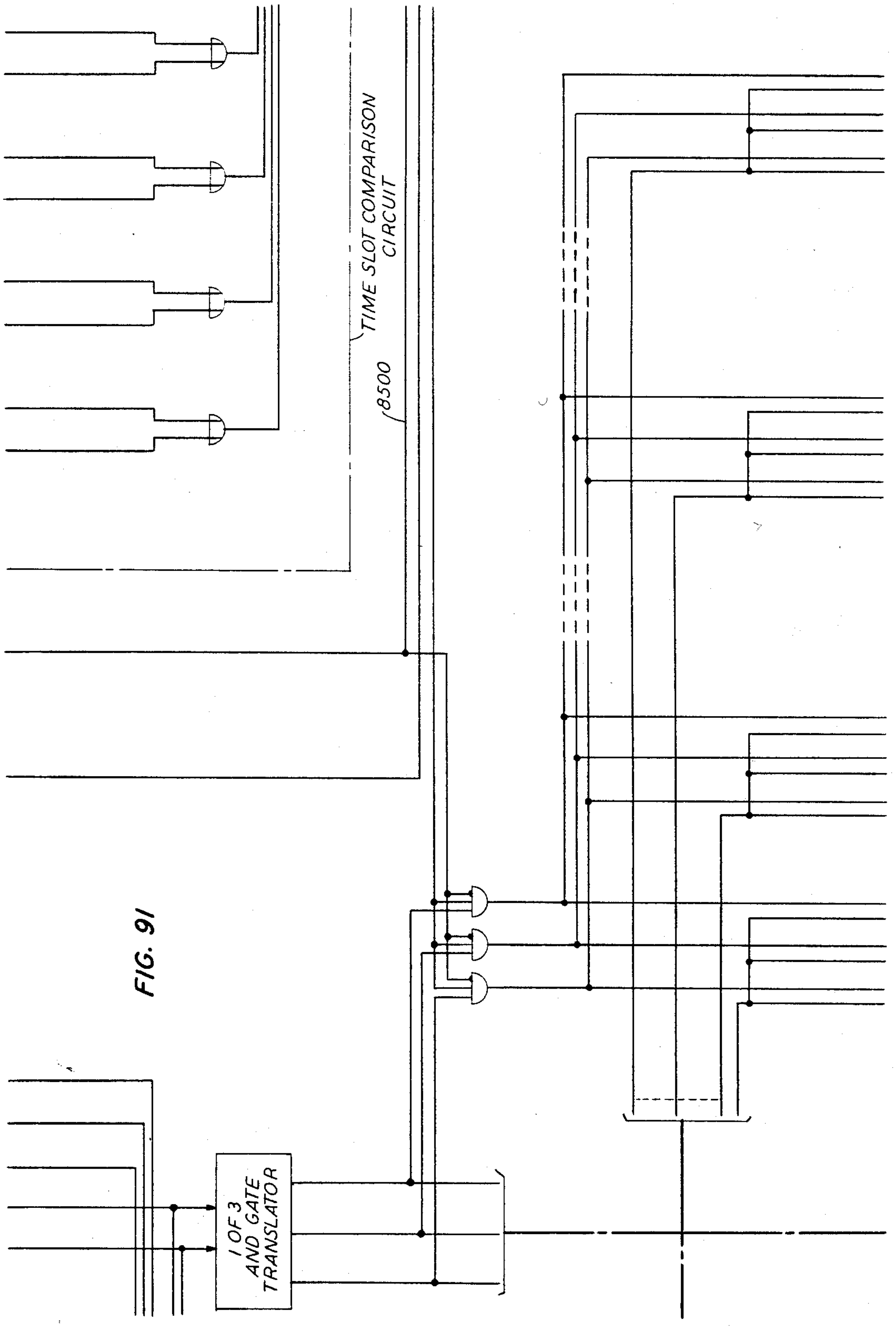
Figure 92:
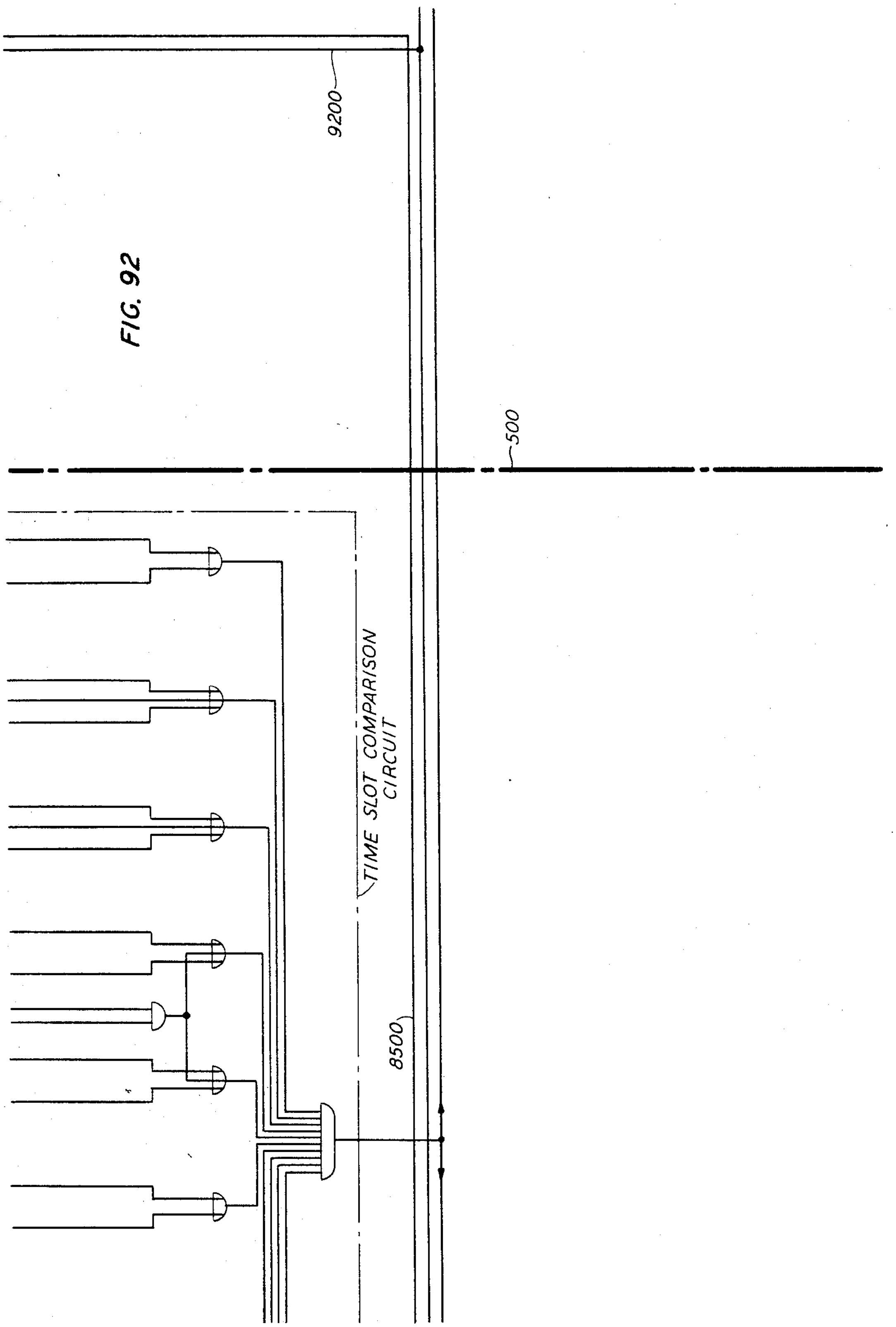

The parity bit generator shown in FIGS. 89 and 96 comprises a pair of parity check circuits 8920 and 8921 and associated logic circuitry which generates a parity bit, if required, during the calling party cycle. The pair of parity check circuits 8930 and 8931 and the logic connected thereto serve to generate a parity bit during the called party cycle in a manner similar to that to be described. All of the parity check circuits can be similar to that shown in FIG. 139. However, since parity need not be checked in a short period of time, as was the case with parity check circuit 7625, these parity circuits can, alternatively, be of the conventional parity tree type or any other type of parity check circuit known to those skilled in the art.

The parity circuits perform a "1-if-odd" operation; that is, they will provide an output pulse if the sum of the binary one bits coupled thereto is odd. No output signal is derived if the input binary one digits are even in number. The 7-bit "calling party line number" stored in word register 8900 is coupled to the input of the parity check circuit 8921 and if the number of binary one bits in said line number is odd, an output signal will be provided by the check circuit 8921. The 5-bit "called party link number" is coupled to the input of the parity check circuit 8920, which functions in the manner identical to check circuit 8921.

The logic circuitry connected to the output of the parity check circuits 8920 and 8921 is of the negated EXCLUSIVE-OR type. Thus, if the output of these two parity check circuits is similar a parity bit will appear on output lead 9620, whereas if the outputs are diffferent, no parity bit is generated. For example, if the parity check circuits 8920 and 8921 both generate a "1-if-odd" signal, the AND gates 8940 and 8941 will be enabled during the calling party cycle. This is indicative of an even number of binary ones in the combined 12-bit address word since the addition of the two odd numbers results in an even number. The output of each of the AND gates 8940 and 8941 is connected to the AND gate 9625 and hence the latter is enabled should the above-assumed condition exist. Accordingly, a parity bit signal will be delivered to lead 9620, which is connected to the parity bit memory loop of each Link Control Unit. The inhibit applied to AND gate 8940 can be disregarded for the moment.

If the 5-bit number checked in parity circuit 8920 contains an even number of binary ones and the 7-bit number checked in parity check circuit 8921 also contains an even number of one digits, the 12-bit address word will of course also contain an even number of one digits and hence a parity bit must be generated. In this instance neither of the check circuits 8920 and 8921 will deliver an energizing signal to the AND gates connected thereto. The gates 8940 and 8941 remain disabled and no parity signal is passed by AND gate 9625. The output of the AND gates 8940 and 8941 are inverted, however, in the inverters 8960 and 8961 and hence an energizing signal is delivered to each of the inputs of AND gate 9675. A parity bit is therefore delivered to the output parity bit lead 9620.

Should parity be such that only one of the parity check circuits provides an output "1-if-odd" signal, neither of the above-described operations can take place, and the AND gates 9625 and 9675 remain disabled during the calling party cycle. This is as it should be, since this condition is indicative of an odd number of binary one digits in the 12-bit word.

Summarizing the above, the parity bit generator generates a parity bit if the 12-bit address word to be stored has an even number of one digits. Conversely, no parity bit is generated should the 12-bit number contain an odd number of one digits.

The operation during the called party cycle is substantially the same as that during the calling party cycle. As indicated hereinbefore, Buffer operation is sequential in that first the calling party information is stored in the appropriate memories and this is then followed by a similar storage of the called party information. The data stored in each cycle is, of course, different.

During the called party cycle the bus 8820 is energized and the calling party bus 8810 is deenergized. The called party cycle bus 8820 then remains energized for the duration of the 2.4 kc. office cycle.

The AND gates 8812–8816 will be enabled by the energized called party cycle bus and hence the "called party link number" bits stored in locations (17) through (21) of word register No. 1 will be read out therefrom. These 5-bits at the output of AND gates 8812–8816 are used in "setting-up" or accessing the particular link assigned to the called party for this call. This link will, of course, be different from that assigned to the calling party. The three most significant bits of AND gates 8814–8816 are fed to and operate the 1-of-8 AND gate translator 9610 and the two least significant bits from AND gates 8812 and 8813 are fed to and operate the 1-of-3 AND gate and translator 9510. The operation of these translators and the link selector circuits is identical to that heretofore described. Thus, the output of the 1-of-8 translator designates the matrix module of the called party; the 1-of-3 translator output designates the link assigned by the C.P. to the called party; and the time slot comparison circuit again controls the time slot or slots during which the link selector enabling signal is generated. Since the 9-bit time slot defining word, as well as the rate bit, stored in word register 8800 have not been changed, storage in the designated Link Control Unit takes place during the same time slot or slots as the storage of the address bits during the calling party cycle. Thus, all of the address bits related to a given call occupy the very same time slot or slots.

The "called party line number" comprises seven bits of information, the same being stored in storage locations (7) through (13) of word register 8900. The energization of the called party cycle bus 8820 causes these seven bits to be read out of the register via seven enabled AND gates, which are symbolically illustrated in FIG. 89 by the heavy-lined gate 8970. These seven call-instruction bits are used to define the line circuit position of the called party.

The energization of the called party cycle bus 8820 also serves to read out the 5-bit "calling party link number" from storage locations (12) through (16) of word register 8800. This read out is via five enabled AND gates which are symbolically illustrated in FIG. 89 by the heavy-lined AND gate 8980. The inhibit applied to the latter AND gates can be disregarded for the moment. It is this 5-bit number together with the above-mentioned 7-bit number that comprise the 12 address bits necessary to complete the call through the link assigned to the called party. Here again these twelve address bits together with a parity bit are delivered over separate leads to each of the Link Control Units. In fact, the twelve output leads from the symbolic gates 8910 and 8920 can be connected to the corresponding leads from symbolic gates 8970 and 8980, since the two 12-bit words appear over these leads at separate times. These twelve address bits along with the parity bit are written into the delay line memory loops of the selected Link Control Unit in exactly the same manner as that heretofore described. The 7-bit "called party line number" when translated in the selected Link Control Unit serves to access the line-link transmit and receive gates of the line circuit position of the called party. The 5-bit "calling party link number" when translated serves to access the link-junctor gate that connects the link receive bus of the called party to the talking bus of the calling party.

The 7-bit "called party line number" is delivered to parity check circuit 8930 and the 5-bit "calling party link number" is delivered to parity check circuit 8931. The latter parity check circuits are structurally and functionally the same as the check circuits 8920 and 8921. And they are connected to negative EXCLUSIVE-OR circuitry in exactly the same manner as the described parity check circuits. Thus, a parity bit will be generated, if required, during the called party cycle.

Each of the two words of a call instruction includes a parity bit. The parity of the word stored in word register 8800 is checked in parity check circuit 8790 and the parity of the word in word register 8900 is checked in parity check circuit 8990. If the parity checks in each instance, the Buffer is permitted to process the call instruction in the above-described manner. If parity does not check, Buffer operation is prevented. Here again the parity check circuits 8790 and 8990 may be similar to the parity check circuit shown in FIG. 139. If parity is not correct in either case, an output signal is delivered to lead 8750 via OR gates 8751 and 8753. The energized signal on lead 8750 is coupled as an inhibit input to AND gate 8802. With gate 8802 inhibited, the timing circuit will not count, the two cycle operation heretofore described will not take place, the calling and called party cycle busses remain deenergized, and there will be no read out from the word registers Nos. 1 and 2.

To further assure that there will be no read-in to a Link Control Unit, lead 8750 is also applied as an inhibit input to gates 9521–9523 and thus no link selector enabling signal can be delivered to any Link Control Unit.

The parity error indication, if any, at the output of OR gate 8751 is also coupled to lead 8500 of the other Buffer via the OR gates 8501 and 8502. It will be apparent from a comparison of the Buffer circuits that the corresponding gates of the other Buffer are similarly inhibited and hence a parity error indication obtained in the described Buffer will disable both of the Buffers. Similarly, the output of the parity check circuits 8390 and 8590 of the other Buffer are coupled to the lead 8750 via OR gates 8551, 8752 and 8753. Therefore, a parity error indication obtained in either Buffer will disable both. As will be explained in greater detail hereinafter, a parity error indication is also delivered to the C.P. which, in response thereto, initiates a maintenance routine.

When a call is terminated it is necessary to erase the address bits stored in the selected time slot or slots of the assigned calling and called party Link Control Units. The operation of the Buffers for "call take-down" is somewhat similar to the heretofore-described "call set-up" operation. With one exception, the first word of the call instruction is the same in both cases. The exception is that the inhibit bits which are binary zeros when a call connection is being established, are now binary ones for call erasure. The second word is significantly different for call erasure; the "calling party line number" and the "called party line number" now comprise all binary zeros, that is, the storage locations (0) through (13) of word register 8900 are set to their "0" state.

The erase call instruction from the central processor is also accompanied by a start signal which takes the timing circuit 8801 out of its idle state in preparation for the two cycle operation. The calling party cycle bus is therefore energized at the beginning of the next complete office cycle following this start signal. And this is followed by the energization of the called party cycle bus during the next succeeding 2.4 kc. office cycle. Since there is no change in the "rate," "time slot," "calling party link number" and "called party link number" information, stored in word register 8800, a link selector enabling signal is delivered in the manner heretofore described, to the assigned calling and called party Link Control Units in their respective cycles. The 1-of-3 AND gate translator, the 1-of-8 AND gate translator, the time slot comparison circuit, and the link selector circuitry all operate in exactly the same manner as before described. Thus, the memory loops of the assigned calling and called party Link Control Units are prepared or "set up" for a read in of address bits. For example, if Link Control Unit No. 1 is assumed assigned to the calling party, the lead 7900 will be energized during appropriate time slot or slots. This energized or enabling signal on lead 7900 serves to enable the gate 7914 and, because of the indicated inversion, it temporarily disables gate 7912. With gate 7912 disabled during the appropriate time slot or slots, the address bit circulating in this memory loop is erased since the same will not be passed by gate 7912 and, as will be evidenced hereinafter, no new meaningful address information is substituted therefor. The call connection is thus terminated.

The inhibit bit stored in location (11) of Word Register No. 1 is applied to the inhibit terminal of each of the five AND gates symbolically illustrated by the heavy-lined AND gate 8920. As heretofore described, the "calling party line number" comprises all zero digits. Accordingly, during the calling party cycle an all zero digit condition exists on the 12 output leads of the AND gates symbolically illustrated by gates 8910 and 8920. This all zero digit address word is, in effect, substituted in the appropriate time slot or slots for the stored address information relating to the terminated call. An all zero digit address word is meaningless to the calling party Link Control Unit translators and thus the call connection through the calling party link is broken.

The erase operation is substantially the same during the called party cycle. The inhibit bit stored in location (10) of word register 8800 is applied to the inhibit terminal of each of the five AND gates symbolically illustrated by the heavy-lined AND gate 8980. And since the storage locations (7) through (13) of word register 8900 are all set to their "0" state, an all zero digit condition will exist on the 12 output leads of the symbolic gates 8970 and 8980. This all zero digit address word is substituted for the 12 bits of address information stored in the memory loops of the Link Control Unit assigned to the called party. The call connection through the called party link is therefore broken.

The parity bit generator serves to generate a parity bit, which accompanies each of the all zero digit, 12 bit, address words. The inhibit bit applied to symbolic gate 8920 is also delivered as an inhibit to the gate 8940. This gate is thereby disabled. The all zero digit input to parity check circuit 8921 results in the AND gate 8941 also remaining disabled. Hence, no signal appears at the output of gates 8940 and 8941. The output of the gates 8940 and 8941 are inverted, however, in inverters 8960 and 8961 and an energizing signal is thereby delivered to each of the inputs of AND gate 9675. A parity bit is thus generated and read into the appropriate memory loop. This operation is repeated during the called party cycle.

It should be apparent from the foregoing explanation that the call address information could be erased in the manner described, using a single inhibit bit. In certain instances, however, a one way transmission path through the switching matrix is desirable. For example, for broadcast calls it is important that there is no return transmission from a listener back to the talker. To this end, the link-junctor gates of the link over which the talker is transmitting are disabled during the appropriate time slots. The same is accomplished herein by the insertion of an inhibit bit in storage location (11) of word register 8800. This inhibit bit serves to inhibit the AND gates symbolically illustrated by the heavy-lined AND gate 8920. The inhibit prevents the read in of the "called party link number" into the memories of the Link Control Unit assigned to the calling party. The 5-bit "called party link number," when translated, normally serves to access the link-junctor gate that connects the link-receive bus of the calling party to the talking bus of the called party. Accordingly, the inhibit bit in storage location (11) serves to prevent the accessing of this link-junctor gate. In all other respects the call set-up operation is the same as heretofore described. The use of the two inhibit bits permits a one way transmission through the matrix in either direction.

The other Buffer shown in FIGS. 83–85, 90–92 and 97–99 is structurally and functionally identical to the Buffer that has been described in detail. The output enabling signal and address bits of the respective Buffers are ORed prior to the application of the same to the delay line memory loops. The switching system can function in normal fashion using only a single Buffer, and in fact a simplex mode of operation is resorted to should either of the Buffers require maintenance. The use of a pair of Buffers provides redundancy, and, in combination with the error detection circuitry to be described, each Buffer provides a check on the operation of the other. In practice, two central processors are normally provided so as to achieve complete duplex operation. Each central processor normally operates with a respective one of the Buffers, but conventional steerage circuitry permits either Buffer to be loaded from the call store send bus of either central processor. The call instructions appear substantially simultaneously over both call store send buses.

The error detection circuitry shown in FIGS. 86, 93 and 100 compares the significant bit and bit combinations generated in one Buffer against those generated in the other and when a lack of comparison occurs, a signal is sent to each Buffer to temporarily disable the same. The central processor, or processors as the case may be, is also advised. The output of the respective time slot comparison circuits are compared in the 1-bit comparison circuit 8610; the output of the respective 1-of-3 translators are compared in the 3-bit comparison circuit 9310; the respective 1-of-8 translator outputs are compared in the 8-bit comparison circuit 10010; and the 13-bit address words (12 address bits and a parity bit) generated in the pair of Buffers are compared in the 13-bit comparison circuit 10020. These comparison circuits are similar to each other and therefore only the circuit 9310 has been shown in detail in the drawings.

The corresponding output leads of each of the 1-of-3 translators are fed to respective bit comparators 9320, 9330 and 9340. These comparators are of the negated EXCLUSIVE-OR type heretofore described in detail, and thus further detailed description of the same is not believed warranted. Suffice it to say that under normal conditions a "match" situation occurs and each comparator therefore normally delivers an energizing signal to the AND gate 9350. The "one" or enabling output of AND gate 9350 is inverted in inverter 9360 and hence a "zero" or non-enabling output appears at the output of the inverter. This is the normal situation.

Should one or more of the comparators 9320, 9330 and 9340 fail to deliver an energizing signal to AND gate 9350 the latter will be disabled and its zero output in this case will be inverted to a one or enabling signal. This is indicative of an error situation. This enabling signal is coupled, for example, to the inhibit input of gates 8802 and 9521–9523 via the OR gates 8670, 8752, 8753 and lead 8750, and the Buffer is thereby disabled as heretofore described. The other Buffer is also disabled in a similar manner. An error indication is also fed back to the central processor or processors via leads 8750 and 8500.

The other bit comparison circuits operate in a similar manner to deliver disabling signals to the Buffers when differences occur between the corresponding binary data generated therein. Since a time slot is only of ¾ microsecond duration and it is desirable that the gates to be inhibited remain so until the central processor takes over, the output of the inverter 8620 is delivered to the set terminal of flip-flop 8630. The flip-flop will remain in its set state until reset by a new start signal from the C.P.

When a Buffer disabling signal is generated either by the call instruction parity check circuits or the error detection circuitry, a signal indicative of the same is sent back to the central processor, or processors as the case may be. This initiates a C.P. maintenance procedure wherein the call instruction stored in the word registers is first checked against the instruction in call store and correction of the word register call instruction is made if an error in the same is noted. If the stored call instruction appears to be correct, the next succeeding level of the sequential TDS Control operation is checked, i.e., the 1-of-3 and 1-of-8 output translations. This procedure continues until the malfunctioning Buffer circuit is uncovered, at which time a simplex mode of operation is initiated with the malfunctioning Buffer temporarily disabled for maintenance. This maintenance procedure comprises no part of the present invention. Maintenance routines similar to this are disclosed in the aforementioned Doblmaier et al. case.

The flip-flops 8591, 8592, 8791 and 8792 are utilized by the C.P. to establish a simplex mode of operation. For example, should it be desired to disable the Buffer illustrated in FIGS. 87–89 et al., a signal is delivered by the central processor to the set terminal of flip-flop 8791 which sets the same to its "1" state. An energizing signal is therefore delivered via OR gate 8753 and lead 8750 to the inhibit terminals of gates 8802 and 9521–9523. With the latter gates inhibited the Buffer is completely disabled. The flip-flop 8592 is also set to its "1" state by a signal from the C.P. and this serves to inhibit gate 8501. With the latter gate inhibited, signals from the error detection circuitry are prevented from disabling the Buffer of FIGS. 83–85 et al. It is necessary that the output of the error detection circuitry be inhibited in the described manner since a call instruction will normally not be deposited in the word registers of the disabled Buffer. It is to be expected, therefore, that the error detection circuit will, in the simplex mode of operation, generate output pulse signals which, if not inhibited, would disable the operative Buffer.

For the simplex mode of operation wherein the Buffer of FIGS. 83–86 et al. is disabled, the flip-flops 8591 and 8792 are set to their "1" state. The energized (1) output lead of flip-flop 8591 serves to disable the Buffer associated therewith, while the energized (1) output lead of flip-flop 8792 inhibits the transmission of signals from the error detection circuit to the now operative Buffer of FIGS. 87–89 et al.

The manner in which broadcast calls, conference calls, multiplexing-demultiplexing etc. are "set up" by the TDS Control should be apparent from the foregoing explanation. A broadcast call, for example, appears similar to a plurality of distinct calls, each of which is between the talker and a respective one of the listeners. The TDS Control serves to establish or "set up," in sequence, an interconnect with each of the listeners in separate and distinct time slot or slots. The inhibit bits are utilized, in the described manner, to prevent return transmission for certain types of calls, e.g., digitalized vocoded voice. Similarly, the TDS Control serves to establish a conference call by setting up the desired interconnections with each of the indicated conferees in sequence and in separate and distinct time slot or slots. Any given conferee can be permitted to talk back by simply eliminating the inhibit bit from the call instruction connecting him to the conference leader. The multiplexing-demultiplexing switching operation can be considered to comprise a plurality of up to sixteen individual call interconnections between the 16 channels of say a 38.4 kb. multiplex message rate trunk and sixteen 2.4 kb. subscribers. Each of these call interconnections is separately established by TDS Control in the same fashion as is a straightforward subscriber-to-subscriber connection.

*Signal assembler-distributor and signal word queue*

The Signal Assembler-Distributor (SA/D) performs a translation operation between the serial signaling words that appear on the transmission lines and trunks and the parallel signaling words required by the central processor. The supervisory signal bits that are stripped from each incoming bit stream, in the manner heretofore described, are routed to the Signal Assembler portion of the SA/D, where the translation to parallel words takes place on a time multiplexed basis. The parallel words from the Assembler are then routed to a Signal Word Queue (i.e., a buffer storage unit where a line or trunk identity word is added) and then to the central processor via the call store bus. The Signal Distributor portion of the SA/D performs the reverse function on parallel words originating at the central processor, converting them to serial streams and routing the same to the proper line and trunk terminal circuitry for insertion into respective outgoing message bit streams.

At this point a very brief review of the digital message bit stream format, utilized herein, might prove helpful. A typical format is illustrated in FIG. 3. A frame consists of 136 bits, of which 128 are message bits and 8 are supervisory signal and control bits. Each frame is divided into eight subframes by the eight supervisory bits. The signal or "S" bits ($S_1$, $S_2$, $S_3$ and $S_4$) form unique S-characters and are switched to the SA/D. Supervisory signal characters originate at the subscriber station, and at the SA/D under the control of the central processor. As will be covered in greater detail hereinafter, the signaling plan of the instant system calls for 4-bit S-characters or words to be used for steady state conditions or line fill and 8-bit words to convey discrete items of signaling information. The 8-bit discrete words are comprised of two 4-bit discrete codes in successive frames. Exactly how the various discrete 8-bit S-words are employed to convey discrete signaling information will be covered later. For the purpose of understanding the SA/D it is sufficient at this time merely to known that there are steady state 4-bit S-words, and discrete 4-bit S-codes—a pair of which comprise a discrete item of signaling information.

The SA/D function is not entirely limited to the serial-parallel conversion process. Since there is a steady stream of S-words, both discrete codes along with the steady state fill words, flowing into a given SA/D input or inputs, there would be an overburdening flood of words delivered to the central processor unless some form of word filtering is employed. The Signal Assembler, after the serial to parallel conversion passes only discrete codes to the Signal Word Queue (SWQ) and the steady state codes are blocked, except for the first word of a new steady state—e.g., on-hook changing to off-hook, and the first steady state word appearing after each discrete code. In the reverse process, steady state words are sent out on a continuous basis and are supplied by the Signal Distributor, thus relieving the central processor of the burden. The steady state word to be sent on a given line is written into the Signal Distributor via the SWQ and the Distributor repeats it from then on until changed. Discrete words for given lines and trunks are sent once, overriding the steady state transmission for a pair of frames, followed again by the steady state word transmission.

FIGS. 104–111 and 121—128 of the drawings show the SA/D apparatus for serving 127 line and/or trunk terminals. This is comprised of two identical 68-terminal capacity SA/D units, one serving the line terminals 0 through 67, the other serving the remainder.

The Signal Word Queue (SWQ) is shown in FIGS. 112–120 of the drawings. It consists of two sections, one of which provides the requisite buffer interface between the illustrated Signal Assemblers and the central processor (C.P.), while the other constitutes the buffer interface between the Signal Distributors and the C.P.

For an office of more than one matrix module (i.e., more than 127 lines and trunks), an additional SA/D pair must be added per module. These added units would, of course, be identical to those shown in the drawings and hence the present description will be confined to a single SA/D pair.

As indicated hereinbefore, the SA/D units utilized herein are of the same nature as that disclosed in the copending application of J. H. Helfrich, Ser. No. 243,213, filed Dec. 6, 1962.

With this brief introduction, the detailed description of this equipment can now proceed.

SIGNAL WORD ASSEMBLER

Turning to FIGS. 104–107 and 109 of the drawings, the Signal Assembler shown therein comprises 68 line terminal circuits, designated T0 through T67. The S-bit data of the 68 subscriber lines and interoffice trunks, connected to the first 68 line circuit positions of the switching matrix, are respectively connected to terminal circuits T0–T67. These lines and trunks, however, are at different digital rates with different relative frame positions. Accordingly, additional data, indicative of rate and frame, is required. To this end, an "S-phase" signal and $F_1$ signal are also coupled to the designated terminal circuits T0–T67. Exactly how these inputs function to permit the intermixing in the Assembler of S-bit data at different rates and frame phases will become apparent hereinafter.

Assume by way of example that the subscriber lines 701, 1501 and 1901 have their S-bits delivered to the Signal Assembler terminals T0, T1 and T2, respectively. Accordingly, the S-bits that are stored one at a time in flip-flop 1022 of the Superivsory Bit Stripper circuit of FIG. 10 are applied in serial fashion to the AND gate 10401 of terminal circuit T0. As will be evident from FIG. 3 and the explanation of the operation of the Bit Stripper circuit, each of the S-bits is applied to the AND gate 10401 for a duration of two subframes. The S-phase signal, which is indicative of rate, is derived from the subframe clock pulse generator-distributor 1301 via the OR gate 1311 and cable 1300. Four such S-phase pulses occur per frame and the leading edge of each is synchronized with an S-bit data pulse. These S-phase signals, however, are of a duration of one bit period. The S-phase pulses from the generator-distributor 1301 are capacitively coupled to the flip-flop 10402 in a manner such that the trailing edge of an S-phase pulse serves to set the flip-flop to its "1" state. In a similar manner the F1 frame pulse is derived from the generator-distributor 1301 and it is capacitively coupled to the flip-flop 10403 so that the trailing edge of the same serves to set the flip-flop to its "1" state.

The S-bit data, S-phase and F1 frame pulses associated with each subscriber line and/or interoffice trunk are similarly derived and applied to a respective one of the Assembler line terminal circuits.

A scanner comprising a counter and translator acts as a 68-terminal rotary switch and cyclically scans the 68 terminals T0 through T67. A complete scan of all 68 terminal circuits T0–T67 is accomplished once every 416⅔ microseconds, with each terminal circuit output being scanned or enabled for a 6.127 microsecond interval. The 416⅔ microsecond scan cycle, hereinafter called an address cycle, is equivalent to one 2.4 kc. period and therefore the SA/D can accept, and deliver, S-bit data at a maximum rate of 2.4 kb. Each 6.127 microsecond interval, hereinafter called an address interval (AD$\omega$, where $\omega$=0=67), comprises one of 68 phases of the scan cycle (i.e., 6.127 $\mu$sec.×68=416⅔ $\mu$sec.

At this point, the direct introduction of the clock signal definitions used in the SA/D would appear appropriate and will facilitate an understanding of the SA/D processes to be described. All the following defined waveforms are derived directly or translated from the central timing unit waveforms:

(1) Address Cycle—416⅔ microseconds, one 2.4 kc. period, 68 Address Intervals;
(2) Address interval—AD$\omega$, where $\omega$=0–67, one of 68 phases of the address cycle, 6.127 microseconds, a duration equal to 8 time slots illustrated in FIG. 135 generated from a 68-state fast carry counter-translator operating at 163.2 kc.;
(3) Address phase—AD$\phi\beta$, where $\beta$=0–7, one of eight phases of an address interval, .765 microsecond, one time slot duration, translated from 652.8 kc., 326.4 kc. and 163.2 kc. waveforms in a manner to be described;
(4) Timing waveforms from 1.3056 mc. down to 18.75 c.p.s., taken directly from central timing unit;
(5) High frequency phase—$\phi\alpha$, where $\alpha$=0–7, .092 microsecond, one of eight phases of address phase, taken directly from central timing unit.

The eight address phase signals (AD$\phi$0 through AD$\phi$7) are translated from the 652.8 kc., 326.4 kc. and 163.2 kc. waveforms, as follows:

| Address Phase | Translation, kc. | | |
|---|---|---|---|
| AD$\phi$0 | 652.8 | 326.4 | 163.2 |
| AD$\phi$1 | $\overline{652.8}$ | 326.4 | 163.2 |
| AD$\phi$2 | 652.8 | $\overline{326.4}$ | 163.2 |
| AD$\phi$3 | $\overline{652.8}$ | $\overline{326.4}$ | 163.2 |
| AD$\phi$4 | 652.8 | 326.4 | $\overline{163.2}$ |
| AD$\phi$5 | $\overline{652.8}$ | 326.4 | $\overline{163.2}$ |
| AD$\phi$6 | 652.8 | $\overline{326.4}$ | $\overline{163.2}$ |
| AD$\phi$7 | $\overline{652.8}$ | $\overline{326.4}$ | $\overline{163.2}$ |

The above translations will be apparent from an examination of FIG. 135 and an appreciation of the fact that an Address Phase is exactly one time slot in duration.

Returning now to the drawings, the seven stage counter 11000 and the 1-of-68 AND gate translator 11001 comprise the aforementioned scanner. Seven stages provide a count capacity in excess of 68; however, because of the timing waveforms applied to the counter circuitry the same is allowed to count sequentially to 68 and then recycle. The negated, $\overline{2.4}$ kc. waveform from the central timing unit is capactively coupled to the flip-flop 11002 in a manner such that the trailing edge of the same serves to set the flip-flop to its "1" state. With the flip-flop 11002 in its "1" state, the counter 11000 is reset or "initialized" and a count cycle begins. From FIG. 135, it should be evident that a count cycle is initiated by the $\overline{2.4}$ kc. concurrently with the start of each 2.4 kc. office cycle. The 163.2 kc. waveform from the central timing unit is capacitively coupled to the reset terminal of flip-flop 11002 so that the trailing edge of the same serves to reset the flip-flop to its "0" state. This reset of the flip-flop follows the setting of the same by a half period of the 163.2 kc. waveform (see FIG. 135). The beginning of the next cycle of the 163.2 kc. starts the count in counter 11000. The counter thereafter counts in a conventional manner in response to each succeeding cycle of the 163.2 kc. waveform until the occurrence of the next trailing edge of the $\overline{2.4}$ kc. waveform whereupon the counter is reset and the count cycle begins once again.

The 1-of-68 translator 11001 performs a conventional AND gate translation whereby one and only one of the output leads thereof is energized for each count of counter 11000. As the count proceeds in the counter successive output leads of the translator will be energized to thereby sequentially scan or strobe the terminal circuits T0–T67. Each terminal circuit is thus scanned in an assigned one of the 68 address intervals that comprise an address cycle.

The output leads of the 1-of-68 translator are respectively coupled to the output AND gates of the terminal circuits T0–T67. For example, the AND gates 10401–10403 are connected to an assigned one of the translator outputs and hence when the same is energized, once per address cycle, the S-bit data as well as the state of the S-phase and $F_1$ flip-flops will be read out and deposited in flip-flops 10501–10503. The flip-flops 10402 and 10403 are reset, at the end of the assigned address interval, by the trailing edge of the applied address gate signal.

The output of corresponding AND gates of terminal circuits T0–T67 are concentrated through respective OR networks and delivered in serial form to the flip-flops 10501–10503 via single-to-double-rail gate circuits. The latter provide for destructive read in, as heretofore described. During any given address interval the state of the flip-flops 10501–10503 is, therefore representative of the S-bit data and the state of the S-phase and $F_1$ flip-flops of the terminal circuit assigned to that address interval.

At the data transmission rates of 40.8 kb. and 2.55 kb., for example, the supervisory S-bit rates are 1200 b.p.s. and 75 b.p.s., respectively. Accordingly, with an address cycle of 416⅔ microseconds—one 2.4 kc. period—there is no likelihood of any S-bit data being missed or passed over. In fact, the probability is that most S-bits will be sampled a multiple number of times. As will be evident hereinafter, the S-phase data is utilized to prevent more than one read in of an S-bit to the Assembler.

The S-bit assembly and S-bit distribution operations both rely upon a dynamic storage arrangement which comprises a delay line and a shift register connected in a loop configuration. For example, the S-bit Assembler of FIG. 105 comprises a four stage shift register 10510 and a delay line 10511 connected end to end in a loop configuration, i.e., the output of the shift register is connected, via logic, to the input of the delay line and the output of the delay line is connected to the input of the register. The delay line may be similar to those used in the Link Control Units with one exception. The total loop delay is the same, 416⅔ microseconds duration which permits storage of 544 bits in 544 time slots, but four bits at a time are made available in a shift register with the delay line shortened accordingly. The time spacing for each bit is .765 microsecond or one AD$\phi$ interval (i.e., one time slot). The delay line is driven each bit time by a $\phi 4$ high frequency phase signal. The bits in the shift register are advanced by the 1.3056 mc. timing waveform derived from the central timing unit. Thus, the bits remain in each stage of the shift register for a duration equal to one time slot or .765 microsecond.

Among other things, the logic circuitry interposed between the output of the shift register and the input of the delay line utilizes the S-phase signals in a manner such as to prevent more than one read in of an S-bit to the delay loop. For example, an S-phase signal indicates that there is new S-bit data being presented to a given terminal circuit. The S-phase signal sets its terminal circuit flip-flop to its "1" state which in turn sets flip-flop 10502 to its "1" state during the appropriate address interval. The new S-bit data is then read into the delay loop in said address interval in a manner to be described. At the end of this address interval the terminal circuit flip-flop is reset by the trailing edge of the address gate pulse and there will not be another S-bit read into the Assembler delay loop from the given terminal circuit until the appearance of a new S-phase pulse. This utilization of the S-phase signals thus permits the Assembler to accept S-bit data at various rates from 2.4 kb. on down.

As indicated hereinbefore, to prevent the delivery of an overburdening flood of words to the central processor some form of word filtering is necessary. To this end, the Assembler incorporates transfer logic that passes only discrete codes to the SWQ; the steady state codes are blocked, except for the first word of a new steady state and the first steady state word appearing after each discrete code. Now since the transfer logic must be able to tell if one steady state word is different or like a previous steady state word of the same line or trunk, to accomplish word filtering eight S-bits or two 4-bit S-codes must be stored in the Assembler store. The Assembler storage loop is capable of storing 544 bits, hence the 68-terminal capability of an SA/D unit ($544 \div 8 = 68$).

An $F_1$ frame pulse occurs every fourth S-bit (see FIG. 3). Hence, its occurence is indicative of the receipt of a complete four bit S-code. Accordingly, the same can be utilized, in conjunction with transfer logic in the Assembler, to initiate a test to see if a stored four bit S-code is different from its immediate predecessor and thus should be forwarded to the central processor. The $F_1$ frame signal thus permits the intermixing of different frame phases resulting from subscriber lines and trunks of different lengths.

During each address interval of eight address phase time slots, four S-bits are available at any one instant in the register. As indicated hereinbefore, two 4-bit S-codes, i.e,. eight S-bits of a given line or trunk, are stored in juxtaposition to each other in the delay loop. The time slot assignment of a given subscriber is retained on a permanent basis. The loading of the S-bits in the delay loop is serial and it employs a precessional scheme, i.e., loading is accomplished by precessing the already loaded S-bit information ahead in position so as to make room for a new S-bit. For purposes of explanation, let it be assumed that an $S_4$ bit from the 40.8 kb. subscriber line 701 has been deposited in flip-flop 10501. When a new S-bit is thus presented, an S-phase signal is also deposited in flip-flop 10502. These bits are read into the respective flip-flops during the first of the eight phases (AD$\phi$0) of the address interval in which the terminal circuit T0 is scanned. As indicated hereinbefore, the presence of the S-phase signal permits the read in of the new S-bit data into the delay loop. This read in is accomplished in the following fashion. The (1) output lead of the S-phase flip-flop 10502 is applied to the input of AND gate 10512. The (1) output of flip-flop 10501 is similarly applied to the input of AND gate 10512. Accordingly, during the last of the eight address phases of the address interval (AD$\phi$7) the AND gate 10512 will be enabled so as to deliver an energizing signal to the input of AND gate 10513, via OR gate 10514. The high frequency $\phi 4$ pulses occur for each and every address phase time slot and the same causes a sample of the $S_4$ bit to be read into the delay loop.

Subscriber line 701 operates at a data transmission rate of 40.8 kb. and the supervisory S-bit rate thereof is 1200 b.p.s. The total loop delay in the delay line-register loop configuration is 416⅔ microseconds or one 2.4 kc. period. Accordingly, the last inserted S-bit must traverse the delay loop twice before the read in of the next S-bit from the same subscriber line.

For subscriber lines of lower transmission rates the inserted S-bits must traverse the delay loop an even greater number of times before the read in of the next succeeding S-bit of the same subscriber. For example, at a data transmission rate of 2.55 kb., the supervisory S-bit rate is 75 b.p.s. Accordingly, an S-bit of 2.4 subscriber must recycle in the delay loop 32 times before the next succeeding S-bit read in from this subscriber.

When no new S-bit is to be inserted, the eight juxtaposed S-bits of a subscriber are advanced through the four stages of the shift register by the 1.3056 mc. advance pulses and then shifted out of the last stage and through the gates 10515 and 10514 to the input of gate 10513. The high frequency $\phi 4$ pulses which occur each and every address phase time slot then strobe the S-bits back into the delay line. The AND gate 10515 is not inhibited at this time.

After the aforementioned $S_4$ bit from subscriber line 701 has traversed or recycled in the delay loop twice, the first S-bit ($S_{1n}$) of the next succeeding S-character of this subscriber will be deposited in flip-flop 10501 preparatory to the same being read into the delay loop. This is accompanied by the setting of flip-flop 10502 to its "1" state in response to the accompanying S-phase pulse.

Figure 143A:
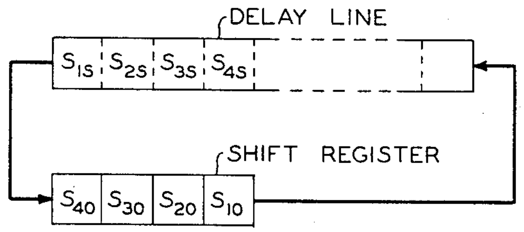
FIGS. 143A–143E shows a series of diagrams that symbolically illustrate the manner of operation of the SA/D assembler delay loop.

The location of the S-bits of subscriber line 701 in the delay loop prior to the insertion of this new S-bit ($S_{1n}$) is symbolically illustrated in FIG. 143A of the drawings. The least significant bit ($S_{10}$) of the oldest stored 4-bit code appears first in time, i.e., it appears in the last or output stage of the shift register, preceding the $S_2$, $S_3$ and $S_4$ bits of the same code. The succeeding 4-bit S-code is in the delay line immediately behind the aforementioned oldest code and the bits of the same are arranged in a manner shown in FIG. 143A of the drawings. When the flip-flop 10502 is set to its "1" state during the AD$\phi$0 period of the appropriate address interval, the gate 10515 will be inhibited and the gates 10512 and 10516 will be partially enabled. Accordingly, during AD$\phi$0 the least significant bit ($S_{10}$) of the oldest word is prevented from recirculating and the next significant bit ($S_{20}$) is immediately read out of the next to last stage of the register and through gates 10516 and 10514 to the input of gate 10513. The $\phi 4$ pulse occurring during this address phase time slot then strobes a sample of the $S_{20}$ bit back into the delay loop. This results, of course (in the stored information being advanced (i.e., processed) one time slot within the delay loop. The gate 10516 is enabled by the "1" output of flip-flop 10502 from AD$\phi$0 through AD$\phi$6 and hence as each of the S-bits $S_{20}$, $S_{30}$, $S_{40}$, $S_{1s}$, $S_{2s}$, $S_{3s}$, $S_{4s}$ are successively shifted into the next to last stage of the register, the same are read out therefrom and strobed back into the delay line in the manner described. The gate 10515 is, of course, continuously inhibited during this period. In this manner each of the above-enumerated S-bits are precessed or advanced one time slot within the delay loop. With the occurrence of AD$\phi$7 of this address interval, the gate 10512 is enabled and the gate 10516 is disabled. The new S-data bit ($S_{1n}$) stored in flip-flop 10501 is thus read out of the same and into the input of the delay line via the gates 10512, 10514 and 10513. The AD$\phi$7 signal marks the end of this address interval and the S-bits from this subscriber line now circulate in the delay loop until the next S-data bit is to be inserted therein. It should be noted in this regard that the gate 10515 will not be inhibited during the assigned address interval until the time for insertion of another new S-bit.

Figure 143B:
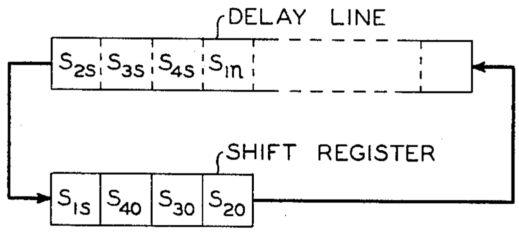
Figure 143C:
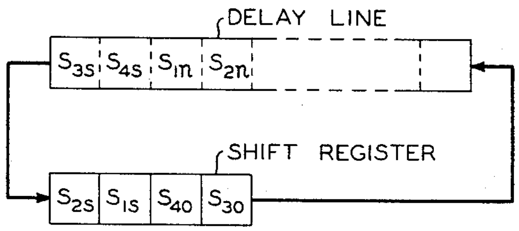

FIG. 143B illustrates symbolically the location of the stored S-bits of subscriber line 701 prior to the insertion of the next S-bit ($S_{2n}$). Once again the flip-flop 10501 will be set to a state indicative to this new S-bit, while the S-phase pulse will set the flip-flop 10502 to its "1" state. Accordingly, the gate 10515 will be temporarily inhibited, the $S_{20}$ bit in the last stage of the shift register will thus be lost, the bits $S_{30}$, $S_{40}$, $S_{1s}$, $S_{2s}$, $S_{3s}$, $S_{4s}$, $S_{1n}$ will all be precessed one time slot within the delay loop, and during AD$\phi$7 of this address interval, the $S_{2n}$ bit will be inserted immediately behind the $S_{1n}$ bit.

Figure 143D:
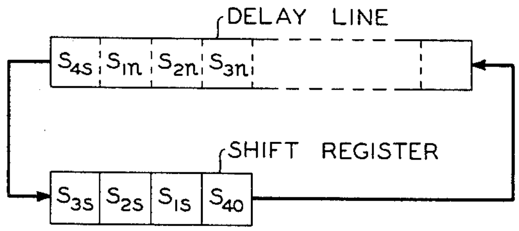
Figure 143E:
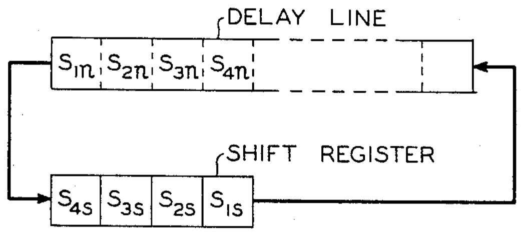
Figure 144:
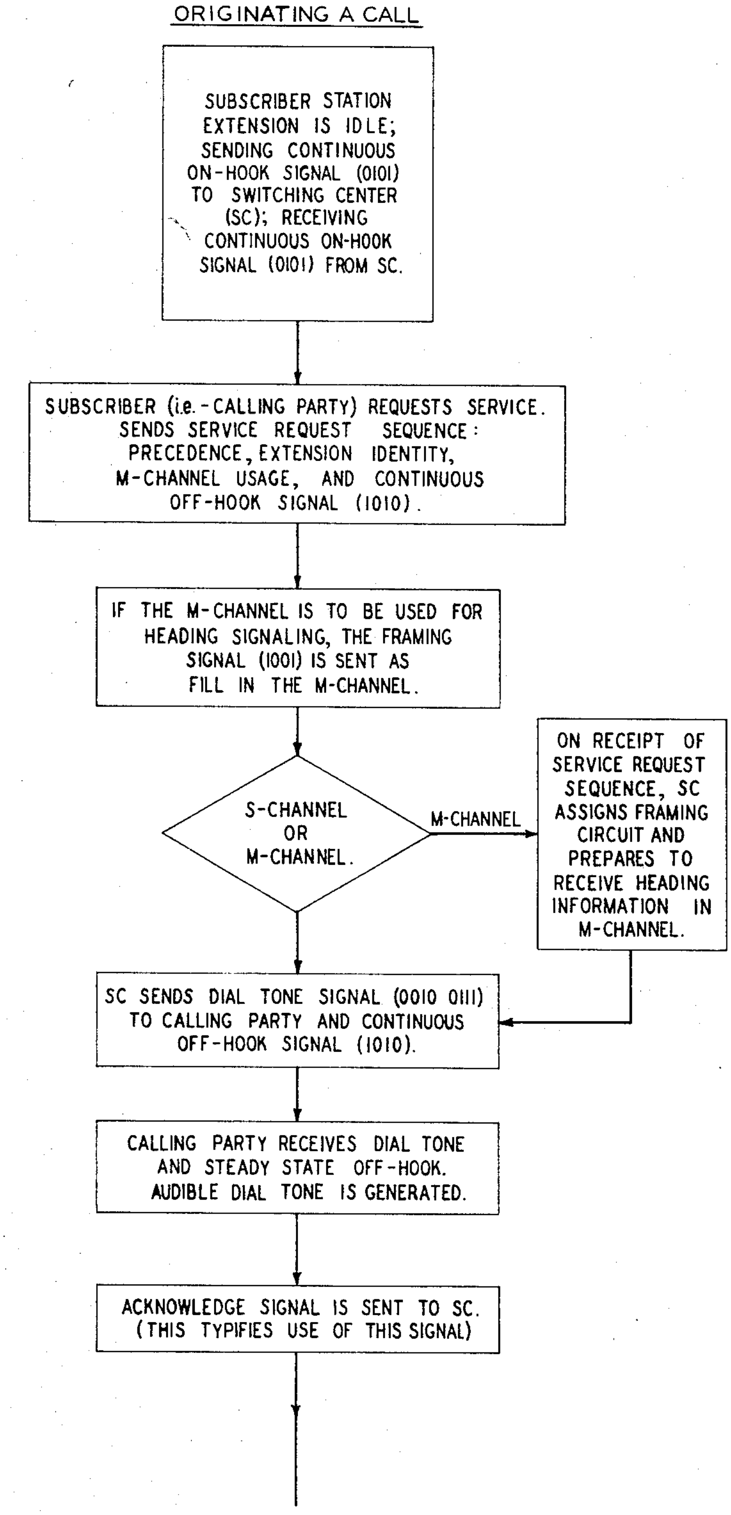
Figure 145:
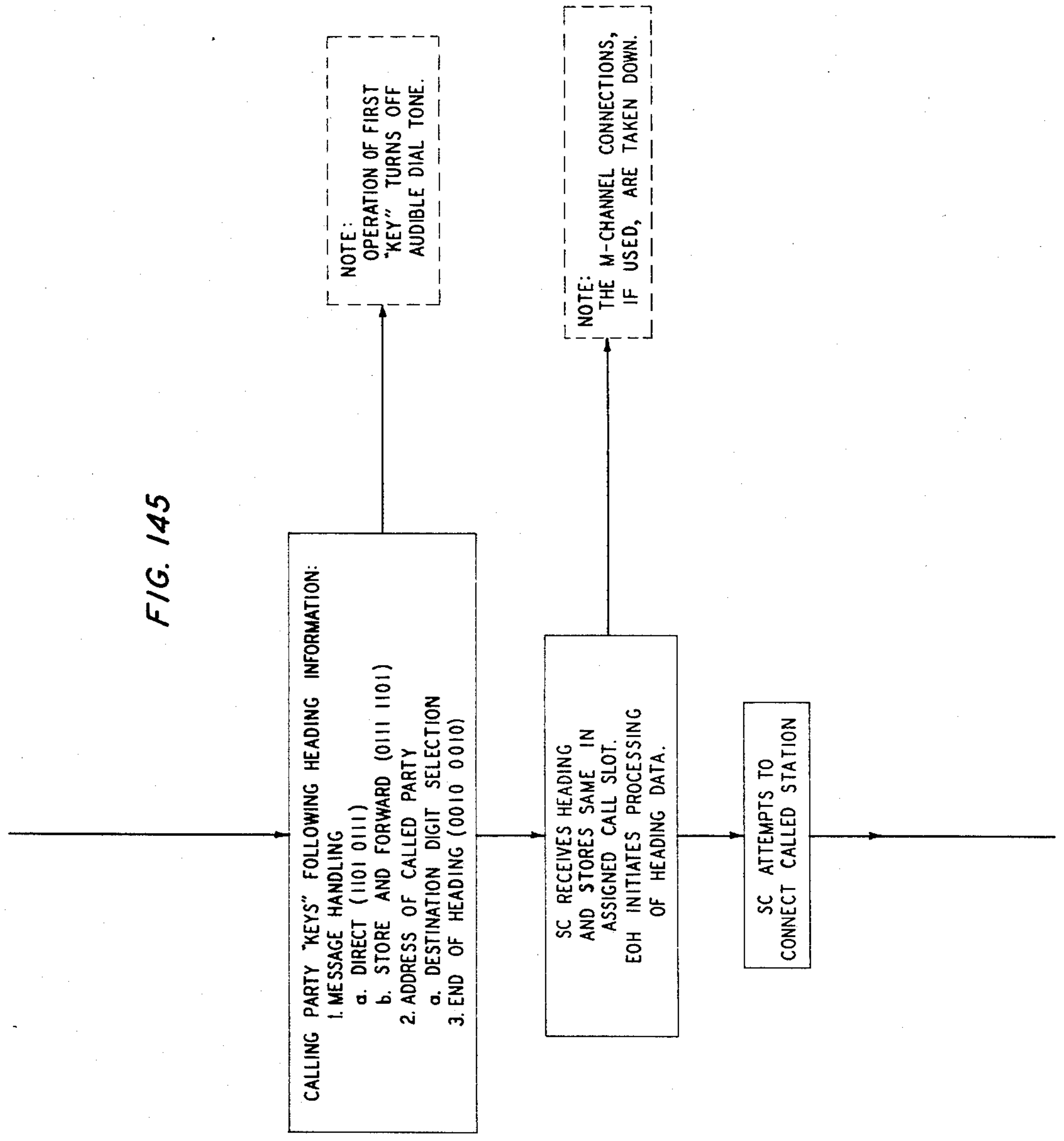
Figure 146:
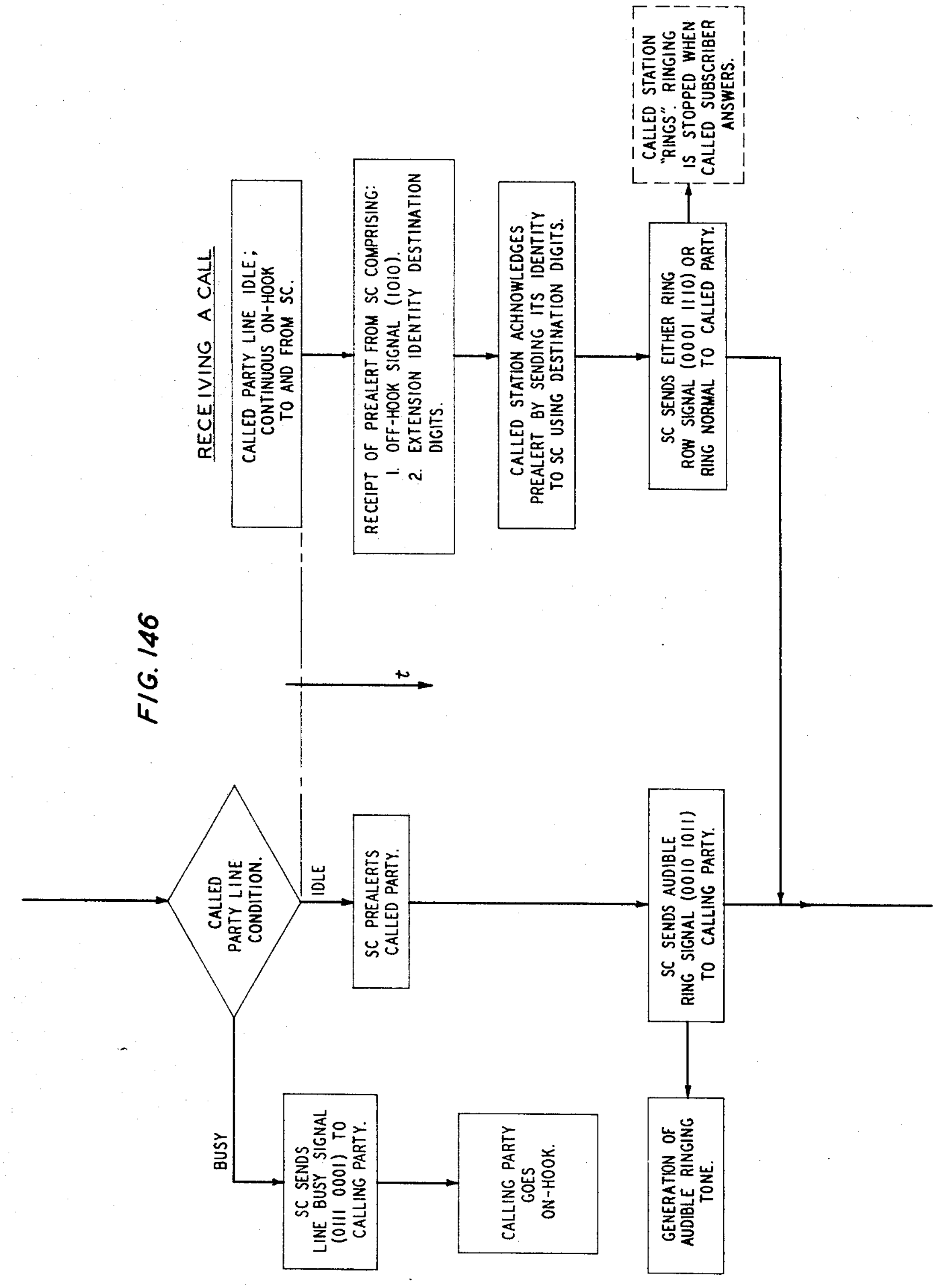
Figure 147:
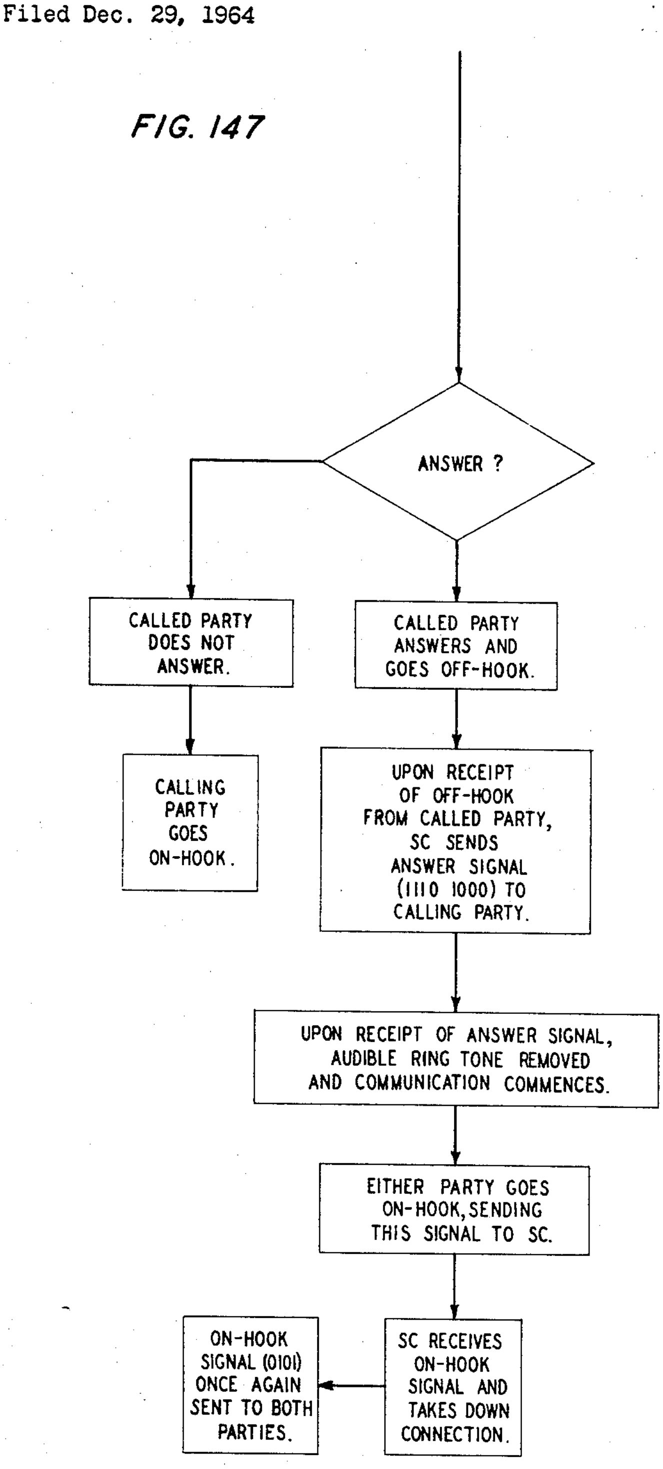

As indicated in FIGS. 143D and 143E of the drawings, the above-described operation is repeated for each of the succeeding bits ($S_{3n}$, $S_{4n}$) of the new S-code. The end result of this operation is that the four S-bits of the new S-code are inserted in the proper order in the delay loop immediately behind the four S-bits of the preceding S-code ($S_{1s}$–$S_{4s}$). FIG. 143E symbolically represents the positioning in the delay loop of the two latest 4-bit S-code prior to the insertion of a new S-bit of the next succeeding 4-bit S-code of subscriber line 701. It is at this point that the transfer logic examines the two 4-bit S-codes of successive frames to determine if the same are similar or different.

The S-bits that are read out of the last stage of shift register 10510 are delivered to the flip-flop 10520 via the single-to-double rail gate circuit 10521. The $\phi$4 high frequency timing pulses that occur each and every address phase time slot strobe these S-bits serially into flip-flop 10520. The (1) output lead of flip-flop 10520 is delivered to the input of AND 10522, while the (0) output lead is delivered to gate 10524. Conversely, the (1) output lead of the input stage of shift register 10510 is coupled to the input of AND gate 10524, while the (0) output lead of said input stage is delivered to the input of AND gate 10522. The outputs of AND gates 10522 and 10524 are coupled to the set terminal of flip-flop 10525 via the OR gate 10526. Disregarding for the moment the various timing pulses delivered to the AND gates 10522 and 10524, the above-described AND gate interconnections permit a bit-by-bit comparison of the S-bits of successive 4-bit S-codes. These AND gate interconnections are such that the flip-flop 10525 will be set to its "1" state if, and only if, the bits being compared are different. For example, the AND gate 10522 is connected to the (1) output of flip-flop 10520 and to the (0) output of the input stage of the shift register. Hence, only if the S-bits presently stored in flip-flop 10520 and in said input stage are different will the gate 10522 be able to pass an energizing signal to the set terminal of flip-flop 10525. That is, only if a binary one is stored in flip-flop 10520 and a binary zero is stored in said input stage will the AND gate 10522 be capable of delivering said energizing signal. In a corresponding manner, if a binary zero S-bit is stored in flip-flop 10520 and a binary one S-bit is presently in said input stage of the register, the AND gate 10524 will be capable of passing an energizing signal to the set terminal of flip-flop 10525. It should be apparent that if the two S-bits under comparison are the same, neither of the AND gates 10522 and 10524 will be enabled.

The comparison between S-bits is carried out continuously for every pair of S-bits that are four time slots removed from each other in the delay loop. It should be apparent, however, that the only comparison that is really meaningful is that carried out between successive 4-bit S-codes of the same subscriber. The $F_1$ frame pulse is advantageously utilized to this end. As indicated hereinbefore, the occurrence of an $F_1$ frame pulse is indicative of the fact that a complete 4-bit S-code has been received. After the receipt and insertion of an $S_4$ bit, an $F_1$ frame pulse occurs to set the flip-flop of the appropriate Assembler terminal circuit, in our assumed case terminal circuit T0, to its "1" state. When this terminal circuit is next scanned, during the appropriate address interval, the flip-flop 10503 is then set to its "1" state. The pertinent S-bits circulating in the delay loop will be located at this time in a manner such as that symbolically illustrated in FIG. 143E of the drawings. The comparison of the S-bits, four time slots removed, then takes place. The described bit-by-bit comparison must be completed with the new S-code ($S_{1n}$, $S_{2n}$, $S_{3n}$, $S_{4n}$) positioned in the four-stage shift register awaiting possible read out should the compared S-codes differ.

To provide a complete understanding of the operation of the transfer logic, the sequence of events comprising the transfer operation will now be described in detail.

Assume a new 4-bit S-code has been written into the delay loop, the $F_1$ frame pulse has set the appropriate terminal circuit flip-flop to its "1" state and the terminal circuit is just about to be scanned during the assigned or appropriate address interval, which, it will be recalled, comprises eight address phases each of which is of one time slot duration. During AD$\phi$0 the flip-flop 10503 is set to its "1" state and it will remain so set for the duration of the address interval. The (1) output lead of this flip-flop is coupled as an enabling signal to the input of the bit comparison AND gates 10522 and 10524. The juxtaposed 4-bit S-codes to be compared are presently located in the delay loop in a manner such as that symbolically illustrated in FIG. 143E. The S-bits of the new 4-bit S-code are located adjacent the output end of the delay line 10511 preparatory to their being read into the shift register. During AD$\phi$0 the least significant bit ($S_{1s}$) of the oldest stored 4-bit S-code appears in the last or output stage of the shift register. This S-bit is read into the flip-flop 10520 via the single-to-double-rail gate circuit 10521 by the high frequency $\phi$4 pulse that occurs during AD$\phi$0. At the beginning of the next address phase (AD$\phi$1) the least significant bit ($S_{1n}$) of the newest 4-bit S-code is read into the input stage of the shift register. The aforementioned comparison then takes place between the least significant bit of the oldest code, stored in flip-flop 10520, and the least significant bit of the newest code, stored in the input shift register stage. This comparison takes place during AD$\phi$1, $\phi$1. Note, in this regard the AND gates 10522 and 10524 are strobed each and every address phase time slot by the $\phi$1 high frequency timing pulses. If the two S-bits under comparison differ an energizing signal will therefore be delivered to the set terminal of flip-flop 10525 to set the same to its "1" state.

Since the only 4-bit S-code comparisons that are of any real significance are those between successive codes of the same subscriber, it is desirable that the bit-by-bit match take place as the four S-bits of a given subscriber are read out of the shift register and the four S-bits of the new S-code are read in thereto. To this end the 163.2 kc. timing waveform is delivered to the flip-flop 10530 via the single-to-double rail gate circuit 10531. The $\phi$4 high frequency timing pulses are coupled as strobe pulses to the input of the AND gates of gate circuit 10531. Accordingly, the flip-flop 10530 delivers an enabling signal to the AND gates 10522 and 10524 for a time period that extends from AD$\phi$0, $\phi$4 to AD$\phi$4, $\phi$4. As will be evident hereinafter, this period encompasses the first S-bit comparison just described and the last S-bit comparison to be described.

A short time after the first comparison has taken place during AD$\phi$1, $\phi$1 the high frequency $\phi$4 pulse strobes the next significant bit ($S_{2s}$) of the oldest word from the output stage of the shift register 10510 where it had been shifted during AD$\phi$1, into the flip-flop 10520. Next, the S-bits are again shifted into and through the shift register at the beginning of the address phase time slot AD$\phi$2. Accordingly, during AD$\phi$2, $\phi$1, the $S_{2s}$ bit previously deposited in flip-flop 10520 is now compared with the $S_{2n}$ bit read into the input stage of the shift register at the beginning of AD$\phi$2. These latter S-bits are compared in the heretofore described manner and the flip-flop 10525 is set to its "1" state should the compared bits differ. If the flip-flop 10525 had previously been set to its "1" state as the result of the first comparison, it just remains so set.

In the same manner the next significant bit ($S_{3s}$) of the oldest stored 4-bit S-code is compared to the corresponding bit ($S_{3n}$) of the newest stored 4-bit code.

At the beginning of AD$\phi$3 the most significant bit ($S_{4s}$) of the oldest stored 4-bit code is shifted into the output stage of the shift register 10510. During AD$\phi$3, $\phi$4 this S-bit is strobed into the flip-flop 10520. The most significant bit ($S_{4n}$) of the newest code is shifted into the input stage of the register at the beginning of AD$\phi$4, and the two $S_4$ bits are then compared during AD$\phi$4, $\phi$1. At this point the four S-bits of the newest code are now stored in the shift register in the following order: $S_{4n}$, $S_{3n}$, $S_{2n}$, $S_{1n}$, reading from left to right.

In the described manner the four bits of the oldest stored code are compared a bit at a time with the corresponding bits of the newest code of the same subscriber. If one or more of the compared bits are different from the other, the flip-flop 10525 will be set to its "1" state. The flip-flop 10530 is reset at AD$\phi$4, $\phi$4 since the 163.2 kc. timing waveform has now reversed polarity. Thus, all succeeding comparisons will be ignored until the next address interval during which the successive 4-bit S-codes of another and different subscriber will be compared in the described manner. Accordingly, the only meaningful or operative comparisons are those carried out between successive 4-bit S-codes of the same subscriber. The flip-flop 10525 is reset at the end of the address interval (AD$\phi$7), but prior to this reset the state of the flip-flop 10525 is utilized to either permit or prevent read out from the shift register of the new S-code ($S_{1n}$, $S_{2n}$, $S_{3n}$, $S_{4n}$) temporarily stored therein.

The transfer logic provides word filtering in accordance with the following:

TRUTH TABLE

| Difference | Steady State | Output |
|---|---|---|
| 1 | X | 1 |
| 0 | 0 | 1 |
| 0 | 1 | 0 |

Thus, if there is a difference between successive 4-bit S-codes of a given subscriber, the newest of the S-codes should be read out to the SWQ. If such a difference does exist, it is immaterial whether the newest S-code is a steady state code or not. In the second possible situation, there is no difference between the successive S-codes, but the newest code is not a steady state; the same should, therefore, be likewise read out to the SWQ. For the last of the possible conditions or situations, there is no difference between the successive S-bit codes, and the newest S-code is, in fact, a steady state; read out to the SWQ should then be prevented. In summary, discrete codes are always delivered to the SWQ and steady state codes are normally blocked, except for the first word of a new steady state and the first steady state word appearing after each discrete code.

The flip-flop 10525, the steady state detectors 10711 through 10715, and the gates 10720 and 10730 are used to perform the word filtering defined by the foregoing Truth Table.

As has been described in great detail hereinafter, the flip-flop 10525 will be set to its "1" state if one or more of the four bits of the oldest S-code of a given subscriber are different from the corresponding bits of the newest S-code of the subscriber. The bit-by-bit match is complete when the new S-code is available in the four-place shift register 10510, the same occurring during AD$\phi$4.

Each of the four stages of shift register 10510 is arranged in the manner known in the art to supply "two-rail logic output signals." In other words, each stage of the register has a (0) and a (1) output lead. The steady state detectors 10711 through 10715 are connected to selected output leads in the illustrated manner such as to provide an output indication if the S-code that appears in the shift register during AD$\phi$4 comprises one of the steady state code assignments. As will be explained in greater detail hereinafter, there are five steady state code assignments as follows:

| | |
|---|---|
| 0101 | On Hook |
| 1010 | Off Hook |
| 1001 | Framing |
| 0000 | Trouble Indicator |
| 1111 | Trouble Indicator |

Thus, the steady state detector 10713 detects the steady state code 1001 by having two of its input leads connected to the (1) output leads of the first and last stages of shift register 10510. The remaining two inputs are connected to the (0) output leads of the intermediate stages of the shift register. Accordingly, if the S-code in the register comprises the steady state code 1001, the detector 10713 will deliver an energizing output signal to the AND gate 10720 via the OR gate 10725. By way of further example, it will be seen that the steady state detector 10714 is connected at its input to the (0) output leads of each of the stages of the shift register and hence it will detect the steady state code 0000. The correspondence between the remaining steady state detectors and their interconnections to the (1) and (0) output leads of shift register 10510 should be apparent.

The (0) output lead of flip-flop 10525 is connected to the input of AND gate 10720, as are each of the steady state detectors via OR gate 10725. The output of AND gate 10720 is delivered as an inhibit input to gate 10730. An energizing signal is delivered to the input of AND gate 10730 from the $F_1$ storage flip-flop 10503. The AD$\phi$4 address phase pulse and the $\phi$4 high frequency timing pulse are also coupled to the input of gate 10730. It should be apparent, therefore, that if the gate 10730 is not inhibited, an energizing output signal will be delivered from the same to the single-to-double-rail gate circuits 10901–10904, and the S-code presently stored in the shift register 10510 will be read out therefrom and into the bank of flip-flops 10911–10914. The single-to-double-rail gate circuits are enabled, if at all, only during the AD$\phi$4, $\phi$4 pulse period and since the newest S-code of the given subscriber is presently stored in the shift register during AD$\phi$4, only a complete "new" S-code will ever be deposited in flip-flops 10911–10914.

To explain the operation of the above-described circuitry, the three possible alternative situations set forth in the Truth Table shall be assumed. If in the first instance the successive S-codes of a given subscriber are different, the flip-flop 10525 will be set to its "1" state. With the flip-flop so set, the (0) output lead of the same will not be energized and, hence, no output signal will be coupled from the same to the input of AND gate 10720. The AND gate 10720 is therefore disabled, irrespective of the output of the steady state detector circuitry. With AND gate 10720 thus disabled, no inhibit signal is applied to the gate 10730 and an energizing pulse will be passed by the same during AD$\phi$4, $\phi$4. The S-code presently stored in the shift register is therefore read out and into flip-flops 10911–10914.

In the second possible situation delineated in the Truth Table, the successive S-codes of a given subscriber are the same (i.e., no bit difference therebetween) and hence the flip-flop 10525 will remain in its "0" state. The flip-flop therefore delivers an energizing signal to one of the inputs of AND gate 10720. In this second possible situation, however, the S-code stored in the shift register 10510 is not a steady state code and hence the other input lead of AND gate 10720 remains deenergized. The gate 10720 is disabled; the gate 10730 is not inhibited; hence, an energizing pulse appears on the output lead of the latter during the AD$\phi$4, $\phi$4 pulse period. Thus, once again the S-code stored in shift register 10510 is read into the flip-flops 10911–10914.

In the last of the possible alternative situations, no difference exists between the successive S-codes of a given subscriber and so flip-flop 10525 remains in its "0" state. The S-code presently stored in the shift register comprises one of the five possible steady state codes and thus an output energizing signal will be delivered from one of the steady state detectors to the AND gate 10720. Accordingly, the latter gate will be fully enabled so as to deliver an inhibit input signal to gate 10730. With gate 10730 inhibited, no energizing signal is passed thereby and read out from the shift register into the flip-flops 10911–10914 is prevented.

The read in, if any, to flip-flops 10911–10914 is accompanied by the flip-flop 10915 being set to its "1" state. With the latter flip-flop so set, the AND gate 10516 will be enabled during AD$\phi$5 and an energizing signal will be delivered to the AND gates 10921–10924. The S-code stored in the flip-flops 10911–10914 during AD$\phi$4 is, therefore, read out of the same to the SWQ in AD$\phi$5. The enabling output signal from AND gate 10516, labeled BU0, is also delivered to the SWQ for reasons which become more apparent hereinafter. The flip-flop 10915 is reset at the beginning of the next address interval by the AD$\phi$0 pulse. The assembler circuitry is now ready to repeat the above-described operation during the next address interval, which is assigned to another and different subscriber.

The described assembly operation is exactly the same for all subscriber lines and interoffice trunks irrespective of the rate thereof. As pointed out hereinbefore, the only difference in operation for different rated transmission lines and trunks is the number of times that preceding S-bits circulate in the delay loop prior to the next succeeding S-bit read in of the same line or trunk. Operation is identical in all other respects.

Figure 108:
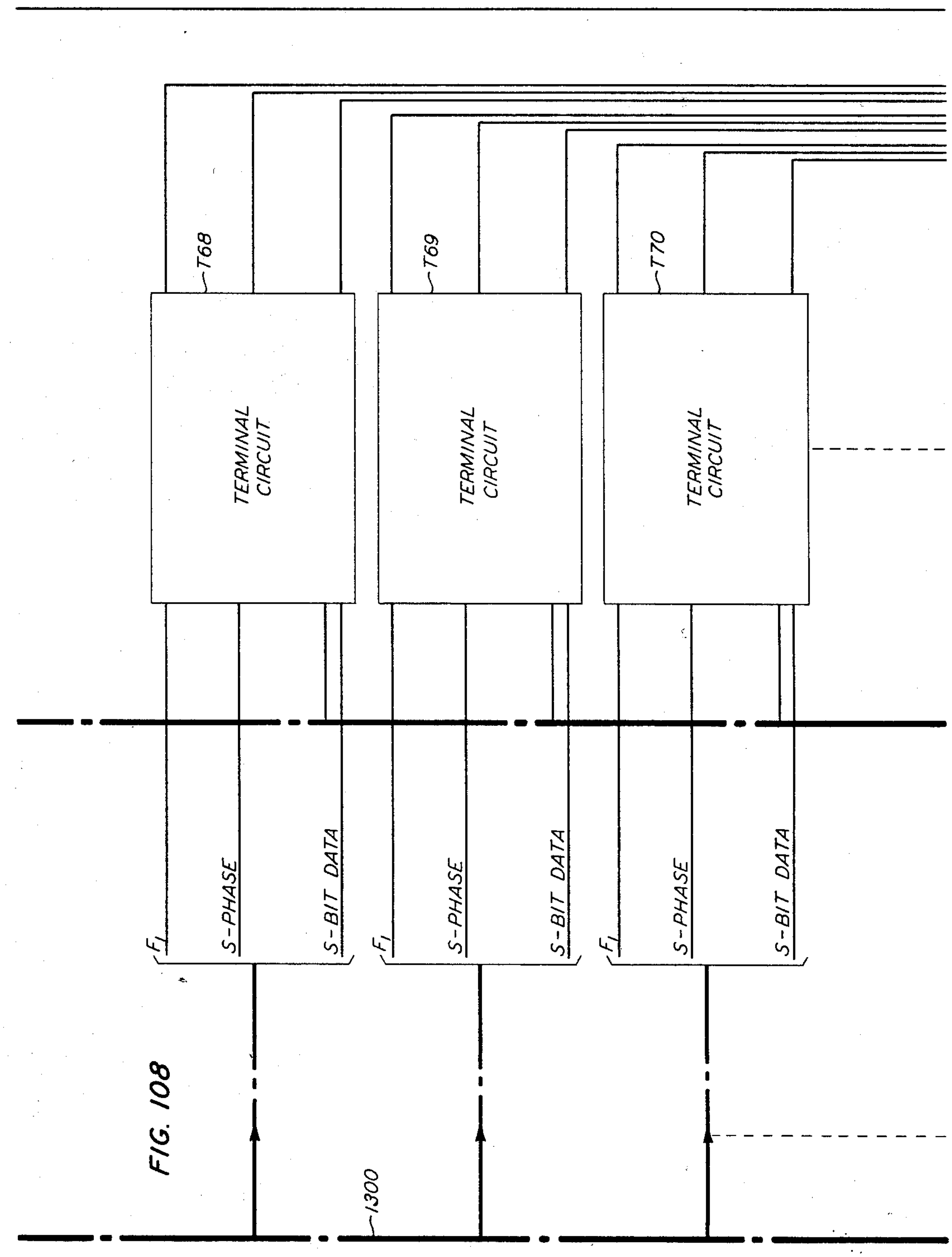
Figure 109:
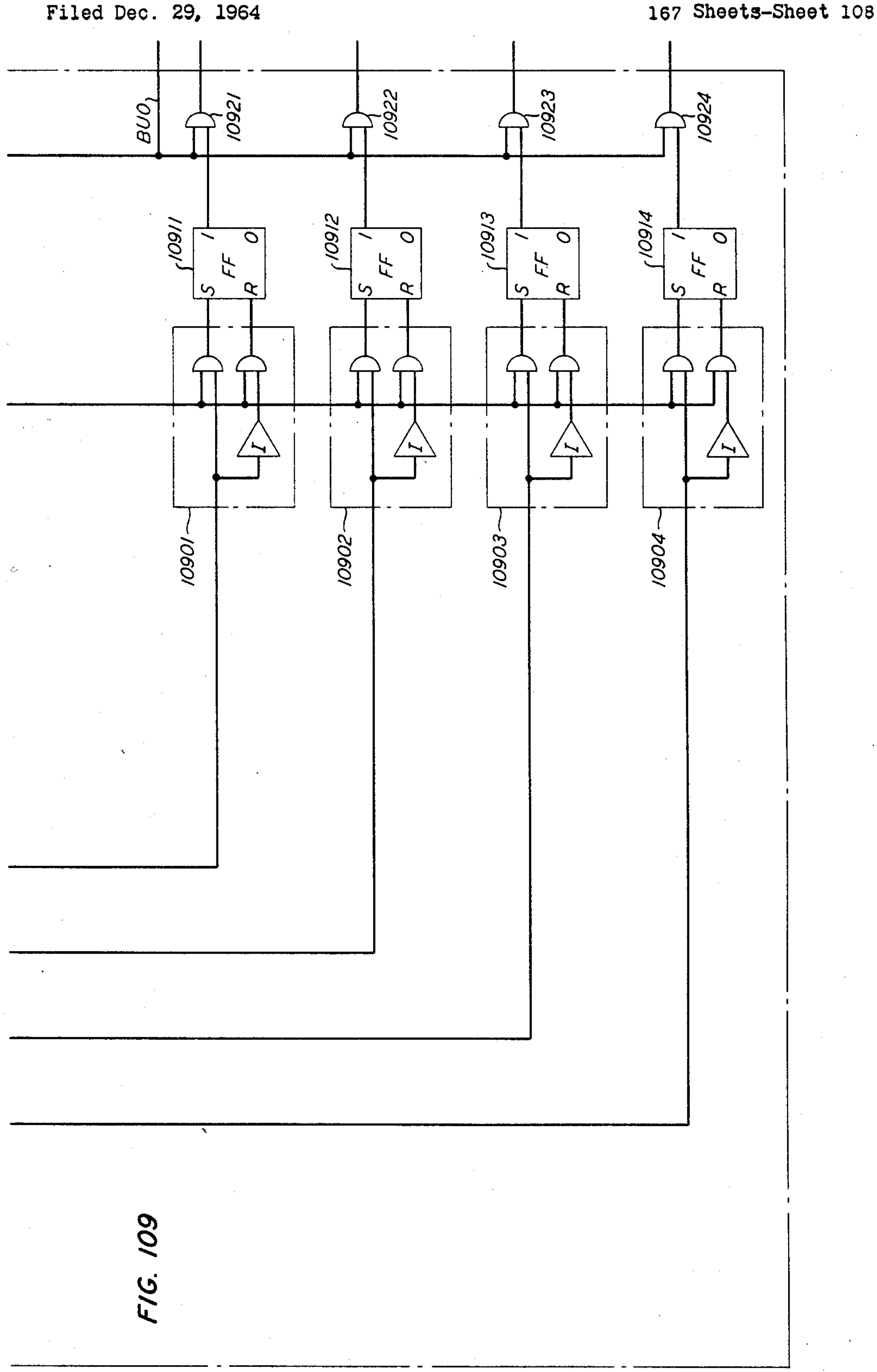
Figure 110:
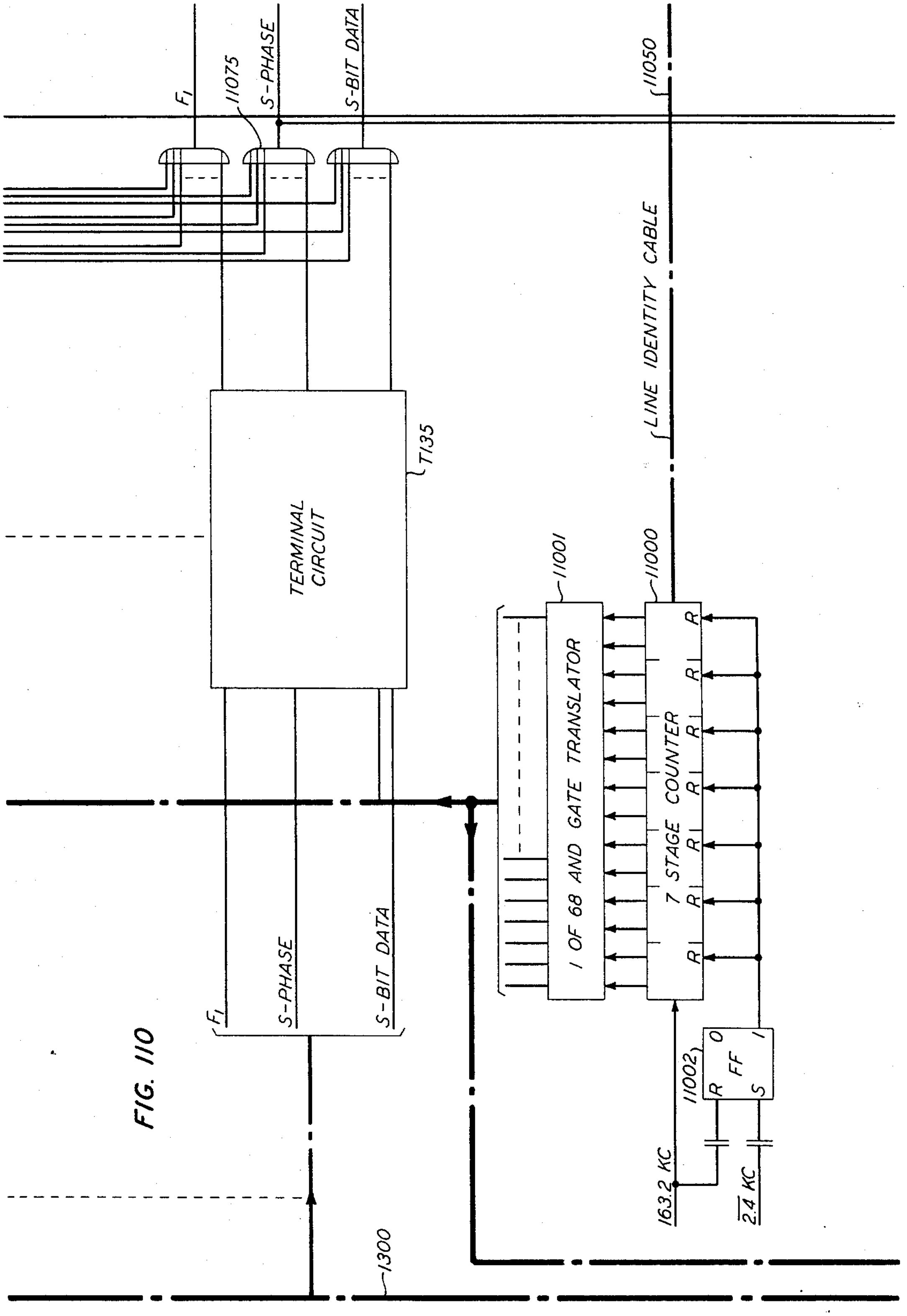
Figure 111:
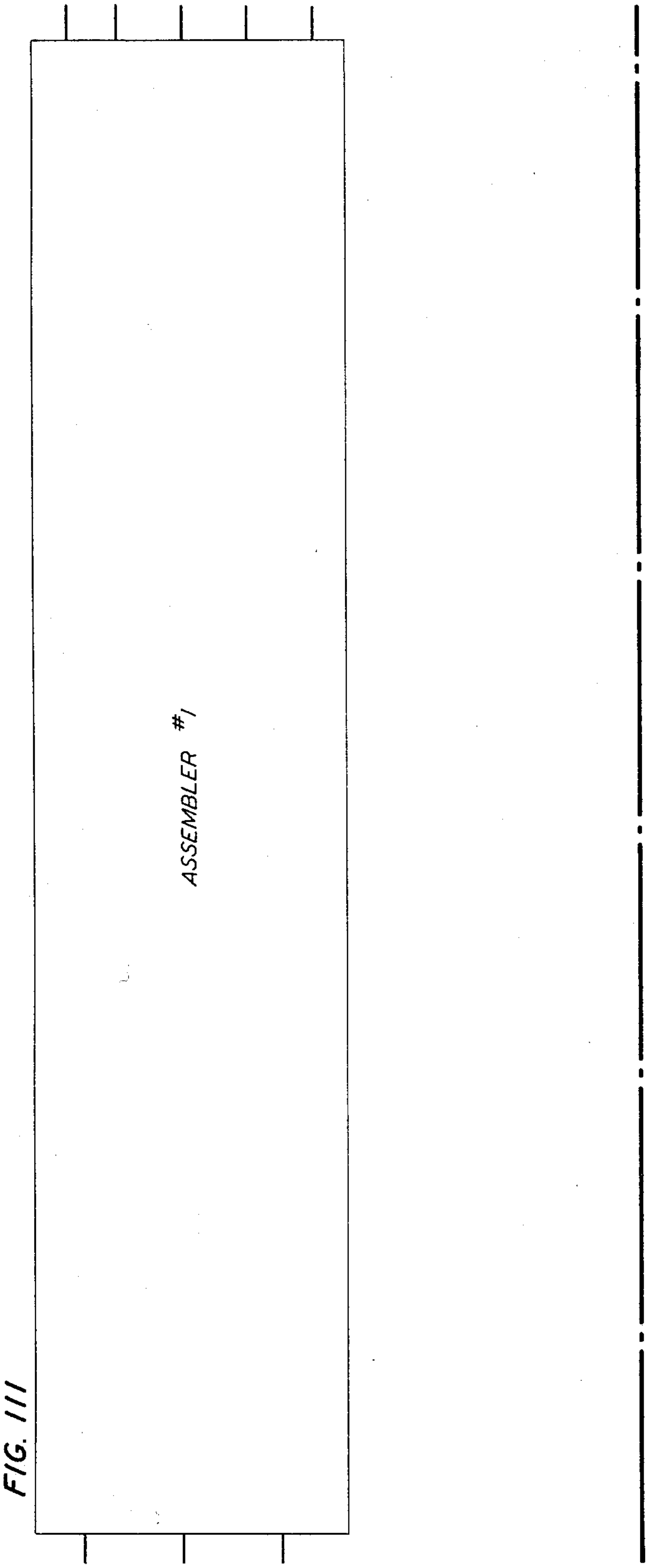
Figure 112:
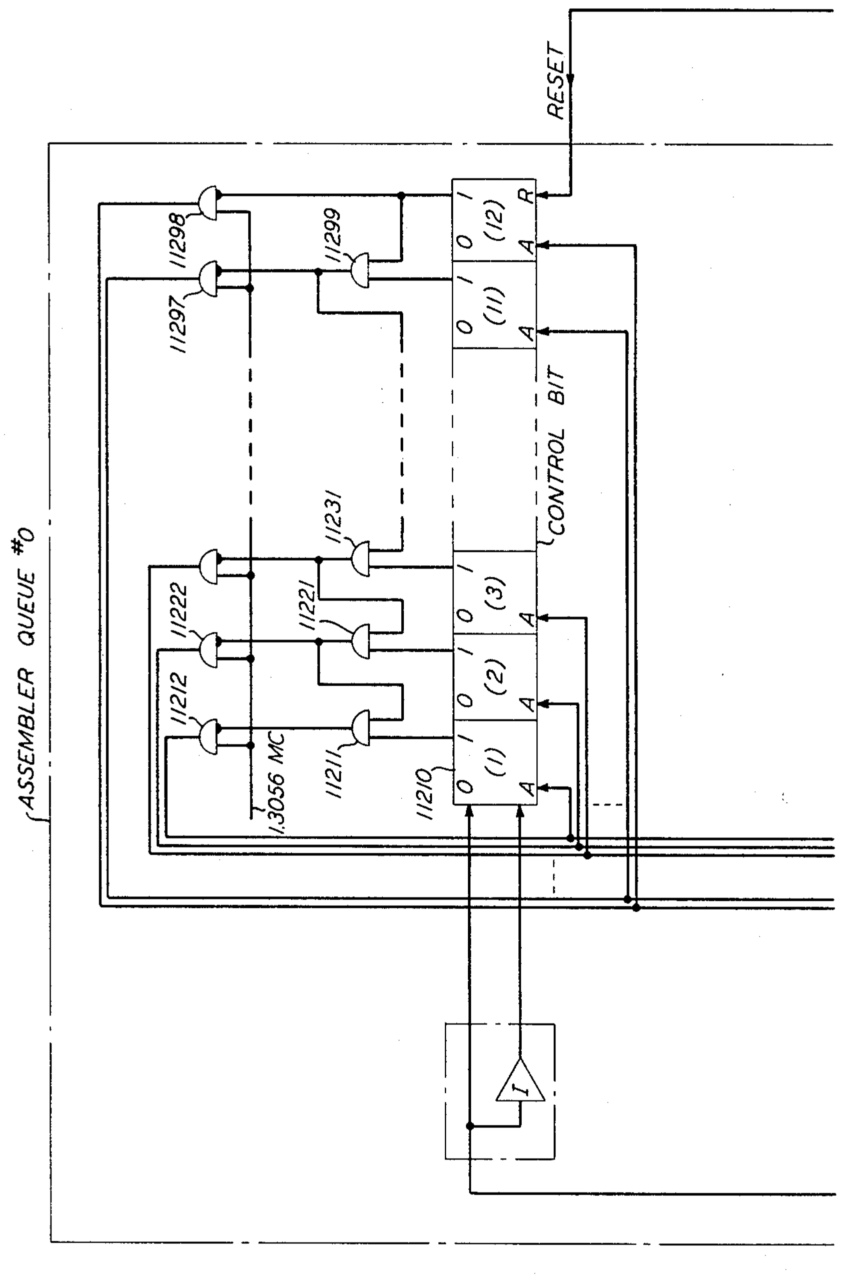
Figure 115:
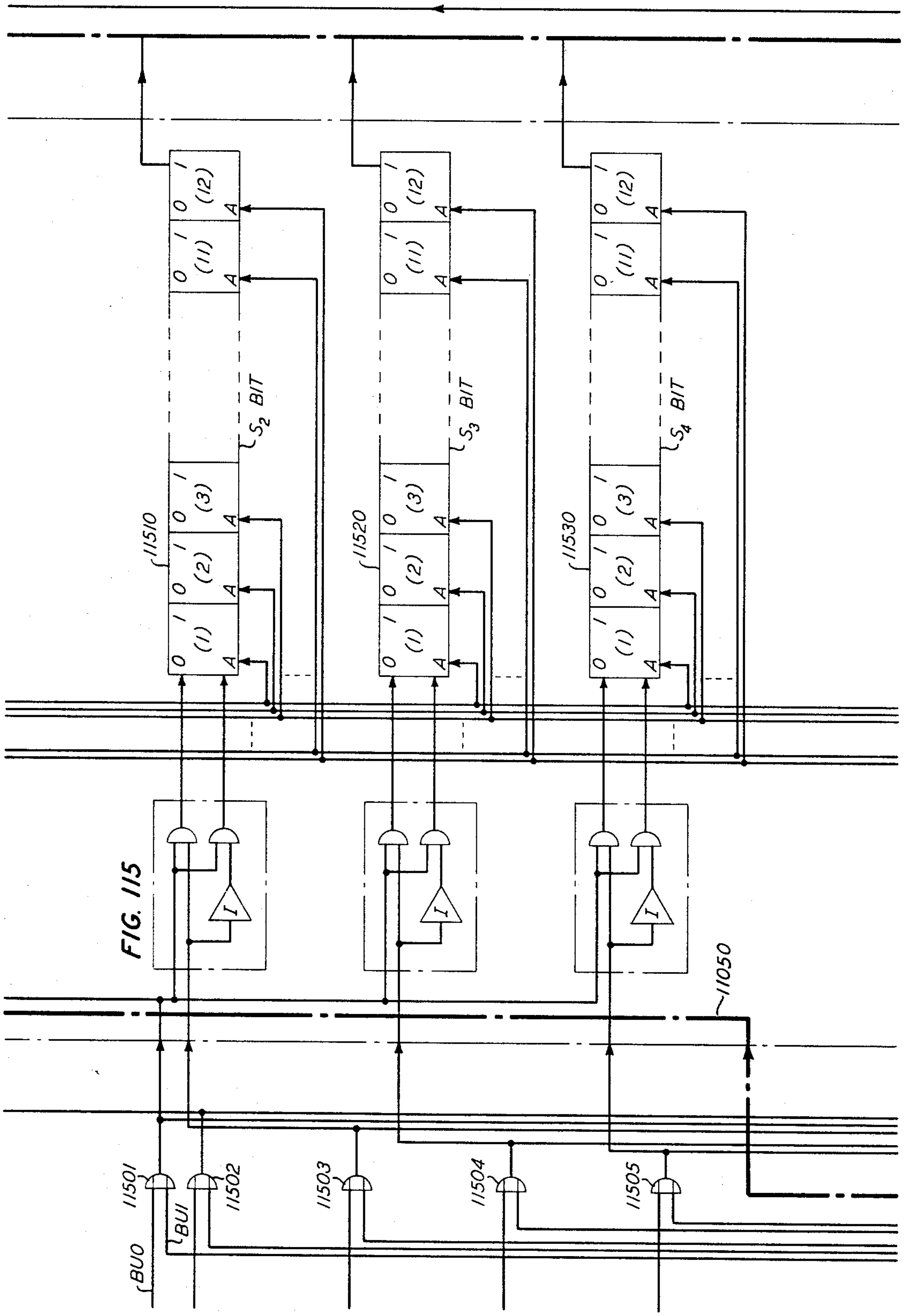

The Assembler shown in FIGS. 108, 110 and 111 of the drawings similarly comprises 68 line terminal circuits, designated T68 through T135. The S-bit data of the subscriber lines and interoffice trunks, connected to the remaining line circuit positions of the switching matrix (i.e., 68 through 127), are respectively connected to the terminal circuits of this second Assembler. It should be noted in this regard that this second Assembler, designated hereinafter Assembler #1, has excess capacity since there are only 127 line circuit positions associated with a matrix module and 68 of these are serviced by the heretofore described Assembler #0. The excess capacity can be used in various manners, e.g., in conjunction with maintenance routines. The terminal circuits T68 through T135 are successively and cyclically scanned in exactly the same fashion as the terminal circuits T0–T67. Here again, the scanner comprises the counter 11000 and translator 11001 which act as a 68 terminal rotary switch. The assembly of the S-bits of a given subscriber in juxtaposition to each other, the transfer logic and word filtering, and the read out of the S-bit codes to the SWQ are all carried out in exactly the same manner as heretofore described. The only difference between Assembler #0 and Assembler #1 is that the read out to the SWQ from the former is carried out in AD$\phi$5, while the read out from Assembler #1 to the SWQ is carried out in AD$\phi$6. As indicated in FIG. 115, the corresponding outputs of the two Assemblers are ORed together in OR gates 11501 through 11505.

*Signal word queue*

The Signal Word Queue (SWQ) provides time buffering between the SA/D and the central processor. It receives S-words from subscriber stations and/or trunks through the SA/D and stores them until the central processor is ready to receive the same; it also receives S-words from the central processor and stores them until the SA/D is ready to accept them for transmission to subscriber line and trunk terminal circuits.

The SWQ consists of two sections, namely the assembler queue and the distributor queue. The assembler queue provides the requisite buffer interface between the Assemblers #0 and #1 and the central processor, while the distributor queue constitutes the buffer interface between the Distributors #0 and #1, to be described hereinafter, and the C.P. The assembler queue will be considered first.

The assembler queue comprises a plurality of registers for storing the S-codes assembled in the pair of Assemblers. A line identity word accompanies each S-code so as to provide an indication to the central processor of the origin of the same. A block bit also accompanies each S-code so as to provide an indication of the Assembler from which the S-code has been derived. Finally, a control or traffic bit is also loaded into the queue for each S-code. As will be described in greater detail hereinafter, the control bit and its associated logic functions in a manner such as to cause each of the S-codes, the associated line identity words and block bits to propagate or advance in the registers in parallel from the entry point to the first unoccupied parallel position; and then, in response to the accessing of the assembler queue by the central processor, to advance to the point of egress, i.e., to the call store receive bus. The name of the unit obviously is derived from the fact that this propagation or advance of the bits in the registers is, in fact, a queuing operation.

Turning now to the drawings, the assembler queue is shown in FIGS. 112 through 116 of the drawings. The assembler queue comprises thirteen shift registers having twelve stages each. A-single-to-double rail gate circuit precedes each input stage and provides destructive read in, as heretofore described. The $S_1$, $S_2$, $S_3$, and $S_4$ bits of assembled S-codes are stored in shift registers 11410, 11510, 11520 and 11530, respectively. For example, the $S_{1n}$ bit heretofore described as being temporarily stored in flip-flop 10911 will be read out of the same during AD$\phi$5 and delivered to the input of the single-to-double-rail gate circuit 11411 via the enabled AND gate 10921 and OR gate 11502. The BU0 block bit generated during AD$\phi$5 serves to enable the AND gates of the double-rail gate circuit 11411 to thereby permit read in of the $S_{1n}$ bit into the input stage of the shift register 11410. In a similar fashion, the S-bits stored in flip-flops 10912, 10913, and 10914 will be read into the input stages of the registers 11510, 11520, and 11530, respectively.

The read in of the S-codes from Assembler #1 to the shift registers 11410, 11510, 11520 and 11530 is carried out in exactly the same fashion as that described. However, the BU1 block bit from Assembler #1 is generated during AD$\phi$6 and hence the latter S-bits are read into their respective shift registers during the AD$\phi$6 pulse period. It is entirely likely that an S-code from Assembler #1 may be read into the shift registers immediately behind the read in of an S-code from Assembler #0, thus there is a need for a further bit to identify the Assembler from which a given S-code has been derived.

The BU1 bit that is generated in Assembler #1 for each new S-code to be loaded into queue is itself coupled to the shift register 11610 via a single-to-double-rail gate circuit. A BU0 bit is of course generated in Assembler #0 for each new S-code to be loaded into queue. However, the BU0 bit is not delivered to the block bit register 11610. Accordingly, if the input stage of register 11610 contains a binary one, it is evident that the S-code simultaneously stored therewith was assembled in Assembler #1; whereas, if a binary zero is so stored, it is evident that the S-code was assembled in Assembler #0.

The BU0 and BU1 block bits are ORed together and delivered to the input of the control bit, shift register 11210 via single-to-double-rail logic. As will be described in greater detail hereinafter, these bits serve as control or traffic bits and with the logic associated with the register 11210 they perform the advance or queuing operation briefly mentioned above.

Figure 113:
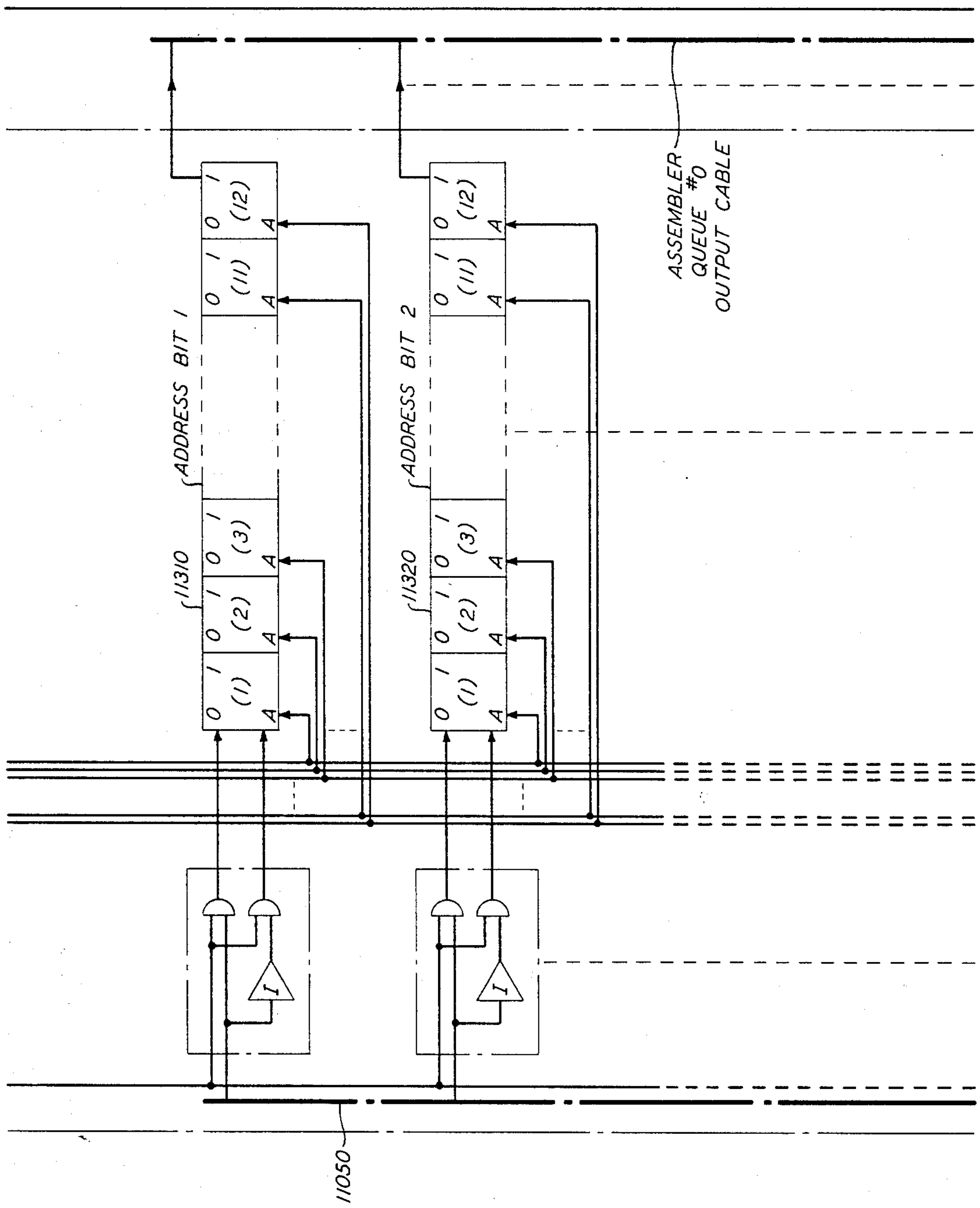
Figure 114:
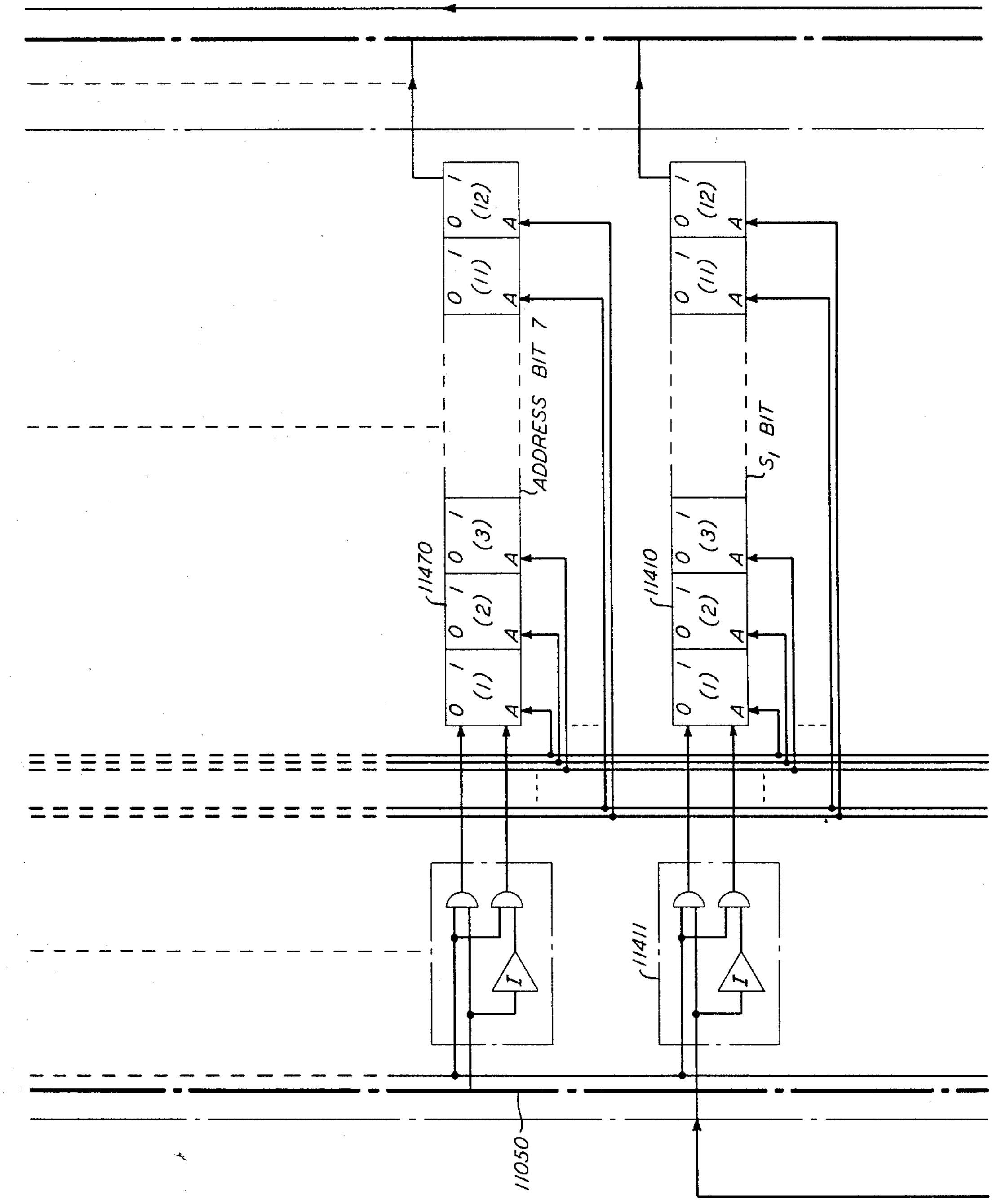

A line identify word must also be simultaneously loaded into the assembler queue so as to identify the origin of a loaded S-code. This line identify word is derived from the 7 stage counter 11000 and it is delivered via the line identity cable 10050 to the seven shift registers shown in abbreviated schematic in FIGS. 113 and 114. As indicated previously, to identify 1-of-68 lines at least 7 address bits are required. These address bits are respectively stored in seven address bit shift registers, as indicated in FIGS. 113 and 114 of the drawings.

The 7 address bits and the block bit loaded into the assembler queue with each S-code thus provide an indication of the originating subscriber line and/or trunk of the S-code.

The term rank, to be used hereinafter, refers to that stage presently occupied by related bits in their respective shift registers. The thirteen registers of the assembler queue each comprise twelve stages; the S-code bits, the associated address bits, and the block bit are read into the registers simultaneously and are advanced together. That is, the S-code bits and related address and block bits all occupy the same rank. The read in of course is initially into the rank [1] stage of the shift registers and the bits are then advanced simultaneously into the second, third, fourth, et cetera, ranks until the first unoccupied rank is encountered. They eventually advance to the twelfth rank or output stage from which they are read onto the call store receive bus.

Turning now to the manner in which the stored bits are queued from the input to output, it will be evident that the storage of a control bit in a given stage of the control bit, shift register 11210 signifies that S-bits, address bits, and a block bit are stored in corresponding rank in the other shift registers; whereas, if a given stage of the control bit register is in its "0" state, no bits are known to be stored in this rank in the other shift registers.

Considering now the logic circuitry associated with shift register 11210, the first eleven ranks thereof (i.e., stages (1) through (11)) each have their (1) output lead connected to the inut of an AND gate, with the other input to the latter being derived from the output of the AND gate of the next higher rank. The output of each AND gate is applied as an inhibit to a second gate, the latter being strobed by the 1.3056 mc. timing waveform from the central timing unit. The output of each of these second, inhibit, gates is respectively applied to the advance terminals of all shift register stages of a given rank. For example, the (1) output lead of the rank (1) stage is applied to the input of AND gate 11211, the other input to this AND gates being derived from the output of AND gate 11221. The output of gate 11211 is, in turn, applied as an inhibit to gate 11212. And the output of gate 11212 is connected to the advance terminals of the rank (1) stages of each of the assembler queue shift registers. Similarly, the (1) output lead of the rank (2) stage of register 11210 is connected to the input of AND gate 11221; the other input to this AND gate is taken from the output of the AND gate 11231 associated with the rank (3) stage of register 11210. The output of AND gate 11221 is applied as an inhibit input to gate 11222 and this gate has its output connected to the advance terminals of the rank (2) stages of each of the shift registers.

The above described pattern of interconnections is the same except for the rank (12) stage. The (1) output lead of the rank (12) stage of the shift register is applied directly as an inhibit to the gate 11298. The output of gate 11298 is connected to the advance terminals of the rank (12) stages of each of the assembler queue, shift registers. The gate 11299 is connected directly to the (1) output lead of the rank (12) stage of shift register 11210.

Considering the operation of the described logic circuitry, let it be assumed that the register ranks (3) through (12) are presently occupied (i.e., data is stored therein), whereas ranks (1) and (2) are "empty." With the rank (2) stage of register 11210 empty, i.e., set to its "0" state, the AND gate 11221 will be disabled and no inhibit will be applied to gate 11222. Correspondingly, the gate 11211 will be disabled and no inhibit will be applied to gate 11212. Accordingly, the next 1.3056 mc. clock pulse will be passed by the gates 11212 and 11222 and advance pulses will be applied to the ranks (1) and (2) of each of the shift registers. If S-code bits and the associated address and block bits are presently being read out of one or the other of the Assemblers, the same will then be advanced into rank (1) of the registers. The rank (2) stage of register 11210 is still empty however; the AND gate 11221 thus remains disabled, the gate 11222 is therefore not inhibited, the AND gate 11211 is still disabled, the gate 11212 is thus not inhibited, and hence the occurrence of the next succeeding 1.3056 mc. clock pulse will result in an advance pulse again being applied to the rank (1) and (2) stages of each of the registers. This then advances the bits stored in the rank (1) stages into the second rank. Since rank (3) and all of the next higher ranks are assumed occupied, the 1.3056 clock pulses are inhibited or prevented from being passed as advance pulses to the third and higher order ranks of the registers.

To summarize this operation, when data bits are advanced into the first rank of the shift registers they are successively advanced to each of the succeeding unoccupied ranks until an occupied rank is encountered.

When the twelfth or output rank of the shift registers are accessed by the central processor and the bits stored therein are read out, the central processor resets the rank (12) stage of the control bit, shift register 11210. With this stage thus reset to its (0) state, the inhibit previously applied to gate 11298 is removed and the AND gate associated with the next lower rank is disabled. This, in turn, removes the inhibit from gate 11297, and since the output of gate 11299 is applied as an input to the AND gate associated with the next lower rank, the latter AND gate is similarly disabled. It should be evident that the AND gates associated with each of the remaining lower ranks are likewise disabled (i.e., the AND gates are interconnected in a manner that achieves a "falling domino's" type operation) and the 1.3056 clock pulses will be applied to the advance terminals of all stages of all shift registers. Thus, if the first eleven ranks are assumed occupied at this time, the bits stored therein are all advanced or queued one rank. As rank (12) of the shift registers is successively accessed under the control of central processor and the rank (12) stage of the control bit shift register is reset subsequent to each accessing, the data stored in the lower ranks of the registers will be successively queued or stepped toward the twelfth rank position.

The data stored in respective ranks of the queue are advanced, under the control of the 1.3056 mc. timing waveform, in .765 microsecond. The central processor utilized herein has a program store access cycle of 6.127 microseconds. The assembler queue is accessed and the data bits, if any, are read out of the twelfth rank in one cycle and into call store in a second cycle. The rank (12) stage of register 11210 is reset during this second cycle. Hence, if the assembler queue is accessed every other cycle, there is more than sufficient time for data stored in the eleventh rank to be advanced into the twelfth rank prior to the next accessing of the assembler queue. The central processor will continue to access the assembler queue until an all zero data word is encountered. This is indicative of the fact that the assembler queue is now empty. When this condition is encountered, the central processor will not access the queue again until approximately 3⅓ milliseconds later. It should be apparent at this point that an assembler queue of twelve ranks should be adequate for most traffic conditions.

Note that the BU0 and BU1 bits deposited in the control bit shift register 11210 are not read out onto the assembler queue output cable. These bits are utilized only for the above-described queuing operation.

Figure 116:
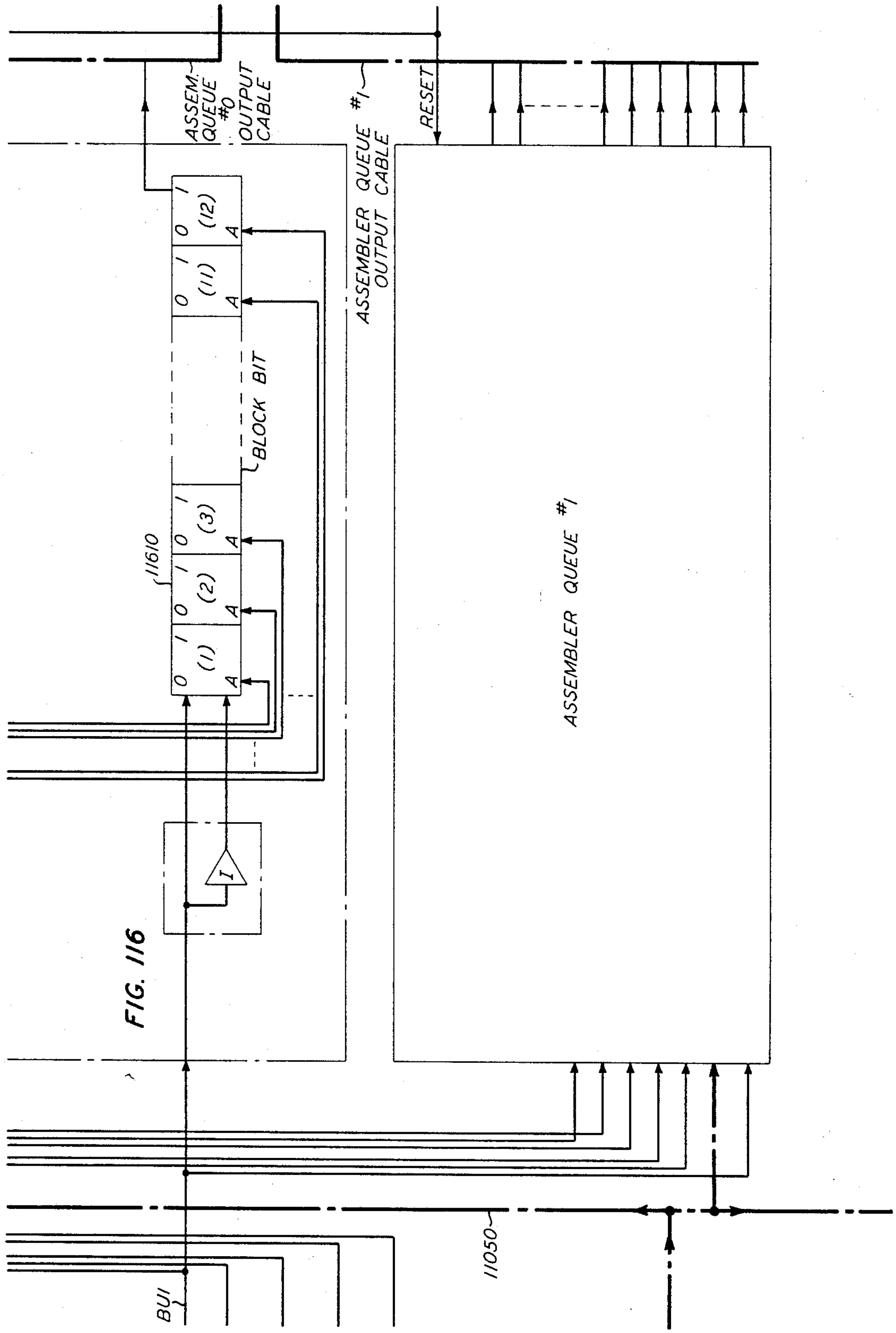
Figure 117:
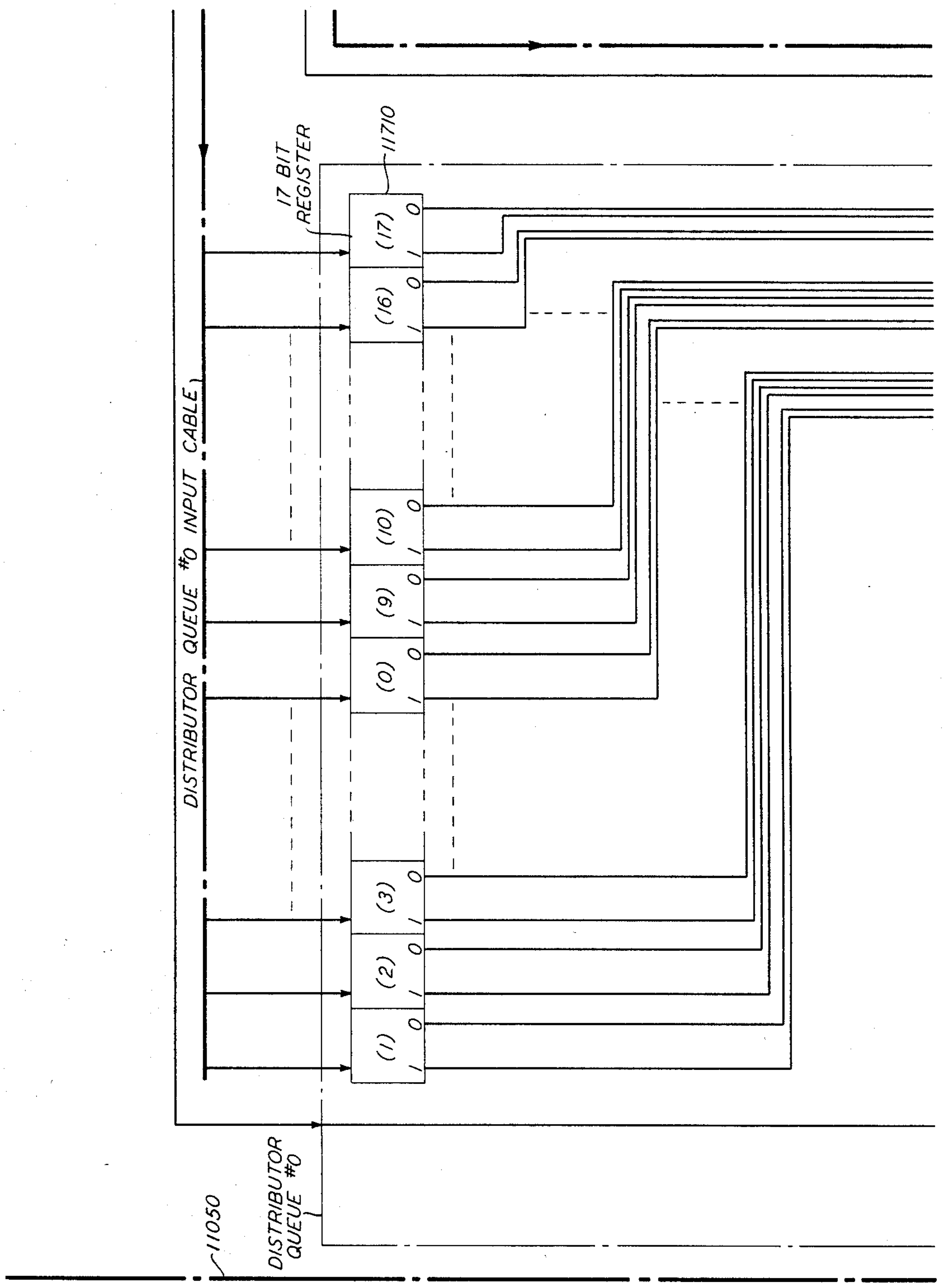

The assembler queue shown in block form in FIG. 116 of the drawings is structurally and functionally identical to the assembler queue of FIGS. 112 through 116. And this second assembler queue, designated hereinafter as assembler queue #1, receives the same data as the assembler queue #0, heretofore described. As will later be evident, for normal operation the signaling information identically stored in assembler queue's #0 and 1 are respectively delivered to independent common controls; the latter carry on the same work functions on the basis of the duplicate input information. A high order of system reliability is thereby achieved.

The distributor queue operates in a manner similar to the assembler queue, except that its registers are loaded from a distributor queue input cable and the same are unloaded to the signal or S-bit Distributors. The distributor queue comprises a plurality of registers for storing the S-codes intended for given subscriber lines and/or trunks. Here again, a line identity word and a block bit accompany the S-bit data deposited in the distributor queue. The line identity word, comprised of 7 address bits, and the block bit are indicative of the specific line or trunk to which the stored S-bit data is intended. A traffic or control bit accompanies the above described data and here again it is utilized to advance or queue the stored data to the first unoccupied rank or position in the registers and then eventually to the point of egress. The timing of the unload operation is determined by detecting a match condition between the address bits stored in the distributor queue and the appropriate line identity word from the 7-stage counter 11000. As in the case of the assembler queue, traffic bits only appear when there is meaningful data loaded in the distributor queue registers.

Turning now more specifically to the drawings, a distributor queue is shown in detail in FIGS. 117, 118, 119 and 120. The distributor queue comprises seventeen shift registers having four stages each. The data from the central processor is initially deposited in the 17-bit register 11710. As will be seen from the drawings, each stage of the latter register has its (1) and (0) output leads coupled to the input of a respective one of the seventeen shift registers. The central processor loads the 17-bit register 11710 during the second half cycle of the 300 c.p.s. timing waveform of the central timing unit. As will be more evident hereinafter, read out from the distributor quene occurs during a predetermined portion of the first half cycle of the 300 c.p.s. waveform. Thus, the read in and read out operations are staggered with respect to each other. The 17-bit register 11710 is loaded from the distributor queue input cable by means of destructive read in. Data can be loaded every other 6.127 microsecond cycle of the central processor. The central processor will fill the four ranks of the distributor queue registers in rapid succession and then wait until the next program interrupt cycle (every 3⅓ microseconds) before again loading data into the queue. Since the (1) and (0) output leads of each stage of register 11710 are coupled to the input stage of respective shift registers, there is no need in this instance for single-to-double-rail input logic circuitry.

As in the case of the assembler queue, the distributor queue registers can be considered as being arranged in a plurality of ranks—four ranks in this case—with the associated S-bits and their accompanying address and block bits all occupying the same rank in the registers. Eight S-bits are loaded and stored at a time in the eight registers 11810 and 11920 through 11980. Thus a complete discrete S-word comprising two 4-bit S-codes is loaded into the distributor queue and, as in the case of the assembler queue, specific registers are assigned on a permanent basis to specific S-bits. For example, the first 4-bit S-code is assigned to the first four S-bit registers, with the second 4-bit S-code assigned to the last four. In the case of steady state words, the same are stored in the first four S-bit registers, while all zeros are deposited in the remaining S-bit registers.

A line identity word is also simultaneously loaded into the distributor queue so as to identify the intended origin of the stored S-word. To identify 1-of-68 subscriber lines and/or trunks served by a given Distributor, 7 address bits are required. These address bits are respectively stored in the seven address bit registers 11911 and 11921 through 12071. The address bits are address ordered, that is, they are successively loaded into the address bit registers in numerical order from the lowest to highest numbered address. This address ordering is carried out by a sorting program of the central processor. Sorting programs of this nature are quite common in the art, any of which may be advantageously used to this end; see "Programming and Coding Digital Computers" by Philip M. Sherman, John Wiley & Sons, Inc. (1963), pages 334–340.

The block bit is used to designate the Distributor to which given stored S-words are to be routed. The block bit is stored in the shift register 12080. To designate the Distributor #0, a binary zero is read into shift register 12080; whereas, a binary one is read in to designate Distributor #1. The aforementioned sorting program carries out one further operation. It is entirely possible that the same line identity word will be stored in successive ranks of the address bit shift registers. These similar line identity words, however, have reference to different subscriber lines, which are being served by different Distributors. This will be "recorded" in the block bit shift register 12080 by the two stages of the successive ranks being set to different states, namely, a binary zero state followed by a binary one. Thus, if two successive ranks of the address bit shift registers contain the same line identity word, as is entirely possible, then the S-bits intended for the subscriber line served by Distributor #0 will always be loaded so as to precede the S-bits at the other subscriber line, having the same line identity word but being served by Distributor #1. That is, in the instance of successive ranks containing the same line identity word, the sorting is such that a zero bit will precede a one bit in the block bit shift register 12080.

The control or traffic bits, that accompany each data read in to the distributor queue, are stored in the control bit shift register 11850. The presence of a control bit in a given rank of register 11850 signifies that S-bits and the accompanying address and block bit are stored in corresponding rank in the other shift registers. Here again, the control bits are utilized to perform queuing.

The control bit shift register, the logic connected thereto, and the operation of the same all correspond to the queuing circuitry of the assembler queue. The (1) output lead of each stage of the four stage shift register 11850 is coupled as an inhibiting input to respective inhibit gates 11851 through 11854. In the case of the first three stages of the register, the (1) output lead is coupled to the inhibit input via respective AND gates 11862 through 11864. The other input to these AND gates is derived from the output of the next higher ranked stage. For example, AND gate 11862 is connected directly to the (1) output leads of the stages labeled (3) and (4). The AND gate 11863 is connected directly to the (1) output lead of stage (2), with its other input connected to the output of the AND gate 11862 associated with stage (3). The connections for AND gate 11864 correspond to those of AND gate 11863. The gates 11851 through 11854 are strobed by the 1.3056 mc. clock pulses. These clock pulses are applied as advance shift pulses to one or more of the ranks of the shift registers, should one or more of the gates 11851–11854 not be inhibited. For example, after the read out of the stored data from the rank (4) stages of the shift registers, the output or rank (4) stage of register 11850 will be reset to its "0" state in a manner to be described. This removes the inhibit from gate 11851. The AND gate 11862 is, of course, now disabled and hence no inhibit can be applied to gate 11852. With the AND gate 11862 disabled, the AND gates 11863 and 11864 are likewise disabled and thus the gates 11853 and 11854 are also no longer inhibited. The next 1.3056 mc. clock pulse is passed by gates 11851 through 11854 and the same is applied to the advance terminals of each of the stages of each of the shift registers. In this manner the data successively stored in ranks (3), (2) and (1) are advanced or queued one rank toward the output or point of egress. This operation will be repeated each time the rank (4) stage of register 11850 is reset subsequent to a read out. The operation continues, of course, until all of the data is read out of the storage registers.

The 7 stored address bits comprising a line identity word are delivered to the address match circuit 11800, as is the 7-bit line identity word derived from a seven stage counter, such as counter 11000. With one possible minor exception to be covered hereinafter, the address match circuit corresponds to the time slot comparison circuit 8700 shown in FIGS. 87, 88, 94 and 95 of the drawings. Briefly, the address match circuit compares the address information staticized in the distributor queue with the 7-bit line identity word generated in the counter, and when there is a match therebetween, an output energizing signal is provided by the address match circuit. Structurally and functionally this match circuit is the same as the above-noted time slot comparison circuit 8700 and hence a detailed showing and explanation of the match circuit does not appear warranted.

For Distributor timing reasons which will be more evident hereinafter, it is desirable that the read out of the S-bits to a Distributor occur only once per every eight 2.4 kc. periods. To this end, the 300 c.p.s., 600 c.p.s. and 1.2 kc. timing waveforms from the central timing unit are applied to the input of AND gate 11801. The output of this AND gate is in turn applied as an input to AND gate 11802, the other input to the latter being derived from the rank (4) stage of shift register 11850. The inhibit input to gate 11802 will be explained in greater detail hereinafter and the same can be disregarded at this time. The output of AND gate 11802 comprises one of the enabling inputs to the read out gates 11901 and 12001. This being the case, read out from the distributor queue can occur only once for every eight 2.4 kc. periods. This is due to the fact that one or more of the 300 c.p.s., 600 c.p.s. and 1.2 kc. waveforms are negated, i.e., of reverse polarity, for the remaining 2.4 kc. periods.

Figure 118:
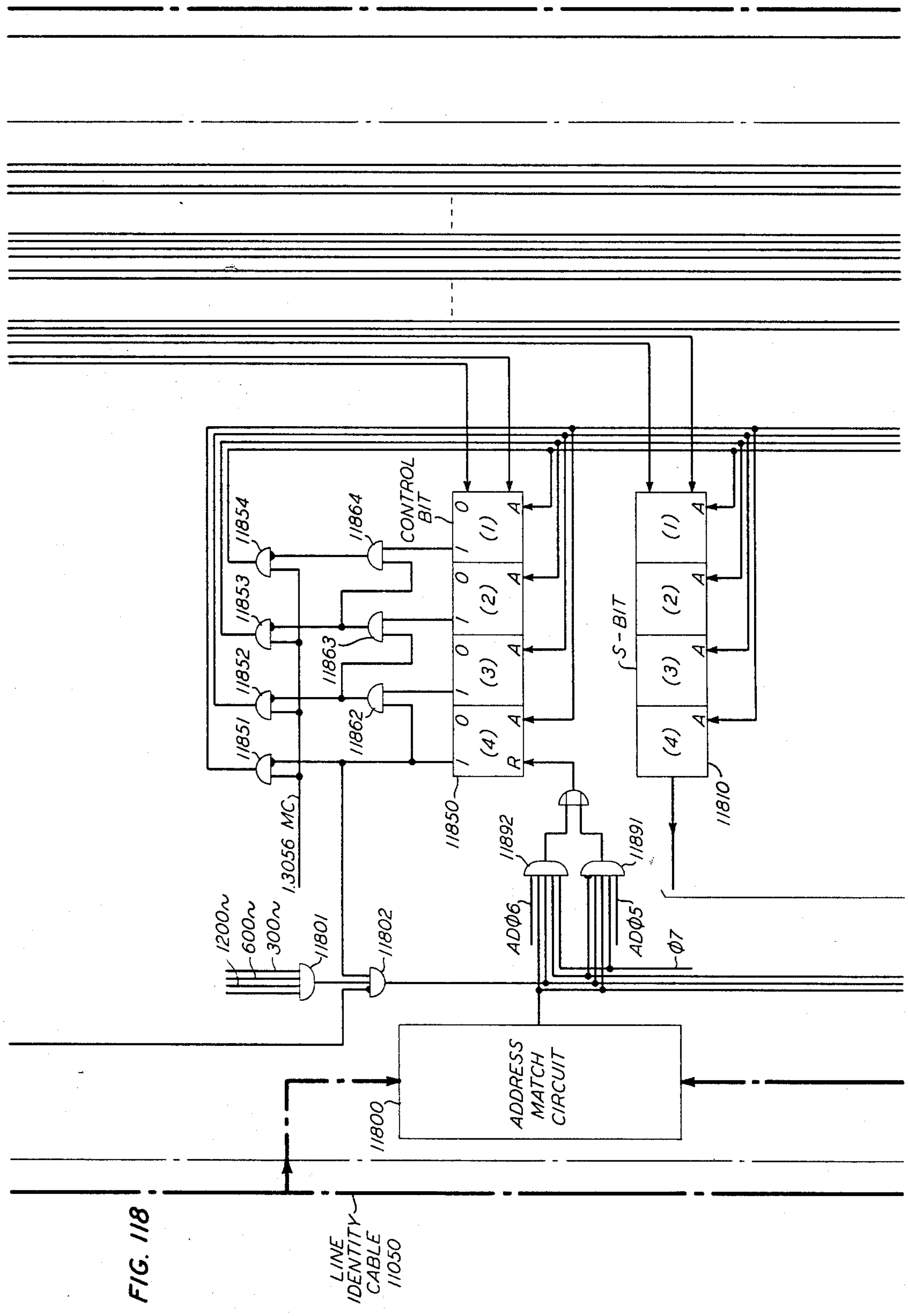
Figure 119:
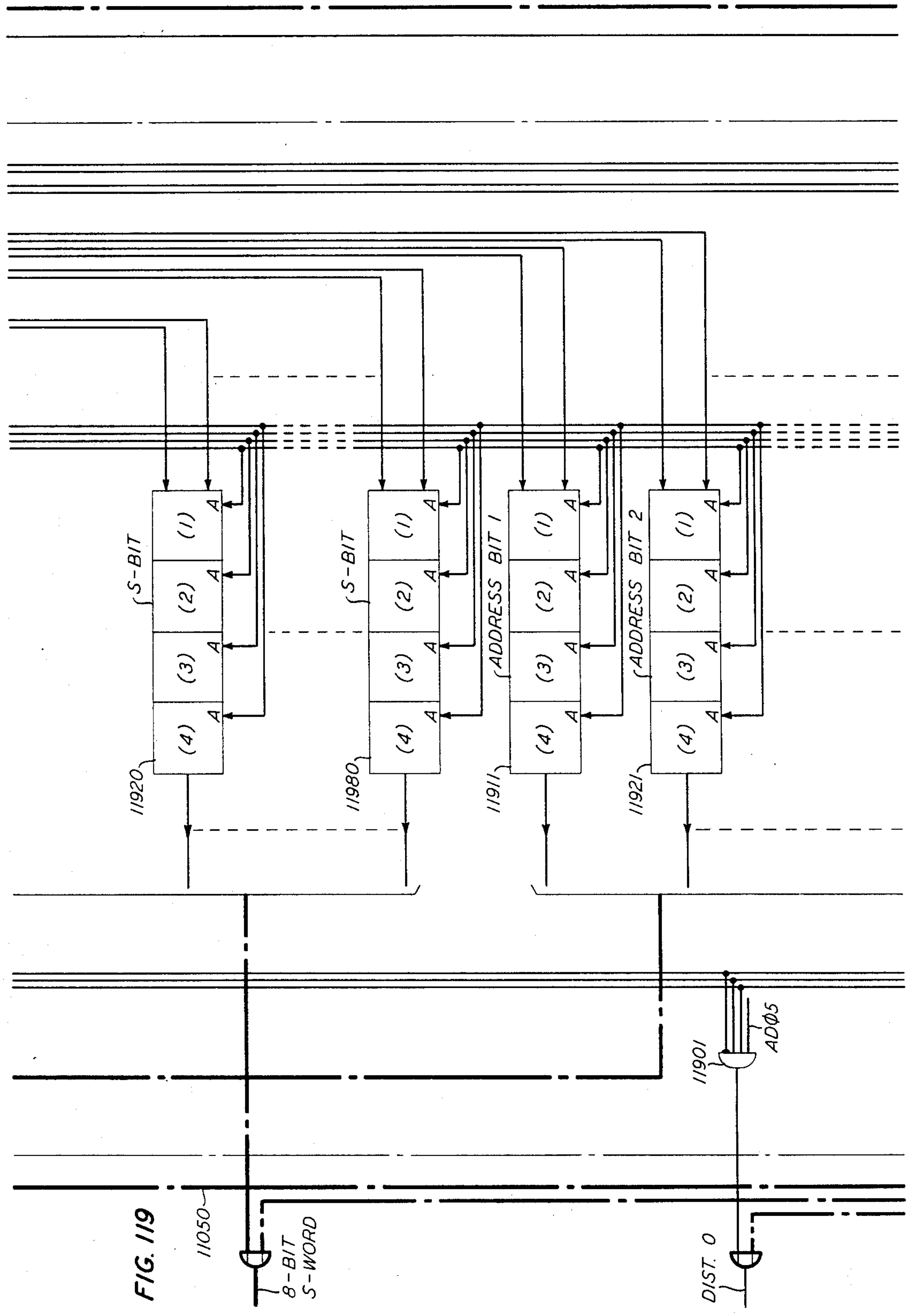

For purposes of explanation let it be assumed that an S-word intended for Distributor #0 is stored in rank (4) of the eight S-bit registers shown in FIGS. 118 and 119. The address of the subscriber line or interoffice trunk to which the S-word is to be routed is stored in the rank (4) stages of the 7 address bit registers 11911 and 12021 through 12071. A binary zero is stored in the rank (4) stage of register 12080 and, of course, the control bit appears in the same rank in register 11850. It can be assumed that the AND gate 11801 is presently enabled, i.e., we are operating in the read out 2.4 kc. period. When the line address word stored in the distributor queue matches the line identity word then being generated by the 7-stage counter 11000, the address match circuit 11800 will deliver an enabling signal to the gates 11901 and 12001. With AND gate 11801 enabled and a control bit stored in the rank (4) stage of register 11850, the AND gate 11802 will be fully enabled to thereby also deliver an enabling input to gates 11901 and 12001. The (1) output lead of the rank (4) stage of block bit register 12080 is applied as an inhibit input to gate 11901 and as an enabling input to the gate 12001. However, with a binary zero stored in this rank (4) stage, the inhibit will be removed from gate 11901 thereby allowing the same to be fully enabled, while the gate 12001 will be disabled. Thus, with the inhibit removed from gate 11901 and the address match circuit 11800 and the output of AND gate 11802 delivering enabling inputs thereto, the occurrence of the AD$\phi$5 pulse during the appropriate address interval will deliver an energizing signal to the output lead labeled DIST 0. The latter lead is coupled as an enabling input to the bank of AND gates 12601 through 12608. The other input to each of these AND gates is derived from the respective S-bit storage registers. Thus an energizing signal from gate 11901 reads the S-word stored in rank (4) of the S-bit registers into the flip-flops 12611 through 12618.

With the exception of the $\phi$7 high frequency strobe pulses, the inputs to gates 11891 and 11892 correspond exactly to the inputs to gates 11901 and 12001, respectively. According, after the passage of an amount of time sufficient to permit the above-described read out, a $\phi$7 pulse occurs and causes an energizing signal to be delivered from the output of gate 11891 to the reset terminal of the rank (4) stage of the control bit shift register. This causes the data, if any, in the succeeding ranks to be advanced or queued toward the output end of the registers.

If the next succeeding S-word advanced into rank (4) of the registers is intended for a line terminal circuit associated with Distributor #1, a binary one (i.e., BU1) will appear in the rank (4) stage of the block bit shift register 12080. This stored binary one serves to inhibit the gate 11901, while enabling the gate 12001. During the appropriate address interval an address match takes place in match circuit 11800 and the same thereby delivers an energizing signal to the gate 12001. As indicated hereinbefore, the gate 11801 is enabled for a 416⅔ microsecond interval (i.e., one 2.4 kc. period) and the described queue operation takes place in .765 microsecond. Accordingly, the gate 11801 remains energized for a period sufficient to accomplish the read out of four ranks of S-bit data. With the gate 11801, therefore, still energized and a control bit in the rank (4) stage of register 11850, an energized output signal from AND gate 11802 will be applied to gate 12001. Thus, during AD$\phi$6 of the appropriate address interval the S-word stored in the S-bit registers will be read out therefrom and into a bank of eight flip-flops in Distributor #1. The bank of flip-flops in the latter Distributor and the read in thereto are the same as heretofore described.

A $\phi$7 high frequency timing pulse occurs near the end of AD$\phi$6 and it serves to strobe a reset signal from gate 11892 to the rank (4) stage of the control bit register. The data stored in the succeeding ranks of the register are then once again advanced toward the output end and the described operation is repeated.

After the 4 ranks of S-bit data have been read out to the distributor and/or distributors, no further meaningful operation occurs within the distributor queue until the registers thereof are once again loaded from the central processor.

Figure 120:
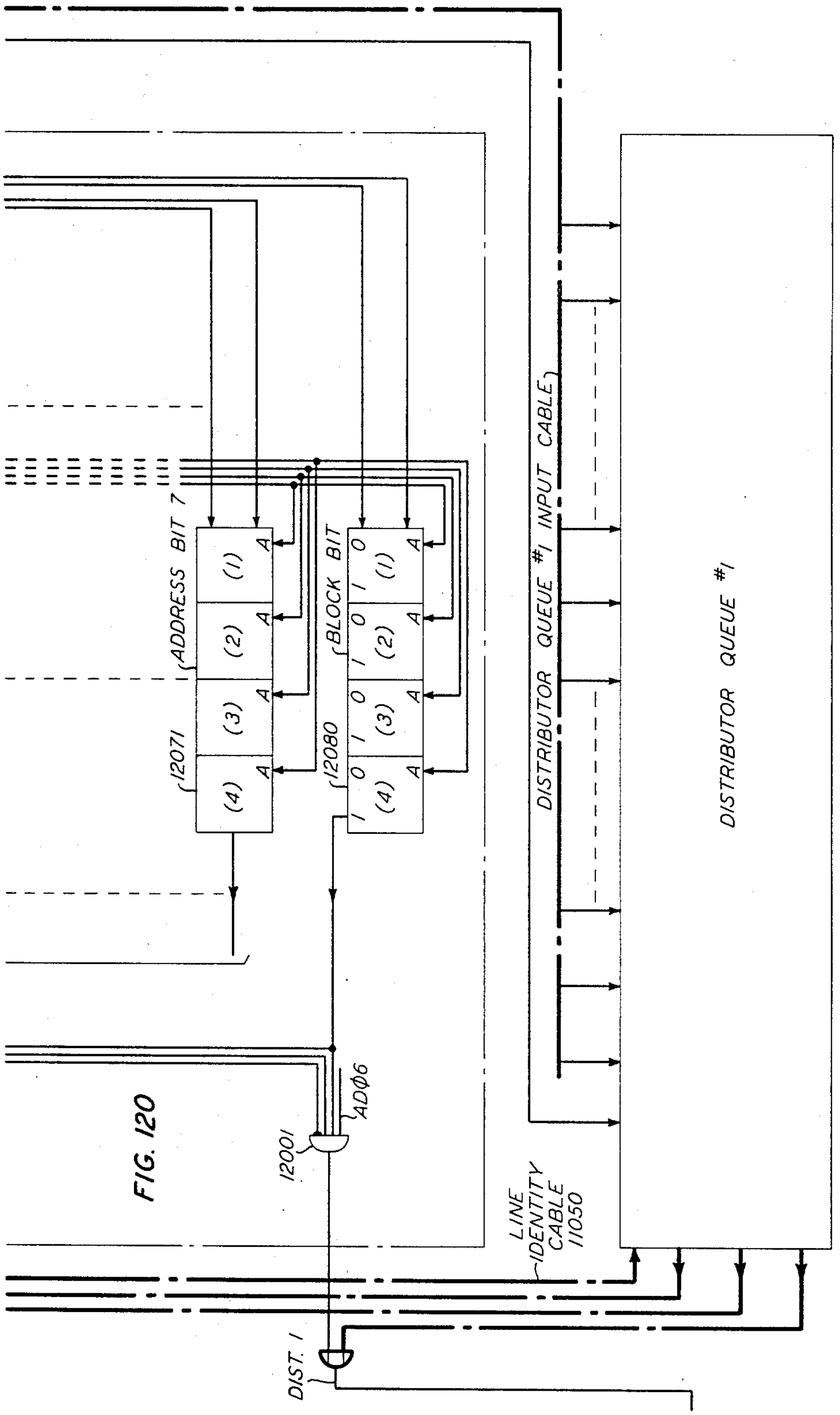
Figure 121:
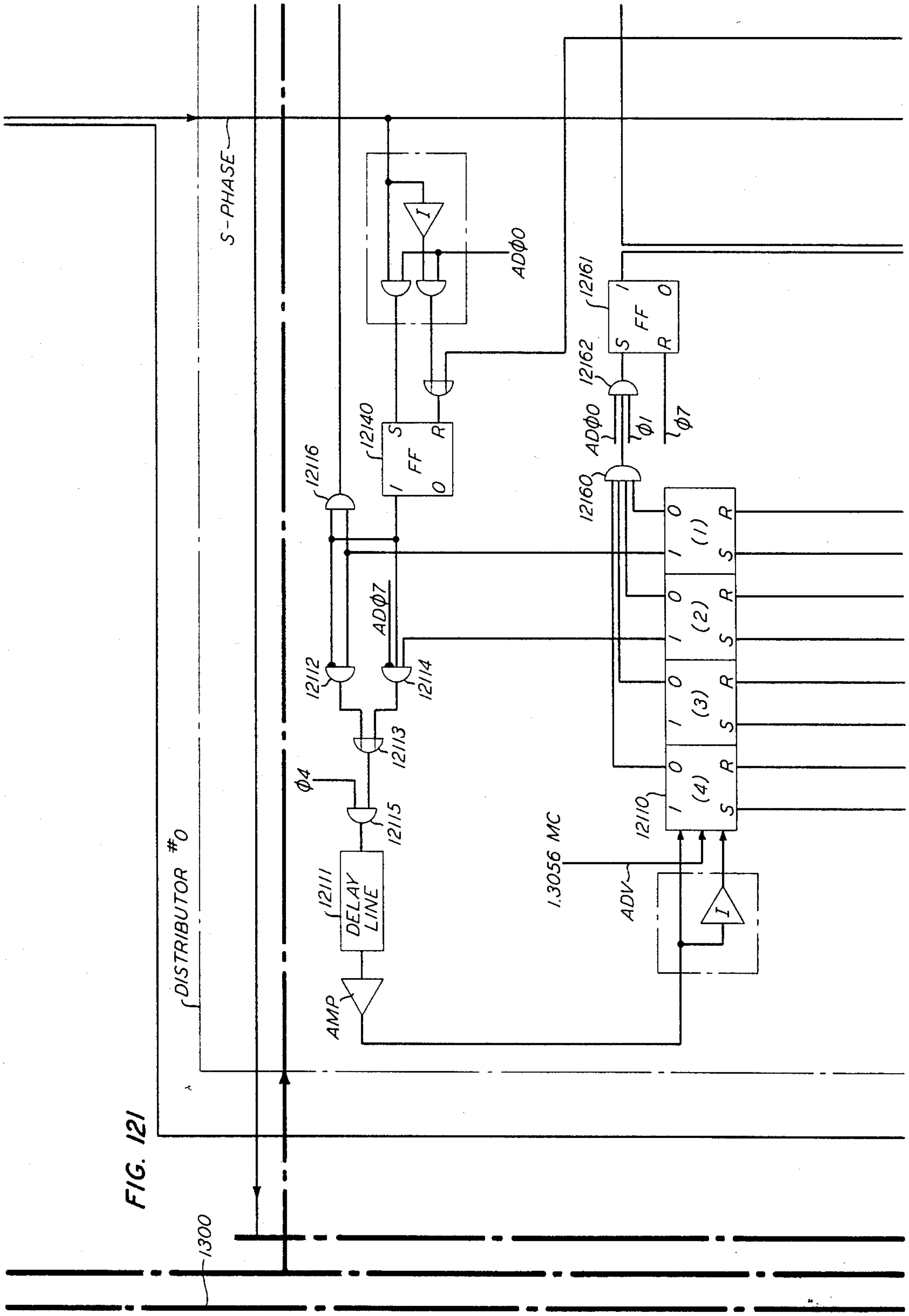
Figure 122:
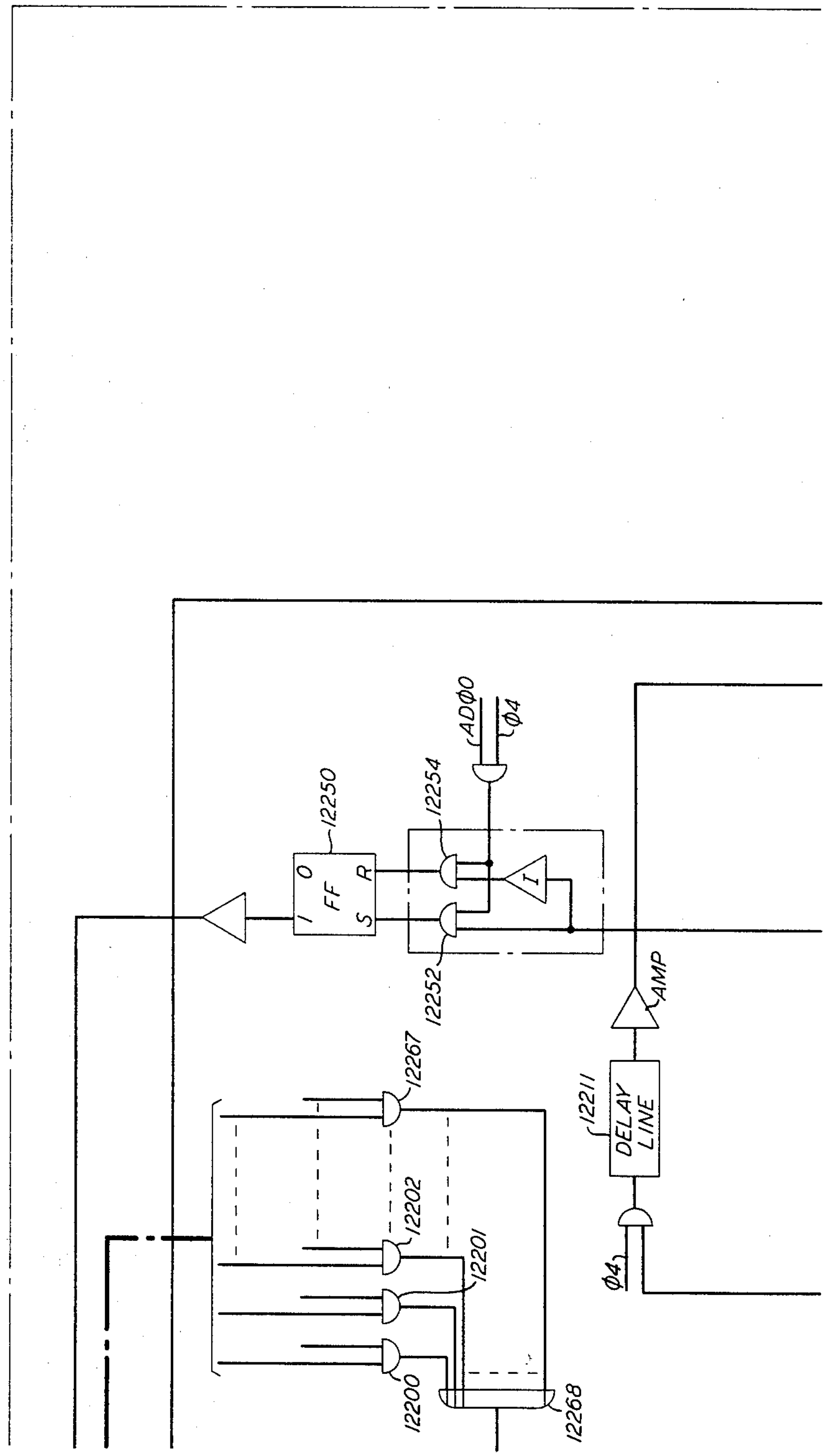
Figure 123:
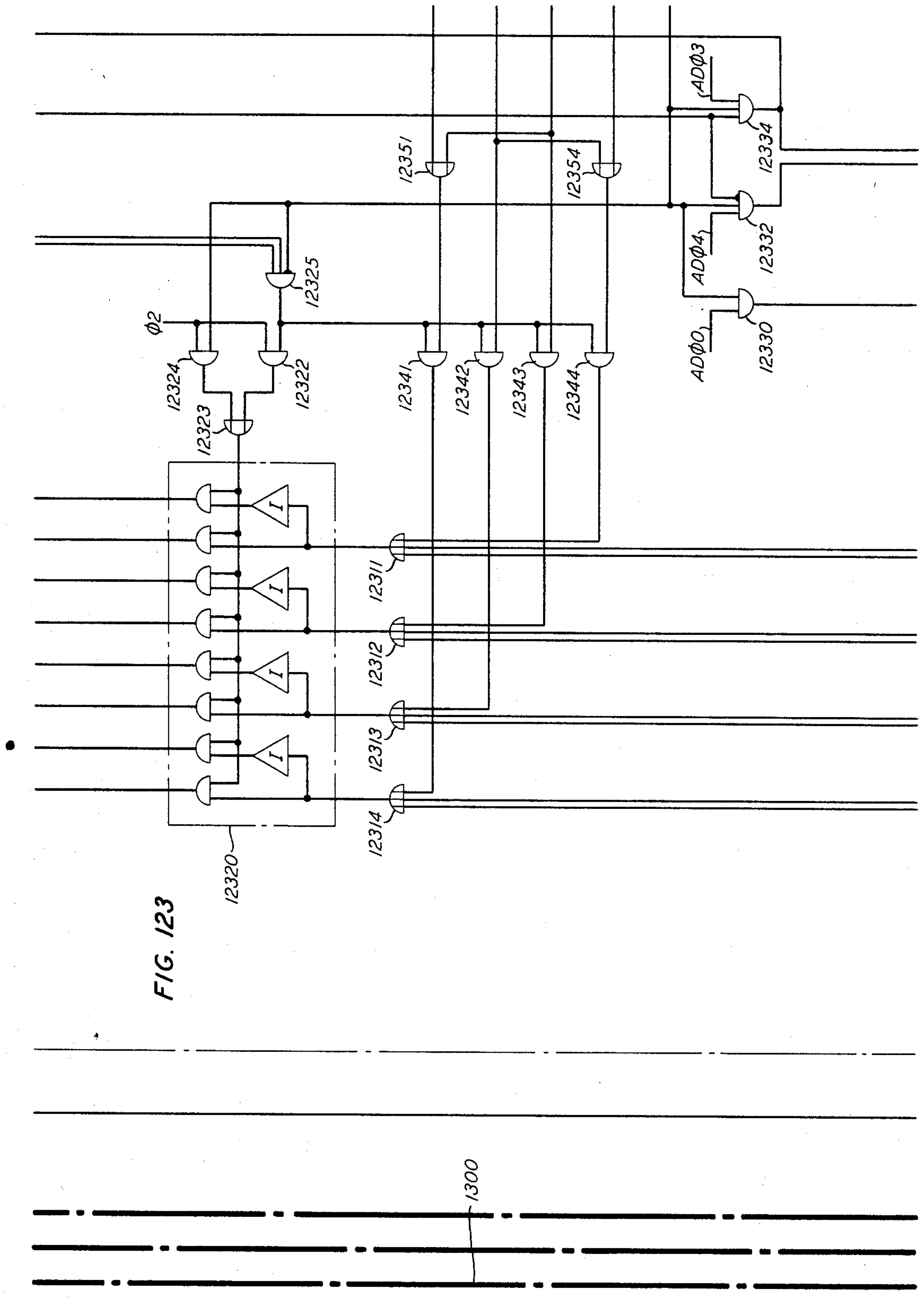

The distributor queue shown in block form in FIG. 120 of the drawings is structurally and functionally identical to the distributor queue of FIGS. 117 through 120. And this second distributor queue, designated hereinafter as distributor queue #1, receives the same data from the central processor as the distributor queue #0, heretofore described. As shown in the drawings, the outputs of the distributor queue #0 and 1 are ORed together and then delivered to the signal distributors.

*Signal word distributor*

The Signal Word Distributor performs a translation operation between the parallel S-bits originating at the central processor and the serial S-bits required by the transmission lines and trunks. The Distributor also serves to send steady state S-words on a continuous basis, thus relieving the central processor of this burden. The steady state word to be sent on a given line is written into the Distributor via the SWQ and the Distributor repeats it from then on until changed. In contrast, discrete S-words are sent only once, overriding the steady state transmission for a pair of frames, followed again by the steady state transmission.

As with the S-bit assembly operation, the S-bit distribution relies upon a dynamic storage arrangement comprising a delay line and a shift register connected in a loop configuration. For example, the S-bit Distributor #0 of FIGS. 121 through 126 of the drawings comprises a four stage shift register 12110 and a delay line 12111 connected end to end in a loop configuration, i.e., the output of the shift register is connected via logic circuitry to the input of the delay line and the output of the delay line is connected to the input of the register. Here again, the delay line may be similar to those used in the Link Control Units with one exception. The total delay is the same, 416⅔ microseconds, duration, which permits the storage of 544 bits in 544 time slots, but four bits at a time are made available in the shift register with the delay line shortened accordingly. The time spacing for each bit is .765 microsecond or one AD$\phi$ interval (i.e., one time slot). The delay line is driven each bit time by a $\phi$4 high frequency phase signal. The bits in the shift register are advanced by the 1.3056 mc. timing waveform derived from the central timing unit. The S-bits, therefore, remain in each stage of the shift register for a duration equal to one time slot or .765 microsecond.

As will be described in greater detail hereinafter, the eight S-bits comprising a discrete S-word are loaded into the delay loop in two steps, four bits at a time in parallel into the eight assigned address phase time slots and comprise a given address interval. The bits are then serially read out of the delay loop under the control of the appropriate Rate or S-phase signals. Each time an S-bit is read out through an extract gate in a given address interval, a precessional switch operates in a manner similar to the assembler precessional switch arrangement to thereby move the remaining S-bits ahead one time slot in the given or assigned address interval. In this case, zeros are inserted behind the remaining bits of a stored word and after an interval of two frames the delay loop is empty within the given address interval.

The distribution operation further relies upon a control delay loop which also comprises a delay line and a shift register connected in a loop configuration. For example, the S-bit Distributor of FIGS. 121 through 126 comprises a four stage shift register 12410 and a delay line 12211 connected end to end in loop configuration. Here again, the delay line may be similar to those used in the Link Control Units, again with one exception. The total loop delay is the same, 416⅔ microseconds' duration, which permits storage of 544 bits in 544 possible time slots, but four bits at a time are made available in the shift register with the delay line shortened accordingly.

The primary function performed by the control delay loop is to supply steady state words to the above-described distributor precessional delay loop in the absence of S-bit data words from the queue. Upon receipt of a 4-bit steady state code from the queue, originating at the central processor, a steady state detector detects the same and loads the control delay loop in selected time slots with a 2-bit code representing the particular steady state. This occurs along with the loading of the precessional delay loop. When a new frame occurs and there is no new S-bit data information for a given address, the control delay loop is read and a steady state word is generated and loaded into the distributor precessional delay loop. The steady state 4-bit S-words are read out of, as well as processed in, the precessional delay loop in the same manner as are the 8-bit discrete S-codes.

Turning now more specifically to the drawings, the Signal Distributor shown in FIGS. 121 through 126 serves the send side of the 68 subscriber lines and interoffice trunks connected to the first 68 line circuit positions of the switching matrix. This Distributor, therefore, and the Assembler of FIGS. 104–7 and 109 comprise the SA/D unit coupled to the first 68 line terminal circuits, 0 through 67.

The flip-flop 12450 is set to its "1" state as each new S-word is deposited in the buffer unit comprised of flip-flops 12611 through 12618. The (1) output lead of flip-flop 12450 is coupled as an enabling input to the gates 12330, 12332 and 12334. Thus with an S-word deposited in the flip-flop buffer, the occurrence of the very next AD$\phi$0 pulse will deliver an enabling input from AND gate 12330 to the AND gates 12501 through 12504 and this reads the S-bits stored in flip-flops 12611 through 12614 into the four stages of the shift register 12110 via single-to-double-rail-gate circuitry 12320. The AND gate 12324 is also coupled to the (1) output lead of flip-flop 12450, with the other input to the AND gate being the designated $\phi$2 high frequency timing pulses. The output of AND gate 12324 is applied via OR gate 12323 to the input of each of the AND gates of the single-to-double-rail-gate circuitry 12320. Thus, the four S-bits are read into the respective stages of the shift register 12110 during AD$\phi$0, $\phi$2. Following the read in of this 4-bit S-code into the shift register 12110, one of two possible modes of operation will occur, these being dependent upon whether the 4-bit S-code comprises part of a discrete S-word or, alternatively, constitutes a steady state S-word. Accordingly, for purposes of explanation, it shall first be assumed that the S-bits to be distributed comprise a discrete S-word. This will then be followed by an explanation of the Distributor operation upon steady state S-words.

The above-described read in of the S-bits into the distributor precessional delay loop, comprised of shift register 12110 and delay line 12111, occurs during AD$\phi$0 of the address interval assigned to the subscriber line or trunk to which the S-bits are to be sent. This being the case, it will be apparent that the S-bits must be read into the flip-flops 12611 through 12618 in the address interval immediately preceding the aforementioned assigned address interval. This can be readily accomplished in any one of several alternative manners. For example, the 7-bit line identity word delivered to the address match circuit 11800 can be derived from a seven stage counter (not shown) that corresponds to the seven stage counter 11000 but is advanced in phase with respect thereto by one address interval (i.e., one cycle of the 163.2 kc. waveform). This will provide an address match situation, as heretofore described, but this address match will occur one address interval preceding the address interval of interest. Alternatively, the address match circuitry can be readily modified, in a manner which should be apparent to one skilled in the art, such that an address match is arrived at one address interval prior to the address interval designated by the seven address bits stored in the seven address bit registers 11911 and 12021 through 12071.

Consider now the case wherein an 8-bit discrete S-word is stored in flip-flops 12611 through 12618. The 4-bit S-code stored in flip-flops 12611 through 12614 is read out therefrom and deposited in respective stages of the shift register 12110 in the manner described. These bits are then either strobed or read into the delay line 12111 by the $\phi$4 timing pulses applied to AND gate 12115 or, alternatively, the least significant S-bit is immediately read out and the other bits processed in a manner to be described hereinafter. The S-bit read out and accompanying S-bit precession is determined by the presence of an S-phase signal from the OR gate 10475 during the given address interval. The output of the concentrating OR gate 10475 is delivered to the set terminal of flip-flop 12140 via a single-to-double-rail gate circuit. The (1) output lead of flip-flop 12140 is applied as an inhibit input to gate 12112 and as an enabling input to gates 12114 and 12116. Assume for the present there is no S-phase output signal from OR gate 10475 during the given address interval in which the S-bits are strobed into the shift register 12110. This being the case, flip-flop 12140 is in its "0" state. The gate 12112 is therefore not inhibited, and the least significant S-bit of the first 4-bit S-code is read out of stage (1) of the shift register and into the delay line 12111 via the gate 12112, the OR gate 12113 and the AND gate 12115, the latter being strobed once per address phase time slot by a $\phi4$ timing pulse. This least significant S-bit ($S_1$) thus begins its circulation in the delay loop. As the S-bits stored stages (2), (3) and (4) are then successively advanced by the 1.3056 mc. clock pulses into stage (1) of shift register 12110, the same will be read out therefrom and strobed into the delay line. The most significant bit ($S_4$) of the first 4-bit S-code is read out of the shift register and into the delay line in AD$\phi$3.

The output of the concentrating S-phase OR gate 10475 is also applied as an inhibit to gate 12332 and as an enabling input to gate 12334. As indicated, the flip-flop 12140 remains in its "0" state in the absence of an S-phase signal during a given address interval and this is accompanied by the gate 12334 being disabled and the gate 12332 uninhibited. The gate 12332 is enabled during AD$\phi$4 and an energizing output signal therefrom is delivered to the AND gates 12505 through 12508. The 4-bit S-code stored in flip-flops 12615 through 12618 is thus delivered to the respective stages of the shift register via the enabled AND gates 12505 through 12508, the OR gates 12311 through 12314, and the single-to-double-rail gate circuitry 12320. The gate 12112 remains uninhibited throughout the given address interval and hence the least significant bit of the second 4-bit S-code is immediately read out of stage (1) of the shift register and strobed into the delay line 12111 by the $\phi4$ timing pulse that occurs during AD$\phi$4. The S-bits stored in stages (2), (3) and (4) are in turn successively strobed into the delay line during the address phase time slots AD$\phi$5, AD$\phi$6 and AD$\phi$7. The eight S-bits that comprise a discrete S-word are thereby stored in juxtaposition to each other in the delay loop. The flip-flop 12450 is reset during AD$\phi$4, $\phi4$ and hence with the exception of the read in of steady state words, to be described, no further read in to the precessional delay loop can take place until a new S-word is loaded into the buffer flip-flops 12611 through 12618.

The total loop delay in the precessional delay loop is 416⅔ microseconds or one 2.4 kc. period. Accordingly, the S-bits of the first stored 4-bit S-code appear in stages (1) through (4) of the shift register exactly one 2.4 kc. period later, i.e., during AD$\phi$0 of the assigned address interval in the next succeeding address cycle. If the S-bits are intended for a 40.8 kb. transmission line or trunk the S-bit read out and precession operations will now take place.

As indicated hereinbefore, for subscriber lines and interoffice trunks operating at a data transmission rate of 40.8 kb., the supervisory S-bit rate thereof is 1200 b.p.s. Accordingly, since the total delay in the precessional delay loop is 416⅔ microseconds or one 2.4 kc. period, S-bits intended for a 40.8 kb. line must traverse the delay loop twice between successive S-bit read out operations. And, as in the Assembler, for subscriber lines and trunks of lower transmission rates, the inserted S-bits must traverse the delay loop an even greater number of times between read outs. For example, with a transmission rate of 2.55 kb. the supervisory S-bit rate is 75 b.p.s. Accordingly, the S-bits of a 2.4 kb. subscriber line or trunk recycle in the delay loop 32 times between successive read outs.

If no S-bit is to be read out of the delay loop, the eight juxtaposed S-bits of a discrete S-word, intended for a given subscriber, are advanced through the four stages of the shift register by the 1.3056 mc. advance pulses, and then read out of the last stage and through the gates 12112 and 12113 to the input of AND gate 12115. The high frequency $\phi4$ pulses which occur each and every address phase time slot then strobe the S-bits back into the delay line. The gate 12112 is, of course, not inhibited at this time.

The read out of an S-bit from the delay loop and the accompanying precession of the remaining S-bits of the same S-word are carried out in the same manner whether read out occurs immediately after the initial loading operation or after the S-bits have recycled or recirculated in the delay loop one or more times. This being the case, the situation to be described is that wherein the least significant S-bit of a discrete S-code is immediately read out following the loading of the same into stage (1) of the shift register.

The read out of S-bits from the precessional delay loop is under the control of the S-phase signals. As will be recalled, the S-phase signal derived from a given transmission line or trunk is indicative of the supervisory S-bit rate thereof. For example, if the terminating circuit T0 is assigned to a 40.8 kb. transmission line S-phase signals will be delivered thereto at a 1200 b.p.s. rate and since these S-phase signals control the S-bit read out from the Distributor during the appropriate address interval, the S-bits are read out and delivered to the appropriate line terminal circuit at a 1200 b.p.s. rate.

With the eight S-bits of a discrete S-word stored in flip-flops 12611 through 12618, the occurrence of the AD$\phi$0 pulse during the assigned address interval serves to read the first 4-bit S-code out of the flip-flops 12611 through 12614 and into respective stages of the shift register 12110 as heretofore described. If the S-phase flip-flop of the appropriate terminating circuit has been set to its "1" state sometime prior to said assigned address interval, an S-phase signal will appear at the output of the OR gate 10475 during this address interval. The S-phase signal serves to set the flip-flop 12140 to its "1" state; it further inhibits gate 12332 and it enables gate 12334 for the duration of this address interval. With the flip-flop 12140 set to its "1" state the gate 12112 is inhibited and the gates 12114 and 12116 are enabled. Accordingly, the least significant S-bit loaded into stage (1) of shift register 12110 is immediately read out therefrom and into stage (4) of shift register 12410 via the enabled AND gate 12116 and single-to-double-rail-gate circuitry. The gates 12440 and 12460 of this single-to-double-rail-gate circuitry are enabled during AD$\phi$0, $\phi3$. The one output lead of stage (4) of shift register 12410 is coupled via single-to-double-rail logic circuitry to the input of flip-flop 12250. The AND gates 12552 and 12554 of the latter single-to-double-rail-gate circuit are enabled during AD$\phi$0, $\phi4$. The least significant bit ($S_1$) of the first S-code is therefore deposited in stage (1) of shift register 12110 during AD$\phi$0, $\phi2$; it is then read out from stage (1) and deposited in stage (4) of shift register 12410 in AD$\phi$0, $\phi3$; and finally, it is read out from the latter stage and loaded into flip-flop 12250 during AD$\phi$0, $\phi4$.

The (1) output lead of flip-flop 12250 is connected to the input of each of the Supervisory Bit Insertion Circuits of the 68 transmission lines and trunks being served by SA/D #0. The output leads of the 1-of-68 AND gate translator 11001 are coupled to respective Supervisory Bit Insertion Circuits. Accordingly, the S-bit that is read out of flip-flop 12250 during a given address interval is strobed into the appropriate Insertion Circuit by the address lead that is energized during the given address interval. That is, the translator 11001 provides the address information for directing the S-bit deposited in flip-flop 12250 to the proper Supervisory Bit Insertion Circuit.

The control delay loop comprising shift register 12410 and delay line 12211 has a total loop delay of 416⅔ microseconds or one 2.4 kc. period. There is no precessional feature incorporated in this delay loop. Accordingly, an S-bit deposited in stage (4) of register 12410 during AD$\phi$0 of a given address interval will reappear in this stage during AD$\phi$0 of the same address interval in successive address cycles. Accordingly, this stored S-bit is continually read out in successive 2.4 kc. periods until the same is erased by overwriting a new S-bit into stage (4) of the register. This ensures that an S-bit will be continuously delivered to a line terminal circuit for a full double subframe period irrespective of rate. As indicated hereinbefore, the insertion circuitry double-writes each S-bit into the M-bit stream. This double-writing is eliminated, however, at the Send-Digital Terminating Unit.

The least significant S-bit of the first S-code is read out of the delay loop via the enable AND gate 12116 and it is prevented from recirculating in the delay loop by the inhibit applied to gate 12112. The gate 12114 is enabled, however, and the next significant S-bit ($S_2$) in stage (2) of the register is therefore read out therefrom and strobed into the delay line by a $\phi 4$ timing pulse. Thus the read out of the least significant bit ($S_1$) during AD$\phi$0 of the given address interval is carried out simultaneously with the insertion into the delay line of the next, least significant bit ($S_2$). This in effect results in this next bit ($S_2$) being advanced or precessed one time slot within the delay loop. As the S-bits ($S_3$) and $S_4$) are successively advanced into stage (2) of the register, the same are read out therefrom and strobed into the delay line in the same manner. The ($S_4$) bit is inserted into the delay line during AD$\phi$2.

During AD$\phi$3 of the given address interval, the gate 12334 is enabled so as to deliver an energizing input to the AND gates 12505 through 12508. The four S-bits stored in flip-flops 12615 through 12618 are thereby read out of the same and into the four stages of the shift register 12110 during AD$\phi$3, $\phi$2. This read in of the second 4-bit S-code is accompanied by the resetting of flip-flop 12140 to its "0" state by the energized output signal from gate 12334. With this flip-flop returned to its "0" state, the gate 12112 is no longer inhibited, while the gates 12114 and 12116 are now disabled. The least significant bit ($S_1$) of the second 4-bit S-code is therefore strobed into the delay line during AD$\phi$3, $\phi$4, via the gates 12112, 12113 and 12115.

As the S-bits now stored in stages (2), (3) and (4) of the register are advanced into stage (1) by the 1.3056 mc. clock pulses, the same will be successively strobed into the delay line during AD$\phi$4, AD$\phi$5 and AD$\phi$6, respectively.

As indicated hereinbefore, if the S-bits are intended for a 40.8 kb. transmission line, the juxtaposed S-bits will recycle twice in the delay loop prior to the read out of the next least significant S-bit ($S_2$). Accordingly, two address cycles later, the $S_2$ bit of the first loaded S-code will be temporarily stored in stage (1) of the register 12110 during AD$\phi$0 of the given address interval. The flip-flop 12140 will again be set to its "1" state to thereby inhibit gate 12112 and to enable gates 12114 and 12116. The ($S_2$) bit is therefore read out of the delay loop during AD$\phi$0, while the ($S_3$) bit presently stored in stage (2) of the register is simultaneously strobed back into the delay line. The flip-flop 12140 now remains in its "1" state for the duration of the address interval and as the other remaining S-bits of this S-word are advanced into stage (2) of the register they are read out therefrom and strobed back into the delay line via the gates 12114, 12113 and 12115. Once again, therefore, the remaining S-bits of the S-word have been advanced or precessed one time slot within the delay loop. The above described process is repeated every other address cycle until all of the remaining S-bits intended for the 40.8 kb. transmission line are read out.

The described operation is exactly the same for S-bits intended for other rated subscriber lines and trunks, the only difference being the number of times the stored S-bits recycle in the delay loop between successive S-bit read out operations.

As indicated above, the flip-flop 12140 is reset to its "0" state during AD$\phi$3 of the address interval in which the S-word is initially loaded into the delay loop. This is to ensure that each of the S-bits of the second loaded S-code are strobed into the delay line. For example, if the flip-flop 12140 were not reset by the AD$\phi$3 pulse from gate 12334, the ($S_1$) bit of the second S-code, deposited in stage (1) of the register, would be inhibited or prevented from circulating in the delay loop. Significant signaling information would therefore be lost.

After all the S-bits intended for a given transmission line have been loaded into the delay loop, the flip-flop 12450 is reset during AD$\phi$4, $\phi$4. The gate 12334 is thereafter disabled until a new S-word is to be read into the distributor; hence, the flip-flop 12140 will no longer be reset as described above. Accordingly, when the flip-flop 12140 is thereafter set to its "1" state during the given address interval, it will remain in this state for the duration of the address interval. With the flip-flop 12140 set to its "1" state during a complete address interval, an S-bit will be read out of stage (1) of the register and sent to the appropriate Supervisory Bit Insertion Circuit, while the remaining S-bits of the same S-word are read out of stage (2) of the register and reinserted into the delay line. This, of course, causes all of these remaining bits to precess one time slot. As the S-bits are precessed, zeroes are, in effect, inserted behind the remaining bits.

The S-bits of respective lines and trunks are deposited in the delay loop in adjacent 8-bit time slot positions. Thus the least significant bit ($S_1$) of the first S-code of a given subscriber appears in the delay loop immediately behind (i.e., in the very next time slot) the most significant bit ($S_4$) of the second S-code of another and different subscriber. Now to prevent the above-described precession operation performed on the S-bits of one subscriber from affecting in any way the S-bits of another subscriber, the AD$\phi$7 pulse is applied as an inhibit to gate 12114. For example, during AD$\phi$7 of a given address interval the ($S_1$), ($S_2$) and ($S_3$) bits, if any, of the subscriber assigned to the next address interval will be positioned in stages (2), (3) and (4) of the register 12110. Accordingly, with the flip-flop 12140 set to its "1" state during said given address interval the ($S_1$) bit of the line assigned to the next address interval would normally be read out of stage (2) and advanced into the delay line during the AD$\phi$7 period of said given address interval. To prevent this possibility from occurring, AD$\phi$7 is applied as an inhibit to gate 12114.

Considering now the mode of operation for steady state S-words, it will be recalled that steady state words are comprised of four S-bits. The four S-bits of a steady state word are loaded into flip-flops 12611 through 12614, in the manner heretofore described, and all zeros are deposited in flip-flops 12615 through 12618. During AD$\phi$0 the 4-bit steady state word is read out of the flip-flops and into the four stages of the shift register 12110. These S-bits are then operated upon within the distributor precessional delay loop in exactly the same manner as the first 4-bit S-code of a discrete word. In the absence of an S-phase signal during the given address interval, these four bits will be successively strobed into the delay line 12111. The most significant bit ($S_4$) of the 4-bit steady state word is read out of the shift register and into the delay line in AD$\phi$3. In AD$\phi$4 the contents of the flip-flops 12615 through 12618 are then read into the four stages of the shift register. However, since the flip-flops 12615 through 12618 are in their "0" state, all zeros are stored in the shift register stages. It will be apparent, therefore, that a steady state word appears in the precessional delay loop as a 4-bit S-code followed by four zeros. The four bits of the steady state word are successively read out of the precessional delay loop in exactly the same manner as the read out of the first 4-bit S-code of a discrete S-word. And as each S-bit of the steady state word is read out, the remaining bits are advanced or precessed one time slot.

Figure 124:
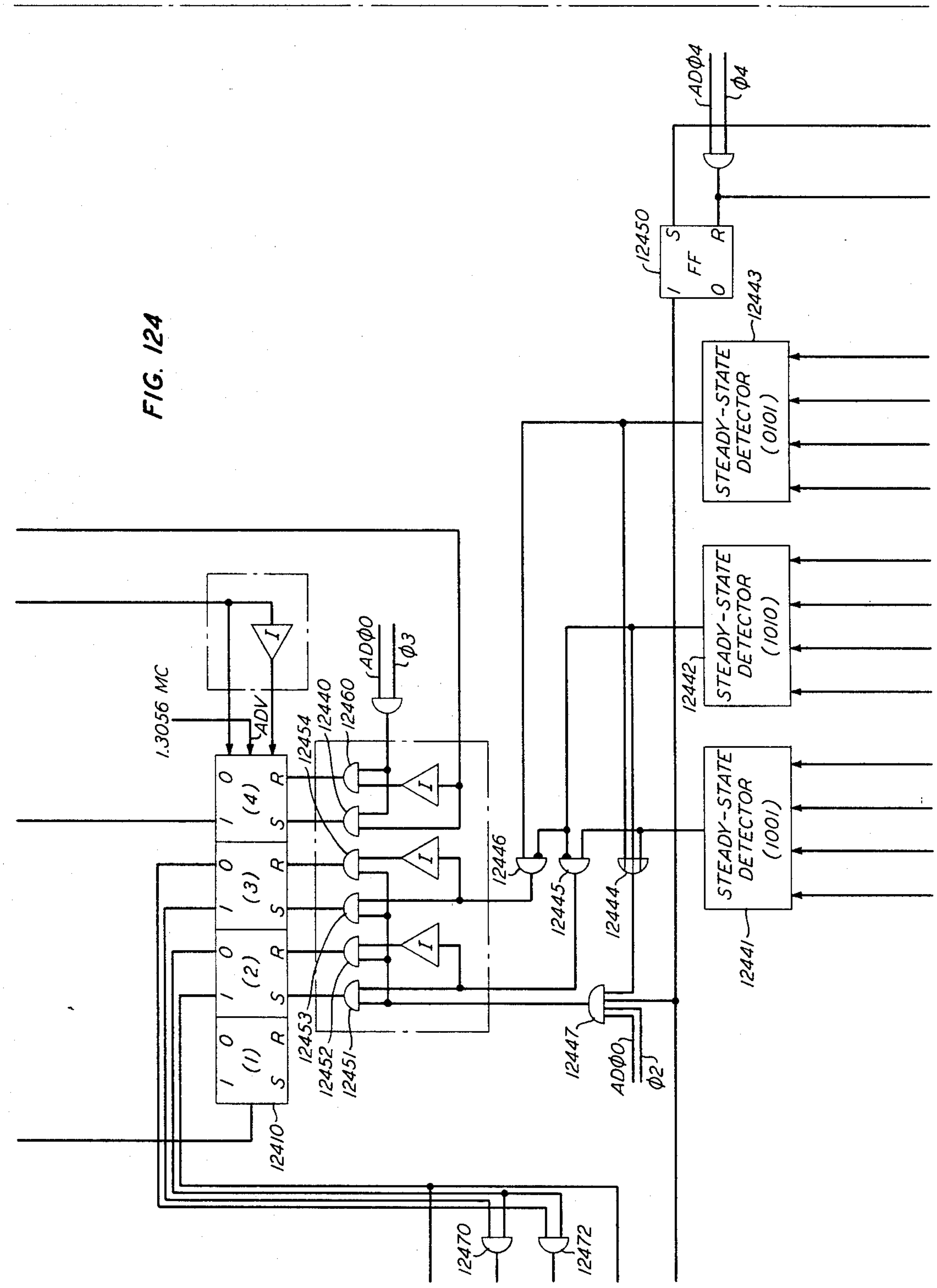
Figure 125:
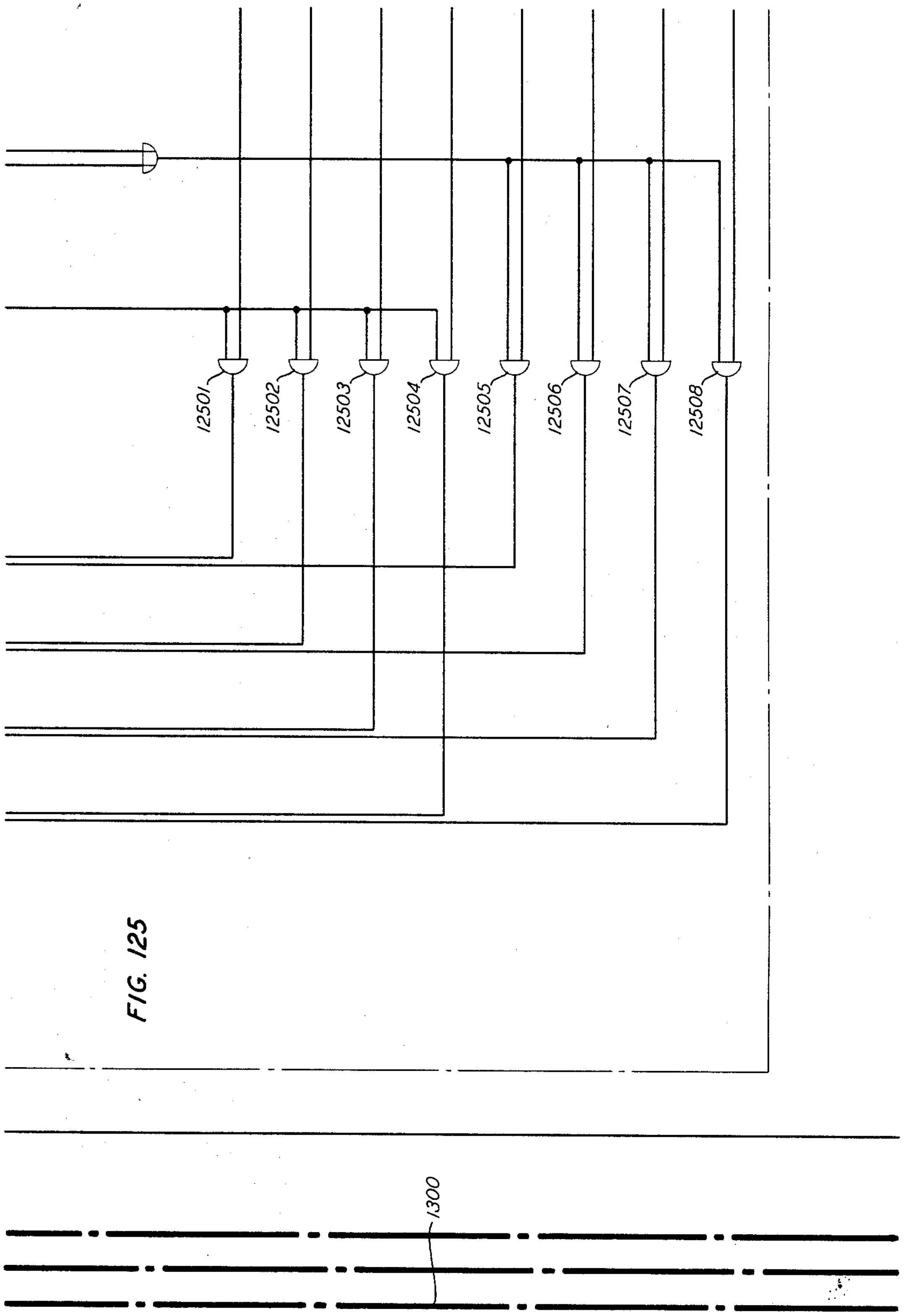
Figure 126:
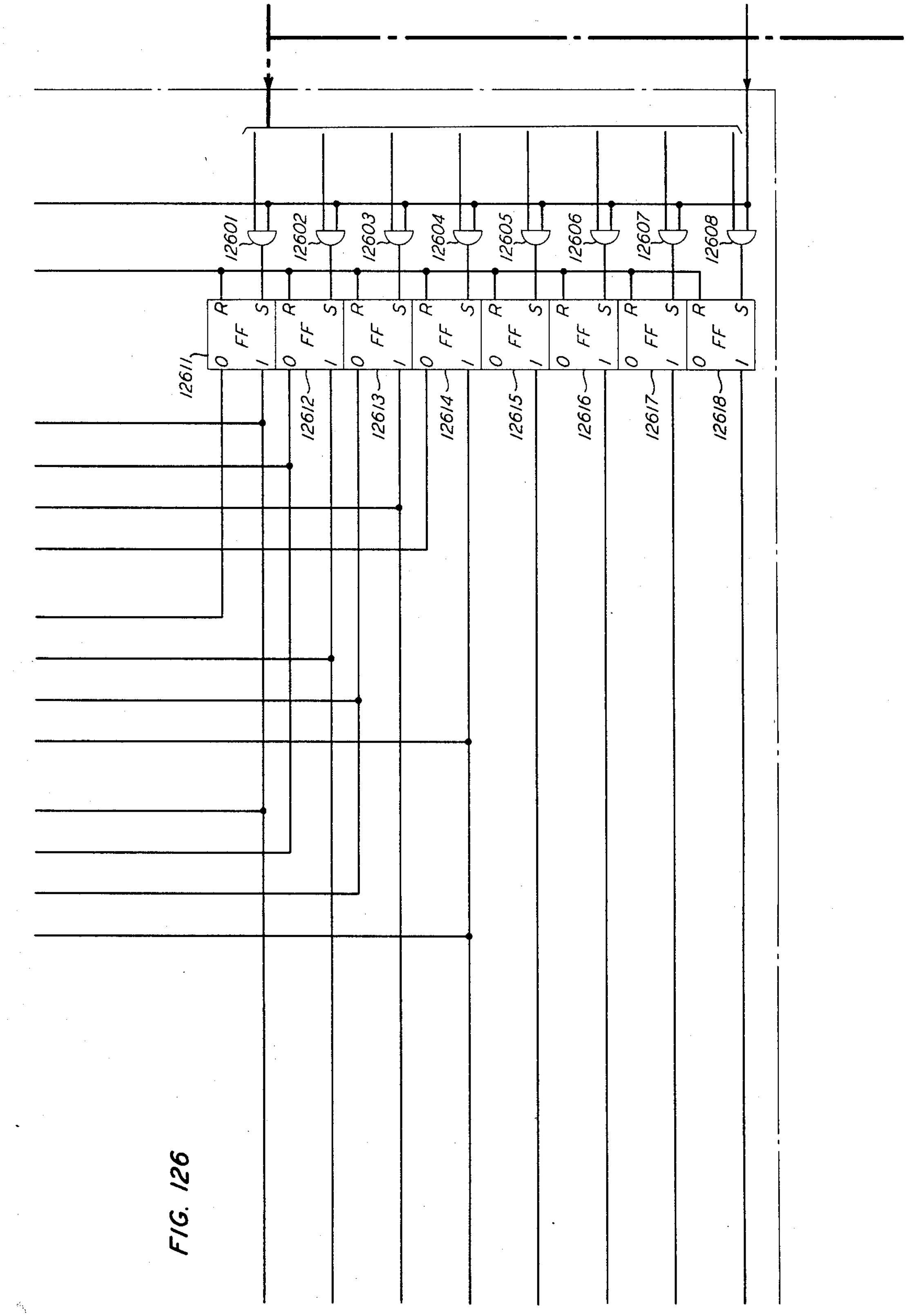

The loading of a 4-bit steady state word into the precessional delay loop is accompanied by the loading of a 2-bit code into the control delay loop; the 2-bit code represents the particular steady state word. Each of the four flip-flops 12611 through 12614 is arranged in a manner known in the art to supply "two-rail logic output signals." In other words, each flip-flop stage has a (0)

and a (1) output lead. Each steady state detector of FIG. 124 is connected to selected output leads in the illustrated manner so as to provide an output therefrom if the steady state word in flip-flop storage matches the steady state code the detector is intended to recognize. As will be covered in greater detail hereinafter, there are three outgoing steady state code assignments:

| | |
|---|---|
| 1 0 0 1 | Framing |
| 1 0 1 0 | Off Hook |
| 0 1 0 1 | On Hook |

Thus the steady state detector 12441 detects the steady state code 1001 by having two of its input leads connected to the (1) output leads of the flip-flops 12611 and 12614, with the remaining two inputs connected to the (0) output leads of the flip-flops 12612 and 12613. Accordingly, if the S-word in the first four flip-flops comprises the steady state code 1001, the detector 12441 will provide an output energizing signal. By way of further example, it will be seen that the steady state detector 12442 is connected at its input to the (1) output leads of flip-flops 12612 and 12614, and to the (0) output leads of flip-flops 12611 and 12613; hence, it will detect the steady state code 1010. The correspondence between the remaining steady state detector and its interconnections to the (1) and (0) output leads of flip-flops 12611 through 12614 should be apparent. These steady state detectors may be of the same nature as those used in the Assembler.

The output of the steady state detectors 12441 through 12443 are utilized, in a manner to be described, to write a 2-bit code into the control delay loop which is indicative of the particular steady state. For example, the 2-bit code 00 represents the steady state "Off Hook"; the 2-bit code 01 represents "On Hook"; and the 2-bit code 10 represents "Framing." As will be explained in detail hereinafter, these 2-bit codes are read out of the control delay loop and utilized by logic circuitry to write in the appropriate 4-bit steady state word into the distributor precessional delay loop.

The output lead of each steady state detector is delivered to the OR gate 12444; the output of steady state detector 12442 is applied as an inhibit input to the gates 12445 and 12446; and the outputs of steady state detectors 12441 and 12443 are applied as enabilng input signals to the gates 12445 and 12446, respectively. The output, if any, from gate 12445 is delivered to stage (2) of the shift register 12410 via single-to-double-rail gate circuitry. In a similar manner the output of gate 12446 is delivered to stage (3) of the shift register via a single-to-double-rail gate circuit. The AND gate 12447 is coupled at its input to the (1) output lead of flip-flop 12450, to the output of OR gate 12444, and to the AD$\phi$0 and $\phi$2 pulse sources. If a steady state word has been deposited in the flip-flops, the (1) output lead of flip-flop 12450 will be energized and the output of one of the steady state detector circuits will be energized. Thus, during AD$\phi$0, $\phi$2, the AND gate 12447 will deliver an enabling signal to the AND gates 12451 through 12454 of the double-rail gate circuitry to thereby strobe the appropriate 2-bit code into stages (2) and (3) of shift register 12410. For example, if the steady state code is 1010 designating "Off Hook," the steady state detector 12442 will deliver an inhibit input signal to the gates 12445 and 12446. Accordingly, during AD$\phi$0, $\phi$2 stages (2) and (3) of the shift register 12410 will be set to their "0" state. Thus the 2-bit code 00, indicative of "Off Hook," is stored in the control delay loop. If the steady state word comprises 0101, the output lead of the steady state detector 12443 will be energized, with the output leads of the detectors 12441 and 12442 de-energized. The gates 12445 and 12446 are no longer inhibited and, therefore, the output of steady state detector 12443 serves to set stage (3) of register 12410 to its "1" state. There is no energizing output signal from steady state detector 12441 and stage (2) of the register is therefore set to its "0" state. The 2-bit code 01, indicative of the "On Hook" steady state word, is thus deposited in the control delay loop. Finally, for the steady state code 1001 the output lead of detector 12441 is energized, while the output leads of detectors 12442 and 12443 are de-energized. Under these conditions it will be apparent that the 2-bit code 10, representative of the "Framing" steady state word, is now deposited in the control delay loop.

A 2-bit code written into the control delay loop in the described manner is advanced in the shift register 12410 under the control of the 1.3056 mc. control pulses, and they are strobed into the delay line 12211 by the $\phi$4 timing pulses. Each 2-bit code recycles in the control delay loop for an indefinite period until the 2-bit code of a new steady state replaces the old steady state code. That is, the new 2-bit code, indicative of a new steady state word, overwrites the old 2-bit code. There is no precession of the bits in the control delay loop. The 2-bit code read into the stages (2) and (3) of the shift register during AD$\phi$0 of a given address interval reappear in these stages during AD$\phi$0 of the same address interval of the next succeeding address cycle.

The (1) and (0) output leads of stages (2) and (3) of register 12410 are coupled to the input of the shift register 12110 by logic circuitry which serves to write the appropriate steady state word into the distributor precessional delay loop when a given set of conditions prevail. These conditions are as follows. First, this write in of a steady state word to the register 12110 from the control delay loop should occur during AD$\phi$0 of the appropriate address interval. Second, the read out of the preceding steady state word or discrete word from the precessional delay loop should be completed. Third, no new S-word read in to the precessional delay loop is contemplated at this time; that is, the flip-flop 12450 is in its "0" state. This read in of a steady state word into register 12110 under the control of the 2-bit code stored in the control delay loop must occur only once per frame. To this end, it is necessary to develop a pseudo-frame signal which is analogous in purpose and intent to the $F_1$ framing pulses utilized by the Assembler.

The logic circuitry for controlling a steady state read in in accordance with the conditions set forth above will now be described. The AND gate 12160 is connected at its input to the (0) output leads of the four stages of the shift register 12110. The output of AND gate 12160 is delivered to the set terminal of flip-flop 12161 via the AND gate 12162, which is strobed by the AD$\phi$0 and $\phi$1 pulses. Thus the flip-flop will be set to its "1" state whenever all zeros appear in the four stages of the shift register during AD$\phi$0, $\phi$1 of a given address interval. The (1) output lead of flip-flop 12161 is delivered as an enabling input to the gate 12325. The output of gate 12325 is coupled to the input of AND gates 12341 through 12344. Only when these AND gates are enabled can there be any read in to the distributor precessional delay loop from the control delay loop. Accordingly, the described circuitry serves to satisfy one of th previously noted conditions, i.e., no read in to the precessional delay loop from the control delay loop can take place until the previously stored steady state or discrete word has been read out of the former.

The (1) output of flip-flop 12450 is coupled as an inhibited input to the gate 12325. As explained hereinbefore, flip-flop 12450 is set to its "1" state whenever a new S-word is to be read into the precessional delay loop. Thus, whenever a new S-word is intended to be read into the register 12110 during a given address interval the gate 12325 is inhibited to thereby prevent possible read in to the register 12110 from the control delay loop. This satisfies another of the above-noted conditions.

The 68 output leads of the 1-of-68 AND gate translator 11011 are coupled to the respective AND gates 12200 through 12267. The other input to each AND gate is the above-mentioned pseudo-framing pulse derived by straightforward translation from the central timing unit waveform. These pseudo-framing pulses are each 416⅔ microseconds duration of one 2.4 kc. period. The rate of recurrence of each pseudo-framing pulse, however, is determined by the transmisison rate of the transmission line or trunk assigned to the respective address interval. The output of the AND gates 12200 through 12267 are coupled to the input of gate 12325 via OR gate 12268. Here again, it is only when an enabling signal is applied to the gate 12325 from one of the AND gates 12200–12267 that a read out from the control delay loop into the precessional delay loop will be permitted.

As indicated hereinbefore, the pseudo-framing pulses assure that the read in to the precessional delay loop from the control delay loop occurs only once per frame. However, the frame period and frame rate are different for lines and trunks operating at different transmisison rates. For example, the $F_1$ frame marker pulse, at a 40.8 kb. transmission rate, is repetitive at a 300 c.p.s. rate; for a 10.2 kb. line or trunk, the $F_1$ frame pulse repeats at a 75 c.p.s. rate; and for a 2.55 kb. line or trunk transmission rate, the $F_1$ frame pulse is at a repetition rate of 18.75 c.p.s. Accordingly, the pseudo-framing pulses must be generated at rates that correspond to the frame rates of the transmission lines and trunks assigned to the respective address intervals. For example, assume that a 40.8 kb. subscriber line is assigned to the first address interval of the address cycle. During this address interval an enabling signal will be delivered to the AND gate 12200 from the 1-of-68 AND gate translator. As indicated above, for this transmission rate the frames, i.e., the $F_1$ frame marker pulses, occur or repeat at a 300 c.p.s. rate. Accordingly, the AND gate 12200 associated with the 40.8 kb. subscriber line should be enabled only once per 300 c.p.s. period. This insures only one possible read in to the precessional delay loop from the control delay loop per frame.

The pseudo-framing pulses for the lower rate transmission lines and trunks are, of course, repetitive at lower rates. And here again, the repetitive rate of the same corresponds to the $F_1$ frame bit of the given subscriber lines or trunk. The following table indicates the manner in which these pseudo-framing pulses are derived from the central timing unit waveforms.

| Line or trunk transmission rate, kb. | Translation, c.p.s. |
|---|---|
| 40.8 | 1200, 600 and 300. |
| 10.2 | 1200, 600, 300, 150 and 75. |
| 2.55 | 1200, 600, 200, 150, 75, 37.5 and 18.75. |

The (1) output lead of stage (2) of shift register 12410 is coupled to the input of AND gates 12341 and 12344 via OR gates 12351 and 12354. The (0) output lead of stage (2) of register 12410 is applied as an enabling input to the AND gates 12470 and 12472. The output of AND gate 12470 is applied directly to the input of AND gate 12342 and it is further applied to the input of AND gate 12344 via OR gate 12354. In a somewhat similar fashion, the output of AND gate 12472 is coupled directly to the input of AND gate 12343 and via OR gate 12351 to the input of AND gate 12341. The (1) and (0) output leads of stage (3) of register 12410 are connected to the input of AND gates 12470 and 12472, respectively. The output of the AND gates 12341–12344 are respectively coupled to the four stages of the shift register 12110 via the single-to-double rail gate circuitry 12320.

The read in to the distributor precessional delay loop from the control delay loop will now be explained. For this read in to occur the previously described conditions must prevail. That is, the flip-flop 12450 is in its "0" state and hence the gate 12325 is not inhibited; the previous S-word has been read out of the precessional delay loop and therefore the flip-flop 12161 will be set to its "1" state during AD$\phi$0, $\phi$1 of the appropriate address interval; and the appropriate AND gate in the bank of AND gates 12201–12267 is energized. During AD$\phi$0 of the given address interval, the 2-bit code previously read into stages (2) and (3) of the shift register 12410 will reappear in these stages. For purposes of explanation, assume the 2-bit code is 00, which is representative of the steady state "Off Hook." The energized (0) output leads of stages (2) and (3) of register 12410 serve to enable the AND gate 12472. The latter therefore delivers an enabling input to the AND gate 12343 and also to the AND gate 12341 via the OR gate 12351. The AND gate 12470 has one input lead connected to the (1) output lead of stage (3) of register 12410 and hence it will remain disabled. With gate 12470 disabled, the gates 12342 and 12344 are disabled. For the prevailing conditions recited above, the gate 12325 is presently enabled so as to deliver enabling input to the AND gates 12341–12344. The gates 12341 and 12343, being completely enabled, serve to set the stages (2) and (4) of the shaft register 12110 to their "1" state. The gates 12342 and 12344 are disabled, as heretofore described, and hence the stages (1) and (3) of the register 12110 remain in their "0" state. With the four stages of the shift register thus set in the manner described, the "Off Hook" steady state code assignment 1010 has been effectively written into the distributor precessional delay loop. The S-bits of this steady state word are then operated upon within the distributor precessional delay loop in exactly the same manner as the previous steady state word.

By way of further example, assume the 2-bit code 01, representative of "On Hook," is deposited in stages (2) and (3) of shift register 12410 during AD$\phi$0 of the appropriate address interval. This presents a situation just the reverse of that previously described. In this case, the AND gate 12470 is enabled and the AND gate 12472 is disabled. Accordingly, the AND gate 12342 will be enabled as will the AND gate 12344; the latter is coupled to the output of AND gate 12470 via the OR gate 12354. With the AND gate 12472 disabled, the AND gates 12341 and 12343 are in turn disabled. Accordingly, the stages (1) and (3) of register 12110 are set to their "1" state, while the stages (2) and (4) remain in their "0" state. With the stages so set, it will be apparent that the "On Hook" steady state code assignment 0101 has been effectively read into the distributor precessional delay loop.

If the "Framing" steady state word is to be written into the precessional delay loop, the 2-bit code 10 will be deposited in the stages (2) and (3) of register 12410 during AD$\phi$0 of the appropriate address interval. With the 2-bit code 10 in stages (2) and (3) of the shift register 12410, the AND gates 12470 and 12472 are disabled since the same are coupled at their input to the (0) output lead of stage (2). The (1) output lead of stage (2) is coupled, however, to the input of AND gate 12341 via the OR gate 12351 and to the input of AND gate 12344 via the OR gate 12354. The AND gates 12341 and 12344 are therefore enabled, while the AND gates 12342 and 12343, which are respectively coupled to the output of the disabled AND gates 12470 and 12472, are in turn disabled. Accordingly, the stages (1) and (4) of shift register 12110 are set to their "1" state, while the stages (2) and (3) of the register remain in their "0" state. With the four stages of the shift register so set, the "Framing" steady state code has been effectively written into the distributor precessional delay loop.

The control delay loop is read and a steady state word is generated and loaded into the distributor precessional delay loop for each and every frame of an outgoing digital bit stream, assuming, of course, there is no new S-bit data information intended for the digital bit stream. When a new S-word is to be sent, the same is deposited in the flip-flops 12611–12618 via the signal word queue. The flip-flop 12450 will be set to its "1" state at this time and this serves to inhibit the gate 12325 to thereby block the read in to the precessional delay loop of the steady state word generated from the 2-bit code stored in the control delay loop. If the new S-word is a stealy state word, a new 2-bit code will be read into the control delay loop, overwriting the previous steady state 2-bit code.

The distribution process described above is carried out for each and every address interval of the address cycle. Different rated transmission lines and trunks are, of course, assigned to the respective address intervals. The described operation is exactly the same, however, irrespective of transmission rate, the only difference being the number of times the stored S-bits recycle in the distributor precessional delay loop between successive S-bit read out operations.

Figure 127:
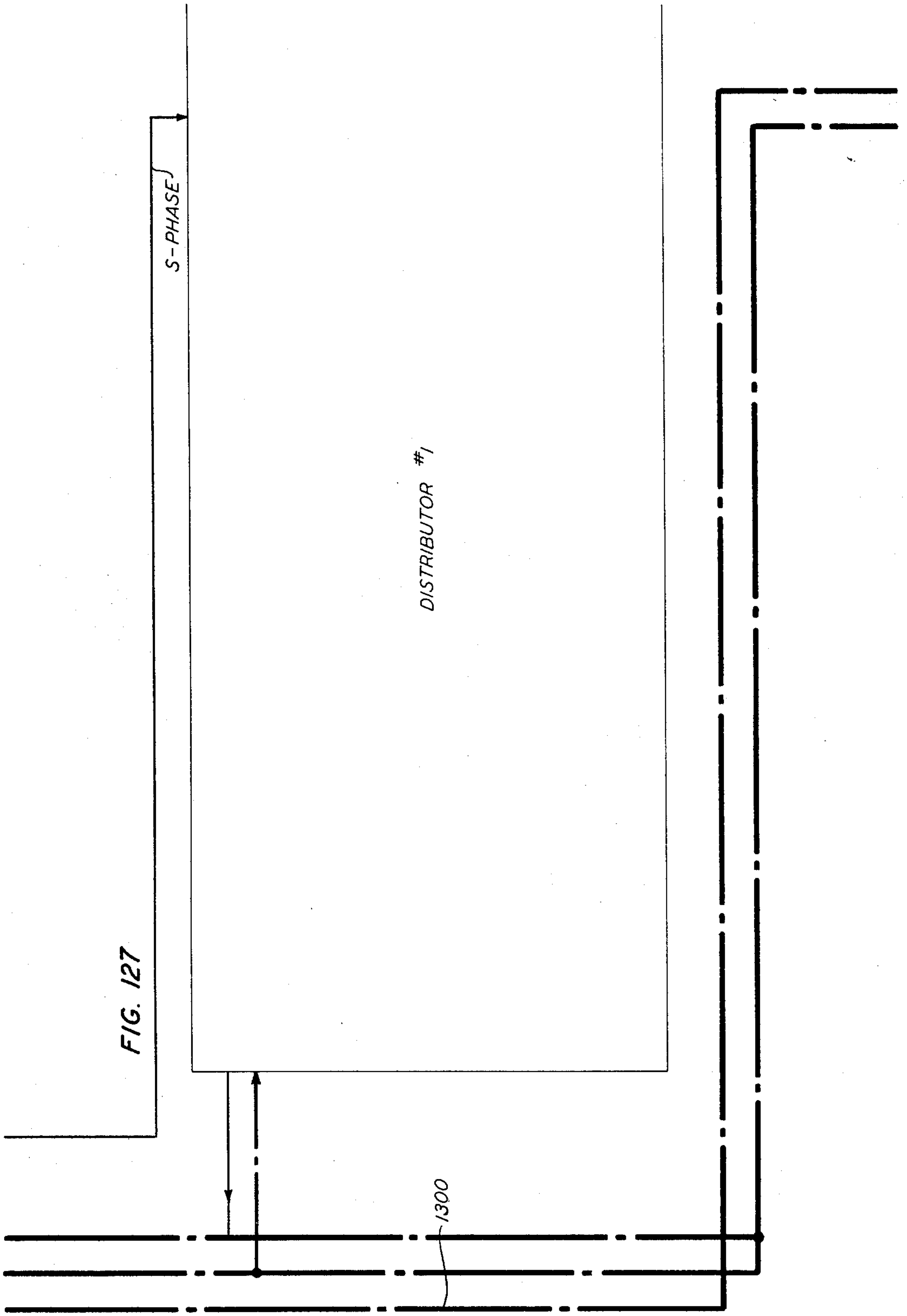
Figure 128:
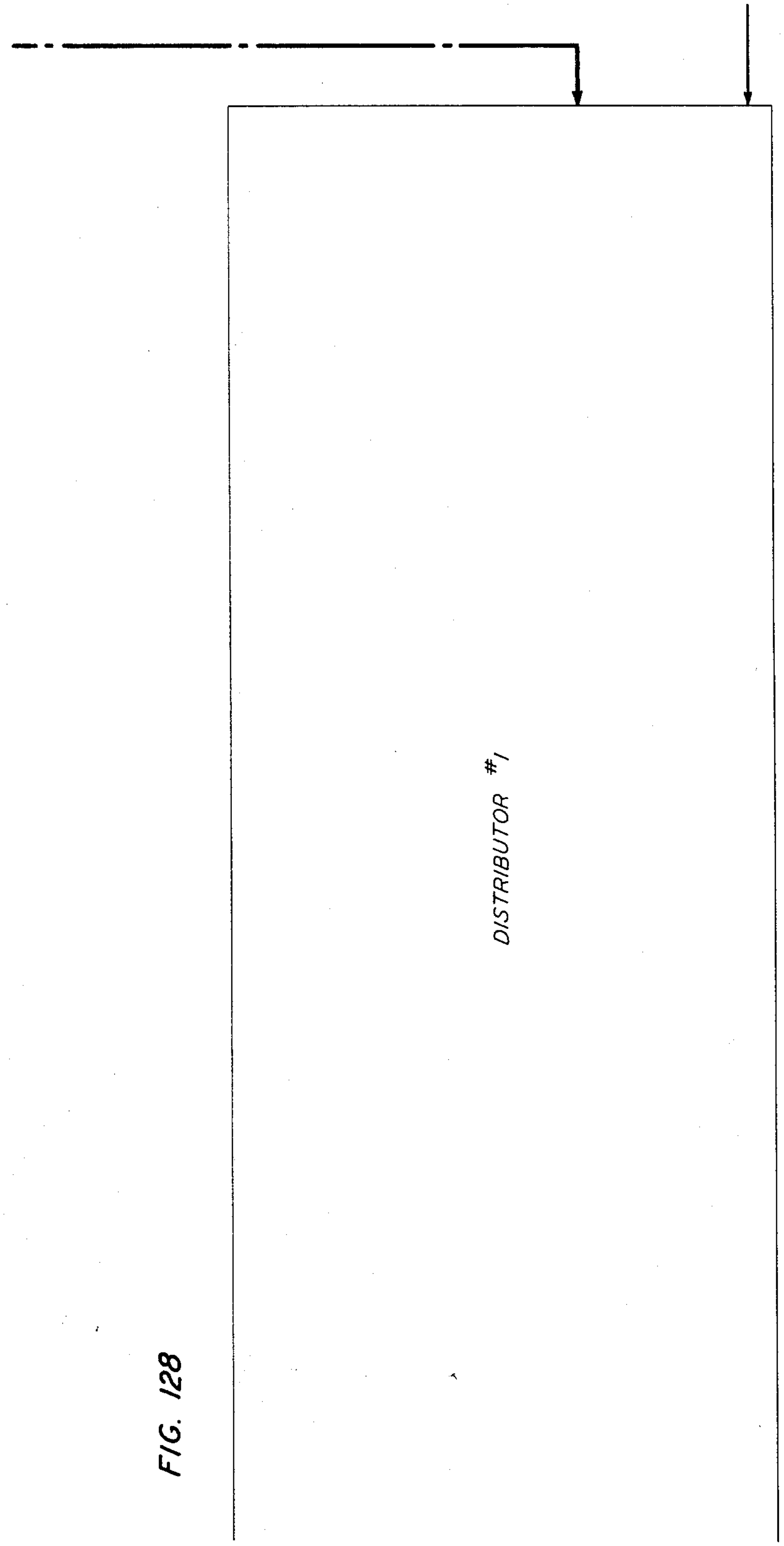

The Distributor, shown in FIGS. 127 and 128 of the drawings, is connected to the remaining line and trunk terminal circuits, i.e., those not serviced by Distributor #0. This second Distributor, designated hereinafter Distributor #1, is structurally and functionally identical to Distributor #0. Here again, the multiplexed S-bit output from the Distributor is connected to each of the Supervisory Bit Insertion Circuits of the subscriber lines and trunks serviced by the Distributor. The output leads of the 1-of-68 AND gate translator 11001 are coupled to respective Supervisory Bit Insertion Circuits. Accordingly, the S-bit that is read out of Distributor #1 during a given address interval is strobed into the appropriate Insertion Circuit by the address lead that is energized during the given address interval. That is, the translator 11001, here again, provides the appropriate address information for steering the S-bit from Distributor #1 to the proper Supervisory Bit Insertion Circuit.

It should be apparent from the above that the 1-of-68 AND gate translator may be simultaneously directing an S-bit from Distributor #0 into one of the 68 Insertion Circuits to which this Distributor is connected as well as an S-bit from Distributor #1 to one of the Insertion Circuits serviced by the latter.

*Central processor*

The Central Processor, sometimes called a common control, is a centralized data processing facility which is employed to implement the various telephone, maintenance and administrative functions of the telephone switching system. As indicated hereinbefore, the Central Processor utilized herein is structurally similar to that disclosed in the copending application of Doblmaier et al., Ser. No. 334,875, filed Dec. 31, 1963. To establish a background of knowledge so as to promote a better understanding of the instant switching system the various component parts of the Central Processor and the interaction of the same with each other and with the several parts of the switching system will be briefly described herein.

Figure 130:
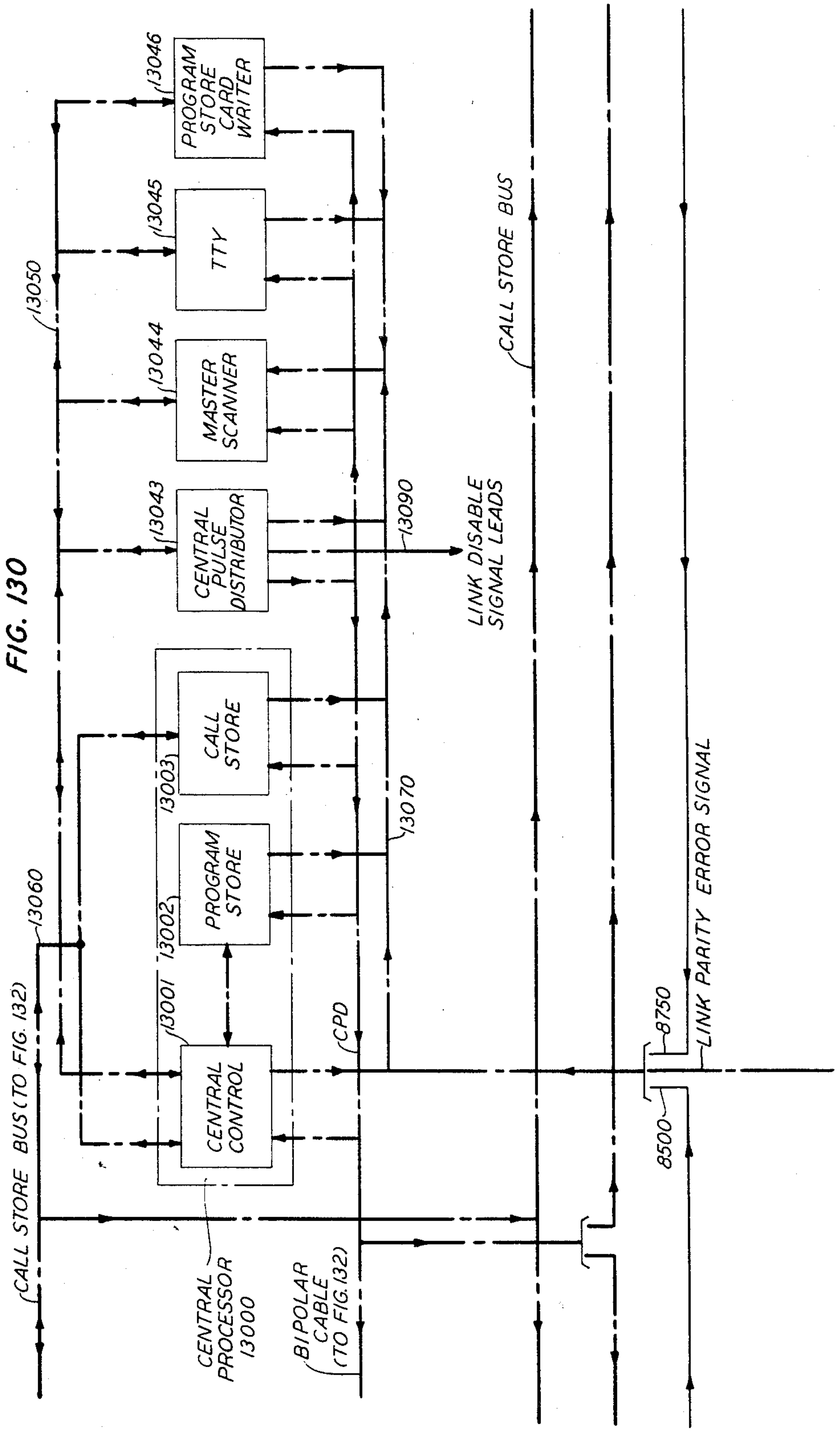

As indicated in FIG. 130 of the drawings, the Central Processor 13000 comprises three basic units:

(1) Central Control 13001
(2) Program Store 13002
(3) Call Store 13003

All requests for service and all control instructions either terminates or originate in the Central Processor. The Central Processor, of course, does not do any of the switching for the talking paths, but rather serves as an observer and controller of the switching.

In its function as an observer, it monitors the status of all lines and trunks to detect any recent change in status. It interprets any such change as a service request or signaling information and takes the appropriate action.

The control function, however, is the primary function of the Central Processor, for the Processor is needed to accomplish the logical operations required in determining system action. When the Central Processor initiates an action that controls other equipment, it converts the control information to the appropriate format and transmits it as control signals to the other elements of the system. What ithe control is required to do is specified in the Program Store unit of the Central Processor.

The Central Pulse Distributor 13043, Master Scanner 13044, Teletypewriter 13045 and Program Store Card Writer 13046 comprise auxiliary units that are intimately involved in the various operations associated with the Central Processor 13000. Whether these units are considered separate and distinct from the Central Processor or rather as comprising parts of the same depends on one's particular philosophy. However, since they are considered separate, but associated, units in the aforementioned Doblmaier et al. case, they will be so considered herein.

The Central Processor is substantially duplicated; a failure in any one of its units automatically removes the malfunctioning unit from the system.

*Central control*

The Central Control 13001 is the primary data processing unit of the system. It is analogous to a digital computer programmed by an ordered list of sequential program instructions which are normally received from a semipermanent memory called Program Store. The Central Control performs three main functions: (1) basic data processing, (2) handling input-output data, and (3) handling maintenance functions. It hunts for and finds a path through the switching matrix, recognizes priorities, if any, and diagnoses trouble both inside and outside the Central Control.

The Central Control 13001 actually comprises two independent central controls for purposes of system reliability. These independent central controls are both arranged to perform all of the necessary system actions. In the normal mode of operation both independent central controls carry on the same work functions on the basis of duplicate input information. This is termed an "in-step" mode of operation. However, only one of the two central controls can alter the system status or control the execution of telephone functions at any given instant. That is, the two independent central controls provide control and maintenance information to the remainder of the system on a mutually exclusive basis.

The Program Store 13002 and Call Store 13003 likewise comprise two independent program stores and two independent call stores, respectively. The information in both the program stores and the call stores is duplicated in the separate stores of the respective store systems and normally a first central control will receive information from a first store via a first bus of the bus system, while the second central control will receive the same information from the other store via another bus of the bus system. The received information being the same, the two central controls perform the same work functions. In this in-step mode of operation the central controls are operating in identical fashion. Correspondence of action of the two central controls is carefully checked by routinely comparing the flow of data through each central control. In the event that a mismatch is found between the data as it flows through the central controls, he system is alerted and diagnostic routines are initiated. The manner in which the data flow is continually compared and checked within the central controls as well as the corrective routines (i.e., maintenance programs) that are initiated in response to malfunctions comprise no part of the present invention and hence the same will not be disclosed herein; reference to the aforementioned Doblmaier et al. can be had for a full description of the same.

Central Control (CC) is capable of executing, one at a time, many different types of basic instructions or orders. Together, these instructions or orders form the vocabulary of the machine language used to tell the system how to perform its various functions. Detailed programs are written in terms of these instructions and are recorded in Program Store. Normally, CC requests an instruction from the Program Store every 6.127 microseconds. Each instruction is a binary word of 44 bits.

Each instruction has a symbolic form that has a definite and precise meaning. The decoding of the binary-encoded instruction tells CC what to do: what registers it is to use, where the operand is located, what operations it will perform in the operand word, et cetera.

Certain instructions result in actions that are entirely confined within the CC. Other instructions, instead, cause the CC to command some other unit to perform some action which may result in an answer back to CC. An instruction, for instance, may result in a command to Call Store to read or write at some specified address (i.e., location) therein. If a reading operation is involved the word read out is sent back to CC. All addresses and commands originate from CC and all answers return to it. The mechanized intelligence required to carry out the complex telephone and maintenance functions of the system, however, reside entirely in the stored programs. Each program is simply a list of orders or instructions which are stored in ordered sequences within the memory of the Program Store. The program orders or instructions can be divided into three basic types: a "do" type, a "go" type, and an "examine" type. A do type order requests the CC to carry out some specified operation (e.g., arithmetic or logical) and to proceed or advance unconditionally to the next order. A go type requests the CC to transfer unconditionally to some specified address in the program and to proceed from there. An examine type order requests the CC to establish the value of some specified binary quantity or quantities and to decide accordingly whether to advance to the next order, or to transfer to some specified address.

It should be clear at this point that whenever it is stated that CC, or the data processing system, performs some function, it must be understood that this function is carried out by CC under the direction of a program. The order word structure and the action of CC in response to specific orders are set forth in detail in the aforementioned Doblmaier et al. case. Thus, the inclusion of the same herein does not appear warranted; reference to the Doblmaier et al. case should be had for a full and complete description of the same.

*Program store*

The Program Store 13002 is a semipermanent memory for storing programs, translation information, directory information, and diagnostic information. It is designed as a multiword, 44-bits per word, word organized, random access, card changeable, nondestructive read out store. As pointed out in greater detail in the Doblmaier et al. case, information is stored by the magnetization or demagnetization of pieces of magnetic material on a card and is sensed by close-proximity Twistor wire elements. Any word can be read in 6.127 microseconds.

The program and translation information (e.g., directory number to line equipment number translations) are, of course, absolutely essential for the operation of the entire system. The system cannot function without this information; the absence of even small parts of the same can cause malfunctioning. Therefore, since continuity of service must be maintained at all times, even in the presence of failures, full duplication of the Program Store is necessary.

The Program Store system 13002 comprises two independent program stores. The storage medium of each store is divided into two sections, a left-hand section (H) and a right-hand section (G), each containing a block of information. Duplication is achieved by having information in the H section of one store duplicated completely in the G section of the second store.

Each of the 44-bit stored binary words is identified by a 16-bit binary address and a 4-bit coded name. The 4-bit name refers to the physical section of the store (G or H) in which the designated word is stored. Within either section of the store the physical position of the word is specified by the address and fixed by the design of the store. The reading of a word from Program Store requires that both the name and the address be supplied as input data from Central Control.

The Program Store is passive in the absence of commands from Central Control; that is, the Program Store is completely dependent upon commands from the CC. Information is retrieved from Program Store by a command from CC consisting of a plurality of input pulses. These inputs are decoded by input logic circuitry and cause various actions to take place, e.g., a memory read out, or a control action within the store itself. For the normal mode of operation Central Control defines, by means of the aforementioned input pulses, an address location in a particular block of stored information and requests that the information found at this address be transmitted back to Central Control. The Program Store then proceeds to retrieve the requested information from its memory and sends it back in duplicated form. If a control operation request is detected, the store may be requested via Central Control to set the state of internal flip-flops or to read the states of internal points and deliver these as an output. These features permit diagnostic examination of the store itself. The structure of the Program Store and its actions in response to specific commands from Central Control are set forth in detail in the Doblmaier et al. case, and thus the inclusion of the same herein does not appear warranted.

*Call store*

The Call Store 13003 provides the temporary memory required by the Central Processor. The more volatile system information is stored in Call Store. This information includes:

(1) Information relating to calls (e.g., call signaling information);
(2) Recent change information related to subscriber lines and trunks prior to updating the translation information in Program Store;
(3) A network path memory map;
(4) Subscriber line and trunk busy-idle information;
(5) Recent changes in subscriber class of service (e.g., rate) information;
(6) Maintenance information related to program-controlled diagnostic tests; et cetera.

The information contained in the Call Store is organized in words of 24-bits. Each word occupies a word location uniquely identified by an address. There is no restriction upon the sequence in which locations can be addressed, i.e., access is completely random; any word location may be chosen without regard to previous selections. A word can be read in 6.127 microseconds.

As in the Doblmaier et al. case, the basic storage element is a multi-apertured ferrite sheet wherein each hole in the sheet, when excited by coincident current pulses, behaves as a square loop magnetic memory core.

The Call Store system 13003 comprises two independent call stores in accordance with system reliability requirements. A single call store provides random access to 8,192 words of 24-bit length. The memory of each store is divided into two sections, like the Program Store, left-hand section (H) and a right-hand section (G) each containing a block of information. Duplication is achieved by having the information of the H section of one store duplicated in the G section of the second store.

In the normal operating mode, the Call Store serves as a temporary memory for the system, with the ability to read information from a location in memory, send that information to Ceneral Control, and then replace it in the memory location from which it was taken. This "read and regenerate" process is necessary because Call Store is a destructive read out memory. In the normal operating mode, the Call Store also can replace information in a memory location with other information. This is called "erase and write" and consists of the same procedure as before except that new information is written into the memory location in place of the old information that was there.

Information is retrieved from Call Store via a command from Central Control designating an information group code name and an address designating the location of the desired information word within the designated information group. Similarly, information is written into Call Store by a command from Central Control designating an information group code name, an address designating the location which is to receive the data, and the coded data that is to be written into the designated information location. Each information group is, of course, permanently assigned a discrete code name and each block of information is duplicated in the two stores.

Here again, the structure of the Call Store and its actions in response to specific commands from Central Control are set forth in detail in the Doblmaier et al. case. The purpose and function of Call Stores, as well as the other units of the Central Processor, will become more apparent hereinafter from the general description, infra, of the operation of the Central Processor in its handling of a typical call through the office.

*Central pulse distributor*

The Central Pulse Distributor (CPD) 13043 provides Central Control (CC) with fast access to many points throughout the central office. Upon receiving an order from CC, the CPD selects and pulses one of a multitude of outputs (e.g., 512) as specified by the address from CC. These outputs are connected over separate leads to the various points controlled. In essence, the CPD comprises wired logic translators that decode the information furnished by CC so as to energize the corresponding single output point. For purposes of redundancy, the CPD comprises at least a pair of pulse distributors. The units of a pair operate independently of one another. For large offices, a Central Pulse Distributor may comprise a plurality of pairs of pulse distributors (e.g., four pairs).

The Central Pulse Distributor 13043 provides two classes or types of output signals in resopnse to commands from CC. The two classes of output signals are termed unipolar signals and bipolar signals, and are respectively associated with separate pulse distributor output terminals. Both classes of signals comprise pulses transmitted from the CUD output point to the using devices via individual transmission paths.

The most common use of the unipolar signals is to momentarily enable a particular piece of equipment on the peripheral bus, e.g., the Master Scanner, the Teletypewriter, the Program Store Card Writer, et cetra. These enablement signals generally comprise relatively important information; therefore, in response to the enablement signal the enabled unit will normally transmit a "verify" signal back to the CPD over the same transmission path that was used to transmit the enable signal. The verify signal is received at the CPD and is translated to the same form as the address portion of the command which was initially transmitted from CC to the CPD. The translated verify signal is transmitted to CC where it is compared against the address which was initially transmitted. A match assures that the correct unit of equipment was enabled. As pointed out in greater detail in the Doblmaier et al. case, only the unipolar signals are verified and even then not all unipolar user units send back verify signals.

The CPD bipolar signals, of positive or negative polarity, are used to control flip-flops and logic circuitry throughout the central office. If a bipolar signal is of one polarity, a flip-flop may be set to its "1" state, whereas if it is of the opposite polarity, the flip-flop will be set to its "0" state. The function of the Central Pulse Distributor 13043 in conjunction with the various components of the present switching system will become more apparent hereinafter.

*Master scanner*

The Master Scanner 13044 is a unit used by Central Control to monitor the various points throughout the system. Each point to be scanned is connected to a sensing device called a ferrod sensor. More specifically, the ferrods, located in the Master Scanner, are the sensing devices that (1) detect both normal variations and variations from normal, (2) receive periodic interrogation from Central Control, and (3) report to Central Control on conditions throughout the system. Thus, the Master Scanner aids in the supervision of the various circuit elements which reflect the operating condition of the system; the supervisory states of these elements are useful in system maintenance and trouble diagnosis. For example, scan points of the Master Scanner are employed to monitor the voltage levels of critical voltage supplies and the states of control relays and logic packages such as flip-flops to assure the proper operation thereof.

The Master Scanner may comprise one or more scanners, each capable of supervising a multitude of circuit elements (e.g., 512). The scanners of the Master Scanner are not duplicated; however, there is a complete duplication of access circuitry to provide system reliability.

The ferrods of a scanner are typically organized into groups so that a number of them can be interrogated at the same time. A typical scanner contains 512 ferrods arranged in a 16 x 32 matrix, with circuits for access to each row of 16 ferrods and a suitable means for converting the outputs from the ferrods into signals that can be transmitted to CC. The information from CC will direct the access circuitry to interrogate a particular row of ferrods; the scanner then replies with a word (16 pulses) as to the state of the devices being monitored.

A ferrod sensing device is disclosed in the copending application of J. A. Baldwin, Jr.-H. F. May, Ser. No. 26,758, filed May 4, 1960.

The operation of the Master Scanner 13044 in conjunction with the various circuit elements of the instant switching system will become more apparent hereinafter.

*Teletypewriter*

The Teletypewriter 13045 provides a means for communicating information from maintenance personnel to the system and for transmitting information from the system to maintenance personnel.

By means of the Teletypewriter 13045 maintenance and operating personnel may request limited specific system actions. Included in these system actions is the ability to enter into the Call Store 13003 recent change translation information. That is, in the course of daily routine business there are often requirements for changes in directory number to line equipment number translations. For example, when a subscriber line is disconnected for any reason, a new line is added, or changes are made in the service (e.g., rate) afforded a subscriber line, a recent change entry is required. Recent change information is held in Call Store until such time as the coding of Program Store is changed to reflect the recent change information.

In the course of routine operations the system may encounter abnormal or trouble operating conditions and information relating to such abnormal or trouble conditions is printed out on the Teletypewriter for the information of the maintenance personnel.

*Program store card writer*

The words in the Program Store are stored in an array of magnetized and demagnetized bars of magnetic material bonded to an aluminum card. The function of the Program Store Card Writer 13046 is to write new information or to change information previously stored on the magnet cards. Directory changes and other program changes occur from time to time to make such a writer necessary. The word information used by the Program Store Card Writer is obtained from Call Store and reaches the card writer via the peripheral bus 13050. Information for card preparation is entered into the Call Store either by the Teletypewriter or by a magnetic tape. The information to be written on the program cards is controlled by a specific program called the program card preparation program. This program is part of the administrative program for the system. Its function is to load the card writer queue in the Call Store with the information to be written onto the program store cards by the Program Store Card Writer. The inputs to this program consist of the actual information to be placed on the cards and the control inputs received via the Teletypewriter, which determine the combination of information inputs to be used for a particular job. The outputs from this program go to the card writer queue, from which they are transferred to the card writer. The operation of the Program Store Card Writer 13046 is described in detail in the copending application of C. F. Ault-D. Friedman-R. H. Granger-J. J. Madden, Ser. No. 266,962, filed Mar. 21, 1963.

*Bus system*

The control and information transfer between units of the present system are carried out over an A-C bus system. The bus system can be considered as comprising the following three major bus subsystems:

(1) Call store bus;
(2) Peripheral bus; and
(3) Scanner monitor bus.

All of the above bus subsystems consist of cable drivers, balanced twisted pairs, and cable receive circuits.

The call store bus 13060 is used for information signaling between Central Control, Call Store, TDS Control and the Signal Assembler/Distributor Queues. As will be more evident hereinafter, to provide for reliable communication betwen the various units on the call store bus, there is a duplication of the communication paths. Central Control can send to or receive from either of two call store buses. The setting and resetting of certain flip-flops in the units on the call store bus determine the bus to be used. The call store bus consists of two sets of 77 twisted-pair transmission lines used for the transmission of information pulses. The information pulses are 0.5 microsecond pulses with a maximum repetition rate of 6.127 microseconds.

The information transmitted on the call store bus consists of the following three major types:

(1) Information for the selection of a unit on the bus, the mode in which the unit should operate, and the address of a data sink location or source internal to the unit (address bus);
(2) Information consisting of data sent from Central Control, (send bus);
(3) Information consisting of data sent to Central Control (receive bus).

The data transfers on the call store bus between Central Control and the other units connected to the bus are strictly controlled by Central Control through the use of programmed instructions.

The peripheral bus 13050 is used for information transfer between Central Control and the Master Scanner 13044, the TTY 13045, the Card Writer 13046, et cetera. The peripheral bus has the same electrical characteristics as the call store bus and it is likewise duplicated for purposes of relability. The information transmitted on the peripheral bus comprises the following two major types:

(1) Information sent, usually in specially coded form, directing the action of the selected peripheral unit;
(2) Information returned to Central Control by the selected unit, if it is one that answers.

The monitor bus 13070 is used to connect the Master Scanner to the Call Store, Program Store, et cetera, so that the internal conditions of these units may be monitored.

The Central Pulse Distributor is connected to the various units, as heretofore described, via a plurality of twisted-pair transmission lines.

Figure 129:
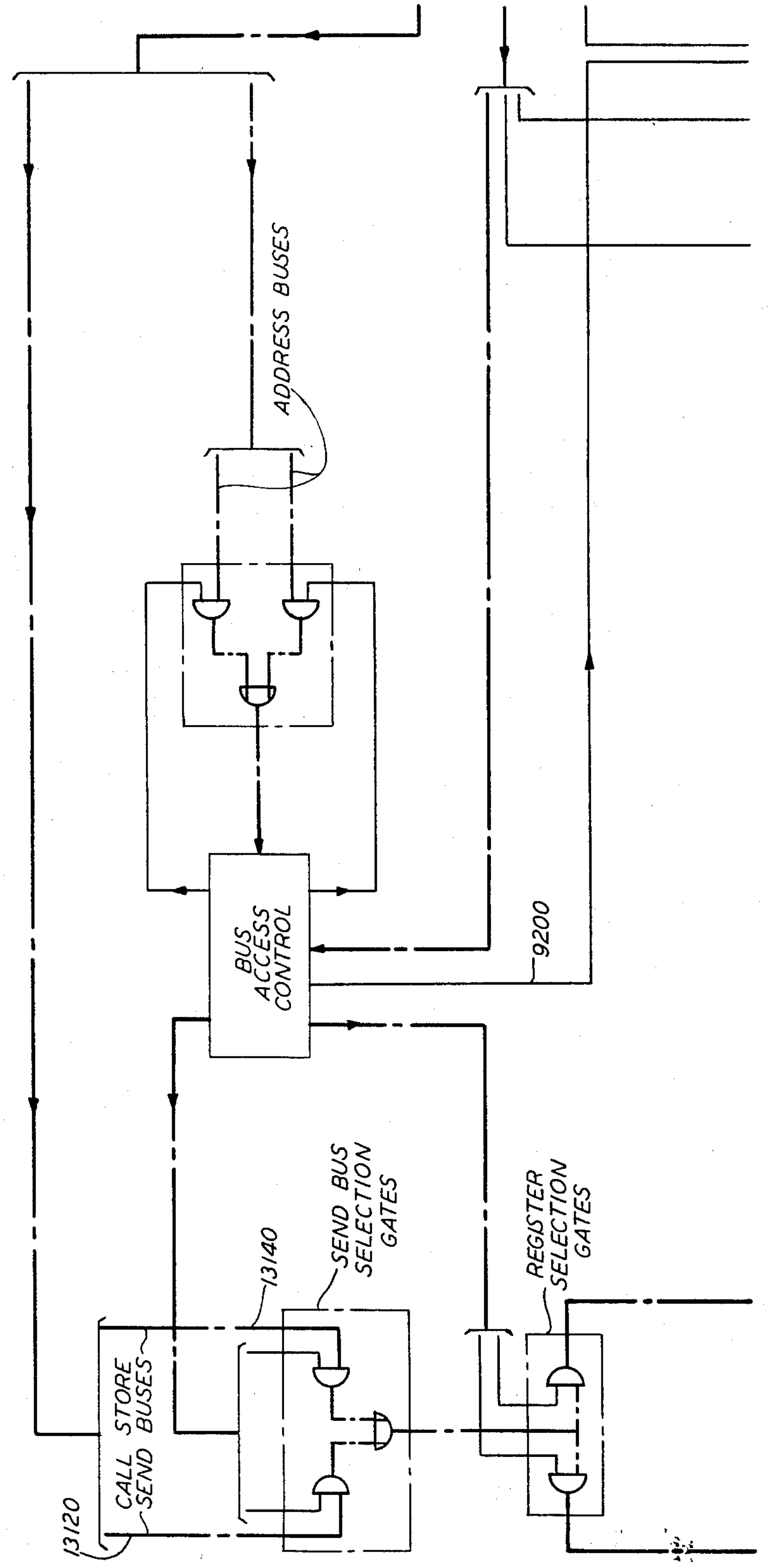
Figure 131:
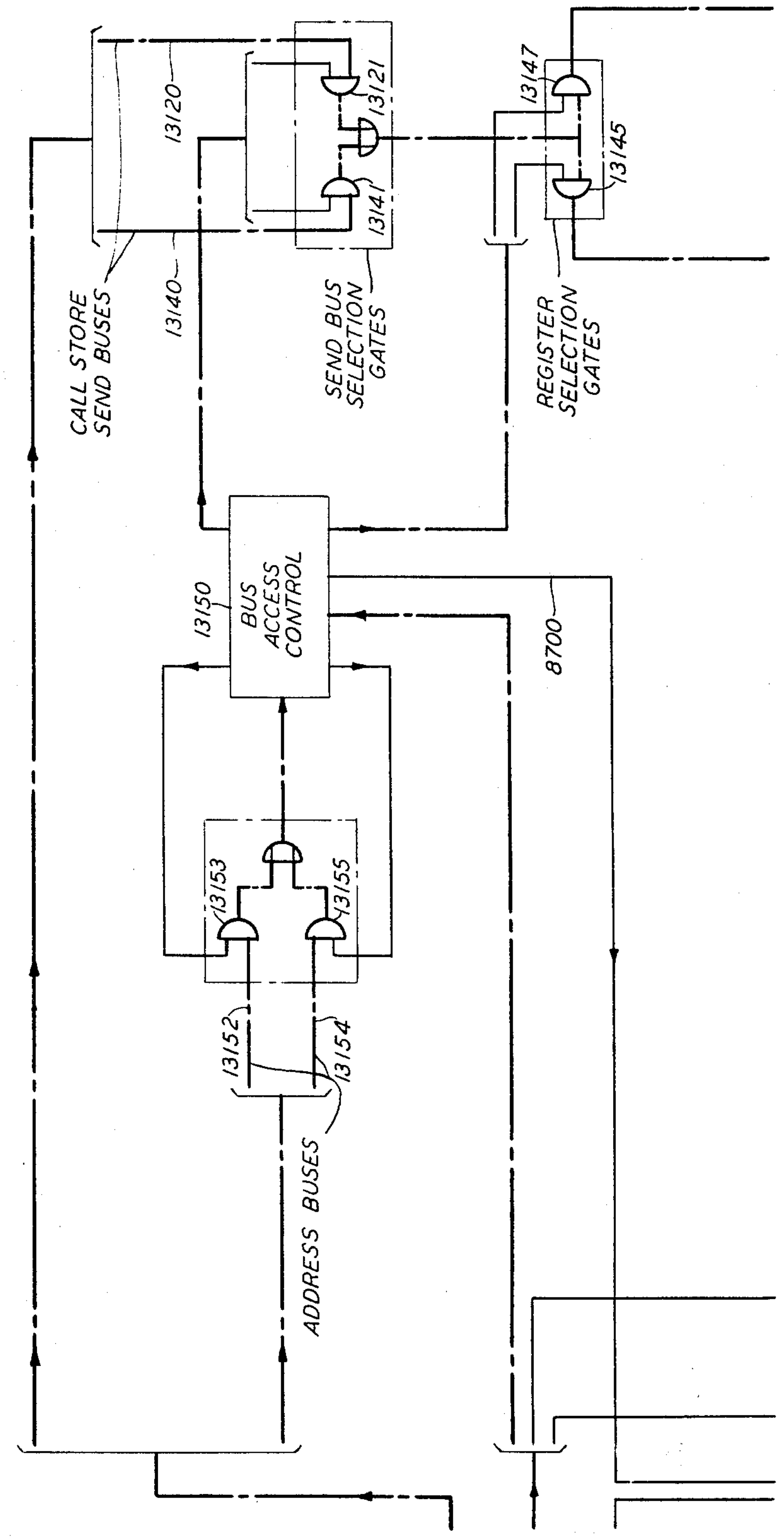

Turning now to FIGS. 129 and 131 of the drawings, the logic circuitry illustrated therein forms the interconnecting interface between the Central Processor and the TDS Control buffer units. In essence, this circuitry causes the call instructions that appear over the call store send buses to be properly loaded in the respective TDS Control buffers. As will be evident from the drawings, the schematic circuit diagrams of FIGS. 129 and 131 are identical and therefore only the latter figure will be described in detail.

As indicated hereinbefore, there is duplication of the communication paths. For the normal in-step mode of operation, heretofore described, the pair of independent central controls will deliver identical call instructions to the call store send buses 13120 and 13140, respectively. Under the control of an enabling signal from the Bus Access Control 13150, one or the other of the send bus selection gates 13121 and 13141 will be enabled to thus couple the registers 8800 and 8900 to one of the call store send buses. As will be evident from the drawings, the call instruction storage registers 8800 and 8900 can be connected to either call store send bus, depending on which of the selection gates 13121 or 13141 is enabled. However, the interconnection of the same is on a mutually exclusive basis, and normally, if the buffer unit of FIGS. 87–89, 94–96, and 101–103 is connected to a respective one of the call store send buses, then the other buffer is connected to the other call store send bus.

The circuits comprising the Bus Access Control 13150 are shown in detail in FIGS. 83 through 94 of the Doblmaier et al. case; these circuits include address and control decoders, time sequencing circuitry and various storage and control flip-flops. The Bus Access Control 13150 will only be described in functional terms herein, reference may be had to the noted application for the detailed schematic circuit diagram.

Under the command of the Central Control, the Central Pulse Distributor will deliver a bipolar signal to a flip-flop in Control 13150 so as to couple the same to one or the other of the address buses 13152 or 13154 on a mutually exclusive basis. Depending on the state of this flip-flop one or the other of the gates 13153 or 13155 will be enabled. This same flip-flop further serves to couple the TDS Control buffer unit of FIGS. 87–89, 94–96 and 101–103 to one or the other of the call store send buses 13120 or 13140, on a mutually exclusive basis as described. The latter interconnection is, of course, via one or the other of the send bus selection gates 13121 or 13141. These interconnections, established by the aforementioned flip-flop, are generally of extended duration—i.e., many, many computer cycles (6.127 microseconds).

During a given 6.127 microsecond cycle, appropriate address bits are delivered to the Control 13150, via one or the other of the address buses, while the first word of a call instruction appears on the call store send buses. Note, the same call instruction appears over both send buses. The address bits precede the send bits in the timing cycle. The address bits include (1) a sync bit which, among other things, initiates the timing sequence circuitry; (2) six code bits that specify the particular unit on the call store bus that is to receive the send bits; (3) twelve unit address bits that specify the address of a data location or source internal to the unit; and (4) a write bit that informs the unit that it is to receive information from Central Control. The Control 13150 decodes the received address bits and, thus appreciating that the bits on the call store send bus are intended for the associated buffer, it will enable the register selection gate 13145 during this 6.127 microseconds' timing cycle so that the first call instruction word is delivered via the call store send bus to word register 8800.

The described operation is substantially repeated during a succeeding timing cycle so that the second word of the call instruction is delivered, via the same call store send bus and the enabled gate 13147, to word register 8900. In this latter timing cycle the twelve unit address bits are, of course, different inasmuch as the other register selection gate 13147, must now be enabled. During this second cycle the timing sequence circuitry in Control 13150 serves to generate the start signal that is delivered via lead 8700 to the timing circuit 8801.

The Control 13150 is not addressed again until a new call instruction is to be written into the word registers of the TDS Control.

As indicated hereinbefore, parity error indications, as well as buffer malfunctioning signals, are delivered to the Master Scanner 13044 via the leads 8590 and 8750. Each of these leads is connected to a respective ferrod sensor. The sensors are periodically interrogated by Central Control and should parity error or malfunctioning indication be encountered, a maintenance routine is initiated. In this regard it should be noted that the Program Interrupt hierarchy is substantially the same as that disclosed in the Doblmaier et al. case. The appropriate maintenance program will first check the call instructions stored in the buffer word registers against the call instructions in Call Store and if a mismatch is detected, correction of the appropriate word register call instruction will be made. If the stored call instruction appears to be correct, the next succeeding level of the sequentialy TDS control operation is checked, i.e., the 1-of-3 and 1-of-8 output translations. This program procedure continues until the malfunctioning buffer circuit is uncovered, at which time a simplex mode of operation is initiated with the malfunctioning buffer temporarily disabled for maintenance. This maintenance procedure comprises no part of the present invention. Maintenance routines similar to this are disclosed in the aforementioned Doblmaier et al. case.

A buffer is disabled and a simplex mode of operation established by setting the flip-flops 8591, 8592, 8791 and 8792 to the appropriate states as heretofore described in the descriptive mateiral dealing with the Time Division Switch Control. These flip-flops are set to the appropriate states by bipolar signals delivered thereto from the Central Pulse Distributor, acting under orders from Central Control.

The output of the parity check circuit 7625 as well as the output of the parity check circuits of Link Control Units No. 2 and 3 are delivered to the Master Scanner 13044. As indicated hereinbefore, it is desirable to distinguish between single and multiple parity errors. To this end the output of each of the parity check circuits is connected to ferrod sensors in the Master Scanner; in addition, the output of each parity check circuit is delivered to a parity error register (not shown) which can be in the nature of a conventional counter. The output of each of these counters is, in turn, coupled to a respective ferrod sensor in the Master Scanner. The sensors are periodically interrogated by Central Control and should a single or a multiple parity error be detected, a maintenance routine is initiated. For single errors, the data stored in the memory loops are checked against the corresponding data in Call Store and if a mismatch is detected the data is once again written into the memory loops. When a link is malfunctioning, however, as indicated by a selected number (e.g., 2) of parity error signals delivered to a parity error register counter, the malfunctioning link must be taken out of service and the calls transferred to the other links of the link group. This latter maintenance program is, of course, different from that used for correction of single parity error detections.

A link is disabled in a manner similar to that in which a TDS control buffer unit is disabled. That is, there are one or more flip-flops associated with each link for disabling the same. These flip-flops are set to the appropriate states by bipolar signals delivered thereto from the Central Pulse Distributor via the cable 13090. Here again, these maintenance procedures comprise no part of the present invention, and similar maintenance routines are disclosed in the aforementioned Doblmaier et al. case.

Figure 132:
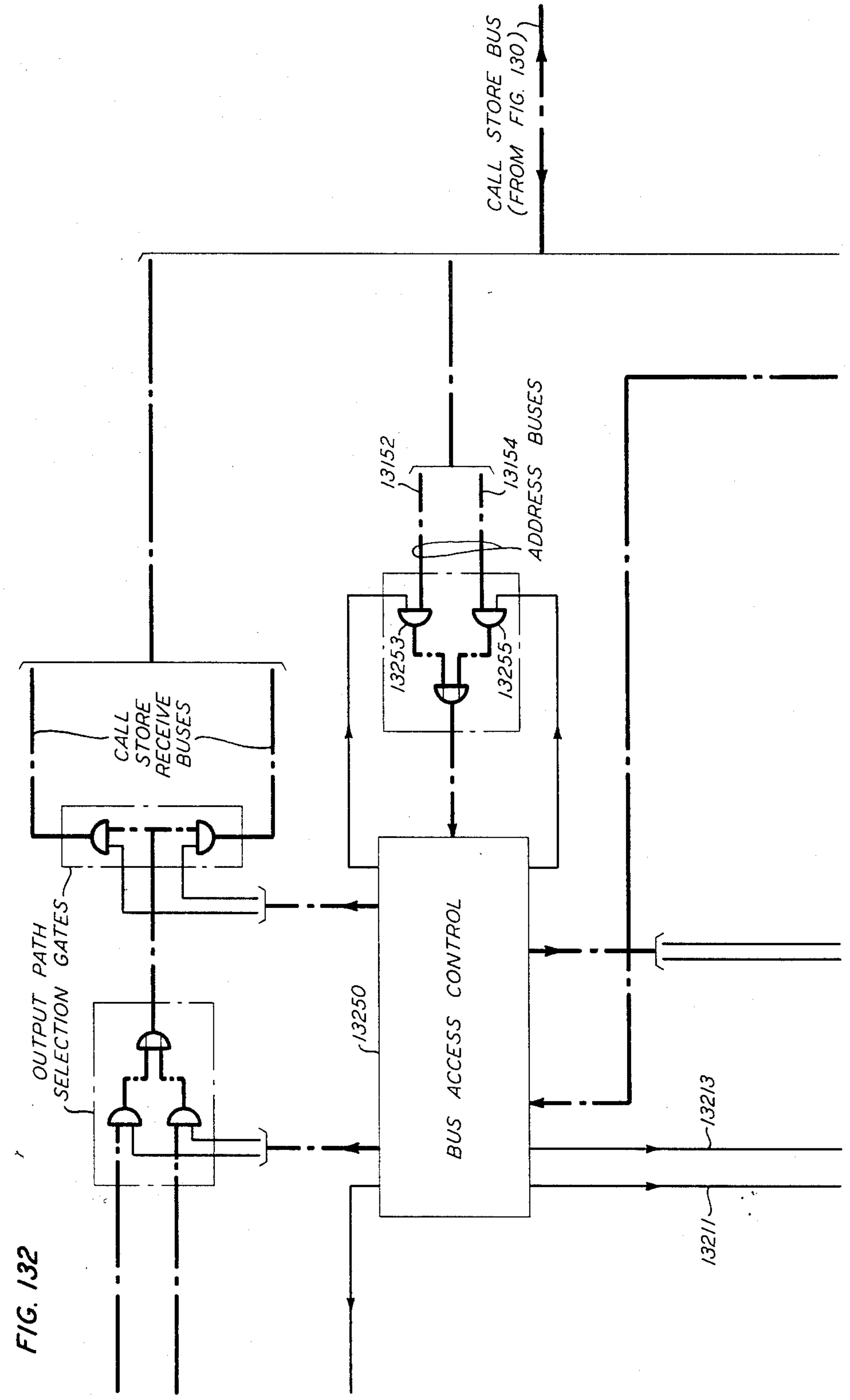
Figure 133:
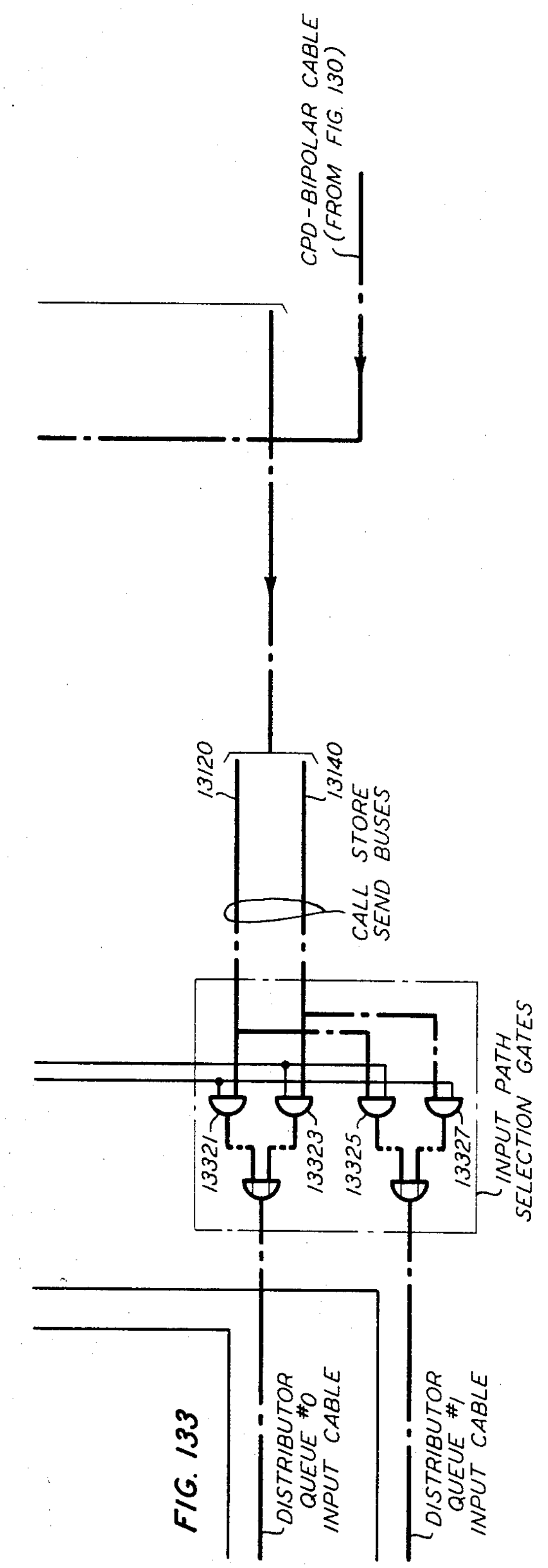

Turning now to FIGS. 132 and 133 of the drawings, the logic circuitry illustrated therein forms the interconnecting interface between the Central Processor and the Signal Word Queue. In essence, this circuitry causes the S-bit data stored in the assembler queues #0 and 1 to be read out therefrom onto the call store receive buses and, further, it causes the S-bit data that appears over the call store send buses to be loaded in respective distributor queues #0 and 1. The bus access control 13250 is similar to the bus access control 13150 and, here again, the circuitry comprising the same is illustrated in detail in FIGS. 83 through 94 of the Doblmaier et al. case.

Under the command of the Central Control, the Central Pulse Distributor will deliver a bipolar signal to a flip-flop in Control 13250 so as to couple the same to one or the other of the address buses 13152 or 13154 on a mutually exclusive basis. Depending on the state of this flip-flop, one or the other of the gates 13253 or 13255 will be enabled. This same flip-flop further serves to couple the distributor queues #0 and 1 to one or the other of the call store send buses 13120 or 13140, on a mutually exclusive basis. For example, if the distributor queue #0 is coupled to the call store send bus 13120 via the enabled gate 13321, then the distributor queue #1 may be coupled to the call store send bus 13140 via the enabled gate 13327. Alternatively, if the distributor queue #0 is connected to the call store send bus 13140 via the gate 13323, then the distributor queue #1 is connected to the call store send bus 13120 via the gate 13325. Here again, for the normal in-step mode of operation the independent central controls deliver identical call instructions to the call store send buses 13120 and 13140.

The address bits delivered to the Control 13250 are of the same nature as the address bits sent to Control 13150, heretofore described. The address bits delivered to the Control 13250, however, include one additional bit of information, namely, a read bit, which informs the unit that it is to *supply* information to Central Control. The read and write address bits from CC are mutually exclusive, i.e., the Control 13250 is sent either a read of a write bit, but never both. If the address bits received by Control 13250 contain a write bit, the Control functions to interconnect the distributor queues to the call store send buses during a 6.127 microsecond timing cycle and, of course, on a mutually exclusive basis. Whereas, if the address bits received by Control 13250 contain a read bit, the control functions to interconnect the assembler queues to the call store receive buses. This latter interconnection is not on a mutually exclusive basis. That is, the output of either assembler queue can be connected to either call store receive bus or the output of either assembler queue can be connected to both call store receive buses. This will be apparent from an inspection of the output path selection gate circuits shown in FIG. 132. As in the case of the input path selection gates, the output path selection gates are set to appropriate states by means of bipolar signals which are sent from the Central Pulse Distributor to flip-flops in Control 13250. As indicated hereinbefore, an assembler queue is accessed and the S-bit data, if any, is read out of the rank (12) stage in one cycle and into Call Store in a second cycle. During this second cycle, the timing sequence circuitry in Control 13250 serves to generate the reset signal that resets the rank (12) stages of the assembler queues. As has been described, this reset causes the S-bit data in the lower ranks to advance.

The leads 13211 and 13213 are connected to respective flip-flops in Control 13250. Should it become necessary to disable a given distributor queue, for reasons of malfunctioning, the Central Pulse Distributor under the command of the Central Control will deliver a bipolar signal to the appropriate flip-flop to set the same to a given state. For example, if the lead 13211 is connected to the (1) output lead of a flip-flop in Control 13250 and this flip-flop has been set to its "1" state in response to a bipolar signal, an inhibit input will be delivered to the gate 11802 and this will effectively prevent any S-bit data read out from distributor queue #0.

To promote a better understanding of the various aspects of the present invention, the following discussion describes in brief the progress of a typical call through the office; and, more particularly, it outlines the measures or steps taken by the Central Processor in establishing the requested call interconnection.

As indicated in the description of the Signal Assembler/Distributor, supra, continuing steady state signals are not transferred to the Central Processor because of the operation of the transfer control logic that comprises part of the Signal Assembler. When a subscriber requests a service interconnection he will go from an on-hook to an off-hook condition, and an indication of this will be delivered to the Central Processor. This on-hook to off-hook signal will also be accompanied by a "precedence" signal word, which is indicative of the precedence the subscriber is requesting. In addition, in many instances (e.g., in the case of a multiparty line station such as the well-known two party or four party line), a station extension identity signaling word is also sent. This signal word sequence constitutes a typical service request.

The above-described signal words are stored in Call Store in the order of arrival. In addition, since other lines and trunks will, in all likelihood, be delivering signaling information to the Central Processor during the same period of time, the described signal words will be interleaved in a main input queue of Call Store (CS) with the signal words from other lines and trunks. The stored signaling information from the respective subscriber lines and trunks is accompanied by 7-bit line identity words as heretofore described.

At a given point in the cycle of the main operational program, an input program is initiated under the direction of the executive control program. The function of this input program is to sort the input signal words which have been loaded into the aforementoined main input queue of CS. The sorting serves to gather together all of the signaling information related to a given subscriber. As indicated hereinbefore, sorting programs are quite common in the art, and any of the same may be advantageously utilized herein; see the above-noted book entitled "Programming and Coding Digital Computers." The sorting operation performed by the input program further serves to place all the signal words received from a particular subscriber line into an input processing buffer, where the kind of buffer is a function of the line's current state, i.e., idle, active, out-of-service, and so forth. In the case of the service request under discussion, the signal words are loaded into an input processing buffer for idle lines. Having assembled the service request in this buffer, the same is now checked to determine if it is indeed a legal service request. If so, a service request indication is then placed in a service request matrix (in Call Store) and the input processing buffer in which the signal words were initially assembled is released, the signals in it having served their purpose. The matrix arrangement is designed so that the precedence, if any, and the station extension identity information are also retained or stored.

At a later point in the main operational program cycle, a service request processing program is initiated. The service request processing program scans the service request matrix and processes the service requests contained therein. Having found a particular service request, this program first determines if there is adequate room at this time in Call Store to store all the data that is needed for establishing a new call connection. Actually, this amounts to determining if there is a "call slot" available in Call Store; a call slot being in essence a group of Call Store registers. A given area of Call Store is set aside and dedicated to call slots. There are, of course, a plurality (e.g., 100) of call slots in this dedicated area of CS, and this permits the concurrent handling of a corresponding number of call interconnections. If a call slot is available, the service request processing program then determines if the necessary facilities are available to establish a connection between the subscriber's M-channel terminal on the time division switch (if M-channel signaling is utilized) and a terminal of the SA/D. The call processing procedure is slightly different for the case where all the signaling is carried out in the S-channel. The latter is the most simple case and it will be discussed briefly hereinafter. The expression "necessary facilities" means whether or not a switching path can be established between the subscriber line circuit position and a given line circuit position to which an idle "framing" circuit is connected; this framing circuit and its function will be described later. Assuming such facility is available, the service request processing program orders a connection through the time division switch matrix so as to implement the necessary connection. This ordering causes the appropriate call instruction words to be read into the buffers of the TDS control, and the latter then proceeds to load recirculating delay line memory loops in the manner heretofore described. In addition, the service request processing program performs several bookkeeping operations in Call Store memory that are germane to this connection. Specifically, it marks the status of the selected call slot as active rather than idle; it identifies the status of the selected framing circuit as active rather than idle; it identifies the status of he selected network path as active rather than idle; the status of the calling subscriber line in a line status table in CS is changed from idle to active; and the identity of the call slot that has been assigned to this call is noted, i.e., it is stored in the line status table at a position that is associated with the calling subscriber's line terminal number. Finally, it enters into the assigned call slot all the information that is pertinent to this connection. This information includes the precedence information, the subscriber identity, the identity of the selected framing circuit, the identity of the TDS network path, and an indication that the call state is service request connection ordered. The service request processing program then relinquishes control to the executive control program if there are no other service requests to be processed.

Under the direction of the executive control program, other call processing programs monitor for the completion of the ordered connection. Upon said completion, a dial tone signal is then sent to the subscriber via the SA/D and the S-channel of the outgoing subscriber line; the state of the call as indicated in the call slot is now changed to indicate that the call has reached a state wherein the subscriber can now dial the heading information.

Upon receipt of dial tone the subscriber "keys" his heading information. The quoted term has reference to the process of depressing buttons, if you will, so as to send out the appropriate coded signal information. The heading which is keyed for a simple two party call consists of a sequence of digits indicative of destination, followed by a keyed end-of-heading (EOH) code.

As will be described in greater detail hereinafter, in the case of broadcast and conference calls, multiple groups of digit destination codes are sent in succession, these being separated by a keyed end-of-address (EOA) code; the last address is followed by a keyed EOH. For purposes of the present explanation, however, a straightforward subscriber-to-subscriber interconnection will be assumed.

The heading signaling information is transmitted via the subscriber's message channel, through the time division switching matrix connection, through the framing circuit, assembled in the Signal Assembler/Distributor and then sent to the Central Processor via the Signal Word Queue. In the Central Processor, the heading signals are stored in the same main input queue of CS, as previously described for the service request signals. The same sorting program which processed the service request signals will process these signals in the same manner, except in this case the heading signals are assembled and placed in an input processing buffer for active lines. At a given time in the main operational program cycle the executive control program transfers control to a processing program which searches for new signal data in the input processing buffers for active lines. Upon finding heading signals in a buffer, it transfers these signals to that portion of the appropriate call slot which is used to store heading signals. This transfer process continues until the EOH signal is received. Upon receipt of the EOH signal, control is then transferred to another call processing program which releases the connection that was established for receipt of the heading signals in the message channel and it undoes that portion of the bookkkeeping which was originally performed by the service request processing program to establish the service request connection. For example, it marks the framing circuit idle, it marks the network path idle, and so forth. The call processing program then proceeds to analyze the heading digits to identify the called party. Upon identifying the called subscriber, the processing program examines the line status table to determine the present status of the called subscriber.

In the event the status of the called subscriber is idle, the call processing program performs several additional checks; for example, are the calling and called party operating at the same bit rate This is the situation that is most common and this will be assumed herein. However, as heretofore explained, it is possible that converters, such as that illustrated in FIG. 140 of the drawings, can be utilized to establish interconnections between subscribers operating at different bit rates. In this instance, of course, the appropriate network paths as well as the busy-idle status of the converters will be examined in the appropriate status tables, and the appropriate paths and converters then selected.

For the assumed case wherein the bit rates of the calling and called party are compatible, the call processing program simply searches for a path in the TDS matrix which will permit an interconnection between the message channels of the calling and the called subscribers. In the event of a multiparty line, a pre-alert signaling sequence is sent from the Central Office on the S-channel to the called party station. This signal sequence identifies which particular party on the line is to receive the call. Each of the parties connected to a multiparty line will, of course, be provided with decoding apparatus which in response to the receipt of the appropriate signal sequence serves to pre-alert the appropriate subscriber subset. In this instance, the subset acknowledges the pre-alert by sending a series of reply signals to the central office. These latter signals contain the identity of the responding subset for purposes of vertification. Upon receipt of vertification, the Central Processor confirms that the correct subset has connected to the line and orders the TDS matrix path connected that was previously selected.

In the more usual instance, it is contemplated that a single subscriber will be assigned to a given line, and hence the above-described pre-alert sequence is not required. That is, the pre-alert sequence is omitted and the network path is ordered immediately. This ordering results in the appropriate call instruction words being read into the TDS Control buffers.

When the TDS matrix interconnection is completed between the calling and called parties, a ring signal is sent to the called party and a ring-notify signal is sent to the calling party in the respective S-channels. Assuming the called party answers, an answer signal is returned from the called party to the central office. Upon receipt of this answer signal the central office sends an answer notification to the calling party. This signal turns off the audible ring tone at the calling party's station. In addition, as will be appreciated by those skilled in the art, the answer notification signal is in effect a go-ahead signal to start transmission from any digital apparatus, such as a teletypewriter, connected to the calling party line. The latter, of course, is unnecessary in the case of person-to-person interconnections.

The state of the call at this point is now in the talking phase and the same continues until either party hangs up. As has been indicated hereinbefore, the information stored in the call slot is continually updated as the state or condition of the call changes; during the talking phase it is, in effect, in a talking state and it will remain in this state until call termination. In addition, of course, the network memory map and other status tables must reflect the actual status of the equipment that are presently involved in this connection. During this talking phase, the off-hook code is sent on a continuous basis in the respective subscriber S channels.

The call is terminated when either subscriber goes from an off-hook to an on-hook condition. Upon receipt of the on-hook signal code from either subscriber, the Central Processor orders a disconnect of the talking path connection. The manner in which the disconnect is accomplished has been described in detail in the previous portion of the description dealing with the TDS Control. Within the Central Processor the call is taken down, all the status tables which were previously marked active are now marked idle, and the call slot is released.

Some of the variations that may be encountered in this basic call are as follows:

(1) The called party is idle but fails to pick up.
(2) The called party is busy.

In the event the called party fails to pick up, the originating party will eventually abandon the call by going on-hook. Upon receipt of the on-hook signal the central office will terminate the call in much the same manner as described.

In the event the called party's line is found to be busy at the time its status or state is tested, one of several possible alternatives may occur. If the precedence of the originating call is of a category that does not warrant pre-emption, a busy signal is immediately sent to the originating party, in which case he will hang up and the call will be terminated. When the calling party hangs up, an on-hook signal is sent to the Central Processor which in response thereto serves to initiate the described terminating sequences. There are two other alternative courses of action and these are termed (1) camp-on and (2) pre-emption. Briefly, for the camp-on situation the Central Processor "remembers" the originating call in the call slot until the called party terminates his current call, at which time the originating call is completed to the called party in much the same manner as described. In order to apprise the originating subscriber that he is camped-on, a special camp-on signal is sent to the originator, and in addition, a call-waiting signal is sent to the called party to advise him that an incoming call is camped-on to his line. This camp-on call processing program is normally initiated only in the event the precedence of the incoming call is of a category which warrants pre-emption and the category of the call in progress is one which also warrants pre-emption, which means that it cannot be pre-empted by another call of equal precedence.

If the precedence of the originating call is of a pre-empt category, while the precedence of the call in progress is a nonpre-empt category, then a pre-empt call processing program is initiated. This program sends a pre-empt signal to the called party and the other party with whom he is speaking so as to advise them that their call is being pre-empted; and, in addition, it terminates the call connection. Upon receipt of the pre-empt signal, the called party is expected to go on-hook and the pre-empt call is then set up in a fashion similar to that described.

The call processing procedures carried out by the Central Processor are essentially the same whether the called party is connected to the same central office as the calling party or to a different central office. As will be clear to those skilled in the art, instead of setting up a call between subscriber lines connected to the same switching matrix, this being the situation heretofore described, the calling party in an interoffice call would be interconnected to an interoffice trunk and appropriate signaling information would be delivered from the originating central office to a tandem or terminating central office. The signaling information would, among other things, identify the called subscriber and identify the trunk facility containing the incoming call. Interswitching center signaling will be covered in greater detail hereinafter.

When a service request is being processed and it is known, by prearrangement, that the heading information is to be transmitted in the S-channel of a subcriber line, then it is not necessary to initially establish a connection between the subscriber's M-channel terminal on the time division switching matrix and a terminal of the SA/D as previously described. Accordingly, instead of doing the various things previously described for the case wherein M-channel, signaling was employed to convey the heading information to the central office (e.g., selecting a path through the matrix, selecting an idle framing circuit, et cetera) it is only necessary to select the call slot to be used, to deposit the requisite data therein, mark the line status active, identify and mark the status of the selected call slot as active rather than idle, and send dial tone. If it is not established, by prearrangement, whether the heading information will be transmitted in the S-channel or the M-channel, the service request signaling sequence would have to contain an indication from the subscriber to the central office as to whether he intends to use the S-channel or the M-channel for the heading information. In response to this indication the Central Processor will then select the appropriate service request processing program and the processing then ensues accordingly.

*The signaling plan*

Basically, the signaling problem is to convey communications control intelligence from one location to another. The problem is essentially twofold: information must be transmitted between digital subscriber stations and the switching center (i.e., central office) to which they are connected and also between adjacent switching centers.

Consider first how digital information is transmitted between two locations: digital information is transmitted as a continuous stream of binary digits—bits. The digital bit stream advantageously utilized herein is divided into groups of 136 bits, a single group being called a frame. Each frame is subdivided into 8 subframes of 17 bits each. The first bit of each subframe is called a supervisory signal or control bit; the other 16 bits are message bits (M-bits). These latter bits constitute the message channel or talking path of the transmission facility. The first bit of subframes 1 and 5 is used to provide framing information, as heretofore described, and they are always transmitted as a binary 1 and 0, respectively. The first bit ($P_1$) of subframe 7 is used for parity check purposes, and the first bit of subframe 3 may be used for encryption purposes, or also for parity check, or for some still further purpose as desired. The first bit of subframes 2, 4, 6 and 8 (i.e., $S_1$, $S_2$, $S_3$, $S_4$) are termed supervisory signal bits—or just simply S-bits. It is the latter four bits that are used for signaling, and the encoding of them conveys the various items of signaling information. The following discussion is concerned with the four S-bits that occur each frame and the manner or plan whereby these S-bits can be advantageously utilized in accordance with the present invention to convey the requisite signaling information.

The above-described format, is the same for all subscriber lines and interoffice trunks irrespective of the digital bit rate thereof. As indicated hereinbefore, the message bits (M-bits) may comprise the multiplexed message bits from a plurality of subscribers, as when sixteen 2.4 kb. subscribers are multiplexed onto 38.4 kb. interoffice trunk; or, alternatively, the may comprise the message bits of a single subscriber on an incoming line or trunk—this being termed a simplex mode of transmission.

The four S-bits of a frame will be called hereinafter an S-character or S-code. As previously described, it is the function of the Signal Assembler to assemble the S-bits received over the respective lines and trunks into S-characters, and once assembled these characters are transferred to the Central Processor. If all the assembled S-characters from all lines and trunks were transferred to the Central Processor, however, the main input queue of the Call Store would be hopelessly overburdened by S-characters, most of which would convey no new signaling information. To overcome this difficulty the Signal Assembler includes transfer logic that decides which of the S-characters or S-codes conveys new signaling information and hence must be transferred to the Central Processor. The rest of the S-codes that contain no new signaling information are accordingly filtered out. To this end, a distinction is made between steady state S-codes and discrete S-codes.

Recognizing that most of the time a message channel of a transmission facility is either in an idle or an active condition, it is desirable to indicate the same by means of signaling. Hence, there is a clear need for On-hook and Off-hook S-codes. The On-hook S-code is transmitted continuously, i.e., frame after frame, as long as the message channel of a transmission facility is idle; similarly, for Off-hook when the message channel is active. Accordingly, On-hook and Off-hook are defined as steady state codes because they are transmitted repetitively on a continuing steady state basis. The On-hook and Off-hook codes are thus "fill" on the S-channel of all subscriber lines and trunks, and hence are analogous to the presence or absence of direct current on a typical telephone transmission circuit.

It is possible that failures in the transmission path or terminal equipment may result in the S-characters degenerating to a full binary zero (0000) or a full binary one (1111) condition on a steady state basis. Hence, these two code combinations similarly comprise steady state codes and can be advantageously utilized by the Central Processor for detecting failures. That is, the receipt of either steady state code is an indication to the Central Processor of a failure in the transmission facility and/or terminal equipment.

There is one other code which is designated as a steady state code. This S-code (1001) is utilized for framing purposes when M-channel signaling is resorted to. The use of this code and a description of M-channel signaling will be given hereinafter.

The remaining S-codes are designated or termed discrete S-codes. A discrete S-code is by definition, one which can be used to convey a discrete piece of signaling information and hence can be transmitted in a frame in the place of a steady state S-code that would normally be transmitted. Exactly how these discrete S-codes are employed to convey discrete signaling information will be covered in detail hereinafter.

The Central Processor is, of course, interested in changes in steady state S-codes and in all discrete S-codes, since these are the signaling events that constitute new signaling information. This, of course, dictated the design of the transfer logic: all discrete S-codes are transferred to the Central Processor and all changes in steady state S-codes are likewise transferred; in addition, the steady state S-code that is received immediately following a discrete S-code is always transferred. For detailed consideration of the transfer logic and its operation reference should be had to the previous portion of the present specification dealing with the Signal Assembler/Distributor.

A point that is significant is that with the universal signaling format utilized herein, the requirements of the transfer logic can be specified without any consideration as to the source of the S-codes, i.e., line or trunk. That is, it makes aboslutely no difference to the transfer logic what kind of transmission facility is connected to the Signal Assembler/Distributor.

With this brief in troduction, the detailed description of the signaling plan can now proceed. The Subscriber Station/Switching Center Signaling will first be described—including M-channel signaling—and this will then be followed by the description of the Interswitching Center Signaling.

*Subscriber station/switching center signaling*

For Subscriber Station/Switching Center Signaling approximately 30 discrete signal words are required. It is a feature of the present invention that these discrete signaling words are comprised of a pair of the aforementioned discrete S-codes. That is, the discrete codes are always transmitted in pairs to convey a given item of discrete signaling information from the subscriber station to the switching center and, of course, in the reverse direction as well. There are a total of 121 "discrete code pair" combinations available for this use. In accordance with the present invention, a particular subset of the same is carefully chosen for the 30 odd items of discrete signaling information. This choice advantageously maximizes the ability to detect transmission errors and it minimizes the chance of one legal combination being changed to a different legal combination. The unassigned codes are, of course, available as spares, but, in general, they are treated as illegal codes. As will be evident from the code assignment list, infra, the discrete code pairs are selected so that the total number of binary one bits in a "discrete code pair" word constitute an even number. This provides 100% protection against an odd number of bits being in error. Thus, the S-codes chosen are not only utilized to convey specific items of signaling information, but they provide as well an inherent parity check indication. The purposes and advantages of parity checking will be obvious to those skilled in the art.

Each code pair selected is assigned a unique meaning such as dial tone, destination digits, end of heading (EOH), end of address (EOA), et cetera. As it becomes necessary to transmit these unique discrete code pairs, the appropriate two discrete codes that make up the pair are sent; one in each of two consecutive frames in place of the steady state code that would normally be transmitted. Immediately after transmission of one or more discrete code pairs, the steady state code that was being transmitted just before the discrete is normally transmitted once again. However, in certain instances a new steady state may be substituted.

CODE ASSIGNMENTS

[Precedence (if any)]

0100 0111—Precedence Category Number 1 (Right of Way)
1110 1110—Precedence Category Number 2
1011 1011—Precedence Category Number 3 (Routine)

[Message handling]

1101 0111—Direct
0111 1101—Store & Forward

[Destination digits]

0010 1000—0
0001 0100—1
0001 1000—2
0001 0010—3
0100 0100—4
0100 1000—5
0100 0010—6
1000 0100—7
1000 1000—8
1000 0010—9

[Control and supervision]

0010 0010—End of Heading
0010 0100—End of Address
0010 0111—Dial Tone
1110 1000—Answer
0100 1101—Pre-empt
1101 1011—Hold
0111 0001—Line Busy
0001 0111—Camp-On
0001 1110—Ring Row
1101 1000—Ring Normal
0010 1011—Audible Ring
0010 1101—Call Waiting
1101 0001—Clear Call Waiting

[Steady state]

On Hook—0101
Off Hook—1010
Framing—1001
No Signal—0000
No Signal—1111

Note: These S-codes also provide an inherent parity check indication.

[Spares]

0001 0001
0010 0001
0100 0001
1000 0001
0100 1011
0111 0010
0111 1000 et cetera

Note: These code words can be assigned signal meanings needed to implement other communication service features such as call booking, intercommunication of maintenance information, et cetera.

[M-channel usage]

1100 0110—M-channel Heading
0011 1100—S-channel Heading

[Broadcast]

1100 1100

[Conference]

1011 0010

A description of the utilization of these various discrete code assignments will now be given. This description will, in general, proceed in the normal sequence in which these code assignments might be generated during a typical call. To aid the reader in attempting to locate a specific one of the above-listed code assignments, each of the code assignments will be capitalized in this description. It should be evident that the code assignments will not appear in this description in the exact order in which they occur in the above list.

To describe a typical sequence of signaling, it should be assumed that a particular subscriber's line is in the idle state. This means that the On-Hook steady state code is being transmitted in both directions. At the time a subscriber wishes to request service, he must operate (e.g. depress) one or two keys on his sub-set. The first key will indicate the precedence of the call he wishes to place. The second key will indicate whether he intends to send his heading information in the S-channel or the M-channel. If, as heretofore mentioned, the channel in wihch the heading information is to be sent is known, by prearrangement, the operation of this second key is of course not necessary. Having placed the station in an "off-cradle" condition, and having operated the noted keys, the station sends the following service request sequence of signals to the switching center. First, a discrete code pair signal is sent to indicate the precedence category. For the sake of this example, we will assume PRECEDENCE CATEGORY Number 3 which is the ROUTINE category. The call processing procedures followed for a precedence call have been described in detail in the previous descriptive matter dealing with the Central Processor. Second, a discrete code pair is automatically delivered to the switching center to identify the particular station extension (in the multiparty line case) that is originating the service request. The particular signal that is sent in this case is one of the DESTINATION DIGITS which uniquely identify a particular station on this line. Third, an M-channel or S-channel usage signal is sent, if necessary, to indicate whether the heading information will be transmitted in the S-channel or the M-channel. As indicated hereinbefore, in response to this indication, the Central Processor will select the appropriate service request processing program. In addition, in the event the heading is to be transmitted in the M-channel, the station automatically transmits the steady state FRAMING signal in the message or M-channel. The signaling sequence is, in essence, the same whether the heading information is sent in the S-channel or M-channel. For S-channel signaling the heading information is substituted for the steady state OFF-HOOK fill which is being transmitted on a continuous basis; alternatively, if the heading is to be sent in the M-channel, the appoprιate S-codes are substituted for the steady state FRAMING code that is being sent on a continuous and repetitive basis.

Upon receipt of the service request sequence of signals at the switching center, the necessary control or processing are taken to give the subscriber service, as described, supra, in the previous descriptive matter dealing with the Central Processor. Upon completion of these steps the DIAL TONE signal is sent from the switching center to the station and, in addition, the steady state signal being transmitted from the switching center to the station is changed to OFF-HOOK. Upon receipt of the DIAL TONE signal the station generates an audible dial tone for the benefit of the subscriber.

Upon hearing the audible dial tone, the subscriber "keys" his heading information. As each heading key is keyed, i.e., depressed, the appropriate discrete code pair is transmitted to the switching center. A typical heading sequence comprises, first, the message handling information, such as DIRECT or STORE AND FORWAD. As the name implies, the DIRECT signal word indicates that the call is to be handled on a real time basis, while for the STORE AND FORWARD word the call will be routed through the switching center to a storage unit, such as drum storage, and it will be stored therein until a subsequent time at which it is forwarded to the called subscriber. Store and Forward operation is described in detail in the copending patent application of H. G. Kienzle-R. E. Swift Ser. No. 371,135, filed May 28, 1964. At this time if there were any other features which the system might provide and which the subscriber would care to designate employment of, such as a privileged information category, the appropriate keys on his station subset would be operated to designate these features, and the corresponding signal information would be transmitted to the switching center. These latter signals would, of course, be assigned from the list of the space signals in the code assignment list.

Following the keying of the above-noted heading preamble type information, the subscriber then keys the identity of the called party by operating the destination digit keys on his station set. As each key is depressed, the appropriate DESTINATION DIGIT signal is sent to the switching center. The particular number of destination digits that is dialed for each addressee (or group of addressees, if there is a repertory dialing feature in the system) is of course dependent upon the particular numbering plan for the system being considered.

Normally, a single destination address would be keyed. However, in the case of broadcast and other multi-address calls the subscriber will key additional destination addresses, each address consisting of a group of DESTINATION DIGITS. In the case where more than a single destination address is transmitted, the subscriber keys the END OF ADDRESS (EOA) signal, following each destination address. Following the last destination address, the END OF HEADING (EOH) signal is keyed.

As previously described, the heading information as it is received at the switching center is stored in the call slot assigned for this call. Upon receipt of the END OF HEADING signal, the heading information is processed and in the event the heading was transmitted in the M-channel the connections provided for this purpose are disconnected.

The switching center then proceeds to analyze the heading to determine the type call and the identity of the called party. Assuming a simple two-party intraoffice call and the case in which the called party's line is in an idle state, the switching center proceeds to prealert the called party. To do this is changes the steady state signal being sent to the called station from ON-HOOK to OFF-HOOK and, in addition (in the case of a multiparty line), it sends a discrete code pair signal which identifies the particular station extension to be alterted on the line. This discrete code signal is one of the DESTINATION DIGITS codes. The particular station extension which is being alerted recognizes this prealert signal and acknowledges the prealert by sending a series of reply signals to the central office. These latter signals consist of a series of DESTINATION DIGITS which identify the directory number of the extension being alerted.

When the response to the prealert is received by the switching center, it confirms that the correct subscriber subset has connected to the line. If, indeed, the correct subset has responded, the switching center transmits to the called station an alert signal sequence which consists of either a RING ROW or RING NORMAL depending upon the precedence of the call. The RING ROW (ring right-of-away) indicates that the precedence of the incoming call is of a category that warrants pre-emption. The handling of a pre-empt process has been briefly described in the previous portion of the description covering the Central Processor. In addition, the switching center can at this time send other discrete code pair signals to indicate special call information; for example, privileged information category, indications, if any. In response to receipt of these alerting signals, the subscriber's subset "rings." In the case where a RING NORMAL signal is received, normal ringing occurs; e.g., 2 seconds of ringing followed by 4 seconds of silence. In case the RING ROW signal is received, rapid ringing occurs; e.g., ½ second of ringing followed by ¼ second of silence.

At the same time that the switching center sends the alert signals to the called party, it also sends an AUDIBLE RING signal to the originator. Upon receiving the AUDIBLE RING signal, the originator station generates an audible ring tone to indicate to the originator that the called party is being rung.

When the called party answers, a steady state OFF-HOOK signal is sent to the switching center. The switching center then sends an ANSWER signal to the originating station. As has been described heretofore, the ANSWER signal causes the audible ring tone to be turned off at the orignating subscriber's station. In addition it acts in effect as a notification or a go-ahead, which tells the calling subscriber's station to go ahead and start transmission from any particular digital apparatus, such as a teletypewriter, connected to the calling subscriber's station. In this latter respect the ANSWER signal is, of course, superfluous in the case of person-to-person interconnections.

The call is terminated when either subscriber goes from OFF-HOOK to ON-HOOK. The switching center responds by sending the ON-HOOK signal to both stations and it terminates the call.

In the event the called party's line is found to be busy at the time the Central Processor tests its state or status, and if there is no cause for pre-emption, as was discussed previously, the switching center sends a LINE BUSY signal to the originator. The originator station generates an audible busy tone upon receipt of this signal so as to notify the originator who then will go ON-HOOK.

If the switching center finds it necessary to pre-empt a nonright-of-way call which is blocking completion of the new call, it sends the PRE-EMPT signal to both stations busy with the blocking call and then terminates the blocking call by sending the ON-HOOK signal to each station. The new call is then completed in the normal way.

In the event, the called party's line is found to be busy with a right-of-way call at the time the switching center checks its state or status, and in the event the originator has specified a right-of-way call, the switching center will cause the originating call to "camp-on" to the called party's line, as described heretofore. The switching center then sends the CAMP-ON signal to the originating station. In response, the originating station generates a camp-on audible tone to advise the originator.

Under those situations where a CAMP-ON signal is sent to the originator, a CALL WAITING signal is sent to the called party who is currently busy with another right-of-way call. In response to the receipt of this signal, the called party's station turns on a call waiting lamp to notify the called party that he has another right-of-way call waiting. In the event the called party does not answer the new call in a reasonably short period of time, and the originator elects to abandon the new call, a CLEAR CALL WAITING signal is sent to the called party so that his station can extinguish the call waiting lamp.

Under the call waiting situation which was just described, the called party can answer the new incoming call in one of the two ways:

(1) He can terminate the current call by going on-hook, in which case the new incoming call will be completed in the normal fashion, or (2) He can hold the current call while he answers the new originating call. To do this he keys a HOLD signal to the switching center. The switching center then completes the new originating call and places the other party in a camp-on situation. If the held party at any time abandons the call the CLEAR CALL WAITING signal is sent to the holding station. It should be noted that a party who is holding a call can interchange the held call with the call currently in progress as many times as he wishes by keying the HOLD signal.

The sequence or flow chart illustrated in FIGS. 144 to 147 of the drawings illustrates the sequence of operations involved in handling a typical routine call. This chart should be self-evident to those skilled in the art and it follows directly from the preceding discussion and that covering the functional operation of the Central Processor in handling a typical call request.

The present signaling plan taken in conjunction with the automatic data processing apparatus advantageously utilized herein is extremely versatile and capable of providing a wide variety of service features beyond the more basic features described above. For example, if a high degree of reliability in the transmission of signaling information is required, one of the spare signals can be designated as an ACKNOWLEDGE signal (e.g., 0111 0100). For each discrete signal word sent from the switching center to a subscriber station, the station will send an ACKNOWLEDGE signal back to the switching center. Failure to receive back an ACKNOWLEDGE signal for each signal sent indicates to the switching center that the signal sent was lost. In this event, the switching center retransmits the discrete signal word. For discrete signals sent from the subscriber station to the switching center, however, no acknowledgment is required. In all cases, the acknowledgment is implicit in the response of the switching center (even if this response is the result of relaying a signal back from the subscriber at the remote end of the connection). Lack of a response necessitates the subscriber's repeating the signal or taking some other appropriate action, dependent upon the signal lost. Another example is the case where a call connection is established between two data machines, such as teletypewriters or two tape machines. In this case, the originating machinery starts to transmit the data message when the answer signal is received at the originating station. When the originating machine has completed the transmission of the message, it causes an END OF MESSAGE (e.g., 1000 1011) to be transmitted to the switching center which in turn relays the same to the called station. When received at the called station a check can be made either automatically or manually to determine if the message was received correctly. If it was, the called station would then cause a MESSAGE OK (1110 0001) signal to be sent to the switching center which, in turn, relays the MESSAGE OK signal to the originating subscriber station. At this time the originating station has the option of sending a second message or terminating the call. On the other hand, if the called station determines that the message was received incorrectly, it would send a MESSAGE ERROR signal (0111 1110) to the switching center which, in turn, would relay this signal to the originating station. Upon receipt of the MESSAGE ERROR signal, the originating station would repeat transmission of the message.

A further signaling feature that can be readily implemented herein is the call booking feature. In the event an originator's call cannot be completed because the called station is busy, the originator can key a CALL BOOKED signal (e.g. 1000 0111) to the switching center and then go on-hook. In this case, the switching center will "remember" the call and when the called party is available will call back the originator and complete the call as originally specified. These call signaling features are given merely by way of example to indicate the wide flexibility and versatility that can be obtained utilizing the signaling plan of the present invention in conjunction with the switching center automatic data processing equipment.

There are two multiaddress type calls capable of being handled by the present time division switching system, these being broadcast calls and conference calls. For those subscribers necessitating such a facility, the subscriber subset is provided with two additional keys which, when depressed, would advise the Central Processor that a broadcast or conference call connection is desired. If the originator of the call desires a broadcast call interconnection with a plurality of listeners, he would key the BROADCAST signal (1100 1100) in the preamble just prior to keying the destination addresses. Whereas, if the originating subscriber should desire a conference call interconnection with a plurality of conferees, he would key the CONFERENCE signal (1011 0010) in the preamble again just prior to keying the destination addresses. As has been indicated hereinbefore, the usual practice is for the originator of a conference call to maintain voice control throughout the conference. Thus, when he is interconnected to the other conferees he will advise them of the purpose of the conference and convey any other information desired. In most instances it will be necessary that one or more of the other conferees be placed temporarily in the talking postion sometime during the conference. To this end, the conference leader will once again key the CONFERENCE signal followed by the destination address of the conferee to be put in the talking condition. Upon receipt of this signaling information, the Central Processor will select the appropriate conference processing program, whereby the designated conferee is permitted to talk. The manner in which this is carried out within the time division switching matrix has been described in detail hereinbefore. At a later stage in the conference the conference leader, if he should desire to transfer the talking position to another and different conferee, will once again key the CONFERENCE signal and the appropriate destination address of the new conferee to be placed in the talking position. In substantially the same manner he can once again place himself back into the talking position; or, alternatively, terminate the conference by going on-hook.

As will be appreciated by those skilled in the art, an alternative to the described conference arrangement is the utilization of a conventional conference bridge circuit interconnected to respective line terminal circuit positions of the time division switch matrix. The utilization of such a conference bridge interconnected to terminals of the time division switch simplifies the procedures to be employed by the originator of the conference in administering the conference, and consequently it simplifies the signaling, i.e., it is no longer necessary for the originator or conference leader to specify which conferee is to talk at any given time. All conferees have the privilege of talking at any time. The utilization of a conference bridge, however, has the limitation that it is a further piece of equipment of modest complexity and ample cost. Whether or not the advantages to be gained from the use of such a conference bridge justifies the cost thereof would have to be determined in the particular circumstances wherein use of the same is contemplated.

*Message channel signaling*

At the subscriber transmission rates of 40.8 kb. and 2.55 kb., for example, the supervisory S-bit rates are 1200 b.p.s. and 75 b.p.s., respectively. For most subscriber signaling to a switching center the 1200 b.p.s. rate will normally prove adequate and therefore for 40.8 kb. subscribers lines all signaling can usually be carried out using the S-channels thereof. However, the 75 b.p.s. bit rate is not adequate; this is particularly true for those instances when heading information is to be sent from a 2.55 kb. subscriber station to a switching center. The heading information, it will be recalled, comprises a preamble having one or more discrete code pairs followed by a plurality of destination digits.

In the case of interswitching center signaling the large volume of signaling data that must be conveyed back and forth and the speed of service requirements make it desirable to utilize a signaling facility of at least 1200 b.p.s.; in some cases even this rate is not entirely adequate. To overcome the above-noted deficiencies inherent in S-channel signaling it is a feature of the present invention to advantageously utilize a message channel (hereinafter termed M-channel) to convey, at the least, the heading information between subscriber stations and a switching center and for interswitching center signaling to convey most all the signaling information.

As has been described hereinbefore, if heading information is to be sent in the M-channel, the subscriber will provide an indication of the same by keying the appropriate discrete code pair (1100–0110). This "M-channel usage" signal word is delivered in the S-channel to the switching center which, in response thereto, selects the appropriate service request processing program. An operational or functional description of this processing program appears in the preceding portion of this description dealing with the Central Processor. In a similar manner, for inter-switching center signaling, the S-channel is initially utilized to alert a remote switching center to the fact that signaling information is to be sent over a particular 2.55 kb. interoffice trunk facility. It should be noted that in addition to 2.55 kb. interoffice trunks, a 2.4 kb. M-channel of a 40.8 kb. multiplex trunk can be utilized for signaling in exactly the same way by simply utilizing the multiplexing capability of the time division switch to separate the appropriate 2.4 kb. M-channel out of the 38.4 kb. multiplexed M-channels of the 40.8 kb. multiplex trunk.

The SA/D is capable of assembling, and conversely distributing, the S-bits of a plurality of lines and trunks of different digital rates with different relative frame positions. However, to accomplish the same, it was indicated hereinbefore that additional data indicative of rate and frame is required. To this end, appropriate "S-phase" and "$F_1$ frame" signals are coupled to the respective line terminal circuits of the SA/D. An S-phase signal indicates that there is new S-bit data being presented to a given line terminal circuit and this information is utilized to control the read in to the delay loop of the Assembler. An $F_1$ frame pulse occurs every fourth S-bit (see FIG. 3) and its occurrence is indicative of the receipt of a complete 4-bit S-code. The $F_1$ frame pulse is thus utilized, in conjunction with the transfer logic of the Assembler, to test to see if a stored 4-bit S-code should be forwarded to the Central Processor. It should be apparent at this point that similar S-phase and $F_1$ frame pulses are therefore necessary for M-channel signaling.

As will be more evident hereinafter, the necessary S-phase signals can be readily derived, but the regular $F_1$ frame pulses that occur once per frame are not suitable for the assembly operation when M-channel signaling is utilized. This is so for two reasons. First, the signaling information (i.e., S-words) sent in the M-channel are not necessarily synchronous with the frame format illustrated in FIG. 3. In addition, the operation of the SA/D requires a framing bit for every fourth S-bit and, as will be readily apparent from the FIG. 3 format (assuming a 2.4 kb. rate), the framing bits ($F_1$ and $F_0$) are separated by a total of 64 M-bits. Accordingly, it is necessary that additional framing information be provided when S-words are sent over an M-channel. In accordance with a feature of the present invention, this is advantageously accomplished by sending the FRAMING S-word as a steady state fill signal on the M-channel. The required framing information can then be derived from this FRAMING S-word.

The 4-bit steady state S-code allocated for FRAMING must be nonrepetitive within four bits, such as 1001. A code such as 0101 or 1010 is clearly not suitable for this purpose. This will be readily apparent from the following lines of these repetitive S-codes;

1001100110011001100110011001100110011001
0101010101010101010101010101010101010101

The first line represents the FRAMING S-word utilized herein. As will be seen, this code is nonrepetitive within any given 4-bits; whereas, the code of the second line is repetitive.

The designated FRAMING S-code is sent continuously as steady state fill on the M-channel. Each discrete S-code that comprises a discrete item of signaling information is transmitted in the place of a steady state framing code, i.e., it is substituted for the same by a simple "overwriting" insertion process. The framing fill in the M-channel will repeat every four bits without regard to the frame format, and the discrete codes will be disposed at various positions in this bit stream. The operating procedure is essentially the same irrespective of transmission rate. For a simplex 40.8 kb. transmission facility, however, the 38.4 kb. message bit stream is modulated at a 2.4 kb. rate. That is, each successive 16 message bits are similar (i.e., all will be either a binary one or binary zero). Thus, each 16 message bits will represent one bit of signaling information and hence 64 successive message bits will represent a given S-code, be it either the steady state framing code or a discrete S-code. To repeat, there need be no synchronization whatsoever between the signaling information in the M-channel and the frame format. In fact, the above-described 16 similar message bits representative of a single bit of signaling information can actually straddle a subframe supervisory bit.

To accommodate the above-described M-channel signaling, a digital signaling frame recovery circuit (more simply, a framing circuit) is interconnected between a line circuit position of the time division switching matrix and a line terminal circuit of the SA/D. In practice, there will in most instances be several of these frame recovery circuits interconnected between respective terminals of the time division switch and the SA/D; the exact number will be determined by the anticipated signaling traffic. When M-channel signaling is to be utilized, the Central Processor under program control establishes a connection through the time division switch matrix between the M-channel of the appropriate subscriber line or interoffice trunk, as the case may be, and the intraoffice trunk line circuit position to which an idle framing or frame recovery circuit is connected. The S-words that are sent over this M-channel are routed through the time division switching matrix to the chosen frame recovery circuit and thence to one of the SA/D terminal circuits T0–T67. From the S-bit stream, the frame recovery circuit derives the requisite framing information and sends it, together with the S-bit stream and S-phase signals, to the line terminal circuit of the SA/D.

The incoming S-bits in a given M-channel are routed through the switch from one line circuit position to the other in exactly the same manner in which a typical message talking path is established. All that is really different is that these incoming S-bits are routed to an intraoffice trunk line circuit position to which an idle frame recovery circuit is connected. Since the signaling in an M-channel will be at a 2.4 kb. rate, an interconnection through the switch will be established once per office cycle. It should be noted in this regard that the bit stream output from the line and/or interoffice trunk Terminal Circuits is a "non-return-to-zero" type signal; for example, the output flip-flop 1040 of the Supervisory Bit Stripper Circuit of FIG. 10 presents a "non-return-to-zero" type signal to the switching matrix. Accordingly, for a typical simplex 38.4 kb. message bit rate modulated at a 2.4 kb. rate for the transmission of S-words from a subscriber's station to the switching center, the bit stream output of the Terminal Circuit will be converted to a 2.4 kb. non-return-to-zero bit stream. That is, each 16 successive bits in the message channel, which are representative of a single bit of signaling information, are delivered via single-to-double-rail circuitry to the same set or reset terminal of the Terminal Circuit output flip-flop (e.g., 1040). Thus, the flip-flop remains in the same state for the duration of the 16 bit period, this duration being equivalent to a 2.4 kb. bit period. Accordingly, the M-channel signaling bits can be switched through the time division switching matrix at a 2.4 kb. rate.

A digital signaling frame recovery circuit is shown in FIG. 148 of the drawings. The S-bits, that are routed through the switching matrix to the line circuit position to which this frame recovery circuit is connected, appear over lead 14801. These S-bits are connected via lead 14802 directly to a given terminal circuit of the SA/D, and also to the input of the eight stage shift register 14803 via the single-to-double rail gate circuit 14804. As described, the S-bits occur at a 2.4 kb. rate and they are advanced into and through the shift register under the control of the 2.4 kc. waveform derived from the central timing unit. The AND gate 14805 is connected to either the (1) or (0) output lead of each of the eight stages of the shift register. As shown in the drawings, it is connected to the (1) output lead of stage (1), the (0) output leads of stages (2) and (3) and the (1) output lead of stage (4); this connection pattern is repeated for the stages (5) through (8). There is a correspondence between these interconnections of AND gate 14805 with the shift register stages and the steady state FRAMING code (1001). Only when two successive FRAMING codes (1001 1001) are stored in the eight stage shift register will the shift register deliver a complete enabling input to the AND gate. That is when, and only when, two successive 4-bit FRAMING codes are shifted into the shift register will the AND gate 14805 be enabled so as to deliver an input signal to the set terminals of the 2-stage counter 14807. The $\overline{2.4}$ kc. waveform is also delivered to AND gate 14805 and it specifies at what point in the 2.4 kc. period the setting of the counter stages occurs. The setting of the two stages of the counter 14807 to the "1" state serves to enable the AND gate 14808 which then delivers a "pseudo-framing" pulse ($F_1$) to the appropriate terminal circuit of the SA/D. The term "pseudo-framing" is used to distinguish this pulse from the regular $F_1$ framing pulse that marks the beginning of each frame of each digital bit stream. Each of the stages of the counter are set to their "0" state by the next input cycle of the 2.4 kc. waveform. As succeeding cycles of the 2.4 kc. waveform are delivered to the input of the 2-stage counter 14807, the latter will count in typical binary fashion and recycle. Thus four distinct counting states are successively and cyclically established in the counter under the control of the 2.4 kc. timing waveform. In each counting cycle the two stages of the counter are set to their "1" state and the AND gate 14808 will thus be enabled once every fourth 2.4 kc. period to thereby deliver another pseudo-framing pulse to the SA/D terminal circuit. Accordingly, a pseudo-framing pulse is generated every fourth 2.4 kc. cycle and hence it is correspondingly generated for every fourth 2.4 kb. S-bit.

The shift register 14803 will periodically deliver, via AND gate 14805, an enabling "set" signal to the two stages of the counter 14807. This occurs whenever a pair of juxtaposed 4-bit FRAMING codes are shifted into the register. However, if there is no loss or slippage in timing, the stages of the counter 14807 should in each instance normally be in their "1" state in the repetitive counting cycle. Thus the counter 14807 is figuratively a "flywheel" that is initially set to the proper phase and thereafter maintained in phase by the periodically occurring pulses derived from the shift register.

An S-phase signal is indicative of the fact that there is new S-bit data being presented to the SA/D. In the present case, the incoming S-bits occur at a 2.4 kb. rate and since it is necessary that each of these be read into the Assembler delay loop, it is necessary that an S-phase signal of corresponding rate be applied to the appropriate flip-flop of the SA/D line terminal circuit. The same is accomplished herein by simply connecting the $\overline{2.4}$ kc. timing waveform, as the S-phase signal, to the line terminal circuit.

The Signal Assembler scanner has a scan cycle of 416⅔ microseconds, which is equivalent to one 2.4 kc. period. Accordingly, the SA/D can accept and handle S-bit data up to a maximum rate of 2.4 kb.

The S-words that are sent over an M-channel are assembled in—and conversely, distributed by—the SA/D in exactly the same way as if they were being transmitted over an S-channel, and the pseudo-framing pulse ($F_1$) and the S-phase pulse derived from the frame recovery circuit are utilized in exactly the same manner as heretofore described. That is, the pseudo-framing pulse is the full functional equivalent (for assembly purposes) of an $F_1$ framing pulse normally supplied by a subframe clock pulse generator-distributor.

Because interswitching center trunk M-channels can be used as described, the flexibility exists to utilize any trunk facility between two switching centers at any time, as required for signaling, by simply changing the connections in the time division switch.

*Interswitching center signaling*

In order to establish, control and terminate interswitching center calls, and to transmit system control information between switching centers, an Interswitching Center Signaling Plan is required which satisfies the following objectives:

(1) It must have the capability of transmitting a large variety of call control and system control information between switching centers. By "variety" is meant a wide range of information content.

(2) It mus tbe capable of transmitting the signaling information accurately and reliably.

(3) It must be able to transmit a relatively large volume of signaling information and it must transmit the same in as short a time as possible so that reasonable speed of service requirements can be satisfied.

The foregoing objectives are achieved in accordance with the present invention by the Interswitching Center Signaling Plan to be described.

The Subscriber Station/Switching Center Signaling heretofore described could be utilized to convey the necessary signaling information between switching centers. The various discrete code pairs could be given unique signal meanings for interswitching center signaling and various combinations and permutations of the same would all the requisite signaling data that must be sent back and forth between switching centers. However, as will be clear hereinafter, the use of the same for interswitching center signaling would not be efficient in the bit usage sense and, as a corollary, would not satisfy the necessary speed of service requirements. For example, using discrete code pairs, a given destination digit requires the transmission of a discrete code pair comprising 8 S-bits. Thus, for a 4-digit destination address, 32 S-bits are needed. Now it will be apparent to those skilled in the art that any given one of the 10 destination digits can be appropriately designated using only 4 binary bits (e.g., destination digit 9 is 1001 in binary coded decimal form) and hence for a 4-digit destination address only 16 binary bits (i.e., S-bits) need be transmitted.

Any significant saving in the number of bits that must be transmitted to convey a given item of signaling information will necessarily result in a concomitant advantage in speed of service. For this reason, the previously described Subscriber Station/Switching Center Signaling is not suitable for signaling between switching centers. However, the cost per subscriber station for the installation of equipment necessary to utilize the signaling plan to be described hereinafter cannot be justified. That is, it is desirable to keep the subscriber station equipment as simple as possible. On the other hand, the extensive capabilities of the Central Processor utilized herein make it practical to incorporate, for interswitching center signaling, a more sophisticated signaling plan which possesses the advantages cited above.

The signal coding technique utilized herein permits the transmission of an unlimited variety of information between switching centers, and for this reason the expression "universal coding scheme" is used to appropriately define the same. In fact, as will be more apparent hereinafter, an almost infinite variety of signaling information can be sent between switching centers utilizing this universal coding scheme. And as will be clear to those familiar with signaling plans, the universal coding scheme to be described is amenable to, and can be adapted for, signaling supervision in any of the existing communication systems.

As indicated by the table, infra, there are only 16 signaling characters available for interswitching center signaling. The universal coding scheme utilizes 8 of these 16 available signaling characters. The 8 signaling characters chosen are those that have odd parity.

| Inter-Switching Center Signaling Characters | Parity of Signaling Characters | Last 3 Bits of Odd Parity Signaling Characters | Transmitted Digital S-Character | Analog Tone Combination (A/B c.p.s.) |
|---|---|---|---|---|
| [1] 0000 | EVEN | | | |
| 0001 | ODD | 001 | 0001 | 700/900 |
| 0010 | ODD | 010 | 0010 | 700/1100 |
| [2] 0011 | EVEN | | | 1500/1700 |
| 0100 | ODD | 100 | 0100 | 700/1300 |
| [1] 0101 | EVEN | | | 900/1500 |
| 0110 | EVEN | | | 1300/1700 |
| 0111 | ODD | 111 | 0111 | 700/1500 |
| 1000 | ODD | 000 | 1000 | 1300/1500 |
| [3] 1001 | EVEN | | | 1100/1500 |
| [1] 1010 | EVEN | | | 900/1700 |
| 1011 | ODD | 011 | 1011 | 900/1100 |
| 1100 | EVEN | | | 1100/1700 |
| 1101 | ODD | 101 | 1101 | 900/1300 |
| 1110 | ODD | 110 | 1110 | 1100/1300 |
| [1] 1111 | EVEN | | | 700/1700 |

[1] 0000, 1111—Indicate No Signal.
0101—Indicates On Hook.
1010—Indicates Off Hook.
[2] End of Signaling Message (EOSM).
[3] 1001 is the Framing code transmitted as fill on trunks.

These particular eight signal characters were chosen for two reasons. First, by checking for odd parity, 100% protection against an odd number of bit errors per character during transmission and processing can be achieved. Thus, the S-codes or S-characters chosen are not only utilized to convey specific items of signaling information, but they provide as well an inherent parity check indication. The purposes and advantages of parity checking will be obvious to those skilled in the art. Turning now to the second reason, these eight chosen signal characters are utilized in a unique fashion in the conveyance of signaling information from one switching center to another. This unique use can best be described by assuming a typical signaling message that might be sent from one switching center to another. For example, assume the following message to be sent between adjacent switching centers:

Message to be sent—1100111010111001100101110001

Now the obvious way of transmitting this message is, of course, to transmit the same as distinct S-characters (4 bits at a time) using the 16 signaling characters that are available. Such a transmission would thus appear as follows:

Transmit—1100 1110 1011 1001 1001 0111 0001

The simplicity of this approach is readily apparent and would be obvious to those skilled in the art. However, as will be described, this simple solution is, in fact, unworkable and a novel, unique approach is necessary to accurately convey the above message between switching centers. For example, the above series of 4-bit S-characters that are transmitted from a first switching center and received at a second will, after assembly, be subjected to the transfer logic and will appear as follows when "racked up" in the Signal Word Queue:

Message received after transfer logic—
1100 1110 1011 1001 [lost] 0111 0001

An S-code is lost, i.e., omitted, in the above "message received" as a result of the operation of the transfer logic of the Signal Assembler. The S-code that immediately precedes the lost 4-bit code is the Framing code (1001). This steady state Framing code is passed by the transfer logic, but in accordance with the heretofore described operation of the transfer logic, the next succeeding similar steady state S-code is rejected. The reasons for this rejection have been set forth in detail in the preceding descriptive portion covering the SA/D. Accordingly, the reassembled message presented to the receiving Central Processor is as follows:

Reassembled Message—11001110101110010111000 1

This message is *not* the same as the message that had been sent and hence the receiving Central Processor will not respond in the manner desired.

Now, in accordance with a feature of the present invention, the unique coding scheme utilized herein transmits the message three bits at a time using only the eight, odd parity, signaling characters. For example, if N-bits of information are assembled at a given switching center for transmission to a remote switching center, the N-bits can be sent three bits at a time in the following fashion:

110 011 101 011 100 110 010 111 000 100

Each of these three bits, however, is actually transmitted as a 4-bit S-character. That is, for each 3-bit combination there is a unique 4-bit S-character. This is indicated in the table, supra, wherein the eight 3-bit combinations used for signaling purposes are aligned in each row with the 4-bit S-character that is in fact transmitted. The translation between each 3-bits of signaling information and each related 4-bit S-character is straightforward since the last three bits of each 4-bit S-character are identical to the three bits of signaling information. And, as will be evident from the table, *all* eight combinations of three bits occur in the last three bits of the odd parity S-characters.

The eight S-characters that are used to transmit the 3-bit groups of signaling information are all discrete S-codes. Hence, none will be lost as a result of the operation of the transfer logic.

The 4-bit S-codes that are received at the remote switching center and that are "racked up" in the Signal Word Queue are as follows:

1110 1011 1101 1011 0100
1110 0010 0111 1000 0100

All of the above 4-bit codes represent discrete S-codes and hence all will be passed by the transfer logic of the Signal Assembler. These 4-bit S-codes are thus transferred to the main input queue of Call Store, as previously described. The input program sorts incoming S-codes from lines and trunks and places the same into appropriate input processing buffers. In the case of signaling data received from interoffice trunks the program, after determining that the S-code received is one of the odd parity discrete codes, translates the 4-bit code into the appropriate three bits of signaling information. The translation, in effect, simply strips off the first bit of each received discrete 4-bit S-code. The successive sets of three bits of signal data are stored in juxtaposition to each other in the appropriate input processing buffer. The S-bits that are thus stored in the input processing buffer are as follows:

110011101011100110010111000100

With one exception (i.e., the last two zeros), this stored signal message is identical to the signal message that was assumed sent from the first switching center.

The signaling message to be transmitted can comprise any given number of S-bits of any predetermined arbitrary format. That is, the message length, as well as the coding thereof, may comprise an almost infinite variety of configurations or combinations. For practical reasons, however, there is an upper limit on the message length, this being determined by the storage capacity of the aforementioned processing buffers in Call Store. For the Call Store configuration advantageously utilized herein, each of the processing buffers comprises a total of 105 storage locations and, hence, the message lengths are limited to 105 bits. Thus, the signaling messages can be of any length up to 105 bits and the coding thereof is practically unlimited; hence, the name "universal coding scheme."

As has been explained, if an N-bit signaling message is to be transmitted from one switching center to another, the N-bits of information are sent three bits at a time, utilizing the 8 odd parity discrete S-characters. Thus, all message lengths must be multiples of three bits. Accordingly, it is necessary to add unassigned bits to some messages to round out the total number of bits to a multiple of 3. In this case, an appropriate number of binary zero bits is added to the message. These bits are unassigned bits in the message format—i.e., they convey no legal information and they are ignored in processing.

Because the various messages can be of different preassigned lengths, and each does not necessarily comprise 105 bits, it is desirable to terminate each message with a preassigned END OF SIGNALING MESSAGE (EOSM) code. Thus, successive messages transmitted over a signaling channel are separated by the EOSM code (0011) that is transmitted after each and every message.

As has been briefly mentioned above, and as will be described in greater detail hereinafter, the signal messages can be sent in either the S channels or the M-channels of the trunks connecting adjacent switching centers. The fill in both the S-channels and the M-channels is the Framing code. When M-channel signaling is resorted to, the frame recovery circuit heretofore described will utilize two successive Framing codes to generate pseudo-framing pulses, these occurring for every fourth signal bit. It is to be noted at this point that the discrete codes used in sending signal messages between switching centers will in no instance ever combine to result in any successive eight S-bits being interpreted as two successive Framing codes. This is a characteristic inherent in the choice of the S-characters used to convey signaling data.

The universal coding scheme is usable regardless of the type of transmission facilities between switching centers. It makes no difference whether the S-characters are transmitted as 4-bit S-characters over digital trunks, as has been described, or, alternatively, as multifrequency tones over analog trunks, if any, between adjacent switching centers. As shown in the table, supra, the S-characters which are employed in signaling between switching centers can be transmitted over analog trunks using the 2-out-of-6 multifrequency tones as tabulated. To persons skilled in the art it will be clear that other tone system combinations can also be used, such as 4-by-4.

The signaling messages transmitted between switching centers can be divided into several classes or types, and subclasses thereof, as illustrated below:

| Class No. | Subclass No. | Class Name | Length in Bits | ACK Req'd |
|---|---|---|---|---|
| 1 | | Origination Message | 57 | X |
| 2 | | Signaling Channel Control | 22 | X |
| 3 | | Acknowledge | 11 | X |
| 4 | | Call Progress | 26 | X |
| | 0 | Camp-On | | |
| | 1 | Audible Ring | | |
| | 2 | Answer | | |
| | 3 | End of Message | | |
| | 4 | Message Error | | |
| | 5 | Message OK | | |
| | 6 | Call Waiting | | |
| | 7 | Clear Call Waiting | | |
| | 8 | Unassigned | | |
| | 9 | Unassigned | | |
| | 10 | Unassigned | | |
| 5 | | Call Termination | 26 | X |
| | 0 | On Hook | | |
| | 1 | Pre-empt, On Hook | | |
| | 2 | Line Busy | | |
| | 3 | Unassigned | | |
| | 4 | Unassigned | | |
| 6 | | Supplementary Origination | 85 | |
| | 0 | Broadcast | | |
| | 1 | Conference | | |
| 7 | | Maintenance | 103 | X |
| 8 | | System Control | 105 | X |
| | 0 | Routing | | |
| | 1 | Load Control | | |

The Call Origination Message Class (Class 1) is used to establish a call connection; it contains the various information that is needed to this end, such as the identity of the called party, the precedence of the call, the trunk facility over which the call is to be completed, et cetera.

The Signaling Channel Control Class (Class 2) is used for the purpose of establishing a trunk M-channel for signaling purposes. The use of M-channel interoffice signaling will be covered hereinafter.

The Acknowledge Class (Class 3) is used to advise the sending switching center of the fact that a message other than an Acknowledge message has been correctly received.

The Call Progress and Call Termination Classes (Classes 4 and 5, repsectively) are used to indicate that a significant event in the progress of a call has occurred. Events such as called party is being rung, called party has answered, end-of-message has been sent, call has been terminated, et cetera, are identified by the appropriate call progress or call termination message.

The Supplementary Origination Class (Class 6) is used whenever a call is to be established and there is more than one addressee, such as in the broadcast and conference situations. In this case, the necessary number of supplementary origination messages are sent following the origination message. These supplementary origination messages are thus used to forward the identity of the addresses in excess of one to the remote switching center.

The Maintenance Class (Class 7) is used when maintenance data is to be conveyed between switching centers, such as the operational status of equipments in the switching center and/or changes in the operational status of interconnecting trunks.

The System Control Class (Class 8) is used to inform connecting switching centers of changes in system routing plans and load control plans.

The various signal message classes briefly described above will now be considered in greater detail. The first four bits of every signaling message sent by a switching center are used to identify the message class. This determines the format and the length of the signal message for both the sending and receiving switching centers. The number of bits used to define a given class will, of course, be dependent upon the total number of classes used for interswitching center signaling. In the present case, four bits are adequate for this purpose. An additional six bits are also used for the purpose of identifying the message number. As signal messages are transmitted from one switching center to another they are assigned message numbers. Whenever a message is received correctly, an acknowledgment message, identifying the message received by its message number, is sent back to the sending switching center. Many messages will, of course, be in transit at any given time. Hence, their acknowledgments must be distinguishable, and this is accomplished by means of the assigned message number. If the sending switching center does not receive an acknowledgment message within a reasonable time interval the original message is sent once again. Acknowledge messages themselves are not numbered, since they do not require acknowledgment. Obviously, a given message number cannot be assigned to more than one message during any given time interval.

The Origination Message (Class 1) is comprised as follows:

| Information Content | Number of Bits | Code |
|---|---|---|
| 1. Class | 4 | 0001 |
| 2. Message Number | 6 | |
| 3. Repeated Message Indicator | 1 | |
| 4. Message Channel | 11 | |
| 5. Precedence | 3 | |
| 6. Equipment Type | 7 | |
| 7. Destination SC | 6 | |
| 8. Destination Extension | 16 | |
| 9. Broadcast Indicator | 1 | |
| 10. Conference Indicator | 1 | |
| 11. Continuation Indicator | 1 | |
| | 57 | |

Items 1 and 2, namely the Class and Message Number, respectively, have been described. Item 3, Repeated Message Indicator, is a 1-bit item which is set to indicate that the same message is being sent a second time because the sender failed to receive an acknowledgment to the message the first time it was sent.

Item 4, Message Channel, is an 11-bit item which identifies the particular trunk facility over which the call connection will be completed, i.e., it specifies to the switching center receiving the Origination Message which trunk facility the sending switching center has selected for the call connection. If the switching center which receives the Origination Message is not the terminating switching center but rather a tandem switching center, it will, in turn, forward the Origination Message on to the next switching center and insert therein the message channel designation of the trunk facility it will utilize for forwarding the call. Item 5, Precedence, a 3-bit item, has been described in sufficient detail hereinbefore.

Item 6, Equipment Type, a 7-bit item, is used to specify the particular kind of equipment being used by the originating subscriber station, i.e., telephone, Teletype, data machine, et cetera. This is used by the processing programs to guarantee that a connection is completed between two subscribers' stations that have compatible equipments.

Items 7 and 8, Destination SC and Destination Extension, are 6- and 16-bit items, respectively. These items designate the terminating switching center and the extension of the called party at that switching center.

Items 9 and 10, Broadcast Indicator and Conference Indicator, respectively, are each 1-bit items and, as the names imply, they indicate whether the connection to be established is a broadcast or conference one.

Item 11, Continuation Indicator, is a 1-bit item that is used in the case of a multiple address call where the identities of the additional addresses must be forwarded in Supplementary Origination Messages. This will occur in the case of either a broadcast or conference call. It should be noted that the Origination Message itself has provision for the destination designation of the first addressee, which is sufficient for the normal party-to-party call. In the simple party-to-party call the Broadcast, Conference, and Continuation Indicators are not set—i.e, they are transmitted as binary zeros.

Signaling Channel Control, Class 2, is utilized as the name implies, to indicate to a remote switching center that M-channel signaling is to be used and to further indicate the specific M-channel so adopted. The information content of this class is as follows:

| Information Content | Number of Bits | Code |
|---|---|---|
| 1. Class | 4 | 0010 |
| 2. Message Number | 6 | |
| 3. Repeated Message Indicator | 1 | |
| 4. Message Channel | 11 | |
| | 22 | |

The first three items of this class, namely, Class, Message Number and the Repeated Message Indicator, comprise 4–6- and 1-bits, respectively. These items are identical in purpose and intent to items 1, 2 and 3 of the Originating Message. Item 4, Message Channel, is an 11-bit item which serves the above-noted purpose of designating the specific M-channel over which the signaling data is to be sent. The M-channel designated may comprise either the M-channel of a 2.55 kb. interoffice trunk, the M-channel of a 40.8 kb. simplex interoffice trunk or a 2.4 kb. channel of a 38.4 kb. Multiplex bit stream.

Acknowledge, Class 3, is as follows:

| Information Content | Number of Bits | Code |
|---|---|---|
| 1. Class | 4 | 0011 |
| 2. Message Number | 6 | |
| 3. Repeated Message Indicator | 1 | |
| | 11 | |

The purpose of this signaling message has been previously described and, here again, it comprises the three items, namely, Class, Message Number and Repeated message Indicator. In this instance, however, the Message Number has reference to that message number which is being acknowledged by the Acknowledge message. The Repeated Message Indicator is set only if the Repeated Message Indicator is set in the message being acknowledged.

The format of Classes 4 and 5 is the same. These two classes concern those signal messages that indicate that a specific event in the progress of a given call has occurred. As indicated below, Classes 4 and 5 comprise five items, the first three of which have been previously described.

| Information Content | Number of Bits | Code |
|---|---|---|
| 1. Class | 4 | 0100 or 0101 |
| 2. Message Number | 6 | |
| 3. Repeated Message Indicator | 1 | |
| 4. Subclass | 4 | |
| 5. Message Channel | 11 | |
| | 26 | |

Item 4, Subclass, is a 4-bit item that designates the specific call progress or call termination event being indicated by the message. Item 5, Message Channel, is an 11-bit item and it is utilized to identify the specific call to which the Call Progress or Call Termination message pertains.

Supplementary Origination, Class 6, is comprised as indicated below:

| Information Content | Number of Bits | Code |
|---|---|---|
| 1. Class | 4 | 0110 |
| 2. Subclass | 4 | |
| 3. M-Channel | 11 | |
| 4. Address Data | 66 | |
| | 85 | |

This class comprises four items, the purpose of the first two of which corresponds to the previous description of these items in other classes. Item 3, M-Channel, refers to the call to which this Supplementary Origination message has reference. Item 4, Address Data, is used to identify the destination extension of one, two, or three additional addresses. If there are more than three additional addresses, then additional Supplementary Origination Messages are sent.

Maintenance, Class 7, is a message used to convey maintenance data that indicates the status of equipments and/or interoffice trunks. This will be covered in greater detail hereinafter. As indicated below, the Maintenance class comprises four items of information, the purpose of the first three of which should now be apparent. Item 4 has reference to the particular maintenance data to be transmitted.

| Information Content | Number of Bits | Code |
|---|---|---|
| 1. Class | 4 | 0111 |
| 2. Message Number | 6 | |
| 3. Repeated Message Indicator | 1 | |
| 4. Maintenance Data | 92 | |
| | 103 | |

System Control, Class 8, is indicated below:

| Information Content | Number of Bits | Code |
|---|---|---|
| 1. Class | 4 | 1000 |
| 2. Message Number | 6 | |
| 3. Repeated Message Indicator | 1 | |
| 4. Subclass | 4 | |
| 5. Control Data | 90 | |
| | 105 | |

The first four items of a System Control message, here again, correspond to the similarly designated items previously discussed. Item 5, Control Data, comprises the necessary data appropriate to the subclass designated, i.e., routing or load control.

To provide a better understanding of the interswitching center signaling aspects of the present invention, the signaling that is used to establish a typical two-party call between subscriber lines connected to different switching centers will now be given. To aid the reader in attempting to locate a specific one of the above-described signaling messages, each of the same will be capitalized in the following descripiton.

The typical sequence of signaling to establish a party-to-party call between subscribers connected to the same switching center has been given. Accordingly, as the point of departure for the instant description, it shall be assumed that a calling party connected to switching center A has already signaled to the switching center that he desires an interconnection with a called party connected to switching center B. To keep the description as simple as possible, it shall be assumed for purposes of explanation that the two switching centers are adjacent.

From the analysis of the heading information received at switching center A, it is determined that the called party is connected to the adjacent switching center B. The next step at switching center A, therefore, is to select an available idle trunk, of adequate capacity, i.e., of the correct bit rate, to switching center B. Switching center A then proceeds to establish a connection between the calling party's line circuit position on the time division switching matrix and the line circuit position of the selected outgoing trunk; an ORIGINATION MESSAGE is also sent to switching center B. The ORIGINATION MESSAGE is of the indicated format and it conveys the requisite call information (e.g., MESSAGE CHANNEL, PRECEDENCE, DESTINATION EXTENSION, et cetera) to switching center B. As has been indicated hereinbefore and as will be described in further detail below, this ORIGINATION MESSAGE may be sent in an S-channel, or alternatively in an M-channel if message channel signaling is presently being used. There is no correspondence whatsoever between the facility used for the transmission of the signaling data and the trunk to be utilized to convey the call itself.

Upon receipt of the ORIGINATION MESSAGE, switching center B sends an ACKNOWLEDGE message to switching center A. It then proceeds to determine whether the called party identified in the ORIGINATION MESSAGE is connected to this switching center or a different switching center. As already indicated, the case assumed is that wherein the called party is connected to switching center B. Having established this fact, switching center B proceeds to check the status of the called party's line in exactly the same manner as described for the simple two-party intra-office call. The called party's line will be found to be idle or busy. Assuming the called party's line is idle, switching center B will send the pre-alert and alert sequences, as heretofore described for the simple two-party intra-office call. At the same time that switching center B sends the alert signal to ring the called party, it also sends a CALL PROGRESS message, subclass AUDIBLE RING, to switching center A. Switching center A, in turn, then sends an audible ring to the calling party. In addition, switching center A, returns an ACKNOWLEDGE message to switching center B.

The called party may or may not answer the ringing tone. Assuming he does answer, the answer signal will be sent from his station to switching center B, as previously described for the simple two-party intra-office call. Switching center B, on receipt of this answer signal, will send a CALL PROGRESS, subclass ANSWER, message to switching center A. Switching center A will ACKNOWLEDGE receipt of this CALL PROGRESS message to switching center B and will send the answer signal to the calling party. The call is now in a talking state.

Eventually either the calling and/or called parties will go on-hook and send the on-hook signal to its respective switching center. Upon receipt of this on-hook signal the switching center will send a CALL TERMINATION, subclass ON-HOOK, message to the other switching center, which, in turn, will send an ACKNOWLEDGE message and an on-hook to the other party. Both switching centers then disconnect the call to complete the sequence.

As has been explained in detail hereinbefore, there are various alternative call processing procedures which are established by a switching center for those cases where the called party's line is found to be busy, where the called party fails to answer, where the calling party's call is of a pre-empt nature, where a camp-on situation is established, et cetera. The manner in which these alternative situations are handled by a switching center and the subscriber station connected thereto is similar to that previously described. However, because the call processing events with regard to the calling and called party's lines are determined by different switching centers, it is necessary for the switching center that determines or establishes a particular event or situation to notify the other switching center of the same. For this purpose, the various CALL PROGRESS and CALL TERMINATION messages previously described are utilized. For example, as the name would imply, the CALL TERMINATION, subclass LINE BUSY, message is sent from switching center B to switching center A if the called party's line is in fact busy, and the rules for pre-emption or camp-on do not apply. On the other hand, if the rules for camp-on do apply, the CALL PROGRESS, subclass CAMP-ON, message would be sent from switching center B to switching center A. In both of these cases, of course, switching center A would send an ACKNOWLEDGE message to switching center B.

As will be appreciated by those skilled in the art, there are numerous cases where switching center A and switching center B are not adjacent; that is, there are no trunks connecting switching centers A and B directly, but rather there are trunks connecting switching centers A and B via one or more intermediate tandem switching centers. In such a case, switching center A would select a trunk which connects between itself and the first of the intermediate tandem switching centers, and it would forward an ORIGINATION MESSAGE to that tandem switching center. This message would include, among other things, item 7, which comprises 6 data bits identifying the DESTINATION SC. The first tandem switching center, upon receipt of this message, would recognize from item 7 that it is not the terminating switching center but rather a tandem switching center, and it would select a trunk facility between itself and the next tandem switching center or terminating switching center, as the case may be. It would then forward the ORIGINATION MESSAGE accordingly. The first tandem switching center, however, would modify the ORIGINATION MESSAGE, in particular, item 4, so as to indicate the trunk selected to handle the call between itself and the next switching center. This process continues at each successive tandem switching center until the ORIGINATION MESSAGE is received by the terminating switching center. Once a connection is so established, all CALL PROGRESS and CALL TERMINATION messages are relayed between the originating and terminating SC's via the tandem SC's.

There are two multiaddress type calls capable of being handled by the present time division switching system, these being broadcast calls and conference calls. The manner in which a subscriber advises his switching center of the fact that he wishes a particular multiaddress call to particular designated subscribers has been explained hereinbefore. Let it be assumed for purposes of explanation that two or more of the broadcast listeners or conferees, as the case may be, are connected to a switching center B different from that of the originator of the multiparty call. In this case, the originating SC will forward both an ORIGINATION MESSAGE and one or more SUPPLEMENTARY ORIGINATION messages to switching center B. The purpose of the latter is to forward the identities of those parties, in excess of one, which are to be interconnected for this multiparty call. In this case the conference or broadcast indicator would also be set in the ORIGINATION MESSAGE, as appropriate, and the continuation indicator would also be set. Upon receipt of the ORIGINATION MESSAGE and the SUPPLEMENTARY ORIGINATION message, switching center B would ACKNOWLEDGE receipt of the same to the originating SC, and it would establish the appropriate connections. The multiparty call would then proceed in a fashion similar to that hereinbefore described.

For the speed of service normally required, either a 2.4 kb. or a 1200 b.p.s. transmission facility should be used, whenever possible, for interswitching center signaling. A ground rule for this signaling is, therefore, that one or more 2.4 kb. and/or 1200 b.p.s. transmission facilities be established as signaling channels between each and every pair of adjacent switching centers. The exact number of channels required between a given pair of switching centers will be determined from signaling traffic considerations. Having established these facilities as signaling channels, all interoffice signal messages for all calls between switching centers are transmitted over these facilities. The utilization of a message channel for signaling purposes is never construed as a permanent assignment of the facility for signaling, but rather as a semipermanent assignment. That is, it (the M-channel) can be used as a signaling channel as long as it is in good operating condition and it is not required for any other purpose, such as the completion of a call. As a back-up, and in a last resort situation, one or more of the 75 b.p.s. S-channels of 2.55 kb. interoffice trunks can be used for signaling.

When a 2.4 kb. M-channel is to be used for signaling purposes, it is necessary to connect it to the SA/D via a connection through the time division switching matrix. However, the 1200 b.p.s. S-channel facility of a 40.8 kb. interoffice trunk is permanently "wired-in" to the SA/D and consequently it can only be used for signaling purposes. When both the 2.4 kb. and 1200 b.p.s. facilities are available for use as signaling channels, the 1200 b.p.s. facility is selected as the first choice, assuming that a 2.4 kb. M-channel has not at that time been seized and set up for signaling purposes. If, however, an M-channel is presently set up to convey signaling information, it would normally be the first choice, since it is the fastest. M-channels are not set up as signaling channels as long as the capacity of the permanently wired S-channels are adequate to satisfy the signaling traffic requirements.

When it becomes necessary to establish a 2.4 kb. M-channel for signaling purposes, the switching center recognizing this must transmit a SIGNALING CHANNEL CONTROL message to the desired connecting switching center on any presently existing signal channel. This message designates the 2.4 kb. facility that is to be used for signaling. In addition, the originating switching center connects the selected 2.4 kb. transmission facility to the SA/D via the switching matrix and it sends the Framing signal as steady state fill over the selected M-channel. Upon receipt of the SIGNALING CHANNEL CONTROL message, the connecting switching center connects the selected 2.4 kb. M-channel, to be used for signaling, to its SA/D via its switching matrix and it transmits back to the originating switching center the steady state Framing signal. When the connection is completed and the Framing signal is detected, each switching center can then employ the selected facility for signaling. It should be emphasized at this point that any 2.4 kb. facility between adjacent switching centers can be used to transmit any signaling information therebetween. The 2.4 kb. M-channel facility selected will be retained in this status on a semipermanent basis. However, if the need arises, the M-channel set up for signaling purposes can be taken down so that it can be used for completing a call.

A "glare" problem exists when selecting M-channels for signaling purposes. Glare is a condition that exists when switching centers at both ends of a trunk facility simultaneously seize the trunk for different uses. In accordance with a feature of the present invention, the occurrence of glare in seizing trunks can be minimized by first numbering the trunk facilities between adjacent switching centers; then, by pre-arrangement, one of the two switching centers seizes the lowest numbered trunk facilities first, while the other seizes the highest numbered trunk facilities first. With this arrangement, the possibility of glare can occur *only* when all but one of the trunk facilities are busy. In this case, when glare does occur, by further pre-arrangement, one of the two switching centers will yield to the other.

In the present switching system, seizure of a particular trunk (or trunk channel) for the purpose of connecting a call is permitted at both terminaing (i.e., adjacent) switching centers. Since seizure at either end is permitted, it is desirable to keep the maintenance in-service and out-of-service status for each trunk up to date at both terminating switching centers.

If a trunk fails, it will sometimes fail in such a way that the failure is detected by the maintenance programs at both terminating switching centers at about the same time, and hence the status is changed to out-of-service at both ends within at most a few hundred milliseconds. However, it is possible for a failure to occur such that it is detected by the maintenance program at only one end. In this case the trunk status is changed to out-of-service at only the end detecting the failure unless some means of notifying the other end is provided. If it should happen that the trunk status is changed to out-of-service at only the end detecting the failure, the other switching center will continue to seize the trunk for the purpose of completing calls. These calls will not be completed, however, since origination messages received designating a trunk which is known to be out-of-service are not processed further by the receiving switching center. The switching center which thinks the trunk is in service will of course, continue to seize that trunk for calls, with the result that in each case the call will not be completed and the switching center seizing the trunk will abandon the call. If the trunk were marked out-of-service as it should be, the switching center, instead of attempting to seize the faulty trunk, would recognize this fact and select an alternate facility, with the result that the calls would be completed rather than being abandoned. It is, of course, possible to make the operational programs defensive against differences in a particular trunk's status at its two terminating switching centers, but such an approach is quite costly and a more ready solution can be implemented by utilizing the flexibility supplied by the signaling plan of the present invention. The essential objective of the present aspect of the signaling plan is that any change in the in-service or out-of-service status of a trunk at one switching center can be followed by a corresponding change in status at the other switching center within one program cycle of 426⅔ milliseconds.

In accordance with a feature of the present invention, the interoffice trunk maintenance status signaling advantageously utilizes two of the steady state signals as follows:

(1) The FRAMING fill signal is transmitted over the S-channel of an interoffice trunk whenever its maintenance status is in service at the transmitting switching center or when an attempt is being made to place the trunk in service at the transmitting switching center;

(2) The ON-HOOK fill signal is transmitted on the S-channel of an interoffice trunk whenever its maintenance status is out of service at the transmitting switching center.

In accordance with the above, whenever the status of a trunk is changed from in-service to out-of-service at a switching center, that switching center transmits ON-HOOK fill to the other switching center. In response to receipt of ON-HOOK, the latter places the trunk out of service and transmits ON-HOOK back to the first switching center.

It should be clear at this point that the trunks are 4-wire and hence the signal transmitted by each switching center is a function of the status of the trunk as understood by the transmitting switching center at the time. As a result, the switching center first detecting the out-of-service condition is the first to send the ON-HOOK signal, while the other switching center continues to send the FRAMING signal. It is not until the second switching center receives the ON-HOOK signal from the first that it changes the signal it is transmitting from FRAMING to ON-HOOK. In the foregoing manner the maintenance status at any pair of adjacent switching centers can be so coordinated that they both reflect the same status condition within at most a few hundred milliseconds.

If a trunk failure is detected by both switching centers at approximately the same time, both will immediately change the trunk's status to out of service and transmit the ON-HOOK signal to the other.

Whenever a trunk is placed out of service, the SA/D terminal associated with the incoming S-channel of the trunk is turned off (by means of a logic switch, not shown) to prevent further receipt of signals from the trunk S-channel. This turn-off prevents the overloading of the signal word queue and the input queue of Call Store with unwanted signals from noisy and/or faulty trunks. Accordingly, whenever a request is made to place a trunk in service, the switching center at which the initiative is taken must not only turn on the associated SA/D terminal and send the FRAMING signal, but it must also send an appropriate message via an existing signaling channel to tell the switching center at the other end to also turn on its SA/D terminal and send FRAMING. Such an interswitching center signaling message is a Class 7 Maintenance message. If these actions are successful, both switching centers will receive the FRAMING signal within at most 213⅓ milliseconds of each other. Receipt of the FRAMING signal is the stimulus for the program to change the trunk status from out-of-service to in-service.

Following a total trunk group failure, no signaling channels will exist between the two terminating switching centers at the time a particular trunk is to be placed in service. As a result the Class 7 Maintenance message that notifies the other switching center of an in-service action cannot be sent and the trunk will not go into service. However, the attempt to place the trunk in service at one of the switching centers does result in turning on the appropriate SA/D terminal and the transmission of the FRAMING fill. A request to place the same trunk in service at the other switching center at a later time will, of course, result in the same action. As a result, FRAMING is recognized at both centers immediately following the in-service request action at the second of the two centers and the trunk is then placed in service.

It is desirable when a switching center is first started up (i.e., initially started up or restarted after a termination in the operation of the same) to initialize the trunk in-service/out-of-service status to in-service for all trunks which are in an operable condition and to out-of-service for the rest. An "operable trunk" is one which is connected between the switching center being started up and an adjacent switching center which is already operational. A "nonoperable trunk" is one which is itself not in working condition or is connected to an adjacent switching center which is not operational. In accordance with the present signaling plan, the aforementioned initialization is accomplished automatically as follows: At the time of start up the initialization programs for trunks initialize the status tables for all the trunks to out-of-service, turn on the SA/D terminals for all trunks, and send FRAMING. Operable trunks will already be in this same condition at the adjacent switching center. As a result, FRAMING is received at both centers immediately following this start up initialization action and these operable trunks are automatically placed in service at both switching centers. The FRAMING signal is not received from nonoperable trunks and hence these trunks are not placed in service until either the remote switching center is started up, or (if it is already started up) until an in-service request is initiated to place the trunk in service. This latter case would be the result of the trunk itself failing after the adjacent switching center was started up. In order that operable trunks connected to switching centers which are not yet operational not be placed in service, it is necessary to insure that a signal other than FRAMING be transmitted as fill on these trunks at the non-operational switching centers.

As has been indicated hereinbefore, selected subscribers can be provided with the capability of keying direct or store and forward (S/F) signal words. The direct signal indicates that the call is to be handled on a real time basis, while for the store and forward signal the call will be routed through the switching center to a storage facility where it is stored until a later time at which it is forwarded to the called subscriber. A typical use of this store and forward facility would be when a calling party desires a recordation made of his message. In other instances, for example, in the case of facsimile messages, and particularly multiaddress facsimile messages, it is desirable to handle the calls, by prearrangement, using store and forward.

Message store and forward (S/F) apparatus and the operation thereof are disclosed in detail in the aforementioned copending patent application of H. J. Kienzle-R. E. Swift. Briefly, the message store and forward equipment handles all digital messages that by choice, or prearrangement, are to be stored and forwarded at a later time when the traffic load is low. Typical of the messages that can be handled by S/F are teletypewriter, facsimile, and data set messages. The incoming digital messages flow to the S/F equipment from the time division switching matrix via intraoffice trunks; when taken in, the messages are stored on drum or tape units. Digital message outputs from S/F are sent through the time division switching matrix to the appropriate subscriber lines and/or interoffice trunks. The S/F equipment can provide multiaddress store and forward service with speed buffering.

The signaling information of an incoming digital message is diverted to Central Control, which selects one of a group of S/F modules to receive the message. Each module is connected to a respective intraoffice trunk and hence the routing or steering of a particular digital message to a given S/F module is carried out by the time division switching matrix acting under instructions provided by the Central Control. Wired logic in the module controls the handling of data bits and the assembly of messages into blocks, while Central Control handles the blocks and message routing operations. The S/F equipment uses what is known as the traffic category approach, with the urgent traffic being sent out first (under program control). With this approach the various messages are in effect queued according to their precedence category and they are transmitted in turn as their precedence category and the idle trunk capacity warrants.

The data transfer actions involved, as well as decisions as to which subscriber gets which message, are under the supervision of Central Control, which also sends instructions to control the S/F module actions and the data handling and storage methods. Central Control is able to initiate or discontinue, by use of selected code instructions, any of the wired routines built into each S/F module. Central Control also monitors (by means of the Master Scanner) the performance of these routines by the sensing of information stored in the module itself; it further conducts maintenance and checkout exercises of the module through coded instructions.

A message S/F module receives all messages in a bit stream, assembles the bit stream into arbitrarily sized message blocks, places these blocks on drum storage or on tape, and subsequently transmits the stored messages as soon as transmission facilities are available. In general, a drum storage unit provides intermediate storage capacity for intermediate-sized messages. A tape unit, on the other hand, provides large storage capacity for the storage of extremely large messages, such as facsimile. The Central Control examines the signaling information that defines the message and thus determines whether assembled message blocks are to be transferred to a drum unit or a tape unit. A tape unit, in addition, can be used as an overflow store in the event that a drum unit reaches the point of being nearly full.

The actual number of drum units provided will depend upon the digital traffic arriving at a particular switching center, as well as the anticipated type of traffic and the expected usage of this S/F facility. A typical drum unit has a capacity for storing 393,216 bits, divided into 16,384 twenty-four bit words, which, in turn, are divided into 256 sixty-four word blocks.

The number of tape units required will also depend upon the above-noted considerations; however, there is a minimum number of tape units that are necessary. At least one tape unit should always be reserved for the storage of facsimile messages. These messages are usually quite long in comparison to other forms of digital messages and hence they would require excess storage capacity if stored on a drum. At least one tape unit should also be reserved for drum overflow when the drum units of that message store and forward module become nearly filled and the danger of message loss might arise. Another tape unit should be reserved to keep a permanent record of all messages received at that particular message store and forward module. This can be accomplished by transferring each message to the record tape following its transmission from the switching center. Additional tape units may be reserved for any other purpose required, but at least one should be reserved for standby operation in the event that one of the other tape units fails. A typical tape has the capacity to store 200 bits per inch at a tape speed of 75 inches per second.

When a call is to be set up in the time division switch, the address information, necessary to interconnect the calling and called parties, is placed in the same time slot, or slots, of the circulating memories of two Link Control Units. The address data will remain in this time slot, or slots, of the circulating memories until changed by a new command from the Central Processor. The 12 address bits that are deposited in a given slot in the circulating memories of a Link Control Unit are accompanied by a parity bit that is generated in the TDS Control. If the parity of the switching instruction does not check, the operation of the switching matrix is inhibited in the particular time slot and the Central Processor is notified that an error has occurred, all as heretofore described.

Now as will be recalled, the 7 address bits, used to define a given one of the 127 line circuit positions, are grouped into a 4-bit number (A0–A3) and a 3-bit number (A4–A6). The 4-bit number (A0–A3) and the 3-bit number (A4–A6) are respectively delivered to the 1-of-16 and 1-of-8 translators 7570 and 7560. These two translations serve to define, and enable, the appropriate line-link gates. In a similar manner, the 3-bit number (B0–B2) and the 2-bit number (B3–B4) are respectively delivered to the 1-of-8 and 1-of-3 translators 7660 and 7670 so as to define and thereby enable the appropriate link-junctor gate.

Figure 139A:
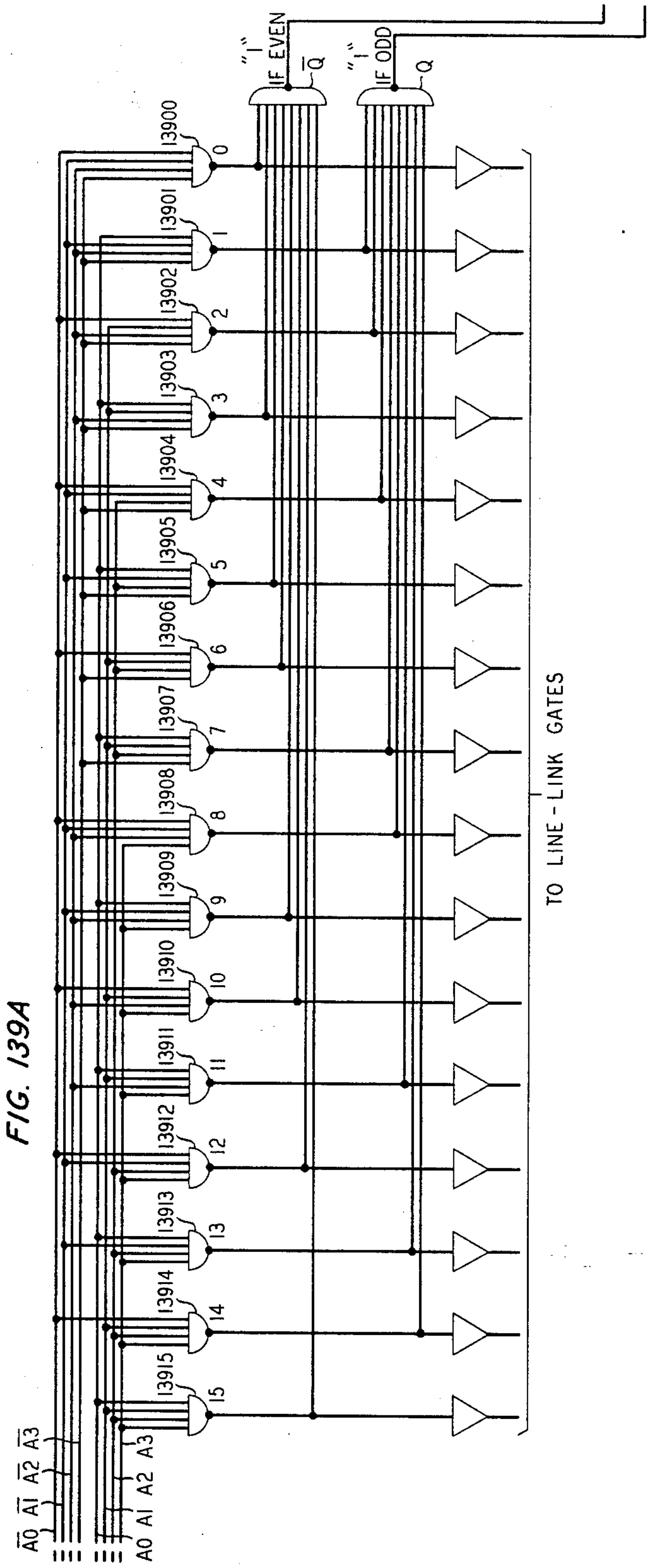
FIGS. 139A–139C is a fast acting parity check circuit used for checking parity of the call address words stored in the memory loops of a Link Control Unit.
Figure 139B:
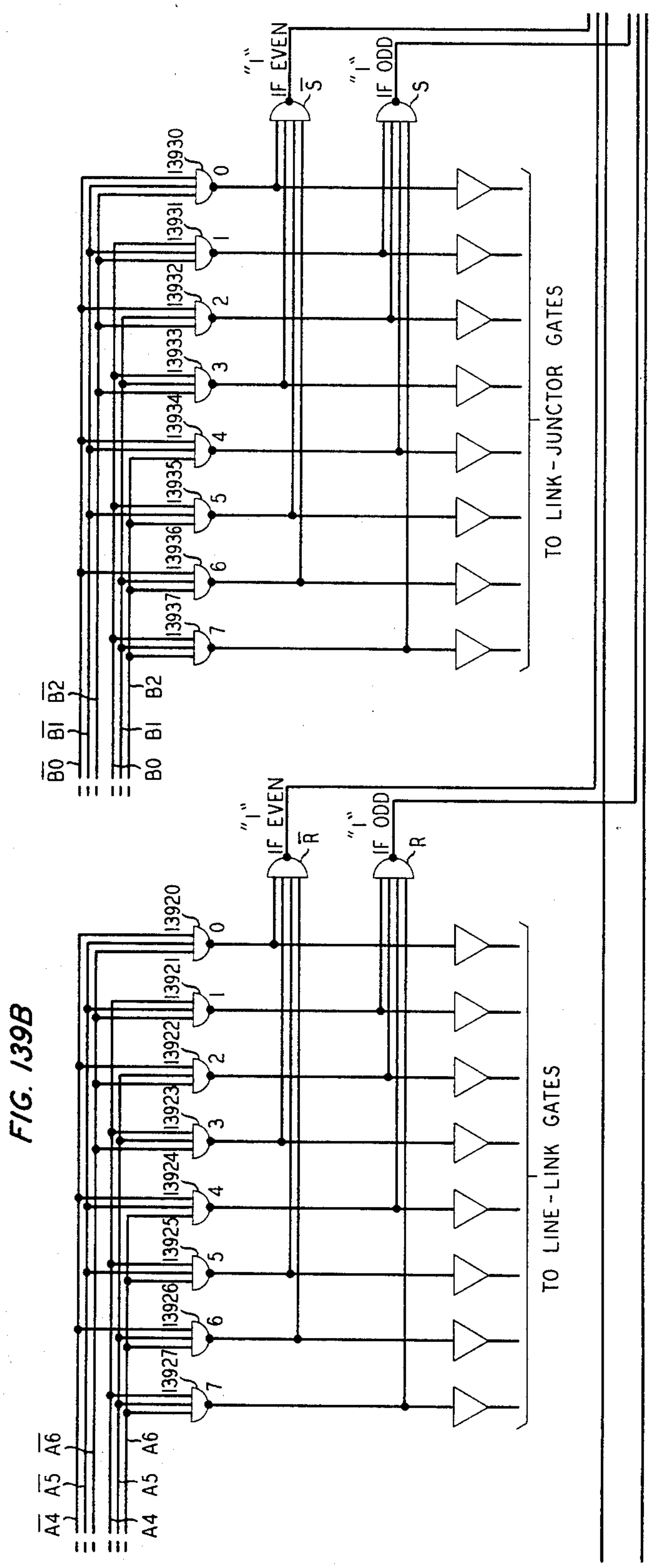
Figure 139C:
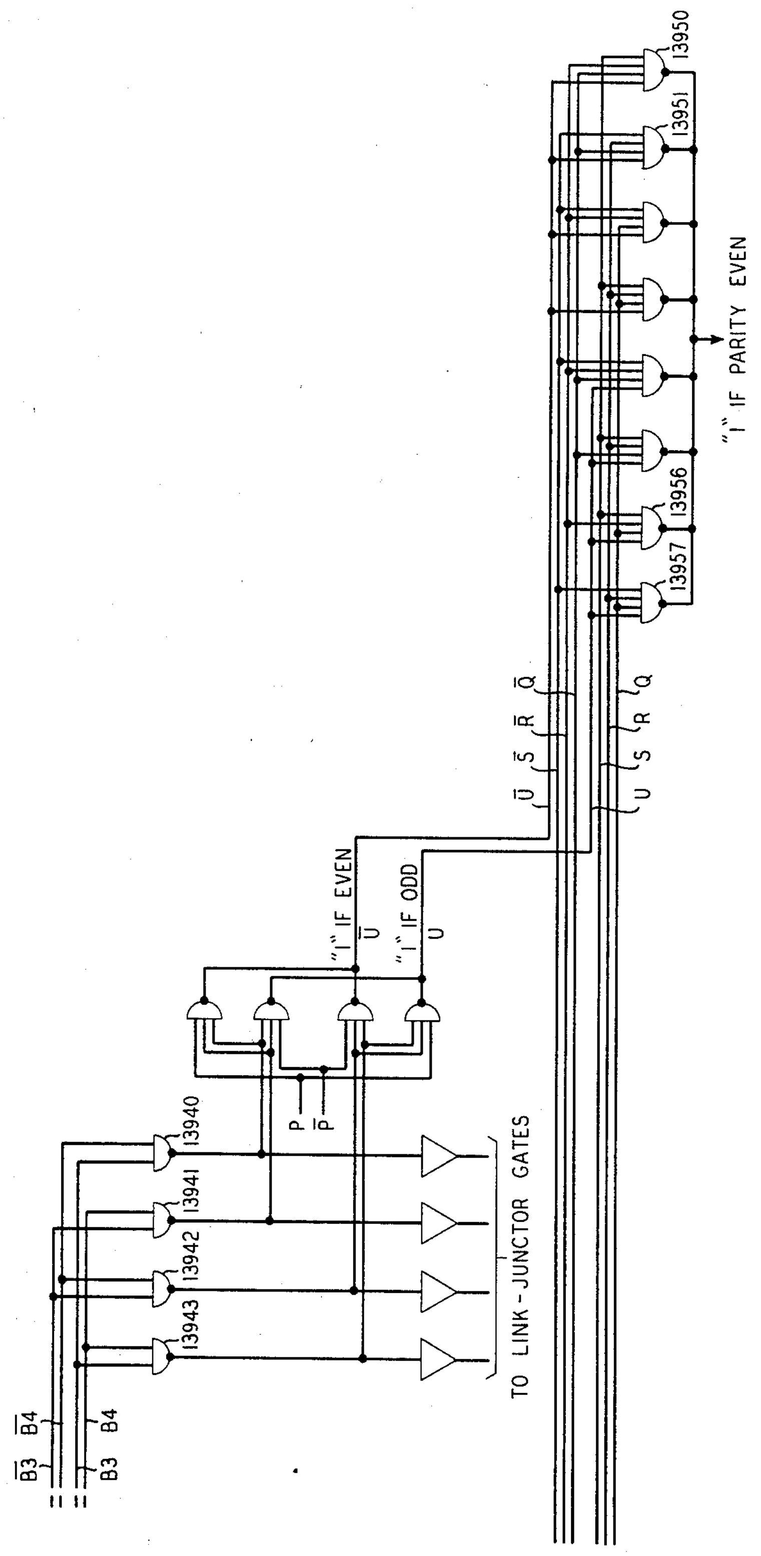

FIG. 139 of the drawings illustrates circuitry for carrying out the above-described translations, this figure being comprised of three sections designated 139A, 139B and 139C. The address bits A0–A3, as well as the negations thereof $\overline{A0}$–$\overline{A3}$, are delivered to the AND-NOT translation gates 13900 through 13915, in the manner illustrated in FIG. 139A, so as to energize one and only one of the 16 output leads numbered 0 through 15. The following table illustrates the correspondence between the coding of these address bits and the particular output lead that is thereby energized.

| A3 | A2 | A1 | A0 | Energized Output Lead |
|---|---|---|---|---|
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 0 | 14 |
| 1 | 1 | 1 | 1 | 15 |

In substantially the same manner the AND-NOT translation gates 13920 through 13927, 13930 through 13937, and 13940 through 13943 serve to decode the input address bits applied hereto, namely A4–A6 and the negated $\overline{A4}$–$\overline{A6}$, B0–B2 and the negated $\overline{B0}$–$\overline{B2}$, and B3–B4 and the negated $\overline{B3}$–$\overline{B4}$, respectively, so as to provide the other required 1-of-8 and 1-of-3 translated output signals. These translations should be obvious from a consideration of FIG. 139 and the "Line Circuit Position Address Code" and "Binary Codes for Link-Junctor Gates" Tables, supra.

Now in accordance with an aspect of the present invention, the fast acting parity check circuits of the Link Control Units (e.g., parity circuit 7625) advantageously utilize the very same AND-NOT translation gates for parity check purposes. For example, the "1" if Odd, AND-NOT gate designated Q is coupled to the output leads of the gates 13901, 13902, 13904, 13907, 13908, 13911, 13913 and 13914. From the foregoing table it will be apparent that each of the enumerated translation gates has an odd number of input binary one bits applied thereto. Accordingly, the gate Q will be enabled if the 4-bit number (A0–A3) comprises an odd number of binary ones. Whereas, the "1" if Even gate $\overline{Q}$ is connected to the output leads of translation gates 13900, 13903, 13905, 13906, 13909, 13910, 13912, and 13915. And from the foregoing table it will be seen that these gates have an even number of input binary one bits. Thus, if this 4-bit number (A0–A3) comprises an even number of binary one bits, the gate $\overline{Q}$ is enabled.

In a corresponding manner and to the same end, the "1" if Odd and "1" if Even gates R and $\overline{R}$ are connected, as shown in FIG. 139, to the output leads of respective translation gates 13920 through 13927; and the "1" if Odd and "1" if Even gates S and $\overline{S}$ are connected to the output leads of respective translation gates 13930 through 13937.

The parity check of the 1-of-3 translation bits (B3–B4) is different from those described only insofar as the parity bit and its negation $\overline{P}$ also enter into the production of the parity output indication U or $\overline{U}$. The manner of operation of this parity check circuitry will be self-evident from an examination of FIG. 139C.

The derived parity signals, Q, $\overline{Q}$, R, $\overline{R}$, S, $\overline{S}$, U and $\overline{U}$ are combined in the illustrated manner in the parity check circuit comprising AND-NOT Gates 13950 through 13957. This circuit produces an output "1" level if the over-all parity of the thirteen bits stored in any given time slot is even. The output of this circuit is therefore normally "0" for odd parity. When the output goes to the "1" level, the signal is used in the manner described to inhibit operation of the switching matrix in the particular time slot.

The parity check of the thirteen bits written into a particular time slot is thus carried out simultaneously on several subgroups of the same. This simultaneous or parallel parity check operation results in a concomitant saving in time.

A low level logic (LLL) circuit is utilized to perform a wide variety of logic functions in this time division switching system. The circuit consists of resistors, diodes, and a transistor that provides amplification and inversion. Logical operations may be performed at the input circuit when there is more than one input diode or at the output of the transistors when two or more collectors are connected together. The circuit uses silicon semiconductor devices so as to permit operation over a wide temperature range. The LLL circuit provides high speed switching, and it is designed to tolerate large variations in component parameters and supply voltages.

This LLL circuit, its operating characteristics, and the manner in which the same can be utilized to synthesize special circuits such as binary counters, translators, shift registers, et cetera, is covered in detail in the article entitled "No. 1 ESS Logic Circuits and Their Application to the Design of the Central Control," by W. B. Cagle et al., The Bell System Technical Journal, September 1964, vol. XLIII, No. 5, Part 1. Briefly, the low level logic circuit is essentially a gate coupled through a multijunction silicon diode to a transistor inverter amplifier, as shown in FIG. 149. Transistor Q1 supplies the current gain necessary to permit incoming signals to operate a number of similar circuits at the output (fan-out condition). It also provides isolation of input and output circuits. Changing the bias circuit (that is, changing the value of R1) increases the collector current of the transistor, thus permitting increased fan-out. The base-to-emitter current, supplied by the +24 volt supply through the voltage-shifting diode D1 and resistor R1, turns on the transistor Q1. In operation, the transistor is turned off when this current is passed to ground through any of the gate input diodes that connect to an "on" transistor. Normally the transistor Q1 is "on" (no input) and the output at the collector is therefore close to ground potential (logic state 0). When the transistor is turned "off" as a result of an applied input, the output at the collector goes to approximately 4.5 volts (logic state 1).

The resistor R3 is connected to a +4.5 volt supply and it applies a reverse bias to the input diodes of the driven stage when all driving transistors are turned off, thereby discriminating against extraneous noise signals in this condition. During the off-going transition, resistor R3 also supplies the logic circuit's output impedance (since the transistor output becomes a high impedance at this time), thus providing a quick-change path for stray wiring capacity on the output.

The base bypass resistor R2 is used to carry to ground any collector leakage current that may flow when the transistor is "off"; the resistance of R2 must be sufficiently low that the maximum expected leakage current ($I_{co}$) will produce a voltage drop value less than the base-emitter function potential. However, this resistance must be high enough so that it does not divert an appreciable portion of the base drive current during the "on" condition.

The voltage-shifting diode D1 serves the dual function of providing a voltage threshold similar to that of a Zener diode and providing a charge storage similar to that of a coupling capacitor. The multijunction diode D1 comprises, in effect, three silicon diodes in series. This unit makes use of the forward characteristics of the junction stack to provide a voltage threshold in the same manner that the reverse characteristics of a Zener diode can be used. The voltage drop of the multijunction diode, plus the forward base-to-emitter drop of the transistor, which provides a threshold of about 3.0 volts, is greater than the maximum expected drop across the input diode and an "on" driving transistor (approximately 1.7 volts). The excess voltage in this threshold provides noise margin for a logic 0 input condition. The charge storage inherent in diode D1 is advantageously used as a means of quickly removing the storage charge in an "on" transistor. The minimum value for the storage charge in D1 should be specified so that it is always greater than that in the transistor, at the level of base current that occurs in the circuit. As a result, when a driving transistor is "on" the output at the diode appears as a very low impedance. To accomplish a rapid transistor turn-off, the diode acts as a capacitor through which a reverse current briefly flows, thereby removing the storage charge on the base of the transistor.

Figure 150:
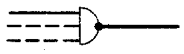

The conventional logic symbol for this LLL circuit is shown in FIG. 150.

Two of the basic LLL packages can be cross-connected in the maner shown in FIG. 151 to provide a flip-flop function. This LLL flip-flop is symbolically illustrated in FIG. 152 of the drawings.

*Conclusion*

For purposes of explanation, a switching matrix was assumed to comprise 127 line circuit positions, with eight such matrices per central office. It should be clear, however, that the present invention is in no way limited to these numbers. Further, the invention is in no way limited to the transmission and message bit rates that were assumed for purposes of description, nor to the number of message bits per frame or subframe, the specific frame format disclosed, or the illustrated number of supervisory signals and control bits per frame.

In the preceding disclosure there has been described typical call processing functions of a time division system constructed in accordance with the principles of the present invention. However, many other usual, as well as unusual, call processing services can be carried out, over and above those explicity mentioned, without departing from the spirit and scope of the invention.

As has been indicated hereinbefore, the instant time division switching system is most advantageously utilzed in conjunction with an automatic Common Control such as the stored program controlled CC disclosed in the aforementioned Doblmaier et al. case; it should be clear, however, that the various features of the present invention are not limited thereto. For example, the Common Control arrangement disclosed in United States Patent No. 2,955,165 of Budlong-Drew-Harr, filed Oct. 7, 1957, has sufficient flexibility to permit its adaptation to the task of controlling the time division switching circuits of the present invention. In addition, while it is not recommended, inasmuch as it would defeat the speed of operation and versatility offered by the instant switching system, a manual office control module could, if necessary, be used to receive the signaling instructions from subscribers, and to dispatch the appropriate instructions to the TDS. That is, an operator, in response to specific received signals from a subscriber (e.g., dialed digits) could manually establish an interconnection through the switch with the called party by manually inserting the appropriate instructions in the TDS Control word registers.

Accordingly, it is to be understood that the foregoing disclosure relates to only a preferred embodiment of the invention, and numerous modifications and alterations may be made therein without departing from the spirit and scope of the present invention.

What is claimed is:

1. In a time division communication system, a plurality of subscriber lines each of which is adapted to carry a digital message bit stream that includes supervisory signal and control bits at uniformly spaced positions in each frame of said stream, a plurality of trunks for carrying in multiplexed fashion a predetermined number of digital message bit streams as well as supervisory signal and control bits at uniformly spaced positions in each frame of the same, means associated with each subscriber line and trunk for separating the supervisory signal and control bits from the message bit in each incoming digital stream and for stretching the message bits into a uniformly spaced stream of message bits, a time division switching matrix having a line circuit position for each subscriber line and trunk to which the message bits of the same are respectively coupled, means for routing a bit-at-a-time selected message bit streams between selected line circuit positions in distinct time slots of a repetitive cycle, and means associated with each subscriber line and trunk for inserting supervisory signal and control bits at uniformly spaced positions in each of the outgoing digital bit streams.

2. The time division system as defined in claim 1 wherein the digital bit streams carried by the subscriber lines and trunks are at a multiple of binarily related rates.

3. The time division system as defined in claim 1 wherein a two way interconnection is established between each of a plurality of selected line circuit positions respectively assigned to subscriber lines and a selected trunk line circuit position in a distinct time slot of a recurring cyclic period.

4. A communication system comprising a plurality of subscriber lines for carrying respective digital message bit streams, each digital bit stream including supervisory signal and control bits at uniformly spaced positions in each frame of the stream, a plurality of interoffice trunks each capable of carrying in multiplexed fashion a given number of digital message bit streams as well as supervisory signal and control bits at uniformly spaced positions in each frame of the same, means associated with each subscriber line and interoffice trunk for separating the supervisory signal and control bits from the message bits in each incoming digital stream, a time division switching matrix having a line circuit position for each subscriber line and interoffice trunk to which the message bits of the same are respectively couple, means controlling said matrix to switch a bit-at-a-time samples of each of the message bits of selected message bit streams between selected subscriber line circuit positions in distinct time slots of a repetitive office cycle, said control means controlling said matrix so as to also switch a bit-at-a-time samples of each of the message bits of a given number of selected message bit streams between each of a given number of selected line circuit positions respectively assigned to subscriber lines and a selected interoffice trunk line circuit position in distinct time slots of a recurring cycle, and means associated with each subscriber line and interoffice trunk for inserting supervisory signal and control bits at uniformly spaced positions in each of the outgoing digital bit streams.

5. A communication system as defined in claim 4 wherein the message bit streams carried over the subscriber lines are at a multiple number of binarily related rates.

6. A communication system as defined in claim 5 including means permitting the exchange of message bit streams between subscriber lines of different rates without loss of intelligibility.

7. A communication system as defined in claim 4 wherein the sampled message bit switching between subscriber lines and that between other subscriber lines and the interoffice trunk are simultaneously carried out.

8. A communication system as defined in claim 4 wherein samples of each of the message bits of a selected message bit stream can be switched to a plurality of selected subscriber line circuit positions.

9. A communication system as defined in claim 8 wherein samples of each of the message bits of the message bit stream of a designated one of the plurality of selected subscriber lines can be simultaneously switched back to the line circuit position associated with the selected message bit stream.

10. A communication system comprising a plurality of subscriber lines for carrying respective digital message bit streams, each digital bit stream including supervisory signal and control bits at uniformly spaced positions in each frame of the stream, a plurality of interoffice trunks each capable of carrying in multiplexed fashion a given number of digital message bit streams as well as supervisory signal and control bits at uniformly spaced positions in each frame of the same, means associated with each subscriber line and interoffice trunk for separating the supervisory signal and control bits from the message bits in each incoming digital stream and for stretching the message bits into a uniformly spaced stream of message bits, a time division switching matrix having a line circuit position for each subscriber line and interoffice trunk to which the message bits of the latter are respectively coupled, means controlling said matrix to switch a bit-at-a-time samples of each of the message bits of selected message bit streams between selected subscriber line circuit positions in distinct time slots of a repetitive office cycle, said control means controlling said matrix so as to also switch a bit-at-a-time samples of each of the message bits of a given number of selected message bit streams between each of a given number of selected line circuit positions respectively assigned to subscriber lines and a selected interoffice trunk line circuit position in distinct time slots of the repetitive office cycle, and means associated with each subscriber line and interoffice trunk for inserting supervisory signal and control bits at uniformly spaced positions in each of the outgoing digital bit streams.

11. A communication system as defined in claim 10 wherein the digital bit streams carried over the subscriber lines are at a plurality of binarily related rates.

12. A communication system as defined in claim 11 wherein the frame format is the same for all subscriber lines and interoffice trunks.

13. A time division switching system comprising a plurality of subscriber lines for carrying respective digital message bit streams, each digital bit stream including supervisory signal and control bits at uniformly spaced positions in each frame of the stream, a multiple of interoffice trunks each capable of carrying in multiplexed channels a given number of digital message bit streams with supervisory signal and control bits located at uniformly spaced positions in each frame of the same, means associated with each subscriber line and interoffice trunk for separating the supervisory signal and control bits from the message bits in each incoming digital stream, time division switching matrix means having a plurality of line circuit positions to which the message bits of the subscriber lines and interoffice trunks are respectively connected, means controlling said matrix means to switch subscriber message bit streams between selected subscriber line circuit positions by interconnecting the latter in distinct time slots of a repetitive office cycle, said control means further serving to multiplex a plurality of other selected subscriber lines onto a selected interoffice trunk by interconnecting the same in distinct time slots of a repetitive cycle, and means associated with each subscriber line and interoffice trunk for inserting supervisory signal and control bits at uniformly spaced positions in each outgoing digital bit stream.

14. A time division switching system as defined in claim 13 wherein a plurality of subscriber line to subscriber line call message switching connections and a multiple of multiplexing operations can be carried out simultaneously.

15. A time division switching system as defined in claim 13 wherein the message bit streams carried over respective subscriber lines are at a multiple number of binarily related rates.

16. A time division switching system as defined in claim 15 wherein the message bit rates all fall in a $N \times 2^n$ bits per second series.

17. A time division switching system as defined in claim 15 wherein a plurality of message call switching connections between similarly rated subscriber lines are simultaneously carried out.

18. A time division switching system as defined in claim 17 wherein a plurality of call connections at multiple rates are simultaneously carried out.

19. A time division switching system of claim 15 including means for exchanging message bit streams between subscriber lines of different rates without loss of intelligibility.

20. A time division switching system as defined in claim 15 wherein the frame format is the same for all subscriber lines and interoffice trunks irrespective of the rate thereof.

21. A time division switching system comprising a plurality of subscriber lines for carrying respective digital message bit streams, each digital bit stream including supervisory signal and control bits at uniformly spaced positions in each frame of the stream, a multiple of interoffice trunks each capable of carrying in multiplexed channels a given number of digital message bit streams with supervisory signal and control bits located at uniformly spaced positions in each frame of the same, means associated with each subscriber line and interoffice trunk for separating the supervisory signal and control bits from the message bits in each incoming digital stream, time division switching matrix means having a plurality of line circuit positions to which the subscriber lines and interoffice trunks are respectively coupled, means controlling said matrix means so as to switch subscriber message bit streams between selected subscriber line circuit positions by interconnecting the latter in distinct time slots of a repetitive office cycle, the control means controlling said matrix means to further switch a given number of message bit streams between selected subscriber lines and selected channels of an interoffice trunk by interconnecting the subscriber line circuit positions to the interoffice trunk line circuit position in distinct time slots of a repetitive cycle, the distinct time slots being coincident with separate and distinct channels, and means associated with each subscriber line and interoffice trunk for inserting supervisory signal and control bits at unformly spaced positions in each outgoing digital bit stream.

22. A time division switching system as defined in claim 21 wherein the control means controls said matrix means to further switch the message bit stream in a selected channel of an incoming multiplexed interoffice trunk to a corresponding channel of an outgoing multiplexed interoffice trunk by interconnecting the interoffice trunk line circuit positions in a distinct time slot of a repetitive office cycle.

23. A time division switching system as defined in claim 21 wherein the control means controls said matrix means to further switch message bit streams between selected channels of a pair of interoffice multiplex trunks by interconnecting the interoffice trunk line circuit positions in distinct time slots of a repetitive cycle.

24. A time division switching system as defined in claim 23 including means for carrying out channel interchange whereby the message bit stream in one channel of one interoffice trunk is transferred to another and different channel of the other interoffice trunk and vice versa.

25. A time division switching system as defined in claim 21 wherein the control means simultaneously controls said matrix means to further switch message bit streams in given channels of a selected interoffice multiplex trunk to given channels of another interoffice multiplex trunk by interconnecting the interoffice trunk line circuit positions in distinct time slots of a repetitive cycle, the distinct time slots being coincident with distinct channels.

26. A time division switching system as defined in claim 25 including means permitting the message bits occupying a given channel of said selected interoffice trunk to be temporarily stored a bit-at-a-time and then transferred to another and different channel of the other selected interoffice trunk.

27. A time division switching system as defined in claim 25 including means for carrying out a plurality of channel interchanges whereby the message bit streams in a plurality of channels of a selected interoffice trunk are transferred to other and different channels of the other selected interoffice trunk and vice versa.

28. A time division switching system comprising a plurality of subscriber lines for carrying respective digital message bit streams, each digital bit stream including supervisory signal and control bits at uniformly spaced positions in each frame of the stream, a multiple of interoffice trunks each capable of carrying in multiplexed channels a given number of digital message bit streams with supervisory signal and control bits located at uniformly spaced positions in each frame of the same, means associated with each subscriber line and interoffice trunk for separating the supervisory signal and control bits from the message bits in each incoming digital stream and for stretching the message bits into a uniformly spaced stream of message bits, a time division switching matrix having a plurality of line circuit positions to which the message bits of the subscriber lines and interoffice trunks are respectively connected, means controlling said matrix to switch subscriber message bit streams between selected subscriber line circuit positions by interconnecting the latter in distinct time slots of a repetitive office cycle, said control means further serving to multiplex and demultiplex a plurality of other selected subscriber lines with a selected interoffice trunk by interconnecting the same in distinct time slots of a repetitive cycle, and means associated with each subscriber line and interoffice trunk for inserting supervisory signal and control bits at uniformly spaced positions in each outgoing digital bit stream.

29. A time division switching system as defined in claim 28 wherein transmission through the switching matrix is on a four wire basis to thereby permit unidirectional control of the bit stream flow therein.

30. A time division switching system as defined in claim 28 wherein transmission through the switching matrix is on a four wire basis with the matrix control means capable of establishing unidirectional control of selected data flow therein.

31. A time division switching system as defined in claim 28 wherein the switching matrix comprises crosspoints of the low level logic switch design.

32. A time division switching system as defined in claim 28 wherein the switching matrix gates comprise low level logic switches.

33. A time division switching system as defined in claim 28 wherein the digital message bit streams respectively comprise digital data or digitalized voice messages at a multiple number of binarily related rates.

34. A time division switching system as defined in claim 28 wherein up to sixteen digitalized multiplexed vocoded voice messages at a 2.4 kilobit rate can be multiplexed onto a 38.4 kilobit multiplexed message interoffice trunk.

35. A time division switching system as defined in claim 28 including a plurality of intraoffice trunks having store-and-forward modules respectively connected thereto, each intraoffice trunk being respectively connected to a switching matrix line circuit position, the said means controlling the switching matrix to also switch a selected message bit stream between a selected subscriber line circuit position and a selected intraoffice trunk line circuit position.

36. A time division switching system comprising a plurality of subscriber lines for carrying respective digital message bit streams, each digital bit stream including supervisory signal and control bits at uniformly spaced positions in each frame of the stream, a plurality of interoffice trunks each capable of carrying in multiplexed channels a given number of digital message bit streams with supervisory signal and control bits located at uniformly spaced positions in each frame of the same, means associated with each subscriber line and interoffice trunk for separating the supervisory signal and control bits from the message bits in each incoming digital stream and for stretching the message bits into a uniformly spaced stream of message bits, a time division switching matrix having a plurality of line circuit positions to which the message bits at the subscriber lines and interoffice trunks are respectively connected, means controlling said switching matrix to switch subscriber message bit streams between selected subscriber lines by interconnecting the line circuit positions assigned thereto in distinct time slots of a repetitive office cycle, said control means controlling said switching matrix to further switch a multiple of message bit streams between a multiple of selected subscriber lines and selected channels of a given interoffice trunk by interconnecting each of the subscriber line circuit positions to the interoffice trunk line circuit position in a selected time slot of a recurring period which spans a given number of time slots and is time coincident with a given channel, and means associated with each subscriber line and interoffice trunk for inserting supervisory signal and control bits at uniformly spaced positions in each outgoing digital bit stream.

37. A time division switching system as defined in claim 36 including a storage flip-flop for each line circuit position wherein the message bits of the subscriber lines and interoffice trunks are respectively stored a bit-at-a-time prior to their being switched through the switching matrix.

38. A time division switching system as defined in claim 37 wherein the message bits stored in the flip-flop of a selected line circuit position can be nondestructively read out therefrom and switched to a plurality of other selected line circuit positions in distinct time slots of the repetitive office cycle.

39. A time division switching system comprising a plurality of subscriber lines for carrying respective digital message bit streams, each digital bit stream including supervisory signal and control bits at uniformly spaced positions in each frame of the bit stream, a plurality of interoffice trunks each capable of carrying in multiplexed channels a given number of digital message bit streams with supervisory signal and control bits located at uniformly spaced positions in each frame of the same, means associated with each subscriber line and interoffice trunk for separating the supervisory signal and control bits in each incoming digital stream and for stretching the message bits into a uniformly spaced message bit stream, a time division switching matrix having a plurality of line circuit positions to which the message bits of the subscriber lines and interoffice trunks are respectively connected, means controlling said matrix to establish subscriber call interconnections by switching subscriber message bit streams between selected similarly rated subscriber lines by interconnecting the line circuit positions assigned thereto in distinct time slots of a repetitive office cycle, the control means controlling said matrix to further switch up to a given number of message bit streams between selected subscriber lines and selected channels of an interoffice trunk by interconnecting each of the subscriber line circuit positions to the selected interoffice trunk line circuit position in an assigned time slot of a recurring period which is time coincident with a given channel, and means associated with each subscriber line and interoffice trunk for inserting supervisory signal and control bits at uniformly spaced positions in each outgoing digital bit stream.

40. A time division switching system as defined in claim 39 wherein the control means controls said switching matrix to provide a digital conference call connection by establishing a bidirectional call connection between a pair of selected subscriber line circuit positions and a unidirectional call connection from one of said pair of subscriber line circuit positions to a plurality of other selected subscriber line circuit positions.

41. A time division switching system as defined in claim 40 including conversion means permitting the establishment of the conference call connection between different bit rate subscribers.

42. A time division switching system as defined in claim 40 wherein the conferenced subscriber message bit streams comprise a plurality of digitalized, multiplexed, vocoded voice, message bit streams.

43. A time division switching system wherein a plurality of conference call connections can be established in the manner set forth in claim 40 by selectively interconnecting the appropriate line circuit positions in distinct time slots of a repetitive office cycle.

44. A time division switching system as defined in claim 40 wherein the bidirectional call connection and the plurality of unidirectional call connections can be selectively changed between conferees.

45. A communication system comprising a plurality of subscriber lines for carrying respective digital message bit streams, said digital bit streams being at a number of different yet multiply related rates, a plurality of interoffice trunks capable of carrying in multiplex fashion a given number of digital message bit streams, a time division switching matrix having a line circuit position for each subscriber line and interoffice trunk, and means controlling said matrix to switch a bit-at-a-time samples of each of the message bits of selected message bit streams between selected subscriber line circuit positions in distinct time slots of a repetitive office cycle, said control means controlling said matrix so as to also switch a bit-at-a-time samples of each of the message bits of a given number of selected message bit streams between each of a given number of selected line circuit positions respectively assigned to subscriber lines and a selected interoffice trunk line circuit position in distinct time slots of a repetitive cycle.

46. A communication system as defined in claim 45 wherein the message bit streams carried over the subscriber lines are at a multiple number of binarily related rates.

47. A communication system as defined in claim 46 including means permitting the switching of message bit streams between subscriber lines of different rates without loss of intelligibility.

48. A communication system as defined in claim 47 wherein the sampled message bit switching between subscriber lines and that between other subscriber lines and the interoffice trunk are simultaneously carried out.

49. A communication system as defined in claim 45 wherein samples of each of the message bits of a selected message bit stream can be switched to a plurality of selected subscriber line circuit positions.

50. A communication system as defined in claim 49 wherein samples of each of the message bits of the message bit stream of a designated one of the plurality of selected subscriber lines can be simultaneously switched back to the line circuit position associated with the selected message bit stream.

51. A communication system comprising a plurality of subscriber lines for carrying respective digital message bit streams, the message bit streams being at a number of different yet binarily related rates, a multiple of interoffice trunks each capable of carrying in multiplexed channels a given number of digital message bit streams, time division switching matrix means having a plurality of line circuit positions to which the subscriber lines and interoffice trunks are respectively connected, and means controlling said matrix means to switch subscriber message bit streams between selected subscriber line circuit positions by interconnecting the latter in distinct time slots of a repetitive office cycle, the control means further serving to multiplex a plurality of other selected subscriber lines onto a selected interoffice trunk by interconnecting the same in distinct time slots of a repetitive cycle.

52. A communication system as defined in claim 51 wherein a plurality of subscriber line to subscriber line interconnections and a multiple of multiplexing operations can be carried out simultaneously.

53. A communication system as defined in claim 51 wherein the frame format is the same for all subscriber lines and interoffice trunks.

54. A communication system as defined in claim 51 wherein the message bit rates all fall in an $N \times 2^n$ bits per second series.

55. A communication system as defined in claim 51 wherein a plurality of message call switching connections between similarly rated subscriber lines are simultaneously carried out.

56. A communication system as defined in claim 55 wherein a plurality of call connections at multiple rates are simultaneously carried out.

57. A communication system of claim 51 including means for exchanging message bit streams between subscriber lines of different rates without loss of intelligibility.

58. A time division switching system comprising a plurality of subscriber lines for carrying respective digital message bit streams, the message bit streams being at a number of different yet binarily related rates, a multiple of interoffice trunks capable of carrying in multiplexed channels a given number of digital message bit streams, time division switching matrix means having a plurality of line circuit positions to which the subscriber lines and interoffice trunks are respectively connected, and means controlling said matrix means to switch subscriber message bit streams between selected subscriber line circuit positions by interconnecting the latter in distinct time slots of a repetitive office cycle, the control means controlling said matrix means to further switch a given number of message bit streams between selected subscriber lines and selected channels of an interoffice trunk by interconnecting the subscriber line circuit positions to the interoffice trunk line circuit position in distinct time slots of a repetitive cycle, the distinct time slots being coincident with separate and distinct channels.

59. A time division switching system as defined in claim 58 wherein the control means controls said matrix means to further switch the message bit stream in a selected channel of an incoming multiplexed interoffice trunk to a corresponding channel of an outgoing multiplexed interoffice trunk by interconnecting the interoffice trunk line circuit positions in a distinct time slot of a repetitive office cycle.

60. A time division switching system as defined in claim 58 wherein the control means controls said matrix means to further switch message bit streams between selected channels of a pair of interoffice multiplex trunks by interconnecting the interoffice trunk line circuit positions in distinct time slots of a repetitive cycle.

61. A time division switching system as defined in claim 60 including means for carrying out channel interchange whereby the message bit stream in one channel of one interoffice trunk is transferred to another and different channel of the other interoffice trunk, and vice versa.

62. A time division switching system as defined in claim 58 wherein the control means simultaneously controls said matrix means to further switch message bit streams in given channels of a selected interoffice multiplex trunk to given channels of another interoffice multiplex trunk by interconnecting the interoffice trunk line circuit positions in distinct time slots of a repetitive cycle, the distinct time slots being coincident with distinct channels.

63. A time division switching system as defined in claim 62 including means permitting the message bits occupying a given channel of said selected interoffice trunk to be temporarily stored a bit-at-a-time and then transferred to another and different channel of the other selected interoffice trunk.

64. A time division switching system as defined in claim 62 including means for carrying out a plurality of channel interchanges whereby the message bit streams in a plurality of channels of a selected interoffice trunk are transferred to other and different channels of the other selected interoffice trunk, and vice versa.

65. A time division switching system comprising a plurality of subscriber lines for carrying respective digital message bit streams, the message bit streams being at a number of different yet binarily related rates, a multiple of interoffice trunks each capable of carrying in multiplexed channels a given number of digital message bit streams, a time division switching matrix having a plurality of line circuit positions to which the subscriber lines and interoffice trunks are respectively connected, and means controlling said matrix to switch subscriber message bit streams between selected subscriber lines by interconnecting the line circuit positions assigned thereto in distinct time slots of a repetitive office cycle, the control means controlling said matrix to further switch up to a given number of message bit streams between selected subscriber lines and selected channels of an interoffice trunk by interconnecting each of the subscriber line circuit positions to the selected interoffice trunk line circuit position in an assigned time slot of a recurring period which is time coincident with a given channel.

66. A time division switching system as defined in claim 65 wherein transmission through the switching matrix is on a four wire basis with the matrix control means capable of establishing unidirectional control of selected data flow therein.

67. A time division switching system as defined in claim 65 wherein the switching matrix comprises crosspoints of the low level logic switch design.

68. A time division switching system as defined in claim 65 wherein the switching matrix gates comprise low level logic switches.

69. A time division switching system as defined in claim 65 wherein the digital message bit streams respectively compirse digital data or digitalized voice messages at a multiple number of binarily related rates.

70. A time division switching system as defined in claim 65 wherein up to sixteen digitalized multiplexed vocoded voice messages at a 2.4 kilobit rate can be multiplexed onto a 38.4 kilobit multiplexed message interoffice trunk.

71. A time division switching system as defined in claim 65 including a plurality of intraoffice trunks having store-and-forward modules respectively connected thereto, each intraoffice trunk being respectively connected to a switching matrix line circuit position, the said means controlling the switching matrix to also switch a selected message bit stream between a selected subscriber line circuit position and a selected intraoffice trunk line circuit position.

72. A time division switching system comprising a plurality of subscriber lines for carrying respective digital message bit streams, the message bit streams being at a number of different yet binarily related rates, a multiple of interoffice trunks capable of carrying in multiplexed channels a given number of digital message bit streams, a time division switching matrix having a plurality of line circuit positions to which the subscriber lines and interoffice trunks are respectively connected, and means controlling said switching matrix to switch subscriber message bit streams between selected subscriber lines by interconnecting the line circuit positions assigned thereto in distinct time slots of a repetitive office cycle, the control means controlling said switching matrix to further switch a multiple of message bit streams between a multiple of selected subscriber lines and selected channels of a given interoffice trunk by interconnecting each of the subscriber line circuit positions to the interoffice trunk line circuit position in a selected time slot of a recurring period which spans a given number of time slots and is time coincident with a given channel.

73. A time division switching system as defined in claim 72 including a storage flip-flop for each line circuit position wherein the message bits of the subscriber lines and interoffice trunks are respectively stored a bit-at-a-time prior to their being switched through the switching matrix.

74. A time division switching system as defined in claim 73 wherein the message bits stored in the flip-flop of a selected line circuit position can be nondestructively read out therefrom and switched to a plurality of other selected line circuit positions in distinct time slots of the repetitive office cycle.

75. A time division switching system comprising a plurality of subscriber lines for carrying respective digital message bit streams, the message bit streams being at a number of different yet binarily related rates, a multiple of interoffice trunks each capable of carrying in multiplexed channels a given number of digital message bit streams, a time division switching matrix having a plurality of line circuit positions to which the subscriber lines and interoffice trunks are respectively connected, and means controlling said matrix to establish subscriber call interconnections by switching subscriber message bit streams between selected similarly rated subscriber lines by interconnecting the line circuit positions assigned thereto in distinct time slots of a repetitive office cycle, the control means controlling said matrix to further switch up to a given number of message bit streams between selected subscriber lines and selected channels of an interoffice trunk by interconnecting each of the subscriber line circuit positions to the selected interoffice trunk line circuit position in an assigned time slot of a recurring period which is time coincident with a given channel.

76. A time division switching system as defined in claim 75 wherein the control means controls said switching matrix to provide a digital conference call connection by establishing a bidirectional call connection between a pair of selected subscriber line circuit positions and a unidirectional call connection from one of said pair of subscriber line circuit positions to a plurality of other selected subscriber line circuit positions.

77. A time division switching system as defined in claim 76 including conversion means permitting the establishment of the conference call connection between difference bit rate subscribers.

78. A time division switching system as defined in claim 76 wherein the conferenced subscriber message bit streams comprise a plurality of digitalized, multiplexed, vocoded voice, message bit streams.

79. A time division switching system wherein a plurality of conference call connections can be established in the manner set forth in claim 76 by selectively interconnecting the appropriate line circuit positions in distinct time slots of a repetitive office cycle.

80. A time division switching system as defined in claim 76 wherein the bidirectional call connection and the plurality of unidirectional call connections can be selectively changed between conferees.

81. A communication system comprising a plurality of subscriber lines far carrying respective digital message bit streams which include supervisory signal and control bits at uniformly spaced positions in each frame thereof, the message bit streams being at a number of different yet binarily related rates, a multiple of interoffice trunks each capable of carrying in multiplexed channels a given number of digital message bit streams with supervisory signal and control bits located at uniformly spaced positions in each frame of the same, means associated with each subscriber line and interoffice trunk for separating the supervisory signal and control bits from the message bits in each incoming digital stream and for stretching the message bits into a uniformly spaced stream of message bits, a time division switching matrix having a plurality of line circuit positions to which the message bits of the subscriber lines and interoffice trunks are respectively connected, means controlling said switching matrix to switch subscriber message bit streams between selected subscriber line circuit positions by interconnecting the latter in distinct time slots of a repetitive office cycle, said control means further serving to multiplex a plurality of other selected subscriber lines onto a selected interoffice trunk by interconnecting the line circuit positions thereof in distinct time slots of a repetitive cycle, and means associated with each subscriber line and interoffice trunk for inserting supervisory signal and control bits at uniformly spaced positions in each outgoing digital bit stream.

82. A communication system as defined in claim 81 wherein the message bit stream switching through said matrix is carried out a bit-at-a-time between selected line circuit positions.

83. A communication system comprising a plurality of subscriber lines for carrying respective digital message bit streams which include supervisory signal and control bits at uniformly spaced positions in each frame thereof, the message bit streams being at a number of different yet binarily related rates, a multiple of interoffice trunks each capable of carrying in multiplexed channels a given number of digital message bit streams with supervisory signal and control bits located at uniformly spaced positions in each frame of the same, means associated with each subscribed line and interoffice trunk for separating the supervisory signal and control bits from the message bits in each incoming digital stream and for stretching the message bits into a uniformly spaced stream of message bits, means for assembling the separated supervisory signal bits into signal words of predetermined size prior to delivery of the same to control means, a time division switching matrix having a plurality of line circuit positions to which the message bits of the subscriber lines and interoffice trunks are respectively connected, means controlling said switching matrix to switch subscriber message bit streams between selected subscriber line circuit positions by interconnecting the latter in distinct time slots of a repetitive office cycle, said control means further serving to multiplex a plurality of other selected subscriber lines onto a selected interoffice trunk by interconnecting the line circuit positions thereof in distinct time slots of a repetitive cycle, means for receiving signal words of predetermined size from the control means and for distributing the same as time separated supervisory signal bits, and means associated with each subscriber line and interoffice trunk for inserting the distributed supervisory signal bits and supervisory control bits at uniformly spaced positions in the appropriate outgoing digital bit streams.

84. A communication system comprising a plurality of subscriber lines for carrying respective digital message bit streams which include supervisory signal and control bits at uniformly spaced positions in each frame thereof, the message bit streams being at a number of different yet binarily related rates, a multiple of interoffice trunks each capable of carrying in multiplexed channels a given number of digital message bit streams with supervisory signal and control bits located at uniformly spaced positions in each frame of the same, means associated with each subscriber line and interoffice trunk for separating the supervisory signal and control bits from the message bits in each incoming digital stream and for stretching the message bits into a uniformly spaced stream of message bits, means assembling the separated supervisory signal bits that occur in each frame of each bit stream into signal characters and delivering the same with appropriate identity to common control means, a time division switching matrix having a plurality of line circuit positions to which the message bits of the subscriber lines and interoffice trunks are respectively connected, means controlling said switching matrix to switch subscriber message bit streams between selected subscriber line circuit positions by interconnecting the latter in distinct time slots of a repetitive office cycle, said control means further serving to multiplex a plurality of other selected subscriber lines onto a selected interoffice trunk by interconnecting the line circuit positions thereof in distinct time slots of a repetitive cycle, means for receiving signal characters and the appropriate subscriber line or trunk identity of the same from the common control means and for distributing the signal characters as predetermined time separated supervisory signal bits, and means associated with each subscriber line and interoffice trunk for inserting the distributed supervisory signal bits at uniformly spaced positions in the appropriate outgoing digital bit streams.

85. A communication system comprising a plurality of subscriber lines for carrying respective digital message bit streams which include supervisory signal and control bits at uniformly spaced positions in each frame thereof, the message bit streams being at a number of different yet binarily related rates, a multiple of interoffice trunks each capable of carrying in multiplexed channels a given number of digital message bit streams with supervisory signal and control bits located at uniformly spaced positions in each frame of the same, means associated with each subscriber line and interoffice trunk for separating the supervisory signal and control bits from the message bits in each incoming digital stream and for stretching the message bits into a uniformly spaced stream of message bits, a time division switching matrix having a line circuit position for each subscriber line and interoffice trunk to which the message bits of the same are respectively coupled, means controlling said matrix to switch a bit-at-a-time samples of each of the message bits of selected message bit streams between selected subscriber line circuit positions in distinct time slots of a repetitive office cycle, said control means controlling said matrix so as to also switch a bit-at-a-time samples of each of the message bits of a given number of selected message bit streams between each of a given number of selected line circuit positions respectively assigned to subscriber lines and a selected interoffice trunk line circuit position in distinct time slots of a recurring cycle, and means associated with each subscriber line and interoffice trunk for inserting supervisory signal and control bits at uniformly space positions in each of the outgoing digital bit streams.

86. A communication system comprising a plurality of subscriber lines for carrying respective digital message bit streams which include supervisory signal and control bits at uniformly spaced positions in each frame thereof, the message bit streams being at a number of different yet binarily related rates, a multiple of interoffice trunks each capable of carrying in multiplexed channels a given number of digital message bit streams with supervisory signal and control bits located at uniformly spaced positions in each frame of the same, means associated with each subscriber line and interoffice trunk for separating the supervisory signal and control bits from the message bits in each incoming digital stream and for stretching the message bits into a uniformly spaced stream of message bits, means assembling the separated supervisory signal bits that occur in each frame of each bit stream into signal characters and delivering the same with appropriate identity to control means, a time division switching matrix having a line circuit position for each subscriber line and interoffice trunk to which the message bits of the same are respectively coupled, means controlling said matrix to switch a bit-at-a-time samples of each of the message bits of selected message bit streams between selected subscriber line circuit positions in distinct time slots of a repetitive office cycle, said control means controlling said matrix so as to also switch a bit-at-a-time samples of each of the message bits of a given number of selected message bit streams between each of a given number of selected line circuit positions respectively assigned to subscriber lines and a selected interoffice trunk line circuit position in distinct time slots of a recurring cycle, means for receiving signal characters and the appropriate subscriber line or trunk identity of the same from the control means and for distributing the signal characters as predetermined time separated supervisory signal bits, and means associated with each subscriber line and interoffice trunk for inserting the distributed supervisory signal bits at uniformly spaced positions in the appropriate outgoing digital bit streams.

87. A communication system comprising a plurality of subscriber lines for carrying respective digital message bit streams which include supervisory signal and control bits at uniformly spaced positions in each frame thereof, a multiple of interoffice trunks each capable of carrying in multiplexed channels a given number of digital message bit streams with supervisory signal and control bits located at uniformly spaced positions in each frame of the same, means associated with each subscriber line and interoffice trunk for separating the supervisory signal and control bits from the message bits in each incoming digital stream and for stretching the message bits into a uniformly spaced stream of message bits, means assembling the separated supervisory signal bits that occur in each frame of each bit stream into signal characters and delivering the same with appropriate identity to control means, a time division switching matrix having a line circuit position for each subscriber line and interoffice trunk to which the message bits of the same are respectively coupled, means controlling said matrix to switch a bit-at-a-time samples of each of the message bits of selected message bit streams between selected subscriber line circuit positions in distinct time slots of a repetitive office cycle, said control means controlling said matrix so as to also switch a bit-at-a-time samples of each of the message bits of a given number of selected message bit streams between each of a given number of selected line circuit positions respectively assigned to subscriber lines and a selected interoffice trunk line circuit position in distinct time slots of a recurring cycle, means for receiving signal characters and the appropriate subscriber line or trunk identity of the same from the control means and for distributing the signal characters as predetermined time separated supervisory signal bits, and means associated with each subscriber line and interoffice trunk for inserting the distributed supervisory signal bits as well as supervisory control bits at uniformly spaced positions in the appropriate outgoing digital bit streams.

88. A communication system comprising a plurality of subscriber lines for carrying respective digital message bit streams which include supervisory signal and control bits at uniformly spaced positions in each frame thereof, the message bit streams being at a number of different yet binarily related rates, a multiple of interoffice trunks each capable of carrying in multiplexed channels a given number of digital message bit streams with supervisory signal and control bits located at uniformly spaced positions in each frame of the same, means associated with each subscriber line and interoffice trunk for separating the supervisory signal and control bits from the message bits in each incoming digital stream and for stretching the message bits into a uniformly spaced stream of message bits, means receiving the separated supervisory signal bits which occur in each frame of each incoming bit stream and translating the same into distinct parallel supervisory signal words and then delivering the latter with appropriate line or trunk identity words to common control means, a time division switching matrix having a line circuit position for each subscriber line and interoffice trunk to which the message bits of the same are respectively coupled, means controlling said matrix to switch a bit-at-a-time samples of each of the message bits of selected message bit streams between selected subscriber line circuit positions in distinct time slots of a repetitive office cycle, said control means controlling said matrix so as to also switch a bit-at-a-time samples of each of the message bits of a given number of selected message bit streams between each of a given number of selected line circuit positions respectively assigned to subscriber lines and a selected interoffice trunk line circuit position in distinct time slots of a recurring cycle, means for receiving from the common control means parallel supervisory signal words and identification words which indicate the lines and trunks to which the supervisory signal words are to be respectively routed and for translating each of the parallel signal words into a series of supervisory signal bits with the signal bits time separated by a predetermined amount, and means associated with each subscriber line and interoffice trunk for inserting appropriate serial supervisory signal bits at predetermined positions in the respective outgoing digital bit streams.

89. A communication system as defined in claim 88 wherein the translation of the separated supervisory signal bits of the digital bit streams to distinct parallel supervisory signal words takes place on a time multiplexed basis.

90. A communication system as defined in claim 88 wherein the translation of the parallel supervisory signal words to distinct series of supervisory signal bits takes place on a time multiplexed basis.

91. A communication system comprising a plurality of subscriber lines for carrying respective digital message bit streams which include supervisory signal and control bits at uniformly spaced positions in each frame thereof, the message bit streams being at a number of different yet binarily related rates, a multiple of interoffice trunks each capable of carrying in multiplexed channels a given number of digital message bit streams with supervisory signal and control bits located at uniformly spaced positions in each frame of the same, means associated with each subscriber line and interoffice trunk for separating the supervisory signal and control bits from the message bits in each incoming digital stream and for stretching the message bits into a uniformly spaced stream of message bits, means for assembling the separated supervisory signal bits which occur in each frame of each incoming bit stream into separate and distinct signal words and for delivering each of the same with an appropriate line or trunk identity word to common control means, a time division switching matrix having a line circuit position for each subscriber line and interoffice trunk to which the message bits of the same are respectively coupled, means controlling said matrix to switch a bit-at-a-time samples of each of the message bits of selected message bit streams between selected subscriber line circuit positions in distinct time slots of a repetitive office cycle, said control means controlling said matrix so as to also switch a bit-at-a-time samples of each of the message bits of a given number of selected message bit streams between each of a given number of selected line circuit positions respectively assigned to subscriber lines and a selected interoffice trunk line circuit position in distinct time slots of a recurring cycle, means for receiving from the common control means supervisory signal words along with identity words indicative of the lines and trunks for which the said signal words are respectively intended and for distributing each of the supervisory signal words as serial supervisory signal bits separated in time to a predetermined extent, and means associated with each subscriber line and interoffice trunk for inserting the appropriate distributed supervisory signal bits at predetermined positions in the outgoing digital bit streams.

92. A communication system as defined in claim 91 wherein the supervisory signal assembler means comprises a delay line and a shift register connected end to end in a loop configuration, the total loop delay being equal to the duration of the aforementioned repetitive office cycle.

93. A communication system as defined in claim 92 including means for loading each new supervisory signal bit of a given line or trunk into the delay loop in juxtaposition to previously loaded signal bits of the same line or trunk.

94. A communication system as defined in claim 93 wherein the said previously loaded signal bits are precessed one bit position in the delay loop prior to the loading of each new supervisory signal bit.

95. A communication system as defined in claim 94 wherein the shift register comprises a number of stages equal in number to the number of signal bits forming the signal words.

96. A communication system as defined in claim 95 wherein the assembled signal bits forming the signal words are read out of the shift register in parallel form.

97. A communication system as defined in claim 96 including means for inhibiting the aforementioned read out of signal words under predetermined conditions.

98. A communication system as defined in claim 96 including means for inhibiting the aforementioned read out of repetitive preselected signal words of the same line or trunk.

99. A communication system as defined in claim 96 including means for inhibiting the aforementioned read out of certain signal words after the first occurrence of the same.

100. A communication system as defined in claim 94 wherein the same delay loop assembly means is used for assembling the signal words of a plurality of different rated subscriber lines and trunks.

101. A communication system as defined in claim 91 wherein the supervisory signal distributor means comprises a delay line and a shift register connected end to end in a loop configuration, the total loop delay being equal to the duration of the aforementioned repetitive office cycle.

102. A communication system as defined in claim 101 wherein the signal words to be distributed are loaded in parallel into the delay loop and are then serially read out of the same.

103. A communication system as defined in claim 102 wherein the loaded signal bits intended for a given line or trunk are precessed one bit position in the delay loop each time one of the same is read out from the delay loop.

104. A communication system as defined in claim 91 wherein the supervisory signal distributor means automatically generates and distributes selected supervisory signal words for a given line or trunk when no new signal data is to be delivered thereto.

105. A communication system as defined in claim 103 wherein the same delay loop distributor means is used for distributing the signal words intended for a plurality of different rated subscriber lines and trunks.

106. A communication system comprising a plurality of subscriber lines for carrying respective digital message bit streams, said message bit streams being at a number of different yet multiply related rates, a plurality of interoffice trunks capable of carrying in multiplex fashion a given number of digital message bit streams, a time division switching means having a line circuit position for each subscriber line and interoffice trunk, said means switching a bit-at-a-time samples of each of the message bits of selected message bit streams between selected subscriber line circuit positions in distinct time slots of a repetitive office cycle, said switching means also serving to switch a bit-at-a-time samples of each of the message bits of a number of selected message bit streams between each of a number of selected line circuit positions respectively assigned to subscriber lines and a selected interoffice trunk line circuit position in distinct time slots of a repetitive cycle.

107. A communication system as defined in claim 106 wherein the message bit streams carried over the subscriber lines are at a multiple number of binarily related rates.

108. In a communication system, a plurality of subscriber lines for carrying respective digital message bit streams, each digital bit stream including supervisory signal and control bits at uniformly spaced positions in each frame of the stream, a plurality of interoffice trunks each capable of carrying in multiplexed fashion a given number of digital message bit stream as well as supervisory signal and control bits at uniformly spaced positions in each frame of the same, time division switching means having a line circuit position for each subscriber line and interoffice trunk, said switching means switching a bit-at-a-time samples of each of the message bits of selected message bit streams between selected subscriber line circuit positions in distinct time slots of a repetitive office cycle, said switching means also serving to switch a bit-at-a-time sampling of each of the message bits of a given number of selected message bit streams between each of a given number of selected line circuit positions respectively assigned to subscriber lines and a selected interoffice trunk line circuit position in distinct time slots of a repetitive cycle.

109. A communication system as defined in claim 108 wherein the time division switching means includes means for separating the supervisory signal and control bits from the message bits in each incoming digital stream and for inserting predetermined supervisory signal and control bits at uniformly spaced positions in each of the outgoing digital bit streams.

110. A communication system as defined in claim 109 wherein the digital bit streams carried over the subscriber lines and interoffice trunks are at a multiple number of binarily related rates.

111. A communication system comprising a plurality of subscriber lines for carrying respective digital message bit streams which include supervisory signal and control bits at uniformly spaced positions in each frame thereof, the message bit streams being at a number of different yet binarily related rates, a multiple of interoffice trunks each capable of carrying in multiplexed channels a given number of digital message bit streams with supervisory signal and control bits located at uniformly spaced positions in each frame of the same, means associated with each subscriber line and interoffice trunk for separating the supervisory signal and control bits from the message bits in each incoming digital stream and for stretching the message bits into a uniformly spaced stream of message bits, means for assembling the separated supervisory signal bits which occur in each frame of each incoming bit stream into separate and distinct signal words and for delivering each of the same with an appropriate line or trunk identity word to common control means which generates in response to the received signal words the appropriate call instructions so as to provide the requested service, a time division switching matrix having a line circuit position for each subscriber line and interoffice trunk to which the message bits of the same are respectively coupled, means controlling said matrix in response to call instructions received from the common control means to switch a bit-at-a-time samples of each of the message bits of selected message bit streams between selected subscriber line circuit positions in distinct time slots of a repetitive office cycle, said control means controlling said matrix in response to call instructions received from the common control means so as to also switch a bit-at-a-time samples of each of the message bits of a given number of selected message bit streams between each of a given number of selected line circuit positions respectively assigned to subscriber lines and a selected interoffice trunk line circuit position in distinct time slots of a recurring cycle, means for receiving from the common control means supervisory signal words along with identity words indicative of the lines and trunks for which the said signal words are respectively intended and for distributing each of the supervisory signal words as serial supervisory signal bits separated in time to a predetermined extent, and means associated with each subscriber line and interoffice trunk for inserting the appropriate distributed supervisory signal bits at predetermined positions in the outgoing digital bit streams.

112. A time division switching communication system comprising a plurality of subscriber lines for carrying respective digital message bit streams which include supervisory signal and control bits at uniformly spaced positions in each frame thereof, the message bit streams being at a number of different yet binarily related rates, a multiple of interoffice trunks each capable of carrying in multiplexed channels a given number of digital message bit streams with supervisory signal and control bits located at uniformly spaced positions in each frame of the same, means associated with each subscriber line and interoffice trunk for achieving bit synchronization between all incoming lines and trunks operating at the same rate and for achieving subframe synchronization between all incoming interoffice multiplex trunks of the same rate, means associated with each subscriber line and interoffice trunk for separating the supervisory signal and control bits from the message bits in each incoming digital stream and for stretching the message bits into a uniformly spaced stream of message bits, means for assembling the separated supervisory signal bits which occur in each frame of each incoming bit stream into separate and distinct signal words and for delivering each of the same with an appropriate line or trunk identity word to common control means which generates in response to the received signal words the appropriate call instructions so as to provide the requested service, a time division switching matrix having a line circuit position for each subscriber line and interoffice trunk to which the message bits of the same are respectively coupled, means controlling said matrix in response to call instructions received from the common control means to switch a bit-at-a-time samples of each of the message bits of selected message bit streams between selected subscriber line circuit positions in distinct time slots of a repetitive office cycle, said control means further controlling said matrix in response to call instructions received from the common control means so as to also switch a bit-at-a-time samples of each of the message bits of a given number of selected message bit streams between each of a given number of selected line circuit positions respectively assigned to subscriber lines and a selected interoffice trunk line circuit position in distinct time slots of a recurring cycle, means for receiving from the common control means supervisory signal words along with identity words indicative of the lines and trunks for which the said signal words are respectively intended and for distributing each of the supervisory signal words as serial supervisory signal bits separated in time to a predetermined extent, and means associated with each subscriber line and interoffice trunk for inserting the appropriate distributed supervisory signal bits at predetermined positions in the outgoing digital bit streams.

113. A time division switching communication system as defined in claim 112 wherein the incoming line and trunk digital bit streams are synchronized with locally generated clock pulse signals.

114. A time division switching communication system as defined in claim 112 including means for recovering framing information from each incoming line and trunk digital bit stream and for generating clock pulses that are synchronous with the supervisory signal and control bits of each incoming digital bit stream.

115. A time division switching communication system as defined in claim 112 including means for generating an odd parity bit for each frame of each outgoing line and trunk bit stream and for inserting the same along with other predetermined supervisory control bits in selected positions in the respective outgoing digital bit streams.

116. A time division switching system as defined in claim 112 wherein the means for separating the supervisory signal and control bits from the message bits in each incoming digital bit stream and the means for inserting supervisory signal and control bits in each outgoing digital bit stream are structurally the same irrespective of the rate of said bit streams.

117. A communication system comprising a plurality of subscriber lines for carrying respective digital message bit streams which include supervisory signal and control bits at uniformly spaced positions in each frame thereof, the message bit streams being at a number of different yet binarily related rates, a multiple of interoffice trunks each capable of carrying in multiplexed channels a given number of digital message bit streams with supervisory signal and control bits located at uniformly spaced positions in each frame of the same, means associated with each subscriber line and interoffice trunk for separating the supervisory signal and control bits from the message bits in each incoming digital stream and for stretching the message bits into a uniformly spaced stream of message bits, means for assembling the separated supervisory signal bits which occur in each frame of each incoming bit stream into separate and distinct signal words and for generating for each of the same an appropriate line or trunk identity word, common control means, means for delivering the signal words and the related identity words to said common control means which generates in response thereto the appropriate call instructions so as to provide the requisite office interconnections to complete the call requests conveyed by the signal words, a time division switching matrix having a line circuit position for each subscriber line and interoffice trunk to which the message bits of the same are respectively coupled, means controlling said matrix in response to call instructions received from the common control means to switch a bit-at-a-time samples of each of the message bits of selected message bit streams between selected subscriber line circuit positions in distinct time slots of a repetitive office cycle, said control means controlling said matrix in response to call instructions received from the common control means so as to also switch a bit-at-a-time samples of each of the message bits of a given number of selected message bit streams between each of a given number of selected line circuit positions respectively assigned to subscriber lines and a selected interoffice trunk line circuit position in distinct time slots of a recurring cycle, means for receiving from the common control means supervisory signal words along with identity words indicative of the lines and trunks for which the said signal words are respectively intended and for distributing each of the supervisory signal words as serial supervisory signal bits separated in time to a predetermined extent, and means associated with each subscriber line and interoffice trunk for inserting the appropriate distributed supervisory signal bits at predetermined positions in the outgoing digital bit streams.

118. A communication system comprising a plurality of subscriber lines for carrying respective digital message bit streams which include supervisory signal and control bits at uniformly spaced positions in each frame thereof, the message bit streams being at a number of different yet binarily related rates, a multiple of interoffice trunks each capable of carrying in multiplexed channels a given number of digital message bit streams with supervisory signal and control bits located at uniformly spaced positions in each frame of the same, means associated with each subscriber line and interoffice trunk for achieving bit synchronization between the digital bit streams of all incoming lines and trunks operating at the same rate and for achieving subframe synchronization between the digital bit streams of all incoming interoffice multiplex trunks of the same rate, means associated with each subscriber line and interoffice trunk for separating the supervisory signal and control bits from the message bits in each incoming digital stream and for stretching the message bits into a uniformly spaced stream of message bits, means for assembling the separated supervisory signal bits which occur in each frame of each incoming bit stream into separate and distinct signal words and for generating for each of the same an appropriate line or trunk identity word, common control means, means for delivering the signal words and the related identity words to said common control means which generates in response thereto the appropriate call instructions so as to provide the requisite office interconnections to complete the call requests conveyed by the signal words, a time division switching matrix having a line circuit position for each subscriber line and interoffice trunk to which the message bits of the same are respectively coupled, means controlling said matrix in response to call instructions received from the common control means to switch a bit-at-a-time samples of each of the message bits of selected message bit streams between selected subscriber line circuit positions in distinct time slots of a repetitive office cycle, said control means controlling said matrix in response to call instructions received from the common control means so as to also switch a bit-at-a-time samples of each of the message bits of a given number of selected message bit streams between each of a given number of selected line circuit positions respectively assigned to subscriber lines and a selected interoffice trunk line circuit position in distinct time slots of a recurring cycle, means for receiving from the common control means supervisory signal words along with identity words indicative of the lines and trunks for which the said signal words are respectively intended and for distributing each of the supervisory signal words as serial supervisory signal bits separated in time to a predetermined extent, and means associated with each subscriber line and interoffice trunk for inserting the appropriate distributed supervisory signal bits at predetermined positions in the outgoing digital bit streams.

119. A communication system as defined in claim 118 wherein the means for controlling the switching matrix comprises a recirculating memory having a total loop delay that defines the aforementioned repetitive office cycle.

120. A communication system as defined in claim 119 wherein the recirculating memory comprises a plurality of recirculating delay lines having the same loop delay, with the duration of said loop delay being subdivided into a plurality of time slots having the same duration.

121. A communication system as defined in claim 120 including means for receiving call instructions from the common control means and in response thereto loading the appropriate switching matrix crosspoint address data in designated distinct time slots of the recirculating memory.

122. A communication system as defined in claim 121 wherein the said crosspoint address data comprises a predetermined number of address bits with each of the same stored in respective recirculating delay lines and all address bits of a given call connection occupying the same time slot or slots in their respective recirculating delay line loops.

123. A communication system as defined in claim 122 including means for generating parity bits to accompany the crosspoint address bits stored in respective time slots of the recirculating delay line memory loops.

124. A communication system as defined in claim 123 including means for checking the parity of the crosspoint address bits stored in respective time slots and for inhibiting transmission in the switching matrix during any time slot in which a parity error is detected.

125. A communication system comprising a plurality of subscriber lines for carrying respective digital message bit streams, each digital bit stream including supervisory signal and control bits at uniformly spaced positions in each frame of the stream, a plurality of interoffice trunks each capable of carrying in multiplexed channels a given number of digital message bit streams as well as supervisory signal and control bits at uniformly spaced positions in each frame of the same, means associated with each subscriber line and interoffice trunk for separating the supervisory signal and control bits from the message bits in each incoming digital stream, means for assembling the separated supervisory signal bits which occur in each frame of each incoming bit stream into separate and distinct signal words and for delivering each of the same with an appropriate line or trunk identity word to common control means, a time division switching matrix having a line circuit position for each subscriber line and interoffice trunk to which the message bits of the same are respectively coupled, means controlling said matrix to switch a bit-at-a-time samples of each of the message bits of selected message bit streams between selected subscriber line circuit positions in distinct time slots of a repetitive office cycle, said control means further providing multiplexing and demultiplexing capabilities between other selected subscriber lines and a selected interoffice trunk by switching a bit-at-a-time samples of each of the message bits of a plurality of selected message bit streams between each of the line circuit positions respectively assigned to the last-mentioned selected subscriber lines and the selected interoffice trunk line circuit in distinct time slots of a recurring cycle, means for receiving from the common control means supervisory signal words along with identity words indicative of the lines and trunks for which the said signal words are respectively intended and for distributing each of the supervisory signal words as serial supervisory signal bits separated in time to a predetermined extent, and means associated with each subscriber line and interoffice trunk for inserting the appropriate distributed supervisory signal bits at uniformly spaced positions in the outgoing digital bit streams.

126. A communication system as defined in claim 125 wherein the digital bit streams carried over the interoffice trunks are at a multiple number of binarily related rates.

127. A communication system as defined in claim 126 wherein the multiplexing and demultiplexing operations are carried out at different rates for different rated interoffice trunks.

128. A communication system as defined in claim 125 wherein supervisory signaling information can also be transmitted over the subscriber lines and interoffice trunks by substituting appropriate signal bits for the message bits in the respective message bit streams, intraoffice trunk signal data coupling means interconnected between respective line circuit positions on the time division switching matrix and the supervisory signal bit assembler means, said control means controlling said matrix to switch a bit-at-a-time samples of each of the aforementioned substituted signal bits between the line circuit positions to which the same are delivered and the line circuit positions of the intraoffice trunk coupling means, the assembler means assembling the substituted signal bits into separate and distinct signal words in the same manner as the assembly of the aforementioned separated supervisory signal bits.

129. A communication system as defined in claim 125 wherein supervisory signaling data is selectively transmitted over a given subscriber line or interoffice trunk by substituting the appropriate signal bits in the message bit positions of the respective message bit stream of the line or trunk, an intraoffice trunk interconnected between a line circuit position of the time division switching matrix and the supervisory signal bit assembler means, said control means controlling said matrix to switch a bit-at-a-time samples of each of the aforementioned substituted signal bits between the line circuit position of said given line or trunk and the intraoffice trunk line circuit position, and means permitting the assembly of the substituted signal bits in the assembler means in the same manner as the assembly of the supervisory signal bits that are typically separated from the message bits in each incoming line or trunk.

130. A communication system as defined in claim 129 wherein supervisory signaling data is selectively transmitted between offices by substituting the appropriate signal bits for message bits in a selected channel of a interoffice trunk, the demultiplexing capability of the switching matrix control means serving to separate the substituted signal bits out of the multiplexed message bit stream of the trunk and route the same cross-office to said intraoffice trunk line circuit position.

131. A communication system as defined in claim 129 wherein the means permitting the assembly of the substituted signal bits comprises means for recovering framing information therefrom.

132. A method of conveying an interoffice digital signaling message of M bits in length between communication offices using signal words of N bits in length which comprises the steps of subdividing the M bit length message into a sequence of $N-1$ bit blocks, translating said $N-1$ bit blocks into N bit signal words by adding to the beginning of each of said $N-1$ bit blocks a selected $N^{th}$ bit, and transmitting in sequence to a remote communication office the translated $N-1$ bit blocks.

133. The method in accordance with claim 132 wherein the N bit length signal words each comprise an odd number of binary one bits.

134. The method in accordance with claim 133 wherein the signal words consist of four signal bits each.

135. The method in accordance with claim 134 wherein the interoffice message is subdivided into three bit blocks, and the last three bits of the sequentially transmitted signal words correspond to the successive three bit blocks that comprise the interoffice message.

136. The method in accordance with claim 135 wherein the interoffice message can comprise any given number of bits of any predetermined coded format.

137. The method in accordance with claim 136 including the step of adding an appropriate number of unassigned bits to interoffice messages to round out the total number of bits thereof to a multiple of three.

138. A method of conveying an interoffice supervisory signaling message of M bits in length between communication central offices using signal code words of N bits in length comprising the steps of subdividing the M bit length interoffice message into successive $N-1$ bit blocks, translating said successive blocks into a sequence of N bit signal code words wherein $N-1$ bits of successive words of said sequence correspond to the successive $N-1$ bit blocks subdivided from said message, and transmitting to a remote communications office said sequence of N bit signal code words.

139. The method in accordance with claim 138 wherein each of the transmitted N bit length signal code words further conveys its own inherent parity check information.

140. A method of signaling between central offices of a digital communication system wherein the interoffice signaling messages typically comprise a plurality of binary digits of any given number and of any predetermined coded format, the steps comprising subdividing an interoffice signaling message into $N-1$ bit blocks, selecting for transmission supervisory signal codes each comprised of N signal bits, $N-1$ bits of successive signal codes corresponding to the successive $N-1$ bit blocks that comprise the interoffice message, inserting the signal bits of said successive signal codes in successive frames of a digital bit stream transmitted between offices, the signal bits being inserted at uniformly spaced positions in each frame, separating the signal bits out of the digital bit stream arriving at the remote office, assembling the separated supervisory signal bits that occur in each frame into N bit signal codes, and reconstructing the original interoffice signaling message by translating each N bit signal code into the appropriate $N-1$ bits of signaling information.

141. The method in accordance with claim 140 wherein the aforementioned translation comprises elimination of the extra bit in each signal code that is not utilized to convey a portion of the signaling message.

142. The method in accordance with claim 140 wherein the interoffice trunk maintenance status information at two central offices is maintained concurrent including the steps of transmitting a unique signal code on a steady state continuing basis in the aforementioned signal bit positions in each frame of the digital bit stream of a given interoffice trunk whenever its maintenance status is in-service or it is being placed in service at the transmitting central office, and transmitting another and different unique code in a similar steady state fashion whenever the trunk's maintenance status is out-of-service at the transmitting central office.

References Cited

UNITED STATES PATENTS

| | | | |
|---|---|---|---|
| 3,050,589 | 8/1962 | Vaughan | 179—15 |
| 3,207,851 | 9/1965 | Fukinuki | 179—15 |

KATHLEEN H. CLAFFY, *Primary Examiner.*

LAURENCE A. WRIGHT, *Assistant Examiner.*